US007895560B2

(12) United States Patent
Lovell

(10) Patent No.: US 7,895,560 B2
(45) Date of Patent: Feb. 22, 2011

(54) CONTINUOUS FLOW INSTANT LOGIC BINARY CIRCUITRY ACTIVELY STRUCTURED BY CODE-GENERATED PASS TRANSISTOR INTERCONNECTS

(76) Inventor: William Stuart Lovell, 2701 NW, Hwy. 101 #43, Lincoln City, OR (US) 97367

( * ) Notice: Subject to any disclaimer, the term of this patent is extended or adjusted under 35 U.S.C. 154(b) by 1083 days.

(21) Appl. No.: 11/542,773

(22) Filed: Oct. 2, 2006

(65) Prior Publication Data

US 2008/0082786 A1 Apr. 3, 2008

(51) Int. Cl.
*G06F 17/50* (2006.01)
*G06F 15/00* (2006.01)
*G06F 7/38* (2006.01)

(52) U.S. Cl. ....................... 716/119; 716/126; 708/130; 708/231

(58) Field of Classification Search ..................... 716/9, 716/10, 12, 13, 16; 708/130, 231
See application file for complete search history.

(56) References Cited

U.S. PATENT DOCUMENTS 3,526,783 A 9/1970 Booher
3,601,627 A 8/1971 Booher
3,747,064 A 7/1973 Thompson
3,931,506 A 1/1976 Borrelli et al.
3,935,475 A 1/1976 Margolies
3,940,743 A 2/1976 Fitzgerald
3,970,900 A 7/1976 Hodgins
3,970,993 A 7/1976 Finnila
3,978,452 A 8/1976 Barton et al.
3,982,138 A 9/1976 Luisi et al.
3,986,042 A 10/1976 Padgett et al.

(Continued)

OTHER PUBLICATIONS

Compton et al., "Automatic Design of Area-Efficient Configurable ASIC Cores", IEEE Transactions on Computers, vol. 56, No. 5, May 2007, pp. 662-672.*
Levman et al., "Hardware-Software Co-synthesis of Partially Re-Configurable Embedded Systems Optimized for Reduced Power Consumption", IEEE Canadian Conference on Electrical and Computer Engineering, vol. 3, May 4-7, 2003, pp. 1835-1840.*
Lockwood, "Evolvable Internet Hardware Platforms", Thrid NASA/DoD Workshop on Evolvable Hardware, 2001, pp. 271-279.*
S.McGeady The i960CA Super Scalar Implementation of the 80960 Architecture. Intel Corp, CH2843 1990 IEEE.

(Continued)

*Primary Examiner*—Phallaka Kik

(57) ABSTRACT

A processing space contains an array of operational transistors interconnected by circuit and signal pass transistors that when supplied with selected enable bits will structure a variety of circuits that will carry out any desired information processing. The Babbage/von Neumann Paradigm in which data are provided to circuitry that would operate on those data is reversed by structuring the desired circuits at the site(s) of the data, thereby to eliminate the von Neumann bottleneck and substantially increase the computing power of the device, with the apparatus conducting only non-stop Information Processing on a steady stream of data and code, with no repetitious Instruction and data transfers as in the normal computer being required. A code is defined that will identify the physical locations of every transistor in the processing space, which code will then enable only selected ones of the pass transistors therein so as to structure the circuits needed for any algorithm sought to be executed. The circuits so structured, operating independently of and in parallel with every other circuit so structured, are then restructured after each step into another group of circuits, so that almost no transistor will ever "sit idle," but all of the processing space can be devoted entirely to information processing, thereby again to increase enormously the computing power of the device. The apparatus is also super-scalable, meaning that an Instant Logic Apparatus built around that processing space could be built to have any size, speed, and level of computer power desired.

8 Claims, 45 Drawing Sheets

U.S. PATENT DOCUMENTS

| | | | | |
|---|---|---|---|---|
| 4,011,465 | A | 3/1977 | Alvarez, Jr. | |
| 4,021,701 | A | 5/1977 | Davies | |
| 4,044,270 | A | 8/1977 | Lesser | |
| 4,056,780 | A | 11/1977 | Faulkner | |
| 4,100,430 | A | 7/1978 | Lesser | |
| 4,103,186 | A | 7/1978 | Albarren et al. | |
| 4,149,241 | A | 4/1979 | Patterson | |
| 4,224,532 | A | 9/1980 | Spence | |
| 4,229,790 | A | 10/1980 | Gilliand et al. | |
| 4,251,861 | A | 2/1981 | Mago | |
| 4,274,823 | A | 6/1981 | Stanciu et al. | |
| 4,276,029 | A | 6/1981 | Gilson et al. | |
| 4,295,193 | A | 10/1981 | Pomerene | |
| 4,331,914 | A | 5/1982 | Huber | |
| 4,338,671 | A | 7/1982 | Korytkowski et al. | |
| 4,358,690 | A | 11/1982 | Ollendick | |
| 4,360,901 | A | 11/1982 | Proebsting | |
| 4,369,494 | A | 1/1983 | Bienvenu | |
| 4,399,332 | A | 8/1983 | Furlan et al. | |
| 4,405,884 | A | 9/1983 | Weber | |
| 4,412,303 | A | 10/1983 | Barnes et al. | |
| 4,541,067 | A | 9/1985 | Whitaker | |
| 4,612,620 | A | 9/1986 | Davis et al. | |
| 4,684,927 | A | 8/1987 | Zofan et al. | |
| 4,725,975 | A | 2/1988 | Sasaki | |
| 4,805,130 | A | 2/1989 | Lanfranca et al. | |
| 4,835,770 | A | 5/1989 | Hayano | |
| 4,870,302 | A | 9/1989 | Freeman | |
| 5,003,200 | A | 3/1991 | Sakamoto | |
| 5,297,032 | A | 3/1994 | Trojan et al. | |
| 5,543,737 | A | 8/1996 | Ovshinsky | |
| 5,563,586 | A | 10/1996 | Baum et al. | |
| 5,603,043 | A * | 2/1997 | Taylor et al. | 712/1 |
| 5,714,768 | A | 2/1998 | Ovshinsky et al. | |
| 5,752,067 | A | 5/1998 | Wilkinson et al. | |
| 5,805,146 | A | 9/1998 | Jaeger et al. | |
| 5,828,229 | A | 10/1998 | Cliff et al. | |
| 5,996,020 | A | 11/1999 | Reed | |
| 6,044,080 | A | 3/2000 | Antonov | |
| 6,118,299 | A | 9/2000 | Raza | |
| 6,134,688 | A | 10/2000 | Sachdev | |
| 6,208,275 | B1 | 3/2001 | Lovell | |
| 6,247,077 | B1 | 6/2001 | Muller et al. | |
| 6,292,925 | B1 * | 9/2001 | Dellinger et al. | 716/8 |
| 6,334,156 | B1 | 12/2001 | Matsuoka | |
| 6,351,149 | B1 | 2/2002 | Miyabe et al. | |
| 6,513,077 | B2 * | 1/2003 | Vorbach et al. | 710/100 |
| 6,580,378 | B1 | 6/2003 | Lovell | |
| 6,628,215 | B2 | 9/2003 | Talwar et al. | |
| 6,732,215 | B2 | 5/2004 | Smith et al. | |
| 6,812,718 | B1 | 11/2004 | Chong et al. | |
| 6,900,746 | B1 | 5/2005 | Lovell | |
| 6,970,114 | B2 | 11/2005 | Lovell | |
| 7,146,587 | B2 | 12/2006 | Rich et al. | |
| 7,164,679 | B2 | 1/2007 | Kotha et al. | |
| 2002/0010853 | A1 | 1/2002 | Trimberger et al. | |
| 2003/0149676 | A1 | 8/2003 | Kasabov | |
| 2004/0054830 | A1 | 3/2004 | Craft et al. | |
| 2004/0093480 | A1 | 5/2004 | Hagiwara et al. | |
| 2005/0079721 | A1 | 4/2005 | Buerger et al. | |
| 2005/0185700 | A1 | 8/2005 | Pietila et al. | |
| 2005/0199915 | A1 | 9/2005 | Kuroki | |
| 2005/0221233 | A1 | 10/2005 | Minvielle et al. | |
| 2005/0246590 | A1 * | 11/2005 | Lancaster | 714/47 |
| 2005/0264527 | A1 | 12/2005 | Lin | |
| 2006/0007206 | A1 | 1/2006 | Reddy et al. | |
| 2006/0026578 | A1 | 2/2006 | Ramchandran et al. | |
| 2006/0044018 | A1 | 3/2006 | Chang | |
| 2006/0153532 | A1 | 7/2006 | McCrossan | |
| 2006/0202358 | A1 | 9/2006 | Snider | |
| 2006/0205354 | A1 | 9/2006 | Pirzada et al. | |

OTHER PUBLICATIONS

George Boole, An Investigation of the Laws of Thought on Which Are Founded the Mathematical Theories of Logic and Probabilities, undated, p. 37, Dover, New York.

Wolfgang K. Giloi, Konrad Zuse's Plankalkul: The First High-Level 'non von Neumann' Programming Language, IEEE Ann. Hist. Comp., 1977, pp. 17-24, vol. 19, No. 2.

Doron Swade, Charles Babbage and the Quest to Build the First Computer, 2002, pp. 27, 110-114, Penguin Books, New York.

Martin Campbell-Kelly, et al., Computer: A History of the Information Machine, 1996, pp. 3-4, 54-55, 69-76, 84.

John Von Neumann, "First Draft of a Report on the EDVAC,"1945, in Nancy Stern, FromENIAC to UNIVAC: An Appraisal of the Eckert-Mauchly Machine, 2001, Dig. Equip. Corp. Boston.

Alan M. Turing, "Computing Machinery and Intelligence," Oct. 1950, pp. 433-460, MIND, 1992, North Holland, New York.

John Backus, "Can Programming be Liberated from the von Neumann Style?" Aug. 1978, Comm. of the ACM, pp. 613-641 at 615.

Arthur W. Burks, "von Neumann's Self-Reproducing Automata," in Essays in Cellular Automata, 1970, p. xii, Univ. of Ill, Urbana, Ill.

War Dept., TM 11-466, Radar Electronic Fundamentals, Jun. 29, 1944, pp. 229-230, U. S. Gov't Printing Office.

M. D. Godfrey et al., "The Computer as von Neumann Planned It," 1993, pp. 11-21, IEEE Ann. Hist. Comp., pp. 22-38, vol. 15, No. 1.

J. P. Eckert, et al., in Michael R. Williams, "The Origins, Uses, and Fate of the EDVAC," IEEE Ann. Hist. Comp., 1993, pp. 22-38 at 23, vol. 15, No. 1.

Paul E. Ceruzzi, A History of Modern Computing, 2003, pp. 6, 14-15, 22, The MIT Press, Cambridge, Mass, 2d Ed.

Raul Rojas, et al., Eds., The First Computers: History and Architectures, 2002, pp. ix, 4-7, The MIT Press, Cambridge, Mass.

R. W. Hockney, et al., Parallel Computers 2: Architecture, Programming and Algorithms, 1988, pp. 14, 16-19, 35-36, Adam Hilger, Bristol, England.

Saul Rosen, "Electronic Computers: A Historical Survey," 1969, pp. 7-36 at p. 12, Computing Surveys, vol. 1, No. 1.

J. Signorini, "How a SIMD Machine Can Implement a Complex Cellular Automaton," 1989, pp. 175-188, Proc. ACM/IEEE Conf. High Perf. Comp.

Jean-Luc Beuchat, et al., "Von Neumann's 29-State Cellular Automaton . . . ," Aug. 2000, pp. 300-308, IEEE Trans. Edu., vol. 43, No. 3.

Predrag T. Tosic, A Perspective on the Future of Massively Parallel Computing . . . 2004, pp. 488-502, Proc. CF '04.

R. W. Hartenstein, et al., XPUTERS: Very High Throughput . . . , 1990, pp. 365-381, Proc. Fifth Jerusalem Conf. on Information Technology.

Gerald Estrin, "Reconfigurable Computer Origins . . . ," 2002, pp. 3-9 IEEE Ann. Hist. Comp. vol. 24, No. 4.

Ronald N. Ibbett, The Architecture of High Performance Computers, 2002, p. 1, Springer-Verlag, New York.

G. Jack Lipovski, et al., Parallel Computing: Theory and Comparisons, 1987, pp. 17, 31-33, John Wiley & Sons, New York.

Christine A. Monson, et al., A Cooperative Highly-Available Multi-Processor Architecture, 1979, Proc. Compcon Fall 79, pp. 349-356.

David B. Davidson, "A Parallel Processing Tutorial," IEEE Antennas and Prop. Soc. Mag., Apr. 1990, pp. 6-19.

G. M. Amdahl, "Validity of the Single-Processor Approach to Achieving Large Scale Computing Capabilities," Proc. AFIPD, 1967, p. 483-485, vol. 30.

Katie Greene, "Simulators Face Real Problems," Science, Jul. 18, 2003, pp. 301-302, vol. 301, No. 5631.

Nick Tredennick, et al., "The Death of the Microprocessor," Embedded Systems Programming, 2004, pp. 16-20, vol. 17, No. 9.

Michael Barr, "A Reconfigurable Computing Primer," Copyright 1996-2004, Netrino, LLC.

Pak K. Chan, et al., Digital Design Using Field Programmable Gate Arrays, 1994, p. 22, Prentice-Hall, Upper Saddle River, N. J.

John T. McHenry,"The Wildfire Custom Configurable Computer," in John Schewel, Ed., FPGAs for Fast Board, 1995, pp. 189-200, Proc. SPIE, vol. 2607.
Anthony Stansfield, et al., The Design of a New FPGA Architecture, in Moore, et al., Field-Programmable Logic and Applications, 1995, pp. 1-14, Springer, New York.
Stephen Churcher, et al., "The XC6200 FastMap Processor Interface," in Moore, et al., supra, 1995, pp. 36-43.
Ioulia Sliarova, et al., "Reconfigurable Hardware SAT Solvers: . . . ," IEEE Trans. Comp., Nov. 2004, pp. 1449-1461, vol. 53, No. 11.
R. C. Seals, et al., Programmable Logic: PLDs and FPGAs, 1997, pp. 4-7, McGraw-Hill, New York.
Joydeep Gosh, et al., "Critical Issues in Mapping Neural Networks on Message-Passing Multicomputers," ACM SIGARCH Comp. Arch. News, 2008, pp. 3-11. V. 16, No. 2.
Stephen I. Gallant, "Connectionist Expert Systems," Comm. ACM, Feb. 1988, pp. 152-169, vol. 31, No. 2.
G. J. Van Opdorp, et al., "Networks at Work: . . . ," Proc. Third Int'l Conf. Artif. Int., 1991, pp. 278-287, ACM Press, Oxford, England.
Dan Hammerstrom, et al., "The Cognitive Architecture Approach," ACM SIGARCH Comp. Arch. News, 2006, pp. 9-21, vol. 14, Issue 1.
W. Daniel Hillis, The Connection Machine, 1992, pp. 5, 10, 15, 20, 22, 33, The MIT Press, Cambridge, Mass.
William H. Gothmann, Digital Electronics: An Introduction to Theory and Practice, 1977, pp. 23-24, Prentice-Hall, Inc., Englewood Cliffs, N. J.
"Japan Will Use U. S. Technology in Supercomputer," Wall St. Journal, Nov. 15, 2005, p. B2.
Rick Merritt, Cray Tips Its Hand on M Petaflops Bid, EE Times, Mar. 13, 2006, Issue 1414, p. 14.
Wen C. Lin, Handbook of Digital System Design for Scientists and Engineers, 1981, pp. 158-159, CRC Press, Inc., Boca Raton, FL.
Jeffrey D. Ullman, Computational Aspects of VLSI, 1984, pp. 19-20, Fig, 1.14, Computer Science Press, Rockville, MD.
I. Deol, et al., "Amdahl Chip Delay Test System," Proc. IEEE ICCD '91, 1991, pp. 200-205.
George Lawton, "The Lowdown on High-Rise Chips," Computer, Oct. 2004, pp. 24-27.
Jacob Millman, Micro-Electronics: Digital and Analog Circuits and Systems, 1979, p. 173, McGraw-Hill Book Co., New York.
"Graphene's Unique Properties Offer Much Potential," APS News, May 2006, pp. 1, 3, vol. 15, No. 5.

* cited by examiner

Fig. 1. Basic Instant Logic Circuit

Fig. 22
WIRE
Prior Art
Fig. 23
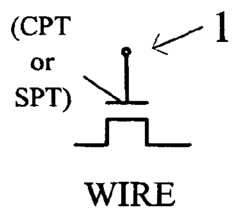
Fig. 24
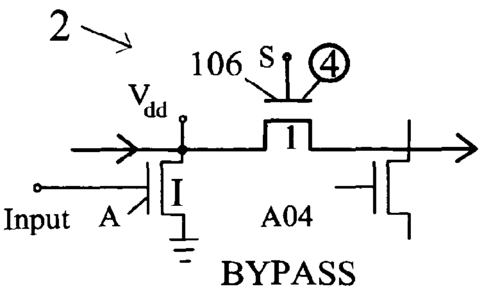
Fig. 25
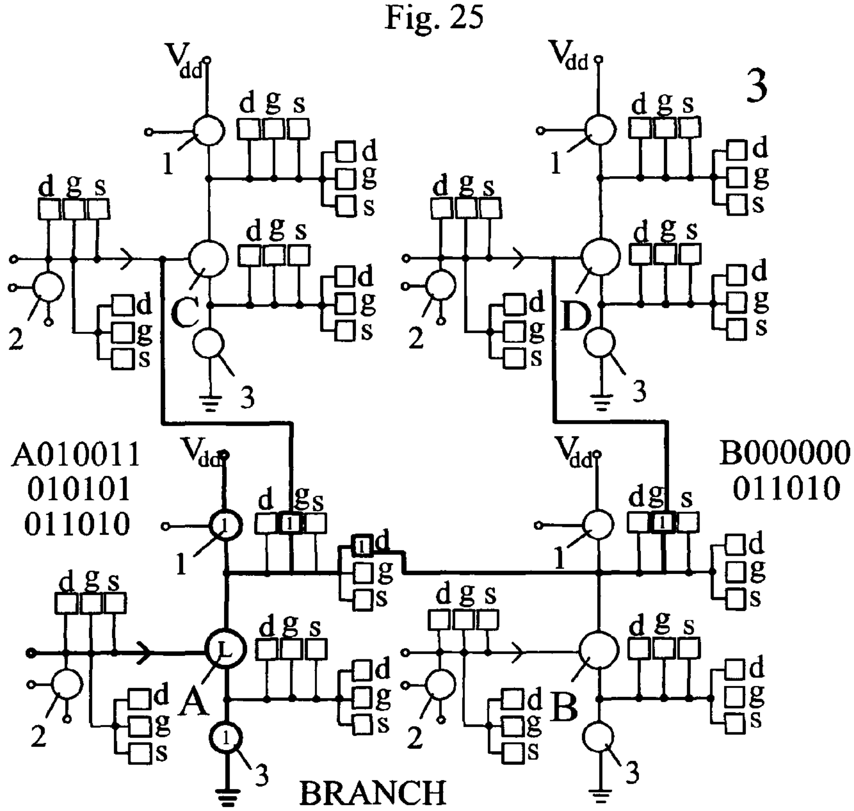
Fig. 26
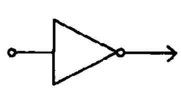
NOT
(Inverter)
Prior Art
Fig. 27
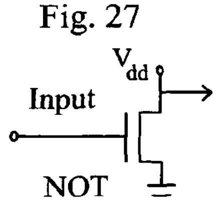
NOT
(Inverter)
Prior Art
Fig. 28
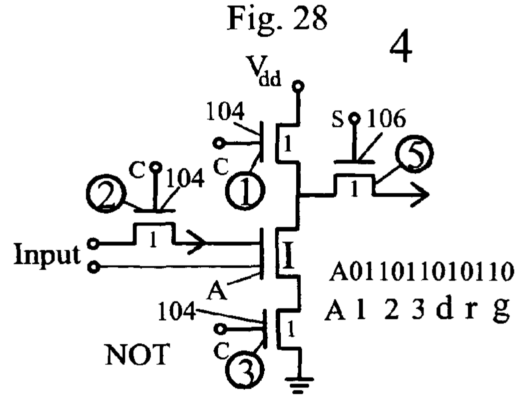

AND

AND

NOR

NOR

NOR

9

$x_m = 8; y_m = 8; z_m = 8$

COMMON
LATCH

COMMON LATCH

Wrap-Around Module
From MPTEs 394

From MPTEs 394
2nd IC level

ADD (Level 1, left side)

(Level 2, left side)

(Level 1, right side)

(Level 2, right side)

(Level 2, right side)

(Level 2, left side)

Fig. 79

CLAIMS CHART

| | | | | | | | |
|---|---|---|---|---|---|---|---|
| 1. Method of achieving Super-scalability | 2. Circuits are formed at locations of data | 4. Changes passive energy devices to active | 12. Independent circuit code selector | 13. Independent signal code selector | 14. Code output enablers | 15. Nested multi-level data selector and counter | 16. IC Inter-connection |
| | 3. Eliminates von Neumann bottleneck | 5. Devices are electronic | | | | | 17. Connection to a contiguous lower plane |
| connector | 23. Two-level connecting | 6. Transistors in a processing space | | | | | 18. Connection to a second next plane |
| 22. Listing the IL connections | | 7. Code control through code selector | | | | | 19. Connection between PSs on different ICs |
| 24. Active binary circuit | $IN_j$ values | | | | | | |
| | 26. $IN_j$ values from relative coordinates | 8. Selectors for circuit and signal | | | | | 20. Wrap-around connections |
| | 27. $IN_j$ values from absolute coordinates | 9. Circuit code selector | | | | | |
| 28. Rotated Transistor Interconnection | | 10. Signal code selector | | | | | |
| | | 11. Manifold capability | | | | | |

CONTINUOUS FLOW INSTANT LOGIC BINARY CIRCUITRY ACTIVELY STRUCTURED BY CODE-GENERATED PASS TRANSISTOR INTERCONNECTS

CROSS-REFERENCE TO RELATED APPLICATIONS

This application follows up on and is in part based on the art of this Inventor in U.S. Pat. Nos. 6,208,275, 6,580,378, 6,900,746, and 6,970,114, as to all of which the present Applicant is the sole inventor and WEND, LLC is the common assignee, which patents are hereby incorporated herein by the references thereto herein as though fully set forth herein.

RESERVATION OF COPYRIGHT

This patent document contains text subject to copyright protection. The copyright owner has no objection to the facsimile reproduction by anyone of the patent document or the patent, as it appears in the U.S. Patent and Trademark Office files or records, or to copying in accordance with any contractual agreements executed by that owner, but otherwise reserves all copyright rights whatsoever.

STATEMENT REGARDING FEDERALLY SPONSORED RESEARCH OR DEVELOPMENT

Not applicable

REFERENCE TO A "SEQUENCE LISTING"

Not applicable

BACKGROUND OF THE INVENTION

1. Field of the Invention

This invention relates to information processing, and particularly to methods and apparatus that have eliminated what has been termed the "von Neumann Bottleneck" that exhibits what may be termed the "Babbage Paradigm" (BP), i.e., wherein data and instructions are transferred back and forth between memory and the circuitry that is to carry out the desired information processing, the invention having then eliminated that von Neumann Bottleneck specifically by reversing that BP, i.e., by using methods and apparatus in which the circuitry required to carry out the desired information processing is structured at the sites at which such data are located or are expected to appear, and at the times of such appearance.

2. Background Information

History

A brief summary of the invention will be given here in order that the relevance of the various prior art references to be brought out below can be seen more easily. The method aspect of the invention is called "Instant Logic™" (IL), for which, as can be seen from the "™" labels, trademark protection is claimed. Upon the entry of any data required, the apparatus that constitutes the central hardware aspect of the invention, which is the "Processing Space" (PS), also called an Instant Logic™ Array (ILA) (the "ILA" acronym is also used for an "Instant Logic™ Apparatus," but the context in which the "ILA" acronym is used suffices to indicate which meaning is intended) will carry out any "Information Processing" (IP) task desired for which the applicable code has been installed in the apparatus memory, as long as enough memory is available to hold the code lists for all of the algorithms, and enough PS to carry out the execution of those algorithms. The resultant IP will take place in a continuous, uninterrupted flow of enabling code and data. The circuitry that brings about the IL operations is designated as an "Instant Logic™ Module" (ILM), the particular type of code by which each algorithm is caused to be executed is called "Algorithmic Code" (AC), by which is meant that the code is to be used in an appropriate device to cause the algorithm to be executed, in the same manner that the program code of computer software is used to cause a computer program to be executed in a computer.

Both types of apparatus (the ILA and standard computers) use ordinary binary (not digital) code according to the rules of Boolean algebra, but in the Instant Logic™ (IL) method the AC is developed through the use of a "Circuit Code Selector" (CCS) 126 that will structure the circuits and a "Signal Code Selector" (SCS) 128 that will interconnect those circuits so as then, upon receiving any requisite data, to execute the desired algorithms. (There are no instructions, since instead of having an instruction indicate that a particular circuit (e.g., "ADD") is to be used on such-and-such data, IL simply presents the desired circuitry to those data, wherever those data happen to be or are expected to be.)

The principles underlying the CCS 126 are also expanded to added levels to yield a general purpose "Data Analyzer" (DA2) 226. A "Code Cache" (CODE 120) memory contains the algorithm-specific code lists required, and by calling upon a particular algorithm, the corresponding code lists are sent to the CCS1 (or DA2) 226 and SCS 128 that in turn will enable the PTs appropriate to the circuitry requirements of that particular algorithm and cause the execution of whatever specific IP task was desired at the particular time. ("CC" is not used here as an acronym since it is used otherwise in a reference cited herein.) (CCSs 126 can be provided that carry out one, two, or three, etc., levels of selection, and a number "1" or "2," etc., may be added to the right end of the component acronym (as in the "CCS1" above) to distinguish the level of the particular apparatus being discussed, so a "CCS 126" with no added number should be taken by default to be a CCS1 126.) Although CODE 120 has the same geometric layout as does PS 100, what are referred to in CODE 120 as being "LN 102 nodes" are not in fact LNs 102 at all, but rather memory cells that hold the codes for particular LNs 102 at the node in CODE 120 so designated. (As noted below, there is a Test Array (TA) 124 that indeed is a replica of PS 100 and is thus made up of LNs 102.)

This application does not purport to address any kind of "turnkey" Instant Logic™ Apparatus (ILA) having a monitor, printer, and all the other peripherals, since no such apparatus that was specifically appropriate for the IL process is yet fully known, but some information that has been identified as to such an apparatus will be included here so as to place the functions of the circuits that are essential to the IL process and the Instant Logic™ Apparatus (ILA) as a whole in perspective. (The apparatus that indeed is shown and described would of course be fully functional using presently available signal sources and the various peripherals as are also available from the prior art.)

The IL process as such, CODE 120, and the two Code Selectors (CSs) 126, 128 as set out herein, form the nucleus of a new computing paradigm that reverses what is termed herein as the nearly 200-year-old "Babbage Paradigm" (BP). This new paradigm is termed the "Instant Logic™ Paradigm" (ILP), and completely removes what has come to be known as the "von Neumann bottleneck" (vNb). Inasmuch as in so doing the invention reverses nearly 200 years of computer history, this background must be nearly as broad in scope, hence the short "history" to be given below is provided in order to disclose any previous work that might have contributed to the present invention throughout that period.

The background to Instant Logic™ and the ILA is addressed here in a short first part in such historical terms, with reference to specific previous apparatus and whether the advancements those apparatus provided might in any way have led to IL and the ILA. A second part is devoted to the concepts underlying microprocessors (μPs), central control, configurable computers, scalability, Amdahl's Law, Parallel Processing (PP), Connectionist Machines (CMs), Field Programmable Gate Arrays (FPGAs), and cellular automata, with the distinctions therefrom of IL and the ILA being noted throughout. It is shown how IL and the ILA resolve many of the problems associated with those earlier apparatus. The ubiquitous μP is allotted only a short section, since that device will be discussed at some length in most of the other sections just noted.

What is done by IL involves a number of changes in the way that the processes used are best considered, and in the manner in which one can most usefully think about the invention as compared to the prior art, and for that reason some rather basic and elementary things will need to be restated. (In effect, to an extent one must learn from these pages an entirely new "computer science.") For example, it still remains the practice to refer to apparatus that employ electronic means to carry out IP tasks as being done by "digital electronics," although digital procedures had long since been abandoned following the 1853 invention of binary algebra by George Boole in *An Investigation of the Laws of Thought on Which Are Founded the Mathematical Theories of Logic and Probabilities* (Dover Publications, Inc., New York, undated first American printing), p. 37, based on the equation $x^2=x$ that has only "0" and "1" as solutions. Boolean logic then entered into actual computer practice with the war time (WWII) work of Konrad Zuse in using binary logic and Boolean algebra in the late 1930's, as noted in the Wolfgang K. Giloi article, "Konrad Zuse's *Plankalkül*: The First High-Level 'non von Neumann' Programming Language," *IEEE Ann. Hist. Comp.*, Vol. 19 No. 2 (1977), pp. 17-24, which practice then came to be adopted by the rest of the computer industry. This application will then refer only to binary logic except in historical references when quoting other writings in which the term "digital logic" may appear.

Turning now to the basic foundation of Instant Logic™, and what it was that made the development of Instant Logic™ possible, this can begin by noting that the first task that must be performed in order to carry out any kind of IP with respect to any actual data is somehow to bring together the data and the apparatus by which those data are to be processed, i.e., the "processor" (meant generically) and the operands, so that some kind of operation on those data can take place. In principle, that process, designated herein as an "operational joinder," could be carried out in only two different ways: either by entering the operands into the processor or by providing the processor at the locations of the operands. Given that at the times of Wilhelm Schickard (1623), Blaise Pascal (1642), Samuel Morland (1668), Gottfried Wilhelm Leibniz (1674), René Grillet (1678), of Charles Thomas de Colmar much later (1820), and indeed Charles Babbage (1822), there was no way of doing otherwise, the operands and the processor were necessarily brought together by placing operands within the processor. In fact, in the very earliest machines, such as that of Pascal or the abacus, those operands were entered into the processor by the user, i.e., by direct human intervention.

The appearance of Charles Babbage and his "Difference Engine" in 1822 is regarded as being the first significant step towards automation of the process, wherein after some initial data had been entered, the machine was to do the rest of the specific operations to be carried out, which in the Babbage case was the preparation of printed tables, mostly astronomical, involving the separate steps of calculation, transcription, typesetting and proof reading. In so doing, the "by hand" method of introducing the data into the apparatus was still retained. Doron Swade, *Charles Babbage and the Quest to Build the First Computer* (Penguin Books, New York, 2002), p. 27. Adoption of that procedure was no doubt because that was the only one available, there being no way in which any such processing apparatus, whether made of wood, metal, or whatever, could be "transferred" to the data, and indeed the very notion would at that time have seemed quite nonsensical. However, that practice, as necessarily employed by Babbage at that time, has been followed ever since, even though the apparatus are now semiconductor materials and the "data" comprise very mobile voltages. Boolean algebra not having yet been invented, the Babbage machine was based on digital operations. What must be the principal question herein with respect to the prior art relative to the present invention, however, will lie in the converse situation in which both the theoretical framework and the technology needed for another new advance, namely, Instant Logic™, were available but were not so used.

Work on the "Difference Engine" came to be abandoned, however, in favor of the Babbage "Analytical Engine," first described in 1834. This was to be a general purpose device, rather than being limited to the single task of preparing astronomical tables. In order to speed up the addition process, this machine introduced an "anticipatory carriage," using the "store" and the "mill," akin to the modern memory and CPU, that had even gone so far as to employ a process that much later in the electronic equivalent would be that of the carry-look-ahead adder. Martin Campbell-Kelly and William Aspray, *Computer: A History of the Information Machine* (Basic Books, New York, 1996), p. 54. "In the Analytical Engine, numbers would be brought from the store to the arithmetic mill for processing, and the results of the computation would be returned to the store." Id., p. 55. That principle made possible the long-sought general purpose computer, but also established the CPU as the site of what was later to be known as the "von Neumann bottleneck" (vNb). That central location was where the processing was to occur, and also the location to which the operands and the instructions that would determine what was to be done with those data were transmitted, but during the time that those transmissions were being carried out, no processing could take place. The actual information processing, i.e., the making of arithmetical/logical decisions, was not a continuously running activity but took place more in a staccato fashion, during intervals between the transmission of instructions and data.

Following the development of electronic apparatus, and through the work of those such as John von Neumann and Alan M. Turing, the conceptual foundation of what by then had come to be called a "computer" was established, one feature of which was again that the data were to be introduced into the apparatus. An analysis of the computer as it existed in the 1940s was provided by von Neumann in the 1945 "First Draft of a Report on the EDVAC," reprinted in Nancy Stern, *From ENIAC to UNIVAC: An Appraisal of the Eckert-Mauchly Computers* (Digital Equipment Corporation, Boston, Mass., 2001), and illustrated by Alan M. Turing in his October, 1950 article "Computing Machinery and Intelligence," *MIND*, Vol. 59 (October, 1950), pp. 433-460 (North-Holland, New York, 1992), pp. 133-160, at *MIND*, p. 437, North-Holland, p. 137. Turing's example of an instruction, "add the number stored in position 6809 to that in 4302 and put the result back into the latter storage position," effectively described computers as being "sequential," by which was meant that an ordered list of instructions was to be followed step-by-step in time and in turn. (The procedure given in the Turing example was precisely followed by this inventor on an IBM 650 at Princeton University in about 1963, and of course continues to be employed today.) The information processing required instructions and data to be transferred back and forth repeatedly to one central point, a practice that obviously caused a delay in the processing, and even though that practice had not originated with von Neumann, the path over which those transfers were to take place came to be called the "von Neumann bottleneck" because of his definitive description of the process. John Backus, "Can Programming be Liberated from the von Neumann Style? A Functional Style and its Algebra of Programs," *Comm. of the ACM*, August, 1978, pp. 613-641 at 615.

Von Neumann had in fact been forced to consider the key question of how to bring together the data and the apparatus by which those data are to be processed in his cellular automata design work. It could be said, in fact, that he was necessarily brought to that question since with no "action at a distance" as discussed in quantum physics to be called upon (or not)—to act on data those data must be immediately available. As derived from a tape model introduced by Turing, the operation of a cellular automaton lies in the motion of a tape relative to a recording head, and as the problem presented itself to von Neumann, "In a cellular automaton it is not easy to move a tape and its control unit relative to each other. Instead, von Neumann left them both fixed and established a variable-length connection between them in the form of a path of cells from the control unit to an arbitrary square of the tape and back to the control." Arthur W. Burks, Ed., "Von Neumann's Self-Reproducing Automata," in *Essays in Cellular Automata* (Univ. of Ill. Press, Urbana, Ill., 1970), Editor's Introduction, p. xii. From that starting point, one is then led into the complexities of there needing to be "ordinary" and "special" transmission states in order to expand and contract the tape, an "indefinitely expandable timing loop," Ibid., etc. In this course of developing the cellular automaton one can find the limitations inherent in the historic practice of using mechanical models to carry out logical functions.

The problem seems to be that the field of electronics had not then developed to a stage that could be applied immediately to such functions. The analog side of electronics and of vacuum tube technology was by that time fairly sophisticated, especially including that part related to the switching that was essential to any kind of arithmetical/logical operations as to radar. *War Department Technical Manual TM* 11-466*: Radar Electronic Fundamentals* (U.S. Gov't Printing Office, 29 Jun. 1944), pp. 229-230. However, digital electronics was just being born, as shown by the fact that in his analysis of the EDVAC computer, e.g., in Nancy Stern, supra, in setting out the model on which today's "von Neumann computer" is based, von Neumann was obliged even to develop a system by which logic gates could be represented by icons, since evidently no such system had previously existed; see M. D. Godfrey and D. F. Hendry, "The Computer as von Neumann Planned It," *IEEE Ann. Hist. Comp*., Vol. 15, No. 1 (1993), p. 20.

The EDVAC went through many permutations in arriving at the one built at the Moore School, but what may be taken as a definitive view of how von Neumann himself saw as the EDVAC is given by Godfrey and Hendry, supra, pp. 11-21, in which the use of a "Central arithmetic-logic unit (CA)," "Central Control Unit (CC)," and "Program Counter (address of current instruction (PC)," Id., p. 15, clearly shows the sequential nature of the operation. That sequential (i.e., serial) nature of the operation seems to have derived from this EDVAC work of Eckert and Mauchly:

> "It became apparent that serial operation was in general advantageous and that when serial methods were used whenever possible the equipment was used most efficiently." J. P. Eckert and J. Mauchly, "Automatic High Speed Computing: A Progress Report on the EDVAC," Moore School of Electrical Engineering, Univ. of Pennsylvania, Philadelphia, Sep. 30, 1945, cited in Michael R. Williams, "The Origins, Uses, and Fate of the EDVAC," *IEEE Ann. Hist. Comp. Vol.* 15, No. 1, 1993, pp. 22-38 at p. 23.

Not mentioned is the fact that, as elsewhere in electronics, there will often arise circumstances in which a gain in one aspect of an operation may cause a loss in another; here the conflict lies between "efficiency" and speed.

Von Neumann had built a solid foundation for the continuing development of binary electronics: there were countless paths leading onwards that have been getting explored in numerous ways ever since, but that was evidently too early to examine that foundation to see whether there might be other ways in which that tool might be put to use. It was not that the universal adoption of the von Neumann methodology rested on his authority, since as noted the Moore School EDVAC had departed from his vision in many ways, but rather that the full potential of binary logic had not been exploited far enough that such a course would then have been possible. That understanding has by now been sufficiently expanded that Instant Logic™ can now provide a new basis for future computer advancements.

There is one process described as to the EDVAC that is similar to what is found in the ILA, but is simply a procedure that one would ordinarily follow in any case, i.e., that "Normal instruction sequencing was intended to permit instruction execution at the rate at which data arrived from the output of a delay line." Godfrey and Hendry, supra, p. 17. As a result, "new operands would become available from the current delay line at about the time they would be needed by the C" (that "CA" being the "central arithmetic unit"), Id., p. 18. In the Instant Logic™ Array (ILA), i.e., PS 100, the circuit structuring is timed so that the circuits required for some operation will be structured immediately before the arrival of the data at the inputs to those LNs 102 that make up those circuits. That similarity in the manner of timing, however, does not alter the significance of how it was that the data and circuits were brought together in the first place.

That is, in a "computer" the data arrive at fixed circuits, whereas in the ILA, because of the reversal of the Babbage Paradigm (BP), the data arrive at temporary circuits that would have just been structured for the exact purpose of those specific data, based upon knowing when and where those data would soon appear. Once started, operations within the ILA occur as two continuous, parallel streams of the data and of the code that will structure the circuits that will process those data. Whatever may be the details concerning that EDVAC, therefore, it is quite clear that the EDVAC makes no contribution to the development of IL and the ILA, since the processes that the EDVAC follows as to instructions and data are the precise features that IL sought and has been able to overcome. In addition, the continued use of μPs as PEs in parallel processing apparatus can only suggest that the delaying effect of the μP as such was either not fully appreciated or no solution therefor could be found. The μP is the vNb.

It would seem that the issue next to arise from the Backus query might well have been how programming could be liberated from the von Neumann style while still using a von Neumann computer. Operations that had been written for a sequential computer were modified so as to be more amenable to parallel treatment, but such a modification was not always easy to accomplish. As noted elsewhere herein, although there had been vigorous research effort directed towards the computer hardware, it was the software that "led the charge" against the vNb. What might have occurred, but did not, was to have analyzed the processes underlying that bottleneck first, and then to have sought to eliminate the cause of that bottleneck, as has now been done by Instant Logic™.

In summary of the foregoing, it is that bottleneck between the CPU and memory, not sequential operation, that causes the delay and limits the speed at which presently existing computers can operate. It is not the nature of the pathway between the CPU and memory that causes the delay, or anything specific as to the manner in which the pathway is used, but rather that there is such a pathway at all. It was natural to consider the gain that might be realized, upon observing one sequential process taking place, if one added other like processes along with that first one, thereby to multiply the throughput by some factor, but the result of needing to get those several processes to function cooperatively was perhaps not fully appreciated Parallel processing certainly serves to concentrate more processing in one place, but not only does not avoid that bottleneck but actually multiplies it, with the result that the net computing power is actually decreased.

It was then thought by this inventor that a better approach to the problem might be to eliminate that "von Neumann" bottleneck entirely. (Quite frankly, after a hiatus of some 20 years or so in any involvement at all in electronics, and with my real involvement having taken place in the era of vacuum tubes, when it came time for me to re-educate myself I was astonished to see that what was being done was exactly the same as I had been grinding out at Princeton in the early 60's: "They're still doing that?" The reason for telling this tale is that the idea on which this invention is based must have been incredibly non-obvious if no one had picked up on it for what turns out to have been about 50 years, and would perhaps never have been conceived except by someone like myself who may have had a fair background in the earlier electronics art (mine was through Air Force Radio and Radar), but yet was totally ignorant of transistors and digital electronics and hence had to start out in the subject from the very beginning, which of course is the time at which a thing must be gone into in the greatest detail. Having just learned what a pass transistor was, I was able to ask a different question: "Why don't they just put the circuitry where the data would be? One should be able to hook up a multiplicity of operational transistors into a standard, fixed pattern, through pass transistors, and then by enabling various ones of those pass transistors so as to render them conductive, obtain just about any kind of circuit desired.") Having by then seen what Babbage had done, it was thought to reverse what I elected to call the "Babbage Paradigm" and attempt something that had not been possible at the time of Babbage and other earlier workers, and that evidently had never before been tried, namely, to provide the processing means at the sites of the data.

This invention accomplishes that goal, and as a result not only have a number of procedures that slow down the operation of a computer been eliminated, but it is also found that the resultant apparatus has been rendered not only scalable but indeed super-scalable. There is no "point of diminishing returns" as noted by Amdahl, so through Instant Logic™ both the computing power and the bulk data handling capability can be increased without limit. This invention is not merely some new and fancy gadget, but rather a complete overhaul of the foundations of electronic information processing.

What is now done by IL could not have been done during the early development of computers since, just as in Babbage's case, the technology needed to carry out what was sought was simply not available, and so far as is known to Applicant, IL could not be carried out even now without the pass transistor or an equivalent binary switch. What now follows will be an attempt to set out enough of the history of the actual course of development to show that IL is truly new and unique, having neither been anticipated nor suggested in any of the prior art. Although some specific computers will be mentioned, the "prior art" as to IL is really more a matter of concepts and of particular innovations in the processes that had become available, and in principle could have been used in electronic computers, than in the computers as such.

Specifically, major advances in electronics such as the Fleming vacuum tube in 1904, the de Forest triode in 1906, Konrad Zuse's use of binary logic and Boolean algebra in the late 1930's and '40's, and Eckert and Mauchly's ENIAC that first employed vacuum tubes in a computer in 1946 (Paul E. Ceruzzi, *A History of Modern Computing* (The MIT Press, Cambridge, Mass., 2003), $2^{nd}$ Ed., p. 15), followed by the basic transistor at IBM in 1947, the stored program in Eckert and Mauchly's 1951 UNIVAC and ultimately putting the data and the program in the same memory with the 1952 EDVAC (Ceruzzi, Ibid.), also bit-parallel arithmetic in the EDVAC, Raúl Rojas and Ulf Hashagen, Eds., *The First Computers: History and Architectures* (The MIT Press, Cambridge, Mass., 2002), p. 7)), hardware floating point arithmetic in the IBM 704 in 1955, the first transistor-based computer in 1959, MOSFET transistors in the 1960s, cache memory in 1961, ICs in 1965, active human-computer interaction in the mid-1960s (Ceruzzi, supra, p. 14), the use of semiconductor memory chips in the SOLOMON (ILLIAC IV) computer in 1966, the bit slice or orthogonal architecture in 1972, LSI for the logic circuits of the CPU by Amdahl in 1975, the pipelined CRAY-1 with vector registers in 1976 (R. W. Hockney and C. R. Jesshope, *Parallel Computers 2: Architecture, Programming and Algorithms* (Adam Hilger, Bristol, England, 1988), pp. 18-19), modular microprocessor-based computers with the Cm* computer of Carnegie-Mellon in 1977 (Id., pp. 35-36), the single chip microprocessor in the early 2000s, VLSI (106 gates/chip) with the AMT "Distributed Array Processor" DAP 500 in which the memory was mounted on the same chip as the logic in 2006, all allowed a new methodology to be realized.

Central to all of that, of course, was the seminal work of Robert Noyce and Jack S. Kilby on the computer chip, from which almost innumerable industries have grown, but not until the present writing has anything like Instant Logic™ been seen. While accomplishing the fabrication of chips built up by the integration of several different types of material, the IC structure embodied fully functional transistors having a number of fixed connections made thereto, which of course precluded the IL structure in which the terminal interconnections could be varied dynamically, by also including pass transistors therebetween, as characterizes Instant Logic™. The extent to which the pass transistor was thought to be of any significance can perhaps be deduced from the fact that in none of the computer history books and articles that had been consulted in preparing this application were there found any mention of when the pass transistor was invented (and very few mentions of the pass transistor at all), unless it be taken that such was accomplished, but not particularly noted, in the invention of the transistor as such at IBM in 1947.

In short, at least at the time of the first use of pass transistors in a switching mode, conceivably at least crude versions of Instant Logic™ and the ILA might have appeared even so, but did not. The "von Neumann computer" came to "monopolize" the field of what this application calls "binary electronics," and only in this present work has any departure from that von Neumann computer been found as to the "general purpose" computer, although as noted below there are the Field Programmable Gate Array (FPGA) and Connectionist Machines (CM) for special purposes.

Computers in the 1950s era of the IBM 704 type require special mention, since the documented problem of data transmission that they shared with other computers of the time also documented the need for IL. That is, Hockney and Jesshope note that "all data read by the input equipment or written to the output equipment had to pass through a register in the arithmetic unit, thus preventing useful arithmetic from being performed at the same time as input or output." R. W. Hockney and C. R. Jesshope, supra, pp. 35-36. As to the IBM 704 itself the problem was treated mostly as being one of having slow I/O, however, even though a separate computer called an "I/O channel" was added by which the arithmetic and logic unit of the main computer could operate in parallel with the I/O, albeit that I/O was for purposes of reading and printing of data, and was carried out by way of large blocks of data. Ibid. However, that process did nothing with respect to the data required for those arithmetical and logical operations themselves, and it is those operations that fall prey to the von Neumann bottleneck (vNb) that IL addresses. In short, with the industry having turned towards providing more and more paths through parallel processing, IL has taken the opposite direction, which is to eliminate those paths entirely. The necessary circuitry is provided at the site(s) of the data.

Another significant event in this much abbreviated history, as to the distinctly different path that such history was taking as compared to this late arrival of IL, is seen in the ATLAS computer, which originated at the University of Manchester in about 1956 and appeared as a production model in 1963. Again in the words of Hockney and Jesshope, "The ATLAS was known principally for pioneering the use of a complex multiprogramming operating system based on a large virtual one-level store and an interrupt system. The operating system organized the allocation of resources to the programmes currently in various stages of execution." Id., p. 14. The wide usage nowadays of the term "multi-tasking" in the language attests to the significance of that procedure, but it contributed nothing to how to avoid the results of the vNb. The distinction between that process and IL and of course any ILA, however, is that in that same sense the ILA has no resources to allocate. Unlike any of this prior art, in the IL methodology each course of IP execution is sufficient unto itself and follows its own path while being totally oblivious of what else may be happening in the rest of the "Information Processing Apparatus" (IPA), even as to an immediately adjacent array of LNs 102. The only "resources" that are ever shared and must then be "allocated" are such peripherals as the monitor, printer, and the like.

The IBM 7030, itself an economic failure but even so one that introduced an important innovation in memory usage, was first delivered in 1961. This was the first machine to use parallelism in memory, and included "a look-ahead facility to pick up, decode, calculate addresses and fetch the data to be operated on several instructions in advance, and the division of memory into two independent banks that could send data to the arithmetic units in parallel." Id., pp. 16-17. The "image" of computer operation as might be drawn from that description stands in sharp contrast to an ILA. Because of the manner of operation of IL, one can imagine instead a memory bank filled with data in locations identified by a normal numerical sequence of "index numbers," with the physical location of this memory being unimportant. The reason is that even if there were some long, time-consuming path from memory to the PS, the only effect would be to delay how soon the IP got started, but would have no effect on the speed of operation itself.

That is, since both the data transfer and the IP take place with no interruption, in a continuous, non-stop flow, the speed depends only on how quickly one data bit can be made to follow another one, i.e., the bit rate. Any lack of speed in the transfer of either data bits or code bits (as will be explained below) from memory to the PS 100 means only that initiation of the process would not have taken place until after a first bit had arrived, but after that the process would occur at a rate as fast as transistors can respond. That the actual "working" part of the IP task would not have been started until after even as much as several is or even ms or seconds beyond the time set in the facility work schedule would have no effect whatever on the grand scheme of things—it is only how rapidly the subsequent bits can follow one after another, coupled with how rapidly the transistors of the PS 100 can respond, whichever is the slower, that will affect the operating speed.

The description just given might pertain to a single IP task, or perhaps to a dozen or a hundred such tasks, all under way at once. In any case, simultaneously with the data transmission but with a small "head start" in order to leave time for the actual circuit structuring to take place, there will be a like continuous stream of code arriving in the PS, which code is used to structure the circuits that the data will require in each subsequent step according to whatever algorithm was being executed. That code is held in storage much closer to the PS, and indeed preferably on the same chip, not because of any data transmission delay time but in order to reduce the number of off-chip lines that have to be used. The mode of operation, as characteristic of IL and any ILA, thus stands in clear distinction from the course of developing high speed computers as shown in the time period in question, and except for the present IL and any ILA derived therefrom, that development path was still being followed in 1969, as of course it has been ever since. As has been noted by Saul Rosen in "Electronic Computers: A Historical Survey," *Computing Surveys*, Vol. 1, No. 1, March 1969), pp. 7-36 at p. 12, citing from B. V. Bowden, "Computers in America," in *Faster Than Thought, a Symposium on Digital Computing Machines* (Sir Isaac Pitman and Sons, London, 1953), B. V. Bowden, Ed., the Mark I computer of Howard Aiken was " . . . the first machine actually to be built which exploits the principles of the analytical engine as they were conceived by Babbage a hundred years ago."

Among the devices considered herein, the 2000 Carnegie-Mellon Cm* computer is of interest in being made up of "computer modules" that could act independently or be closely coupled together to function as a whole, that device being said to be expandable to an arbitrary extent and thus to be "somewhat" scalable. Ibid. The modular principle is adopted in the ILA as well, but with a significant difference since IL also reverses the Babbage Paradigm in structuring the circuitry when and where required by the algorithm, so that scalability is fully achieved. As also reported by Hockney and Jesshope, supra, p. 13, "many novel architectural principles for computer design were discussed in the 1950s although, up to 2000, only systems based on a single stream of instructions and data had met with any commercial success." Ibid.

J. Signorini, in "How a SIMD Machine Can Implement a Complex Cellular Automaton? A Case Study: von Neumann's 29-state Cellular Automaton," *Proc.* 1989 *ACM/IEEE Conf. on High Perf. Networking and Computing*, pp. 175-188, notes the development by John von Neumann of Cellular Automata (CA) in his *Theory of Self-Reproducing Automata* (Univ. III Press, Urbana Ill., 1966), (edited and completed by A. W. Burks), as to which Signorini reports having been able to simulate the general purpose components thereof. That work was followed by Jean-Luc Beuchat and Jacques-Olivier Haenni, in "Von Neumann's 29-State Cellular Automaton: A Hardware Implementation," *IEEE Trans. Edu.* Vol. 43, No. 3, August 2000, pp. 300-308, who were able to implement just the transition rule part thereof, and a number of applications of the CA have since been carried out. One characteristic of CA is that the device is able to simulate a Turing machine, and thus perform every kind of arithmetical/logical operation. (This "CA," or "Cellular Automata)," is to be distinguished from the von Neumann "Central Arithmetic" unit mentioned earlier.)

In the ILA, any circuit that can be drawn as a sequence of gates, i.e., in the form of a combinational logic circuit, can be structured. Other than suggesting the use of 2-D arrays, the CA makes no direct contribution to the ILA, but given that the complete CA according to Beuchat and Haenni would require 100,000-200,000 cells, and given also that the prospective size of the ILA, i.e., PS 100, could be made as large as was needed, it may be suggested that the present description of IL and the ILA may provide a "blueprint" for an apparatus that could be used not so much to implement a Turing machine or even a simulation of one, but rather a von Neumann CA (Central Arithmetic unit). Thus, while CA (Cellular Automata) do not contribute directly to the development of IL and the ILA, the particular problems that have been addressed by CA might well suggest particular problems that IL might address as well. If it is true that an ILA itself could carry out any operation that a Turing machine could carry out and more (if indeed there are any such operations), as seems to be the case, it would seem that an ILA could likewise execute all possible arithmetical/logical operations and thus be uniquely suited for addressing the kinds of problems to which the CA has been applied, which the ILA may well be able to carry out faster, whether by simulating a Turing machine or by its own methodology.

The gist of the prior art to this point may then be found in the observation of Campbell-Kelly and Aspray, supra, p. 3, referring to what could only have been that von Neumann report, that "the basic functional specifications of the computer were set out in a government report written in 1945, and these specifications are still largely followed today." (As to what "today" was, the book was published in 1996.) What can be said here will then be limited to a search for any kind of different trend that might ultimately have led to the present invention, along with any reasons that can reasonably be deduced for such trends. Whether certain things were or were not discovered rests on psychological and economic reasons as well as technological reasons, but except for brief observations those will not be pursued.

Efforts to resolve that "bottleneck" problem were directed mainly towards what later was to become called "software," e.g., to the development of FORTRAN by Backus and others, that in fact, as noted above, did not address the "bottleneck" at all but only the sequential nature of the computer. Among those other developments, what was later to be called a "non-von Neumann" programming method was developed by Konrad Zuse, as noted in the Wolfgang K. Giloi article (Giloi, supra) several years before the "non-von" programming style had been advanced by Backus. Again, what was thought to be of concern was the fact that the computing procedure was sequential—so to modify the process so as to occur in parallel would have been the first thought—a natural alternative, but one that did not achieve what was sought, as will be discussed below.

The first fully automatic computer to go into operation and fulfill Babbage's dream was the IBM Automatic Sequence Controlled Calculator, commonly known as the Harvard Mark I, which made explicit the sequential nature of the device and was built at Harvard over the period from 1937 to 1943, having been initiated by Howard Aiken. It was a slow machine in being electromechanical, lacked the ability even to carry out the conditional branch that Babbage's proposed "Analytical Engine" had in fact included, and was really notable only because of having been the first, according to Campbell-Kelly-Aspray, supra, pp. 69-76. (It was to have a rather short history in light of the appearance of the electronic computer.) As it turns out, Babbage's "Analytical Engine" could have been built had the manufacturing capability of his day been that which was available to build the Mark I, while at least in principle, with the advent of electronic computing in the Atanasoff-Berry computer first built in 1941, Campbell-Kelly-Aspray, supra, p. 84, an ILA could also have been built in that time period, had the concept thereof been known. The continuing work in computers, however, entered onto quite different paths from the Instant Logic™ path, both as to hardware and software.

Again in the Campbell-Kelly and Aspray book, Id., pp. 3-4, a 50-year history (from 1945) of research on the development of the computer was noted, in which the research was devoted in part to improving the speed of the components and in part to innovations in use, i.e., as to the software. In the latter research that book singles out five innovations, i.e.: (1) high-level programming languages; (2) real-time computing; (3) time-sharing; (4) networking; and (5) human-computer interfaces, while at least in the use of the equivalent of today's CPU the basic architecture of the computer remained the same. The war-time exigencies then at work might have brought about a quest for quick solutions in lieu of a systematic analysis of the computer art after the von Neumann report, which suggests how it might have been that the "Babbage Paradigm" in which the data to be operated on were taken to the apparatus that would operate on such data continued in use. That continued usage, even after the advancement in technology (especially as to the electronics) had made the opposite choice of Instant Logic™ at least theoretically possible, had anyone developed the concept, is in fact the key element of the prior art examined here. That it then took 60 years for Instant Logic™ to appear would certainly suggest that there is nothing at all obvious about the method and apparatus described herein.

Before that period, according to the flowery language of Raúl Rojas and Ulf Hashagen, Eds., *The First Computers: History and Architectures* (The MIT Press, Cambridge, Mass., 2002), p. ix, "in those early times, many more alternative architectures were competing neck and neck than in the years that followed. A thousand flowers were indeed blooming—data-flow, bit-serial, and bit-parallel architectures were all being used, as well as tubes, relays, CRTs, and even mechanical components. It was an era of Sturm und Drung, the years preceding the uniformity introduced by the canonical von Neumann architecture." Even that much activity, however, did not produce anything substantially different from the von Neumann architecture, or at least anything that survived.

Recently, Predrag T. Tosic had discussed the "connectionist" model of fine rained computing systems (the Connectionist Machine (CM) as will be discussed in more detail further below), an area of high speed computing that is somewhat comparable to IL as to having eliminated the vNb, in "A Perspective on the Future of Massively Parallel Computing: Fine-Grain vs. Course-Grain Parallel Models," *Proc. CF '04*, Apr. 14-16 (2004), pp. 488-502, and in that article the von Neumann computer is described as being based on the following two premises: "(i) there is a clear physical as well as logical separation from the data and programs are stored (memory), and where the computation is executed (processor(s)); and (ii) a processor executes basic instructions (operations) one at a time, i.e., sequentially." Id., p. 489. As a consequence of (i), "the data must travel from where it is stored to where it is processed (and back)," and "the basic instructions, including fetching the data from or returning the data to the storage, are, beyond some benefits due to internal structure and modularity of processors, and the possibility of exploiting . . . instruction-level parallelism, essentially still executed one at a time." Ibid. What for Babbage had been a practical necessity, and what had been described by Alan M. Turing in his "Computing Machinery and Intelligence" article in *MIND*, supra, p. 437, as the "store" (memory) and the "executive unit" (now the microprocessor), remains in the von Neumann computer (e.g., in the laptop on which this text is being written) up the present as the reigning paradigm.

In examining the von Neumann computer, Tosic uses a model that starts with a single "processor+memory" pair and then considers what occurs upon joining a number of such pairs together, noting that "unless connected, these different processor+memory pairs would really be distinct, independent computers rather than a single computing system, [and] there has to be a common link, usually called the bus, that connects all processors together (bracketed word added; emphasis in original)." Id., pp. 490-491. In an Instant Logic™ Array (ILA) there are no "processor+memory" pairs and no need for any such link except to the extent to which one "processor" requires data being held or generated by another such LN 102 "processor." The IL form of a Processing Element (PE) will later be shown to be a Logic Node (i.e., LN 102) and associated CPTs 104 and SPTs 106, or a structured group of such PEs. It will be shown below how (1) IL can routinely generate as many copies of data as desired, without regard to whatever else may be occurring in the system; (2) no bus is required to connect to other "processors" (LNs 102) since IL will structure any circuitry that may be required "on the spot," i.e., at those locations within PS 100 at which the data are to be replicated; and (3) if because of data dependence or some other reason it becomes necessary to store the data generated by the circuits just structured, IL will structure such latches as may be needed to hold those data near to the sites of these calculations, and the subsequent circuit structuring will then be "steered" through PS 100 so that the circuits that will ultimately come to require those data will then be structured at locations adjacent to the latches that had been holding those data, and the most optimum and efficient use of those data can then proceed.

That issue of memory in itself presents a clear distinction between the methods of the μP and the ILA. As noted, the vNb lies in needing to transfer instructions and data back and forth between the μP and "memory." Later when discussing parallel processing (PP) and various examples thereof, as well as Connectionist Machines (CMs) and the like, the issue of where the memory will be located, i.e., as a "main memory" or as "local" memory disposed as a part of each PE in a PP-type computer, will be significant. Memory is required not only to hold all of the data and instructions, but also to collect, either at that main and/or local memory or in some register that is ready to enter such data into one of the circuits of the ALU, all of the intermediate results of every minute step in a program—each ADD, each MOVE, etc. In a PP computer in particular, that may have thousands of PEs with each having its own vNb and consequent memory requirements, that is quite a lot of data to be placed in memory, even temporarily. In the ILA, however, except in the case of data dependence, it is never necessary to save intermediate results, i.e., sending those results out to memory only to be transferred back in the next operation, since those results will pass immediately into the next circuit of the algorithm. And as noted above, in the case of data dependence, the ILA will structure latch memory where needed, and in many cases even that won't be necessary if it were possible, as would most often be the case, to delay the structuring of the circuits that will need that late-produced data until actually required.

Tosic discusses Turing machines, artificial neural networks and cellular automata and their mechanisms as examples of fine-grained connectionist models of computing systems, and also the effect of the emergence of CMOS transistors, but no mention is made of anything at all like IL. He also argues that instead of the "evolutionary" kind of advancement in the IP art along general principles that he sees, there should instead be a revolutionary change into new frontiers. Id., p. 489. The principal limiting factor of this connectionist model, and of the Carnegie-Mellon Cm* computer, is that method of handling the data. Ceruzzi, supra, p. 6, points out that such method comes from the von Neumann era of 1945, but that even at the time Ceruzzi wrote "the flow of information within a computer . . . has not changed." In patent law terms, Tosic had thus enunciated the need (which over nearly 60 years was certainly "long felt"), and noted that such need ought to be fulfilled, but did not purport to provide anything that would have done so. The idea of which Tosic had written, however can now be said to have found in reversing the Babbage Paradigm, and Instant Logic™ does just that.

With respect to types of stand-alone "Information Processing Devices" (IPDs), the "Xputer" has been described as being "non-von Neumann" in nature, in terms partly of using a data sequencer rather than an instruction sequencer. R. W. Hartenstein, A. B. Hirschbiel, and M. Weber, "XPUTERS: Very High Throughput By Innovative Computing Principles," *Proc. Fifth Jerusalem Conf. on Inf. Tech.* 1990, 1990) pp. 365-381. That system has the characteristics that (1) "the ALU is reconfigurable, and thus does not really have a fixed instruction set, nor a hardwired instruction format"; (2) as a result, the Xputer must use (procedural) data sequencing, thus to use a data counter rather than a program counter; and thus (3) "a fundamentally new machine paradigm and a new programming paradigm." Hartenstein et al., supra, p. 365. The relevant question then becomes that of distinguishing between those paradigms and the "Instant Logic™ Paradigm" (ILP).

As to the need for this Xputer system, Hartenstein et al. indicate that "Often . . . the extremely high throughput" being sought "cannot be met by using the von Neumann paradigm nor by ASIC design. In such cases even parallel computer systems or dataflow machines do not meet these goals because of massive parallelization overhead (in addition to von Neumann overhead) and other problems." Hartenstein et al., supra, pp. 366-367. Of course, those are the same issues that motivated the development of Instant Logic™. It then remains to show that the routes taken to overcome the limitations of the technologies listed are quite different as to the Xputer course and that of IL, especially as to the conceptual level at which the changes adopted by those two courses began.

The Xputer adopts the following changes to those prior art technologies:

"Xputers support some compiled fine granularity parallelism inside their reconfigurable ALU (rALU).

A smart register file with a smart memory interface contributes to further reduction of memory bandwidth requirements.

Xputers are highly compiler-friendly by supporting more efficient optimizing compilation techniques, than possible for compilers with computers."

It is also suggested that "the availability of modern field-programmable technology" should contribute to the implementation of the Xputer (Hartenstein et al., supra, p. 367.)

It should then be evident that the Xputer does not present anything that would be useful for, or even remotely related to, Instant Logic™. The reference to compilers, a reconfigurable ALU, etc., suggest that the Xputer comes out mostly as variations on the same von Neumann computer. Later, it is suggested that as to the Xputer, "the key difference to computers, is that data sequencer and a reconfigurable ALU replace computers' program store, instruction sequencer and the hardwired ALU." Hartenstein et al., supra, p. 374.) That data sequencer is described as follows:

"For the xputer, however, the data sequencer is general purpose device covering the entire domain of generic scan paths [i.e., through the memory], which directly maps the rich repertory of generic interconnect patterns . . . from space into time to obtain wide varieties of scan patterns, like e.g., video scan sequences, shuffle sequences, . . . and many others. Instead of being a special feature it is an essential of xputers: the basis of the general purpose machine paradigm." (Hartenstein et al., supra, p. 375.)

Whatever may be the value of those Xputer innovations relative to the von Neumann machine, it is clear that nothing about the "essential of xputers" has any bearing on the innovations underlying Instant Logic™.

Again now as to IL, the principal aspect thereof, besides placing the required circuitry at the exact place and time needed, is that IL leads to both the scalability and the modular feature of the ILA. Since "scalability" has two ends, not only can an ILA be built to be as large as desired but also to be as small as would contain enough PS 100 to structure some minimal number of logic circuits that could "prove out" the system and also do something, such as basic arithmetic. Anything that sets itself out as a new development in the computer art must of course be proven out, but unlike the massive "supercomputers" that cost many millions, with an ILA that testing need not be done by way of building a huge machine that has many thousands of vacuum tubes (or nowadays, ICs), must be cooled cryogenically, or include any other of various somewhat extreme features that seek to pull out the very last bps. One can instead fabricate and test a few small prototypes of an ILA rather than some massive device that would fill a room. (In this application, to "fabricate" means to manufacture an instance of a circuit in "hard wired" form by the procedures commonly used in digital electronics, which is to say by any method other than those of Instant Logic™.)

The modular and scalable aspects of an ILA are such that if a PS 100 were built just large enough to do some minimal set of tasks, one could simply connect up two such modules to each other to see whether or not the throughput doubled. With another few modules to improve the accuracy of the measurements, the case would be made. One would then know that another instance of the device that was many times larger would work in precisely the same way, since the "kernel" of circuitry that makes IL work will be identical through any number of instances—they are all the same, as suggested by the fact that the template of FIG. 2 for the particular embodiment of the ILA, is intended for use throughout all of Instant Logic™, of course in whatever expanded size as were necessary to accommodate whatever circuits that were to be structured, regardless of what circuitry that might be. If a larger device did not function properly, it would then be known that the failure would have arisen from a fabrication problem and not from there being anything wrong with the design or the concepts underlying the IL processes. Such a fault would also be easily corrected, simply by replacing the module on which the defect appeared. A corollary consequence of that distinction is that Instant Logic™ provides some cost and marketing advantages in making possible a wide range of different models in terms of ILA size and throughput that could be marketed, thus to provide a competitive edge that would well serve anyone who sought to develop the ILA commercially.

This is also a convenient point to note that Instant Logic™ does adopt one trend that had been conspicuous in the previous history, which is that of abandoning all use of electromechanical devices in favor of those that are entirely electronic and hence faster. IL takes that process one step further, however, since in at least in some versions of the complete IL apparatus, in lieu of disk drives that apparatus will use purely electronic-type memory, e.g., that formed in semiconductor chips (or of course the corollary thereof in any embodiment of IL that operated on photons). This would apply not only to the Code Cache CODE 120 within which the code for the various algorithms is stored, but also to a main memory in which the data pertinent to those algorithms will be stored. (This is not done for purposes of gaining greater speed, since it turns out that in IL, having no vNbs, the rate at which data are taken from a main memory into the Processing Domain (PS 100) has no bearing on the speed at which the apparatus will operate, but only for purposes of miniaturization, i.e., for the making of pocket-sized versions of the apparatus.)

Microprocessors

Besides those matters of scalability and modularity, another way in which IL can be distinguished from the prior art lies in the manner in which the von Neumann bottleneck (vNb) is addressed. The modern origin of that problem lies in the microprocessor (μP), the current form of the stored program process that had been conceived while developing the ENIAC, Raúl Rojas and Ulf Hashagen, supra, pp. 5-6, and has since underlain most of what has been called "digital electronics." Since there is no special aspect of a μP that even remotely resembles anything in IL, and since the μP has been discussed herein from the outset and will be more so hereinafter, what will be said at this point will simply be a quick summary of what it is that makes up a μP, thereby to provide a location herein of particular aspects of the μP against which a comparison of the ILA can be made. These remarks will also provide a context within which the matter of "central control," to be taken up shortly, can be addressed.

The principal distinction of IL and the ILA from μP-based computers lies in the fact that IL eliminates the vNb problem that in its binary logic version (the original version used by Babbage being digital) the ENIAC and later the μP had created. In order to aid in distinguishing IL and the ILA from the μP as "prior art," it is noted that the μP includes an Arithmetic/Logic Unit (ALU) as part of a Central Processing Unit (CPU), which CPU is provided with a set of instructions—an Instruction Set (IS)—and each instruction of the IS will bring about some operation that is to be carried out within the operational hardware of the apparatus, i.e., in that ALU. Those operations will be carried out when both the instructions to do so and the operands appropriate to the task being executed have been transmitted by the control circuitry of that CPU to that ALU, as a program being executed may dictate.

The occurrence of those events as a temporal series of READ, MOVE, READ, MOVE, [operation], MOVE, WRITE, . . . , etc., makes the apparatus "sequential," as has come to be the defining feature of what is called the "von Neumann architecture" based on the report from von Neumann noted above that had analyzed the EDVAC architecture, and the buses by which those data and instruction MOVEs are carried out constitute the vNb. Arithmetical/logical operations within the ALU are suspended for the length of time that those READs, MOVEs, and WRITEs, etc., are taking place. The "von Neumann computer" is also designated as a Single Instruction, Single Data (SISD) device, since computers having the architecture just noted operate one instruction at a time, and yield a single set of output data. Among other ways, IL and an ILA are principally distinguished from that mode of operation (1) by having eliminated the vNb; (2) in not employing instructions; (3) in operating in a continuous, non-stop manner; and (4) in being unlimited in applicability. The processes employed in SISD machines of conveying the operands to the locations of the circuitry that will operate on those data exhibit the BP that IL and the ILA have reversed. In an ILA, the circuitry is provided at the sites of the operands. The operation of a μP-based computer is also limited to those operations that can be carried out by whatever instruction set had been installed at the time of manufacture, whereas any ILA can carry out any kind of process that falls within the scope of Boolean algebra, with no additional components or anything other than the basic ILA design being needed.

On that basis alone, IL and the ILA are clearly distinct from every other kind of information processing apparatus. What has been presented herein so far should then have already accomplished what the prime task of this background should be, namely, to distinguish the invention from the prior art to a sufficient extent that valid claims can be asserted with respect to that invention. However, rather more background than that will be presented even so, that of course must then serve only to reinforce that conclusion but is presented for quite a different reason: Instant Logic™ (IL) and the Instant Logic™ Array (ILA) have features that are so unique, having no roots whatever in the prior art, that would appear that only by comparing "the unknown to the known" can such previously unknown features be fully understood. A complete grasp of IL requires the development of an entirely new mind set. In so doing, much of what one had learned about computers in the μP-based computer context has to be discarded.

Where a computer program would have an instruction the ILA will have a circuit, or rather the code that would structure that circuit. Where an intermediate result from a computer program would be sent to a main memory for recovery later, in the ILA the output LNs 102 that held such result would be converted into a series of latches so as to form a local memory and those intermediate results would be held in that memory. When the point in the process at which those data were needed was reached, the computer would FETCH those results and send them to a fixed circuit in the ALU that was adapted to carry out the next step in the processing, while IL would instead structure that same circuit adjacent to the latches that held those data, and then send the enable bits to those latches that would release those data to that circuit. In general, in lieu of the instructions of a computer program, IL uses code lists that most often would structure the very same circuits within the ILA as those in the ALU of a computer to which those data would have been sent by those instructions. In writing that code, the user of the ILA will encounter a problem that would be unheard of in a computer, namely, that of "mapping" the course of an algorithm execution onto the ILA geography without "running into" any locations therein that in any particular cycle were already in use by some other algorithm. In what follows quite a few additional features that serve to distinguish IL from the μP-based computer art will be brought out.

Central Control

A term of art that has not always been used consistently in the field of computers is "central control," as had been remarked upon by Turing, supra. Central control has long been an issue in the computer field, based on difficulties that were perceived to arise from having the control and the processing in different locations, meaning that the control had been "centralized." Before actually addressing that issue, however, precisely how the term will be used should be made clear. The reason is that in one sense, there could never be anything but central control, while in another sense, the control could be either central or distributed—sometimes also called "local"—or indeed there could be both. Appropriate clarification of the meaning in which the term will be used is easily obtained, however, simply by specifying exactly what process or apparatus is being controlled and what part of the entire apparatus is to do the controlling.

The sense of the term wherein there could be nothing but central control is in reference to the monitor, as the one central location at which the user will be controlling everything that happens, on the basis of what keys are depressed or where the mouse clicks are made, etc. The user is of course not typically included in the discussion of the computer as such, but even so, there will typically be a single location at which all of those key depressions and mouse clicks will be utilized, so the point remains—given the need for a specific site at which the user can bring about all further actions, that kind of "central control" cannot be avoided. However, that is not the kind of control that is at issue.

In the sense of the single μP, CPU-based computer itself, that central control will lie in the CPU, since that device, under the control of the user, also controls everything that will happen. As instructed by the user, the μP will define what program is to be executed, what data are to be provided to the program so selected, and when a series of instructions and data are to start being transferred between the ALU and memory. That is as far as the matter can go unless the apparatus has both more than one location from which that control could be exercised and something else that requires control—the term "central" cannot have meaning unless there is more than one processing location relative to which the control would or would not then be made "central."

It is the stage of having more than one PE that establishes the practice of both multiprocessing and parallel processing, and from which the issue of central control can first arise. These are distinguished by the fact that the former can be meant to have a multiplicity of PEs (e.g., μPs) all operating at once, under the common, "central" control of a single user, the PEs themselves operating independently, while parallel processing can mean again to have a multiplicity of PEs, but in this case the PEs would be working in conjunction with one another. It is at this point that the issue of there being central or local control takes on meaning.

To Applicant's knowledge no attempt to separate the procedures of control and processing was made even partially until 1960 when Gerald Estrin reported on his efforts both to make that separation and to explore the possibility of achieving computational concurrency, that ultimately came to be known as "parallel processing." See, e.g., Gerald Estrin, "Reconfigurable Computer Origins: The UCLA Fixed-Plus-Variable (F+V) Structure Computer," *IEEE Annals of the History of Computing*, Vol. 24, No. 4 (October-December, 2002), p. 3. That work, however, also introduced the concept of "configurable" computers, and in effect founded the Field Programmable Gate Array (FPGA) industry. Discussion of that Estrin work will then be deferred until it can be taken up more completely in a section below wherein configurable computers and FPGAs will be treated especially.

One way that such a system could be operated would be to have a "control" CPU that will have loaded in a single program, and that program will then send instructions and data to each of the PEs, which would again be a case of central control. Another way lies in having had a program installed within each PE that will carry out the desired operations. In that case, the "control" CPU would be doing little more than turning the PEs on and off, while the PEs would be exerting the direct control of the program loaded therein as to responding to instructions and sending data here and there. The "control" CPU would in a sense be controlling the PEs, from a central point, but the actual operations would be under the direct control of the PEs. (It could be said that while that control CPU was "exercising" control (so as to determine what was to be done) over the whole operation, the PEs would actually be "exerting" that control (actually carrying out whatever had been dictated).) That kind of control would be "local" in the sense of each PE running its own program, would be "distributed" in the sense that the control of the apparatus as a whole would be distributed throughout all of the PEs, and would be centralized again with respect to the actions within the PEs themselves, since each such PE would be functioning in the manner of the μPs that they are. (An apparatus called the "CHAMP" computer will be described later in which each PE in fact has three μPs, each carrying out a different task, but with the same three tasks (and programs) being distributed in the same way among all of the PEs.)

The last of the above types of control comes closest to that of the ILA. Central control circuitry as operated by the user will dictate what program(s) is (are) to be run; in a next step in a second circuit the LNs 102 that are to be used will be specified, along with the code that defines what each such LN 102 is to do; and in a third set of circuits (code selectors) the actual exertion of that control lies in directing selected "1" bits to the CPTs 104, 106 in the ILA itself, the LNs 102 associated with those CPTs 104, 106 that had received "1" bits then carrying out the actions required. By describing the operation in these functional terms, decisions as to whether various aspects of the operation are under central or local control or whether the control is "distributed" become more of an academic exercise than a useful way to describe the operation. In other words, this "central control" issue is one on which a different mind set is required, in that such issue will have lost much of its meaning when applied to Instant Logic™.

That is, the structure of the ILA is such that the PE takes on quite a different role from that of the μPs in the usual computer, and the language by which the process is described must be changed accordingly. In the CPU-based systems just discussed, where a μP can constitute a PE all by itself, whether or not that PE contained a program in its own local memory could be an issue, while in the ILA even to structure the most simple circuit will require some number of the ultimately small-grained PEs to work together, and that circuit itself would only be one small part of what in the CPU context would be called a "program." There are no fixed circuits within the PS that could be called the PE as to carrying out IP, since there are no fixed circuits in the PS that could do anything. IL has no programs since the circuitry itself, as structured within the ILA, carries out the actions that a program would bring about. While the CPU-based system activates particular ones of a number of fixed circuits to carry out the steps of its program, the ILA structures its own circuits when and where needed, i.e., the "instruction" is not a call to use a certain circuit, but is that circuit itself.

The ILA is a very fine-grained device, wherein the PEs thereof are made up of only a single "operational" transistor on a substrate, which is the LN 102, together with CPTs 104 and SPTs 106 associated therewith. By the term "operational" is meant the transistor through which the data bits pertaining to the IP tasks are passed so as actually to carry out the IP. (Although a bit that exits a pass transistor is the same bit as had entered, and indeed does just "pass through," in an LN 102 the bit that enters onto the GA 110 terminal thereof does not just "pass through," but instead renders the LN 102 conductive so that the resultant current brings about a voltage drop between the DR 108 terminal thereof relative to GND—i.e., a "bit," and that bit is not the "same" bit as had entered onto that GA 110 terminal. Even so, it has become the practice in the art to refer to that latter event involving an operational transistor also as having a bit "pass through" a transistor, and that practice is followed throughout this application.)

Also associated with each such grouping there is a Code Selector Unit (CSU) 122 containing a circuit code selector that may be either 1-level or 2-level, etc. (to be explained below), indicating that different versions of the circuit code selector that carry out different levels of classification can be and are provided. In this application, unless otherwise stated, all of the CCSs 126 herein, this being the "generic" version, are to be taken as being 2-bit circuits, and upon there being any 3-bit or higher input, such a circuit would be identified by the number of bits of the input, i.e., a under this system a 3-bit CCS 126 would be designated as a "3,7CCS" (of which one example is shown later, where that "7" will be explained), and a 3-bit, two level CCS 126 would be designated as a "3CCS2" (for which no example is shown). By a "level" is meant that in addition to the normal classification or selection there will also be an initial grouping of the items being treated, as a first level selection, and then within each of the groups so identified that main selection process will be carried out that uses some different feature of the items as a basis and constitutes a second level. (As an analogous corollary, the identification of certain PTs 104, 106 as being one or the other would constitute one level of classification, and then the identification of the differently numbered PTs 104, 106 within each group would be a second level classification.)

The first variation to be shown here is a "one level" CCS1 126 (with reference to which a "Signal Code Selector" (SCS) 128 will be discussed later), both of which exert direct control over what transpires within the ILA (PS 100) by defining which PTs 104, 106 are to be enabled so as to structure a particular circuit and the associated data path. Code lists are held in memory, i.e., in CODE 120, that through an "Index Number" (IN) will identify a particular LN 102 that is to be employed in a circuit, and then through circuit code and signal code will cause CCS1 126 and the SCS 128, respectively, to bring about the sending of "1" bits to particular PTs 104, 106 so that the circuit required for the task at hand will be structured. The actual operation that is to result then requires only the arrival of one or more operands as data input, and upon the arrival those data the operation will proceed.

A sharp distinction with respect to μP-based computers arises, however, from the fact that as the CCS1 126 and SCS 128 are engaged in directing a particular course of circuit structuring that will carry out what in a CPU-based computer would be called a "program," and that in a CPU-based computer would involve only some particular hard-wired circuits in the ALU, the CCS1 126 and SCS 128 of an Instant Logic™ Apparatus" (ILA) will be carrying out the "1" bit transfers of the IL process throughout the full breadth and depth of PS 100. The circuitry required for the next step of every algorithm then being executed in the ILA will be structured at that one time, as to that one particular cycle. There may be dozens of such operations being carried out, each one being under the control of a particular set of CCS1 126 and SCS 128 associated with particular LNs 102 in a particular part of PS 100 in which the operation is to take place, with the code for all of such operations deriving from the one CODE 120. Put another way, while the CPU-based system acts on a single instruction on a single program at a particular time, the ILA acts globally, each algorithm then in process being "attended to" in every cycle. As those operations proceed, each such operation will be tracing out its own separate, independent path through PS 100, so as to change the LNs 102 being used on each cycle. The "particular parts" of PS 100 that are used in each cycle do not fall within any permanently defined region within PS 100, but only along some positional sequence or "path" of LNs 102 that happened to have been selected for use by the encoder (the user), and that could have been anywhere within the ILA, and indeed that might well wend its way all over the ILA.

As it also turns out, that issue of "central control" was something of a chimera in any event. The rationale underlying that statement derives from the fact that with respect to the vNb and the much sought-after faster computers, what has been called "central control" is not a cause, but an effect. Central control was said to be the cause of needing to transfer instructions and data back and forth through the vNb, but in fact the vNb is a consequence of the architecture in which the "store" and the "mill" were located apart from one another, and the central control then arose from having to get data from the "store" to the "mill" and then bring back the result of the processing. Means had to be provided by which those processes could be controlled, such means necessarily being centralized, so the central control came about from the architecture in the same way as did the vNb. Even overlooking the fact that if the PEs are μPs then each will have its own vNb, having a number of PEs set out in an array would then require either some central point from which the control could be exercised, or means must be provided for directly accessing and exercising the control from each PE individually as was previously discussed, but in either case there will be a central point from which the control is directed.

The very name "Central Processing Unit" (CPU) expresses exactly the origin of the vNb difficulty. The delay problem will obviously disappear if the data and processing circuitry are located at the same place, as occurs in IL. The complete Instant Logic™ Information Processing Apparatus (ILA) will not have a CPU, but a Central Control Unit (CCU). (That CCU will be found in the circuitry that, as mentioned earlier, directs CODE 120 to initiate this or that algorithm, controls the input of data, etc.) It does not matter how any data and instruction transfers necessitated by the architecture of a CPU-based system are controlled, but only that such transfers must occur at all.

It would seem that the analysis of how computers could be made to run faster was simply not carried deep enough. Such a conclusion would be supported, for example, by the fact that the study of computer architecture was said to be "particularly concerned with ways in which the hardware of a computer can be organized so as to maximize performance, as measured by, for example, average instruction execution time." Roland N. Ibbett, *The Architecture of High Performance Computers* (Springer-Verlag New York Inc., New York, 2002), p. 1. To accept the use of instructions in that way, i.e., before the analysis has even started, is already to have acceded to the architecture from which at least a principal part of the delay derives, and with that burden already assumed there is nothing that could be done to avoid the consequences. If the matter has already been taken past the stage at which the instruction execution time has become an issue, a great deal of what ought to go into the design of a computing system has been bypassed. The question that might have been asked first is why there should be instructions at all, since that question points to the von Neumann bottleneck (vNb). As a result of having asked that question, the procedure just set out above has become the "heart" of IL, that will be distinguishable from any computer system wherein "instructions" are used to call up particular fixed circuits to be applied to a task at hand.

To see exactly how Instant Logic™ came about should then provide enough of a background to show in clear terms how, and the extent to which, IL differs from the prior art. As to the underlying theme from which IL arose, which was the intent to reverse the BP, the point to be made is that in fact there was no background to that kind of effort—no indication has yet been found showing that anyone had ever before even thought to cause circuits to appear at the sites of the operands instead of the other way around, let alone attempted to do so, and certainly none have succeeded. Once the notion of so proceeding was formed, the manner of so doing was quite simple. It was seen that the circuitry now contained within an ALU must somehow be made available at the immediate sites of the data to be operated upon, whether as incoming data or data that had been produced in the course of using the circuitry that one was then attempting to obtain. The circuitry must of course be in the form of binary logic gates—certainly nothing is "given away" by starting at that point—so one then asks what it takes to have those.

As a first step, one would need to have an operational transistor from which the DR 108 terminal connects to $V_{dd}$, the GA 110 terminal is connected so as to function as an input terminal in connecting to a source of operands, and the SO 112 terminal connects to GND. Not counting the inverter (that strictly speaking is not a "gate" in any event), all binary circuits consist of some number of gates interconnected in various ways, and in order to make the system as broad in scope as possible, one would want to have an operational transistor connected to other such transistors in every way possible. Connections could then be made from the terminals of a first transistor to the terminals of other operational transistors adjacent thereto, then continuing therefrom through a whole array of those operational transistors. With a sufficient number of such transistors being made available for use, one ought to be able to structure every binary circuit imaginable.

Those could not be fixed connections, of course, since the whole array would have been rendered unusable for anything (and conceivably could get burnt out), which would certainly not make for a general purpose computer. However, by making those connections through pass transistors (PTs) whereby the PT is used in its switching mode, i.e., appearing as an open circuit if not "turned on" or a closed circuit when enabled, the originating operational transistor together with selected adjacent operational transistors could be structured into all kinds of circuits just by turning on only those PTs that would form each desired circuit, i.e., various binary logic gates, latches, transmission paths, etc. Depending on which PTs had been enabled, selected sequences of interconnected binary logic gates could be formed into circuits of every kind imaginable.

Those circuits would not be exactly the same as those circuits would be in hard-wired form, since each connection to a terminal in the circuit so structured would bear the RLC or Z impedance of the PT that had been turned on to make that connection, but that impedance Z would generally be minimal (except possibly for the inductance L at the upper frequencies). Upon each such circuit being used for the purpose intended, that circuit could then be de-structured and the LNs 102 thereof could be used again in some other circuit, as the operations of the particular algorithm being executed dictated.

The next step would be to devise a code system whereby selected PTs could be turned on for purposes of structuring circuits, followed by the development of a data input system by which the operands would either arrive at or be produced within a "Processing Space" (PS), and the timing of those two types of event would be arranged so that the circuits required would be structured immediately prior to the arrival or creation of the data, so that in actual operation, the IP step so arranged would then be executed. When that step is finished, those operational transistors, designated herein as "Logic Nodes" (LNs), would then be de-structured and restructured into other circuits for some other IP task, with both the data transmission and the circuit structuring and de-structuring continuing non-stop, with the output being available at any time from the LNs being used. That architecture and methodology form the substance of Instant Logic™.

Beyond microprocessors and central control, what are left as what might be called the "contenders" in the field of binary logic are parallel processing (PP) and configurable arrays (CA), together with such "offshoots" therefrom as connectionist machines (CM), systolic arrays (SA), neural networks (NN), fuzzy logic (FL), and the like. Those first two topics will now be taken up, beginning with PP, from which there also arises the matter of Amdahl's Law, and then configurable computers and their embodiment in the Field Programmable Gate Array (FPGA), to show in these cases again how it is that IL and the ILA are not only distinct from all of those, but also that no combination of any of those could be made that would form the substance of IL and the ILA as just stated above. Moreover, if one painstakingly searched the entirety of the "prior art," including all patents and technical articles, nowhere would there be found any suggestion that the procedures of IL and the architecture of the ILA might be adopted. If anyone had chanced to conceive of this IL procedure, as Applicant was fortunate enough to have done, Applicant would assert that the IL procedure would then have been adopted.

Parallel Processing

The general solution to the von Neumann bottleneck (vNb) problem was thought to be found in the art of "multiprocessing" or parallel processing (PP), in which a number of Processing Elements (PEs) were to be operated in parallel, that process being called a Multiple Instruction, Multiple Data (MIMD) operation. What seems not to have been fully appreciated, however, was that upon arranging to have perhaps thousands of μPs operate in parallel, one would also have introduced that same thousands of vNbs. To have gained the computing power of thousands of μPs all in one apparatus would seem to be quite an advance, yet the device so structured would actually yield less throughput than had been in that same number of individual PEs. Also, PP systems are not scalable, and as noted in Roland N. Ibbett, supra, and shown more thoroughly below, cannot be made to be scalable as long as there are any processing needs beyond those already present in the von Neumann Single Instruction, Single Data (SISD) device. (Although the equations that are commonly used to set out Amdahl's Law do not appear in the above-cited paper, it remains true that Amdahl treated the issue in terms of the relative amounts of sequential and parallel processes, hence the basis for the present manner of interpretation in terms of additional processing needs will also be set out further below.)

There must always be some amount of additional processing that will be needed in any system that seeks to combine a number of fully functional PEs into a single PP apparatus, namely, the processing that actually does that transformation of some number of those separate PEs (whether these are μPs or any other such device) into that single PP device. It thus seems to this inventor that the inability to achieve scalability derives from adding that extra hardware and the program needed to coordinate those multiple PEs, and may have little if anything to do with sequential or parallel programming—(See G. Jack Lipovski and Miroslaw Malek, *Parallel Computing: Theory and Comparisons* (John Wiley & Sons, New York, 1987), p. 17: "Generally, we also will have modules that do not compute, but rather passively move data in interconnection networks.") Even so, Amdahl's Law can still be used qualitatively to illuminate what is sought to be expressed herein.

Specifically, the multiple PEs in the PP apparatus, as described by Tosic and discussed above, were required to operate in conjunction with one another in order to form a single PP device. Means for bringing about and maintaining that cooperation and other such "overhead" operations that would involve all of the PEs were then obviously required, and would form the essentials of bringing about such a PP computer. As will be shown in more detail below, each addition of more μPs would require yet more overhead per μP, and hence could not increase the computing power in any linear fashion. As shown by Amdahl's Law, adding μPs would reach a limit in seeking more computing power, since a point would be reached at which the device throughput would reach a peak upon adding more μPs. (The analysis given below has that computer power ultimately decreasing as more μPs are added.) In short, PP based on interconnecting some number of μPs or similar PEs necessarily lacks scalability, that if achieved in this context would mean that doubling the apparatus size, specifically by doubling the number of PEs, would double the computing power. On the other hand, scalability is a natural, ab initio feature of the ILA architecture.

The reason that scalability cannot be achieved with μPs or other such PEs is not, of course, that the processes are carried out sequentially in the broad sense—everything that happens in this world is sequential—but because of the need when carried out using a PE-based PP computer to have the various PEs working together. The "sequential" and "parallel" distinction might be a convenient way to distinguish between those computers (SISD) that run one instance of a process and others (MIMD) that run perhaps thousands of instances of the process in parallel, so long as it is borne in mind that what one then has is thousands of sequential PEs, each with its own von Neumann bottleneck if those PEs are μPs. For that reason, the distinction between SISD and MIMD computers, which is really what PP is all about, cannot be expressed by that "sequential—parallel" dichotomy, not only because of the fault of the language but because PP does not get rid of the vNb but multiplies it. What matters in that distinction is whether time is being spent carrying out actual IP operations such as an ADD or in doing something else—some "non-productive" action such as a FETCH, or MOVE, etc., and particularly the operation of the system that provides that parallelism.

As to Instant Logic™, on the other hand, there is no original PE that would need to be adapted, converted, networked, or anything else so as to carry out parallel processing (PP), since the initial design of the PE of this invention, shown in FIGS. 1, 20, is adapted to operate in parallel and to form a fully scalable IP apparatus at the outset. The feature of not needing any of the "overhead" operations that are required in any development of a PP device out of pre-existent PEs—required because a collection of independently functioning PEs does not by itself turn into a PP apparatus without adding more hardware and software—will by itself distinguish the ILA from any PP computer built up from μPs or any other type of PE. The ILA version of PP comes about as an inherent collateral result of having adopted processes by which various binary logic gates and circuits can be structured at will at the sites of the data to be treated, with the use of any one Logic Node (LN 102) taking place entirely independently of every other LN 102, except insofar as certain LNs 102 would have been intentionally joined together so as to structure the circuitry needed at each particular moment and location. (As in any other case, the operation of some circuits can be affected indirectly by such circumstances as having so many other circuits operating at the same time that the whole IC was heated up.) Since that feature of independent, parallel and fully scalable operation would already have been provided, no other hardware had to be added to the ILA, nor would any additional connections to the ILA need to be made, beyond those that bring about the structuring of the IL circuits in the first place, in accordance with the original ILA design.

Taking the "computer power" of an apparatus to mean the "speed" (not to be confused with the "clock speed") or the possible throughput and data handling capacity of the apparatus, if that power were to depend only on the size N (the number of LNs 102) of the PS 100 and of the corresponding circuit and signal code selectors CCS1 126, SCS 128, then true scalability will have been achieved. However, the test for scalability based on having accumulated together some large number N of small but fully functional processors as the PEs to make a large parallel processor (PP) that is then to be measured against the cumulative throughput of those N smaller PEs taken separately, to determine whether the device is scalable, cannot be used. The "PEs" distributed throughout PS 100, defined as a single LN 102 and associated PTs 104, 106 (i.e., the circuit of FIG. 1), cannot properly be compared with that cumulative throughput and data handling capacity since a single one of the circuits of FIG. 1 (of course with power, means for entering data, etc.) is not a fully functional device.

A single consumer-level computer such as an office desk top or laptop can be turned on to carry out a very wide range of IP processes, and then some number of such computers could be interconnected into a parallel processing mode for comparison with N of the single computers as to throughput, etc. By itself, however, the circuit of FIG. 1 can at most form an inverter (or a BYPASS gate, as will be described later), and is thus not a fully functional device. Then to compare that FIG. 1 circuit with some device that was built from N such "PEs," in analogy to the single computer—parallel computer comparison now used to measure scalability in the usual computer, cannot be done, since in the Instant Logic™ case that side of the equation would have a "zero" output. (N×0=0.)

The reason why some multiple of the circuits of FIG. 1 as individual circuits cannot be compared to the same number of such circuits arranged for parallel processing is essentially that the ILA carries out parallel processing right at the outset—in the first circuit structured unless deliberately structured otherwise the PEs will be in parallel, and there is no further step towards parallel processing (other than by an increase in the size) that could be taken; parallel processing would already have been achieved in the first two PEs. The only way in which the circuits of FIG. 1 can be used to create a fully functional device (thus to qualify as a "PE") is to structure circuits therein, but that process itself forms a "parallel processor" (but in a rather different sense, i.e., no single LN 102 is a "processor" at all, but a number of LNs 102 interconnected as described herein do form "parallel processors," e.g., two LNs 102 can form an OR gate. (In an AND gate, the LNs 102 are in series, but that is unavoidable, is the same in both hard-wired and IL circuits, and the converse case of an OR gate is not what is ordinarily meant by the term "parallel processing"—the term does not apply to what may occur within a single, minimal circuit.) The "Instant Logic™ Module" (ILM) 114 is of course a fully functional device, but these, acting quite independently from one another as they do (except when the structuring of a circuit happens to require parts of two ILMs 114), are at least scalable on their faces. Scalability is inherently present even as to adding more LNs 102 within a PS 100; doubling the number of LNs 102 (and of course of the "Code Selector Units" (CSUs 122), etc., that operate those LNs 102) within a PS 100 will double the power of the ILM 114 that contains that PS 100, since there would be that much more space in which to structure circuits.

To express this matter in another way, the issue of scalability arises in the context of whether or not there is any limit to the "speed level" and data handling capacity that could be attained by adding more components to an existing system (which of course is why the whole subject arises in the first place), so how those PEs might be defined is actually immaterial as to that question. What matters is whether the amount of throughput and data handling capacity vary linearly (or better, as does the ILA) with the addition of more components. To make a comparison that was analogous with the "N serial computers v. parallel computer made of N serial computers" case, the individual units on the left side of that relationship would have to be fully functional, but in IL by the time that enough components had been added to yield a fully functional device such as an ILM 114, the "parallel computer" would already have been formed, and the two sides of that relationship would be identically the same.

As a result, therefore, regardless of whether or not a linear "computing power v. N" relationship can be said to demonstrate "scalability," the throughput and data handling capacity of an ILA do indeed vary linearly with N (and indeed super-linearly, as will be shown later), and no such comparison is needed. Since each LN 102 will be functioning independently of every other LN 102, other than when being joined together to form a circuit or part thereof by way of enabling various PTs 104 and 106 to form circuits and then transmitting signal bits through those circuits so as to bring about the interactions needed to carry out some IP process, that linearity just noted would still exist.

The linearity in the ILA exists even as to the ILM 114 control circuitry, i.e., the code selectors CCS1 126 and SCS 128 in CSU 122. The CCS1 126 of FIG. 14 (sheet 11) is seen to be formed from some number (in this case, three) of the "Two-bit Code Output Enablers" (2COEs) 202 of FIG. 15 (sheet 12), each of which is an independently functioning circuit in itself, without there needing to be any connections made between those 2COEs 202, and as many outputs could be obtained as one wished, simply by adding that many more 2COEs 202. The same is true of the CCS1 126/SCS 128 combinations, there being one such combination for each LN 102 in PS 100.

The power cost in generating the electrical currents that connect one group of LNs 102 with another and send signal bits therethrough is simply an operational cost, just as will be found in the N-computer parallel processor, and that power cost will increase linearly with the number of CCS1 126/SCS 128 LN 102 combinations. Even with that rather trivial issue involved, however, the fact remains that the throughput and data handling capacity of an ILA as a whole can be increased without limit, for example by adding ever more ILMs 114: the increment of "power" gained by the addition of another ILM 114 does not decrease whether that added ILM 114 was the second one added or the tenth or hundredth, and in fact will increase to make the device super-scalable, as will be explained shortly. The only other change required in expanding the apparatus as a whole would be that, if necessary, of changing the size of the register in the external control circuitry that tracks N values to a size sufficient to accept that greater N value.

Although some patents and journal articles will be cited hereinafter, in a search of the prior art no instance has been found in which anything like IL or the ILA was shown. Similarly, nothing has been found that would anticipate the special code selectors described herein that were found to be necessary to encode the ILA (PS 100), within which the IP of the IL apparatus actually takes place. As to whether or not the development of IL and the ILA might have been obvious, how obvious a development could have been might be discerned in part by the amount of work that had been devoted to the technical field from which the development in question ultimately arose. A search of the USPTO patent data base on the phrase "parallel process . . . " the word "computer," and "highly-parallel" yielded a total less than 1,000, while a search on the terms "multiprocessor" and "computer" yielded nearly 8,000. To assert with total certainty that there are no patents that either disclose the IL methodology or would suggest that methodology if taken in combination with other patents or literature, as would have been suggested by any of those documents, would require a review of all of those patents and also all of the related technical literature and numerous books.

To do all of that is quite impossible, of course, but yet that assertion can still be made with reasonable certainty, based on a review of enough of both patents and the non-patent literature and books to show what trends had been followed. It is also suggested that in light of the advantages now found in Instant Logic™ as set out herein, had the concepts of IL been conceived at any earlier time, had it been possible at such time to do so with the technology then available, then those concepts would surely have long since been pursued and adopted, and something closely akin to the Instant Logic™ (IL) set out herein would now be in use.

In support of such assertions, what will be done here is to point out particular patents that exemplify the trends that the growing efforts in PP were establishing, and show how that trend was aimed in directions quite different from that of IL. Indeed, the whole concept of the PP art is different from the concepts of IL; PP is based on the notion of combining a number of pre-existent, functioning PEs into a single, multi-PE device, while IL simply points to an ILA as an established means for structuring circuits so as to carry out IP, noting as well that such device also happens to be scalable. The reason that the number of patents is mentioned is to suggest that the course of developing the PP art as it exists today involved quite a large number of people who were explicitly seeking out some way to obtain the fastest computer possible, wherein many different investigative routes were pursued, and it will be seen that none of the routes adopted pointed in the direction of IL. With at least 8,000 researchers (not counting the multiple inventors on many patents) working on the problem over nearly 30 years without having conceived of IL, that those IL methods might have been "obvious" could hardly be concluded.

A search on the term "instant logic," which term was coined by this inventor for application to the present invention, yielded 73 patents, but in the bulk of those the two words of that phrase appeared only separately, e.g., as in U.S. Pat. No. 6,351,149, issued to Miyabe on Feb. 26, 2002, and entitled "MOS Transistor Output Circuit," that contained the text "the instant at which the output signal can be regarded as having logic high (H) level," a subject that has no special relevance to anything like IL. In all of the patents that actually contained the full phrase "instant logic," of which there were 20, the word "instant" is used in the sense of that particular logic then under discussion, e.g., as in writing that would refer to the present application as the "instant application." By analogy the phrase "instant logic" would mean the logic that had just been discussed, so the references found become quite irrelevant.

The first "seed" from which PP came to grow, as least as indicated by the patent searches noted above, seems to have been that of U.S. Pat. No. 3,940,743, issued to Fitzgerald on Feb. 24, 1976, with the title "Interconnecting Unit for Independently Operable Data Processing Systems." That patent describes a rather complex scheme wherein one independently operating data processing system is connected to an "interconnecting unit," treated as a peripheral device relative to that first system, wherein the interconnecting unit provides connections to another such data processing system, specifically by changing the address to be sought from an address in that first system to an address in the second system. In the course of so doing, operations in that second system are interrupted when necessary to allow the task of that first system to be carried out. The two systems, while not having formed any actual "parallel processing" system, would nevertheless have put into practice the idea of having two or more such systems work together in a coordinated manner. What is gained by this procedure itself is that the resources installed in the two data processing systems may be different, and by this means one system can make use of resources that are not installed within itself but are installed within the other system and could be used there.

U.S. Pat. No. 3,970,993, issued to Finnila on Jul. 20, 1976, bearing the title "Cooperative-Word Linear Array Parallel Processor," shows a different and more specific manner in which two or more computers can cooperate, specifically by using a "Chaining Channel" to order an array either of memory words or of μP-like devices so as to yield an actual parallel processor. (The PE in this Finnila patent is referred to as being "μP-like" rather than an actual μP because the normal μP is not limited to a single word. Discussion of how that PE functions is described in terms of how a μP functions, however, since the manner of operation of the two are the same.) A series of identical "processors" or "word cells" are employed that do not themselves have physical addresses but are addressed either by content or position within the "chain."

The cells are derived in the apparatus as a whole from many copies of a single wafer formed by LSI technology, and each wafer in turn contains many copies of the word cell. Each word cell contains one word of memory along with control logic. The word cells function in the role of individual μPs, each having one word of local memory, and hence on that basis alone are distinguishable from any IL apparatus. The principle of operation of a μP, in receiving instructions through which data that had also been received are directed to particular circuits within an ALU that will then carry out the particular operation that the instruction had specified, is reflected in the Finnila patent by the word cells (which could be as many as 32,000 in number), that each have the ability to input data to those cells, transmit data between those cells along the Chaining Channel, and then yield particular output data after some operation. The cells operate on those data in either of two different modes, which are a "Word Cycle" mode and a "Flag Shift" mode.

The "Word Cycle" mode is the one of principal use, and includes circuitry that can carry out the operations of "Exact Match," "Approximate Match," "Greater Than or Equal Match," "Less Than Match," "Exclusive-OR," "Add," "Subtract," "Multiply," "Divide," and "Square Root," thus playing a role equivalent to that of an ALU in an ordinary CPU-based computer. The buses to and from those interconnected cells provide parallel operation, in the sense that the operations taking place within each cell can all be taking place at the same time, as the same operations on a range of different data, as different operations on particular data, or as a mixture of these. However, there are fixed arithmetical/logical gate circuits to which data are sent for operation, just as in the von Neumann computer, so this aspect of the Finnila apparatus has no bearing on the validity of any of the claims of the present Instant Logic™ invention in which there are no fixed circuits ready to carry out IP, but only a "skeleton" framework of unconnected transistors that can be structured into IP-functional circuits.

Consequently, this Finnila patent, as the earliest patent encountered in the particular searches carried out that describes an actual "parallel processor," can be taken to be representative of the general trend in PP in which as a general practice two or more identical and separately functional units are interconnected and caused to operate in some kind of cooperative manner by the addition thereto of some second type of circuit and software, which in this case is that "Chaining Channel." The latter device is that which constitutes the "additional" apparatus mentioned earlier that precludes the system as a whole from being scalable. That feature thus dissociates all of PP from the methods and apparatus of Instant Logic™.

As opposed to that Finnila construction, the fundamental operational components of Instant Logic™ are found in the "Instant Logic™ Module" (ILM) 114, which includes an Instant Logic™ Array or ILA (PS 100) of a pre-determined size (i.e., having some pre-determined number of LN 102 Logic Nodes); a corresponding number each of Circuit Code Selectors (CCS1) 126 and Signal Code Selectors (SCSs) 128; a "Code Line Counter" (CLC) 132 for every CCS1 126; and an amount of memory in CODE 120 that would be sufficient to hold as many "Code Lines" (CLs) as the user would require for whatever selection of algorithms to be executed as may be desired. In effect, ILM 114 thus includes a "Processing Space" (PS 100), a "memory block" (CODE 120), and a "Code Selector" (CS) 120 block, thus defining a structure quite distinct from that of the quite different Finnila apparatus. That patent, however, does serve to illustrate the conceptual path, which is quite different from IL and the ILA, on which the course of computer development had embarked, which path is still being followed even as IL and the ILA and the distinctly contrary path thereof are introduced by this application.

Another, different path that is again distinct from that of the present invention, is seen in U.S. Pat. No. 3,978,452 issued to Barton et al. on Aug. 31, 1976, entitled "System and Method For Concurrent and Pipeline Processing Employing a Data-Driven Network." This patent describes a system that was intended to avoid the "central control" of the microprocessor (μP) and parallel processing (PP) apparatus of the prior art. As a data driven network of uniform processing or function modules and local storage units, in order to gain greater speed the Barton et al. apparatus was made to be readily partitionable, thus to allow various operations to take place concurrently, in a pipelined fashion, using serial data transfer wherein, as in the ILA, the datum segments could be of any length.

Like the ILA, the Barton et al. apparatus has no CPU, no main memory, and no I/O control units of the μP-based type, but accomplishes those functions by other means that are also quite distinct from those used by the ILA. The Barton et al. device uses a network of function modules, each with its own local memory, the sum of those memories taking the place of the main memory of the prior art, and being data-driven the need for central control (e.g., a program counter) is also eliminated. In one aspect of the operation, each module is assigned specific tasks, and each module will hold the instructions that are needed to carry out those tasks upon the arrival of data. In that modular structure there is some resemblance to the ILA, but the use of pre-defined function modules each dedicated to specific tasks, and also of fixed local memories rather than the universality of function of the IL PEs that have no fixed local memory but only such temporary memory as might have been structured for some particular purpose, clearly distinguishes this Barton et al. apparatus from the ILA.

The ability in this Barton et al. apparatus to use dynamic partitioning in response to current needs is also somewhat suggestive of IL and the ILA, but nothing in Barton et al., either shows or suggests the IL paradigm. The basic distinction again lies in the Barton et al. device using instructions that must be transferred into the "functional" parts of those function modules, thus still to have the "von Neumann bottlenecks" that IL has eliminated. Also in the Barton et al. device, in the same fashion as that of a CPU the results of each operation are sent to specified addresses, rather than being immediately accessible at the outputs of the particular gates used as in the ILA. Finally, the actual IP circuitry of the Barton et al. apparatus is in fixed, hard-wired form, there being no "on-the-spot" structuring of the circuits to be used as in IL. The Barton et al. device thus continues to operate under the BP, and neither includes nor suggests any part of IL.

U.S. Pat. No. 6,247,077, issued to Muller et al. on Jun. 12, 2001, with the title "Highly-Scalable Parallel Processing Computer System Architecture," can serve to illuminate problems associated especially with Massively Parallel Processing (MPP) systems, and also to identify additional trends in the development of faster computers that trace out a different path from that of IL. Muller et al. were concerned with the fact that because of continuing research, the performances of different computer components such as the CPU and the disk drives had been growing at different rates, at some points in the course of "building better computers" the CPU would have got so fast relative to other components that the CPU would have to sit idle while the fetching or writing of data was being carried out with the disk drive.

The present is such a time period, and the object of the Muller et al. invention was to narrow that time gap. However, before getting into the Muller et al. patent in detail it must be noted that (1) the problem of CPUs having to wait for data remains in any event, as long as CPU-based systems are used and the vNb exists; and (2) in interpreting the Muller et al. patent it must be realized that such patent uses the term "scalable" in a quite different sense than that used in this application. Both of the terms "scalability" and "expandability" are used with reference to multi-PE or PP computers as to making a larger computer, but with different meanings. The latter term refers to the ability to enlarge the computer at all, in terms of the structure of the device. As to "scalability," a measure of that expansion will be made and analyzed in terms relative to some other aspect of the device, as follows: "A simple example; the rate at which a CPU can vector interrupts is not scaling, at the same rate as basic instructions. Thus, system functions that depend on interrupt performance (such as I/O) are not scaling with compute power." Col. 2, lines 21-25. The Muller et al. patent thus uses the term "scalable" in the sense of relative rates of expansion, perhaps better expressed as the degree to which some performance feature will improve at the same rate as does some change in some component that is being altered in order to improve that performance. ("Does the performance increase linearly with that change?") That issue is included here so as to bring out that distinction, thereby to avoid instances in which the mere appearance of the word "scalable" without careful examination of the manner in which the word was being used might lead to wrong conclusions as to whether or not the document in question was relevant prior art.

In Instant Logic™ (IL) the term "scalable" means that the behavior is completely linear, in that doubling the size of an element would exactly double the capacity, such as memory and the amount of data that could be stored. In that usage, one could speak of something as being "nearly linear," or "highly linear," but not "highly scalable," as that term is used herein. If a device is less than linear in computer power relative to size, it is "sub-scalable"; if it is more than linear, i.e., the computer power gained by doubling the size is more than twice the original computer power, the device is "super-scalable." That different use of the latter term as seen in the Muller et al. patent is, of course, just as legitimate a usage as that in IL, and patent applicants can indeed be their own lexicographers, but one cannot then just extrapolate that meaning into another context, i.e. from Muller et al. usage to the IL context. The discussion of scalability in Muller et al., thus has no direct bearing on the present invention, but only such bearing, if any, as might exist if the term were read to mean "linear" in making comparisons in the IL context. As it turns out, although the Muller et al. apparatus may be highly "linear," it is not scalable at all in the IL meaning of the word since, while having eliminated some aspects of the usual PP apparatus, e.g., additional software, the Muller et al. apparatus must still have added the various hardware elements of that invention itself, i.e., "an interconnect fabric providing communications between any of the compute nodes and any of the I/O nodes," Col. 3, lines 31-32, that would not have been needed were each of the compute nodes of the apparatus operating individually. Those elements preclude scalability.

Now as to the actual Muller et al. invention, that invention relates to apparatus that contains arrays both of "compute" nodes and I/O nodes (or ports), and the method used in that invention was to provide a number of switch nodes that would differentiate between those compute and I/O node types and thereby allow connections to be made between any of the compute nodes and any of the I/O ports rather than the more limited interconnection capabilities of the prior art. By contrast, in a loose analogy to the ILA, the GA 110 terminals of the LNs 102 of PS 100 carry out a role that is somewhat equivalent to both a "compute" node and the "I" part of the Muller et al. I/O node, in that an incoming data bit is placed on the GA 110 terminal of a specific LN 102 as an input, and then that LN 102 begins an arithmetical/logical operation. At the completion of that operation the DR 108 terminal of a specific final LN 102 to which the operation would have arrived serves as the "O" part of an I/O port. (Data extraction can also be carried out at earlier points in the process.) In PP computers, the required circuitry has fixed locations and thus "leads the data," both in time and in cause and effect, while in an ILA the data "lead the circuitry," not in time (since the circuitry must always be present before the data arrive) but in terms of cause and effect, i.e., the circuitry will be structured at locations as determined by the data, i.e., at those LN 102 locations in PS 100 to which the successive bits from carrying out the steps of the algorithm are to arrive or would be created.

Also, Muller et al., note that several ways of overcoming delay have been tried, including the "cluster" designs that Muller et al. indicate have the disadvantage of limits in expandability, "MPP systems required additional software to present a sufficiently simple application model" . . . and "also a form of internal clustering (cliques) to provide very high availability," and finally that the problem of interconnects is exacerbated in those MPP computers. (Col. 3, lines 5-16.) In avoiding those issues, the Muller et al. apparatus acts similarly to the ILA, in that likewise none of those cluster design, additional software, or interconnect problems arise in an ILA. However, since the ILA has no software, nor any hard drive—CPU interaction, but only the loading of the operands into PS 100 in a continuous, non-stop stream, together with the concomitant structuring of circuits out of adjacent LNs 102, those LNs 102 and associated pass transistors being the "PEs" of the ILA, the IL method of avoiding those MPP features is quite different from that of the Muller et al. apparatus.

As a particular example of that difference in how to solve the MPP problems, in CPU-based systems, particularly of the MPP variety, it can often happen that a completed calculation will next require circuitry for a next operation that is located at some distance, which will then bring that interconnect design into play, but in an ILA the required circuitry is always located at the most convenient place possible, since that circuitry is structured at the exact site(s) where the operands happen to arrive or be created. The use of hard-wired circuitry for the operational elements of the apparatus in the Muller et al. apparatus precludes using such a method.

For a complete comparison with IL, another aspect of the Muller et al. apparatus requires comment, which is that in that invention, > "storage is no longer bound to a single set of nodes as it is in current node-centric architectures, and any node can communicate with all of the storage. This contrasts with today's multi-node systems where the physical system topology limits storage and node communication, and different topologies were often necessary to match different work loads. The [Muller et al.] architecture allows the communication patterns of the application software to determine the topology of the system at any given instant of time by providing a single physical architecture that supports a wide spectrum of system topologies, and embraces uneven technological growth." (Col. 4, lines 23-34.)

An apparatus that will "determine the topology of the system at any given instant of time by providing a single physical architecture that supports a wide spectrum of system topologies" in those terms reads rather like the present invention, since the ILA indeed has a "single physical architecture that supports a wide spectrum of circuits." However, the mechanisms involved are quite different, and apply to quite different things.

As to the procedure in the Muller et al. apparatus, there is first a "physical disk driver 500 [that] is responsible for taking I/O requests from the . . . software drivers or management utilities . . . and execute the request on a device on the device side . . . ," which disk driver 500 includes therein a "high level driver (HLD) 502, and a low level driver 506. The low level driver 506 comprises a common portion 503. . . " (Col. 5, line 65-Col. 6, line 3.) Then, "unlike current system architectures, the common portion 503 does not create a table of known devices during initialization of the operating system (OS). Instead, the common driver portion 503 is self-configuring: the common driver portion 503 determines the state of the device during the initial open of that device. This allows the common driver portion 503 to 'see' devices that may have come on-line after the OS 202 initialization phase." (Col. 6, lines 52-61.) During the initial open, SCSI devices are bound to a command page by issuing a SCSI Inquiry command to the target device [e.g., a tape drive, printer, hard disk, etc., see Col. 4, lines 44-47]. If the device responds positively, the response data . . . is compared to a table of known devices within the SCSI configuration module 516. If a match is found, then the device is explicitly bound to the command page specified in that table entry. If no match is found, the device is then implicitly bound to a generic SCSI II command page based on the response data format." (Col. 6, line 62-Col. 6, line 6.) "The driver common portion 503 contains routines used by the low level driver 506 and command page functions to allocate resources, to create a DMA list for scatter-gather operations, and to complete a SCSI operation." (Col. 6, lines 7-10.)

That should be sufficient detail to show how the Muller et al. apparatus, although "determining the topology of the system at any given instant of time," etc., still operates in a manner that is quite distinct from that of the ILA. That is, to establish the condition of a device and then transmit SCSI routines that will alter the topology thereof so as to be amenable to adjustment of that condition is more akin to a CPU than to the ILA, the analogy to the former being based on the similarity of the actions in the control part of the CPU of sending commands to the ALU as to what particular arithmetical/logical functions are to be carried out to the operation of that common driver portion 503 just noted.

In either case, neither the alteration of the topology through the transmission of SCSI routines nor the normal operation of a CPU bear any resemblance, either in concept or implementation, to the IL procedures carried out in the PS 100 wherein the circuits to be used are structured when needed "on the spot," "from scratch," from what amounts to a "blank slate" template. (That is, the codes for individual gates and other circuits would have been pre-encoded, but the particular circuits required are then structured from those "off-the-shelf" code "ingredients," based on a "recipe" defined by the algorithm through the code to be executed, and then sent to PS 100.) And, of course, the idea in IL of using pass transistors to construct functional arithmetical/logical circuits out of an array of operational transistors, and specifically at the sites of operands, is nowhere suggested in the Muller et al. patent. As to memory in particular, as was mentioned earlier, a complete Instant Logic™ Information Processor (ILIP) as is ultimately to be built might in many versions include only semiconductor memory, with no electromechanical disk drives at all. (That would not necessarily be the case, however, since the ILA has no instructions to contend with, and as will be shown below, with there being no vNbs in the ILA the time that it takes to extract data from memory no longer has any bearing on the speed of operation of the ILA.)

So as better to appreciate the nature of the ILA, it is noted that a use of the term "scalable" that differs from that of Muller et al. is found in U.S. Pat. No. 6,044,080 issued Mar. 28, 2000, to Antonov entitled "Scalable Parallel Packet Router," wherein the term has been given the same meaning as that in the IL usage, as shown in the following: "The preferred technology for data interconnect 13 provides for linear scalability, i.e., the capacity of data interconnect 13 is proportional to the number of processing nodes 11 attached." Col. 4, lines 8-11. Memory, these Antonov interconnects, and the ILA are all scalable because each "unit" of these different kinds of elements functions independently of each other unit of the particular element. It can also be said that those are all scalable also because the control and the desired function are one and the same thing, hence any change in one is necessarily reflected in the exact same change in the other. To have made a connection in the Antonov apparatus, for example, is to have provided a message path in a 1:1 relationship, and one enable bit to a memory address provides one READ or WRITE. The reason that the ILA is scalable even though subject to substantial amounts of external control is that the means by which that control is executed is likewise the same means by which the function itself is actually executed, i.e., "1," bits sent to selected circuit or signal PTs 104, 106 will each provide either a $V_{dd}$ or GND connection or a data path, and in so being transmitted such "1" bits do not just "control" what the subsequent circuitry will be but actually structure that circuitry at the same time, so that nothing else is needed.

Work somewhat related to that of Tosic discussed earlier, and that is also fairly representative of the software-oriented approach to the problems presented by the vNb, is described by Christine A. Monson, Philip R. Monson, and Marshall C. Pease, "A Cooperative Highly-Available Multi-Processor Architecture," *Proc. Comocon Fall* 79, pp. 349-356, that describes a system called "CHAMP," for "Cooperative Highly Available Multiple-Processor," the apparatus on which the system is based being an "M-module (model-driven module), an autonomous program module containing a model, a set of values, and a set of procedures." Id., p. 349. Being primarily directed towards the issue of fault tolerance in an aircraft control system, this paper does so by addressing "hardware expandability"—"the ability of the computer system to fill the growing needs of the user."

The system is "a large number of processors in an arbitrarily connected lattice to function as a single computer," Ibid, which may also be taken as a generic definition of the art of parallel processing (PP). This "CHAMP" system is also seen as:

> " . . . a network or lattice of functionally identical stand-alone microcomputers. This network is managed by a distributed operating system which is structured hierarchically and makes the lattice behave as a single computer with the unique feature of hardware expandability or contractability that can occur in real-time while the computer is in operation. *** There are no central hardware or system software resources and user code is dispersed throughout the entire network in such a way as to avoid the creation of virtual central resources, thus enhancing survivability." Ibid.

The CHAMP system thus differs from the usual PP system in employing a distributed rather than a centralized control system. Even so, > "If large numbers of small computers are to be joined in a cooperative network to take advantage of the potential hardware cost savings, a generalized networking and programming technique is needed. Such a technique must permit the creation of a system of arbitrary size from small building blocks without imposing any size dependent restrictions on the programmer who is to write the code to use the system. That is to say, the code for a given task should look precisely the same for a system of 10 computers as it does for a system of 1,000 computers." Ibid.

That is, even though the control itself is distributed, there remains a need for a general technique for exercising that control, through software, that is global in its extent.

What is being sought would not seem to be entirely a matter of programmer convenience, however, but rather the ability to have a number of computers "blend in" to an existing system in a way as not to be noticed, i.e., to effect an expansion or contraction in the "computational power" of the system without causing any other effects. The ability so to act is one of the features of IL and the ILA, so the extent to which this "CHAMP" system might employ the same methods as does IL to achieve that goal needs to be examined in terms of any possible anticipation or suggestion of IL and the ILA.

The first obvious difference is that the "CHAMP" system bases the issue of expandability in part on software, while the ILA does not even have any software. The solution in "CHAMP" lies in the development of "sub-units" of the problem, wherein numerous individual computers each serve as one of those sub-units, one for each aircraft. Id., p. 350, wherein each sub-unit exercises its own control. The matter of scalability is not addressed directly, but only expandability, with the emphasis in this 1979 article being placed on there being no "reprogramming demand on existing software," Ibid., and "additional computing capacity can be added to the network without requiring changes to existing user programs." Ibid.

If the CHAMP system happened to satisfy the criteria found in the ILA, namely, that the sub-units all functioned independently of one another, or the exercise of control actually carried out the task being controlled at the same time, as discussed above with reference to the Antonov patent (and as is the case with the ILA), then the CHAMP system might well be scalable. It should be recalled that "scalability" is based on whether or not performance increases linearly from some base, that base generally being a single PE (or computer), and the system is scalable if a multiplication of the number of such base units multiplies the level of performance in the same amount. Scalability is then lost if it is necessary to interject any additional hardware or software in order to have that multiple number of PEs or computers function cooperatively, but if there is no change made in the hardware or software upon increasing or decreasing the number of those sub-units, then scalability would exist. If that "base" already included the necessary control hardware, then the control would be multiplied along with the rest of that base, and it would then only be software that would interfere with there being scalability, which of course that software would certainly do. As it turns out, that latter circumstance is precisely what is found in the CHAMP.

The architecture of the "CHAMP" consists of two parts, the first being the basic hardware architecture made up of a "homogeneous lattice of processors, called processing centers (PCs). The second is a hierarchical network of task code modules which is mapped onto the lattice of PCs." Id., p. 351. As to what herein has been called "overhead," "each PC of the CHAMP lattice is architecturally identical and contains at least three processors that perform the functions of communications, system supervision, and user task module execution. The communications processor and the supervisor processor perform all the overhead functions, normally described as system functions, thus freeing the task processor to concentrate on the user application." Ibid. In particular, "there is no central hardware resource or central 'executive' in the CHAMP lattice; . . . the executive function exists equally in all PCs." Ibid.

(If each sub-unit contains its own control (or "communications" and "supervisory") processors and all of the sub-units are identical, and further if each sub-unit yielded the same performance, it would seem that scalability would have been achieved. However, that view assumes that the amount of control that actually had to be exercised by each sub-unit would be the same regardless of how many sub-units were present. Since this issue reflects directly on the relative status of the ILA, it will be analyzed in greater detail below.)

To appreciate the next topic to be taken up, it is necessary to recall first that the basic purpose of IL was to eliminate the vNb and hence the time expenditure caused by the vNb, and secondly, that in so doing the ILA turned out to be scalable. That feature then came to be used as a convenient means for examining the characteristics of other systems in comparison to the ILA, but the underlying purpose remains the same—the elimination of any operations that do not in themselves constitute a direct IP function. As a result, the issue of scalability will continue to be addressed herein, not so much for its own sake but for the purpose of "getting at" the basic question of whether or not the system being compared to IL has managed, as IL has managed, to eliminate the kinds of extraneous operations as characterize CPU- or μP-based systems, i.e., the time-wasting transfer of instructions and data back and forth between memory and some kind of main processing unit. If the CHAMP had managed that, the next question would be whether that had been accomplished in the same way as did IL. However, what will then come to be discussed in fact will be how it was that the CHAMP did not eliminate the vNb.

(Since there is a practical limit to how large a computer could be built, it the added burden of having more computers was really minimal, it might well turn out that the issue of scalability could actually be of little significance. That is, there could be a "supercomputer" built of a size such that there was really no practical way to make that apparatus any larger, but with this occurring at a stage in expanding the size of the apparatus that was well before the lack of scalability could be seen to have any appreciable effect. So again, the issue is addressed in the amount of detail shown here mostly for purposes of showing the distinction between the ILA and the prior art.)

As just noted above, the model used to this point has been one that starts with a single PE or computer that does not itself have any capacity for operating cooperatively with some number of like devices, and scalability is then lost upon combining a number of such devices into a single apparatus when it becomes necessary to add to that single device not only that number of replicas of the original device as may be sought, but also a central control system that then will bring about such cooperative action. That model does not fit the CHAMP system, since it has no such central control system, but has instead incorporated that ability to function cooperatively into those sub-units themselves. In that case, and under that definition, "scalability" as to the hardware will immediately be found. However, that does not resolve the underlying question of whether or not the CHAMP system can be expanded without limit, as is the case with the ILA.

In order to see precisely where it is that the scalability as to IL is lost as to the CHAMP system, the Monson et al. article notes that "the user's application programs are executed as task code modules in the task processors. *** The task code modules processed by the task processors constitute a hierarchical network which is mapped onto the lattice of homogeneous PCs. These task modules interact with one another by communicating messages either directly (if interacting task modules are in adjoining PCs) or via intermediate PCs . . . " Id., p. 352. The CHAMP system thus provides (a) an array of PCs that are complete processors in their own right; (b) task code modules in the second type of processor, which are the task processors by which the tasks are carried out; and (c) a communications processor through the use of which those PCs are enabled to communicate one with the other. Except for having the system control distributed throughout the PEs rather than being centralized, that description seems to be fairly representative of PP systems generally.

If one then takes those "task processors by which the tasks are carried out" of the CHAMP apparatus to be analogous to the PEs of both a CPU-based PP computer and an ILA, then both the CHAMP and the CPU-based PP computer will require the addition of further elements in order to work cooperatively, those elements for the CHAMP computer being "the communications processor and the supervisor processor [that] perform all the overhead functions," and for the CPU-based computer being that CPU, while for the ILA there are no further elements required. The limited value of the "scalability" analysis, if not applied carefully, can then be seen in the fact that if the "base unit" from which scalability is determined is taken to be an entire, self-sufficient module of the CHAMP computer, then the CHAMP system would be scalable at least as to hardware, as noted above, but if one takes as that base unit those "task processors by which the tasks are carried out" then the system is not scalable, since to obtain that cooperative operation "the communications processor and the supervisor processor [that] perform all the overhead functions" are also required. That such additional hardware is centralized in the CPU-based computer but distributed throughout the entire network (i.e., in every module) in the CHAMP apparatus makes no difference as to the scalability issue. And as also noted above, even when treating the entire CHAMP module as the base unit of a scalability determination there will still be a loss of scalability because of the additional software required, insofar as more time or program instructions are required per module as the system gets larger, since that would produce an overhead/IP ratio that increases with size.

In short, the "expandability" of the CHAMP system means only the ability to add more processing capability without having to adapt any software, without regard to what might arise as to additional hardware or time requirements. Amdahl's Law would then suggest that there will be a finite limit to such expansion at which the message passing and other kinds of "overhead" would come to "outweigh" the IP. That "expandability" is quite a different thing from the "scalability" of an ILA, wherein adding more ILMs 114 does not add any more "overhead" at all, other than that which is inherent in each ILM 114 itself. ("Scalability" in the ILA will be discussed more completely below.) More PCs could be added in the CHAMP system, each capable of carrying out some range of tasks, with the applications program being mapped over all of the PCs in a manner such that the programs are independently executed in each PC, but the passage of messages between those PCs will be required. The program may not need to have been altered in adding more PCs, as was the object of the CHAMP design, but the message traffic will have increased, and that additional message traffic will preclude the CHAMP system from achieving scalability. In an ILA, it is not messages that are sent between PEs but the data bits that are then being operated on, with those operations themselves constituting the IP being carried out, hence nothing more need be added.

Another useful comparison to IL can be found in pipelining, which can be viewed as a limited type of parallel processing (PP). As described by David B. Davidson, "A Parallel Processing Tutorial," *IEEE Antennas and Propagation Society Magazine*, April, 1990, pp. 6-19, pipelining was developed in order to address the "sequential" or data-dependent problem. The sequential nature of the process itself could not be avoided, but at least there could be more than one process being carried out at the same time, by "overlapping parts of operations in time." Ordinarily, when a strict sequence of operations is imposed, such as the steps (1) fetch; (2) add; and (3) store, the fetch operation will be left idle while the add and store operations are being carried out, and then the same occurs as to the add operation when the fetch operation is taking place, and so on, and as a consequence the output from that addition is stored only after all three of those operations have been carried out.

Pipelining, on the other hand, will initiate another fetch step (and then add and store steps), along a parallel processing route, as soon as that first fetch step is completed, and after that first operation there will be an addition output on every step thereafter. Id., p. 7. Each step will require a number of clock cycles, and in those cases wherein there would normally be different numbers of cycles for the different steps, adjustments in the "phases" of those steps are made by adding cycles to those steps that have fewer cycles until the steps all have the same number of cycles. A "setup" time is also involved in pipelining, and the "deeper" the pipelining goes, i.e., how extensive the operations are that would be run in parallel, the more costly and time-consuming will be the pipelining operation. (As to being a limited type of PP, pipelining addresses the operations that take place within a single algorithm, whereas a PP apparatus seeks to execute as many different algorithms simultaneously as may be possible in the particular apparatus.)

(While considering this Davidson paper, and in anticipation of the discussion of Amdahl's Law to follow below, it is well to point out here a possible misinterpretation of that law by Davidson, to wit:

> "It is necessary to mention Amdahl's Law, which states that if an algorithm contains both a serial and a parallel part, the relative time taken by the serial part increases as parallelization reduces that of the parallel part, and a law of diminishing returns holds: further parallelization has increasingly little influence on runtime." Davidson, supra, p. 11.

What will more likely stop the "parallelization" process is that one would have run out of places in which the algorithm can be parallelized. What Amdahl referred to was not that, but rather the "interconnection of a multiplicity of computers in such a manner as to permit cooperative solution." G. M. Amdahl, "Validity of the single-processor approach to achieving large scale computing capabilities, "*Proc. AFIPD*, vol. 30, 1967 Apr., p. 483). In adding more computers, the amount of computing power will not increase linearly with the number of computers, but at a lesser rate, and Amdahl's point was that the gain in computing power as one adds more computers will eventually reach an asymptotic limit. It was noted earlier, however, that the addition of computers might well reach a practical limit (e.g., the size of the room) before any effect of Amdahl's Law would be noticeable.)

All of that concerning pipelining is clearly a valuable advance in the art, but even ignoring the fact that IL does not even require fetch and store steps, one fundamental characteristic of IL and the ILA is that "parallel" operations—unencumbered by fetch or store operations as to either data or instructions—are the one means by which IL is carried out, all of which takes place "automatically" without requiring any setup as is required in pipelining. For example, if two algorithms are to be executed, one algorithm is encoded so as to be structured along one route through PS 100, and the second algorithm is encoded to be structured along another route. These routes may or may not be "parallel" within the physical layout of PS 100, but their operation will be temporally "parallel," in the usual meaning of the term in computer terminology. If an algorithm has sections within itself that could be run in parallel, a route for each such part would be encoded so that "parallelizing" will be carried out even within the algorithm itself.

To give an ad hoc example of that procedure, given a calculation that contained some parameter of interest, and one wished to know the results of the calculation with respect to some range of different values of that parameter, the encoding would be "parallelized" just prior to the time of entry of the parameter, all of the parameter values would be entered, and at the end the results of the calculations would be provided for all of those parameter values. The parallelizing would be accomplished simply by copying out the code following the point of entry of the parameter, and then pasting that code back in to CODE 120 as many times as there were additional values of the parameter to be entered, with each copy being given different addresses for the LNs 102 at which the subsequent operations were to be initiated.

(That procedure is to be distinguished from that of pipelining, wherein the different steps of some repetitive, data-dependent calculation (such as a cumulative add) are placed into different processing elements, with each new step being initiated at the time that the result of the previous step is made available for use rather than waiting for the entirety of that previous step to be completed, whereas the IL procedure just described is a replication process that will define the code for some number of instances of a calculation, for which the resultant structuring will place the requisite circuits "side-by-side," then to be carried out concurrently.)

Also, the depth or expansion of IL operations is not limited, but can extend over as wide a scope as space is available in the PS 100 within which the required circuitry is to be structured. That space can be very large indeed, since once some step of an algorithm has been carried out, the circuitry that had carried out that step will be de-structured and the space occupied by that circuitry will be as available for use as such space would have been had that previous step not been necessary, and the circuitry employed to carry out that step had never been structured.

Similarly, the space required for any long series of subsequent steps will have no bearing on the amount of space available at any particular time, since the times at which those circuits would need to be structured would not yet have arrived. How much IP can be carried out within a PS 100 of a given size is determined not by the cumulative size and number of algorithms to be carried out, but by the number of LNs 102, in accordance with the requirements of those algorithms, that would need to be made part of a circuit at any one time.

The speed of what appears to be among the fastest computers at present, as noted by Katie Greene in "Simulators Face Real Problems," *Science*, Vol. 301, No. 5631, pp. 301-302 (18 Jul. 2003), is reported to be 35,860 Gigaflops, but as noted in that paper, advances beyond that speed are limited by the need to wait for data on which to operate. That was seen to be a particular problem even in the CRAY-1 of Seymour Cray, as noted in the Davidson paper, supra, p. 8: "A designer of a large system has many other problems to consider, which tend to reduce to, first, providing mechanisms to get data to the pipelines from memory and vice versa sufficient fast to keep them occupied, and, second, providing enough (sufficiently fast) memory."

Since the circuit structuring in PS 100 is all carried out independently both as between different steps or processes and to the flow of data, which is quite contrary to the prescription of Amdahl, supra, p. 483, and given that "waiting for the data" might well be the principle impediment in current IP operations, even as, or perhaps especially as, to the fastest possible parallel processing supercomputers, it may be the elimination of that impediment that gives to IL its principal value.

That problem has been noted before, in the statement "calculations can be performed at high speed only if instructions are supplied at high speed," by John Mauchly in 1948. Ceruzzi, supra, p. 22, citing John Mauchly, "Preparations of Problems for EDVAC-Type Machines," Harvard University, *Proceedings of a Symposium on Large-Scale Digital Calculating Machines* (Harvard University Press, Cambridge, Mass., 1948), pp. 203-207. That is no longer a problem in Instant Logic™ because that system has no instructions, and the circuitry that will operate on particular data, which takes the place of such instructions, is always immediately adjacent to those data in having just been structured at the locations of those data.

This review of parallel processing could not even begin to cover the entirety of that vast subject, but what was sought here was simply to identify what the major trends have been in that field so as to determine whether or not the methods of Instant Logic™ (IL) would ever have been attempted or suggested before. Among other differences that were found between the parallel processing art examined by Applicant and Instant Logic™, that review encompassing the standard texts on PP as well as other patents and articles not specifically referenced (because repetitive), the trends were found to follow the historical use of data and instruction transfers between memory and the processing circuitry as defined by the BP, and thus to be consistently (and literally) opposite to that of IL, rather than according to the reversal of that paradigm as set out herein. The PP work that Applicant has been able to review does not then provide any basis for rejecting any of the claims appended hereto.

Configurable Computers and Fpgas

There was sufficient need for a general purpose computer that the development of the μP or of something very much like it was inevitable, and in order to accomplish that goal, at a time when speed of operation was not the issue that it is presently, there was a tradeoff between wide applicability and speed of operation. The general purpose computer with programs for carrying out a wide variety of tasks thus came into being, but at the cost of introducing the von Neumann bottleneck (vNb) that made the operations much less efficient than those operations had been when carried out by fixed circuits. The way out of that dilemma that came first, so far as Applicant has been able to determine, appeared in the Estrin configurable circuit methodology and the founding therefrom of the whole FPGA industry, as was noted above.

That is, as to central control, the Estrin system used an array of configurable circuits, which array was separate from but controlled by an "ordinary" computer. Those "configurable" portions of the device relate to the central control by replacing the source thereof, i.e., the μP, that some have since said is or at least ought to be replaced entirely by configurable logic. See, e.g., Nick Tredennick and Brion Shimamoto, "The Death of the Microprocessor," *Embedded Systems Programming*, Vol. 17, No. 9, pp. 16-20 (September 2004).

The Estrin system did provide a degree of the concurrency that Estrin had sought, and the circuits that would carry out the operations were indeed changeable, but only by stopping operations and then starting up again. The Estrin apparatus used a method in which at the start an ordinary computer would have configured the circuitry of a separate unit in which the operations would be carried out, and that "variable" part would then carry out its work. If some other IP task were then to be undertaken, any operation then under way would be stopped, that second variable part would be reconfigured into some other array of circuits, and the new operation would commence. That process is still reflected in the FPGA, as will be described. By that procedure, a collection of pre-wired gates will have been provided, and the operation then to be carried out will depend on what were the connections made between the particular gates that had been selected.

To set out the goal of IL, on the other hand, the fastest that a computer could be made to operate would be to place a series of arrays of data bits on the input terminals of an array of logic gates, that first array of logic gates then connecting to the input terminals of a second such array, etc., that first data bit array similarly being followed immediately by a second data array, etc., whereby that series of data would then pass sequentially through a series of such arrays of gates in a continuous, non-stop stream, to be acted on as the nature of the particular gates would have defined, throughout the full length of the IP task.

That is, before the appearance of the μP, computers based on straight combinational logic that had been defined to carry out various desired tasks were certainly adequate for those purposes, and for each of those specific purposes should have been the fastest way in which the processing could be carried out, assuming that the problem of providing data fast enough as noted above with respect to the CRAY-1 was solved, the assumption also being that to pass through a sequence of gates without interruption or hindrance is indeed the fastest way in which IP could ever be carried out. Since that early circuitry was fixed, however, none of such devices could constitute a "general purpose" type—each did one job, and only that job.

As to the ILA, on the other hand, the "operating system" thereof likewise has but one task to do, but that one task, in this case, amounts in essence to "do everything," i.e., the functioning of the operating system, together with data, is itself the execution of the algorithm. The ILA carries out but one task, which is to structure circuits at the anticipated sites of the data, which circuits will then act on the data sent thereto, but because of the range of circuits that can be structured, by so doing every other kind of IP task imaginable can also be carried out. According to Occam's Law of which we are reminded by Davidson, supra, p. 10, there is no reason for doing that task in any way other than by the simplest means, i.e., by an array of gate circuits reminiscent of that pre-μP mode noted above, but now using the temporary gates of an ILA that will be structured and re-structured in nanoseconds or even picoseconds. (Other parts of the projected Instant Logic™ Apparatus (ILA) (not a part of the present application) carry out the various other processing tasks, i.e., of IP task selection, etc.)

What the data entered into an ILA will encounter will be precisely that "series of arrays of data bits on the input terminals of an array of logic gates, that first array of logic gates then connecting to the input terminals of a second such array, etc., that first data bit array similarly being followed immediately by a second data array, etc.," as had been stated above with respect to an actual hard-wired gate sequence that constituted the means for executing an algorithm. It is immaterial in that operation that the circuit about to be entered into had not existed a nanosecond or so before the arrival of that incoming array of bits, nor that such first array of gates will exist no longer after the role thereof had been carried out, the data resulting therefrom then passing into a next array of gates that likewise had just been structured at the next following LN 102 locations, and that those first circuits at that first set of LN 102 locations are then replaced by some other array of gates, either for more data of the same kind or perhaps for some other purpose entirely. So long as the circuit is present and operating during the time that the bit to be operated on is "passing through," the temporary nature of that circuit will have no effect on the operation being carried out. If the assumption is correct that a string of gates is the fastest way in which binary logic can be carried out, no faster IP apparatus could be built.

It is not that which is important at the moment, however, but rather the ways in which IL and the ILA differ from configurable systems. To clarify the distinction between the Estrin device (and indeed of all configurable systems) and IL, exactly what is meant by the term "configurable" requires clear definition. The article "A Reconfigurable Computing Primer" (Copyright© 1996-2004 Netrino, LLC) by Michael Barr notes that the term is used with reference to systems that employ Field Programmable Gate Arrays (FPGAs). With these, one circuit can be changed into another by entering a new "configuration code," perhaps providing an entirely different logic design, and the device can then carry out some new and different task. The apparatus must be stopped in its course in order to make that change, however, and once a particular task has been undertaken, the nature of that task, if the overall IP task is to be fully carried out, cannot be changed until that first task has been completed. And then beyond that, the Barr article can be read to say that yet another and higher level of flexibility is available, called being "reconfigurable."

According to Barr, the term "reconfigurable" means "run-time configurable," which is said to imply a capacity for "on-the-fly" re-programmability, which seems to suggest an ability beyond that of the Estrin apparatus. Barr defines "configurable" to mean the ability, given an FPGA that had some particular logical design configured therein, to delete the code that had produced that configuration and enter new code that will define new circuitry in the device, as just noted above. "Reconfigurable," on the other hand, according to Barr means the ability to carry out that exchange of code while the apparatus in which the FPGA is installed is still running.

As put by Barr, "on-the-fly" reconfigurability means the ability to "stop the clock going to some or all of the chip, change the logic within that region, and restart the clock." Barr, supra, p. 3. That means being able to change some "region" of the logic without having to reprogram (or at least turn off) the entire FPGA, so the part not being changed can keep running, with only the clock signals to the area being reconfigured being stopped. The logic that will be changed will be particular gate circuits that had been defined by the FPGA structure, the means for so doing being codes drawn from memory, and to "change the logic" means to replace the code for that initial logic array with the code for another array, also drawn from memory, that will put into effect a different set of pre-defined circuits.

Based on that description, however, neither "on-the-fly reprogrammability" nor "run-time configurable" includes the ability to change the course of a program then being executed without stopping the clock, at least where the changes are to be made, other than such changes as occur when a program is being controlled by software, which typically, by the use of instructions, will simply direct the course of the data being operated on from one set of pre-defined circuits to some other set. (Barr notes that the FPGA does much the same for the hardware as the μP does for the software, and calls the need to stop the clock a "small performance hit, " supra, p. 2.)

In a certain sense this "run-time configurable" approach seems to be less wieldy than software. Software is replete with conditional branches, a mechanical version of which was indeed first developed by Babbage. His apparatus carried out what today would be called "programs" (although there were no stored programs), and was also capable of carrying out iterations. (In separating the equivalent to the memory and the Central Processing Unit, the Babbage apparatus fully anticipated the scheme adopted by von Neumann, which is why reference is made herein to the "Babbage/von Neumann bottleneck.") (Swade, supra, pp. 110, 114). The "run-time configurable" apparatus noted by Barr "must stop the appropriate clock, reprogram the internal logic, and restart," (Barr, supra)., which is not necessary when running a program through a μP using software. (Presumably, any process that could be selected and instituted by stopping the machine, reconfiguring, and then restarting the machine, could also be selected by a conditional branch, but of course with the usual delay of a program.) Even so, the circuitry that can be selected within the FPGA may well include conditional branches itself, meaning that the conditional branch is not "lost," so the most that could be said may simply be that FPGAs do different things in a different way from that of μP-based computers.

There is no stopping of the Clock 130 in the ILA (if a clock were even being used). The FPGA and the ILA do have one thing in common, however, which is having a collection of code sequences saved for future use. In the FPGA, those are the codes that will define—or, rather, "configure"—particular gate arrays that as described above can be exchanged with the code already present to form new circuits, and those new circuits will then control the further course of operation when the clock is started again. In some implementations of the FPGA the circuits are in the FPGA in hardware form, and the "configuration" of a different set of circuits lies in changing the routing so that one set of those circuits will be connected to the rest of the circuitry rather than the former set. That procedure is of course reminiscent of the μP, using software, changing the next operation to be carried out (i.e., selecting a particular gate sequence in the ALU), except that in the ALU some complete circuit in one location is selected over some other circuit at another location, whereas in the FPGA the circuit to be used has the essentially the same location as the circuit not used—in the array of gates that had been installed in the FPGA, interconnections are made in one manner rather than another.

In the ILA, on the other hand, the code being entered does not interconnect an array of gates, but will instead structure both the gates and the desired circuits within the fixed circuitry of the PS 100. Upon being so structured, those circuits will be analogous to both the fixed circuits of a μP and a circuit as configured within an FPGA, and the selection in the ILA of which circuits to be structured, and where and when, serve by analogy as the IL equivalent of program instructions or circuit configurations, but with tremendous increases in speed. For example, the structuring of an ADD circuit in a nanosecond or so will permit the same operation as, and requires substantially less time, than the transmission and execution of an ADD instruction in the ADD circuit of the ALU in a μP-based computer, and of course considerably less time than would be required in an FPGA to stop the program, re-configure the gate connections to insert an ADD circuit, and then start up again. Moreover, a number of such IL ADD circuits as large as desired could have been structured and be operating at the same time, thus to provide a throughput as to mathematical operations that could otherwise hardly be imagined.

In a comparison of an FPGA and an ILA, the analogous procedures would be the interconnection of gates in a certain way to form the desired circuits in the FPGA, and the interconnection of an array of transistors into both gates and more complex circuits in the ILA. Taking an OR gate as an example, when an OR gate and the transistors needed to structure an OR gate are looked at in the abstract, one may ask what real difference there is between the two besides a few wires. In other words, what would be the point in adding the task of structuring the OR gate in the ILA when an OR gate would already be installed, ready for use, in an FPGA. The answer is that the OR gate ready for use in the FPGA has a certain fixed location, and the desired circuitry must then be configured around that location, while the ILA is replete with transistors and hence an OR gate could be structured anywhere desired. Evidently, based on the history outlined above, no one would have thought of structuring circuits "from scratch" in an IP apparatus unless (a) it were consciously in mind that using that process would allow one to place the location of the circuit anywhere one desired; and (2) there would actually be some purpose in wanting to use that freedom to locate an OR gate in one place rather than another.

In the use of pass transistors to effect connections, the manner in which those connections are made in an FPGA and in the ILA are similar. As described in Pak K. Chan and Samiha Mourad, *Digital Design Using Field Programmable Gate Arrays* (Prentice-Hall, Upper Saddle River, N.J., 1994), p. 22, with respect to a logic cell array (LCA), formed as a matrix of configurable logic blocks (CLB) and horizontal and vertical routing channels having a switch matrix located at each horizontal/vertical intersection, where an "IOB" is an input/output block, the Xilinx XC3000 series FPGAs operates as follows:

> "Implementing an entire design on the LCA requires interconnecting the various CLBs and IOBs. This is facilitated by the programmable interconnect resources, which consist of a grid of two layers of metal segments, programmable interconnect points (PIPs) and switch boxes. A PIP comprises a pass transistor that is controlled by a configurable RAM cell . . . Dropping a "1" into the RAM cell establishes a connection between two points." (Emphasis in original.)

However, the particular connections that are made are quite different. In the CLBs of the FPGA a number of standard circuits are already present, and the configuring consists of making interconnections between selected ones of those circuits. In the ILA, the pass transistors (PTs) connect the terminals of a Logic Node LN 102 to $V_{dd}$, GND, a data input line, and to individual terminals of adjacent LNs 102. "1" bits applied to those PTs serve to structure the required circuits "from scratch," with the data to be operated on then to arrive on those input lines immediately after each circuit or circuit part has been structured. That different use of pass transistors to control connections to individual transistors rather than entire gates is very significant, in that the former procedure, as carried out in the ILA, allows the circuitry to be structured at any locations within the ILA desired.

Ordinarily, the exact physical location of a circuit has about as much significance in the electronics function as would the issue of having the μP to the left or right of the memory. To give that issue any significance, there would have to be some distinction between one location and another, and the only way such distinction could arise would be that something was (or was not) located at one location that was not (or was) at any other location. That "something," of course, would be data, or could be made to be data by other circuitry if the connections necessary to bring in such data were provided.

It would also seem that no one would think to undertake the design of such an arrangement unless it were thought that to do so would accomplish some useful purpose. What would be accomplished by that seemingly insignificant effort, however, would be to have developed a method of bringing about the juxtaposition of data and circuitry in a different way than had been used for nearly 200 years. In so doing, one would eliminate the von Neumann bottleneck, and without that motivation, the line of thought just laid out above would likely never have occurred, or rather, if the matter of where a circuit could be located had not been seen to be significant, there would not have been the process of figuring out how, as a routine part of IP operations, to place selected circuits at some set of desired locations.

The procedure sought was then found to lie in structuring the gates and other circuits electronically, within an array of otherwise unconnected, inactive transistors, i.e., the transistors in FIG. 2. So as to avoid the need to transfer data and instructions back and forth to some location at which the means for carrying out the desired operations were located, those means are simply structured at the locations of those data. No data transfer would then be required, and as to the instructions, the particular circuits that would be structured would be those that would carry out whatever operations would otherwise have been designated by such instructions. It may then be rightly concluded that beyond the fact that both the FPGA and the ILA use pass transistors, in terms of &configuring a circuit out of gates in the FPGA or "structuring" circuits out of bare transistors in the ILA, those two procedures operate on quite different principles, act on different components, and thus carry out quite different tasks. There is nothing in the FPGA (which actually resembles a μP more than an ILA) that either shows or suggests any part of IL or the ILA.

As put by Tredennick and Shimamoto, supra, p. 16, the μP had "raised the engineer's productivity by giving up the efficiency of customization for the convenience of programmed implementation." For many restricted applications, as in appliances such as dish washing machines, there had been developed the Application Specific Integrated Circuit (ASIC), which might be thought of as a kind of pre-μP computer, i.e., a custom combinational logic circuit having the sole function of carrying out the one application for which it had been designed. But then, as also described in that article, the growing market for "untethered" devices (i.e., those that were unconnected to a power source) has created another need, i.e., for processing elements that would satisfy a better cost performance per waft standard. For such applications, ASICs were too expensive, and programmable logic devices were not only too expensive but also too slow. μP-based systems were economically feasible, and the speed sought could be obtained by shrinking the size of the transistors, but the performance price of so doing was an increasing leakage current—something clearly to be avoided in an untethered device.

As to the FPGA in particular, statements such as that the FPGA allows programmers to configure the architecture of the processing elements to exhibit the computational features required by the application, as for example in the article John T. McHenry, "The WILDFIRE Custom Configurable Computer," in John Schewel, Ed., *Field Programmable Gate Arrays (FPGAs) for Fast Board Development and Reconfigurable Computing, Proc. SPIE*, Vol. 2607 (25-26 Oct. 1995), pp. 189-200, at p. 189, while quite true, if read too broadly could be interpreted to express as well what IL does (except for the use of the term "programmers," since IL has no programs). However, as has just been seen, what FPGAs (and "configurable" systems in general) can actually do is quite different from what is done by the ILA.

Specifically as to that WILDFIRE system, what the FPGA allows one to do rests first on having developed a hardware architecture that one hopes will be appropriate to and best suited to execute a particular application. The FPGA is then used to duplicate that design: "the logic [i.e., the architecture just noted] is implemented by electrically programming the interconnects and personalizing the basic cells, usually in the user's laboratory instead of a factory." (Bracketed text added.) Chan and Mourad, supra, p. 3. The FPGA before being put to use "consists of several uncomm,tted logic blocks in which the [circuit] design is to be encoded" and "the logic block consists of some universal gates, that is, gates that can be programmed to represent any function: multiplexers (MUXs), random-access memories (RAMS), NAND gates, transistors, etc. The connectivity between blocks is programmed via different types of devices, SRAM (static random-access memory), EEPROM (electrically erasable programmable read-only memory), or antifuse." Id., p. 5. (Bracketed text added.) Some entire logical procedure is configured within that FPGA logic block, not by instructions but as a complete circuit, and data are entered into that circuitry that will then proceed to execute the entire procedure.

Similarly as to that configuring process, Anthony Stansfield and Ian Page described a survey of all of the different kinds of FPGA devices in order to identify common elements therein. As set out in their article "The Design of a New FPGA Architecture," in Will Moore and Wayne Luk, Eds., *Field-Programmable Logic and Applications* (Springer, New York, 1995), pp. 1-14 at p. 2, "the individual elements of the program are converted into groups of logic gates, and then the overall circuit is assembled from these groups in a manner which directly reflects the structure of the original source program." (This approach bypasses drawing out the architecture and goes directly from a program to FPGA implementation.) From that work there was developed a new design based on a 10 transistor, 1-bit Content-Addressable Memory (CAM) cell that upon forming those CAM cells into 16-bit groups as 4×4 arrays, so that the resultant circuit could "generate any Boolean function of up to 4 inputs." Id., at p. 6. Distinction between FPGAs and IL thus lies both in the ILA being constructed so as to have the ability to structure logic gates in an "instant" (i.e., one cycle) from bare transistors, and in what is done with the Boolean functions so generated.

One such distinction is that the FPGA usage just noted rests on software that had been specifically designed to operate in conjunction with a μP-based computer, both as to generating those "Boolean functions" and in the subsequent operation thereof. In IL, although it was stated earlier that if desired the CLs or data could be entered into the ILM 114 using a μP-type computer (components of the IL apparatus itself would ordinarily be used), the operations in accordance with that code and the data then entered rest solely on the circuits within the ILA (PS 100) that are structured by that code using other IL components. In carrying out an IP task in an ILA, no "code" in the software sense is used, and no μPs participate in any operations.

What is meant by "the software sense" can be seen in the following simplified comparison, beginning with the μP-based computer: the higher-level languages in which software programs are written use a human-readable plain text or assembly language "code" to identify specific instructions out of an "Instruction Set" (IS) within an ALU that are to be employed for the particular program. Upon the entry of data those instructions, now interpreted in the "machine language" of the apparatus, will carry out specific actions such as MOVE, ADD, etc., by passing that data through particular digital circuits as had been selected by those instructions, whereby that circuitry will then execute the specific commands defined by the program.

Then in an FPGA, the circuitry to be used is again present in fixed form, but as a block of unconnected hard wired gates. In order to carry out one function rather than another, a code is used to construct the needed circuitry from those gates by configuring selected ones of those fixed gates into the same kinds of circuits as would have been selected by an instruction in an ALU, and the data to be operated on are entered therein just as with the μP-based system.

In the ILA, code in the form of "0" and "1" bits, as had been pre-defined for all of the circuits needed for all of the algorithms, is sent into an array of Circuit Pass Transistors CPTs 104 and Signal Pass Transistors SPTs 106, such that "1" bits applied to selected ones of those CPTs 104 and SPTs 106 will structure from an array of operational transistors (LNs 102) to which those CPTs 104 and SPTs 106 are connected the same circuitry as would have been "called up" by the software in the CPU or configured in the FPGA. The code that would structure the sequence of circuits necessary to carry out each particular algorithm is stored in the special memory CODE 120, and execution of the algorithm is then initiated by selecting the particular block of CLs that are pertinent to the desired algorithm. The structuring of the circuits and the entry of data occur essentially simultaneously, along particular separate (but time-coordinated) paths, so repetitive instruction transfers are not needed. All three types of device employ "code," with that code being of a different type in each type of device, each of which devices brings forth a different kind of procedure, with the ILA employing a procedure that is particularly unique in that the required circuits are structured with the actual locations of those circuits in mind, i.e., at the actual sites of the data to be treated.

One feature in common as to the FPGA and an IL apparatus, since both carry out a form of circuit construction (from pre-wired gates to circuitry in the FPGA and from bare transistors to circuitry in the ILA), is that "shifts by constant amounts can be handled in the routing, they need no logic gates." Stansfield and Page, supra, p. 3. Of course, just as the FPGA treats the processing entirely at the gate level, those shifts would also have involve entire gates, while in the ILA shifts can be made in terms of individual transistors, i.e., from one LN 102 index number or address to another. (As an example of such an event, two outputs that were to go into a next circuit might have come out of the previous circuitry in "staggered" positions rather than side-by-side, perhaps because one of the lines yielding those outputs had an inverter in the line but the other did not, in which case one line could be shifted one space by using a BYPASS gate, as will be described later, so that the circuit outputs would be evenly aligned with the input terminals of the next circuit.)

Similarly as to hardware, Stephen Churcher, Tom Kean, and Bill Wilkie, in the article "The XC6200 FastMap™ Processor Interface," in Moore and Luks, supra, pp. 36-43, have indicated at p. 36 thereof that "processors run different programs at different times. FPGAs should therefore be able to be reconfigured for different tasks at different times." That can be achieved by using "dynamic reconfiguration" (of the type noted above called "reconfigurable" by Barr). "SRAM based FPGA's are inherently capable of dynamic and partial reconfiguration; all that is required is to bring the internal RAM data and address buses onto device pins . . . . The XC6200 family is configurable to provide an 8, 16, or 32 bit external data bus, and a 16 bit address bus. Using these features, the entire configuration can be programmed in under 100 μs." Id., p. 39.

A feature of the FPGA described by Churcher et al. that is somewhat analogous to the capability of the ILA of structuring circuits at any location within the ILA desired is that in the XC6200 FPGA family, "it is not necessary to program the entire device . . . the random access feature allows arbitrary areas of the memory to be changed." Id., p. 40. Even when done "dynamically," however, the ability to change the interconnections of a group of hard-wired gates within some one fixed area in "under 100 μs" is quite a different thing from not only being able to change the interconnections between individual transistors at arbitrary locations within the ILA in ns, but in actually doing so, in every cycle of operation. That FPGA procedure is of course quite useful, and gives to the FPGA a flexibility beyond that of the μP-based computer in which the gate interconnections are all fixed, but the gates being so re-connected in the FPGA will still remain in the same physical locations, so the FPGA lacks the ability to place the needed circuitry at those locations where it is known that the data will actually appear, and hence cannot eliminate the von Neumann bottleneck in the manner of IL and the ILA.

It might then be thought that since data can also be distributed about the ILA as desired, it might serve just as well to have followed the BP by constructing an array of fixed gates first and then sending the data to the input terminals of the circuits that would be configured out of those gates. However, as an example, one algorithm might require that there be some small collection of contiguous OR gates at one point in the process, and if such a collection had been hardwired into the FPGA somewhere that part of that one algorithm could be accommodated, but another algorithm might never require such a collection, could require an ensemble of gates that had not even been installed, or there could be no gates surrounding those OR gates that would fulfill the requirements of the next step in the algorithm. And to base the operation on entire gates all at once would again be wasteful of space, since some gates would never be used. As to the more complex gates such as an XOR gate, the "downstream" parts of those gates, i.e., "gate segments," would simply be taking up space and serving no useful purpose until the data bits had first passed through the "upstream" gate segments, and then the opposite would be the case when the data bits had reached the "downstream" part of the gate process, since at that time the "upstream" gate segment would be wasting space. Moreover, once that collection of OR gates had been used just once in the one algorithm, those gates might not be used again and hence would thereafter be wasting space in their entirety.

The subject of configurable systems was taken up in order to determine whether or not the terms "on-the-fly" or "run-time configurable" in the Barr article could be taken to refer to anything that has been made a part of IL. Based on the foregoing, it seems not. IL operates by having the circuitry that is doing the actual processing change in its entirety on every cycle, which comes about through the use of the code selectors (that with a central control unit to select the algorithms to be activated could be called the "operating system" of the ILA) that were mentioned earlier, and that will be present in the ILA in the form of fixed circuitry. The operation of the ILA is not a matter of "being able" to make changes while a "program" is running, but rather on the fact that to carry out IP tasks at all rests on such changes in the circuitry that actually carries out the IP taking place continuously, which means a "non-stop" process that takes place on every cycle. At every "instant," i.e., for each cycle, the circuitry needed for each new step of an IP task is provided "automatically," at the time and place that the particular IP step requires. That same process takes place at the same time as to all of the algorithms that are then being executed. It is only IL and the ILA that provides that freedom of action, a procedure that is nowhere found or suggested in connection either with μP-based computers or FPGAs.

In a complete Instant Logic™ Apparatus (ILA) (not a part of the present application), an IL central control unit ("CCU") will contain a "full code" (to be defined later) for every step (i.e., each operating cycle) of every IP task that the user had elected to implement in the ILA, and the "running" of an algorithm lies in there being a continuous flow of circuit and signal code into the Processing Space (PS 100) of the ILA, even as the data to be operated on for the algorithm are also flowing continuously into a data array within PS 100. That "data array" is made up of the GA 110 terminals of all of the LNs 102 within PS 100. The input nodes of the circuitry required for each step, which will be the GA 110 terminals of those LNs 102 that had been structured into the particular circuitry required for the particular step of the algorithm(s) being executed, are caused to appear at the same nodes as those at which the operands of the algorithm are to appear. All of that is decidedly distinct from what has been called "configurable computing," "run-time configurable," programming "on-the-fly," and so on, with the term "on-the-fly" perhaps being better reserved for use with reference to IL, since it is only in IL that anything like that really occurs—a thing cannot be said to be "on-the-fly" if it is necessary to stop the operation in order for the thing to be implemented.

This foray into configurable or "reconfigurable" systems also provides an opportunity to point out yet another application of IL, so as to identify yet further how it is that IL is distinguishable from the prior art. This distinction relates to "SAT solvers," i.e., an array of reconfigurable hardware systems that have been configured so as to permit finding out whether or not a Boolean formula can be satisfied by some truth assignment. The Iouliia Sliarova and António de Brito Ferrari article "Reconfigurable Hardware SAT Solvers: A Survey of Systems," *IEEE Trans. on Comp*., Vol. 53, No. 11 (November 2004), pp. 1449-1461, describes how different researchers have developed a wide range of different architectures, all directed towards the SAT problem, and for each architecture an algorithm has been developed by which the problem can be solved through "configurable logic." With respect to just one such architecture, the article mentions spending an hour or more in hardware compilation and configuration. To carry out SAT solving in an ILA, if the algorithm steps had already been spelled out as in the former case and the ILA had been provided with an adequate "Code Line" (CL) library, to institute one of those algorithms would likely require only moments, and no changes would be made to the fixed hardware within which the necessary circuitry for the algorithm was being structured. The algorithm, in the form of the CLs to be applied to the ILA, would have been saved in the CODE 120 memory, and the entire process could be fully instituted in a matter of moments. Moreover, with reference to the wide range of different architectures noted in the above-cited article, all of those algorithms (each testing a particular architecture) could be carried out in the same ILA, and indeed simultaneously if the ILA were large enough. The ILA, as a test bed, thus provides a much more productive way to conduct such research.

Another view of the FPGA, seen as being made up of arrays of pre-defined gates that are held in interconnected "logic blocks" between which the routing is field programmable, can be seen, e.g., R. C. Seals and G. F. Whapshott, *Programmable Logic: PLDS and FPGAs* (McGraw-Hill, New York, 1997), pp. 4-7. The FPGA can be seen as a rough equivalent to an assemblage of operations in an ALU that are called upon by instructions, except that in the FPGA the circuitry is not selected from some set of circuits that are already fixed in the ALU, but is instead defined by programming the connections between a fixed array of logic gates or circuits within that logic block. In other words, in an FPGA the circuitry is electronically configured within an IC out of some set of existing gates that collectively would be capable of being configured into a number of different circuits, while in a CPU the circuitry would be pre-installed in its entirety but then selectively called upon. Both cases are then more or less analogous to changing one ASIC for another.

In constructing the required circuitry directly and perhaps in its entirety, rather than having to send repetitive instructions as to which next circuit was to be employed, FPGAs serve as a significant step away from software and all of the time consuming instruction transfers associated with software, and instead direct the "programming" (configuring) effort towards the actual circuits themselves. Even so, there remains the "Babbage paradigm" (BP) in which, in one way or another, the data to be treated are transferred to various fixed circuits that will carry out the steps that make up the computations (or generally, the "Information Processing") required for the algorithm being executed. Both the μP-based computer and the FPGA are thus clearly different from IL and the ILA, and contain nothing that either anticipates or suggests the principal inventive aspects of IL and the ILA, which can be seen as being clearly distinguishable therefrom on that basis alone.

Connectionist Machines

A "connectionist model" is a special purpose computer particularly suited to treating particular classes of problems that will "involve a large number of elementary computations that can be performed in parallel. Memory is completely distributed, processing can be asynchronous, and the models are inherently tolerant to malfunctioning connections or processing units. Consequently, they are amenable to a highly concurrent hardware implementation using thousands of simple processors, provided adequate support is provided for interprocessor communication." Joydeep Ghosh and Kai Hwang, "Critical Issues in Mapping Neural Networks on Message-Passing Multicomputers," *ACM SIGARCH Computer Architecture News*, V. 16, No. 2, pp. 3-11, 1988. That description generally fits IL and the ILA as well, so again it is necessary to show how IL and the ILA are distinct, in this case from Connectionist Machines (CMs).

CMs are often compared to neural networks, or simulations thereof, because CMs can treat the kinds of problems that arise in that discipline, with neural networks actually being only one of a large number of different kinds of problems such as expert system knowledge bases that the CM can address.

See, e.g.: Stephen I. Gallant, "Connectionist Expert Systems," *Comm. ACM*, Vol. 31, No. 2 (February 2008), pp. 152-169; legal reasoning; G. J. van Opdorp, R. F. Walker, J. A. Schrickx, C. Groendijk, and P. H. van den Berg, "Networks at Work: A Connectionist Approach to Non-deductive Legal Reasoning," *Proc. Third Intern'l Conf. Artif. Intell.* (ACM Press, Oxford, England, 1991), pp. 278-287; and even computer architecture, Dan Hammerstrom, David Maier, and Shreekant Thakkar, "The Cognitive Architecture Project," *ACM SIGARCH Computer Architecture News*, Vol. 14, Issue 1 (January 2006), pp. 9-21. Except in one respect, that description and the kinds of tasks that can be carried out both apply in general terms to the ILA as well. The exception is that besides using a different circuit as the PE than does a CM, an ILA has no need for any "support . . . for interprocessor communication," since the communications between PEs in an ILA will already have been provided by having the required circuitry structured out of PEs that are adjacent to one another, that again serves the purpose of eliminating the vNb.

That distinction requires more explanation, but before addressing that, another similarity between an ILA and a CM is that as to the CM, as described by W. Daniel Hillis, *The Connection Machine* (The MIT Press, Cambridge, Mass., 1992), p. 5, "particular computations can be achieved with high degrees of concurrency by arranging the processing elements to match the natural structure of the data." That description also fits the ILA, in the sense that each ILA circuit or part thereof is structured at the sites at which the data to be treated are located, and another similarity is that the simple PEs (termed "cells" in the CM) of the ILA and the CM are both laid out in a grid or "array" (see FIG. 21 thereof). In the CM those PEs will have been arranged in position at the time of manufacture, and then the connections therebetween will be configured by software. Taken together, those PEs themselves constitute the circuitry that will carry out the IP program. The grid layout of the CM PEs is essentially the same as the layout of a memory bank, and the initiation of a program by making the required inter-PE connections, such as between PEs "A" and "B," is accomplished simply by directing both PEs to the same memory location, so there is no need for any direct "wire" between PEs "A" and "B."

In an ILA, the correlation between data and "cells" (in the ILA, these are the individual LN 102s and PTs 104, 106 in FIG. 21) is brought about at the time of operation by placement of "1" bits on selected PTs 104, 106 on those LNs 102 at which the data are to appear, immediately prior to the appearance of those data. As put by Hillis, supra, p. 10, with reference to the "semantic network" type of CM, "the topology of the hardware depends on the information stored in the network." In an ILA, the PEs ("cells") thereof are not capable of doing anything other than structuring circuits that will then respond to the data in the natural manner of such circuits. Those circuits carry out virtually everything that the ILA does.

That is, in an ILA each circuit or part thereof is structured at particular locations and at such times as to accept each particular bit of data on the next cycle that will appear at those locations immediately afterwards. The particular circuit or part thereof that is then structured will be that required by the algorithm at that time, with that structuring then taking place in a matter of nanoseconds in transitioning from one cycle to another. The data may be initial input data from an external source, or may simply be the output produced in the previous cycle by an LN 102 that was immediately adjacent to the LN 102 being structured. A principal difference between an ILA and a CM in this context is thus that the ILA does not need to be matched in advance to any particular type of computation or other IP—the ILA is a general purpose device that can carry out any binary logic IP that the user could encode—while each CM is designed to carry out selected ones of a small number of IP problems and is thus a special purpose device. There are the superficial similarities just noted between a CM and the ILA (e.g., both consist of small "cells" laid out in geometric arrays, etc.), but beyond that the CM and the ILA are distinctly different in both form and function.

One conceivable function of an ILA that could not be carried out in a CM would be to duplicate the circuitry of other types of devices, even including a CM. In using an ILA it is not necessarily required that the normal practice be followed in which circuits or portions thereof are structured, data are received and operated on, and such circuits are then immediately re-structured for use in another circuit. Although an ILA that had been structured into the form of a CM would not actually be a CM, in principle, and assuming that sufficient PS 100 were available, by using the IL processes an ILA could be made into the functional equivalent of a CM, and in an instant if the code necessary to bring about that transformation had been available from CODE 120. It is possible that one might wish to have a CM (or a μP, etc.) on hand for demonstration purposes or the like, and in such case, again assuming that one had a PS 100 that was large enough to accommodate all of the CM circuitry, the appropriate voltages would be applied to the PTs 104, 106 as required in order to structure that apparatus, in this case as a whole, and then the data would be applied to that "CM" so as to carry out whatever CM-type process that was to be demonstrated. Such a process is to be distinguished from that normal CM process in which the CM is itself used as such to carry out some particular program.

The interconnects of the CM will be laid out in a specific pattern that will define the operations to be carried out, with the PEs themselves remaining fixed in position and hence requiring many inter-PE connections in order to carry out the desired tasks. In the ILA, by contrast, the circuitry that carries out the operations will be structured step-by-step, on every cycle, so as to execute some number of algorithms whereby, depending on the size of the ILA, hundreds or perhaps even thousands of algorithms could be in the course of execution at the same time.

In the CM those connections are programmable by the host computer that operates the CM, much in the manner of an FPGA: "From the standpoint of the software the connections must be programmable, but the processors may have a fixed physical wiring scheme . . . . This ability to configure the topology of the machine to match the topology of the problem turns out to be one of the most important features of the Connectionist Machine." (Emphasis in original.) Hillis, supra, p. 15. The fact remains, however, that the use of software in a separate computer to alter the interconnections in the PE array of the CM grid remains quite distinct from the actions of the ILA wherein direct code maintained within the ILM 114 itself is used to structure (or alter) the circuits to be used.

In a CM, the circuitry required is obtained in part through the use of routers. But "in practice, a grid is not really a good way to connect the routers because routers can be separated by as many as $2\,n^{-2}$ intermediaries." Hillis, supra, p. 16. While to obtain the required circuitry in a CM it will frequently be necessary to make connection between widely separated points A and B, in an ILA whatever had been the content located at a CM point "B" to which connection had to be made, the equivalent operation would be to cause the required circuitry to appear right next to point A, i.e., the circuit is structured so that the inputs thereto connect to point A. If the content of the cell at point B had been data, the previous course of circuit structuring in a corresponding ILA would have been caused to follow paths by which the data content of point A would have been made to appear right next to the circuitry that was to treat those data, i.e., the circuitry of points A, B, would have been structured so as to be adjacent one another.

Another feature common to a CM and an ILA is that they both eliminate the vNb, although with substantially different methodologies and circuits. In the ILA, there is no vNb because the circuitry required by particular data is always structured wherever in the ILA those data are or will be located. The CM avoids the vNB in a different way in which the "data"—that might be some particular concept held in the memory of a particular cell—is treated by an array of PEs that extends across that grid-like array of cells by way of inter-cell connections, and with the data to be treated in the CM already being disposed within the memory portions of the cells throughout that whole array of cells, rather than being entered sequentially (or treated in some separate processor, e.g., in an ALU.

The circuits of an ILA, of course, are likewise structured in part by "inter-cell connections," i.e., by enabling selected PTs 104, 106, but the difference is that no such circuits are structured in the CM. Instead, a small amount of processing capability, such as an ADD, is already a part of the cell, so that a single cell, for example, can be instructed to add two numbers contained within the memory of that cell, and then "computation takes place in the orchestrated interaction of thousands of cells through the communications network." Hillis, supra, pp. 20, 22.

Perhaps the principal difference between the CM and the ILA, however, is that the CM will have had connections made therein that would enable carrying out an entire IP task, as a complete IP "program." Any step of the program, in other words, could involve routing through the entire CM grid, the accumulation of all such routings as initially installed constituting the entire algorithm, those routings then being used successively. In an ILA, by contrast, the circuitry required to carry out an entire algorithm is structured only one step at a time. The array of PEs that make up the CM working space would have been interconnected initially throughout the entire CM grid for the purposes of a single but entire IP algorithm, while in an ILA at each particular instant there could likewise be circuits or portions thereof that had been structured across the full ILA (PS 100) space for purposes of carrying out just one step, but that one "step" would in fact be a separate step for each of perhaps hundreds or a thousand or more different algorithms that were all running at once, if the user had so set up the apparatus. In a CM the circuitry for a program will be present "all at once" while that will never be the case in the ILA. At any one time in the ILA, for each algorithm in use only that circuitry will have been structured that will carry out the next step of that particular algorithm, but with the same also taking place as to all of the other algorithms, if any, then being executed. (As will be discussed later in more detail, that procedure vastly expands the volume of IP that the ILA can carry out.)

Another different thing that the ILA does is eliminate the supposition underlying the CM that in parallel processing any thousands of PEs all working at once must communicate with one another, and often must be synchronized with one another (and hence the CM comes out with that design). For example, Hillis asserts that "Some portion of the computation in all parallel machines involves communication among the individual processing elements." Hillis, supra, p. 22. Of course, that will obviously be true if (1) two or more PEs are participating in a single operation; or (2) the structure of the algorithm is such that two or more items of data must be applied to a single operation, e.g., if the result of interest is derived as the sum of some number of preceding results, then those preceding results must be made to join together into an ADD operation.

The CM goes well beyond that, however, in having a "communications network" as an "overlay" to the operations of the PEs themselves, whereby that ADD operation will be carried out across some thousands of individual PEs, each of which has the particular data therein. (In the CM version of the LISP programming language such an array of PEs containing such data is called an "xector," made up of a "a domain, a range, and a mapping between them," Hillis, supra, p. 33. (Emphases in original.) There will be no such mass communication within an ILA, other than that which might have derived from one or both of the individual circumstances just noted above as to a wide "range" of PEs, since the only "communication" required is that through the SPTs 106 that connect between adjacent LNs 102 and provide the data paths for the circuits as had been structured by CPTs 104, by which the passage of data can then take place. It is abundantly clear that such a scheme has been developed specifically for IP having highly parallelized algorithms, that would benefit the most from the CM method of operation.

Both as to the underlying principles of operation and the implementation thereof, the CM thus does not relate to IL and the ILA as material prior art in any way other than being fine grained like the ILA (but having an entirely different kind of PE and mode of operation) and in having a number of PEs laid out in a grid of some kind. That general type of architecture is also common in the more common types of course-grained parallel processors, and hence is simply a standard part of the current electronics art. (Needless to say, the present application will have no claims on the grid-like architecture of the apparatus as such, but only on the PE content thereof.)

The Connectionist Machine, therefore, and indeed all of the foregoing history and background information as to particular types of apparatus, have not been seen either to show or suggest any circuitry or mode of operation as are exhibited by IL and the ILA, that would consequently detract from the allowability of any of the claims appended hereto. Instant Logic™ and the ILA can then be viewed as a new, fourth major approach to achieving the long-sought goal of a high speed general purpose computer, the major predecessors of which would have been the first single purpose devices centered on combinational logic, the microprocessor, parallel processing, and the FPGA, together with variations thereof such as systolic arrays and the CM. None of those apparatus or practices exhibits the nearly total abandonment of current practices in the computer art as are seen in IL and the ILA, central to which is the IL reversal of the fundamental BP, and evidently with only one of them (the CM) fully recognizing the far reaching significance of the von Neumann bottleneck and having then eliminated the same.

SUMMARY OF THE INVENTION

This invention constitutes a method and apparatus through which any binary circuit can be structured when needed, and then used for Information Processing (IP), the circuits so used then being immediately restructured in repetitive cycles into other circuits, each of those new circuits likewise being used immediately in simultaneously executing some number of the same or different algorithms, for which the method is termed "Instant Logic™" (IL) and the apparatus, designated as an "Instant Logic™ Array") (ILA), provides an alternative to the computers based on the microprocessor, the Field Programmable Gate Array (FPGA), and all other such devices. The operations in the ILA center on a "Processing Space" (PS) within which is disposed an array of operational transistors that are designated as "Logic Nodes" (LNs), such array being interleaved by arrays of "Pass Transistors" (PTs), including both "Circuit Pass Transistors" (CPTs) and "Signal Pass Transistors" (SPTs), that when enabled will connect specific terminals of each LN therein to power means (e.g., $V_{dd}$), to ground (GND), to I/O means, and to one or more terminals of other LNs adjacent thereto, thereby to have structured binary circuits that will carry out the desired "Information Processing" (IP), with those binary circuits being structured at such locations within the PS as to have the input terminals thereof disposed at precisely those locations within the PS at which data requiring IP are present or happened to be selected to receive from memory the data to be operated on whereby, upon the arrival of data requiring IP from either source—i.e., the "operands"—the execution of the full span of any and all possible IP algorithms will begin immediately, as encompassed in a continuous, parallel flow of both the operands and the code that controls such PT enabling, from beginning to end.

The assumption on which the development of the ILA is based is that the fastest that a "computer" or any other electronic information processing device could be made to operate would be by placing data bits on the input terminals of a hardwired, powered-up binary gate, or an extensive series thereof, and then allow those bits to pass therethrough without interruption to yield an output. The goal was to develop a design that would employ a methodology that was as close to that simple procedure as possible, but universal in the sense of being able to execute any algorithm for which code could be written, and at a large enough scale to encompass the most extensive and difficult of information processing (IP) tasks.

To obtain the "universal" computer, however, no fixed gate array could be used, so it was necessary that the gates needed, that would be the corollary of the gates in that idealized hardwired system, could be structured at will. With the advent of the microprocessor (μP), the long-sought universality of the system was achieved, but at the cost of needing to pass data and instructions back and forth between memory and the operational circuits in the CPU, in what has come to be called the "von Neumann bottleneck, although that general scheme predated von Neumann, having been adopted by earlier workers such as Babbage and Zuse. The Instant Logic™ m (IL) methods and apparatus set forth herein resolve both that bottleneck problem and the need for universality first by eliminating the "von Neumann bottleneck, i.e., the transmission of instructions and operands to the circuits of an ALU, and second by way of structuring the required circuitry when needed at the sites of the data.

Absent the μP (or FPGAs), the normal procedures of present "digital" electronics would be a sequence of arrays of data bits being placed onto the input terminals of an extensive hardwired array of logic gates, of a size that would accommodate the sizes of the data inputs, with that first array of logic gates being used in a first step of the IP task in a first cycle, then connecting to a second such array of gates as a second step of the task in a second cycle, then a third array in a third cycle, etc. (Although the term "digital" with respect to the electronic manipulation of data continues to be used in the art, this application will instead use the term "binary" as a more accurate depiction of actual fact, since computers have not used base 10 operations for more than fifty years.) The use of that method for the entirety of some huge algorithm would be quite impractical, however, and would be limited to just that one algorithm, thus not to provide the universality that was sought.

In the Instant Logic™ system, on the other hand, over time the data bits would be caused to pass through a series of such gates in a continuous stream, each bit in each cycle to be acted on as the nature of each particular gate that was being traversed provided, throughout the full length of the particular IP task then being carried out, with no other aspects of the apparatus adding to the minimalist state of the single set of LNs 102 of a single cycle, except in the number of LNs 102 involved, and with the number of LNs 102 needing to be structured at any one time being quite small. In addition, as many of those algorithms could be operating simultaneously and independently of each other as there was space available for them within the PS 100. The execution time of any algorithm will be the product of the cycle period and the number of steps in the algorithm, with there being no other events taking place than control procedures that operate in parallel with the logical processes to bring about those direct IP operations but do not add to the time requirements therefor. The execution time would be much shorter than that of the current methodology, since no time would be spent in transmitting data and instructions back and forth.

Using the methodology described herein under the name "Instant Logic™" (IL), the ILA is able to structure any kind of gate circuit, and so far as Applicant knows, all of the circuitry required for any algorithm that might be conceived. The IL methodology centers on structuring the circuitry needed to carry out some IP task at the locations required to receive the data to be acted on, just prior to the times of arrival of the data at those locations, in an exact reversal of the historic BP. In the ILA an operational transistor (i.e., an LN 102) is made to be a part of a circuit by making connections thereto, which connections are made by enabling selected ones of a multiplicity of pass transistors that connect from those operational transistors. The code that enabled those PTs is followed by the data to be operated on, with both code and data flowing into the ILA in separate streams, being timed relative to one another so that the circuits required will be structured immediately prior to the arrival of the data to be acted on, those circuits then being de-structured, left as is if needed again, or structured for the next step within the same or some different algorithm when the circuits just structured have completed their particular tasks.

The only operational difference between that long, hardwired gate circuit and the IL process is that in the conventional procedure the gates passed through would be fixed in place, but the gates passed through in the IL process would not have existed an instant before those data arrived, and would then "disappear" after the data bits had passed therethrough. There is also a difference in the power consumption, since in the conventional computer all of the transistors will be "powered up" at all times, awaiting data to operate on (thus to be in an "active" state as will be explained below), while in the PS 100 the LNs 102, CPTs 104 and SPTs 106 will be in an unpowered "passive" state, consuming no power, until put into "active" status by the structuring thereof into a circuit, and then the receipt of data that would bring about the "operating" state. (Instant Logic™ does have an added source of power consumption and a diminishment in the speed, however, in the ohmic and delay effects of those PTs.)

Any effect from that "delay" caused by the time required for a bit to pass through an SPT 106 in going from one LN 102 to the next, however, is easily eliminated. As explained in greater detail later, the transmission of the code that would structure a circuit and the data that would be operated upon by that circuit take place quite independently of one another, and if it were necessary to take account of a delay involved in the traversal of an SPT 106, the circuit structuring process would simply be started out earlier, by an amount that would compensate for any such delays. By that means, the circuits would then indeed be ready to receive the data and carry out the intended processing when those data arrived.

As to that long sought universal Information Processing Apparatus (IPA), the ILA would seem to accommodate any arithmetical/logical algorithm as could be conceived, hence besides having what could be an enormous speed advantage, the ILA also seems to be as versatile as any such device could possibly be. Any algorithm could be installed, uninstalled, put into operation, or stopped, without reference to any other algorithm that might be in operation at the same time, so long as the LNs 102 affected by such changes did not "collide" with the LNs 102 being used by any other algorithm. The code for some new algorithm would first be written and saved, that code would then be tested to ensure that indeed no part of that new code would impinge on any circuitry for any other algorithm, and then when desired that new code would entered step by step alongside every other algorithm being executed at that time.

That is, the code for a particular algorithm, after having been so tested, is stored as a whole within a separate memory, CODE 120, and when called upon by a menu or like means, is then used to structure within PS 100 whatever circuits were needed for that algorithm, one step at a time, thus leaving substantial space available for the code for many other algorithms, since one step of an algorithm by itself will typically constitute only a very small fraction of an algorithm that may have thousands of steps. That kind of "packing" of algorithms into the ILA, so as to have as much IP carried out as possible, is made easier by the fact that the structuring of the circuitry for an algorithm can be directed onto any defined path through the PS 100 as may be required in order to avoid "collision" with some other IP taking place. (A "defined" path in a 1-, 2-, or 3-D PS 100 is a line parallel to any of the one, two, or three orthogonal axes of the PS 100 described herein, along which the LNs 102 from which the desired circuits are structured, which line can also jog at right angles so as to momentarily follow lines that are at right angles to one another.)

There would need to be a "Master" copy of every algorithm, since as will be more fully explained later, each location in CODE 120 corresponds to a location in PS 100, and since the code content of the successive locations in PS 100 must change as the course of the algorithm proceeds, a later part of the algorithm would erase the code of an earlier part, and without a master copy that erased code would be lost.

Also, the speed of the ILA is expected to be such as to invite many users, and since a large enough ILA would have space for a great number of algorithms in the prospective ILA as a whole, there would be provision for remote access, so that any number of users around the world would be able to connect in to the ILA and carry out whatever IP was desired at any time, whether using algorithms already installed in the ILA or by installing some new algorithm by transmission from the site of the distant user. This usage of the ILA would not be in the manner of the earlier "time sharing" that was used in main frame computers in the 60's, since there will be no "central control" through which everything must pass, but could have as many algorithms as had been installed all operating at once, not sharing any time or space but proceeding in its own right at "full power." Also the code by which algorithms are installed and executed is totally portable, so that the codes for various algorithms can easily be exchanged among users and sites. (There can be no conflicts between higher level programming languages because there are no higher level programs, although some might ultimately be written.) A single algorithm could be in use in any number of instances at the same time, whether in a single ILM 114 or in distributed ILMs 114, so that with the algorithms of an ILA there would never be a case of not being able to use a program since already being used, as could occur in μ-based computers.

The ILA also exhibits the feature of "super-scalability," meaning that the fraction of the total space that would actually be useable does not decrease as the number of units (e.g., ILMs 114) included in the ILA is increased, as in current microprocessor-based devices, but actually increases, which makes the size of an ILA that could be constructed essentially unlimited. In an ILA, scalability derives from the ability to add or remove processing space at will (e.g., plugging in or unplugging ILMs 114) without affecting the operation of any of the circuitry not involved in such changes, except that, as will be shown in greater detail later, two equal areas of the IL circuitry when joined together to make one apparatus will have more than twice as many inter-transistor connections as are in the total of those two separate areas.

Another unique feature of the ILA is that it will be the only electronic apparatus extant that can routinely accept and operate on data that had been formatted as Variable Length Datum Segments (VLDSs) as set out in the Lovell '275, '378, '746, and '114 patents. A VLDS results from having "zero-stripped" binary words of some fixed or variable size of any leading zeros therein, and has the form nnnnndddddd . . . , where the "n's" are sufficient in number to express in ordinary binary code the number of bits "d" in the VLDSs that constitute the data to be operated on in an ILA.

The complete ILM 114 includes (1) the "Instant Logic™ Array" (ILA), i.e., PS 100, within which all of the IP takes place; (2) an Index Number Designator (IND) 116 that specifies to which LN 102 the code then to follow is to be applied; (3) a "Look-Up Table" (LUT) 118 that serves to convert the digital numbers that initially identify particular LNs 102 into binary code; (4) a "Code Cache" (CODE) 120, i.e., a memory bank in which the code needed to carry out all of the algorithms that had been installed for use is stored; a (5) "Code Line Counter" (CLC) 132 that keeps a count both of LNs 102 being used and the cycles traversed; and (6) a "Code Selector Unit" (CSU) 122 made up of a pair of code selectors, i.e., "Circuit Code Selector 1"(CCS1) 126 (the "1" referring to a "1-level" circuit, of which there can also be 2- or 3-level circuits as will be explained below) that controls which CPTs 104 are to receive "1" bits, and "Signal Code Selector" (SCS) 128 that will similarly control which SPTs 106 are to receive "1" bits, the sending of "1" bits by both code selectors to selected PTs 104, 106 in PS 100 then providing the IL circuitry required in each next step of an algorithm, with the operands for that step then to arrive at the selected LNs 102 immediately after the circuit has so been structured.

(In lieu of having an LUT 118, there are also equations by which a binary number can be calculated from a decimal number; See, e.g., William H. Gothmann, *Digital Electronics: An Introduction to Theory and Practice* (Prentice-Hall, Inc. Englewood Cliffs, N.J., 1977), pp. 23-24.), and a "utility" IL algorithm that would be used to pre-convert the initial decimal LN 102 identifiers into binary form, that could be encoded into the PS 100 and be operating alongside the algorithm installation process.)

What is meant by a "step" here is a single operation carried out by a functional portion of the circuit within a single cycle, that will itself accept an input and yield an output, although not necessarily the entirety of the function that the gate as a whole was to provide. These LNs 102 will often lie in a straight line, with the input LNs 102 being side by side along that line, but in some cases, as in an XOR gate, the first functional part of that gate will require two cross-connected lines of LNs 102 and actually two gates in order to perform its task.

In passing through the aforementioned series of gate arrays, each step will involve a small group of LNs 102 having a number of input terminals that is the same as the number of input bits and is capable of yielding an output. The line along which the LNs 102 required to treat some n-bit operand are structured will generally lay transverse to the direction in which the structuring of those groups of LNs 102 will advance as successive circuits are structured, i.e., the "structuring direction," with that forward direction then being the longitudinal direction. The generally orthogonal orientation of the LN 102 lines used in a single step would then be the transverse dimension of the circuit structuring process.

The result over time will be a series of parallel lines of LNs 102 that would appear and disappear along some arbitrary path through the ILA that was generally orthogonal to those parallel lines, as the execution of the algorithm proceeded. If required by the presence at some particular step of some LNs 102 that had already been designated for use by another algorithm in that same cycle, the direction in which the structuring of circuits for the algorithm then being encoded would proceed would obviously have to be changed so as to find LNs 102 that would not be in use at the same time, perhaps even to make a "U-turn" and direct the structuring back towards the location where the circuitry for the algorithm had been started, with none of any such changes in direction having any effect on the operation of the circuits themselves.

Turning now specifically to the hardware, a processing element (PE) consists of a single LN 102 and associated PTs 104, 106, with a multiplicity of such PEs placed in an array thus forming the PS 100. The LNs 102 have CPTs 104 that connect between the DR 108 and SO 112 terminals of each of the LNs 102 to $V_{dd}$ and GND, respectively, thus to permit the LNs 102 to be "powered up" as a circuit when those PTs are enabled. A third CPT 104 acts as an external data entry point from outside of the ILA to the GA 110 terminal of the LN 102. Those PTs alone do not provide for any output, and there are no more PTs on the LN 102 itself, but elsewhere there is an "output bank" (not numbered because not a separately identifiable component) of PTs that have lines reaching to the DR 108 terminals of all of the LNs 102 in PS 100 that can be used for data extraction.

A second aspect of the PE lies in connecting those SPTs 106 from the DR 108, GA 110, and 112 terminals of each LN 102 to the like terminals of adjacent LNs 102, firstly to structure groups of selected circuits, commencing with simple logic gates that can then be inter-connected to form more complex circuits, and secondly to form data paths between two or more of the LNs 102 of the circuits as had been so structured, according to which of the PTs 104, 106 had been enabled. Which of the PTs 104, 106, are to be enabled at any given "instant," by which is meant the time period of an operating cycle, depends upon what IP task was sought to be carried out and what circuits would be required to carry out that IP task.

With regard to the time required for the execution of an algorithm, the first point to be made is that the initial start of the first data transmission is obviously only a one-time event. No later data transmission step can affect the "run time" since those transfers occur in parallel with the IP operations themselves. With both code and data flowing "side by side" into PS 100, the actual execution time would extend from the first interaction of a first datum bit with a first circuit or part thereof to the last such interaction that yields the final output. Time would be required to transfer in that first bit, but that would not be a part of the actual IP of making arithmetical/logical decisions. In any event, there would be no such delay even for that process, since the data transfer for that first datum bit is simply initiated in advance, i.e., a pre-determined number of cycles prior to the completion of the structuring of the first circuit or part thereof.

There can also be quite a few places within an algorithm when new data must be brought in, and in all cases, including that first data entry, that data transfer will simply be initiated in advance of the structuring of the circuitry that will use those data, again so that the data will arrive immediately after the circuitry had been structured. What that transfer period might be does not matter, since once that "head start" had been given to the first array of bits, with a fixed cycle period that same head start would apply to all later bits, and so far as could be determined at that first point of entry and at every LN 102 array that followed, those data could just as well be arriving from a source that was immediately adjacent the data input point of the receiving LN 102, i.e., the GA 110 terminal thereof.

To sum up, unlike the standard, CPU-based computer, the practice employed in PS 100 of structuring the circuitry required in the immediate path of the operands themselves eliminates the need for repeated transmissions of data between memory and the CPU, and similarly there are no transmissions of instructions, as also characterize the CPU-based computer, since the circuits themselves fill the roles first of the "instructions," by way of the nature of the circuit that had been structured, and secondly of the circuitry that would carry out those instructions. There need only be a continuous flow into PS 100 of code that will structure the circuitry required, together with a continuous flow of operands that will appear just as the circuit structuring is being completed. Although those two flows of circuits and operands must obviously be synchronized, the separate processes being carried out by the various algorithms are otherwise independent of one another.

Besides having perhaps the most simple architecture that could be conceived, PS 100 will also have the fastest possible operating rate, since it is only the rapidity with which data can be sent (i.e., how soon can one bit be made to follow after another bit) and the speed with which the LNs 102 can act on those data, that restricts the operating speed. There are no architectural barriers, whether of the von Neumann type or any other kind. The maximum operating speed will be limited only by the nature of the LN 102, PT 104, 106, and PS 100 IC designs and of the circuitry from which the operands are derived are similarly limited only by the natures of the materials used and the laws of physics.

Consequently, the cooperative way in which the circuits interact is not a feature of any supplementary hardware, as in the case of a number of computers being interconnected by a network, but is a consequence of the circuits themselves. The computing power is then a matter of how much circuitry can be "packed into" the available space, and if a second block of PS 100 had been added to a first, as in having two ILMs 114 instead of just one, it is a matter of complete indifference whether any particular algorithm was structured so as to remain within the PS 100 of that one ILM 114, or had crossed between the two blocks so as to have one part of the algorithm structured in one ILM 114 and the rest structured in the other ILM 114—except for the need to move from one ILM 114 to the other they are the same.

It should also be noted that while this entire IL system has been and will continue to be described herein in binary electronics terms, the same processes could be carried out optically, e.g., with the two logic states perhaps being light of one or the other of two orthogonal planes of polarization instead of "0" and "1" bits, the" energy" would be light energy rather than a voltage; the starting point being an electro-optically active crystal, designated as a "passive energy transmission device" instead of an LN 102; as a connection means or "active" energy transmission device there would be an electro-optic shutter within a "light pipe" rather than a pass transistor; the "energy packets" (which is the "work piece" of the apparatus) would be made up photons rather than bits; a laser would serve as the energy source, and any kind of light detector would serve as the "entry location for energy packets," and so on.

In general terms, all that is required is a passive energy transmission circuit that may be physically connected to or is at least accessible to others of the kind, and then means through the application of any kind of active energy transmission switches that will transform that passive energy transmission circuit into an active energy transmission circuit through processes that would be analogous to those of Instant Logic™ in its electronic version described herein.

There would be no exact one-to-one correspondence between the electronic and optical components, since, for example a beam of photons does not require an energy "sink" such as the GND connection in an electronic embodiment, the necessary energy would not be in a fixed form such as $V_{dd}$ that is then "tapped into" in the electronic version but the "energy packets" constituting the information would themselves provide the necessary energy, etc., but the resultant differences in the components that would need to be recited in a claim would be perfectly obvious. (Indeed, one could no doubt structure an IL-infringing device out of water pipes and valves, which procedure has sometimes been used as an analogy in elementary treatments of how a computer works.)

Again as to an optical version of an ILA, as with an LN 102 the starting point could be "passive" in the sense of not initially being in a condition to respond to signal data, but could then be made "active" by using a source of polarized light (e.g., a laser) and an optically active element in place of the LN 102 that had "light pipes" extending therefrom in the same directions and to equivalent kinds of destinations as are the pass transistors of the circuitry described herein. The elements that would receive the light could perhaps be polarization-sensitive Nicol crystals or the like that would then respond or not to the light coming in, depending upon the polarization of that light. The main principle that underlies Instant Logic™ would still apply: the light pipes coming in to one of such light sources would include either a shutter or, if faster, means for "flipping" the plane of polarization so that in one case the light as received would be transmitted and in the other case would not. As a consequence of which pipes leading to which reception points on that receiving element had been made transmissive of the light being received, there would have been structured, at the location at which information-bearing light pulses constituting the data would be appearing, an optical circuit that could have all of the same circuit forms as do the circuits structured by the electronic version of Instant Logic™ described herein.

Brief Description of the Several Views of the Drawings and Tables

For purposes of illustration only, and not to be limiting in any way but only to provide an aid to better understanding of the invention, a number of preferred embodiments of the invention will now be described with reference to the accompanying drawings. The Instant Logic™ Apparatus (ILA) has quite a number of different aspects, centering mostly on the "Instant Logic™ Module" (ILM) 114 and the components therein. These different aspects, though clearly distinguishable, are nevertheless very much interrelated and interactive, so the same aspect, or specific parts thereof, will be encountered a number of times throughout the text, as each of these aspects is necessarily explained in the context of each of one or more of the others.

For the reason that the components that bear on a particular aspect may be referenced at widely separated parts of the text, references to a figure or a table will include the numbers both of the figures and of the sheet on which that figure appears, and those discussions will also be cross-referenced. These figures, that insofar as possible are numbered and presented in the order of appearance in a discussion thereof, are listed just below, and then, in light of the length of this disclosure, is a listing first of the Tables and then of the Equations used. In light of their number (160), there is also a Components List, by reference number, right after the Equations. Finally, following the text of the Detailed Description but before the Claims and Abstract, there will be a numbered listing of IL-structured circuits and a Glossary.

DRAWINGS

FIG. 1 (sheet 1) is a circuit drawing that represents a preferred embodiment of the central aspect of the invention, i.e., an operational transistor designated as a "Logic Node" (LN) 102 to which are connected a number of "Pass Transistors" (PTs) 104, 106, this FIG. 1 circuit being the "Processing Element" (PE) of Instant Logic™ (IL), which PE is replicated throughout the "Processing Space" (PS) 100 in which all of the arithmetical/logical operations of the "Instant Logic™ Apparatus" (ILA) are carried out.

FIG. 2 (sheet 2) shows a portion of a PS 100 containing a 4×2 (x, y) array of the circuit of FIG. 1 but now including the Interconnect PTs 322 and Posts 326 that permit the use of the "z" dimension shown in FIG. 1 that connects to a layer above the layer shown, thus to permit the use of this array as a general template for structuring Class 3 Instant Logic™ circuits.

FIGS. 3(*a*)-(*g*) (sheet 3) show a group of 10×10 blocks of LNs 102 as excerpts from PS 100, some individual and some interconnected, intended to illustrate how it is that the IL architecture creates super-scalability.

Figure 9:
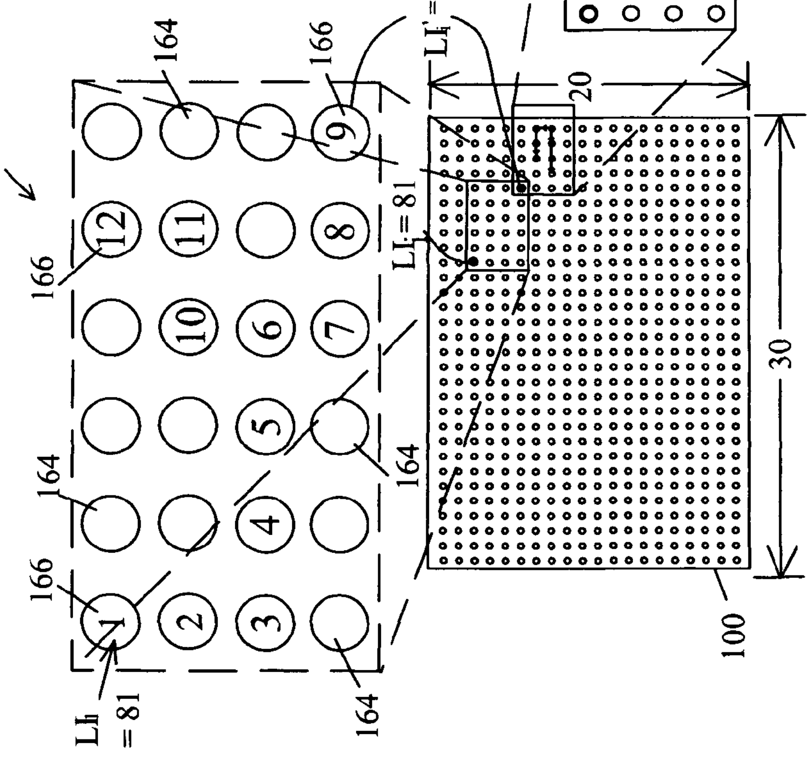

FIG. 9 (sheet 8) shows a PS 100 and an enlarged 6×4 "PS 100 Extract" (PSE) 162 therefrom showing first a "zero" LN 102 position marked "$LI_0$" and then 11 other LN 102 positions to indicate that selected ones of those 12 LNs 102, identified by the ordinary integer number sequence and by being encircled, are to be structured into some kind of circuit.

Figure 10:
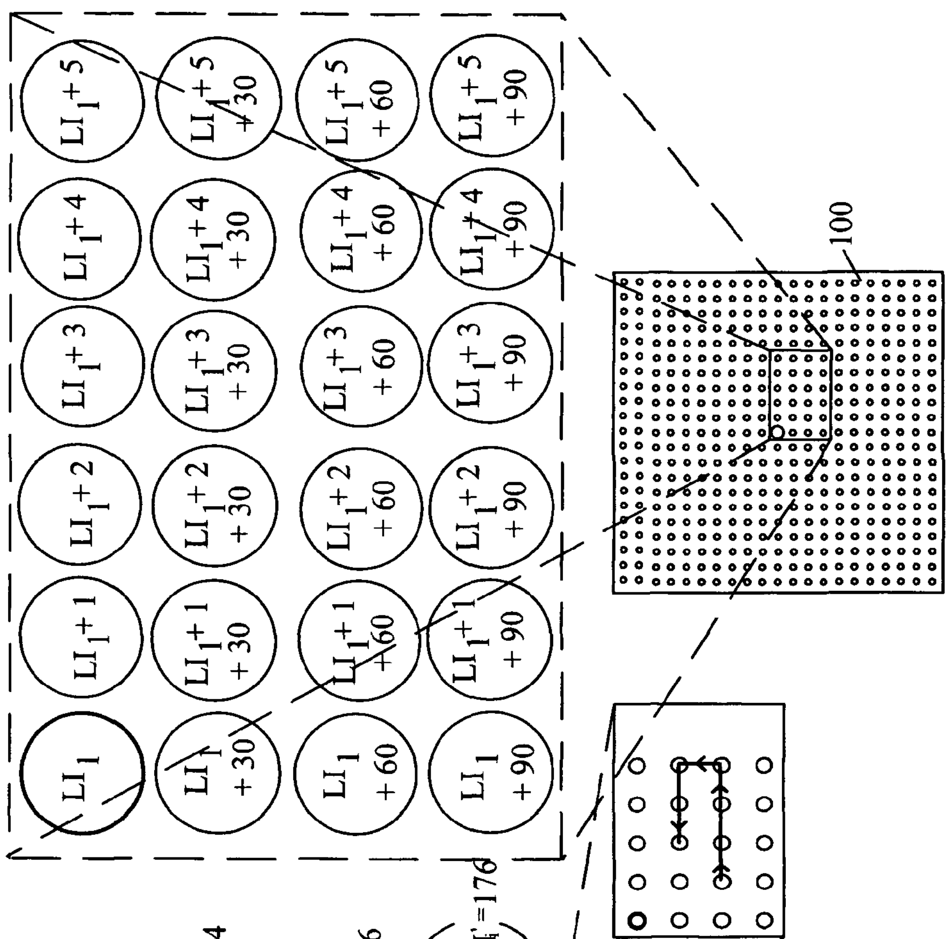

FIG. 10 (sheet 8) shows a transparent Overlay 168 of a size to match the PSE 162 of FIG. 10, wherein a hole passes through the center of Overlay 168, and again showing the array of other LNs 102, but in this case each LN 102 in Overlay 168 has a formula therein that expresses mathematically the $LI_i$ for that LN 102 relative to the upper left hand LN 102 which is designated as the "$LI_1$" LN 102 with respect to PS 100 but acts here as an "$LI_0$."

Figure 11:
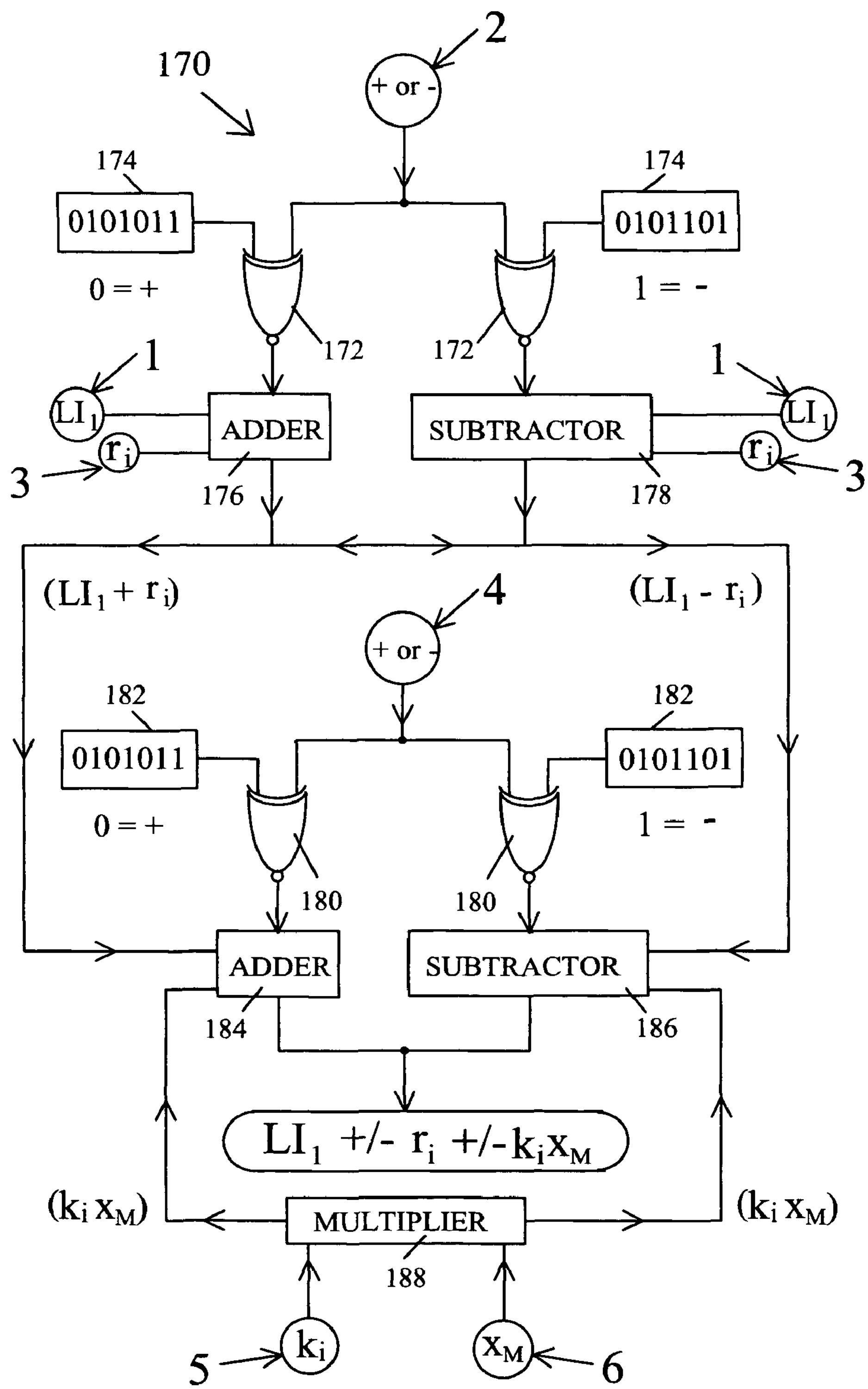

FIG. 11 (sheet 9) shows a "Node Locator" circuit for calculating $LI_i$ values from a known $LI_1$ value and the physical location of the other LNs 102 of a circuit relative to the $LI_1$ LN 102.

Figure 2:
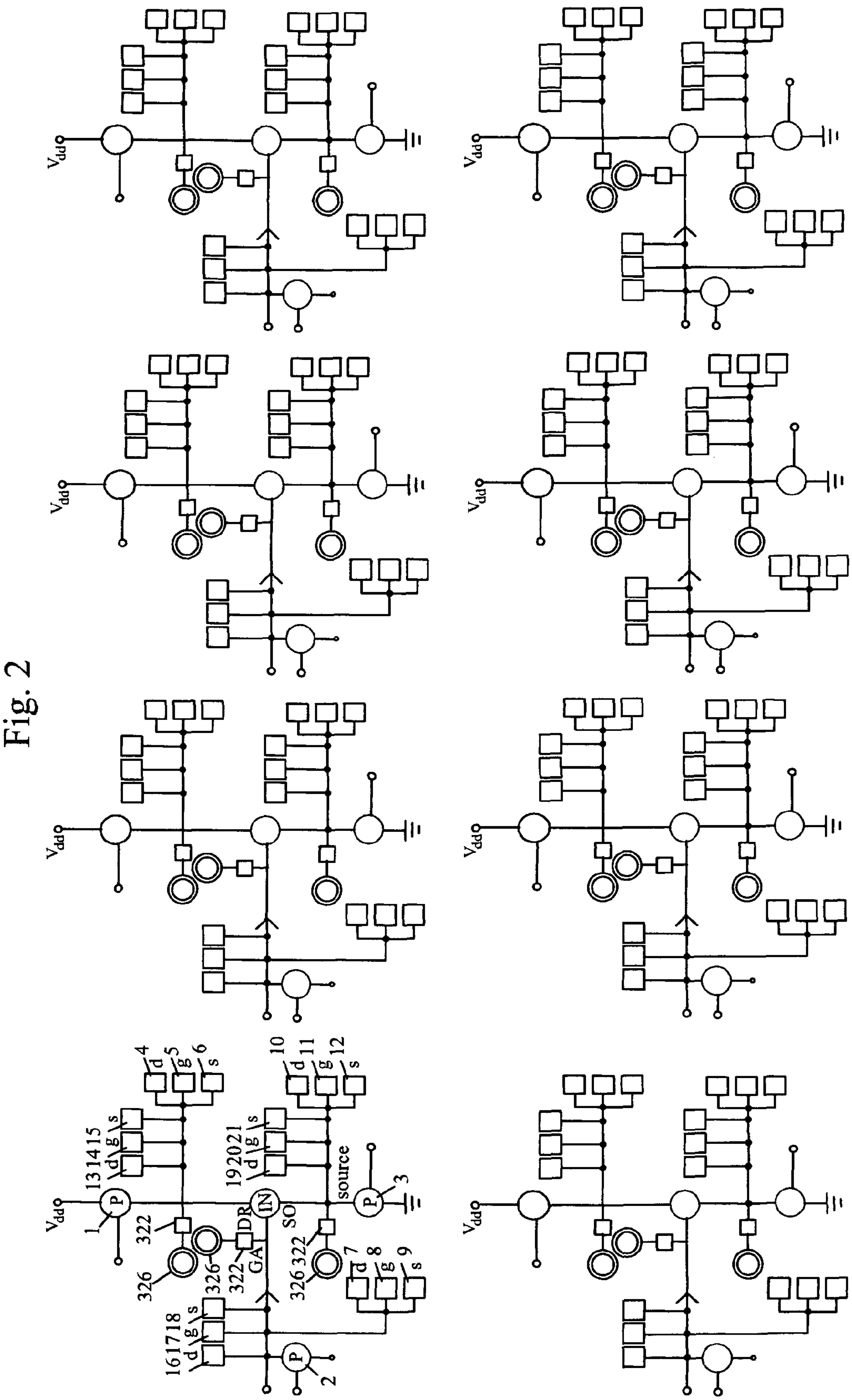
Figure 12:
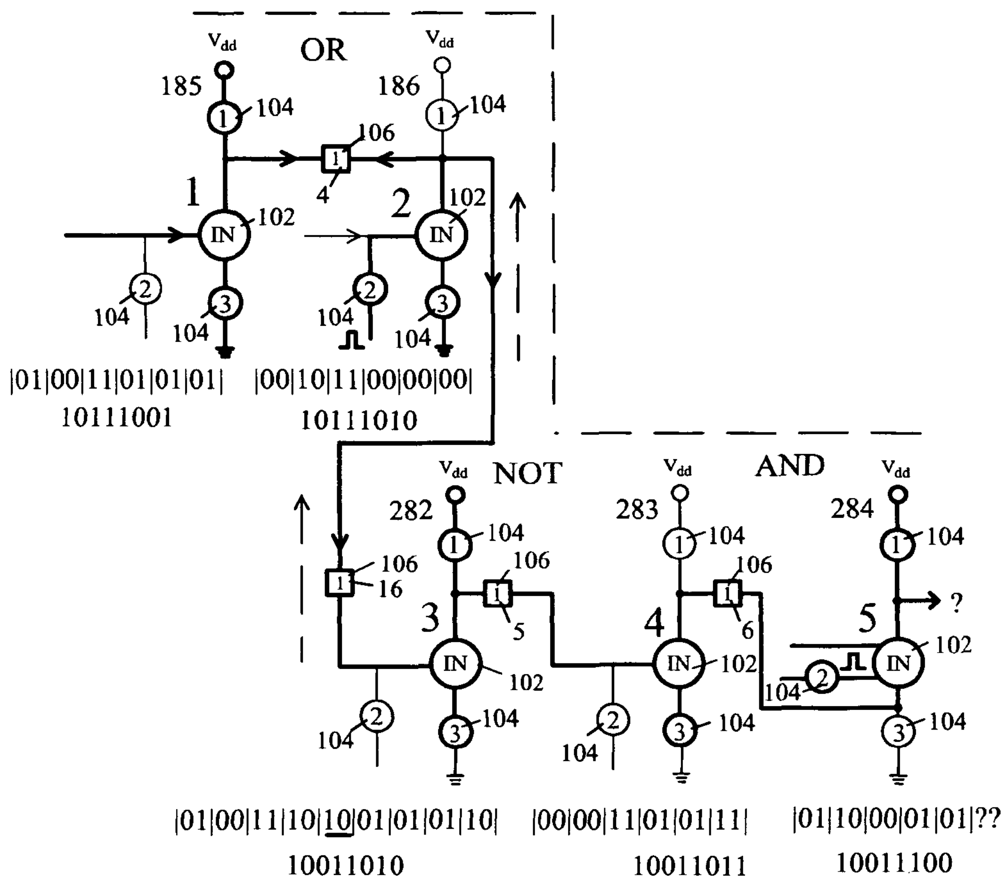

FIG. 12 (sheet 10) shows as an example of the coding process a hypothetical circuit that might be structured using the template of FIG. 2, including one instance of a method of structuring that is opposite in direction to the usual manner (i.e., opposite to the signal flow) in order to illustrate the processes required in order to structure the circuits needed to execute actual algorithms.

Figure 13:
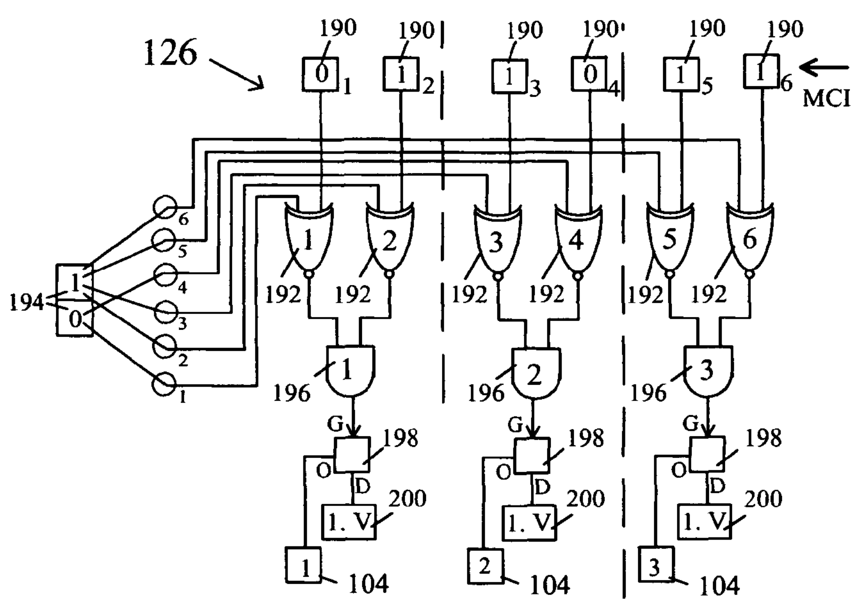

FIG. 13 (sheet 10) is a circuit drawing of a 2-bit 3/3 CCS1 126 (one level, three inputs and three outputs) that sends "1" bits to selected CPTs 104 within PS 100 so as to structure desired circuits.

Figure 14:
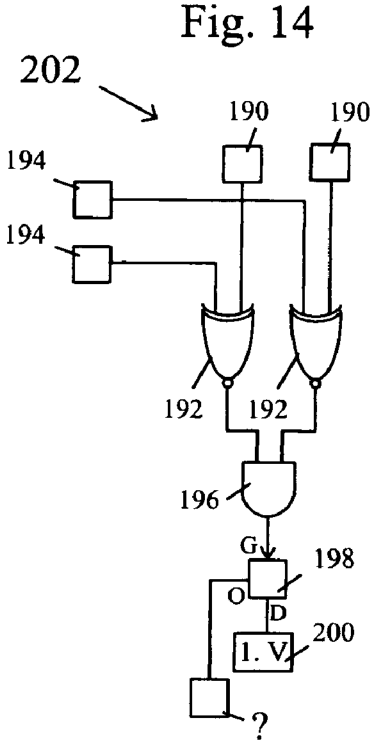

FIG. 14 (sheet 11) shows a 2-bit "Code Output Enabler" (COE) 202, being one of the three identical and independent circuits that were used to make up the CCS1 126 of FIG. 13.

Figure 15:
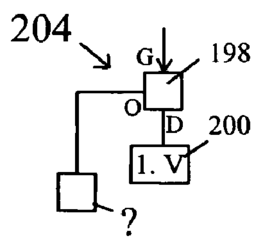

FIG. 15 (sheet 11) is an extract from the terminal end of the circuit of FIG. 14 that could be called a "2-bit Code Output Enabler" (2COE) 202 or more simply a "PT Enabler" (PTE) 204 that can act as an independent circuit in the enabling of selected, isolated PTs.

Figure 16:
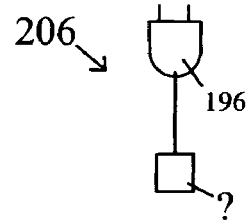

FIG. 16 (sheet 11) shows an output that would act as a "Direct Code Output" (DCO) 206 in lieu of the circuit of FIG. 15 in this IL context.

Figure 17:
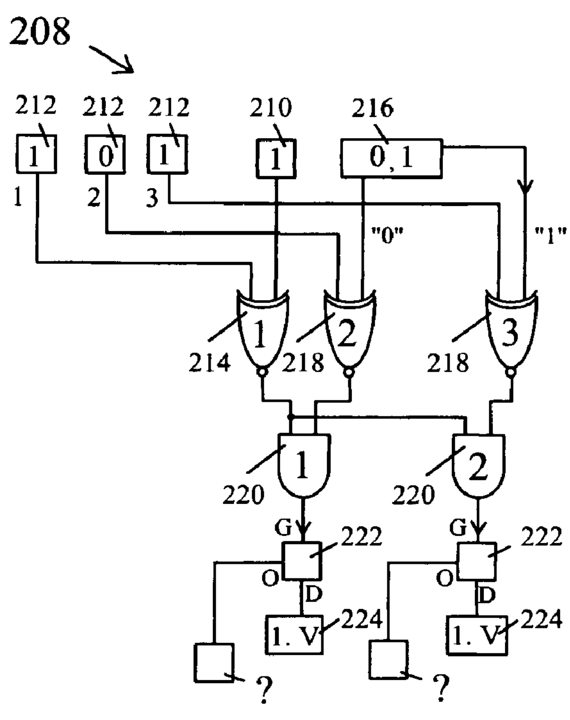

FIG. 17 (sheet 11) is a drawing of a 3/2 "Elective Code Selector" (ECS) by which of three different code entries only two can yield an output.

Figure 18:
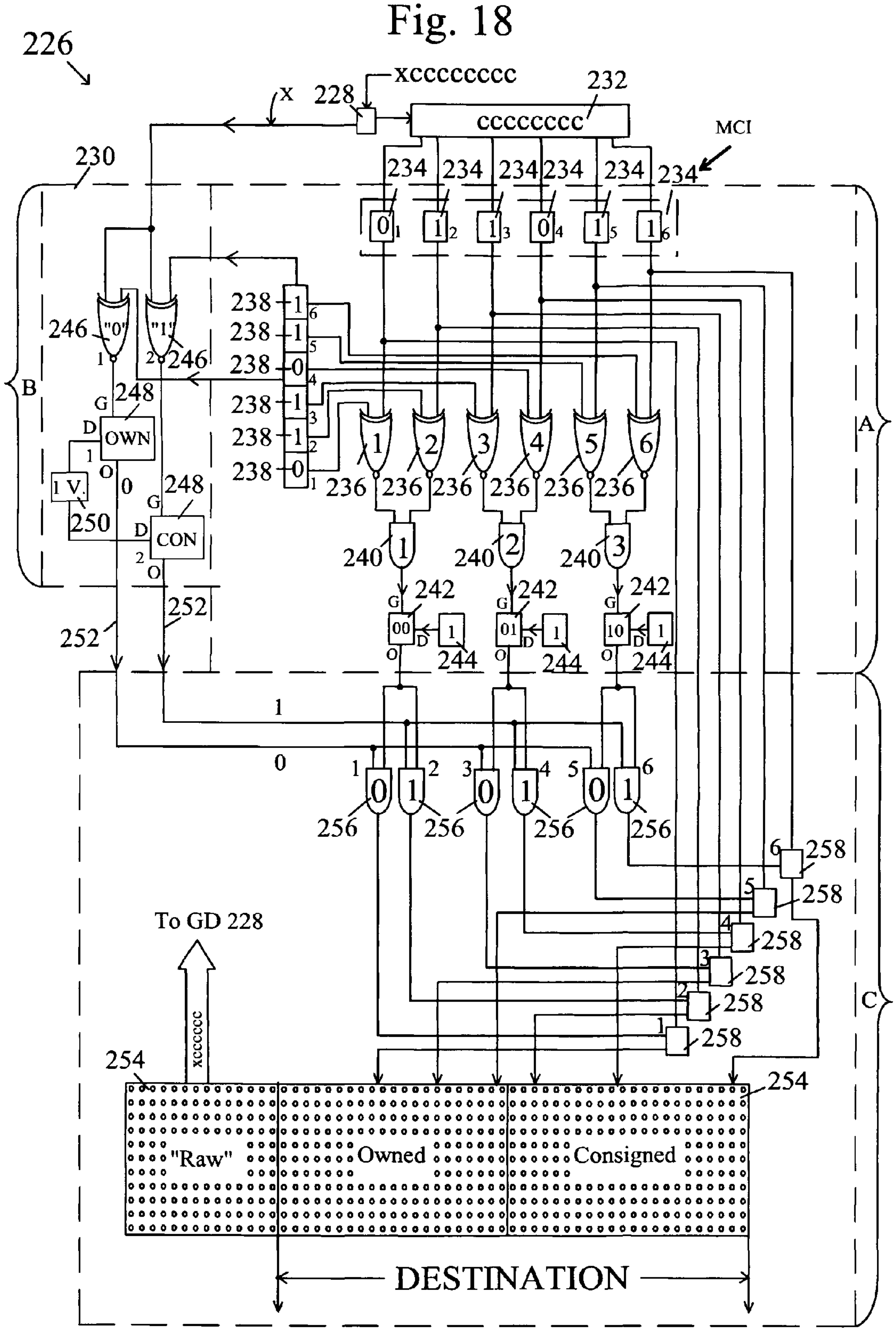

FIG. 18 (sheet 12) shows a 2-bit, 2-level 3/3 Data Analyzer (DA2) 226 made up of an essential replica of the CCS1 126 of FIG. 13 overlaid by a simple 2-choice data selector using just an x=0 or x=1 basis for that second selection.

Figure 19:
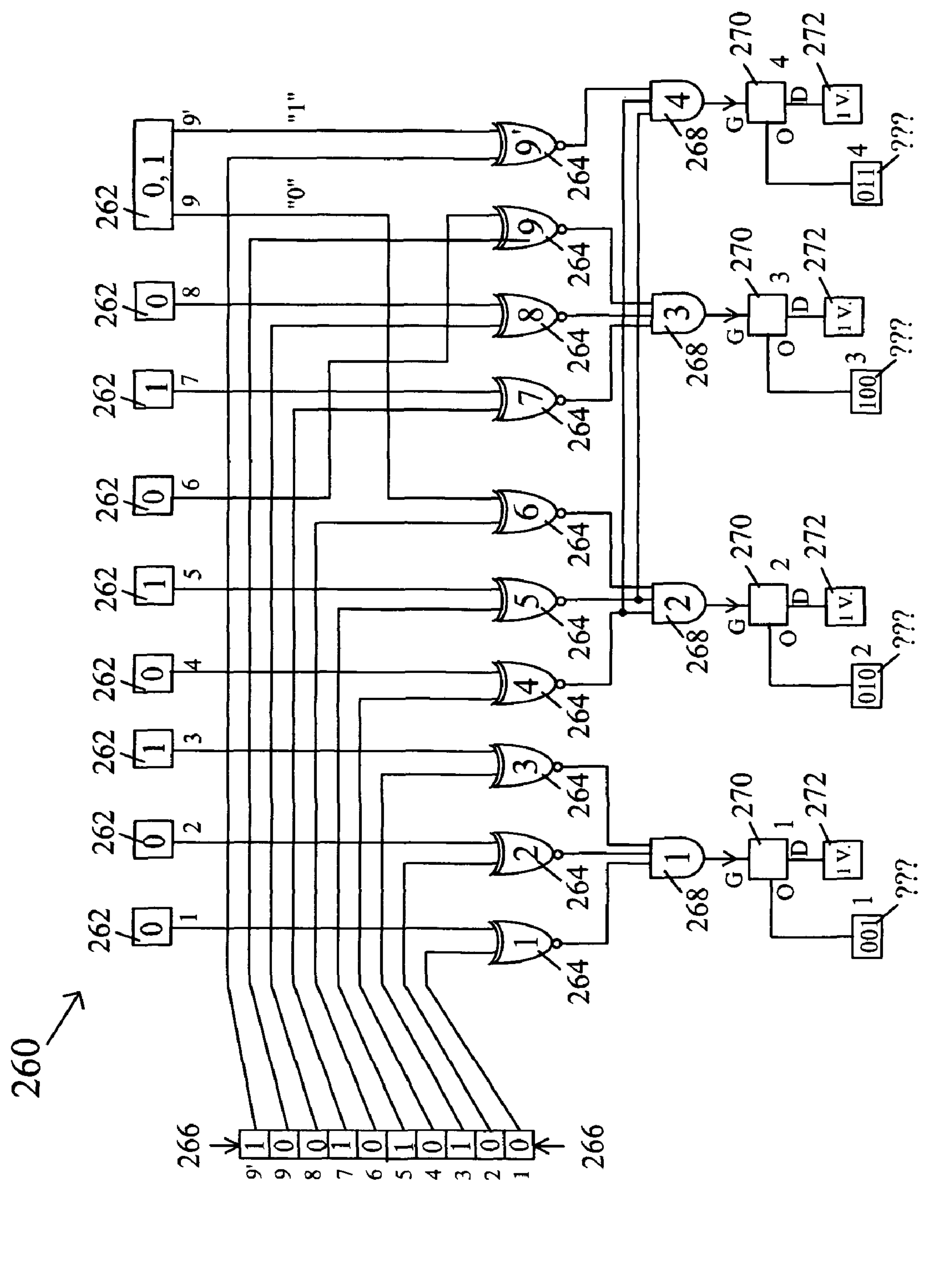

FIG. 19 (sheet 13) shows a 3-bit Elective 4/3 Circuit Code Selector that includes an "either one but not both" election as to two of the code choices.

Figure 1:
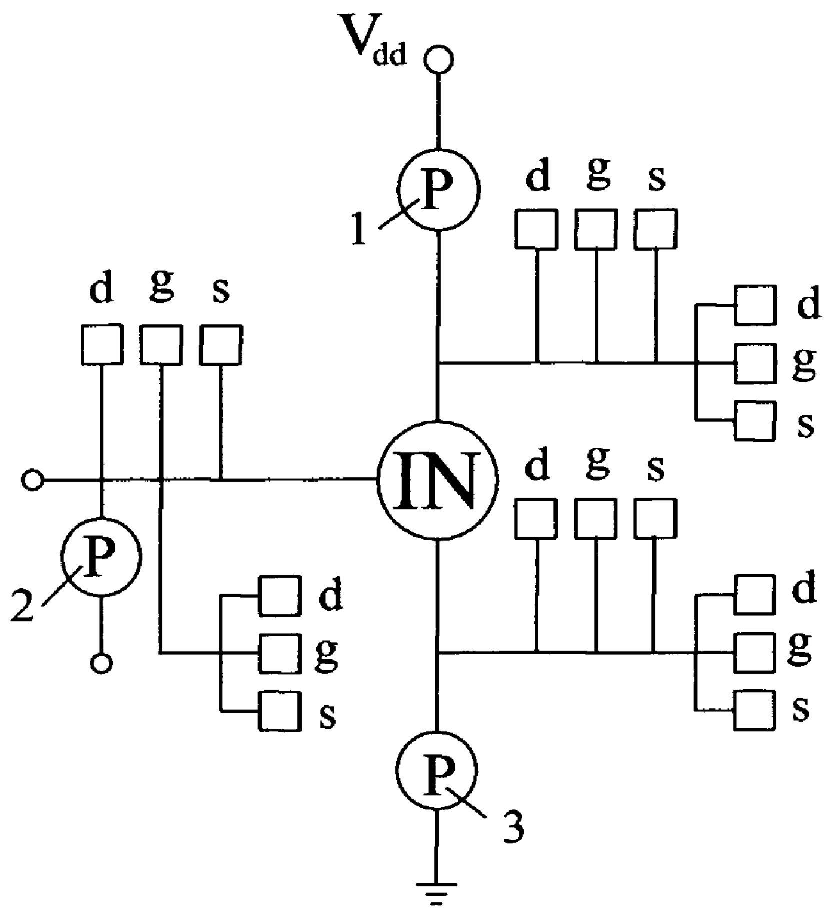
Figure 20:
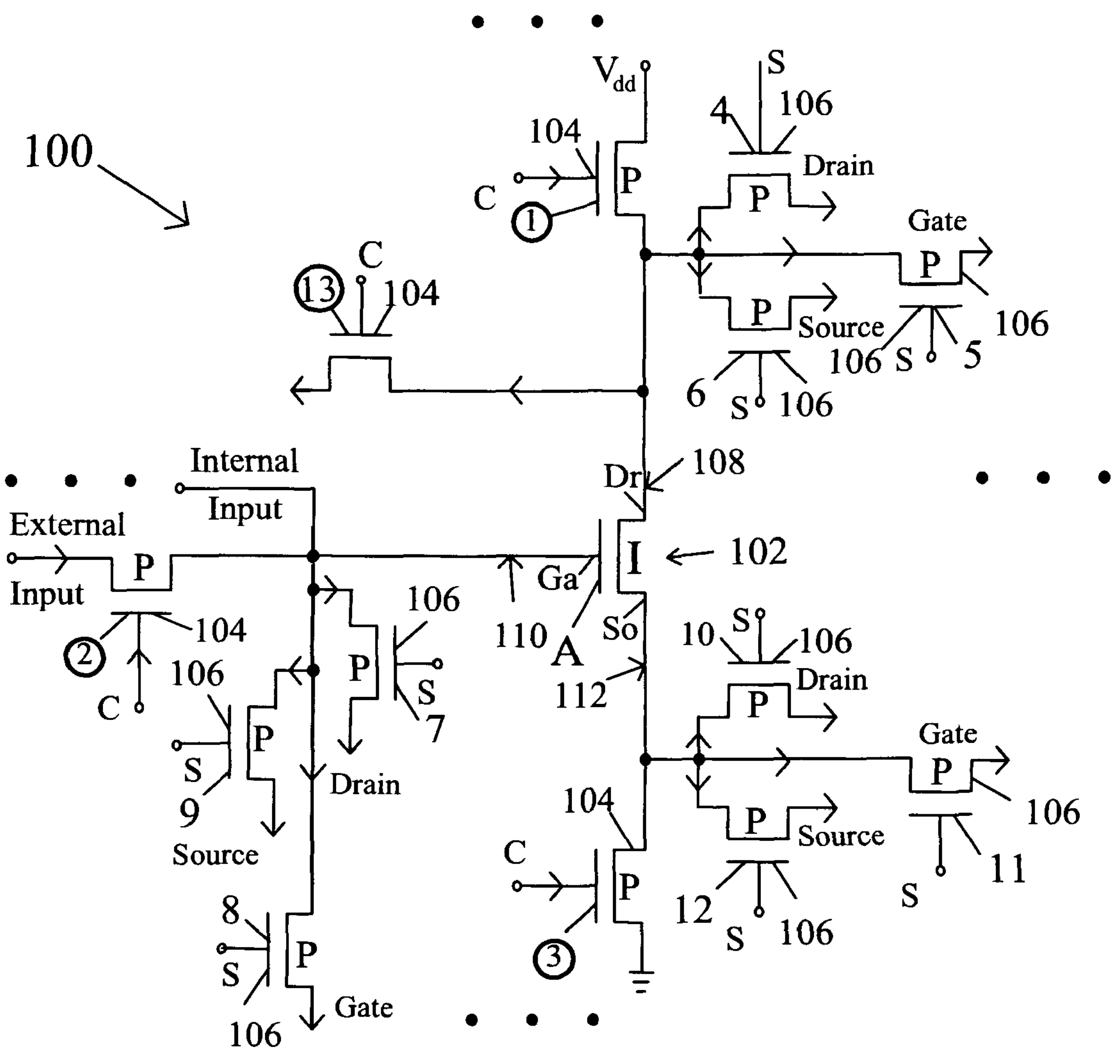

FIG. 20 (sheet 14) shows the basic Instant Logic™ circuit of FIG. 1 with an added external output CPT 104.

Figure 21:
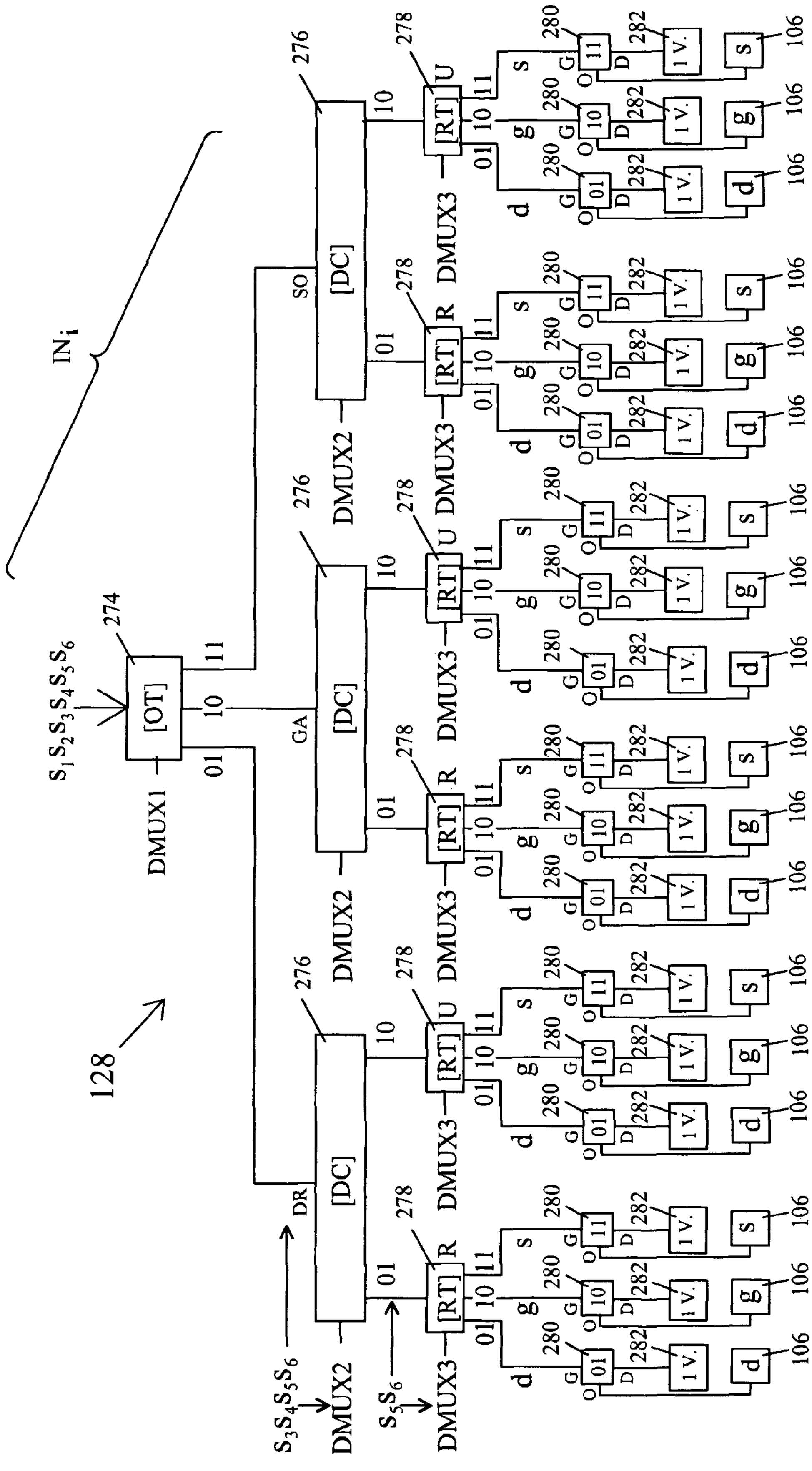

FIG. 21 (sheet 15) shows a Signal Code Selector (SCS) 128 that will operate along with either a CCS1 126 or CCS2 226 so as to convey to the CPTs 104 and SPTs 106 of the associated LN 102 in PS 100 the full "cccccssssss . . . " code, thus to accomplish the complete structuring of an LN 102.

FIG. 22 (sheet 16) is a drawing from the prior art of a simple wire.

FIG. 23 (sheet 16) shows a simple wire structured by the methods of Instant Logic™.

FIG. 24 (sheet 16) shows a BYPASS gate structured by the methods of Instant Logic™, there being no prior art to the knowledge of Applicant.

FIG. 25 (sheet 16) is a drawing of a BRANCH circuit, for which there is also no prior art, but FIG. 25 does include an instance of the BYPASS gate of FIG. 24.

FIG. 26 (sheet 16) shows the iconic representation of an inverter (NOT gate) from the prior art.

FIG. 27 (sheet 16) a circuit or transistor-level drawing of a NOT gate from the prior art.

FIG. 28 (sheet 16) shows the NOT gate of FIGS. 26, 27 structured by the methods of IL.

Figure 29:
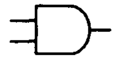

FIG. 29 (sheet 17) shows an iconic representation from the prior art of a 2-bit AND gate.

Figure 30:
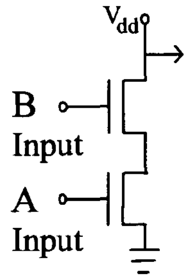

FIG. 30 (sheet 17) shows the transistor-level version from the prior art of a 2-bit AND gate.

Figure 31:
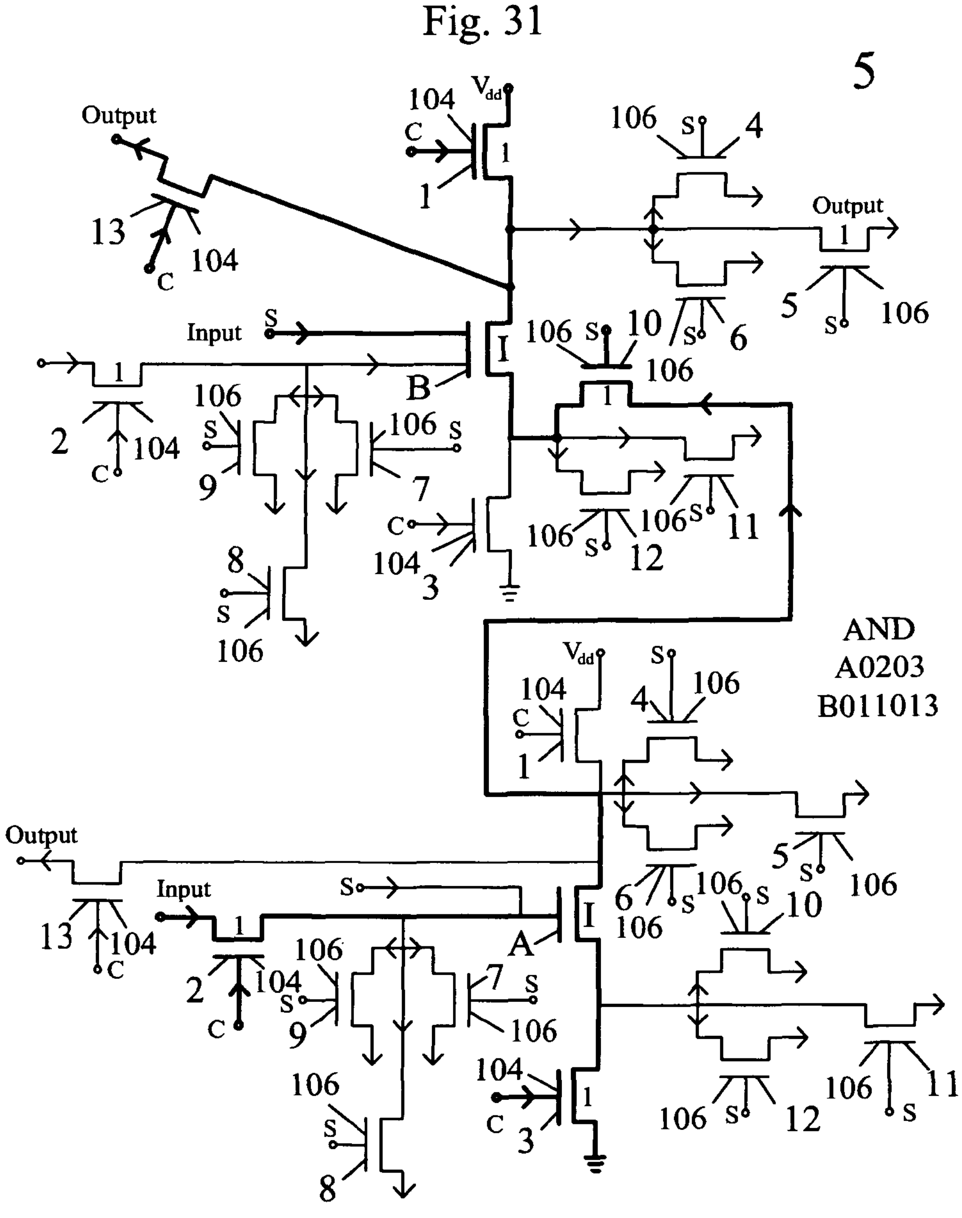

FIG. 31 (sheet 17) shows the AND gate of FIGS. 29 and 30 structured by the methods of IL.

Figures 32, 33, 34:
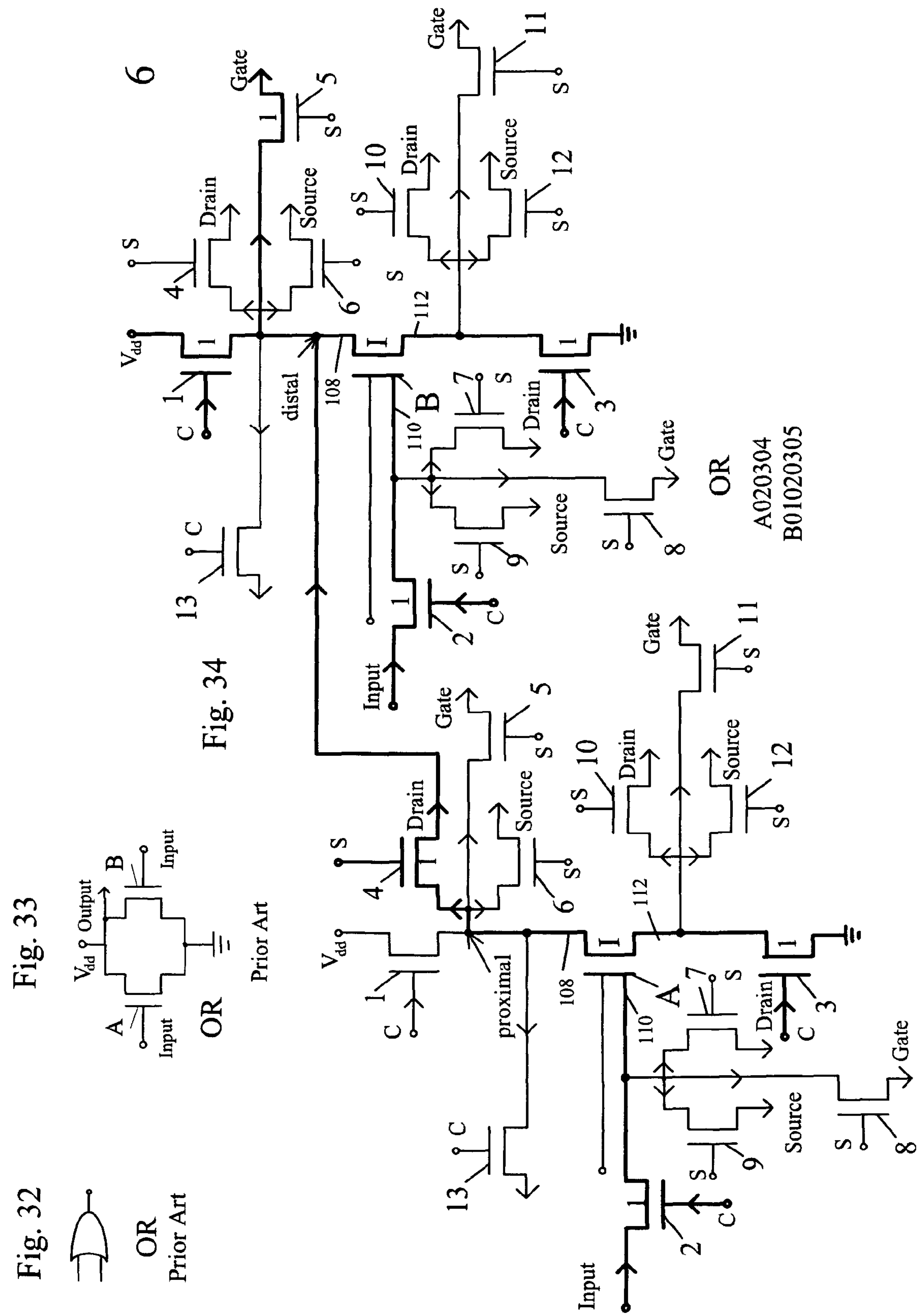

FIG. 32 (sheet 18) shows the iconic version from the prior art of a 2-input OR gate.

FIG. 33 (sheet 18) shows the transistor-level version from the prior art of a 2-input OR gate.

FIG. 34 (sheet 18) shows the 2-input OR gate of FIGS. 32, 33 structured by the methods of IL.

Figures 35, 36, 37:
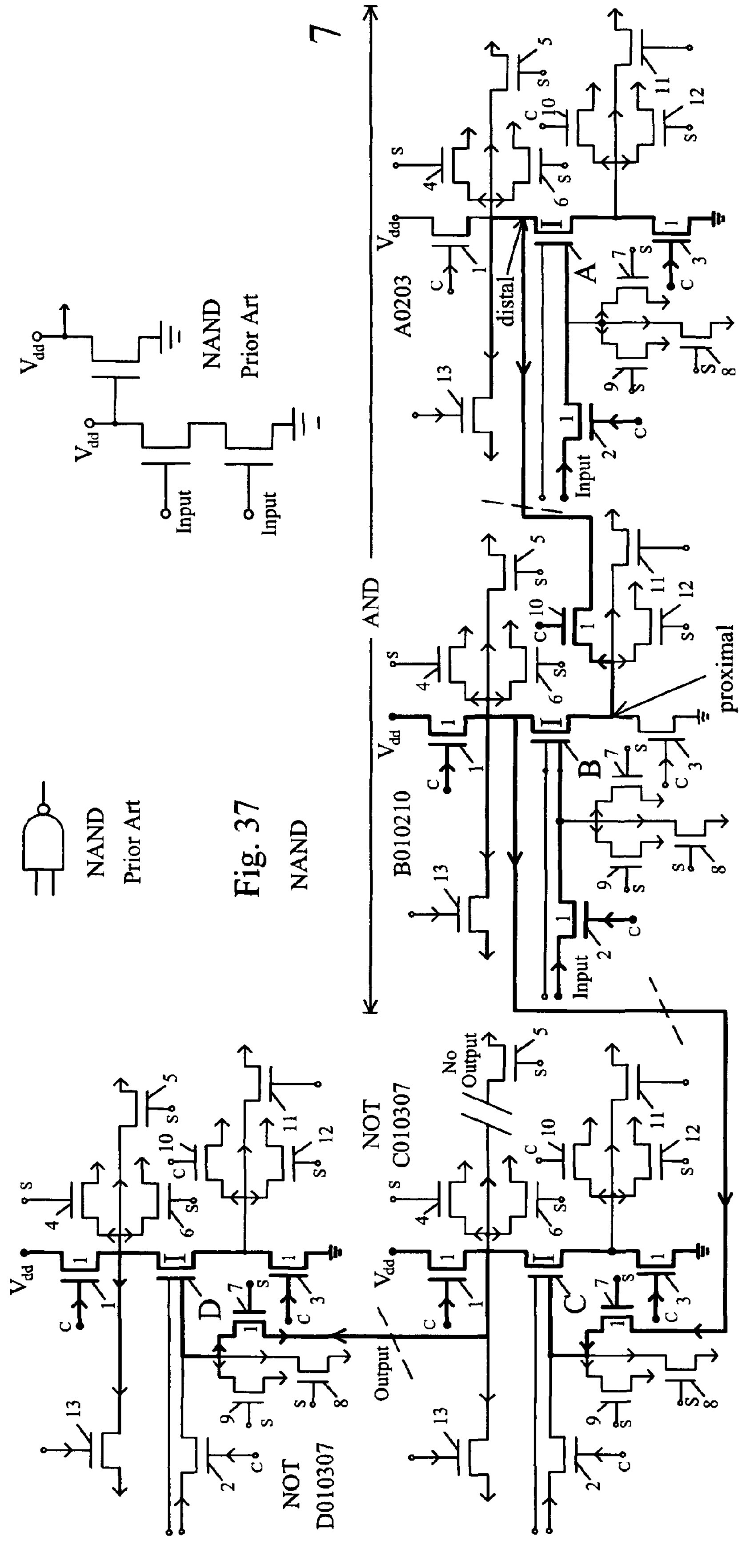

FIG. 35 (sheet 19) shows the iconic version from the prior art of a 2-input NAND gate.

FIG. 36 (sheet 19) shows a transistor level version from the prior art of the NAND gate of FIG. 35.

FIG. 37 (sheet 19) shows the three LNs 102 "A," "B," and "C" structured as the 2-input NAND (AND+NOT) gate of FIGS. 35, 36 by the methods of IL applied now in the right-to-left direction, and including a fourth "D" LN 102 to receive the output from that NAND gate.

Figure 38:
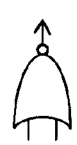

FIG. 38 (sheet 20) shows the normal iconic representation from the prior art of a 2-input NOR (OR+NOT) gate.

Figure 39:
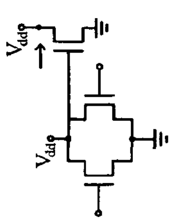

FIG. 39 (sheet 20) shows the prior art transistor level version of the NOR gate of FIG. 38.

Figure 40:
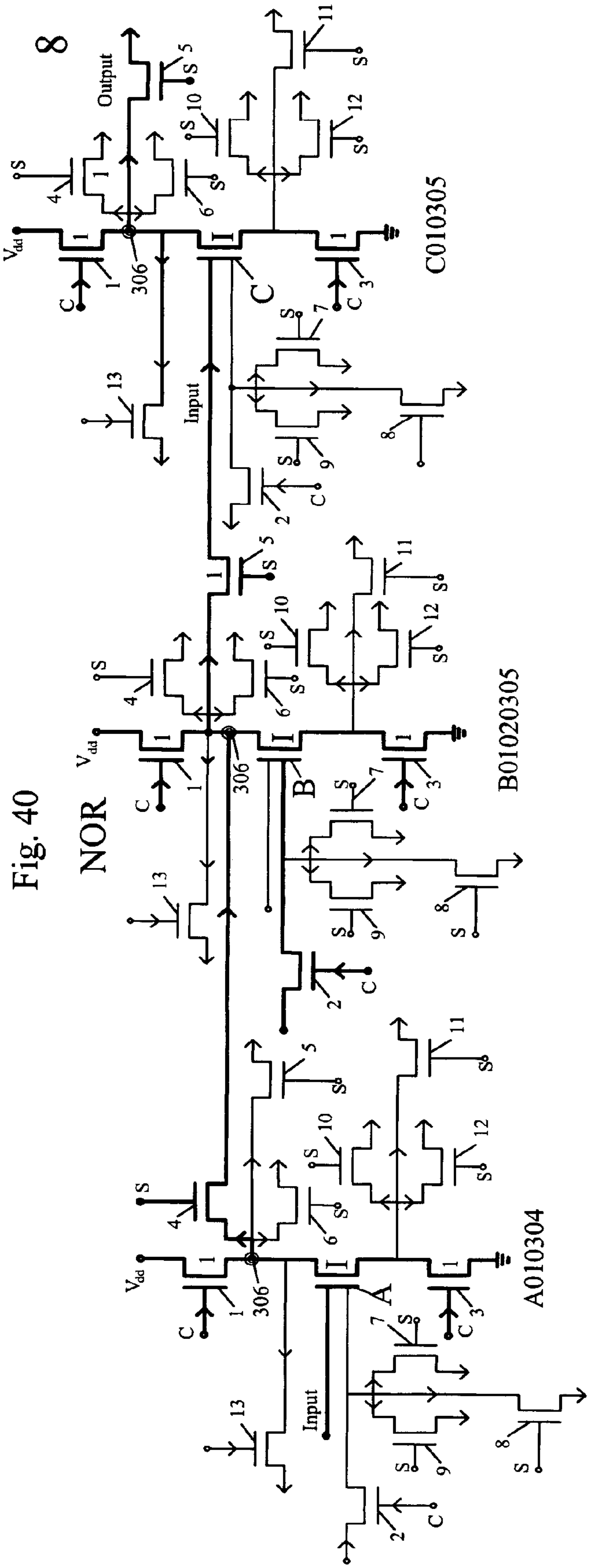

FIG. 40 (sheet 20) shows three LNs 102 structured by the methods of IL as the 2-input NOR (OR+NOT) gate of FIGS. 38, 39

Figure 41:
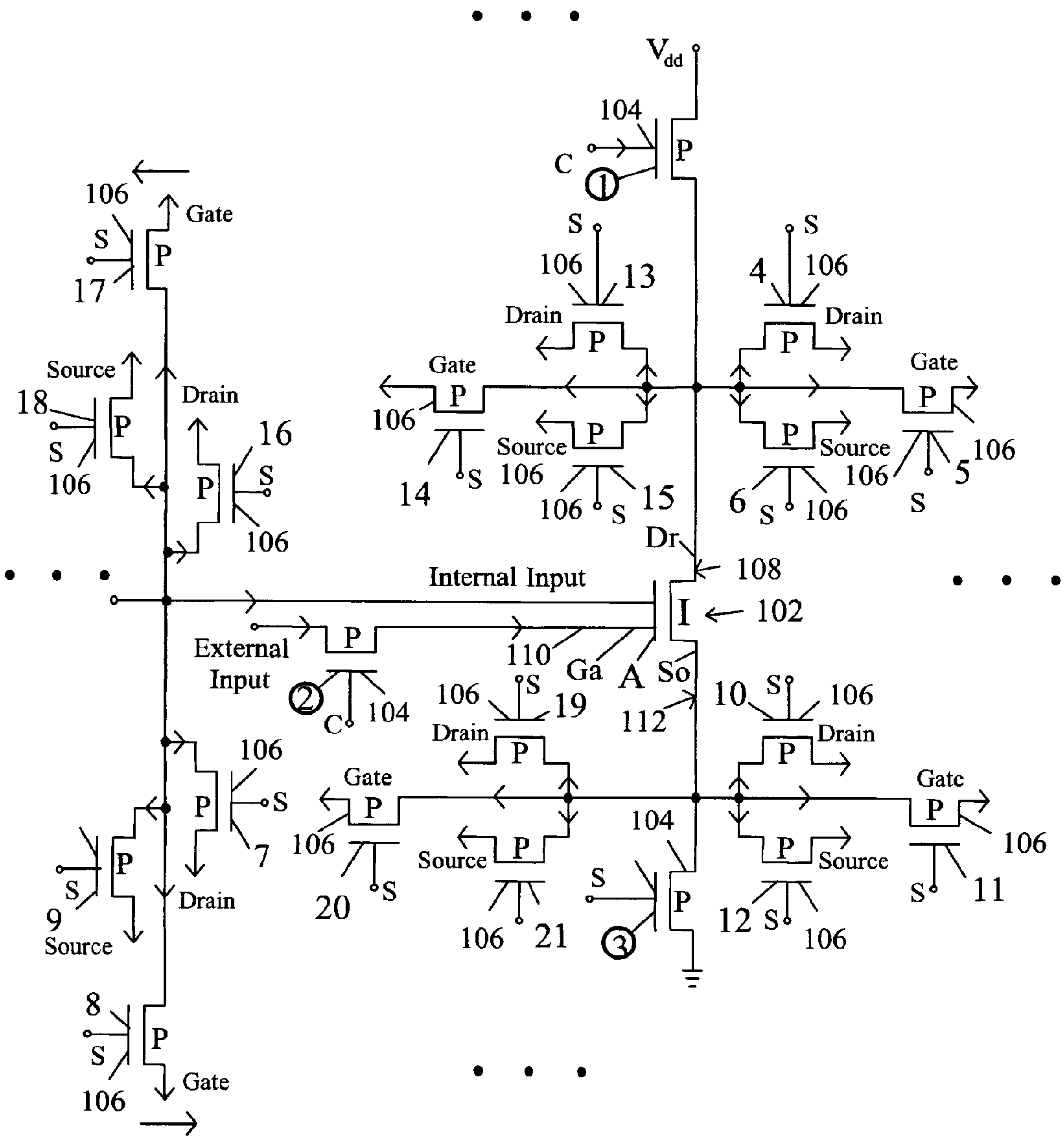

FIG. 41 (sheet 21) shows a "double-sided" version of the basic IL circuit of FIG. 1 in which SPTs 106 are seen to extend to the left and downward as well as to the right and upward.

Figure 42:
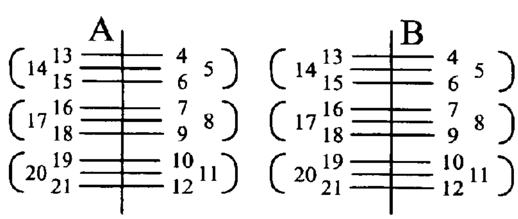

FIG. 42 (sheet 21) shows a single line representation of two of the double-sided versions of the basic IL circuit of FIG. 41 facing each other.

Figure 43:
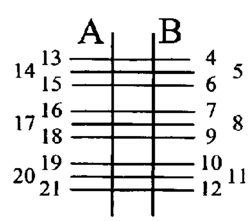

FIG. 43 (sheet 21) shows the two circuits of FIG. 42 having been interconnected.

Figure 44:
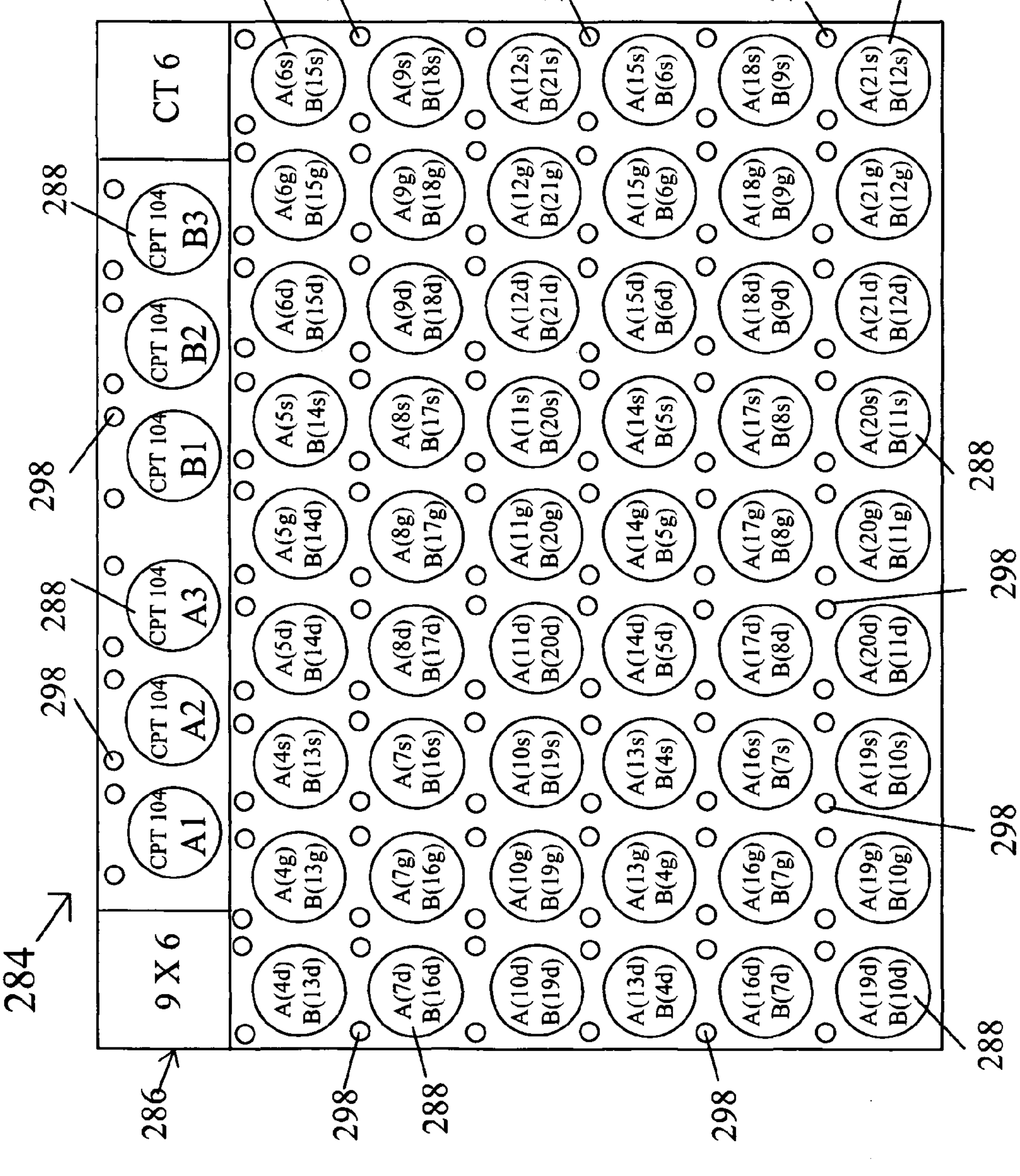

FIG. 44 (sheet 22) shows a front plan view of a circuit tester by which IL circuits can be structured using an array of push buttons.

Figure 45:
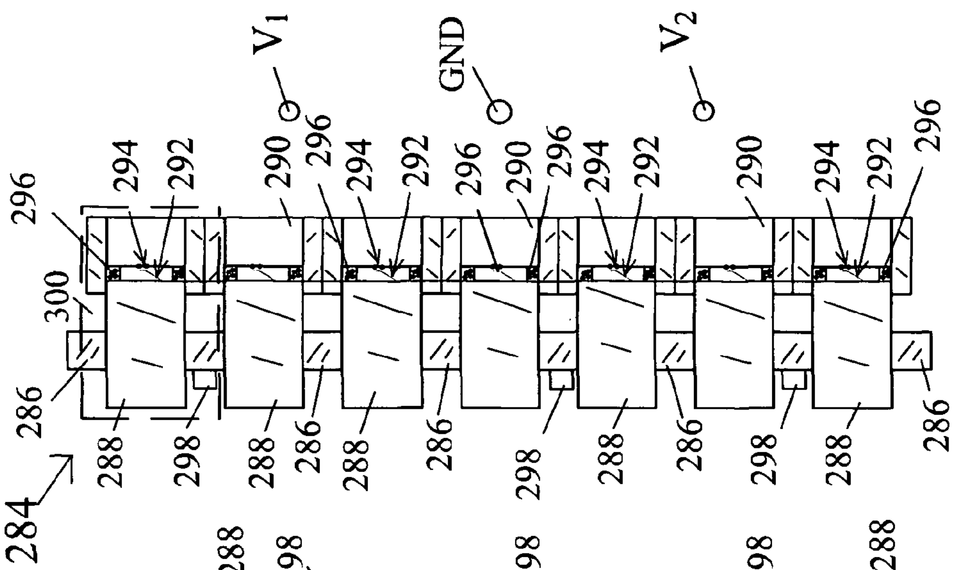

FIG. 45 (sheet 22) shows a side elevation view of the circuit tester of FIG. 44.

Figure 46:
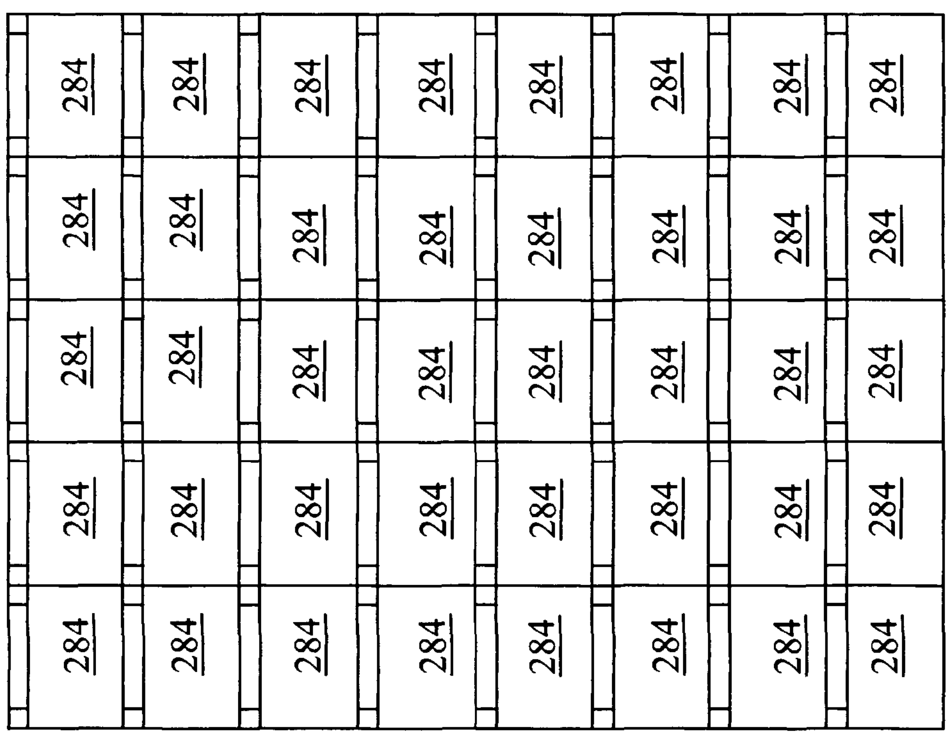

FIG. 46 (sheet 23) shows an array of 40 duplicates of the circuit tester of FIG. 44.

Figure 47:
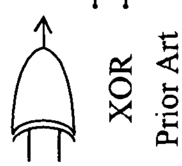

FIG. 47 (sheet 23) shows the general iconic version from the prior art of an XOR gate.

Figure 48:
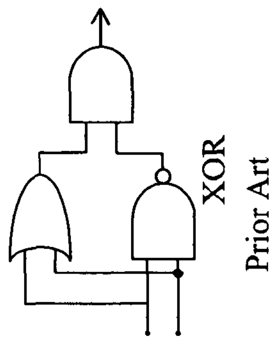

FIG. 48 (sheet 23) shows from the prior art an iconic form of the XOR gate of FIG. 47 in a particular construction that shows the OR, NAND and AND gates that are subcircuits of that XOR gate.

Figure 49:
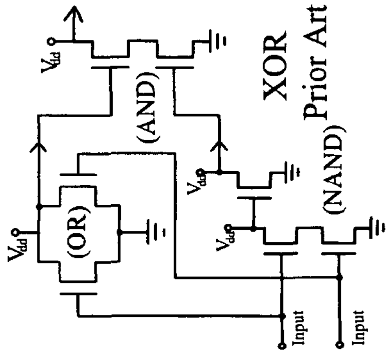

FIG. 49 (sheet 23) shows from the prior art a transistor level version of the XOR gate of FIGS. 47, 48.

Figure 50:
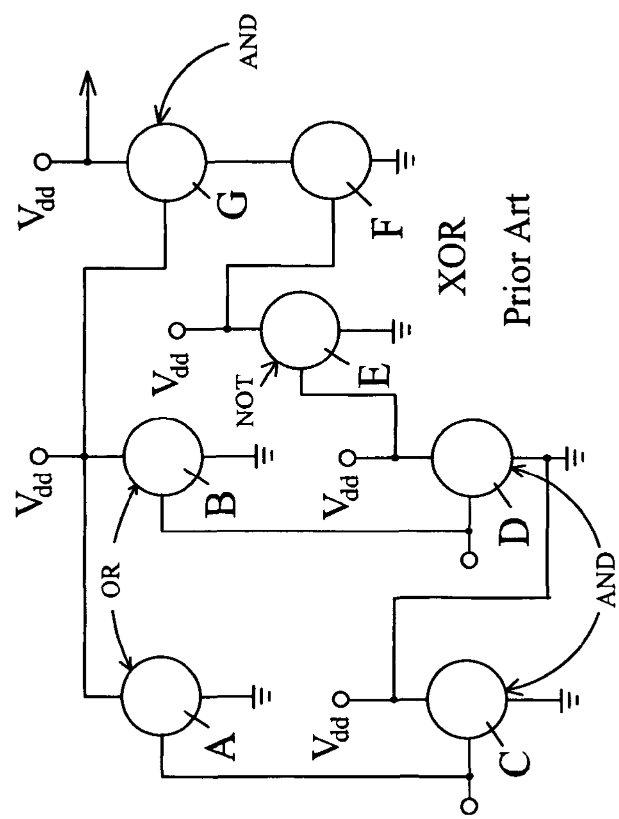

FIG. 50 (sheet 23) shows a simplified circuit drawing of the XOR gate of FIGS. 47-49 from the prior art.

Figure 51:
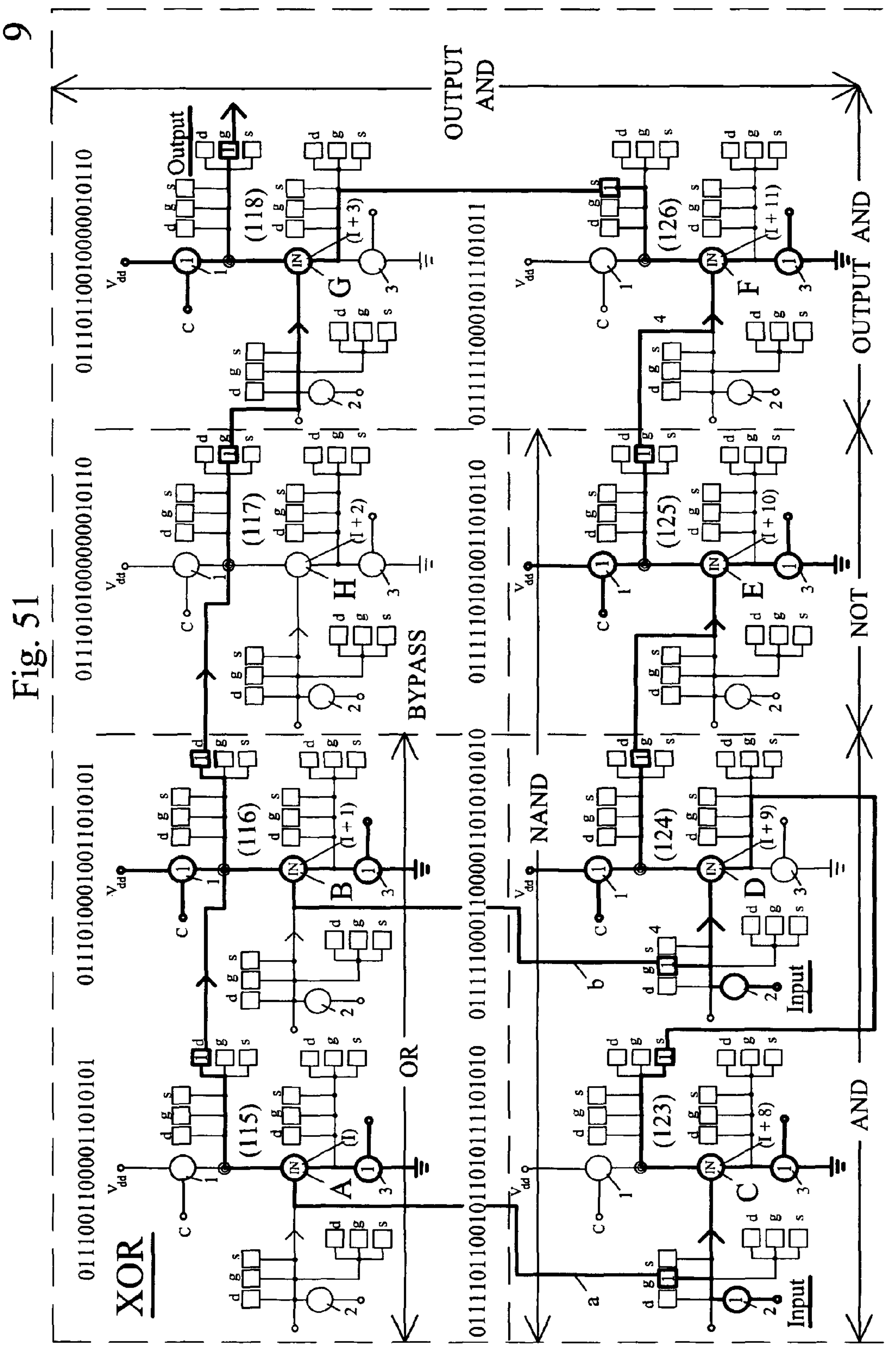

FIG. 51 (sheet 24) shows an IL-structured version of the XOR gate of FIGS. 47-50 based on the template of FIG. 2 and using only external inputs.

Figure 52:
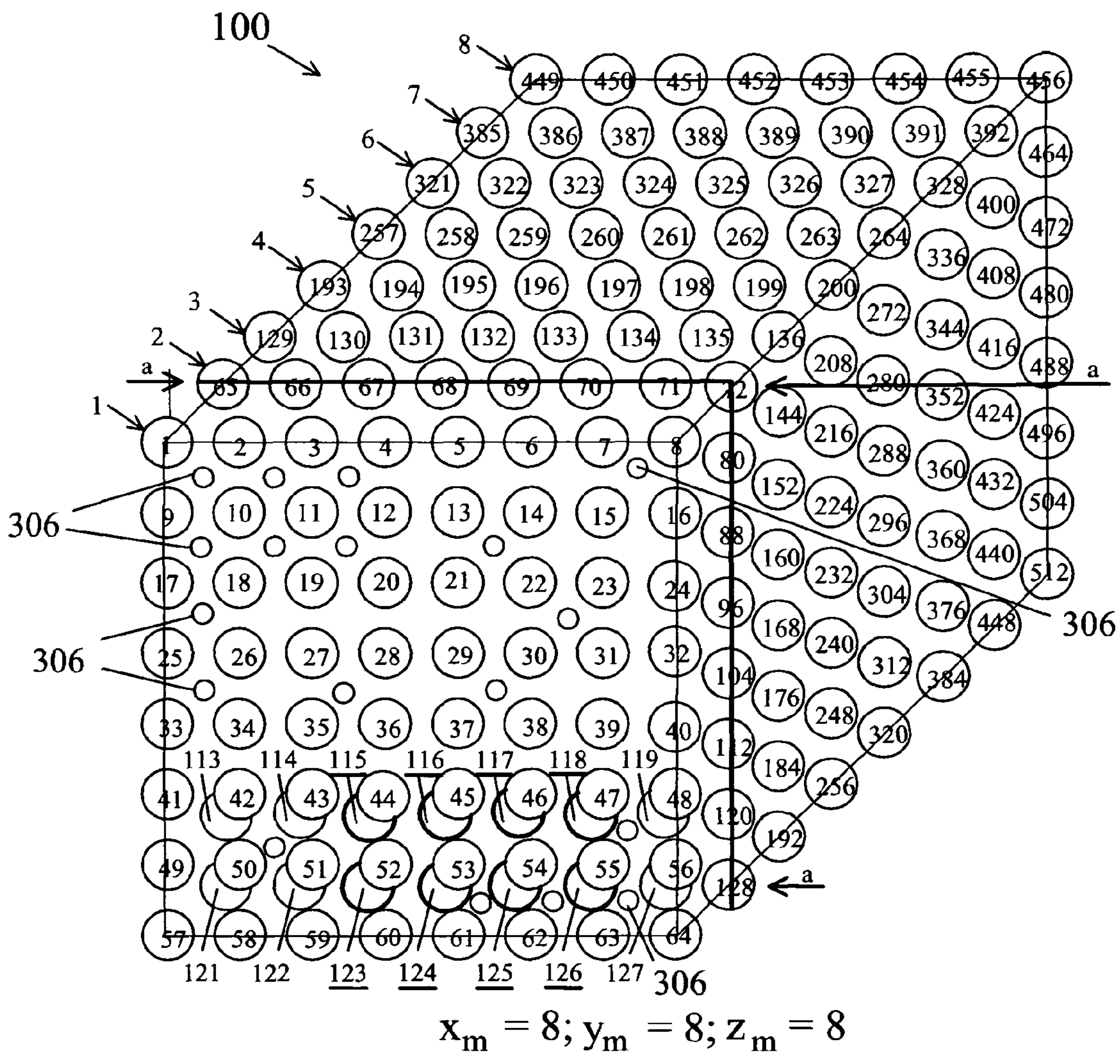

FIG. 52 (sheet 25) shows an 8×8×8 PS 100 showing the $LI_i$ numbers of the visible LNs 102, also marked to indicate the location of the XOR gate of FIGS. 47-51.

Figure 53:
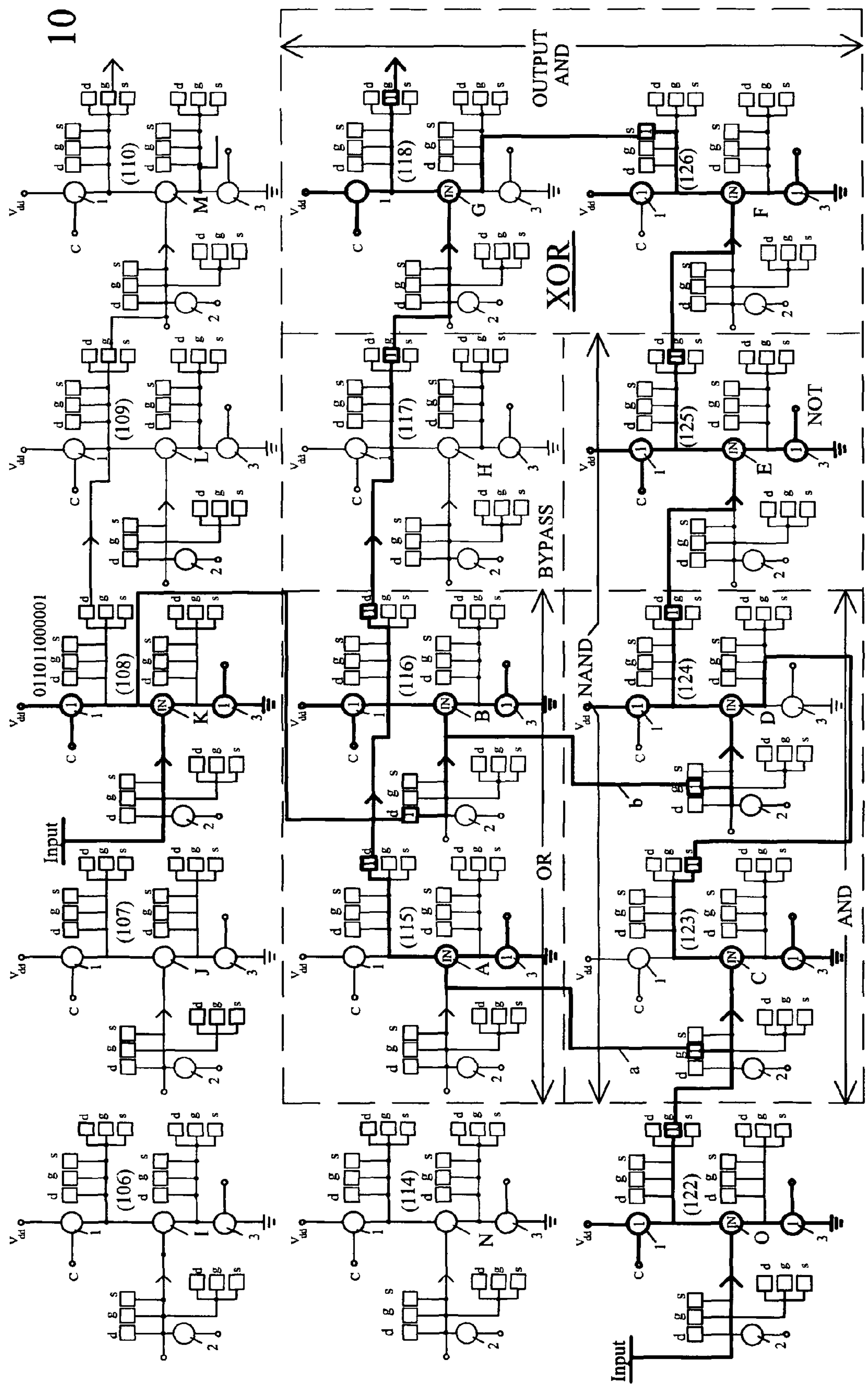

FIG. 53 (sheet 26) again shows the IL-structured version of the XOR gate of FIG. 51, but in this case using only inputs from within the PS 100.

Figure 54:
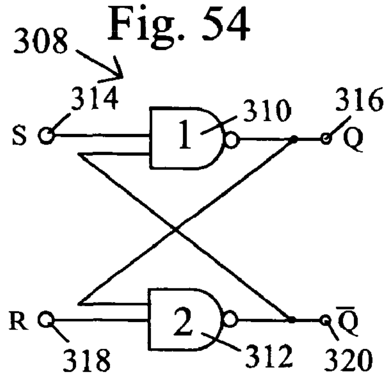

FIG. 54 (sheet 27) shows the usual manner in the prior art of representing a gate level version of a simple latch, wherein the two NAND gates thereof both point from left to right.

Figure 55:
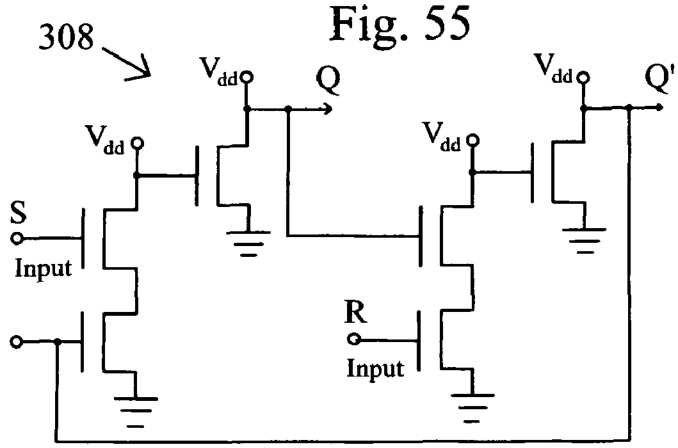

FIG. 55 (sheet 27) shows a transistor level drawing of the latch of FIG. 54 showing the use of six transistors.

Figure 56:
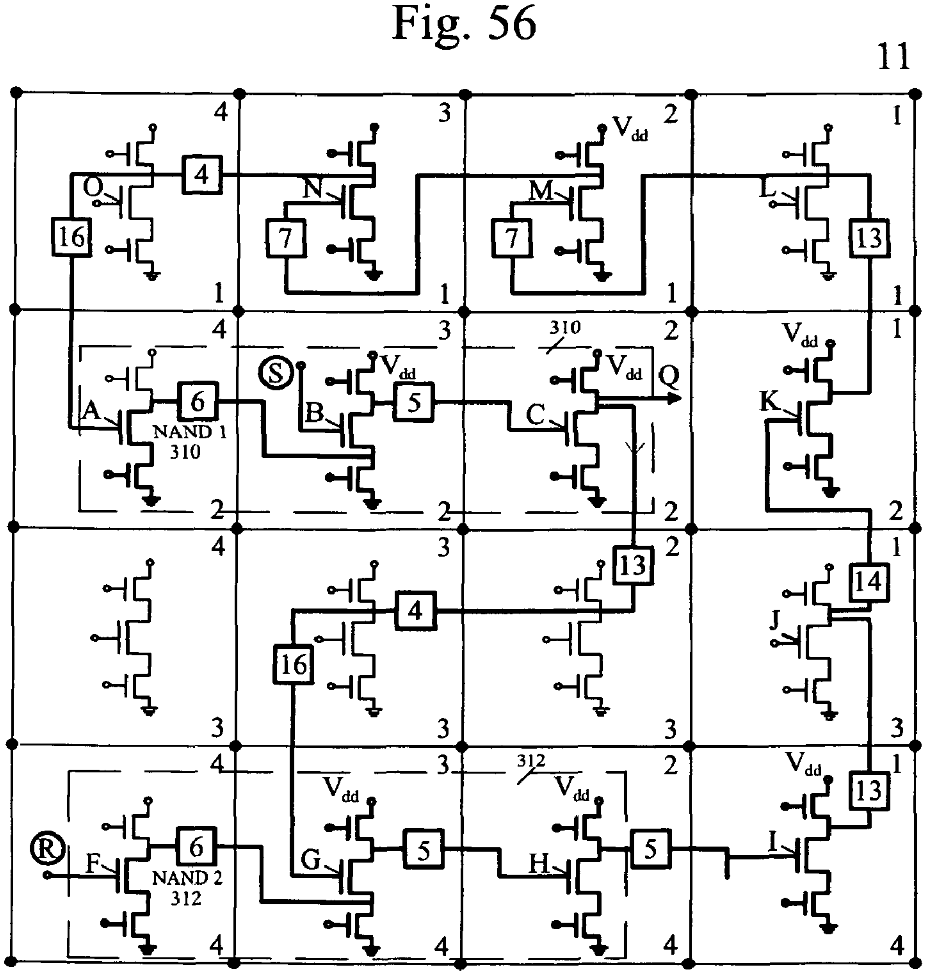

FIG. 56 (sheet 27) shows an IL-structured version of the latch of FIG. 54, based on the usual manner of representing the latch as shown in FIG. 54 and that requires the use of 18, or 12 additional, LNs 102.

Figure 57:
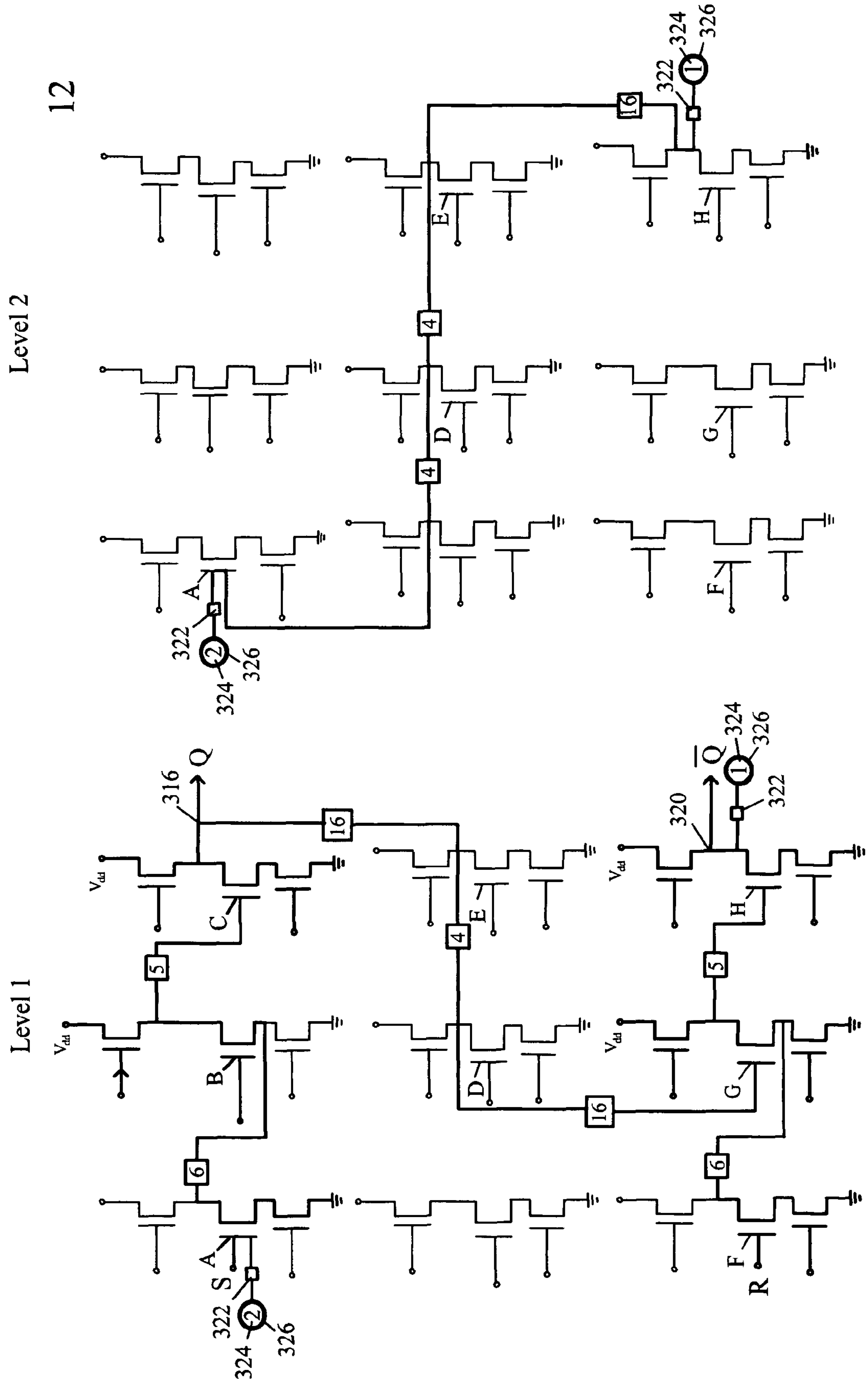

FIG. 57 (sheet 28) shows an IL-structured version of the latch of FIG. 56 but to which a third dimension (i.e., a second, upward layer) has been added that in this case requires the use of only five additional LNs 102 rather than the 12 of FIG. 56.

Figure 58:
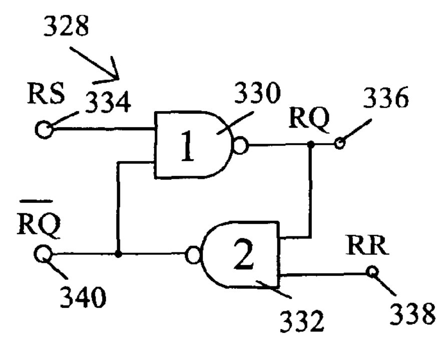

FIG. 58 (sheet 29) shows an alternative manner of representing the prior art latch of FIGS. 54, 55 in which the direction of one of the NAND gates has been reversed.

Figure 59:
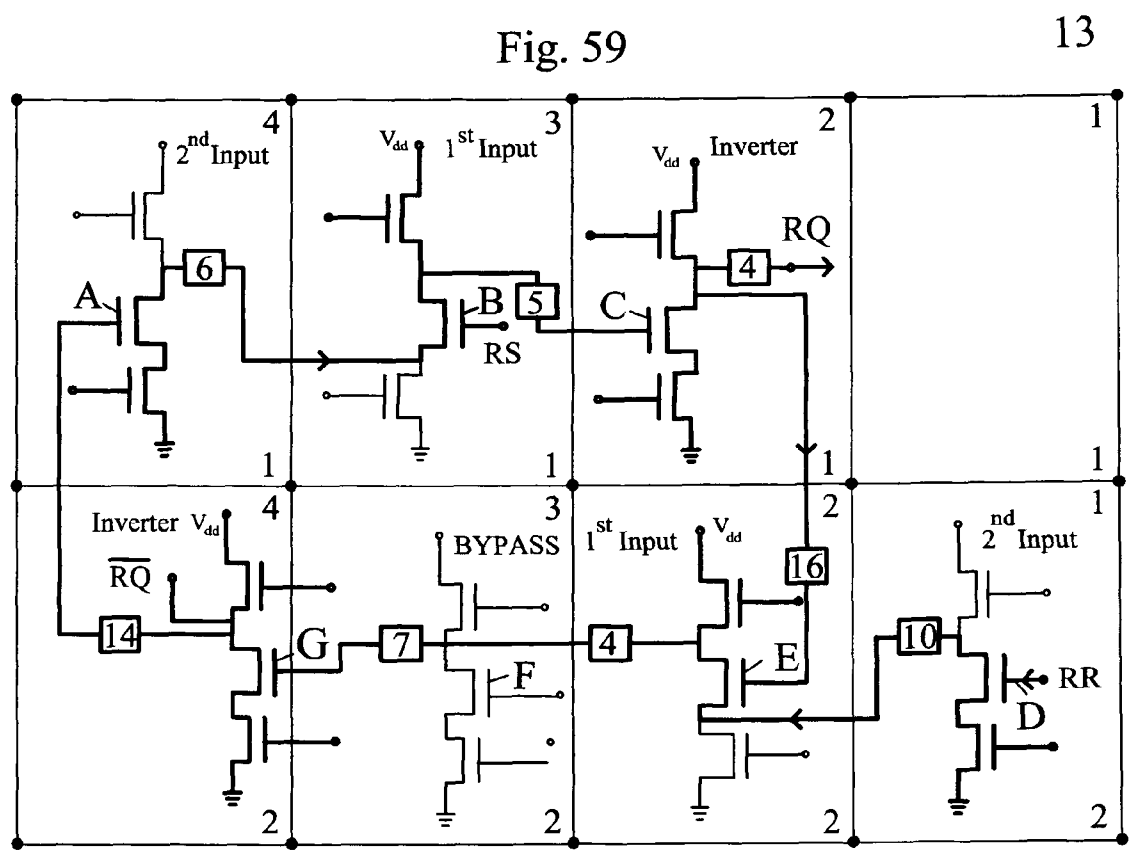

FIG. 59 (sheet 29) shows an IL-structured version of the latch of FIG. 58 that effects that reversal of direction and also shifts the lower NAND gate over one position, that with those changes requires no additional LNs 102 beyond the six transistors of FIG. 55.

Figure 60:
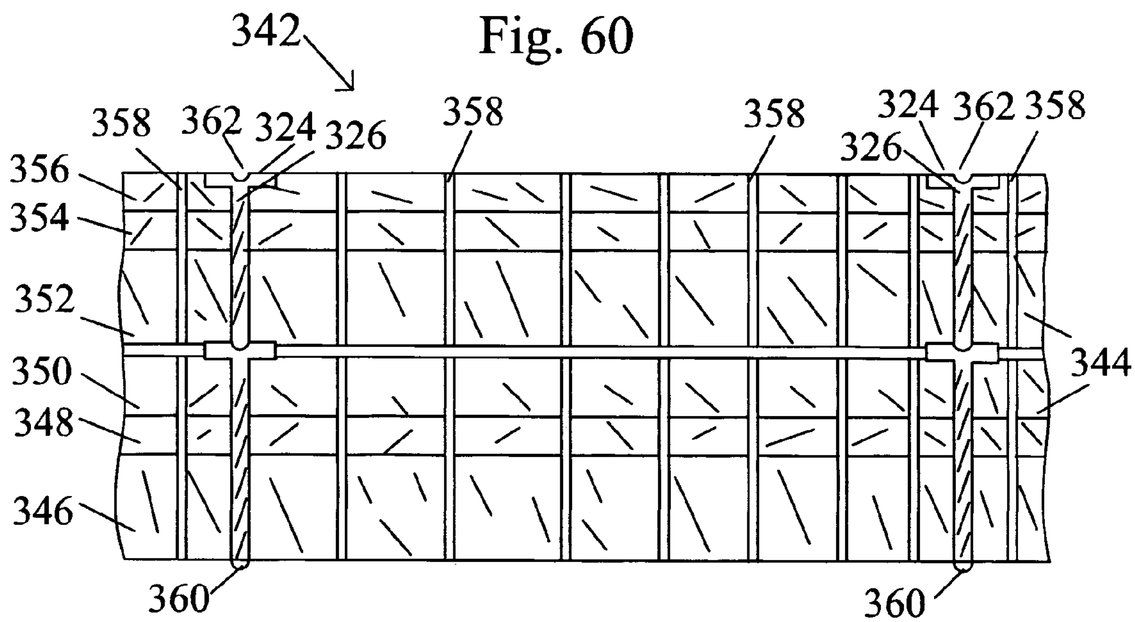

FIG. 60 (sheet 30) shows a vertical cross-section of two three layer ICs joined by posts to make up two levels.

Figure 61:
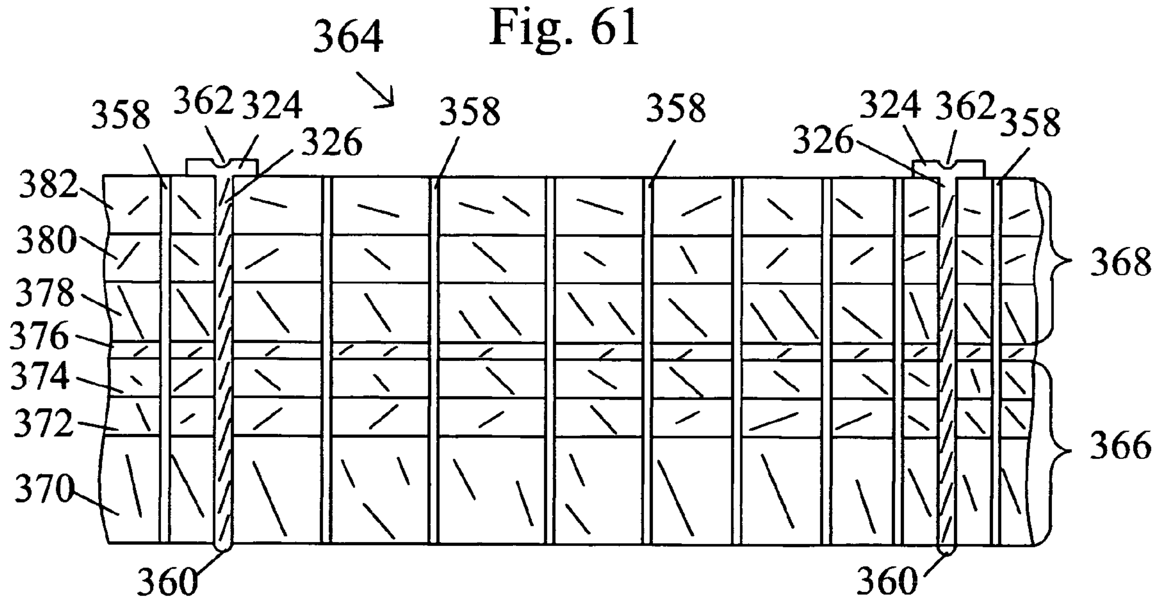

FIG. 61 (sheet 30) shows a vertical cross-section of a unitary seven layer, two level IC.

FIGS. 62*a* (sheet 31*a*) and 62*b* (sheet 31*b*) respectively show the layout for making connections between the DR 108, GA 110, and SO 112 terminals of an LN 102 and the 1, 2, and 3 CPTs 104, also including an interconnect IPT, plate, and post for access to a second level of each terminal used for the SPTs 106, and the layout for connecting those terminals of that LN 102 to the terminals of adjacent LNs 102 through those SPTs 106.

Figure 62:
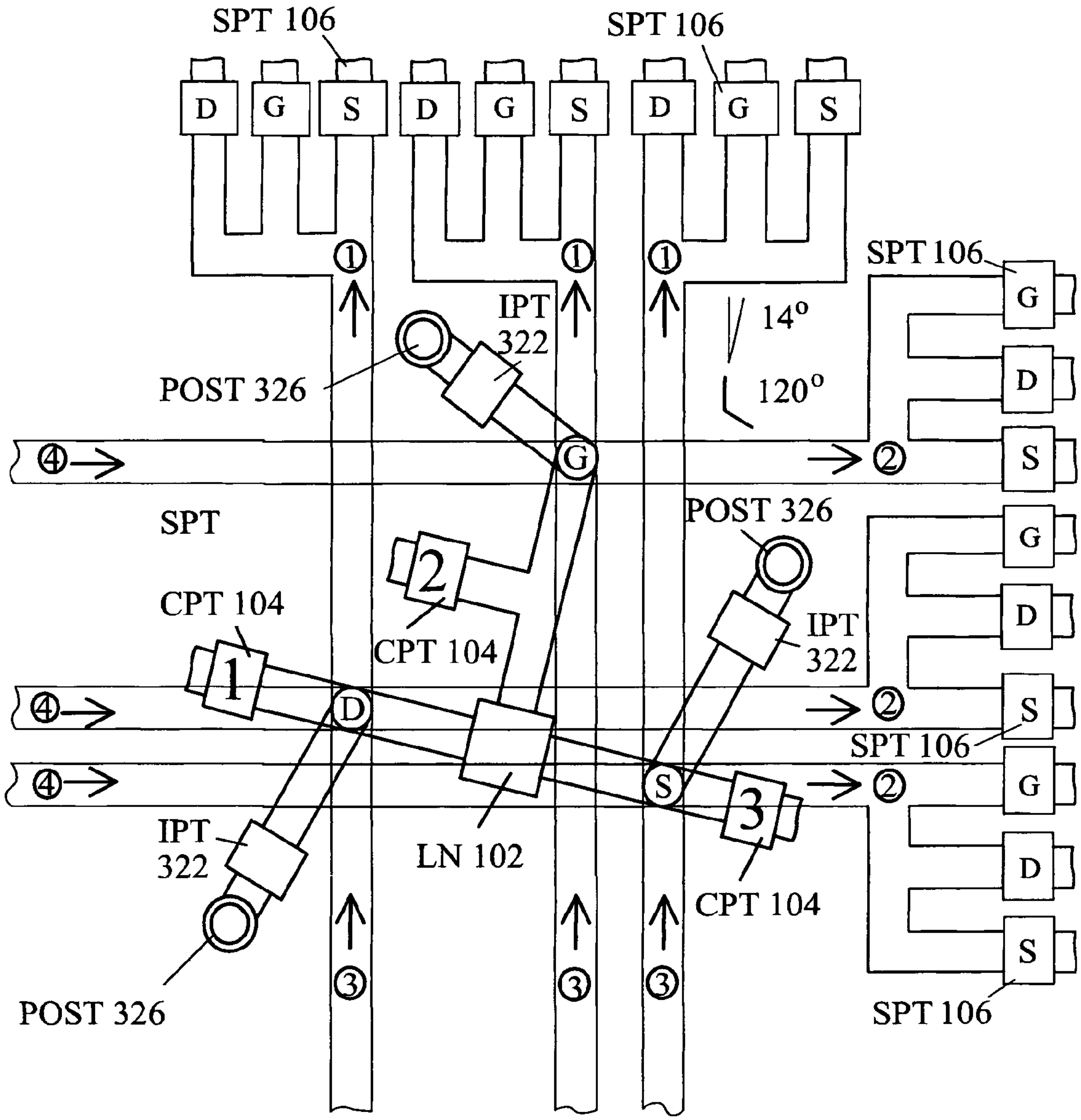
Figure 63A:
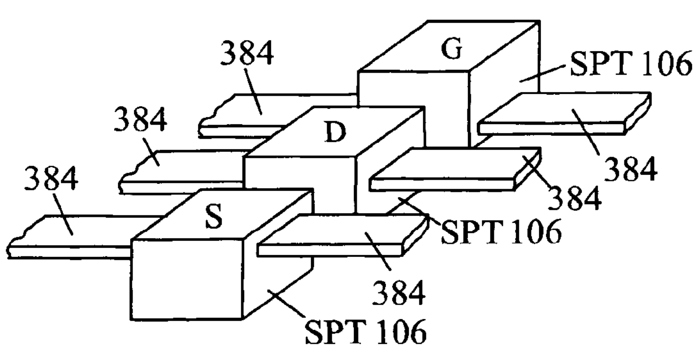

FIGS. 63*a* (sheet 31*a*) and 63*b* (sheet 31*b*) show perspective views of the SPTs 106 in the structure of FIG. 62*a*, showing how the signal paths from the SPTs 106 of FIG. 62*a* then follow pathways through different layers to the three different destination terminals of a next LN 102 in the respective horizontal and vertical directions.

Figure 64:
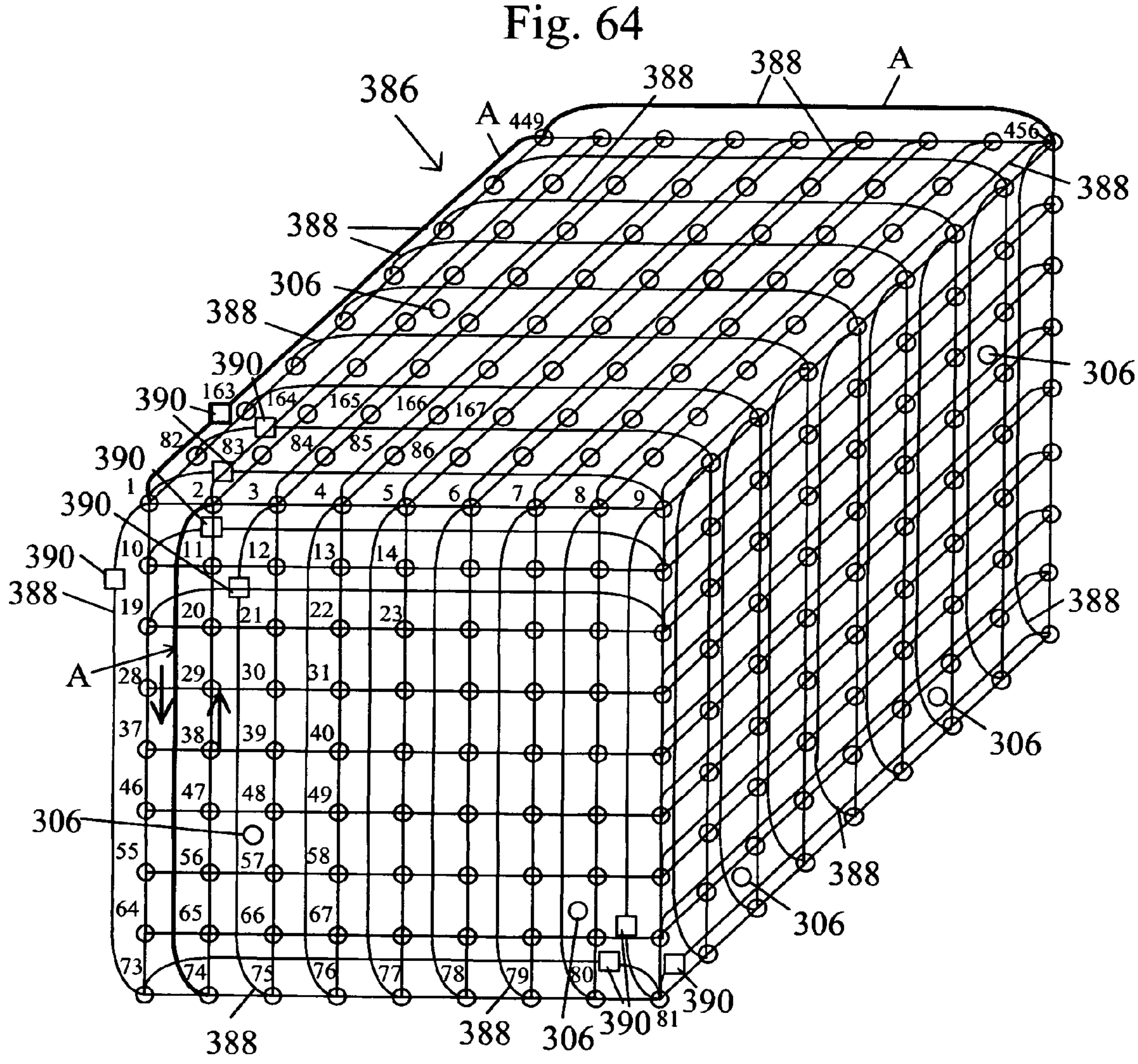

FIG. 64 (sheet 32) shows a 9×9×9 cubic manifold array (CMA) 386 with the manifold lines thereof and some of the manifold enabling PTs also depicted.

Figure 65:
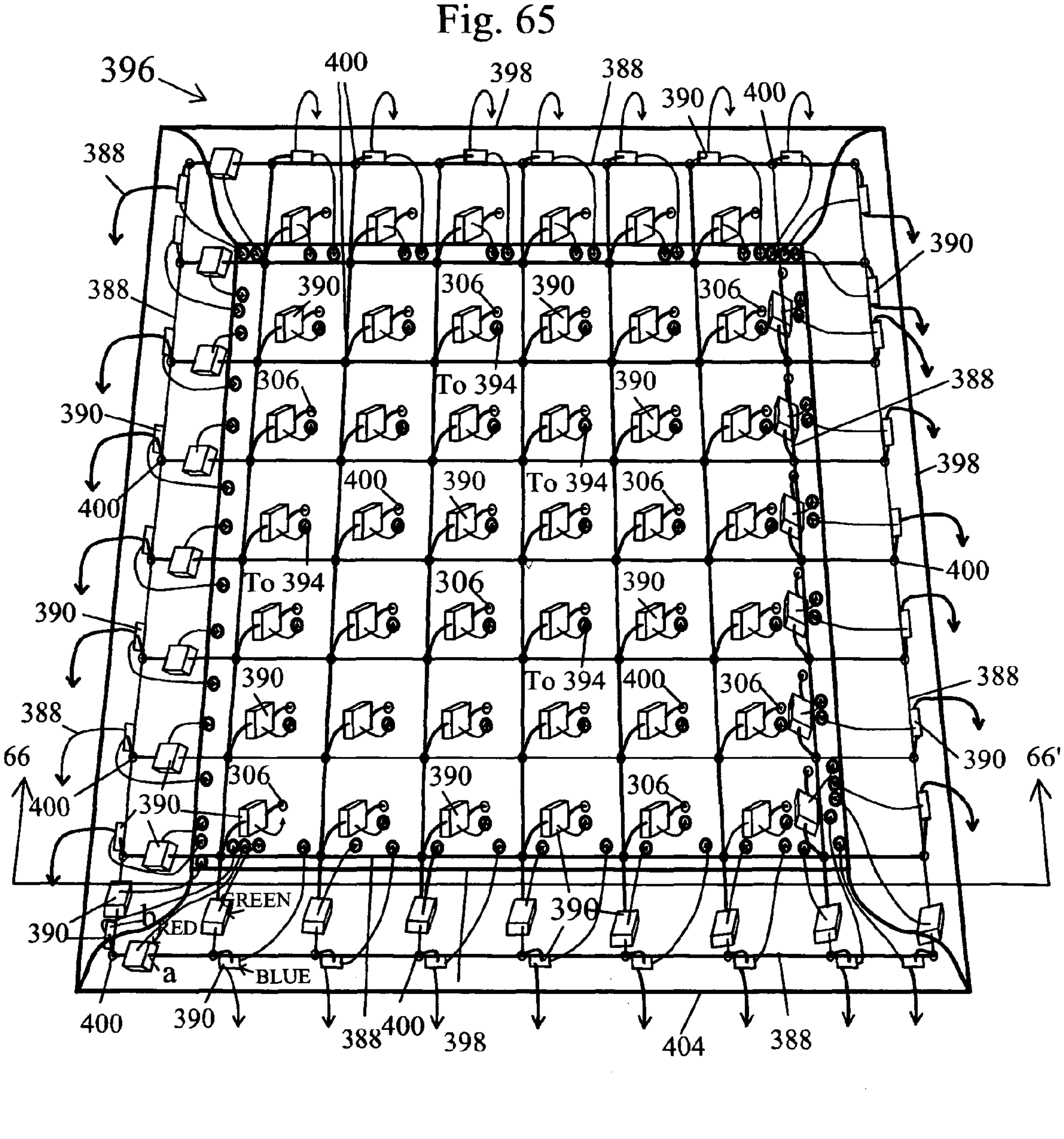

FIG. 65 (sheet 33) is a perspective drawing of a "Wrap-around Cap" (or "Wrap Cap") (WC) 396 by which manifold lines are connected to the DR 108 terminals of LNs 102 on the surfaces of a 3-D manifold array.

Figures 66, 67, 68:
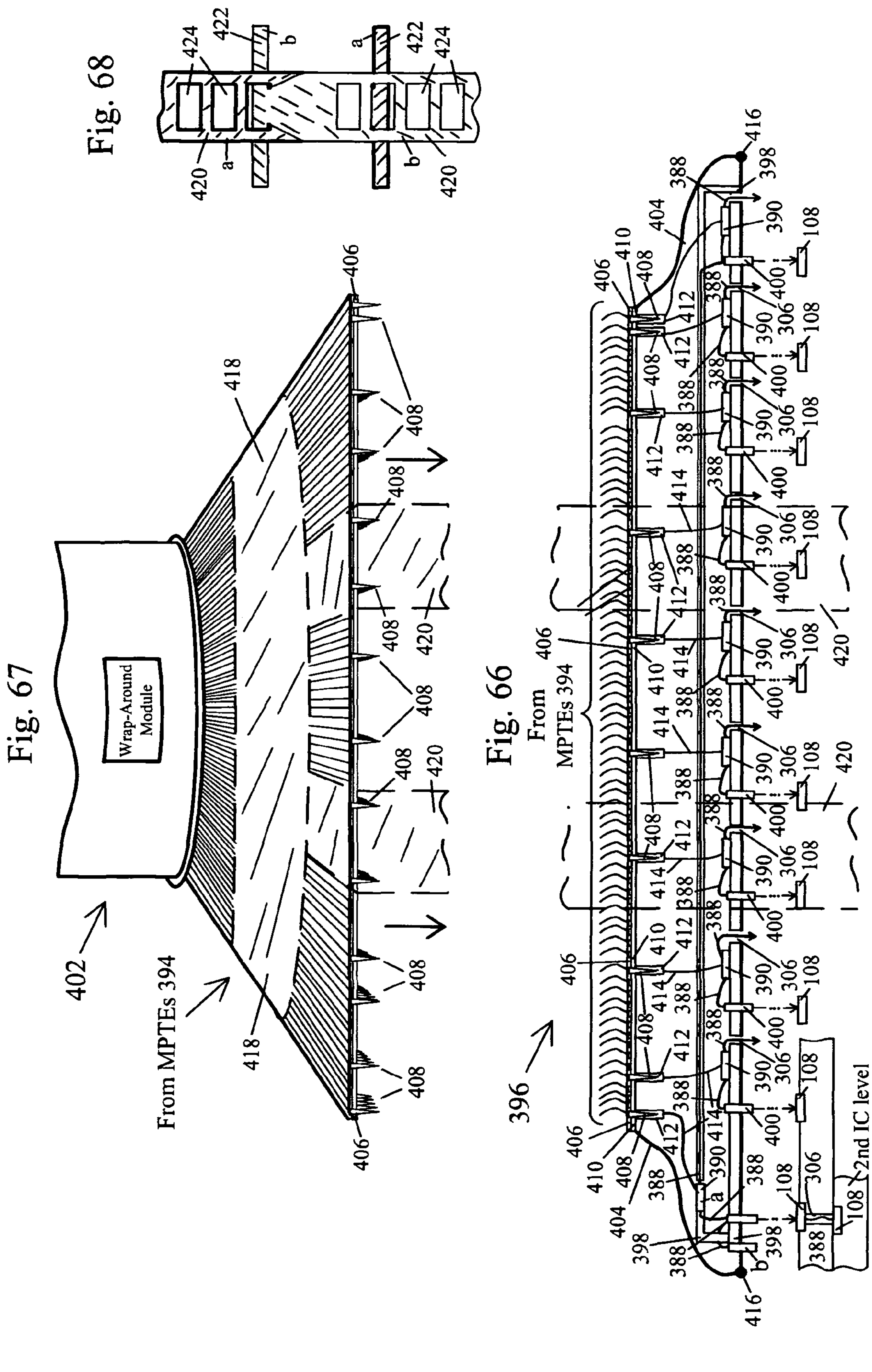

FIG. 66 (sheet 34) is cutaway side elevation view of the WC 396 of FIG. 65 showing the manner of making contact to the outward-facing DR 108 terminals in a CMA 386.

FIG. 67 (sheet 34) is a side elevation view of a wrap cap cover and attached cable by which external connection is made to the CMA 386.

FIG. 68 (sheet 34) shows the interconnection of two of the straps of FIGS. 66, 67 that have come together from opposite sides of the CMA on which wrap caps have been installed, demonstrating the means for adjusting the tension in those straps.

Figure 69:
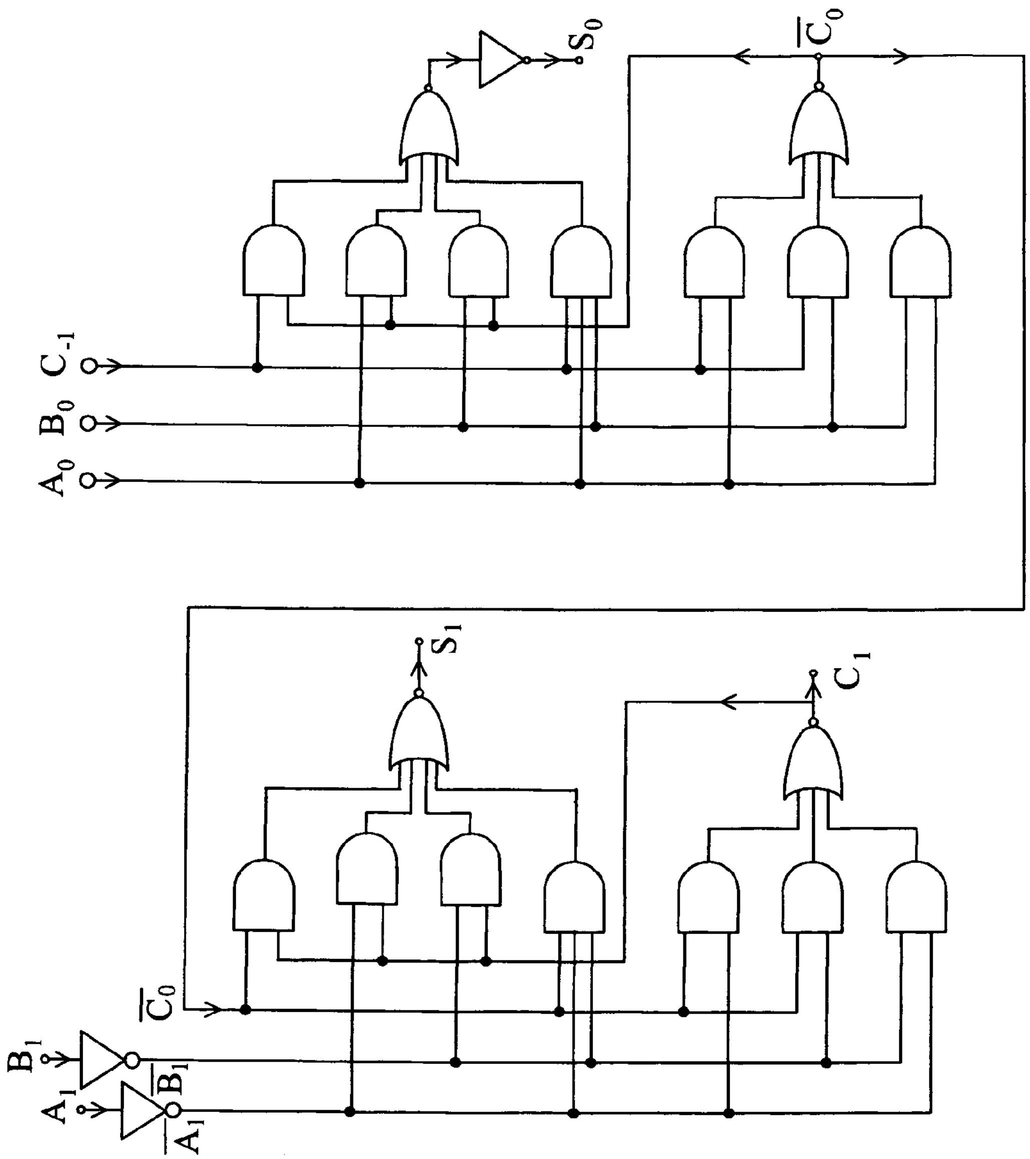

FIG. 69 (sheet 35) is a gate level version of an ADD gate from the prior art of a particular construction that includes two half-adders.

Figure 70:
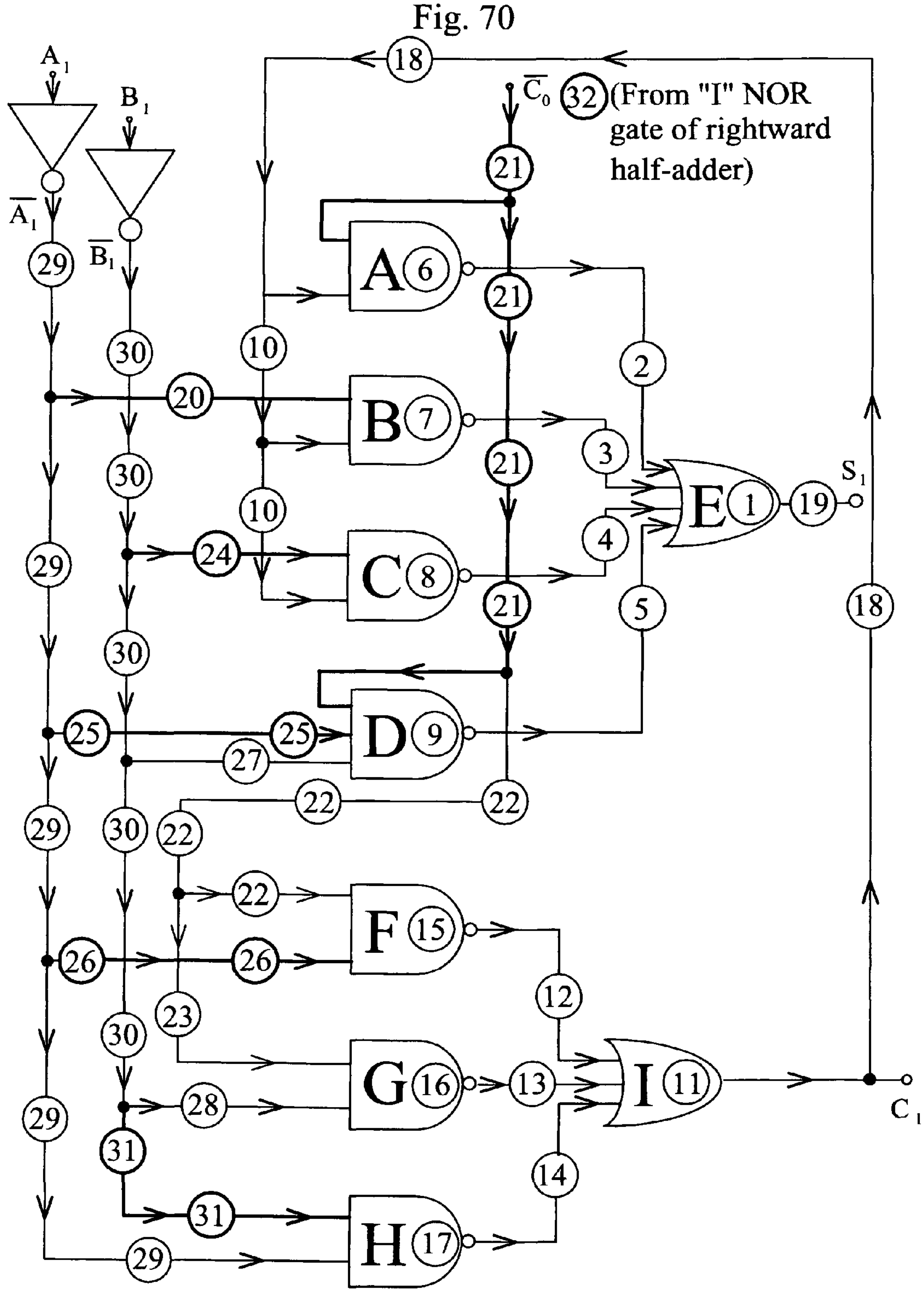

FIG. 70 (sheet 36) is a modified iconic version of the leftward half-adder in the ADD circuit of FIG. 69 that shows the connecting lines in two different styles that identify the IC level in which structured, also including numeric labels on the lines that indicate the order in which the lines were structured, wherein also the output of the 3-bit NOR gate is placed in a location that was necessary for the structuring process that is different from that shown in FIG. 69 but is yet an electronic equivalent.

Figure 71:
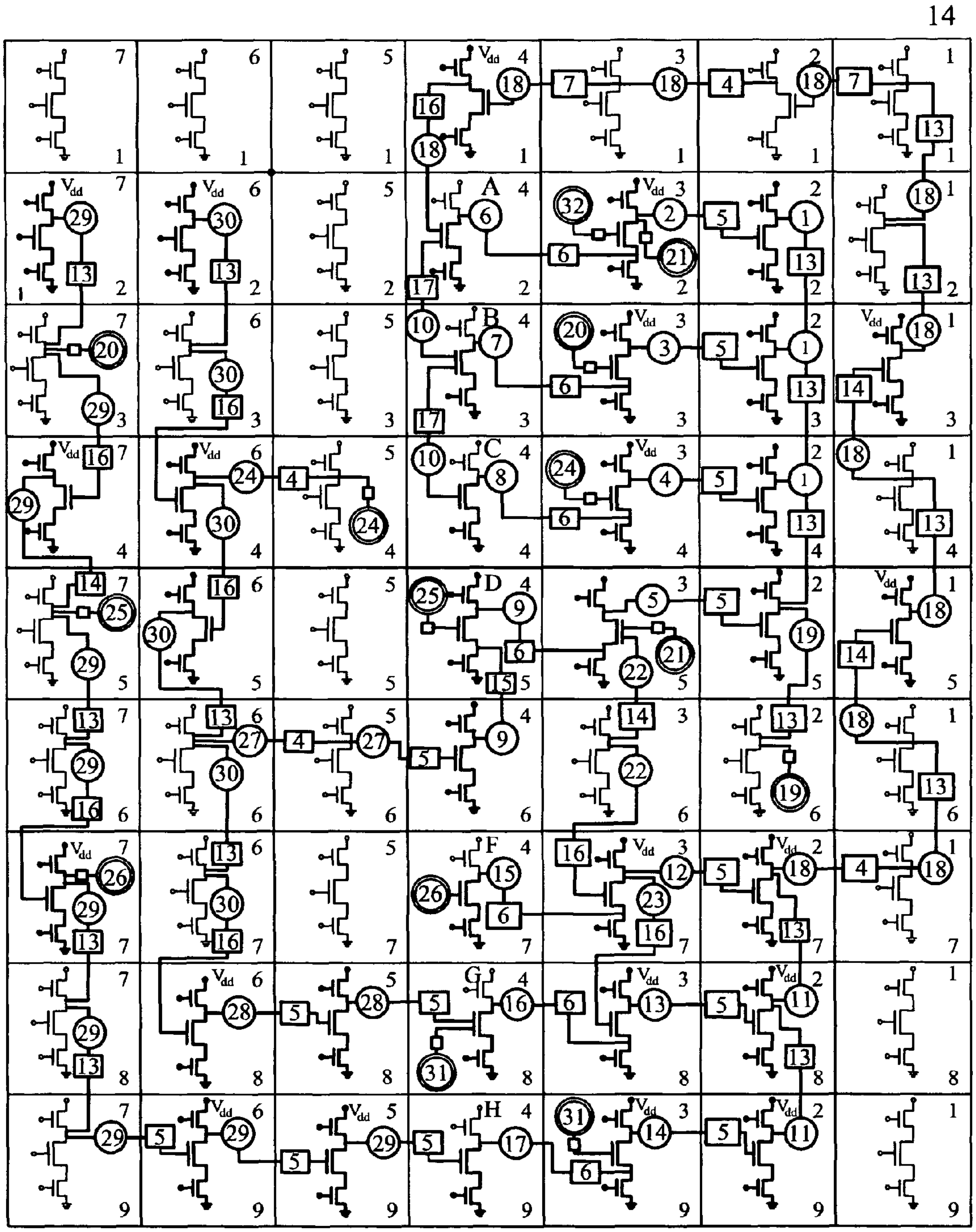

FIG. 71 (sheet 37) shows the lower level portion of an IL structuring of the leftward half-adder of FIG. 69.

Figure 72:
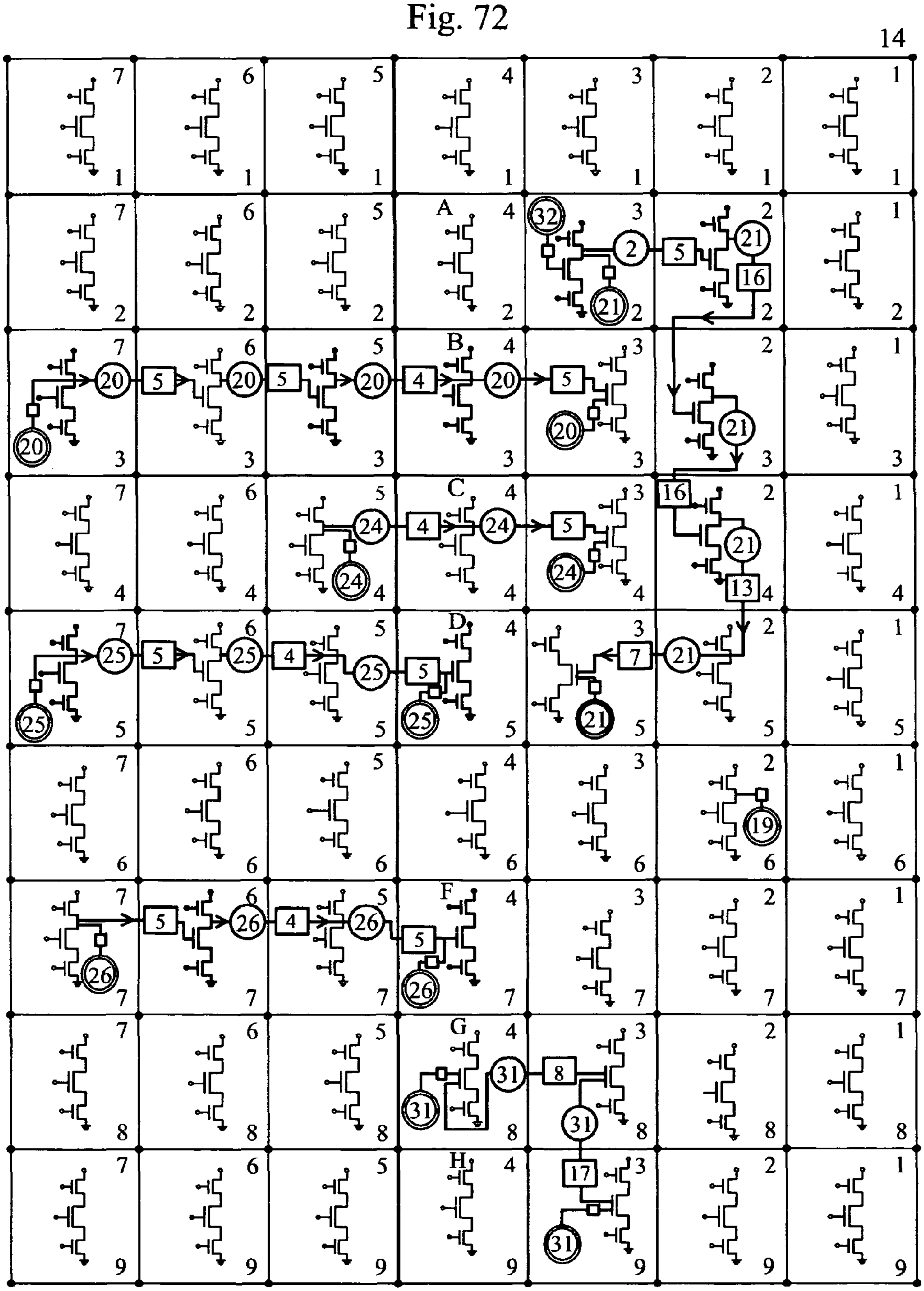

FIG. 72 (sheet 38) shows a corresponding upper level portion of the IL structuring of the leftward half-adder of FIG. 69.

Figure 73:
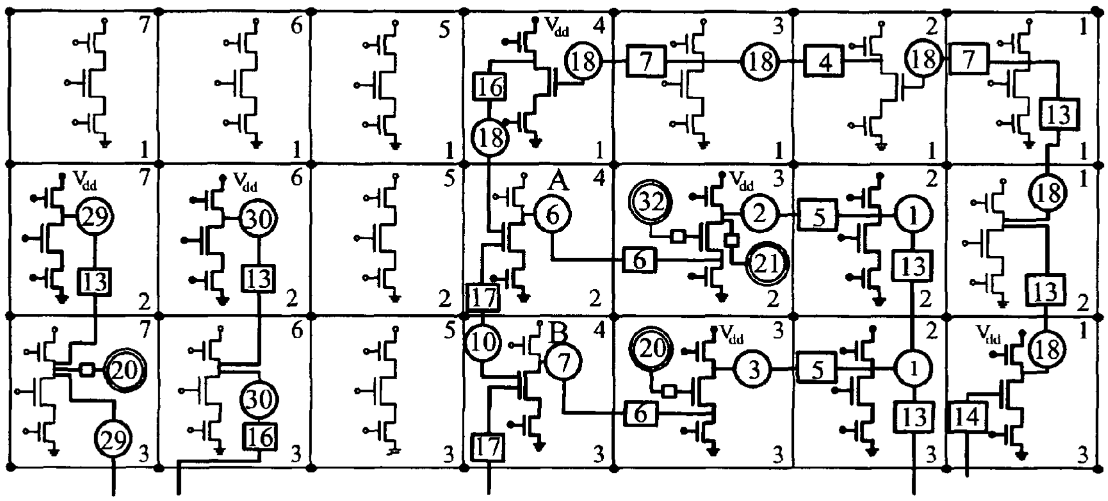

FIG. 73 (sheet 39) shows the IL-structured drawing of so much of the first level of the leftward half-adder of FIG. 69 (i.e., the top three rows) as is needed to show the installation of a first post 32 that will ultimately be connected through to the second level of the rightward half-adder.

Figure 74:
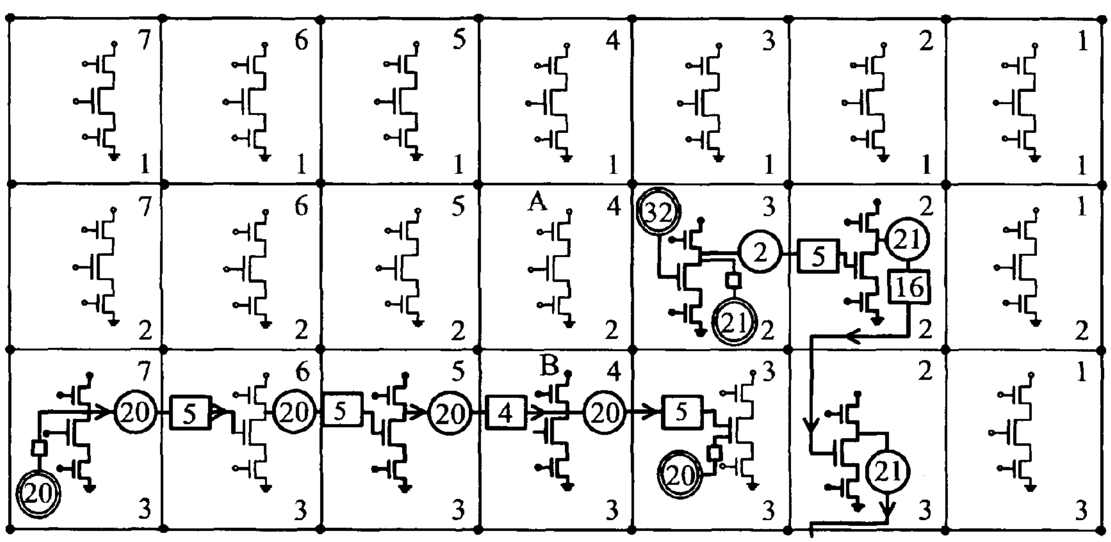

FIG. 74 (sheet 39) is similarly an IL-structured drawing of so much of the second level of that leftward half-adder (again the top three rows) as will show the top of that first post 32 that had been installed in the lower level thereof as shown in FIG. 73.

Figure 75:
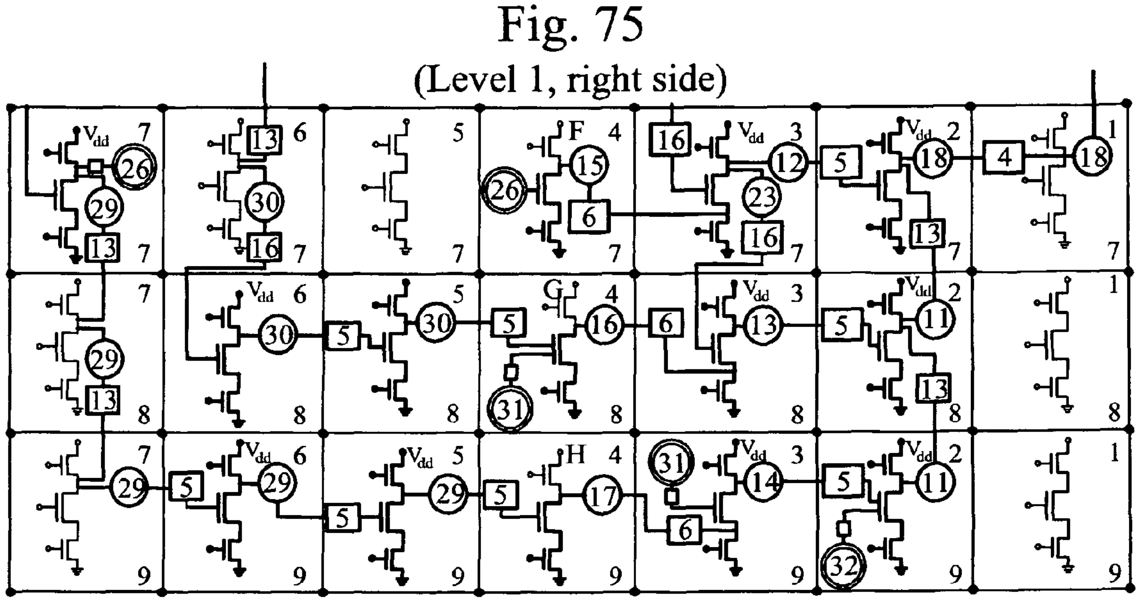

FIG. 75 (sheet 40) shows the IL-structured drawing of so much of the first level of the rightward half-adder of FIG. 69 (i.e., the bottom three rows) as is needed to show the installation of a second post 32 that will ultimately be connected through to the second level of the leftward half-adder.

Figure 76:
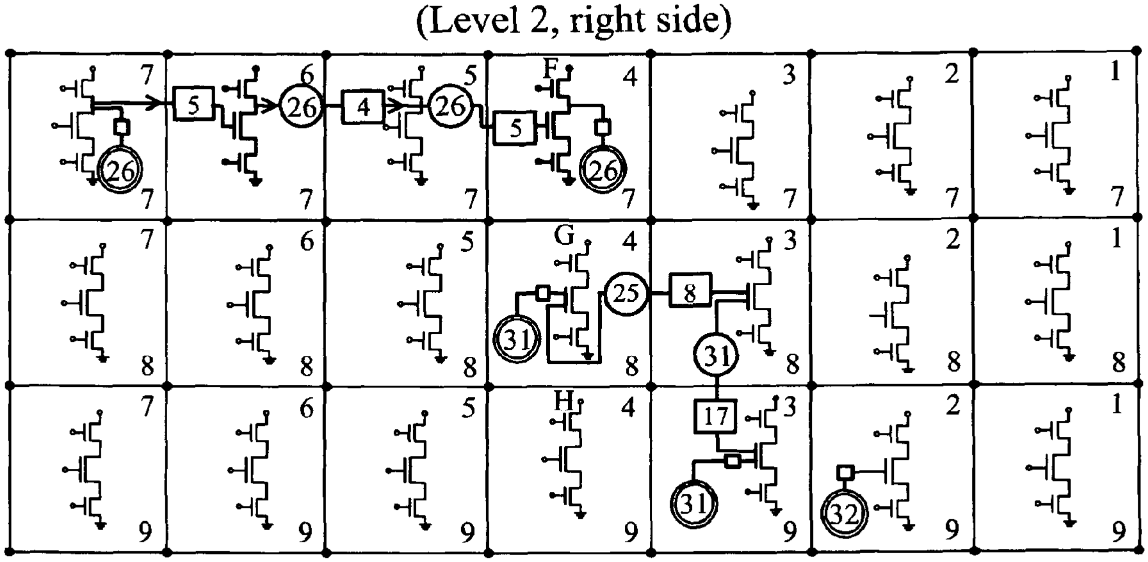

FIG. 76 (sheet 40) is similarly an IL-structured drawing of so much of the second level of that rightward half-adder (again the bottom three rows) as will show the top of the second post 32 that had been installed in the lower level thereof as shown in FIG. 75.

Figure 77:
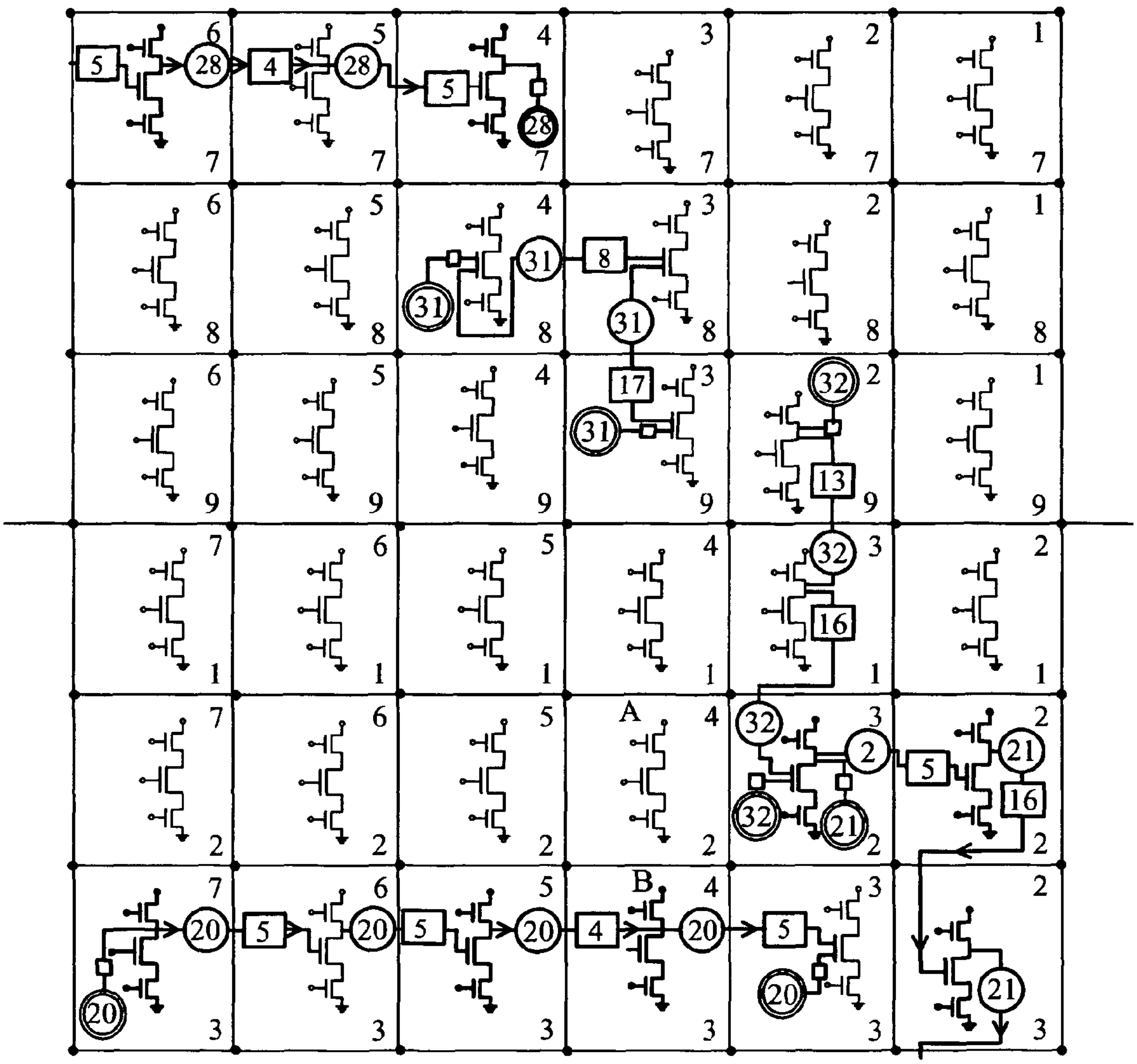

FIG. 77 (sheet 41) is a drawing of those portions of the second levels of the left- and rightward half-adders that have been structured adjacent one another so as to effect the desired connection between those half-adders.

Figure 78:
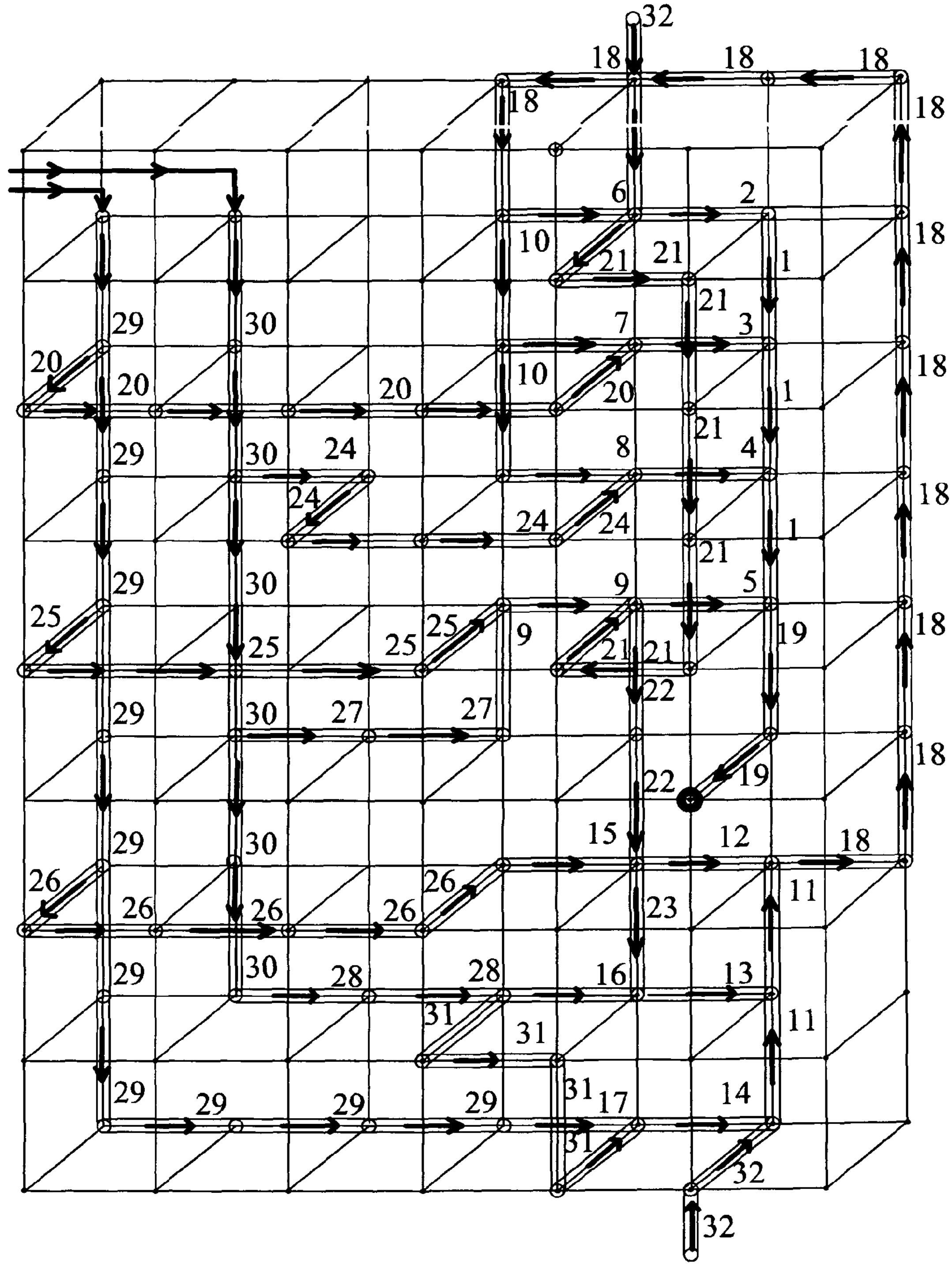

FIG. 78 (sheet 42) is an open perspective drawing of an electronic 3-D PS-100 having two layers in which is shown all of the circuitry including posts shown in FIGS. 71-77.

FIG. 79 (sheet 43) is a claims chart.

TABLES

Table I: Invention Components Listed by Reference Number.

Table II: Fully connected nodes $n_f$ to total nodes $n_t$ ratio $n_f/n_t$.

Table III: SPT 106 Codes.

Table IV: $LI_i$ Formulae for a Circuit.

Table V: The $LI_i$ Values of a Hypothetical Circuit.

Table VI: General $LI_i$ Overlay.

Table VII: Calculations of the $LI_i$ Values for the LN 102 Nodes of a Circuit Using Table VI.

Table VIII(a): SPT 106 Connections For the Hypothetical Circuit of FIG. 13 (sheet 11) in a 2-D, Non-Manifold-Like PS 100.

Table VIII(b): An edited version of Table VIII(a), wherein one line has been moved to a previous cycle.

Table IX: "cccccccsssss" Codes for the LNs 102 of the Circuit of FIG. 12 and Tables VIII(a), (b).

Table X: A Chart of the Numbers Assigned to the SPTs 106 of an Originating LN 102, Also Indicating the Corresponding Terminals at the Receiving Ends Thereof.

Table XI: Codes and Connections for 3-Bit 2-4 Elective 4/3 Code Selector.

Table XII: CPT 104 Codes For a 4-CPT 104 Array and Signal Code Routing Labels.

Table XIII: Code Correlations Between OT and RT SPT 106 Codes.

Table XIV: $LI_i$ Numbers for an XOR Gate Structured in a 3-D PS 100.

Table XV: Code Lines for an XOR Gate Structured in a 3-D PS 100.

Table XVI: $LI_i$ Numbers for an 8×4 Manifold Array.

Table XVII: Linear X-axis Node Locations in an 8×4 Manifold Array.

Table XVIII: Linear Y-axis Node Locations in an 8×4 Manifold Array.

Table XIX: The X-axis "Wrap-Around" Effect in a Manifold Array.

Table XX: The Y-axis "Wrap-Around" Effect in a Manifold Array.

Table XXI: Connections used in Structuring a Half-adder.

Equations

1. $r_n=n_f/n_t=(L-2)^2/L^2$, ratio of fully utilized LNs 102 to total LNs 102.
2. $CP_{PP}=2CP-P_N$, Computer Power in Parallel Processing.
3. $CP_{IL}=2CP+P_{IL}$, Computer Power in Instant Logic™.
4. LN=S+B−1, the cycles needed to execute serially an algorithm of S steps and B bits.
5. P=B−S+1, the length of a full operation plateau within the execution of Eq. 3.
6.

$$W = w_P + 2w\sum_{1}^{S-1}(S-n),$$

the total power dissipation in the full serial execution of the algorithm of Eq. 3.

7. $LI_i=LI_1\pm r_i\pm k_i x_M$, calculation of LIi values relative to a base value $LI_1$.
8. [001][010][100][011][OT][DC][RT] . . . , signal code routing.
9. $LI_i(x, y, z)=X_M(Y_M(z-1)+y-1)+x$, the $LI_i$ value of an LN 102 within a 3-D array by its x, y, z coordinates.
10. $LI_i(x, y)=X_M(y-1)+x$, the $LI_i$ value of an LN 102 within a 2-D array by its x, y coordinates.
11. $[xxxxxxxx][cc_1][cc_2][cc_3][ii_1][jj_1][kk_1][ii_2][jj_2][kk_2][ii_3][jj_3][kk_3]$, basic full code.
12. $[xxxxxxxx][cc_1][cc_2][cc_3][ii_1][jj_1][kk_1][p_1][ii_2][jj_2][kk_2][p_2][ii_3][jj_3][kk_3][p_3]$, the full code for a single post PS 100.
13. $[xxxxxxxx][cc_1][cc_2][cc_3][ii_1][jj_1][kk_1][pp_1][ii_2][jj_2][kk_2][pp_2][ii_3][jj_3][kk_3][pp_3]$, the full code for a three-post PS 100.
14. $[xxxxxxxx][mm_i][cc_1][cc_2][cc_3][ii_1][jj_1][kk_1][ii_2][jj_2][kk_2][ii_3][jj_3][kk_3]$ the full code including a single manifold code (mm).
15. $[xxxxxxxx][mm_1][mm_2][mm_3][cc_1][cc_2][cc_3][CC][ii_1][jj_1][ii_2][jj_2][kk_2][ii_3][jj_3][kk_3]$, the full code that allows for three Manifold Lines (MLs) on an LN 102.
16. $[xxxxxxxx][mm_1][mm_2][mm_3][cc_1][cc_2][cc_3][ii_1][jj_1][kk_1][pp_1][ii_2][jj_2][kk_2][pp_2][ii_3][jj_3][pp_3]$, the full code with a full complement of both MLs 388 (code $mm_i$) and Posts 326 (code $pp_i$).

TABLE I

| Invention Components Listed by Reference Number | |
|---|---|
| 100 | Processing Space (PS) |
| 102 | Logic Node (LN) |
| 104 | Circuit Pass Transistor (CPT) |
| 106 | Signal Pass Transistor (SPT) |
| 108 | Drain terminal |
| 110 | Gate terminal |
| 112 | Source terminal |
| 114 | Instant Logic ™ Module (ILM) |
| 116 | Index Number Designator (IND) |
| 118 | Look-Up Table (LUT) |
| 120 | Code Cache (CODE) |
| 122 | Code Selector Unit (CSU) |
| 124 | Test Array (TA) |
| 126 | First Level Circuit Code Selector (CCS or CCS1) |
| 128 | Signal Code Selector (SCS) |
| 130 | Clock |
| 132 | Code Line Counter (CLC) |
| 134 | Processing Path Switch (PPS) |
| 136 | Toggle Switch (TS) |
| 138 | Toggle Bypass (TB) |
| 140 | Code Input (CI) |
| 142 | Router 1 (R1) |
| 144 | Cycle Accumulator (CYA) |
| 146 | OR gate |
| 148 | LN 102 Accumulator (LNA) |
| 150 | Code Release Pass Transistor (CRPT) |
| 152 | Data Test (DT) |
| 154 | Trigger (TR) |
| 156 | 3-bit AND gate (3AND) |
| 158 | Router 2 (R2) |
| 160 | Code Entry Release (CER) |
| 162 | PS 100 Excerpt (PSE) |
| 164 | Excerpt LN 102 (ELN) |
| 166 | Selected Excerpt LN 102 (SELN) |
| 168 | Overlay |
| 170 | Node Locator |
| 172 | First Node Locator NAND gate (NLNAND1) |
| 174 | First Sign Register (SR1) |
| 176 | First Adder (ADDER1) |
| 178 | First Subtractor (SUBTRACTOR1) |
| 180 | Second Node Locator NAND gate (NLNAND2) |
| 182 | Second Sign Register (SR2) |
| 184 | Second Adder (ADDER2) |
| 186 | Second Subtractor (SUBTRACTOR2) |
| 188 | MULTIPLIER |
| 190 | One Level Circuit Code Input Node (CCIN1) |
| 192 | One Level XNOR gate (XNOR1) |
| 194 | One Level Circuit Code Reference Latch (CCRL1) |
| 196 | First AND gate (AND1) |
| 198 | One Level Enable Latch (EL1) |
| 200 | One Level Voltage Source (VS1) |
| 202 | Two-bit Code Output Enabler (2COE) |
| 204 | Latched Code Output (2CLO) or PTE Enabler (PTE) |
| 206 | Direct Code Output (DCO) |
| 208 | Elective Code Selector (ECS) |
| 210 | Normal Input Node (NIN) |
| 212 | Elective Code Reference Latch (ECRL) |
| 214 | XNOR gate |
| 216 | Elective Input (EI) |
| 218 | Elective XNOR gate (EXNOR) |
| 220 | Elective AND (EAND) |
| 222 | Elective Enable Latch (EEL) |
| 224 | Elective Voltage Source (EVS) |
| 226 | Second Level Circuit Code Selector (CCS2); Data Analyzer (DA2) |
| 228 | Group Detector (GD) |
| 230 | Group Code Router (GCR) |
| 232 | Data Code Router (DCR) |
| 234 | Data Input Node (DIN) |
| 236 | AXNOR2 Gate |

TABLE I-continued

| Invention Components Listed by Reference Number | |
|---|---|
| 238 | Data Reference Latch (DRL) |
| 240 | AAND2 Gate |
| 242 | Two Level Enable Latch (AEL2) |
| 244 | Two Level Voltage Source (AVS2) |
| 246 | BXNOR2 Gate |
| 248 | Group Enable Latch (GEL) |
| 250 | Voltage Source (BVS2) |
| 252 | Group Code Line (GCL) |
| 254 | General Memory (GM) |
| 256 | CAND2 Gate |
| 258 | Group Release Pass Transistor (GRPT) |
| 260 | Three-Bit Elective Circuit Code Selector (3ECCS) |
| 262 | Three-Bit Elective Circuit Code Input Node (3ECCIN) |
| 264 | Three-Bit Elective Circuit Code XNOR gate (3EXNOR) |
| 266 | Three-Bit Elective Circuit Code Reference Latch (3ECCRL) |
| 268 | Three-Bit Elective Circuit Code AND gate (3ECCAND) |
| 270 | Three-Bit Elective Circuit Code Enable Latch (3ECCEL) |
| 272 | Three-Bit Elective Circuit Code Voltage Source (3ECCVS) |
| 274 | Signal Code Input Node (SCIN) (or DMUX1) |
| 276 | DMUX2 |
| 278 | DMUX3 |
| 280 | Signal Code Release Latch (SCRL) |
| 282 | Signal Code Voltage Source (SCVS) |
| 284 | Circuit Tester (CT) |
| 286 | Test Frame (TF) |
| 288 | PT Push Buttons (PTPB) |
| 290 | PT Toggle Switch (PTTS) |
| 292 | Leaf Spring (LS) |
| 294 | Enable Line (EL) |
| 296 | Push Button Cushion (PBC) |
| 298 | LED |
| 300 | Test Bed (TB) |
| 302 | Control Unit (CU) |
| 304 | Test Bed Array (TBA) |
| 306 | Via1 |
| 308 | Common Latch |
| 310 | 1NAND gate |
| 312 | 2NAND gate |
| 314 | S latch input |
| 316 | Q latch output |
| 318 | R latch input |
| 320 | Q' latch output |
| 322 | Interconnect Pass Transistor (IPT) |
| 324 | Plate |
| 326 | Post |
| 328 | Reverse Latch (RL) |
| 330 | First Reverse NAND gate (1RNAND) |
| 332 | Second Reverse NAND gate (2RNAND) |
| 334 | Reverse S input (RS) |
| 336 | Reverse Q output (RQ) |
| 338 | Reverse R input (RR) |
| 340 | Reverse Q' output (RQ') |
| 342 | Two Level, Six Layer Vertical IC) (2, 6VIC) |
| 344 | One Level, Three Layer VIC (1, 3VIC) |
| 346 | One Level First Transistor Layer (1TL1) |
| 348 | One Level First Dielectric Layer (1DL1) |
| 350 | One Level First Connection Layer (1CL1) |
| 352 | One Level Second Transistor Layer (2TL1) |
| 354 | One Level Second Dielectric Layer (2DL1) |
| 356 | One Level Second Connection Layer (2CL1) |
| 358 | Via2 |
| 360 | Bead |

TABLE I-continued

| Invention Components Listed by Reference Number | |
|---|---|
| 362 | Recess |
| 364 | Two Level, Seven Layer Vertical IC (2, 7VIC) |
| 366 | Lower VIC Level (LVICL) |
| 368 | Upper VIC Level(UVICL) |
| 370 | Two Level First Transistor Layer (1TL2) |
| 372 | Two Level First Dielectric Layer (1DL2) |
| 374 | Two Level First Connection Layer (1CL2) |
| 376 | Two Level IC Dielectric Layer (ICDL) |
| 378 | Two Level Second Transistor Layer (2TL2) |
| 380 | Two Level Second Dielectric Layer (2DL2) |
| 382 | Two Level Second Connection Layer (2CL2) |
| 384 | SPT 106 Line (SPTL) |
| 386 | Cubic Manifold Array (CMA) |
| 388 | Manifold Line (ML) |
| 390 | Manifold Line PT (MLPT) |
| 392 | Interconnect PT Enabler (IPTE) |
| 394 | Manifold PT Enabler (MPTE) |
| 396 | Wrap Cap (WC) |
| 398 | Manifold Line Frame (MLF) |
| 400 | Contact Stud (CS) |
| 402 | Manifold Line Control Cable (MLCC) |
| 404 | Wrap Cap Cover (WCC) |
| 406 | Upper Manifold Contact Plane(UMCP) |
| 408 | Contact Pins (CP) |
| 410 | Lower Manifold Contact Plane (LMCP) |
| 412 | Contact Orifice (CO) |
| 414 | Manifold Control Line (MCL) |
| 416 | Rim |
| 418 | Elastic Collar (EC) |
| 420 | Elastic Strap (ES) |
| 422 | Holding Bar (HB) |
| 424 | Attachment Slot (AS) |

DETAILED DESCRIPTION OF THE INVENTION

Instant Logic™ (IL) involves new concepts that are foreign to the current state of the electronics art, hence this disclosure will include more text in explanation than would normally be provided. Not only is the structuring of a circuit shown, but the reasoning that brought about the one structure rather than another is given as well, for the reason that IL particularly involves a method as well as an apparatus, involving procedures that have never done before, so to disclose that reasoning seems necessary. Instant Logic™ provides both an opportunity and a new impetus for the invention of new circuits, and the full disclosure requirement would not be met unless as much as possible of such matters is explained. Besides seemingly being the fastest arithmetical/logical processing apparatus that there could be, the ILA is also intended to serve as a convenient research tool, so how to use the device as a research tool also needs to be set out.

In a complex electronic apparatus having 160 different kinds of reference numbered components that will be processing a very large amount of data, in general there will be two distinct types of architecture that could be adopted. In one of these, all of the components required for the full execution of a sequence of operations as to some number of data bits will be on a single Integrated Circuit (IC). In the second architectural style, all of the instances of a particular component would be on a single IC, and the operation would lie in some number of data bits passing successively through each of a number of different, individual ICs. The operation on each bit will take place independently of any operations that may be taking place as to any other bit. The ICs can be fabricated in various sizes as to the number of components on each, although in that second architecture each component IC (i.e., an IC made up of some number of instances of just one component type) would preferably be made to have the same number of components as do the rest of those component ICs. These bits could also be addressed in terms of bytes, words, or "Variable Length Datum Segments" (VLDSs), etc.

To change the capacity of a device having the second type of architecture would mean replacing every component IC with a new one, with those new ICs having a common size in terms of the number of components therein, but different from that of the original ICs. As to the "compound" or "modular" IC of the first architecture, changing the size of the device as a whole would simply mean adding or deleting ICs of that same modular type, i.e., of "modules." As to the general operation of the device as a whole, i.e., the execution of an algorithm, which of those architectures had been adopted would not matter. So long as the next component in the execution of an algorithm was present in the circuit when needed, operation could continue without regard, except possibly as to timing problems, to which IC that component happened to be on. Although probably more expensive, that first architectural style has the advantage of being more compact, generally meaning shorter transmission lines, and also in the ease with which the size of the whole device could be varied. Consequently, that first architectural style will be adopted in this application.

The resultant compound or modular IC then comes to be the "Instant Logic ™ Module" (ILM) 114. Each ILM 114 contains all of the components that make up a fully functional "Instant Logic™ Apparatus" (ILA), with the number of each being the same for all components (when that measure applies), so presumably the IC would contain some integral number of completely functional apparatus. It might occur, however, that because of the large number of inter-chip connections that were required, a single "ILM 114" would need to encompass two or more actual ICs, especially as to the PS 100 in particular, that as an exception to the modular style might be kept on an IC of its own. In fact, the number of such chips required to connect just a very few LNs 102 could become so large that the distinction between the two architecture types would begin to blur. Starting with a single chip having thereon all of the components needed to carry out one operation on one LN 102, there is a choice between spreading the components among a number of ICs and then having more of the components of a particular type on the IC dedicated thereto, or putting as many components of different types on a single IC, whereby the structure would be as modular as possible. In any event, emphasis should be placed on having as many LNs 102 as possible in juxtaposition on a PS 100 IC for closer communication, since the ultimate object, after all is that of getting bits from one LN 102 to another.

The basic concept underlying Instant Logic™ lies in eliminating the current procedures involving transferring instructions from memory to the Arithmetic Logic Unit (ALU) of the Central Processing Unit (CPU), together with data to the ALU, either from memory or from an external source, and then sending the results of that processing back to memory, with some intermediate results often being locally stored. That process has come to be known as the "von Neumann bottleneck" (vNb). The vNb has its origin in the "Baggage Paradigm" (BP), i.e., the principle that the processing of data will rest on providing the data to be operated on to a location at which the desired processing can be carried out. The task then undertaken that led to the development of Instant Logic™ was to reverse the BP and instead provide the processing means at the sites of the data, thus to eliminate that repetitive process of sending instructions and data back and forth. The means of so doing would of course lie in digital (or, more accurately, binary) electronics, by which is meant the use of various kinds of combinational and sequential logic, i.e., gates, latches, etc., that would be structured at the sites of the data when needed. The circuits needed are to be structured at those sites immediately prior to the arrival of the data, from either an internal or an external source, and then de-structured (unless the same circuit was needed on the next cycle) when the processing of the data passing therethrough would have been completed.

The specific element that brings about that reversal of procedure is shown in the circuit of FIG. 1, which is (with an added external output) the basic "Processing Element" (PE) of the apparatus as employed in any circuit that had been structured by IL methods. As simple as that FIG. 1 circuit may be, everything concerning Instant Logic™ derives from that one circuit and variations thereof in terms of dimensionality and the number and variety of connections used in the structuring of various circuits. In any semiconductor electronic circuit the gate circuits, latches, and the like would be made up of a number of individual transistors within an integrated circuit, but IL circuitry could also be structured using discrete transistors for experimental "bread-boarding" purposes, and that kind of system is also described herein. Those transistors would necessarily have to be connected together in some way, but since different Information Processing (IP) tasks would require different circuits, any connections that were made could obviously not be permanent. Means must then be provided for making temporary connections, in such a way that the transistors will be interconnected in a particular pattern as to each kind of circuit, it also being made possible to change from one pattern to another. The means for so doing was chosen to be the pass transistor, that would be interconnected with the operational transistors, and the various circuits to be structured would be realized by enabling just certain ones of those pass transistors.

To use such circuitry would then require the development of a code by which to designate the various circuits, some non-volatile memory within which to store the code for the circuits so encoded, which memory will be designated herein as CODE 120, and finally an array of those operational transistors and an interleaved array of pass transistors in a "Processing Space" (PS) 100 to which data are sent and within which the operations will be carried out. The specific manner of proceeding was then to interconnect each operational transistor to every adjacent transistor, in every way that was geometrically possible, through pass transistors that could be turned on and off so as to permit the structuring of any kind of circuit, whereby the circuits could be structured and de-structured as needed.

Having said that in IL the data were to be sent to a PS 100 to be treated, it must now be shown how that process differs from that of current microprocessor-based systems. To state that the data are to be sent somewhere sounds like what occurs in the usual computer, but still, the data cannot be operated on in memory and must then be sent somewhere: it is what happens after that which constitutes the differences, which are: (1) no instructions need be sent into PS 100 to control what is to occur, since the circuits that are being structured define those operations; (2) the data being produced during the operation need not be sent to another location in order to find the circuitry that will carry out some next step in the process, since that next circuitry will likewise appear at the location of those data; and (3) the control of what processes are to take place and the actual conduct of such operations take place at the same time, rather than alternating between those two processes on a single time line.

That is, while it is true that in IL the structuring of a circuit and the use of that circuit must both be carried out, that circuit structuring takes place even as the data to be treated are passing through the preceding circuitry, i.e., in parallel, so that when the data arrive at some one or more LNs 102 as next encountered and that are to be the next circuit, the structuring of those LNs 102 into that circuit would just have been completed, so there will be no delay arising from the time that the structuring was being carried out. The circuit structuring in Instant Logic™ thus takes place "Just In Time" (JIT) relative to the arrival of the data, in such manner that incoming data only need to pass right on through PS 100 until the processing is completed. To structure any particular circuit at the sites of the data only requires that certain PTs be enabled by placing a "1" bit on the gate terminals thereof, while the PTs that were not used would be left "off." As can be seen in the figures, a drawing of the PS 100 circuit that showed only those lines on which the PTs had been enabled would show the same circuit as would be drawn of that circuit in hard-wired form. Thus was "Instant Logic™" (IL) born as a method, and it then remained only to fill in the detailed nature of the "Instant Logic™ Array" (ILA) contained therein, to be designated herein as a "Processing Space" PS 100 that could carry out that IL methodology.

For purposes of simplicity in this first introduction to IL, FIG. 1 does not provide for an external output, since that would require a fourth CPT 104, and the more simple "Circuit Code Selector" (CCS1 126) by which it was sought to demonstrate the designating process does not allow for a fourth CPT 104 that would necessitate the use of a 3-bit code. Moreover, a fourth output CPT 104, that has nothing to do with the internal workings of the LNs 102 and other CPTs 104 in any event, properly requires a code selector that would preclude the enabling of both of a particular two CPTs 104 at the same time, and it is preferable to defer discussing that more complex kind of circuit until after the basic IL operations have been shown. The procedure adopted does not require another PT directly on the LN 102.

FIG. 1 shows a "Logic Node" (LN) 102 containing the letters "IN" ("Index Number") and bearing the label "A." That "A" LN 102, together with other like LNs 102, will carry out all of the arithmetical/logical operations or data transfers that may be required in any use of IL and the ILA (PS 100). (A "data transfer" is simply the moving of a bit from one LN 102 to the next without any change thereto, as is sometimes required in the structuring of particular circuits, and is carried out by what is called a BYPASS circuit that will be described later.)

The circuitry required for each particular cycle in the execution of an algorithm is structured by enabling selected ones of the CPTs 104 labeled "1," "2," and "3" in FIG. 1, those labels being enclosed (in this first drawing only) by dark circles, running downward from the 1 CPT 104 on the DR 108-to-$V_{dd}$ CPT 104 at the top. In the text, to "enable" a PT is often referred to herein as "placing a '1' bit thereon," but more exactly that "1" bit will simply be a voltage of such value that when applied to the gate terminal of a CPT 104 or SPT 106 will enable that PT to pass a current, the particular circuits to be structured and de-structured being identified in accordance with which PTs 104, 106 had been enabled. In the later drawings of circuits in fully structured form, only those PTs 104, 106 that were used in the circuit will have a darkened circle (or in 2-D cases a small square), which circle (or square) will itself be used to represent the PT, either with the appropriate number being associated therewith or by a reference line and, in light of the limited space, an adjacent lower case "d=drain," "g=gate," or "s=source" label placed adjacent the darkened squares, and then also with a "1" bit placed therewithin.

Following the basic structuring of the circuit itself by enabling selected CPTs 104, the structuring is completed by enabling the appropriate SPTs 106 as labeled in FIG. 1 that provide the signal paths between the LNs 102. In the descriptions the enabling of CPTs 104 and of SPTs 106 is set out in a logical sequence, thus to appear as though the enabling was being done in sequence, but in fact the enabling codes for the two types of PT will all be sent together. The lines extending from both sides of the PTs that are in use will be shown darkened, along with the circle or square for the PT, while to reduce clutter the lines in the physical structure of PS 100 that extend out from the distal end of an SPT 106 and are not being used will not be shown at all. In the later 2-D drawings that have both rightward and upward connections, the SPTs 106 will be shown as small squares that will be darkened if used, a "1" bit will be shown within the squares for those SPTs 106 in use, and the lines that extend from the distal ends of those squares in use will be shown (and darkened) along with the square itself.

In more detail, both the lines that include the CPTs 104 and those between adjacent LNs 102 that contain the SPTs 106 will be physically present at all times as inherent parts of the ILM 114 IC as fabricated. Those lines become a part of an actual circuit only when the CPT 104 or SPT 106 contained within a particular line has been enabled. The A(2) PT, as an input terminal for data that are to enter in from outside, must obviously carry signal data, but since that A(2) PT also plays the role of providing an input terminal to whatever the circuit may come to be (since "there cannot be a circuit until there is an input terminal"), that A(2) PT is classified as a CPT 104. When mentioned together as a group, as already shown, the CPTs 104 and SPTs 106 may at times be referred to by the generic terms "PTs 104, 106" or similar phrases.

The circuits are structured so that the inputs and outputs thereof will connect in some direction to the terminal(s) of those LN(s) 102 that are to provide or receive data. Circuits in which two or more LNs 102 must operate in parallel in order to form a functional entity must all be structured at the same time, and the completion of the resultant multiple lines by enabling the PTs therein required to provide any intermediate outputs or set thereof within the fully structured LNs 102 would constitute a single step. For example, it will be shown in detail later how an XOR gate develops a first pair of outputs from the combined operations of a 2-bit OR gate and a 2-bit AND gate, and hence the first step in the structuring of the circuit will involve four LNs 102.

It must be recognized, however, that statements that refer to rightward or downward connections only merely express a convention: if it were said that connections between the LNs 102 of a PS 100 were only allowed in the leftward and downward directions, rather than the rightward and upward directions, that statement would be describing the exact same PS 100. The only reason for seeking to indicate a direction in which an SPT 106 is "going" is because the signal flow indeed has a direction, as does the structuring of a circuit, and a circumstance will arise later in which the SPT 106 connection will be made that is the "reverse" of the signal flow.

The next-following LN(s) 102 will be in the process of being structured even as that first operation of the first LN(s) 102 is taking place, and upon completion of that first operation the LN(s) 102 so used will then be either de-structured and restructured for a next operation, or if that next operation was the same as had just been carried out, the code pertaining to those LNs 102 would simply be left in place. Each such sequence of circuit structuring, operation, de-structuring or restructuring, etc., will take place in isolation from, and independent of, whatever else may be transpiring at any other location within PS 100.

An important consequence of that independence of operation, given that a sequence of operations is not affected even by a non-connected next-neighbor sequence of operations, is that even the bare existence of those neighboring LNs 102 would not affect the operation of any LNs 102 that were then carrying out some process, i.e., an operating sequence would be carried out in the same way whether or not those adjacent LNs 102 were even present. (This assumes, of course, that in the specific IC design such matters as cross-talk, deterministic jitter and other types of Electromagnetic Interference (EMI) will have been adequately minimized.) Because of that independence, the expansion of PS 100, whether by adding more ILMs 114 or by adding more LNs 102 within an ILM 114, can be carried out without having any effect on the operation of the circuitry already present. The newly added LNs 102, or more exactly the SPTs 106 thereof, would be physically connected in a "seamless" manner to whatever circuitry had already been present, as will be shown later.

By "seamless" is meant that the connection through such SPTs 106 of any new LNs 102 on a new IC must appear electronically to be the same as the connections between LNs 102 within a PS 100, although of course the physical method of connection would be different, e.g., as by using connecting plugs between ICs rather than on-chip wiring. That would be true whether referring to ICs that contained only the PS 100, or as to a PS 100 part of an ILM 114. The total PS 100 would then have been expanded by those newly added LNs 102 and the PTs connected thereto, in the same way as the operations of those LNs 102 and PTs 104, 106 that had already been present. With that understanding of how extensive that PS 100 could come to be, to complete the description of IL operations and the "mechanics" of how the selected CPTS 104 and SPTs 106 come to be enabled, what remains to be shown are (1) the template on the basis of which those circuits are structured; (2) the code used to carry out that structuring; and (3) the "accessory" or "corollary" circuitry by which the required enabling bits are caused to arrive at the gate terminals of the selected PTs 104, 106. These different aspects of IL will now be set out more or less in that order. What has been written herein so far has been preliminary, and what now follows will constitute the essence of Instant Logic™.

The circuitry of FIG. 2 (sheet 2), as an excerpt from PS 100, is intended to provide a template for all IL circuit structuring, and is seen to reflect the general principles of FIG. 1 except for being 2-D and using small boxes instead of circles for the SPTs 106. The more simple circuits will still be shown in the form of FIG. 1, but for more complex circuits the FIG. 2 template is used as a basis. (The "322" and "326" items shown have to do with reaching up from one level in a multi-level IC to the next, and will be explained later.)

In the more complex circuits, the CPTs 104 are not identified by numbers therein as was done in FIG. 1, but rather by numbers outside of the circles that represent the CPTs 104, being connected thereto by a reference line. Those circles, like the boxes for the SPTs 106, are left blank and in light print when not in use, but are darkened and have a "1" bit therein when in use. The circles for the LNs 102 are also darkened when in use, but since the LNs 102 are not enabled by a "1" bit, the LNs 102 being used (besides being darkened) will instead have the notation "IN" (for "Index Number") therein.

The SPTs 106 extending out from an LN 102 are shown as small boxes that in this case are not labeled by the "drain," "gate," and "source" names as used previously, but rather by the corresponding letters "d," "g," and "s" letters, placed adjacent to those boxes to indicate the receiving terminals of the LN 102 to which the distal ends of the SPTs 106 connect, as being the DR 108, GA 110, and SO 112 terminals, respectively. Also, rather than using the "drain," "gate," and "source" names to identify the terminals of the receiving LNs 102 to which an SPT 106 is to be connected, as was done in FIG. 1, those "receiving terminals" are also identified by the lower case letters d=drain, g=gate, and s=source. When a shorthand reference to an SPT 106 is needed, the numbering system shown on the LN 102 at the upper left corner of FIG. 2 is used. These numbers proceed in normal order through those from the DR 108, GA 110, and SO 112 terminals on the LN 102, and in each case therein through the upward-going SPTs 106 first and then the rightward-going SPTs 106. The ellipses on each side of the template mean that the array continues onward in each direction for some predetermined distance, those distances defining the dimensions of the PS 100. In the template of FIG. 2 itself, all of the LNs 102, CPTs 104, and SPTs 106 are in light print, as are the wires and GND and $V_{dd}$, and the boxes or circles representing the various PTs are left blank, since not yet used.

The code as a whole begins with the $LI_i$, the "Location Indicators" for the LNs 102, wherein $1 \leqq LI_i \leqq LI_M$, with $LI_M$ being the total number of LNs 102 within the total space that the circuitry being structured occupies, including LNs 102 that are encompassed by the area of the circuit but are not themselves used directly in the circuit. Upon establishing what the $LI_i$ and then the $IN_j$ are for a particular LN 102 as previously described, the enabling of the selected CPTs 104 and SPTs 106 associated with that LN 102 lies in applying the codes for each, the CPTs 104 by way of a circuit code selector to be described below, and the SPTs 106 by way of a signal code selector, also described below. Each CPT 104 will be identified by one of the "01," "10" or "11" codes as previously discussed, and what remains to be done is to direct "1" bits to the selected SPTs 106.

The enabling of an SPT 106 rests on determining (1) the terminal of the "originating" LN 102 from which the signal PT 106 extends (i.e., from the DR 108, GA 110, or SO 112 terminals thereof); (2) the direction (rightward or upward) in a 2-D PS 100) in which that SPT 106 extends, thus to identify indirectly the receiving LN 102; and (3) the terminal of the receiving LN 102 to which the distal end of that SPT 106 is connected, that terminal again being either the DR 108, GA 110, or SO 112 terminal. The codes for the CPTs 104 were given previously as 1 CPT 104="01," 2 CPT 104="10," and 3 CPT 104="11," and those same code numbers are used for the SPTs 106. The direction code is defined as rightward=x="01," and upward=y="10." Since the PS 100 is constructed so as to allow further vertical connection only in the upward direction, it turns out that such connections would be in a negative direction with respect to directions along the "y" axis, for which the positive direction is downward.)

With an increasing capability of constructing "vertical" ICs now being seen, it should be noted that expansion of the x, y template circuit of FIG. 2 to three dimensions, as is increasingly being done, would be utilized here by adding the code "inward='11'," and the addition of some number of replicas of the original x, y plane to yield an x, y, z structure, an example of which is shown later in FIG. 51 (sheet 25) as an 8×8×8 cube. As for any given plane of that cube, increasingly higher numbers extend in the rightward and downward directions, using an x, y plane in the plane of the paper, but with a third "z" dimension now increasing inward, as shown by the index numbers included in FIG. 51. (With that x, y plane being horizontal, that z dimension would be downward, but with that x, y plane being vertical, increasing z would be inward as noted above. The other notations and corner-to-corner lines, etc., beyond the LN 102 $LI_i$'s in FIG. 51, will be explained in greater detail later with reference some structured circuits that require three dimensions.)

A principal issue with regard to expanding the size of a computer, or the number of such computers, is that of scalability, meaning the rate at which the "Computing Power" (CP) of an apparatus, measured in logical operations per second, will increase as the number of "Processing Elements" (PEs) is increased, wherein a single von Neumann computer is designated as a "PE." A "scalable" computer would double in CP if the size of the apparatus (e.g., the number of PEs) was doubled. In the conventional computer art, full scalability has not been achieved, and an analysis to be given below shows that a conventional von Neumann computer, regardless of how much "parallelized," could not be made to be scalable. Moreover, according to that analysis, the process in Instant Logic™ of adding ILMs 114 together to make a larger ILA both provides to and exhibits the feature not only of scalability but of super-scalability, by which is meant that doubling the size of an initial reference computing system, whether in terms of the ILMs 114 or individual LNs 102, would yield not just the computer power given by an appropriate multiplying factor (e.g., doubling or tripling, etc., the apparatus size) but actually somewhat more. (As used here, "super-scalable" means to yield more power than that given by the appropriate multiplying factor (the number of PEs) applied to the reference PE, and to be "sub-scalable" would be to yield less power than that calculated from the exact multiple that defines scalability.)

In the approach to this issue proposed by G. M. Amdahl (Amdahl, supra, p. 485), the issue was viewed in terms of what percentage of the processing was being carried out serially and how much was "parallelized," the conversion to parallel processing being a major issue in the industry at that time. It would seem from what is developed here, however, that what is gained in CP by joining together a number of basic computing units, whether entire computers or basic PEs, will necessarily be less than the total CP of those individual units, in part since the resultant system will have to include some further means for carrying out that joining and control the operation thereof. In addition, a part of the CP of the separate computers must be diverted to manage the coordination of those separate units. So long as there must be some software and/or hardware added in order to join those computers together and ensure their cooperative functioning, but yet no CP is added by that joining itself, scalability cannot be achieved.

The key to resolving that problem lies in abandoning the notion of a network and instead developing a type of PE that is individually connectable to other PEs, whereby no network would be required. In Instant Logic™ m, the means by which the PEs are joined and made to function together not only adds computing power, but also adds enough such power that the resultant total CP exceeds the product of the CP of a single PE and the number of such PEs installed, i.e., the system is super-scalable. The reason for this is that in an ILA, the means for joining one PS 100 to another is a simple matter of extending the process of interconnecting LNs 102 within a PS 100 to the case of going across a PS 100-PS 100 boundary. The means by which such a joined pair of PEs is caused to operate is exactly the same as the means by which IP is carried out in the body of the PS 100. In any event; the LNs 102 that run along a boundary of an information processing module will still have SPTs 106 extending outward therefrom that would have nowhere to connect, except that when another such module is added on, the lack of connectability of both modules on the sides so joined is then eliminated.

Specifically, when another PS 100 is brought up to a first module, the distal ends of those SPTs 106 can be connected by some common, accepted means (e.g., as a "male-female plug) to the terminals of the facing LNs 102 that were just brought up. The only difference is that in joining one PS 100 to another, the LNs 102 that are interconnected happen to be on two different ILMs 114. The reason that an ILA not only avoids any loss of CP per unit when those units are joined but increases that quantity and becomes super-scalable is that (1) no network is required, and (2) the procedure used to accomplish that joining is itself computation productive. The way in which that comes about is demonstrated in FIGS. 3(*a*)-(*g*) (sheet 3) below, and derives from simple geometry.

Every finite plane figure that operates on the basis of interconnected units therewithin must have outer edges and corners from which, along the sides and at the corners of said figure in a 2-D figure and in the faces, along the edges, and in the corners in a 3-D figure, for the LNs 102 so located there will be at least one direction in which no connections could be made, which means that no outwardly-directed processing can occur through those face, edge or corner sites. A fully connected node within a planar array of "nodes," i.e., the LNs 102 in the PS 100, will have four different directions in which to interact with a neighboring node, but those LNs 102 on the perimeter of the figure will have fewer such directions. With respect to FIG. 3 (*e*), for example, and taking those squares to represent LNs 102 for the moment, if another row of LNs 102 were shown both above and below the one row shown there would be one LN 102 in the interior that would be fully surrounded by other LNs 102, and that internal LN 102 would have interactions in all four directions. (An interior LN 102 in a 3-D array would have connections in six directions.) In such planar figures as FIGS. 3(*a*)-3(*g*), there will be some fraction of the total number of nodes that are fully surrounded, and another fraction that lacks connections on one or more of the four sides of the square as to the edge LNs 102, and lacking connections on two sides as to the corner LNs 102. (Those directions actually involve nine SPTs 106: one from each DR 108, GA 110, and SO 112 terminal to each of the three DR 108, GA 110, and SO 112 terminals of an adjacent LN 102.)

In a 3×3 array, for example, there is only one central node that can connect in four directions, the other eight nodes being peripheral and hence lacking outward connections, the four nodes in the middle of a side connecting in only three directions, while the four corner nodes are only able to connect in two of those four directions. Similarly, in 4×4 array, four nodes can connect in all four directions, eight along the sides in only three directions, and the four corner nodes in only two directions. The effect of array size on the number of "missing connections" can then be analyzed in terms of the number of fully connected nodes relative to the total number of nodes.

Again for the 3×3 array, the total number of nodes is $n_t=9$ of which but one is fully connected, the ratio r, of fully connected nodes $n_f$ to the total nodes $n_t$ then being $r_n=n_f/n_t=1/9=0.111$. In the 4×4 array that fraction has increased to $n_f/n_t=4/16=0.25$. In general, the number of fully connected or internal nodes is given by $n_f=(L-2)_2$, where L is the length of a side of a square array in units of single nodes, and the total number of nodes is of course $L^2$. Table II below shows the ratio of the number of fully connected nodes $n_f$ to the total number of nodes $n_t$ in terms of the length L of a side of the array. A square array that fills the space within the outer periphery of a larger array of length L, will have a length of L−2. The nodes within the smaller array will be the only nodes in the larger array that connect in all four directions.

The $r_n=n_f/n_t$ value is then given by the ratio of the areas or node counts in the smaller and larger array. With $n_f=(L-2)_2$ and $n_t=L^2$ then $n_f/n_t(L-2)^2/L^2$, for which various values are shown in Table I, which also includes the data on which the calculations were based:

TABLE II

| Fully Connected Nodes $n_f$ to Total Nodes $n_t$ Ratio $n_f/n_t$ | | | | | |
|---|---|---|---|---|---|
| L | $L^2$ | L − 2 | $(L-2)^2$ | $(L-2)^2/L^2$ | $(L)^2-(L-2)^2+4$ |
| 3 | 9 | 1 | 1 | 1/9 = 0.11111 | 12 |
| 4 | 16 | 2 | 4 | 4/16 = 0.25 | 16 |
| 5 | 25 | 3 | 9 | 9/25 = 0.36 | 20 |
| 6 | 36 | 4 | 16 | 16/36 = 0.4444 | 24 |
| 7 | 49 | 5 | 25 | 25/49 = 0.5102 | 28 |
| 8 | 64 | 6 | 36 | 36/64 = 0.5625 | 32 |
| 9 | 81 | 7 | 49 | 49/81 = 0.6049 | 36 |
| 10 | 100 | 8 | 64 | 64/100 = 0.64 | 40 |
| | | | | . . . | |
| 20 | 400 | 18 | 324 | 324/400 = 0.81 | 80 |

It is thus evident that the relative number of fully utilizable LNs 102 as shown in Col. 5 of Table II increases rapidly with the size of the array, a matter that, along with the gain in fully connected nodes by keeping the structure as compact as possible rather than extended as will be discussed below, should then both be kept in mind in designing the physical layout of the ILA components. The last column above, which is the number of partially connected nodes (given by the difference between the areas of the larger and smaller arrays), counts the peripheral nodes and shows that the number of those partially connected nodes increases only by four with each integral increase in array length, while of course the total number of nodes increases as the square of the side length. (The number "4" has been added to the formula used in the last column since four of the peripheral nodes will be corner nodes that lack two directions of connection.)

The most general way to show the foregoing rests on the formulae for the perimeter length and area of a square (or the circumference and area of a circle). As seen above, the perimeter length of a square is given by $n_t-n_f$ or $L^2-(L-2)^2=4(L-1)$, while the area or no is of course given by $L^2$. Here this issue can best be illustrated by the ratio of the perimeter length (the number of LNs 102 that are not fully connected) to the area, given by $4(L-1)/L^2$, i.e., the relative number of LNs 102 not fully connected varies inversely with the number size of the figure, and it is that which establishes super-scalability. In a circle, the circumference (that will correspond to the "perimeter length") is given by 2 μr, and the area is $\mu r^2$, so the equivalent C/A becomes $2\mu r/\mu r^2=2/r$, thus to show again that as an array of LNs 102 grows larger, the relative number of those LNs 102 that cannot be fully utilized decreases, since that quantity varies inversely with the linear dimension of the array.

All of what was just said will remain true, of course, only so long as the LN 102 array, or the information processing modules with which this discussion began, are assembled in as closely packed a fashion as possible, so that there are no "missing" nodes that would invalidate the analysis just made. (It would probably not have been noticed that the current tendency towards using "distributed" sites of information processing, if these would otherwise have been closely packed, actually decreases the computing power.) It can then reasonably be assumed that the amount of Computing Power (CP) available will be directly proportional to the number of inter-LN 102 connections available, given that (1) it is precisely through such interconnections that all of the IP takes place; and (2) each node that by increasing the size has become interior rather than exterior has added one more SPT 106 connection (or two more with respect to what had been a corner node).

Figure 3:
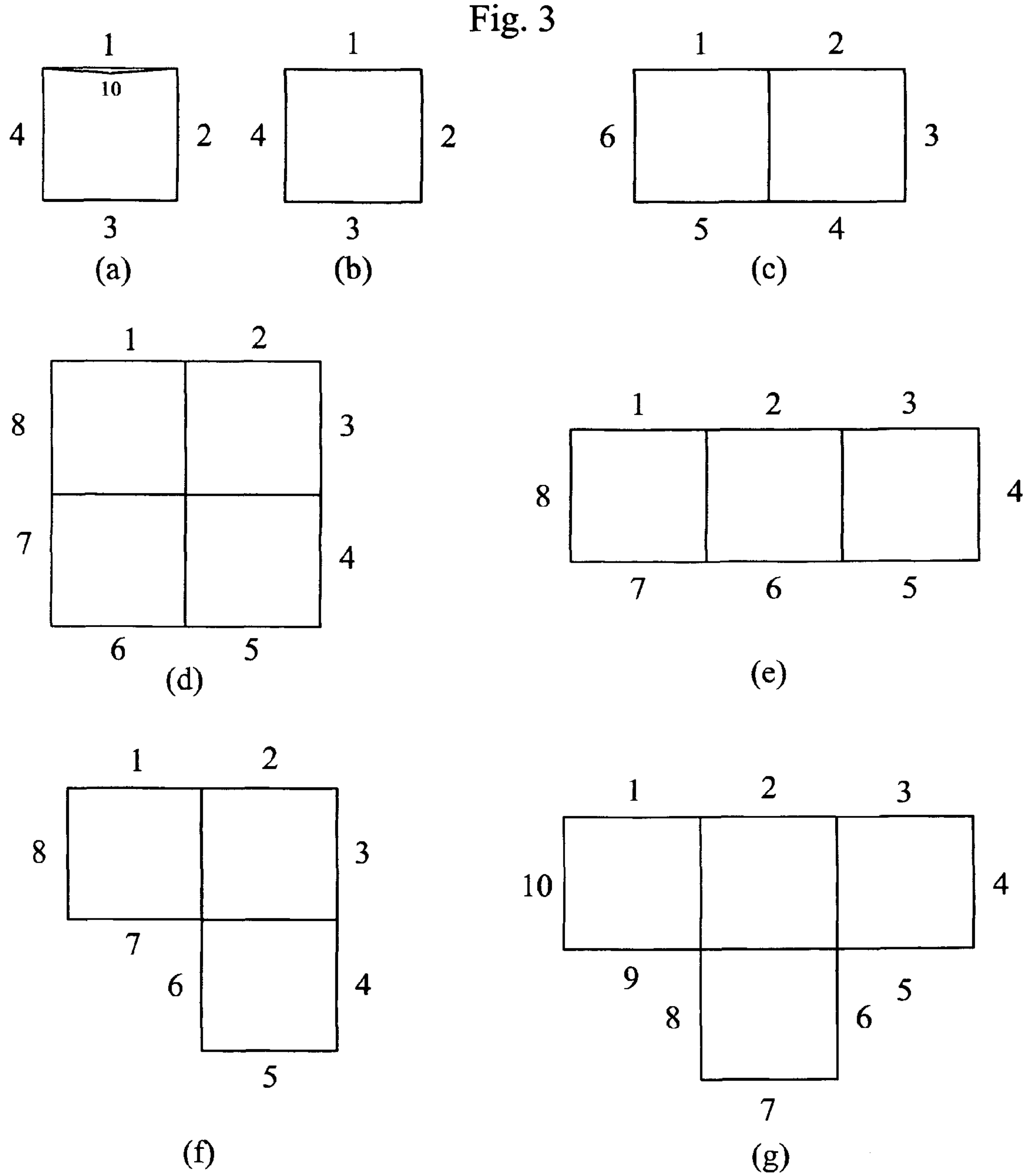

The ratio of fully utilized nodes to the total number of nodes thus becomes $$r_n=n_f/n_t=(L-2)^2/L^2 \tag{1}$$

and shows that the connections per node will increase as the size of the device increases. That geometric fact not only establishes super-scalability, but also one in which the gain in CP per added LN 102 connection actually increases as n gets larger—the percentage of connections that can actually be used increases with size. What is shown in FIG. 3(*a*)-(*g*) is that when a number of planes are interconnected so as to achieve those larger sizes, the manner of interconnection also affects the relative number of fully surrounded LNs 102. (Further below a "manifold-like" structure will be described by which the "missing" connections at the edges and corners, or even within the planes of a 3-D array, can be provided.)

Superscalability arises not only from increasing the size of a unit—the discussion just given can perhaps best be understood by considering the arrays being discussed as being blocks of PS 100—but also by connecting one array to another, which is a second way of increasing the size. (While that first way serves only to increase the efficiency of the apparatus being designed, this second way—adding more and more ILMs 114 so as to increase the CP more than linearly—is what actually provides super-scalability.) Relative to the CP of a single PC or MAC according to the previous argument in the current art of parallel processing (adopting the "hardware" basis used herein rather than the software basis of Amdahl) the total CP from two PCs or MACs would be given by $CP_{tc}=2\ CP_{in}-CP_{net}$, where "$CP_{tc}$" refers to the total CP of a composite of two conventional computers, "$CP_{in}$" is the CP of an individual one of the reference computers, and "$CP_{net}$" means the power being used to operate the network by which those two units are made to function together. In the ILA, on the other hand, the resultant power would be $CP_{til}=2\ CP_{in}+CP_j$, where "$CP_{til}$" is the total power from the IL system after having joined two ILMs 114 together, "$CP_{in}$" is the CP of a single ILM 114 and "$CP_j$" is an amount of CP derived solely from connecting or "joining" the two ILMs 114. Since electronically those interconnections would be the same as any other off-chip connection used in the rest of the PS 100, and except for the actual hardware used the same as any on-chip connection between LNs 102 through an SPT 106, then each such connection (for as many LNs 102 as were along the side being connected) would add to that $CP_{in}$ an amount of CP given by ¼ of the CP of a fully connected LN 102, thus to yield that larger Instant Logic™ total power $CP_{til}$. (As shown in FIGS. 3(*d*), 3(*f*), if a block of nodes were added that encountered two edges, thus to make a FIG. 3(*d*) structure out of the 3(*f*) structure, then besides there being added twice the number of nodes that are along a side, the corner node that touches both the 6 and 7 sides in FIG. 3(*f*) would receive two more added directions.)

In order to confirm how that result comes about, the IL aspect of what has just been described will now be illustrated by way of FIGS. 3(*a*)-(*g*) (sheet 3) that shows a number of 10×10 LN 102 blocks as taken from PS 100, intended to demonstrate the manner in which the Instant Logic™ architecture, specifically PS 100, comes to be "super-scalable." FIGS. 3(*a*) and 3(*b*) each show a single block of LNs 102 in a 10×10 square, thus to be in a 2-D architecture and each to contain 100 LNs 102. Those LNs 102 that are within the interior of the block will have connections in four directions, including outgoing sets of nine connections each (from three different terminals of the originating LN 102 to each of the three different terminals of an adjacent LN 102) in both the rightward and upward directions, with two corresponding sets coming in from the leftward and downward directions, while those on the periphery have connections in only three directions, those LNs 102 along the edges having one direction that lacks any neighboring LNs 102 with which to connect. (By a "connection" here is meant the full set of nine SPTs 106 that extend in one direction from one LN 102 to another LN 102.) The key to how super-scalability comes about lies in taking note of the fact that to obtain the number of connections in a structure such as the FIG. 3(*c*) block is not just to double the 36 connections of that FIG. 3(*a*) or 3(*b*) block, but rather to count the number of LNs 102 around the periphery of the 2-block composite in FIG. 3(*c*), each of which peripheral LNs 102 will lack one set of nine connections in the one direction for each such peripheral LN 102 that points outward from the PS 100 as a whole.

A square in which every one of the 100 LNs 102 had four connections thereto, which is not possible except in a square that was fully surrounded by other LNs 102, would have 400 connections. However, for each side of the block that lacks inter-LN 102 connections, 10 connections would need to be subtracted. With four such sides the block would have 4×10=40 fewer connections, yielding a total of only 360 inter-LN 102 connections. The squares in FIGS. 3(*a*) and 3(*b*) would then have what may be called a "Connection Quotient" (CQ) of 360/400=0.9. For ease of comparison, that value for the reference squares of FIGS. 3(*a*) and 3(*b*) can be normalized to yield a "Normalized Connection Quotient" (NCQ) of 0.9/0.9=1.

Figure 4:
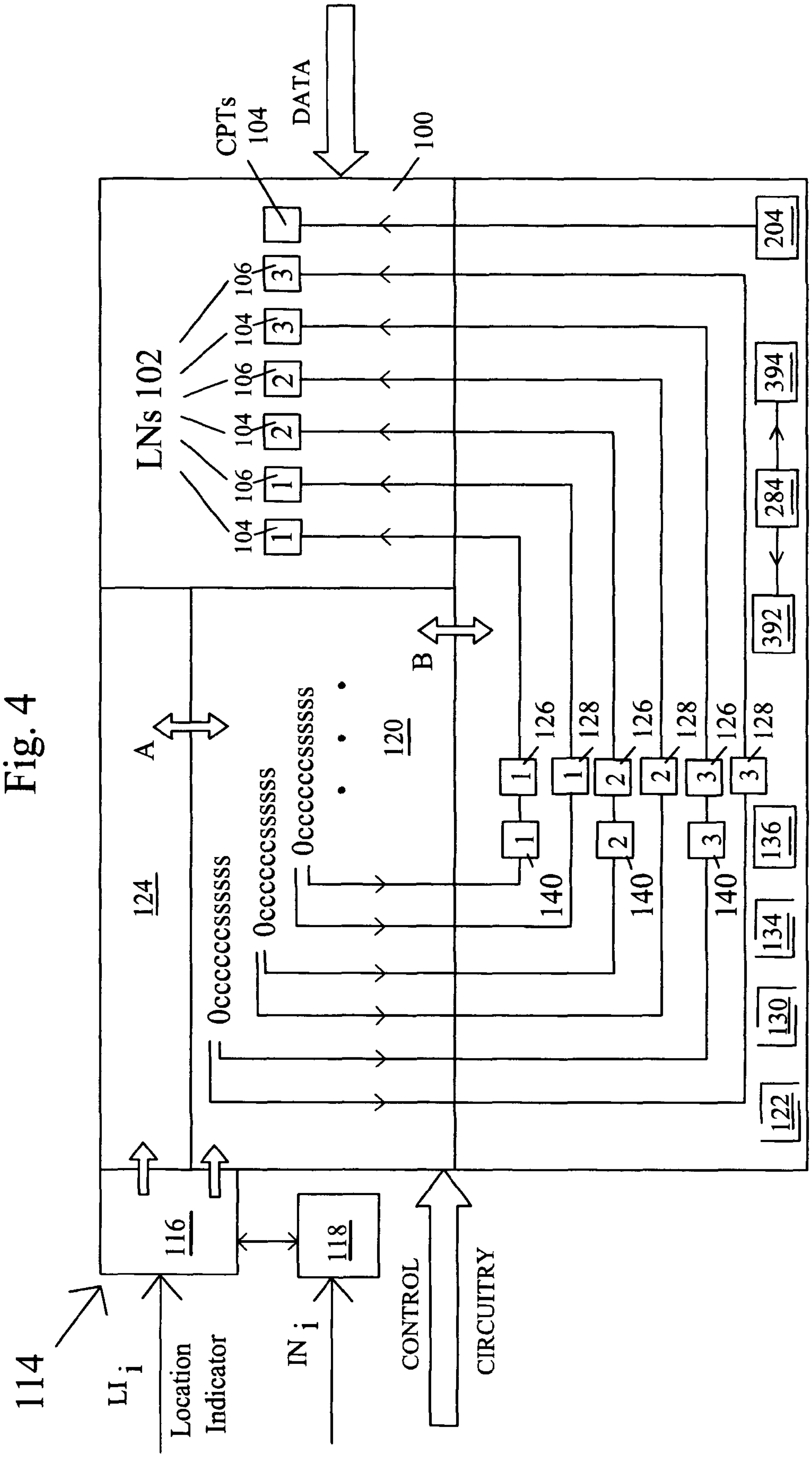
FIG. 4 (sheet 4) is a block diagram of an "Instant Logic™ Module" (ILM) 114 as one embodiment of the second main aspect of the invention, which is the circuitry used to place enabling bits onto the PTs 104, 106 in FIG. 1 so as to structure the circuits needed to carry out the desired Information Processing (IP).

FIG. 3(*c*) shows two blocks of the same size as those of FIGS. 4(*a*) and 4(*b*), but joined together to yield 200 LNs 102. If there were connections in all four directions there would be 800 connections, but now with only six 10-LN 102 sides lacking outward connections as now shown in FIG. 3(*c*), there would be 6×10=60 fewer connections (one outward connection being missing from each edge LN 102), i.e., 800-60=740 actual connections to yield a CQ of 740/800=0.925. The NCQ would then be 0.925/0.9 1.0278. That result comes about because the "2" side of FIG. 3(*a*) and the "4" side of FIG. 3(*b*) that had been unconnected in FIGS. 3(*a*) and (*b*) have now been connected in FIG. 3(*c*), thus to reduce the number of unconnected sides by two, equivalent to 20 connections, thus to increase the CQ and NCQ as just shown. As would be expected, a rule emerges that the larger the size of PS 100, the lesser the side lengths/area ratio, hence more connections. (It is taken here that the sides of a square have LNs 102 therealong that are "functionally connectable," meaning that the functioning of an LN 102 in one block that connected across the juncture to connect with a LN 102 in an adjacent block would be exactly the same as that between two LNs 102 that were adjacently within a single square.)

Analogous consequences are seen in FIG. 4(*d*) that has four of the FIG. 4(*a*) and FIG. 4(*b*) blocks arranged in the form of a square, thus to have only eight 10-LN 102 or 80 unconnected sides, as shown by the count encircling the drawing in FIG. 3(*d*), out of a total of 4×400=1600 connections (if all were connected), and hence 1600−80=1520 actual connections. The CQ is then 1520/1600=0.95 and the NCQ 0.95/0.9=1.0555. These four squares if separate would have had 4×4=16 10-LN 102 (or 160 LNs 102) that were unconnected on one side. However, FIG. 3(*d*) now shows four edge-to-edge joinders involving 10 of the LN 102 connections on each of the two facing sides of a joinder, or a total of 80 LNs 102 now joined, thus to cancel out eight of the unconnected side deductions and leave only the eight unconnected sides shown in FIG. 3(*d*) and incorporated into the calculations just made above.

It would perhaps not be immediately obvious that the exact way in which those 100 LN 102 blocks are brought together to form a larger composite will also affect the number of "missing" inter-LN 102 connections. In brief, it can be seen that both of FIGS. 3(*d*) and 3(*g*) have four 10×10 blocks joined together, but while FIG. 3(*d*) has only eight unconnected sides, FIG. 3(*g*) has 10 such sides and hence 20 more LNs 102 that are unconnected on the outward sides thereof. The FIG. 3(*g*) structure has 1600−100=1500 connections, a CQ of 1500/1600=0.9375 and an NCQ of 0.9375/0.9=1.042, while the FIG. 3(*d*) structure, while also having 1600 total LNs 102, lacks an outward connection on only 80 of those LNs 102, thus to yield 1520 connections, a CQ of 1520/1600=0.95, and an NCQ of 0.95/0.9=1.0555.

To examine that advantage of size further, if the blocks of FIGS. 3(*a*)-(*g*) had 100 LNs 102 on a side, there would be a total of 10,000 LNs 102 and 400 unconnected sides, thus to have a CQ=9,600/10,000=0.96, that upon joining two such blocks together would yield 20,000 LNs 102 but only 600 unconnected LNs 102, thus to yield 20,000−600=19,400 LNs 102 still connected, from which the CQ=19,400/20,000=0.97, thus to yield a Normalized Connection Coefficient (NCQ) of 0.97/0.90=1.077, or a 7.7% improvement using the same 0.9 reference CQ as was used with reference to the 10×10 block. Similar calculations as to a block of 1,000 LNs 102 on each side yields CQ=(1,000,000-4,000)/1,000,000=0.996 and NCQ (again relative to the 10×10 block) of 0.996/0.9=1.1066, or an improvement of 10.66% in the computing power per square of a 1,000×1,000 LN 102 square over a 10×10 LN 102 square.

Two "rules of thumb" that might then be followed in designing an ILA and PS 100 would be to make the LN 102 array of PS 100 as large as possible, in order that the NCQ will also be larger as shown above, and also to make the structure as compact as possible by maximizing the number of inter-LN 102 connections that are added by joining the separate LN 102 blocks together. This latter point is seen in the comparison of the extended form of the four-block structure shown in FIG. 3(*g*) and the more compact form shown in FIG. 3(*d*). The latter form of a three block structure in FIG. 3(*f*) shows a "blank" available for a single block in the lower left hand corner, that when filled with another block would make two joinders at the 6 and 7 edges for a gain of four connections, while only one joinder is made in FIG. 3(*g*), at what had been the 6 edge, thus to gain only two 10-bit sides. Fortunately, those rules describe a design process that would be the most natural to follow in any event. There is one issue, however, in which the size of the PS 100 has a practical bearing. It was suggested earlier that instead of using the ILM 114 as shown in FIG. 4 (sheet 4) wherein the PS 100 is on the same chip as are all of the rest of that circuitry, a complete ILM 114 might be formed by having all of PS 100 on one IC and the rest of that circuitry on a second IC. What has just been set out shows that if the number of inter-IC connections that would be required in the 2-IC scheme could in fact be accommodated, that latter 2-IC scheme would provide the higher efficiency, at least in terms of how many of the SPTs 106 in the full structure were actually connected to a destination LN 102 at their distal ends.

The issue of inter-connectability leads naturally and directly to the issue of scalability. The test for scalability is usually expressed in terms of whether or not doubling the size or number of some reference devices, often with reference to a single von Neumann computer being coupled with another such device so as to work in parallel, would double the computer power (CP), i.e., whether the CP varies linearly with, or "scales" with, the computer size. (Of course, that multiple need not be two, so as just to double the original size, but could be any integral factor. This same issue sometimes expressed in terms of comparing apparatus having first N and then N+1, etc. units.) From what was said above, it appears that the ILA is not only scalable but indeed super-scalable, meaning that the amount of CP gained by enlarging the reference apparatus by some factor will yield more CP than the product of the original CP and that factor, thus varying more than linearly. To Applicant's knowledge neither true scalability nor super-scalability has been achieved in any apparatus.

The matter of scalability has also often been discussed with reference to the so-called "Amdahl's Law" referred to above that centers on the concept of joining a number of basic operational units together in parallel, and an inherent limit to the amount of CP that could be obtained in that manner. As noted above, in the Amdahl analysis that limit was seen as being a matter of the relative amount of serial and parallel programming that was being carried out, but as seen here, what creates that limit seems instead to be the need for "networking" circuitry and associated software in order to cause those units to operate cooperatively.

The issue of scalability with reference to any Instant Logic™ Apparatus (ILA), on the other hand, cannot rest on issues of software, or whether the operation can be changed from serial to parallel, since the ILA operation is inherently parallel, and in any event an ILA has no software. The reference unit of an ILA, rather than being an entire computer, can be taken to be the circuit shown in FIG. 1 (or any other such repetitive unit), since that FIG. 1 circuitry alone can be structured to form at least a fully functional inverter circuit, and to have a larger and more powerful ILA simply means to have incorporated more of those circuits. (The same calculations could be carried out within an ILA using ILMs 114 as a basis, or within an ILM 114 using LNs 102 or a PS 100 of a particular size as the basis, and the results would all be the same, in principle, although the actual numbers derived might be different. The most practical way of forming ILAs of varying size and capacity would be by adding or deleting ILMs 114, provided the circuitry external to the ILM 114 were adapted, for example, to accommodate as large a number of LNs 102 as would ever be used.)

The actual ILA operation is inherently parallel at the outset, whether as to entire algorithms, sub-circuits of algorithms, or LNs 102, so no test of the effect of changing from serial to parallel operation can be made. That is, various gates of the same or different kinds will be operated serially in some sequence, as is the nature of gate circuits, in parallel with that first circuit, so the IL process is parallel at the outset. In particular, to enlarge the size of an ILA so as to gain more CP does not involve adding components that must then be networked by additional hardware, but only more inter-connectable components that are identical to and function in exactly the same way as those already present, and require no network.

As to scalability, two "von Neumann" computers that each provided a computer power CP that were connected together in order to function cooperatively would require more software and/or hardware in order to provide that cooperative action, so it would not be possible to obtain from that "parallel computer" twice the CP of the original computers at a cost that was no more than just doubling the cost of the individual computers. In actual parallel computers having perhaps thousands of simple "computers" joined together, the hardware and software "network" that would permit the whole system to function will itself require a certain amount of power. A mathematical expression of that situation, with $CP_{PP}$ being the computing power of such a parallel processing (PP) system, can be given by $$CP_{PP}=2CP-P_N, \tag{2}$$

where "$CP_{PP}$" is the total computing power for a two-computer parallel processor and $P_N$ is the amount of power taken up by operating that network (that is, whatever the total power requirement may be that exceeds the sum of the power requirements of the individual computers).

On the other hand, if a composite, 2-unit processing system were built by combining two basic units in such a way that the procedure actually added to the resultant computing power, then the correct formula would be $CP_X=2CP+P_X$, where the "x" subscripts refer to cases in which, instead of adding components that themselves had no CP but yet absorbed power, the second "computer" was added to the total by a process that itself added additional CP, rather than only consuming more power. The previous analysis using FIGS. 3(*a*)-3(*g*), wherein every joinder of one block with another adds computing power in that joinder itself (irrespective of the gain from the geometry used), and at no cost whatever, suggests that such is indeed the case with respect to Instant Logic™, thus to yield $$CP_{IL}=2CP+P_{IL}, \tag{3}$$

where the "IL" subscripts refer to those methods and apparatus, and $P_{IL}$ is the amount of computing capability that is added by the fact that the very joining of two IL units (e.g., ILMs 114), or the faces of two computing blocks, rather than being a power sink like a network would be a CP source.

The "worst case scenario" in building up a parallel processor would be that of joining up a number of actual PCs, i.e., the whole tower. A "PP" computer built up of small μ-based PEs would at least avoid that cost, but still, as the number of PEs grows larger the size of the network grows geometrically. That is not the case with IL, since complete interconnection of all LNs 102 is an inherent part of the initial structure: whatever had been the connections to an ILM 114, for example, would increase only linearly as that number of ILMs 114 increased linearly. In the PP computer, the $/CP ratio increases as the computer gets larger, and the CP/PE ratio decreases, while precisely the opposite is the case with Instant Logic™.

The most basic unit for the IL case could be one of the circuits shown in FIG. 1. Each new inter-LN 102 connection will of course require two LNs 102—one to send the signal bits and the other to receive. (In practice, the most useful basic reference unit would probably be an ILM 114, whereby more CP would be obtained simply by connecting those ILMs 114 together as was demonstrated above with reference to FIGS. 3(*a*)-3(*g*).) Since the connection to be used, although necessarily different mechanically, is still precisely the same kind of connection as exists throughout the body of a PS 100, with the term "connection" again referring to all nine of the SPTs 106 that extend from one LN 102 to another, wherein one more connection will add one more unit of CP.

Means are almost desperately being sought by which even the most massive IP requirements of this "Information Age" can finally be met, and from the unavoidable Eq. 2 and accompanying analysis, it is suggested that no "Massively Parallel Processing" (MPP) effort can meet those needs, for the reasons just stated. Instant Logic™, on the other hand, will in fact be able to provide as much CP as may be needed, for as much IP as could be imagined. Of course, that means outperforming any existing "supercomputer," such as the IBM Blue Gene (that reportedly failed to achieve the scalability that had been sought), and apparatus such as that projected by the Tokyo Institute of Technology to yield 100 trillion calculations per second, and even the projected 100-fold expansion of that device. ("Japan Will Use U.S. Technology in Supercomputer," *Wall St. Journal*, Nov. 15, 2005, p. B2.). Also, it was recently reported (*EE Times*, Issue 1414, Mar. 13, 2006, p. 14) that Cray, Inc., plans to bid for a $220+million contract with the Defense Advanced Research Projects Agency (DARPA) for the development of a petaflops computer that would use microprocessors. It would seem, however, that what has been sought has now been done, at least on paper, in this Application. As to an actual rather than just a legal reduction to practice for patent purposes, there seems not to be a single component or use thereof in this Application that is not well within the current state of the art as to the fabrication of electronic components, so the actuality of the ILA seems to be assured.

Besides having eliminated the "shuffle" of data and instructions back and forth, another source of delay in current practice (whether serial or parallel) that IL eliminates is the need to link various code fragments together in order to have defined some operating subroutine. Any program will have large numbers of short subroutines that will be scattered throughout the hard drive, for which "direct link locators" (dlls) have been conceived as a means for locating all of those scattered bits of code and stringing them together. During the time in which those dlls are being applied, no productive information processing is being carried out, i.e., there are no actual arithmetical/logical decisions being made, but only another kind of non-productive "shuffling." Rather than needing to carry out any process such as that, as usual IL simply structures whatever subroutine may be needed at the site of the data. In short, since an ILA will have no programs, it will likewise have no assemblers or compilers or anything like either. (As noted elsewhere herein, IL will have a number of "code modules" available that set out the code lists for a number of circuits or parts thereof and that can be copied out of CODE 120, and will then appear when needed among the code lists employed as an algorithm is executed.)

On that basis, that an ILA could be super-scalable rests on the premise that the CP of an IL-type apparatus depends in part on how many SPTs 106 are present in that ILA that actually connect from one LN 102 to another, so that if the number of such connecting SPTs 106 can be increased without adding more SPTs 106, the CP will increase more than linearly. The previous calculations show that when doubling the size of any such reference device by coupling two devices together, by analogy to the 10×10 squares of FIGS. 4(*a*)-(*g*) the NCQ (that perhaps can now better be given the more meaningful name of a "Scalability Factor" (SF)) will have the value 1.028 and if quadrupling that size, SF=1.055. Having normalized the SF of the reference system to 1, any system for which SF>1 would be super-scalable, while any for which SF<1 would be sub-scalable. (Cf. Lipovski et al., supra, pp. 31-33 in terms of linearity.)

From the foregoing discussion, the SF is simply the ratio of the CQ of a particular computer embodiment (containing N of the initial reference blocks) to the CQ of that reference block. The actual power of those multi-block computers would then be $P_i=NSF_i$. For the one-block computers of FIGS. 4(*a*) and 4(*b*), as the Normalized CQ (NCQ) the $SF_1$ value would of course be 0.9/0.9=1.0, with the SF for the two-block FIG. 3(*c*) then being $SF_2=0.925/0.9=1.0278$ and the resultant CP $P_2==NS_2=2(1.0278)=2.055$. For the computer of FIG. 4(*d*) having four blocks, $SF_4=0.95/0.9=1.0555$, and $P_4=4.2222$.

In general, a number of ILMs 114, along with the requisite user-operated control circuitry and peripherals (monitor, "Graphic User Interface" (GUI), printer, etc.) therefor, are projected ultimately to form a complete IL-based IPA, i.e., an ILA. The larger that ILA may be, i.e., the more ILMs 114 are included, the more computer power will be available, limited only by the need, which if truly large would be limited only by such physical requirements as the amount of space available or energy requirements, and by the cost. The present application, however, is limited to IL as a method and to the ILM 114 as the minimal apparatus to which IL methods can be applied for the purpose of performing IP.

Turning back now to that circuitry, in what follows a "passive" circuit is a structure that has a circuit layout, as in FIG. 2, but has not been provided with power and is unstructured and hence could not yield an output if provided with an input. A passive circuit becomes active if selected CPTs 104 and SPTs 106 thereof are "enabled," which means to be made electrically conductive along some set of lines that would form a circuit. An "active" circuit is then a region of passive circuitry that has in fact been structured into particular circuits that have also been powered up, and will yield an output if an input is applied thereto. To be "active" a circuit need not actually be operating, but only to be ready to operate should an input arrive, in which case the circuit would then, of course, become "operating."

The circuits to be shown hereinafter that together make up the Instant Logic™ Module (ILM) 114 of FIG. 4 (sheet 4) will be of those three general classes: (1) the fixed, passive ILA circuits of FIG. 2 (which is an excerpt of PS 100 to be used as a template) to which the IL methodology will be applied in order to structure the passive circuits into active circuits and then operating circuits when inputs are applied; (2) hard wired code selectors and memory, called "ILA circuits," that carry out that circuit structuring; and (3) circuits such as those of FIGS. 13-17, 19, 24-25, 28, 31, 34, 37, 40, and 50 designated as "IL circuits," that are temporarily active and would have been structured through the application of enabling voltages to that first class of circuits by the second class of circuits, with the resultant Class 3 circuits and any necessary data then to carry out the actual arithmetical/logical operations of the Information Processing (IP) itself. The Class 3 circuit elements exist for only an instant, i.e., one cycle, unless retained through additional cycles if the function just carried out was to be repeated.

In the drawings these circuit classes are easily distinguished since (1) the hard-wired "Class 1" circuits that make up the PS 100 appear at the transistor level as fixed arrays of LNs 102 uniformly interlaced with hardwired PTs 104, 106 that are physically but not electronically connected between the LNs 102; (2) the "Class 2" designating circuitry is hard wired at a location (CS 120) within the ILM 114 of FIG. 4 but external to PS 100, with the components thereof appearing generally as various gates; and (3) finally the IL circuits that, unlike the first two circuit classes, are not in hard-wired form but would have been structured by the first two classes of circuits by way of forming temporary electrical connections between specific LNs 102 by enabling specific CPTs 104 and SPTs 106.

Turning now to the layout of the apparatus, that would preferably be entirely modular. The fabrication would have the PS 100 as one portion of the ILM 114 IC (FIG. 4), then Code Cache (CODE) 120 that holds the codes as a second part, and then the hard wired active circuits that apply those codes to PS 100, these being the INE 116, LUT 118, CSU 122 that contains CCS1 126 and SCS 128, CLC 132 (to be shown later), that along with PS 100 are within ILM 114. Also included in the ILM 114 is a "Test Array" (TA) 124 that plays no role in the actual operational sequence but has the same structure as does PS 100 and can be used to test out new algorithms, all of which components make up the third and last part of the complete ILM 114.

Two minor components are a user-operated "Pass Transistor Enabler" (PTE) 204 contained within the "Code Selector Unit" (CSU) 122 that can be used to generate a "1" bit that would enable a particular PT for whatever purpose, such as initiating the execution of an algorithm, and Clocks 130 for use when the algorithm execution is to be clock driven and for other such purposes, the reference number thereon being meant to represent either a single Clock 130 or a number of Clocks 130 able to drive a number of algorithms. (The relative sizes of the components in FIG. 4 bear no relationship with the actual sizes of those components in the actual apparatus, but result only from the detail needed to be included in each case in order to explain the respective components.) The ILM 114 is controlled by external control circuitry that would be part of a complete ILA that is not encompassed in this specification.

It will be understood, however, that the structure suggested by FIG. 4 in which all of the ILM 114 components appear to have been fabricated on a single IC is only one of a number of different ways in which those circuits might be brought together, and other ways of distributing the ILA, memory, and code selecting circuitry, etc. as could be conceived by a person of ordinary skill in the art, particularly including having the PS 100 on a separate IC, would fall within the spirit and scope of the invention so as to be encompassed by the claims herein. That component distribution issue would be a design choice that would rest in part on such matters as having to form both inter-chip and intra-chip connections, how many such connections could an IC have, etc., and all of such possible choices, as arising from different circumstances, would fall under the scope of the appended claims.

Also, except for not including diagonal connections between LNs 102, the PEs as in FIG. 1 shown herein are seen to include SPTs 106 for as many different connections between adjacent LNs 102 as could be made without duplication. It had been thought originally that at least some of those SPTs 106 would be so rarely used as to be nearly superfluous, so the IL methodology could perhaps be practiced nearly as well without certain PTs that could then be deleted from the design. However, the circuits structured in this disclosure alone suggest that such is not the case—a single circuit—that could be a very important circuit—that could not be structured because an SPT 106 was not available would detract too much from the versatility of this invention.

The intent in the present ILM 114 design is to show maximum flexibility (except for not including those diagonal lines), however, and the particular design then described is not to be taken as being limiting. Alternative PEs that had fewer PTs, or PEs that had other kinds of connections, or had included those diagonal connections, or any other various kinds of PEs that would carry out some IL processes but not others would also fall within the appended claims. It is not the purpose here to identify any "best" ILA, since it is likely that a structure that was optimum for one type of operation might not be so for some other type of operation; i.e., there may well be no such "best" embodiment, except perhaps in some cases for each of some range of purposes. The purpose here is simply to illustrate the "Instant Logic™ Paradigm" (ILP) with one archetype of optimum design insofar as can be determined at present.

The description of an ILM 114 given herein centers on bringing out each of the operations that will need to be carried out, and not the actual structure of an IC. For example, the development of code for an algorithm may begin with a number of circuits drawn on paper, with the transistors therein being numbered using ordinary decimal numbers, which circuits must then be translated into codes that refer to those transistors as laid out in PS 100 using the binary "Index Numbers" $IN_i$, the numerical conversions so required preferably being carried out before the actual design is begun. An operational sequence is laid out that takes a single bit (or pair, if the circuit so requires) through the entire process so as to identify all of the steps of an algorithm, and with regard to a first such algorithm the user has complete design freedom. That conceptual analysis, however, does not necessarily set out what will be the structure of any ICs.

The PS 100, made up as it is of some number of interconnected instances of the PE of FIG. 1 (also shown in the 2-D template of FIG. 2) is of course the "kernel" of the whole Instant Logic™ system, through which all of the actual IP takes place. the specific purposes of the hardwired Class 2 circuits other than the PS 100 are as follows: (1) "Code Cache" (CODE) 120 stores the code for each separate LN 102 that is to be used in structuring a circuit or algorithm; (2) since the identifications of the LNs 102 are originally seen in CODE 120 as decimal numbers designated as "Location Indicators" ($LI_i$), the "Index Number Designator" (IND) 116 converts those decimal numbers into the binary notation required in PS 100; (3) "Look-Up Table" (LUT) 118 that correlates decimal and binary numbers facilitates that conversion; (4) "One-Level Circuit Code Selector" (CCS1) 126 interprets the code that identifies the "Circuit Pass Transistors" (CPTs) 104 that are to be enabled so as to structure the desired IL circuits; (5) "Signal Code Selector" (SCS) 128 interprets the signal code and transmits enabling "1" bits to the "Signal Pass Transistors" (SPTs) 106 so as to structure the signal pathways for each IL circuit; (6) "Code Line Counter" acts firstly to separate entries that are actual code lines and those that signal the termination of a cycle, and secondly provides a running count of both the LNs 102 being used and the number of cycles completed; and (7) a "Test Array" (TA) 122 is used for testing codes as noted above.

Beyond the LN 102 identification code itself, the "Code Line" (CL) is made up of one set of six circuit code bits "cccccc" and from one to three sets of six signal code bits "ssssss." Those circuit code bits are made up of three 2-bit codes, wherein "01"=1 identifies the CPT 104 that connects from the DR 108 terminal of the LN 102 to $V_{dd}$; "10"=2 is the CPT 104 that connects from the GA 110 terminal to an external signal source; and the "11"=3 CPT 104 connects from the LN 102 SO 112 terminal to GND, those 1, 2, 3 numbers being shown in the circuit of FIG. 1. Those codes must appear in that numerical order in the "cccccc" representation. To enable a particular CPT 104 has two aspects: (1) the 2-bit code for the particular CPT 104 must have been entered; and (2) that code must have been entered into the "cc" position along that "cccccc" sequence that corresponds to that particular CPT 104 in the above numerical order.

The same need to maintain the proper order applies to the three signal code bit pairs "ss." However, while in the circuit code case one bit pair "cc" entirely defines a particular CPT 104, in the signal code case three bit pairs are required to identify an SPT 106. The identity of a particular SPT 106 rests on (1) from which terminal of an originating LN 102 ("originating transistor" or "OT") does the proximal end of the SPT 106 connect; (2) in which direction does the SPT 106 extend (thus to identify the receiving LN 102 ("receiving transistor"

or "RT"); and (3) onto which terminal of that RT does the distal end of that SPT 106 connect. That signal code is defined in the following Table III:

TABLE III

| SPT 106 Codes | | |
|---|---|---|
| Terminal of Originating LN 102 | Direction from Originating LN 102 | Terminal of Receiving LN 102 |
| 01 = DR 108 | 01 = rightward | 01 = DR 108 |
| 10 = GA 110 | 10 = upward | 10 = GA 110 |
| 11 = SO 112 | 11 = inward | 11 = SO 112 |

Each CL that appears as "cccccccsssss" would have been entered into CODE 120 as an ordinary series of 2-bit numbers, with each CL being given an $LI_i$; number for which the $IN_j$ thereof used within PS 100 is identified by the IND 116 and LUT 118. That code could be stored anywhere in CODE 120, with each location being physically connected to a circuit made up as a CCS1 126/SCS 128 combination in CSU 122 that connects to that LN 102 in PS 100 that has the $IN_j$ number "iiiii ... " as determined by IND 116 and LUT 118. Since that first code entry could be located anywhere, in selecting a particular LN 102 in PS 100 at which the circuit is to start the user will then have "automatically" designated that "iiiii ... " code that corresponds to the desired $LI_i$; in CODE 120. If that space-saving process of de-structuring LNs 102 for subsequent restructuring for some next task is to be carried out, with each CODE 120 location corresponding to the location of the LN 102 in PS 100 for which the CPTs 104 and SPTs 106 thereof are to be enabled, and in the execution of the algorithm the LNs 102 in PS 100 will thus be used repeatedly, in order to maintain that one-to-one correspondence between code locations in CODE 120 and LNs 102 in PS 100, there must also be a "master" code list that will continually "update" the contents of those code locations in CODE 120 that each connect to a particular CCS 126/SCS 128 combination that connects to the LN 102 in question with the code that will bring about that new structuring.

For example, the entry for the first LN 102 might have been placed at a location within CODE 120 that had $LI_i$ =423, which is located by reference to a designated central point in PS 100, selected as a matter of standard PS 100 operation to be the binary equivalent of 220, since that 220 $LI_i$ appears at the node for which in an 8×8×8 array the coordinates are x = y=z=4, near the center of the array so as (presumably) to give have smaller numbers to express the distances along each axis to the desired starting point. The decimal $LI_0$ code as placed in CODE 120 and ultimately PS 100, e.g., at $LI_0$ =423, might have been for reasons of seeking to set up what was thought to be a logical sequence of algorithms for purposes of menu selection, or where there was space to replace one algorithm with another, but more likely because only that region had sufficient free space available. Such a change would not affect the actual operation in PS 100 at all, so long as that selection led in some way to the actual location in PS 100 that the user had selected.

The reason for using that indirect addressing rather than direct addressing is that a large number of $LI_i$; numbers (let alone a group of $IN_j$ numbers) would tend to appear as just one big blur, i.e., would not likely present a very clear picture of where the LN 102 was to be located. To avoid having willy-nilly selected some LN 102 that would lead to "algorithm collisions," a proposed starting point could be selected that would have a position relative to that central point that was quite clear. The locations of any other algorithms present would also be clear, so the starting point of a new algorithm could be selected that would be a lot less likely to cause collisions.

Then to use the starting point 220 as a reference, the x', y', z' location having the number $LI_i$=423 will have the coordinates x'=4±δx, y'=4±δy, z'=4±δz, where δx, δy, and δz are the orthogonal distances between the respective locations x, y, z and x', y', z' along those respective axes, so it is necessary to establish those δx, δy, and δz values. The desired location could have been picked by a cycle-by-cycle inspection of the LNs 102 being used by other algorithms, and perhaps a chart of every plane would have been used to identify that 423 LN 102, but that would be a tedious chore and would still leave the $LI_i$ values for all the rest of the LNs 102 in the algorithm to be determined. Those distances could also be taken from the charts by which that first $LI_i$=423 had been identified—another tedious task to be avoided. To accomplish that task, there is then introduced a numerical transform introduced by way of a "Code Transform" (CT) algorithm stored in CODE 120 so as to correlate the $LI_i$ numbers with the starting number 220 in PS 100.

The initial $IL_0$ 220 coordinates (4, 4, 4) would first have been entered in digital form, then to be converted to binary form in INE 116, after which the CT formula, although not needed for this first determination since already known, will calculate the differences between those 4, 4, 4 numbers and those of the desired 423 starting point to obtain the δx, δy, and δz values. (These values would possibly already be known if the process of locating the desired starting point had been carried out one way or another, most likely by using a set of charts of each plane in the array. Both the reference node=220 and the desired starting point would have been marked on those charts, and then it would only be a matter of counting off the δx, δy, and δz values.) If the user were to draw in each successive node of the algorithm and count off the δx, δy, and δz values relative to each last determined location, i.e., each new $LI_i$ found would be placed in the role of the $LI_0$ for identifying each next $LI_i$. Once found, those the δx, δy, and δz values for that algorithm would not change, so the same set of x'=x±δx, y'=x±δy, z'=x±δz formulae, with those x, y, z, δx, δy, and δz values now filled in, could be used relative to any starting point in the PS 100. (Ultimately, every algorithm would have had those formulae all put together, and would serve as documentation relative to the algorithm.)

That is, the "cccccccsssss . . . " CLs for each LN 102 would be known, and upon entry of each CL for each LN 102 used, there would also be entered the applicable x'=x±δx, y'=x±δy, z'=x±δz formulae by which each next LN 102 was to be identified, with x, y, and z in each case being the coordinates of the last found $LI_i$ then serving as the $LI_0$, but with those x, y, z, δx, δy, and δvalues for the particular algorithm filled in, using the x, y, z, δx, δy, and δz values just found. Each new $LI_i$ value so found (or actually the corresponding "iiiii . . . ," value) would then be conjoined with the "cccccccsssss . . . " code for the $LI_i$ just found. As each new LN 102 is located, the coordinates thereof would be copied into the formulae as being the $LI_0$ coordinates for finding the next LN 102. (The above indications of what next is to be done do not refer to human actions, of course, since for each algorithm entered there would be provided an algorithm having the formulae therein for each of the aforesaid moves from one LN 102 to the next, all of which formulae and the program itself would be unique to the particular algorithm, since based on whatever series of LNs 102 that would make up the circuits required by that algorithm.)

It will be shown below how that process can be facilitated for a user in a "manual" version of the process by the use of a physical overlay by which the $LI_i$ values for the rest of the LNs 102 in the algorithm can be determined from the $LI_i$ value (e.g., 423) of a first entry. By that method, when a user examines a drawing of a circuit that is to be installed in an ILA along with a layout of the PS 100 (e.g., as a set of charts of all the planes or on a monitor) showing which LNs 102 have already been allocated for other use for each cycle, an LN 102 that faces out onto an amount of free space large enough to be useable as a starting point for the circuit would be selected, bearing in mind that the circuits to be structured will shortly be de-structured, so it is not necessary to find enough space for the entire algorithm at once. Upon entering into CODE 120 the CL for that first LN 102 to be used at the point so selected, the circuit drawing being followed will effectively establish the locations of the LNs 102 for the entire circuit, and from that point forward, and in that same way, for the entire algorithm.

One algorithm might be distinguished from all others by the number of LNs 102 therein, but certainly by the values of δx, δy, and oz, so with the $LI_i$ values having necessarily been found for all of the installed algorithms, with the δx, δy, and δz values for a new algorithm also being known, a proposed $IL_0$ for that new algorithm could be tested in TA 124 simply by executing the new algorithm using selected $IL_0$ values simultaneously with any number of the installed algorithms to determine whether or not there were any "collisions" in which more than one algorithm sought to use the same LN 102 at the same time.

(In order to avoid making double replacements on each LN 102 that had been moved (i.e., first changing the coordinates to fit the position of the new LN 102 and then substituting those new coordinates into the formula by which the coordinates of the next LN 102 are determined), the LN 102 node that in a $LI_0$ role had provided the δx, δy, and δz values that would have placed the LN 102 that was moved into the new position, could also be used as the $LI_0$ for placing the other LNs 102 that had been caused to move. That is, any node for which the x, y, z coordinates were known could be used to count off the δx, δy, and δz values that would reach the location of another node of the circuit (as determined from a drawing of the circuit), and thereby establish the formulae by which the x, y, and z coordinates of the rest of the nodes in an algorithm, the positions of each of would be defined by the circuits to be structured, could be used to establish the δx, δy, and δz values of all of the remaining nodes. So long as the δx, δy, and δz values extending to the intended locations of the subsequent nodes had been correctly counted out, the formulae so devised would then serve to place correctly the nodes of that circuit or algorithm, regardless of the location from which those δx, δy, and δz values had been measured. Those formulae could then serve to place the nodes of the circuit when starting at any other node selected to be the $LI_0$, i.e., the starting point of the algorithm circuitry.)

Since even the movement of a node by one position would likely have more than one direction in which to move, if alternative structuring paths were to be allowed it would be necessary to include formulae that would apply to each such direction. If it were necessary to "go around" a collision point, the alteration of the algorithm could actually involve the addition of several nodes, perhaps as to a pending collision downward, by adding a rightward node, three downward nodes, and then an inward node, so as to encircle one side of the node at which the collision would have occurred. Without that tactic, the movement of one node would require changing the position of every other node, perhaps from that point all the way on to the end of the algorithm. (This would be a case in which diagonal SPTs 106 between the LNs 102 as were mentioned earlier would be useful, since in that case it would only be necessary to add one node, i.e., by using a downward diagonal SPT 106 to the right and then from the node so reached a diagonal SPT 106 to the left, which would just "skip around" the original colliding node.) In any case, such alterations in an algorithm, even though entailing quite a bit of calculations and time, would not consume as much time as would be required to move the starting point and thus would likely be unnoticeable. In any event the algorithm would not then be in execution so as to be interfered with, or with a long algorithm it might be possible to make the change a good distance away from the location along the algorithm at which operation was taking place at the time, thus to yield enough time to make the alteration before the operation reached the location of the alteration. (Although the foregoing has referred only to making changes in the algorithm then being installed (or possibly sometimes in operation), making changes in the algorithm with which the collision was about to occur so as to "get it out of the road" might be the better solution.)

The ability to make changes in the circuitry during operations, found only in IL, then provides a proper definition of the term "on the fly," and contrasts sharply with the processes described by Barr, supra, in which the program was halted in order to make changes. That capability could apply both to making alterations in an algorithm and to executing an algorithm using different values for the parameters therein. For example, if it were sought to find the maximum or minimum value of some set of data and the values that would need to be given to the parameters thereof that would yield that maximum or minimum value, a procedure with which to start might be to encode a number of repetitions of the algorithm execution, each time using one of an array of pre-selected values for the parameters, until something close to the optimum values thereof were found.

That process by itself would not involve this "on-the-fly" capability (except insofar as the parameter changes were being made by the algorithm itself), but once the optimum values were found to have been "bracketed" somewhere between the values, say, of $A_1$ and $A_2$, $B_1$ and $B_2$, and $C_1$ and $C_2$, those "A," "B," and "C" being the parameters in the equation, the user, having noticed the relative sensitivities of the maximum or minimum value of the equation to each parameter, and assuming that those parameters made their appearance sufficiently distant from the start of the algorithm that time was available to make such changes even as the algorithm was being executed, could start another series of repetitions of executions of the algorithm, at the end of each of which the algorithm would enter and employ a different parameter value as had just been entered as another "try" by the user, with such changed value(s) being within the ranges defined by those bracketing values of one or more of those parameters, by smaller and smaller increments than had been used in the first sequence of executions, thus to "zero in" on the optimum values of those parameters to an arbitrary level of precision.

That would be a rather inelegant, "brute force" but nevertheless effective method of finding optimum parameter values. If the executions of the algorithm were carried out in a pulse-driven mode the speed of those executions could be adjusted so that there indeed would be enough time to change those parameter values before the next execution of the algorithm had reached the point therein at which those parameters appeared, or perhaps the user could simply interpose a delay between executions of enough time to make the changes, the latter procedure of course coming closer to but not quite reaching the procedure described by Barr, in which the execution actually needed to be stopped in order to make changes.

Returning now for a moment to the ILM 114 in FIG. 4 (sheet 4) so as to expand the context in which these remarks are being made, the ellipses " . . . " below the CLs in CODE 120 are meant to indicate that the series will extend on through whatever may be all of the CLs and index numbers that were to be treated by that particular ILM 114 so as, with a sufficient number of ILMs 114, to encompass essentially every LN 102 in PS 100 through the full N range (that in turn would depend on how "tightly" the circuits could be structured, i.e., how few were the LNs 102 that because of the nature of the circuit had to be left unused; the ADD circuit will be shown later to permit a surprisingly "tight" structure). As will be discussed below, these ILMs 114 can be designed to serve a number of LNs 102, or there could also be an ILM 114 for every LN 102. It should also be noted that the figure is intended to depict the process, not necessarily the time sequence, hence the three CLs shown could be getting executed either in series or simultaneously. The single lines from a CL in CODE 120 leading to an INE 116 are to be understood as representing all LNs 102 then being treated, as in representing a complete n-bit "cable" by just one line. (The "0" at the start of those CLs serves as a routing bit that will separate the actual "cccccccsssss" code lines from other entries that merely mark the end of a cycle, as will be described more fully below.)

Again as to those three classes of circuit, the differences in the roles of those circuit classes do not involve any significant differences in the speed of operation that would affect the speed of the whole operation, and where there is a difference an effort is made to initiate the slower of the steps with a "head start," i.e., to begin that step even before the previous cycle had been completed. The need for maximum speed extends over all three classes of circuit, since the process as a whole is quasi-sequential, for which one way of breaking down the full process could be as a circuit structuring step, a data input step, an operating step, and a decay step, so the final speed would ordinarily be expected to be constrained to be that of the slowest of those steps. The procedure is not strictly sequential, however; since some steps run on different time lines, it is not necessary that every step must await the completion of a preceding step in order to be initiated. How that comes about will now be explained.

Firstly, the structured IL circuits will obviously not be able to operate at speeds greater than those of the fixed circuits of the first class by which those circuits of the third class are structured, hence at least the LNs 102, CPTs 104, and SPTS 106 in the PS 100 that are circuits of the first class must themselves be able to operate at least at the high, overall speed that is sought. As to the second class of circuit, those "control" circuits, these are all straightforward, hard-wired circuits that are arranged essentially as are those long sequences of gates noted earlier as being the optimum, i.e., as "the fastest way in which to carry out IP." It is not only the circuits of the third class as structured (and of course the circuits of the first class, which are the same transistors) but also the control circuits that carry out that structuring.

That is, in IL the Class 2 code distribution circuitry is an intrinsic, "built-in" part of an operating cycle with which the Classes 1 and 3 circuits must run in tandem (since other than the data it is those Class 2 circuits that directly bring about the Class 1 circuit operations), and hence must be able to attain the desired Class 3 operational speeds. With the control and operational circuits in a μP-based computer acting in sequence, in IL while one would like to have the code distribution circuitry operate as fast as possible, the fact that one stage might not operate as fast as the other is not all that damaging to the operation as a whole, given the contrast with the "wait states" of a standard computer in any event, but even so in IL the speed of every circuit is still important. (The short "delays" within a cycle to be mentioned below that occur within all cyclical electronic operations are not deemed to rise to such level as to fit into that same "wait state" category.)

The Class 2 circuit structuring, data transfer, and Class 3 operations act in tandem, and hence must all operate at the same speed, since otherwise, in the data transfer context, for example, there could be a time at which data were present but not yet any circuit, or conversely a circuit would have been structured but there were yet no data. In short, IL operates simultaneously in all aspects, i.e., in real time, while the CPU does not (in the sense being used here). (A "von Neumann" computer operates sequentially in the sense of executing one instruction at a time as opposed to parallel processors, so the use of the term "sequential" in that sense is quite proper, but such a computer does not operate exactly sequentially with respect to the several operations involved in the execution of a single instruction; i.e., there are "wait states" during which one or another part of the circuitry will not be operating at all.)

A key and very distinguishing feature of IL is that the "speed" of operation in an ILA is to be controlled not by how long it takes for data to reach the PS 100, but by how rapidly one cycle can be made to follow another. Since changes are to be made in the circuitry at every cycle, then that speed would seem to depend as well on how rapidly such changes can be made. That turns out not to be the case either, however, since the circuit structuring process and the operation of the LNs 102 themselves are to take place on parallel time lines having a common frequency but being a bit out of phase, and the structuring of a second and following LNs 102 of a sequence can be initiated in advance of the arrival of the data.

The IL process would require that the PTs 104, 106 in PS 100 are able to operate at least as fast as the LNs 102, but that is not taken to be a problem since to enable or disable a PT only requires the imposition of or removal from that PT of a voltage, the speed of which depends only on the charge redistribution time by which that voltage differential is brought about, while the operation of an LN 102 requires first the flow of a current so as to place a voltage on or remove a voltage from the GA 110 terminal of an LN 102, and then the length of time needed to generate within that LN 102 the bit being produced by way of a current through the LN 102.

Put another way, with a "1" bit on a DR 108 terminal of a first LN 102 and a line including an SPT 106 therein connecting between that DR 108 terminal and the GA 110 terminal of an adjacent LN 102, to place a "1" bit that is present on that first LN 102 DR 108 terminal onto the GA 110 terminal of that next LN 102 requires two steps, which are (1) placing a voltage on that SPT 106 so as to render the SPT 106 conductive; and then (2) passing a current between the DR 108 terminal of the first LN 102 and the GA 110 terminal of the second LN 102 through that SPT 106, i.e., (1) an SPT 106 is enabled and (2) a current passes therethrough. (If the bit capture process was following a "normal path," the capture would occur in the cycle following that in which the bit was released in any event, so it would seem that the pass transistor speed would still be the fastest.)

Then actually to generate the "0" bit on the DR 108 terminal of that second LN 102 (this being an inverter circuit) further requires the passage of a current through the LN 102 to drain a previously existing voltage on the DR 108 terminal of that second LN 102 to GND, thereby to form the required "0" bit on the DR 108 terminal. It can then be reasonably assumed that to enable a PT so as to allow a data bit to pass therethrough to the LN 102 will take less time than that required for both a current to pass through that SPT 106 and another current to pass through the second LN 102. On this basis, the overall speed of the ILA would then be determined by whichever of the rates of providing data bits (the "Bit Rate") or the circuit operation (the natural frequency of the LNs 102) was the slowest.

Analysis of the process in this way makes it easier to appreciate where it is that a user can exert some control over the process and where not. It is clear that in order for the inverter just described to function, there must be two voltages placed thereon (given that the LNs 102 are already "powered up" by the CPTs 104). One of these voltages is the enabling voltage on the SPT 106 that connects from the DR 108 terminal of the first LN 102 to the GA 110 of the second LN 102, and the other is the data bit on the DR 108 terminal of that first LN 102, and it does not matter which voltage arrives first—both must be present. (FIG. 8 (sheet 6) shows an instance in which a 3-bit AND gate (3AND) 156 is used to ensure that the voltages for all three inputs will be present before the operation can proceed.)

Again as to the LN 102, should it happen that the placement of one of those voltages, e.g., the data bit on the first LN 102, requires more time than the placement of the other, e.g., the enabling bit on the SPT 106, and given also that those two processes of providing a voltage take place independently along different time lines, nothing prevents initiating the slowest process first, so that the data bit will arrive at the SPT 106 at about the same time that the SPT 106 becomes enabled, and hence the overall process can be run at the speed of the fastest process (i.e., either enabling the SPTs 106 or the operation of the LN 102) rather than the slower data transmission step. That statement could not be made if the several steps of instituting the development of an LN 102 output were all on the same time line or all had fixed intervals that had to be in phase with matching time intervals in a parallel time sequence, but if a part of one step was able to overlap another step, the conclusion concerning operation at the faster speed becomes possible.

(The reason that the effect of one step being slower becoming too far out of phase in the next cycle or the one after that does not occur, i.e., where the delay in fact does not propagate forward, is that none of the instances of an operation type take place in immediate juxtaposition with one another. At whatever speed and with any operation, given the limited bit rate, there will be an inactive time interval and then an active time interval within the period of each cycle, and what is meant by "starting earlier" is simply that with the active time interval being longer for the slower process, the inactive time period will be made shorter in compensation, so that the problem of the slower process is "handled" within each cycle, and does not propagate.)

For example, the restructuring of the next LN 102 could be started before the previous LN 102 has completed its operation, thereby to give the former process a "head start" so that the time interval to the operation of the next LN 102 would have been shortened, even though the operation of the LN 102 could not begin until the structuring thereof had been completed. (One might envision having a set of Clocks 130, one for each of the independent processes and all running at the same frequency, but being adjustable as to phase so that the initiation of the steps of each process time line could be set so as to occur at the optimum times relative to each of the other processes.)

Figure 5:
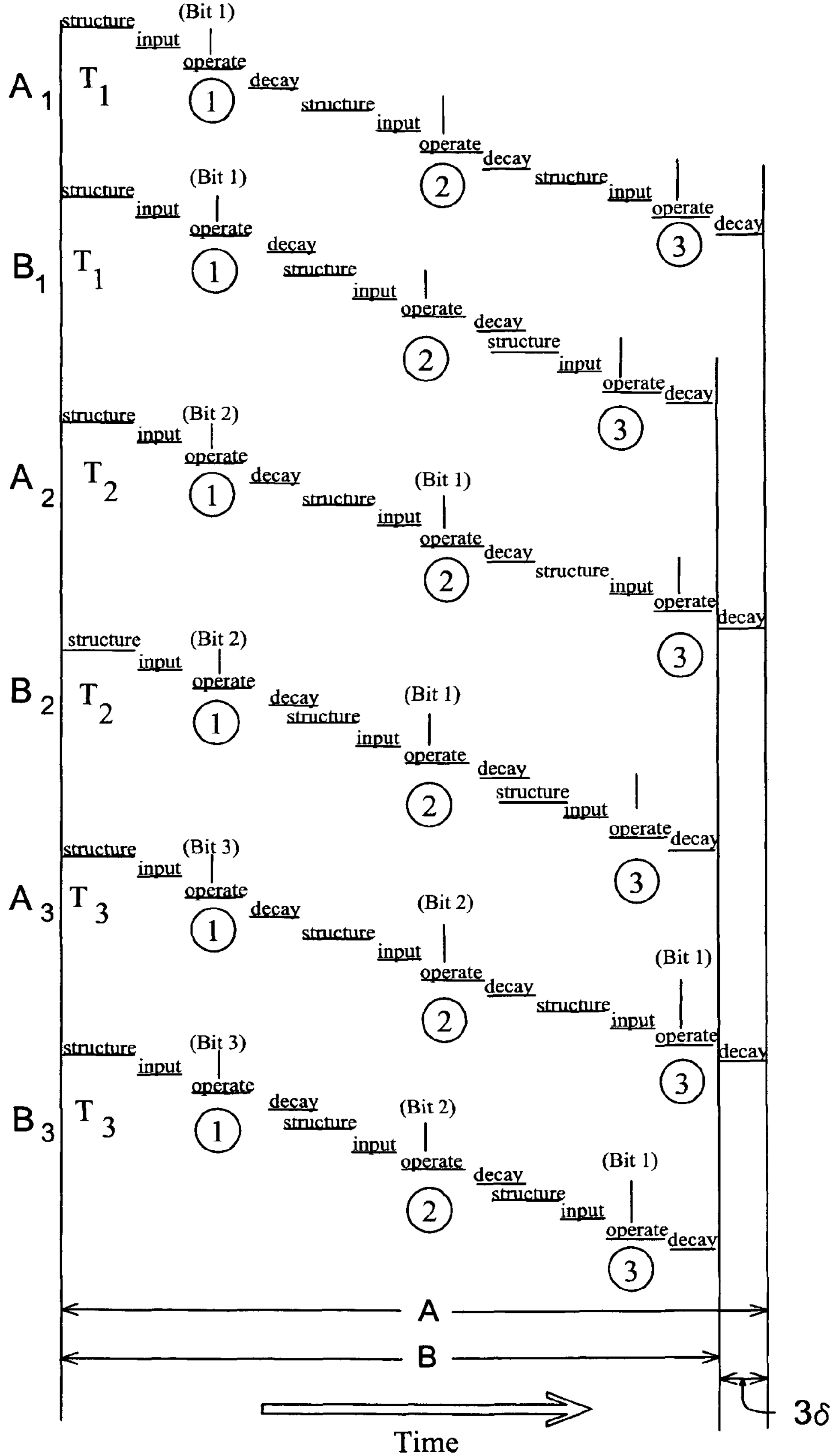
FIG. 5 (sheet 5) shows a sequence of "structure," "input," "operate," and "decay" processes as the steps in a cycle of ILA operation, both when operated in strict sequence and when one step is allowed to overlap another step, the two steps being on two different and independent paths.

To illustrate that kind of process, FIG. 5 (sheet 5) shows a series of three "A" cycles in which the steps thereof take place in a sequential, tightly coupled fashion, in which each step must await the completion of the preceding step before being initiated, thus to yield a time lapse "A" for three cycles. Those three "A" 3-cycle lines of FIG. 5 are alternated with three "B" lines of the same process, wherein one of the steps as to each bit passage overlaps another step for that same bit, so as to yield the shorter time period "B," i.e., B=A−3δ, and δ is the length of time saved in carrying out a single cycle by adopting that overlapping process, i.e., the length of the overlap. More precisely, δ is the amount of time in each cycle during which the structuring of a new LN 102 was in process even as the operation of the preceding LN 102 was still in process, thus to decrease the total time for the three cycles by 3δ. That same calculation would be applied to any other instance in the step sequence at which one sequential step of the overall process was able to overlap another step thereof, the two steps involved in the overlap of course being on different time lines—those shown in FIG. 5 constitute a "meld" of the different time lines being followed by the different steps.

Figure 6:
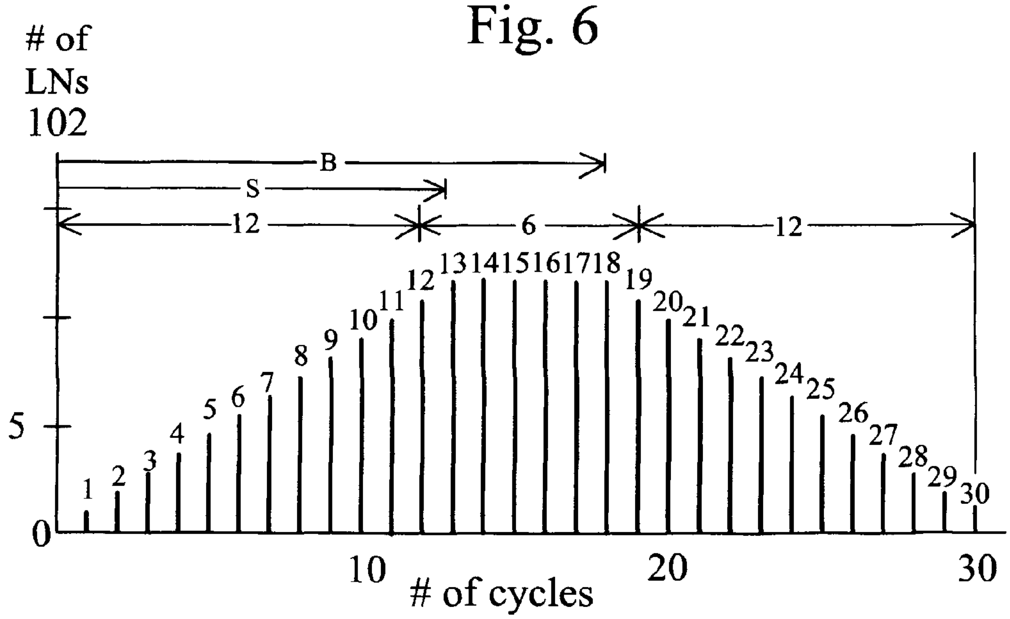
FIG. 6 (sheet 6) shows a histogram of the number of LNs 102 in operation as a function of the number of cycles for a 6-step algorithm and a pre-selected number of data bits. (Because of the available space, FIG. 8 is also shown in sheet 6.)

To clarify what is shown in FIG. 5, the labels "A" and "B" extending down the left side of FIG. 6 identify the time lines to the right thereof as being either an "A" line (no overlapping) or a "B" line (overlapping) version of the same operation. The three "A-B" pairs of time lines extending down the paper represent the time lines for consecutive first, second, and third sequential bits, as shown by the labels above each first "operate" step, while the encircled numbers below each such step identifies the consecutive first, second, and third cycles. In the last "A-B" pair of time lines, it can be seen that the consecutive bits have come to distribute themselves along the LNs 102 of the sequence so that the first "1" bit is leading, followed by the second "1" bit, and then the third "1" bit. As will be seen in the following FIG. 6 (sheet 7), that process will continue on in the same fashion, increasing the number of LNs 102 that are in simultaneous operation until there are no more new data bits to enter, at which time the number of LNs 102 operating simultaneously will begin to "tail off" as the algorithm execution for each particular bit terminates. For the purposes of the drawing, the "structure" step is seen to partially overlap the "decay" step, but that cannot be taken literally since the exact amount of overlap that can be imposed and still have the operation proceeding normally cannot presently be known. Suffice it to say that the two structuring and operating time lines can be moved laterally relative to one another, to determine just how much overlapping would be possible without disrupting the operation.

(Of course, if the same overlapping process were applied to more than one LN 102 in a cycle, that would not add to the time savings, and indeed the process would have to be applied to all of the LNs 102 of each cycle if there were to be any time saving at all.) If there were more than one step in a cycle at which one step could overlap another, the total time eliminated in a cycle would be $\delta=\delta_1+\delta_2+\delta_3+\ldots$, wherein each such $\delta_i$, with i=1, 2, 3, . . . , represents one instance of overlapping. The operating sequence in one cycle of a single LN 102 could hardly reach even 3 steps, but it must be recalled that the circuits and operational sequences set out herein will most often take the LN 102 being described as treating just one bit out of some much larger number of bits required to encompass the full length of the datum segment then being treated.)

In the "B" 3-cycle lines of FIG. 5 it was elected to show that overlap as taking place such that the structuring of the next LN 102 (i.e., sending enabling bits to the CPTs 104 and SPTs 106 of the second LN 102) would be taking place at the same time as the "1" bit on the preceding LN 102 was still decaying. Using adjacent LNs 102 as is done here rather than an input of external data, the "decay" step of the first LN 102 and the later "input" step of the second LN 102 are essentially the same process, and it could as well have been shown that the "input" step was somewhat overlapped with the preceding "structure" step. (Whenever such time or phase shifts are made, these are carried out using the same circuitry (not shown) as is used to control the ILA as a whole.)

In the event it became necessary in the course of executing an algorithm to interject data having an external origin, the times of arrival of those data would have to be made to be the same as those of the data of internal origin. If the transit times of the data bits having an internal or an external origin were different, then the initiation time of the bit entry would have to be altered so that those arrival times would coincide. It is only required that the enabling voltage on the GA 110 terminal of the SPT 106 and the data bit that was to be passed through that SPT 106 on an input terminal thereof will coexist on that SPT 106 long enough for that data voltage to be felt on the GA 110 terminal of the second LN 102, i.e., to be "captured." (The foregoing analysis rests on the premise, to be explained further below, that the PS 100 circuitry has been set up so that the signals follow a "normal" path in which a bit from a first LN 102 will be "captured" in the next cycle by the following LN 102, rather than the faster "race path" or slower "long path.")

Then to summarize the foregoing, within a full cycle there are some steps over which the user has no control as to the time that those steps will require, but there are other steps in which the user can indeed establish the overall time lapse, not by any manipulation of the elements as such, but rather by adjusting the timing of the various events. Because of that phase shifting capability, together with the fact that the various events of a full cycle take place essentially independently, a procedure can be imposed by which a cycle can be completed in less time than would otherwise have been the case. Besides having avoided the von Neumann bottleneck by reversing the Babbage Paradigm, the adoption of this procedure constitutes a second major departure in Instant Logic™ from the earlier practices of electronic information processing.

As an example of this new IL procedure, given that an SPT 106 that was connected between the DR 108 terminal of a first LN 102 and the GA 110 terminal of a next LN 102 had been enabled, and secondly that at the same time a data bit was present on the DR 108 terminal of that first LN 102, that circuit, as an inverter, would bring about at the DR 108 terminal of that second LN 102 thereof a bit that was of opposite sign to the bit on the DR 108 terminal of that first LN 102 in its own fashion, with the length of time required for that output bit on the DR 108 terminal of a first LN 102 to cause an output bit to be formed on the DR 108 terminal of the second LN 102 depending entirely on the inherent operating rate of those circuit components, and the user cannot exert any external, "hands on" control of that process. However, with the circuit structuring process taking place on a physical line that was different from the operational time line, and under separate control, there is an opportunity for the user to control the internal operation of a circuit, simply by adjusting the phase of the data input on one time line relative to the phase of the time line that is being followed by the circuit structuring process. To the degree to which the processes in those two lines can be made to overlap, the operational time line would appear as though that overlapped portion of the circuit structuring process was not even present, and the frequency at which the operational time line operated could be increased.

Put another way, in the von Neumann type of operations the application of those two voltages would take place sequentially, as shown in FIG. 5 (sheet 5) for an ILA circuit. However, if it were possible to have a part of those two events taking place at the same time, then the time required for completion of the cycle as a whole would be shortened by that same amount of time, i.e., the time during which those two events were in process at the same time. Although by what was just stated, once the required voltages have been applied the user has no control over how rapidly the subsequent events will proceed, the operator does have control over the times that the requisite voltages are applied. Since the IL architecture has placed the time for applying those voltages on separate time lines so as to permit one step to overlap another instead of following the "event-event-event . . . " sequence of a von Neumann computer, the second event can be seen to begin before the first event has been completed.

The horizontal time periods indicated in FIG. 5, that would appear to show not only the extent of that overlap but also the length of time for each process, are not to be read literally, since the spacings of those words in FIG. 6 are determined in fact by what happened to be their lengths when printed out, and do not constitute a time scale, and hence those lengths have no relationship to the actual time that each step requires. Similarly, by placing the word "structure" partially under the word "decay" in the drawing it can be shown only in a qualitative way that a time shift occurs, but just as the lengths of the words cannot be used to indicate the time lengths of the respective processes, neither can the amount of overlap of the two words in the drawing be used to show the length of time over which both steps were in process. Even so, the effect of that overlapping on the time required for a cycle (or the three cycles of FIG. 5) is clearly shown—the difference "δ" in the period of the full cycle brought about by that overlapping is clearly visible, even though the exact time period represented by that "δ" is not discernible. (That the 3-δ difference between the lengths of the A and B coincides with the length of the word "delay" in identifying the delay step is purely coincidental, and should not be thought to have any significance.)

As a consequence of that phase shifting capability, to an extent that will be limited by the degree to which the circuit has attained a condition so as to be able to carry out a particular process (e.g., sufficient voltage has been placed on the gate terminal of a CPT 104 or an SPT 106 so as to permit the transfer of electricity therethrough), the circuitry can be "tuned" internally in several ways so as to operate at a faster overall speed, in that the one process can be started before a preceding process has been completed. One would naturally think to give the slower of the two processes a "head start," but in fact which step overlaps another would not seem to matter: any time period during which two consecutive processes were caused to operate at least partially simultaneously, regardless of how that was accomplished and which steps were involved, would delete the time period of that overlap from the overall execution time of a cycle, and once an overlap had been established on a first cycle of an algorithm, of course to include every LN 102 that was then to treat one of the other bits of that particular n-bit datum segment (of which the one just described is but one), that overlap would be present on every cycle thereafter.

It may be noticed that the "peaks" of the cycles, indicated by the vertical lines above the "operate" term and the LN 102 numbers of the successive 1, 2, 3 LNs 102 at which the 1, 2, and 3 bits are seen to appear, are equidistant from one another as to either the A or B lines, and are also in phase with respect to the successive times T1, T2, and T3 in FIG. 6., although because of that overlap process the periods of the B cycles are shorter than those of the A cycles, even though the exact same physical circuit was used in the two different procedures, with the reduction by the user of the time between the production of an output bit on a first LN 102 and the arrival of that bit on the gate terminal of the following SPT 106 being the only difference between the operations of the A and B circuits. The effect of this overlapping process is thus to decrease the operating time of an LN 102, and in part to ameliorate the "side effect" of this first major advancement of in the art of circuit structuring, which is the central theme of IL, and by which the von Neumann bottleneck is eliminated, that side effect being the added delay time of the added SPT(s) 106 in the operational cycle of the circuit, which delay time undesiredly increases the execution time of each LN 102.

It can be seen in the "A" lines of FIG. 5 that if the steps of operating an LN 102 are carried out in strict sequence, the entire time required to structure a circuit will be added to the operational time of the LN 102, as that time would be determined by measuring the frequency of operation of the circuit. The reason that the LNs 102 of an IL-structured circuit inherently operate more slowly than the circuits of an ordinary computer (having the exact same type transistors, etc.) is that the operation of an LN 102 involves an additional step, i.e., the actual structuring of the circuit. That speed loss can at least be partially offset, however, by the above overlap process. As an example for discussion purposes only, it is shown in the "B" lines of FIG. 5 how the circuit structuring of a next LN 102 can be started even as the "decay" stage of a preceding LN 102 was still being carried out, thus to yield a time gain of δ per cycle by "overlapping" two of the process stages. Although certain of the stages may be described in that way as having been overlapped, in practice, and from the process alone, that could not actually be known, nor could the step that had been overlapped actually be identified. What that precise course of events might actually have been, however, would be immaterial, since the only control over the process that could be imposed would be the times at which the structuring of the circuit was to begin and a data bit was to be entered, either from an LN 102 in the PS 100 or from a separate data source, and there would be nothing in that course of events alone that would identify any particular step as having been the one that been overlapped.

As compared to the gain from having eliminated the von Neumann bottleneck, and the other advantages of IL such as achieving scalability, causing parts of the steps to be "overlapped," i.e., to be in process at the same time, is no doubt quite trivial. That process, however, has substantial theoretical significance, since to Applicant's knowledge the extension of a parallelizing process into the "inner workings" of a transistor operation has not previously been shown, and for an obvious reason. Instant Logic™ represents the first case known to Applicant, if the process set out here can be called that, in which there has been any kind of routine "internal" control over the "internal" operation of a transistor, by which is meant the manipulation of the times of entry of the circuit and signal codes and of the data so as to affect the times at which both the data to be worked on and the circuit that would carry out that task would both be present, and that would only have been possible because both an operational time line and a control time line and circuit paths have been provided, i.e., those tasks had been parallelized.

It would necessarily be the first time that any of those procedures were carried out if it was the first time that the circuit in question would have been electronically structured at the time. The reference to the "internal" would apply only if the act of structuring an LN 102 into a circuit or part of a circuit could be called an "inner working." With that caveat, it would necessarily be the case that such manipulation of times would not have been done previously, if it is true, as noted earlier, that the present invention provides the first instance of there being a circuit created electronically where there was none before. Since the circuit structuring and data transfers would be taking place on different time lines and using different external circuitry, it is then possible for the user to control the phases of those processes relative to one another, and perhaps thereby to "compress" the course of events so as to require less total time than would otherwise be the case. The almost fully parallelizable nature of IL could well give rise in the future to other usages of that procedure that would be even more useful.

With respect to the dynamic operation of an ILA as a whole, FIG. 6 (sheet 6) shows the number of algorithms that would be in operation at the same time following the initiation of a single 13-cycle algorithm, and additional bits up to a total of 30 were entered into the same starting LN 102, so that as long as there were both more data bits and more LNs to pass through in the algorithm, each new bit entered would increase by one the number of instances of the algorithm being executed simultaneously. More precisely, FIG. 6 shows the number of executions of a single algorithm that can be taking place at a single time, if it is taken that the entry of each new data bit is indicative of a new execution of the algorithm. As had been shown in FIG. 5, in each new cycle the bits then being operated upon would move one LN 102 to the right, so that as now shown in FIG. 6, that process would continue until the number of LNs 102 in use matched the number of steps in the algorithm. When a bit had entered the last step of an algorithm, that particular execution of the algorithm would terminate, so as to cancel out the effect of adding a new bit, thus to leave the total number of algorithms in operation the same. Then, so long as new bits were being entered, the total number of algorithms in operation would remain constant.

At that time each bit, and each LN 102 operating on one of such bits, would be a part of a different instance of the algorithm being executed. Once all of the data bits available had been entered, then with each new cycle thereafter that total number of instances of the algorithm being executed would decrease by one, since instances of the algorithm would be dropping out on each cycle with no new instance being initiated. Analysis of the "break points" in the data of FIG. 6 shows that the algorithm had 13 steps (the first one of the executions already present is shown to have dropped out, thus to have one new execution starting up and another dropping out at the $14^{th}$ cycle because of having been completed, thus to leave a constant number) and the number of data bits had been 18 (at step 19 there is no new instance of the algorithm added since no new bit had been entered).

FIG. 6 shows a histogram of the number of LNs 102 in use as the execution of a 13-cycle algorithm is first initiated and then allowed to run a course through some particular number of data bits, in this case 18, which numbers are both entirely arbitrary. The circuit will be caused to carry out the same operation on the indicated number of single bits until the last bit had passed through the last LN 102 of the algorithm circuit. If the data base had been larger, the initial upward slope in the number of LNs 102 in operation would have extended higher, or if there had been more steps in the algorithm the "plateau" at the top would have extended further. Whatever the circumstances, the downward slope at the end would be a mirror image of the upward slope at the beginning. The purpose of the analysis is to tell the user how long the stretch of LNs 102 involved will be unavailable for other purposes, given that the algorithm circuit once structured would remain in place until all of the data bits had traversed the entire algorithm, it not being immediately obvious that a 13-step algorithm working with 18 data bits would run for 30 cycles. That the algorithm had a length of 13 LNs 102 is seen in the fact that at the $14^{th}$ cycle, when a $14^{th}$ bit is entered, the number of LNs 102 being executed does not increase—when that new execution of the algorithm is initiated, the first execution that was started will drop out because there was not a next step to be carried out since that first execution had been completed. That the data base contains 18 bits is seen in the number of LNs 102 in operation beginning to decrease at the $19^{th}$ step—no new bit was added so as to start another execution that would counter the loss of an execution as those then in operation are decreasing as successive executions are completed. For the general case, it then seems that the following equation 4 would apply, i.e., $$LN=S+B-1, \tag{4}$$

where LN is the number of LNs 102, S is the number of steps in the algorithm, and B is the number of bits in the data base.

Similarly, the length of the plateau P at the top is given by the following equation 5:

$$P=B-S+1, \tag{5}$$

which as giving the number of cycles during which all of the LNs 102 of the algorithm were in full operation at once would be of interest as to power dissipation. To obtain the full power dissipation (i.e., the product of the single LN 102 dissipation (w) and the area within the histogram display), one might first calculate the number of LNs 102 within the plateau region, or 6×13=78 LNs 102, to get the power dissipation $w_P$ within that plateau area, and then add the number of LNs 102 within the two sloping regions, which would be 2 [1+2+3 . . . ] up to the $(S-1)^{th}$ LN 102, i.e., 2Σ(S−n) over the range n=1 to (S−1), or 156, to yield the product 234 w as that total power dissipation. The total power dissipation W would then be given by the following Eq. 6:

$$W = w_P + 2w\sum_{1}^{S-1}(S-n). \tag{6}$$

Two key questions in the mind of a user when contemplating the installation within a PS 100 of the code for an algorithm would be "how long will it be occupying how much space" and "what would be its power dissipation." With appropriate adjustment for the fact that many cycles will include more than one LN 102, Eqs. 4-6 would answer both of those questions. These would then be excellent candidates to become "utility algorithms" in CODE 120 by which those questions could be answered by an input of just the two variables S and B, with w perhaps being a constant unless different types of LNs 102 were also to be considered, in which case w would become another variable. Under different circumstances the determination of S could present a problem, but in the "Code Line Counter" (CLC) to be described shortly that is a part of the ILA, provision is made for a count and printout of the number of LNs 102 in every cycle of every algorithm code. The value of B, the number of entries in the data base to be treated, would be easily ascertained.

To expand upon the quick summary of the process just described, that full course of operation will pass through three stages, which are: (1) a growth stage during which the number of LNs 102 in operation increases by one with the entry of each new data bit; (2) a "steady state" stage that will begin with the entry of an $(N+1)^{th}$ bit, where N is the number of LNs 102 required for a complete execution of the algorithm; and (3) immediately after the last bit of the data available has been entered, in that "decay" stage the number of algorithms in process will begin to decrease by one in each cycle, until all of the instances of the algorithm have been completed. This decay stage will be a mirror image of the growth stage.

In the second stage, a steady state would have been reached since even as each new bit would as before add another instance of the algorithm being executed, the concomitant termination of the execution of each of the remaining algorithms, in the order of their initiation, would subtract from the total execution count another instance of executing the algorithm. As shown by the 14th bit entry in FIG. 6, the first instance of the algorithm must just have been completed and thus removed, so as not to be present in the next (14th) cycle. The initiation of a new instance of the algorithm in the $14^{th}$ cycle must then have been matched by the deletion of that first instance, so the algorithm must then contain only 13 steps. The number of algorithms in execution begins to go down at the $19^{th}$ step, meaning that there had been no new instance of the algorithm execution being started, hence there must have been only 18 bits to be operated on.

It may be noted that this is a case, as mentioned earlier, in which after the first execution of the algorithm the usual IL procedure is not followed. Nothing happens in an ILA unless there is a "iiiiccccccssssss . . . " a code line that directs some step to be taken, and in a case such as the present, those code lines will direct the SPTs 106 involved to maintain the code for that algorithm (actually, the same code would be sent repetitively) until the last execution thereof has been completed, with each execution of the algorithm starting at the same LN 102. In the first execution the point of actual "action" will move through the PS 100 as that "run" of the algorithm is being carried out the normal IL practice of structuring a second LN 102 (or group thereof) would be followed, and then a third, and so on until the end of the algorithm had been reached.

As to the second execution, that would be started at the same LN 102 location as was the first, but in that same cycle the first instance of the algorithm would be "looking for" a second code line, that must be entered at the same time as is the second code line for the first instance, since that is what "operating simultaneously" means. In each cycle, there would be as many adjacent LNs 102 (or groups thereof) that were being given new code lines as there were instances of the algorithm being executed at the time. Eventually, all of the 13 steps of the algorithm would be in execution at the same time in 13 different instances of the algorithm, for data bits that had been entered successively, and it would only be after the final data bit had been entered and been fully treated in the first execution that de-structuring of an LN 102 (the first) would begin. The "point of action" would not be moving because there would be as many points of action as there were instances of the algorithm being executed.

That is, as to the last step, there being only 13 instances of the algorithm at the 14th cycle but yet another instance would have been initiated by the entry of that 14th bit, the total number would remain at 13 since even as that $14^{th}$ bit is entered, the first instance of using the algorithm would have terminated, and the number of algorithms then in execution would remain constant at 13. From the opposite point of view, when an algorithm in operation has had the last step thereof executed, that instance of the algorithm will be removed, which event is shown by the fact that the count of the algorithm instances does not continue to increase at the 14th cycle but will remain at 13 instances. In that same way, with that algorithm execution count for the 19th cycle being only 12 rather than the 13 as shown by the preceding six cycles (13-18), not only will there be the circumstance just noted of there being an instance of an algorithm being removed with each cycle, but there must also not have been an entry of a new bit, in this case starting with that $19^{th}$ cycle, which new bit would have matched the "dropping out" of another instance of the algorithm, as had been seen in the preceding six cycles. The algorithm count must then begin to decrease with each cycle, seen in this case to begin at that 19th cycle, and hence there must only have been 18 data bits available to be entered, whereby thereafter only that termination of an algorithm execution on each cycle is still taking place.

The circuit on which FIG. 6 was based, a string of 1-bit inverters, will provide only a limited view of the PS 100 in action, but nevertheless that view can still serve as an example of the workings of Instant Logic™ as a whole, if that view is imagined to be expanded to more and more complex and lengthy algorithms that are n steps in length and are extended in every possible direction. FIG. 6 also brings out another singular feature of IL, which is that of using a single group of LNs 102 over and over again so as to minimize the PS 100 area required to execute that 13-step algorithm 18 times. (In the example given, that process was carried out on a series of copies of one algorithm, but each node in that process could as well have been a part of a different algorithm.) That is, while in itself a fixed, hard-wired circuit would perform in precisely that same way, that hard-wired circuit would not "vanish" upon completion of the last execution of the algorithm, or indeed be vanishing LN 102 by LN 102 during the last execution, in the same way as the algorithm was structured LN 102 by LN 102 during the first execution.

With respect to operating space, the least desirable way in which to carry out that process would be to execute those algorithms in a von Neumann-type computer that had been set up to work in parallel by way of some kind of multi-tasking, that would require 18 instances of those 13 LNs 102, or 234 steps. Of course, a von Neumann computer would not ordinarily have those 18 instances of a 13-step algorithm, so those instances would have to be executed in series, end to end, thus to require 234 consecutive steps. The von Neumann-type computer is not equipped to start a second use of a circuit the instant that a first bit has passed through the first LN 102 of a circuit structured to execute that entire algorithm, but except for pipelining and other kinds of "super computer" innovations, but only has an instruction such as ADD that will be carried out as a whole before having any new data entered thereto. All of the LNs 102 in that circuit sit idle, except for the one through which the process was passing at a particular instant, until the first execution has been completed and another execution could be initiated.

The time required for an ILA to execute 18 repetitions of a process would then be but a fraction of what had been required for the fully serial operation having 234 steps and would still require 234 LNs 102, but in an ILA these would be the same LNs 102 being used over and over again, except when first starting up and then finishing the operation. The IL process set out above requires just the 13 LNs 102 and the 30 cycles shown in FIG. 6. After the first instance of executing the algorithm, there will be two on up to 13 instances of the algorithm all in operation at the same time, on the same set of 13 LNs 102. While emphasis has rightly been placed on the advantages of using the circuit-structuring methodology of IL to eliminate the von Neumann bottleneck and thereby save time, a second gain in throughput is brought about by using the same LNs 102 over and over again to carry out all that structuring and thereby save space should also be recognized. Being able to carry out the same IP in less space is equivalent to adding more space.

The central theme of IL as opposed to the conventional computer art is that instead of instruction transfers there will be circuit and signal code transfers for circuit structuring purposes. There must also be data transfers, but in IL these will be quite different from the conventional means. Instead of the repetitive, "back and forth" transfers of data and instructions, which process will continue to be required in parallel processors so long as the PEs thereof either are or contain μPs, there will be coordinated, parallel streams of (1) circuit and signal code entering "one-way" into the INE 116 from CODE 120; and (2) data, also entering "one-way" into PS 100, with the results of the IP then to occur ultimately appearing at the output of one or some small group of LNs 102 that had carried out the last step of the algorithm.

In IL there are thus just two continuous, parallel bit streams entering into the ILM 114, one to structure the circuits needed and the other containing the data to be operated on. There is no need for any sequence of instructions as are required in a von Neumann apparatus, since in IL the code that structures a circuit serves itself as the "instruction," which circuit does not merely specify what action is to be taken but also causes that action to be carried out. That is, even as to sequential logic, instead of sending the instruction "ADD," for example, and then awaiting the arrival of data, the IL circuitry will be structuring another adder even as the second half-adder of an ADD circuit was treating any carry bit from the first half-adder thereof. The process is the same as that of combinational logic except that the repetition interval would no longer be just one cycle, but rather the time period required for one ADD circuit having carried out its full function. Even that "wait state" is resolved if using the rather more complex carry-look-ahead parallel adder in which the function of one level of addition will not be dependent upon a previous carry, if any. (See Wen C. Lin, *Handbook of Digital System Design for Scientists and Engineers* (CRC Press, Inc., Boca Raton, Fla., 1981), pp. 158-59.) The first full adders can begin to be restructured (or can accept new data) as soon as their own task has been completed.

When repetitious instances of executing an algorithm are to be carried out, instead of being de-structured as is the usual case in IL that circuit will be left intact, it being assumed that even as the bit on which a first ADD execution has been fully operated on and is moving into the second ADD circuit, the second bit to be treated will be entering into the first ADD circuit, and then the same as to the third, fourth, etc., bit to be treated, until every ADD circuit has become engaged. Put another way, as the data continue along a series, say, of additions, there is no need to keep dropping out of the stream to go find another ADD circuit for the next bit, so to speak, but instead the ADD circuit is simply "carried along with the flow." When a bit (or datum segment) emerges from the first ADD circuit it will encounter the second circuit, and as that operation is taking place the second bit can be entering into the LN(s) 102 that made up that first ADD circuit that the first bit had just exited, without needing to go anywhere else. Insofar as is presently known, the process would be the same as that of combinational logic except that the "repetition interval" would be made up of the full ADD circuit rather than LN 102 by LN 102. There are also some mathematical algorithms that having once been started by some initial data, perhaps entered "on the spot," would require no further data input, with the bits then to be acted on deriving only from preceding LNs 102, and in such cases after that the only bit stream entering the ILM 114 would be the code stream.

Similarly, instead of sending intermediate results to some distant, remote memory, or even to a separate, built-in local cache (as frequently seen nowadays on the same chip as the μP), with those results then to be READ back when needed, those results can be passed over to adjacent memory latches that had just been structured for that purpose, and would be de-structured as soon as the data had been taken back out therefrom. (This discussion pertains only to the uses of latches; the latch itself will be treated in detail later.) For example, if two numbers had to be calculated for the purpose of being added together, it would be preferable to calculate both addend and augend at the same time and then carry out that addition, but if the augend could not be calculated until some time after the addend had been calculated (e.g., the two calculations might have been started at the same time, but one calculation required more steps), the addend would be held in such a latch until the augend became available.

In a more special case, as when there was some kind of data dependence (e.g., the second number was twice the first), it might be necessary to calculate those two numbers in sequence. In such a case, the first number would be calculated, with that number then being stored in a latch that had just been structured for the purpose. The first number as so calculated would then be used a first time for the calculation of the second number even as a copy of that first number was being placed into those latches as just stated. When the second number became available, that first number would be extracted from those latches a second time for that original purpose of the being added to that second number. (Abstractly, we can see that if the first number was Q, then the ultimate result from what was just said would be 3Q (i.e., Q+2Q=3Q), but with other kinds of data dependence as to more complex algorithms it is easy to see that upon establishing the first number, there might be a lengthy time lapse before the second number became available. In more complex cases in which a number of calculations were being carried out those latches may need to hold data for quite a few cycles, rather than just one or two.)

To help illustrate how it is that there would be no data transfers involved in the preceding process it may be supposed that the circuitry by which those first two numbers are obtained and that in which the two numbers will be added would ordinarily be widely separated, according to how the algorithm had happened to be constructed. In a von Neumann-type computer, even leaving out the process by which those two numbers would have to be transferred first to memory and then brought back, they would at least have to be transferred to the circuit that would do the adding (or more exactly they would have to be transferred to the ADD circuit in the ALU). In an ILA, however, it costs nothing to structure a circuit in one place rather than another, and in this case the "ADD" circuit would simply be structured at the outputs of those LNs 102 at which those two numbers were located, there being no data transfer at all. That is a second advantage of this process by which the circuitry required is structured at the site of the data rather than transferring the data to the circuit as constitutes the principal difference between the processes of IL and of current computers, which advantage is not quite as obvious as that of avoiding the von Neumann bottleneck and the constant shuffle of data and instructions, but yet one that will also contribute to the enhanced efficiency of those IL procedures.

In any such case, the ensuing circuitry will be structured along a pathway such that when the time came to use the data that had just been stored, the input terminals of that part of that following circuitry for which those stored data were required would be made to appear at the output terminals of those latches, with there having been no "data transfer" at all but merely the transfer of an output bit from one LN 102 to the next, just as in any other kind of IL operation. There is also no extra step involved in the foregoing process, because those latches would be structured at the same time that the circuits for calculating that first number were being structured. More exactly, there is a delay in the use of those latches, but that delay arises not from the "store and release" operation of the latches themselves but rather from the fact that the calculations of those two initial numbers had to be carried out in sequence in the first place. The latches themselves provide a saving in time, since their convenient availability avoids the need to WRITE that first number off to some remote memory and then READ that number back again for use, which is what constitutes the von Neumann bottleneck.

Figure 8:
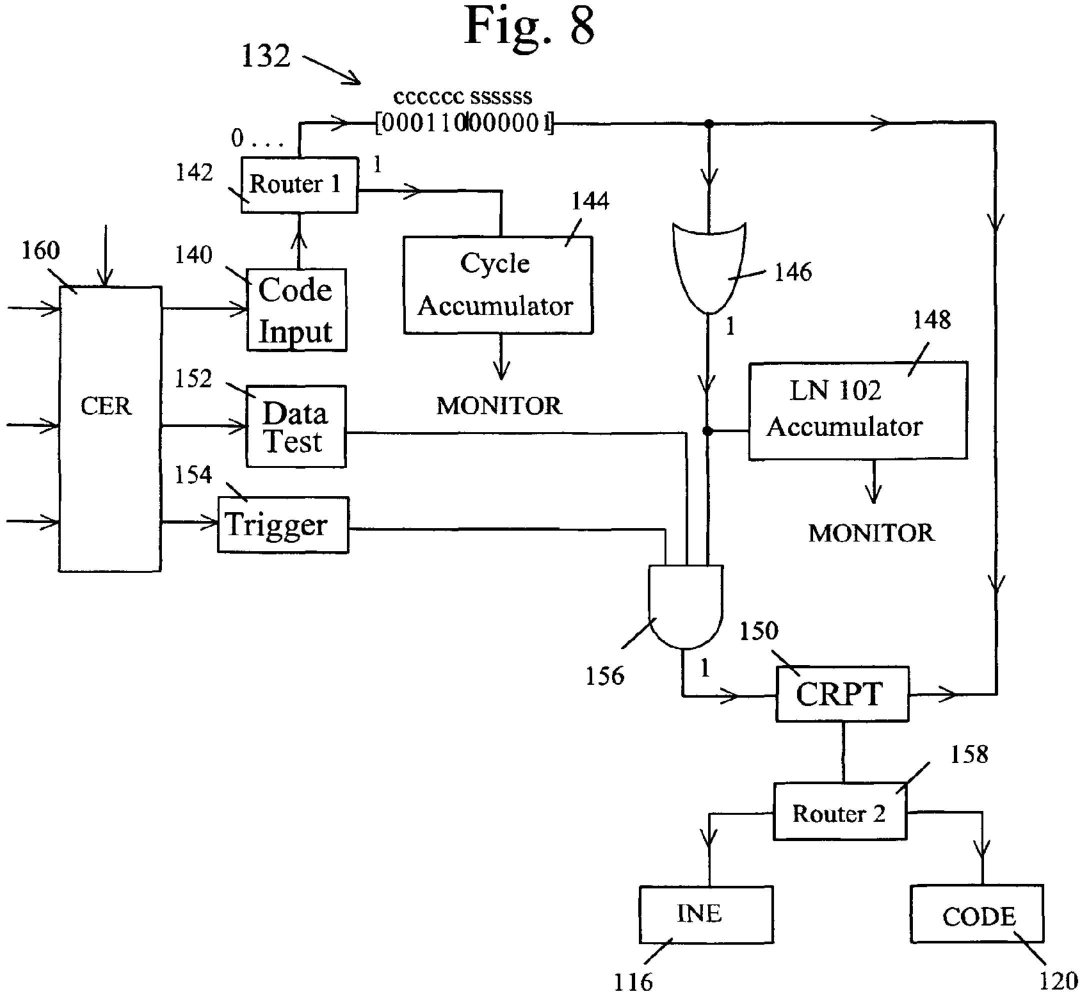
FIG. 8 (sheet 6) shows a combined data enumerator (from the Lovell '378 patent) and 2-bit code selection circuit that is used to recognize and count the code entries in the code for an algorithm.
Figure 7:
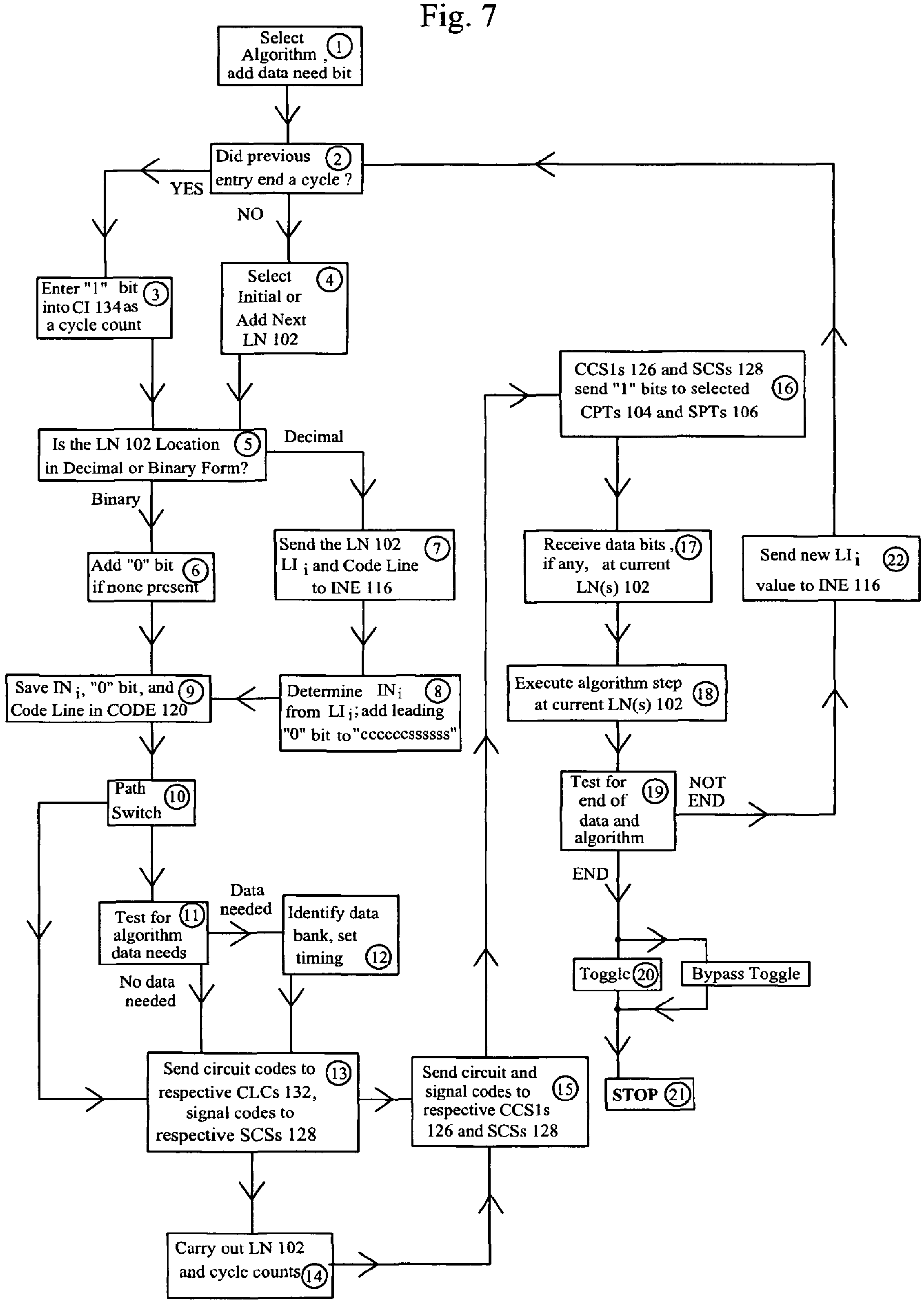
FIG. 7 (sheet 7) shows a flow chart exhibiting the steps by which code is entered into CODE 120 and then used to execute an algorithm.

For the purpose of explaining the different roles of the components of an ILM 114, a flow chart of the procedures that cause the successive steps of executing an algorithm to be carried out is shown in FIG. 7 (sheet 7). (FIGS. 7 and 8 are reversed in order in the drawings because of their relative sizes; that reversal permits two figures to be placed on sheet 6, with FIG. 7 then taking up the entirety of sheet 7.) However, there is another function to be noted, which is the provision of a count of both the LNs 102 used and the cycles completed, thus to determine when all of the LNs 102 to be used in a particular cycle had been designated so that the designating of a next cycle could begin, and for that purpose the CLC 132 is included in the ILM 114 as well. (Nearly all cycles will involve more than one LN 102, with that number to increase if more than one algorithm is being executed in accordance with the same clock 130.)

The first step in executing an algorithm is simply the selection of which algorithm is to be executed. As one method by which that selection might be made, the ILM 114 includes the PTE 204 mentioned earlier that could appear in such form as to be enabled by touching the appropriate icon on a monitor screen. (That PTE 204 is shown in FIG. 4 to be connected only to the CPTs 104, but in fact is quite universal in its applicability and might be found almost anywhere in the ILM circuitry.) That selection process itself is shown as the Step 1 "Select Algorithm" box at the top of FIG. 7 (sheet 7), wherein as just noted that selection will likely be made by clicking on an icon representing the algorithm desired, or if that capability has not yet been established, the user may just start writing in the necessary code and then activating that circuitry as will be described below.

The LNs 102 in CODE 120 must each have a fixed, hardwired connection to an assigned set of INE 116, LUT 118, CSU 122, etc., sequences, those being Class 2 circuits that structure the LNs 102 in PS 100, and since there will typically be a number of LNs 102 to be structured at the same time, there must be such a sequence of those Class 2 circuits for each LN 102. Those components must ultimately lead to the same location in PS 100 as that of the LN(s) 102 designated in CODE 120. As described herein, however, for simplicity every LN 102 in CODE 120 is allotted an entire ILM 114. Reference may also be found herein, however, to there being a number of INEs 116 or other such component within a single ILM 114, in the context of exploring different ways in which those components might be arranged. That aspect of the structure has no bearing on the basic operating principles, however—the system will operate so long as the next circuit required for an operation is present when needed, without regard to whether the components that brought about that result are on the same or a different ILM 114. It might happen that economies in the total number of components that needed to be manufactured might emerge in time, and the resultant apparatus would of course still fall within the scope of the claims appended hereto, the intent here being to set out the principles of operation as simply as possible, e.g., with reference to a single bit (except of course when the operation itself requires more than one bit).

A reasonable compromise would be first to ascertain the highest number of LNs 102 that would ever be found to be operating simultaneously in a single cycle, and then place that many of those INE 116, LUT 118 CSU 122, etc., sequences on a single ILM 114. In case only two LNs 102 made up a cycle, with those selected for use being found to have the corresponding INE 116, LUT 118, CSU 122, etc., sequences within a single ILM 114 IC that contained four of those sequences, in that case there would be two such sequences that were not then to be used. However, it would usually be the case that not every LN 102 in PS 100 (and hence not every one of those sequences) was to be in use at the same time in any event, so there would really be no waste of resources in such a scheme. The only difficulty arising from such a scheme would be that the two LNs 102 that were to be used had INE 116, LUT 118, CSU 122, etc., sequences that were within different ILMs 114 (or ICs). In such a case, the alternatives would be either to alter the circuit structuring pathway so as to use two LNs 102 for which the related sequences indeed were in the same ILM 114, or simply to proceed as would have been done if there had been a full ILM 114 for every LN 102, so that two ILMs would be used instead of just one.

Turning now to the code entry process, a flow chart thereof was seen in FIG. 7 (sheet 7). The course through a cyclical flow chart will of course differ depending on whether an entry therein was the first entry, so as to initiate a first execution of the algorithm, or an entry that would initiate a second or later execution thereof. Whether or not an algorithm will require data will also cause a difference in how an algorithm proceeds. Thus, to address that first issue first, after the algorithm that was to be executed had been selected in Step 1, since the code entry procedure also has the purpose or maintaining a record of how many LNs 102 would have been used upon each entry and how many cycles would have been passed through, Step 2 seeks to establish whether or not the "previous" entry (if there was one) had indeed been the last entry of a cycle, and if so a "1" bit would be entered to mark that count of a completed cycle, while otherwise the selected CL would simply be entered rather than that "1" bit. With a first entry, of course, there would have been no previous cycle, but that would still mean that the "previous entry" had not been "the last of a cycle," so again with a "NO" response at Step 2 the CL would be entered immediately, without first interjecting that "1" bit. Even on a first entry, therefore, the question of whether or not the previous entry had ended a cycle will distinguish whether or not the CL at hand should be entered. As seen in the flow chart of FIG. 7, if it was shown in Step 2 by a "YES" output that the previous entry had indeed ended a cycle, a "1" bit would be entered at Step 3 before the CL was entered at Step 4, while if the previous entry had not ended a cycle (or if the CL to be entered was the first entry), the entry of that CL at Step 4 would take place immediately after that "NO" determination had been made in Step 2. The means by which a first entry can actually be identified will be explained below.

The next Step 5 will test to determine whether the CODE 120 address of the entry being made was in decimal $LI_i$ or $IN_j$ binary form, which is easily made on the basis of the code itself. As will be discussed in greater detail below, a "digital" computer cannot recognize digital numbers, by which is meant, of course, the cardinal digits 6, 3, 2, and 8 in the number 6328. On a monitor screen and elsewhere they will instead appear as such (on the monitor screen) or as the ASCII equivalents (in the circuitry) of those numbers. (That is one reason why this application does not use the term "digital" except when it is actually cardinal (e.g., 1, 2, 3, etc.) numbers to which specific reference is being made, but the term "binary" is used instead, which are the only kinds of number on which at the most fundamental level ordinary computers can act—excluding those of course that for special purposes are using other kinds of mathematically-based numbers such as octal or hexadecimal numbers.) If in binary form, the next step will be Step 6, which proceeds to modify the CL by adding a "0" bit to the leading end thereof for purposes of later routing as had previously been discussed, and specifically by the means set out above (the 12-, 18- or 24-bit CL (depending on whether there were one, two, or three SPTs 106 to be enabled) is entered right-justified into a 25-bit register that already has a "0" bit at the leading or MSB end thereof). Step 9 that would then follow will then save the $IN_j$, "0" bit, and CL back in CODE 120. Had the address been in the cardinal $LI_i$; form, Step 7 would have sent the $LI_i$; and CL to INE 116, whereupon the $LI_i$ will be converted in Step 8 to the $IN_j$ form and the "0" bit will be added to the CL as in the case just noted of a number that had been binary from the start, and then in Step 9 the $IN_j$, "0" bit and CL is sent back to CODE 120 as before.

With a full "$IN_j$0cccccccssssss ." code entry in Step 9 ready to be used, the following Step 10 is a simple "Processing Path Switch" (PPS) 134 in a default position that allows the pathway that follows to continue downward in FIG. 7 through Steps 11 and (if necessary, as will be seen below) Step 12, while at the same time changing that PPS 134 position so as in the future to bypass those steps and proceed directly on to Step 13. That process is to take place only with the first CL entry in executing an algorithm, since Steps 11 and 12 relate to whether or not the algorithm will require data, and if so, in what data bank are those data to be found, etc. Of course, that determination needs only to be made once, and PPS 134 serves to bypass that determination for the remaining LNs 102. (A time may be reached in the execution of an algorithm at which there was no further need for data, but that would not change the fact that data had been needed at some earlier time.) If of interest, probably the easiest way to determine whether or not a code entry was the first would simply be to query the LN 102 count that takes place in CLC 132, as will be described below, which is a "running" count kept of the LNs 102 that had been structured as the execution of the algorithm proceeds. If the entry at hand was the first entry, the field in which those counts are placed would not yet have had any numbers placed therein.) (By "data" here is meant, for example, numbers on which some calculations need to be carried out by the algorithm, and not just bodies of passive information (such as the store inventory that will be addressed later) that only need to be examined, searched, or sorted, etc., since the algorithms for such tasks (such as an IL version of a "Data Analyzer" (DA) 226 to be discussed later) will themselves have their own special procedures as to how the data are to be accessed, and how the results of the task will be reported.)

Although not coming into play until the just before the "STOP" Step 21 of the algorithm, there is another step that pertains directly to this matter of testing for any need for data that is perhaps best explained at this point. As noted above, while that test is carried out but once, after the algorithm has been fully executed the pathway as determined by PPS 134 of Step 10 must be reversed so as to proceed to Step 11 when next used (nothing ensures that the algorithm might not have been altered in the interim) in order that the desired use of that test just one time will be able to take place. Consequently, Step 20, that appears just before the end of the algorithm at Step 21, employs another "Toggle Switch" (TS) 136 (shown in a FIG. 7 by a dashed box in CLC 132) to change the position of PPS 134 from that which leads directly to Step 14 back to that which allows those two tests to be carried out. However, under some circumstances that change at the end of an algorithm execution back to carrying out those tests would not be desired. (It can be reminded here that in spite of the repeated references herein to an "algorithm," that which is set out in FIG. 7 is not an IL algorithm but would ordinarily be the hard wired circuit by which IL is put into operation, although, of course, the circuitry being discussed could well be structured by way of IL.)

That is, the flow chart of FIG. 7 was described above as being "cyclical," meaning that the same course of operations is repeated from start to finish for each LN 102 that is to be employed in the algorithm, going back after each execution of the algorithm to Step 2 of the flow chart for each new LN 102 in a cyclical manner. In this case, there are 18 steps that must be traversed in order to structure a single LN 102, and that process must then be repeated as many times as there are LNs 102 in the algorithm, in order to accomplish a single execution thereof. As opposed to that process (that will be a part of and indeed the heart of every algorithm execution), there is also the case in which the algorithm is itself to be operated repetitively, as when an algorithm does need data, there is a data list to be treated, and each item on that data list requires a complete execution of the entire algorithm. If there were 20 steps involved in structuring an LN 102, and 20 LNs 102 in the algorithm, then 20×20=400 steps would be involved in the one execution thereof. If there were also 20 entries in that data list, completion of the task as a whole would involve 20×20×20=8,000 steps. Even in that case, however, only one execution of the tests for whether data were needed would be required.

That is, just as it was not necessary to carry out that data need test more than once in just one execution of the algorithm, neither does that test need to be repeated when further executions of that same algorithm are to be carried out. As a result, in addition to Toggle Switch 136 that in Step 20 acts to reverse the action in Step 10 in precluding the execution of those tests more than once, so is there provided a "Toggle Bypass" (TB) 138 that prevents carrying out Step 20, so that instead of having the PPS 134 action reversed in order to allow that test to be carried out each successive time that the algorithm was used, that reversal of PPS 134 is eliminated, since that same condition of having once carried out that test no further tests are needed will continue to subsist, regardless of how many times that same algorithm is to be executed, hence the original switch to leaving the pathway from PPS 134 in Step 10 to pass directly to Step 13 should remain in effect.

In order to bring that about, a PTE 204 in ILM 114 is connected to a PT, "Toggle Bypass" (TB) 138, that connects around TS 136 as seen in FIG. 7, and when a user contemplates using some algorithm repetitively on a body of data, that user will activate PTE 204 and thereby enable TB 138 so as to bypass TS 136 as the latter is used in Step 20, whereby the data need test will only be carried out once in the course of any number of executions of the algorithm. (Having by this text perhaps become accustomed to thinking of PTs being enabled for periods of nano- or even pico-seconds, it may be useful here to note that PTs can also be left conducting for extensive periods of time.) At the end of the entire operation, the enabling of TB 138 that bypasses the Step 20 process is terminated, again by the user by way of PTE 204 and TB 138, and the procedures of Steps 10-12 whereby that test could only be carried out during the first CL entry will then be back in effect.

As described above, the Step 11 operation determines whether or not that newly selected algorithm for which that first entry was being made would require any data, so the means by which that test is carried out will now be shown. That determination is perhaps best carried out simply by labeling the algorithm beforehand to indicate whether or not data would be required. In a complete ILA there would be a monitor screen, one use of which as noted earlier would be to display a menu of all of the algorithms that had been installed, and for the convenience of the user it would also be useful to include with the titles of each algorithm an indication of whether or not that algorithm would require data. Of course the user who had installed the algorithm would certainly know that, but some other users might not, but in any event such an indication that the algorithm would need data can also be used to "inform" the apparatus that data will be needed on a particular algorithm. A "d" placed on the screen along with the title of an algorithm would mean "data needed," and besides so informing a user who might not otherwise be aware of that fact, that notation would also be used to generate a "1" bit that would be placed into PPS 134 to give that circuit a second task besides that of changing the route of the pathway to go straight to Step 13 on subsequent CLs (since unlike the status of being a first entry, whether or not an algorithm will need data is not self-announcing.), namely, that of indicating whether or not the algorithm would require data. Again, PPS 134 is shown by a dashed line in CLC 132, and the data need test of Step 11 would then consist simply of a "read" of PPS 134 for the presence of a "1," bit (but see below).

Although not needing to be shown on the monitor screen, a "0" bit indicating that data would not be needed could also be entered by the person installing the algorithm, to be passed into that same PPS 134 as to those algorithms that did not need data (e.g., as in searching or sorting a data bank, etc.), with that "0" bit also to be read in the test of Step 11. (PPS 134 would then be acting both as a switch as to the pathway and as a 1-bit router as to the data need.) A convenient place to carry out the entry of the "0" or "1" bit would again be as a part of the initial Step 1 of the algorithm, as would naturally occur if, as suggested, that "0" bit were made a part of, or was at least entered at the same time as, the algorithm title, as noted in the flow chart of FIG. 7 (sheet 7) by which the particular algorithm to be executed is selected for use (preferably by clicking on the appropriate icon on that menu) in Step 1.

If data were needed (as shown by the apparatus having read a "1'" bit in PPS 134), control would pass to Step 12 through which the relevant data bank would be identified and the timing for the entry of the data therein into ILM 114 will be established. Presumably, the relevant data themselves would bear an indication when entered into CODE 120 (or preferably into a separate memory) to which algorithm(s) those data were pertinent, but at least the algorithm itself would include notice of which data bank was to be used. (That is, besides having a "0" or "1" bit attached to the algorithm name, if data were needed, along with that "1" bit there would also be an indication of which data bank held the data that were to be used.)

One might envision that a memory dedicated to data would have therein a number of "Data Blocks" ($DB_1$, $DB_2$, etc.), each of which would have been sized by the user(s) to fit the data needs of a particular algorithm (that could be one of several algorithms that might at different times be able to use that same $DB_i$), and then the $DB_i$ would be "mapped out" (i.e., have listed the numbers of the memory nodes within that $DB_i$) in that memory. Those DBi could also be mapped (or "blocked") out literally, as by lines drawn on a chart of the memory bank as a whole, which mapping would also be useful thereafter in determining where in the memory there was space still available for use and where not.) A heading on the $DB_i$ itself would list the algorithm(s) that could (and at different times might) use that particular $DB_i$, while at the same time each algorithm would be headed by an indication of which $DB_i$ was to be used, as mentioned above. By accompanying the code entry for the first LN 102 of that algorithm with the information just noted, that information in itself would serve notice that data were to be used, which notice could easily be queried in Step 11 if there were a settled format so that if such information were to be provided it would be located in a particular segment of that part of the algorithm title that would be entered in Step 1. Again, that data field could then be queried by Step 12, by any of a number of different ways that would be known to a person of ordinary skill in the art, but again most likely by a simple read of that data field. (The timing of the data transmissions from these $DB_i$ is carried out by using the procedures concerning phase adjustments that was discussed earlier with reference to FIG. 5 (sheet 5).)

Turning again now to the main course of the flow chart of FIG. 7, whether or not there had been data needed, the pathway would at that point enter into Step 13, wherein the circuit codes "cccccc" would be sent to CLC 132. The signal code "ssssss" could be sent to SCS 128 at the same time, but since some time will be required to treat that circuit code in CLC 132, that step might be delayed until the circuit code has been treated, both in the CLC 132 and perhaps also in the CCS1 126 then to follow, since the circuit and signal codes will preferably arrive at their respective ultimate destinations, i.e., the CPTs 104 and SPTs 106, respectively, at the same time. (In making that determination, account will also have to be taken, as will be described below, that it will take more time to enter the "ssssss" signal code than it does to enter the "cccccc" circuit code.) The CLC 132 will thus be described at this point, while CCS1 126 (and several variations thereof) and SCS 128 will be described further below.

The CLC 132 is seen in the ILM 114 of FIG. 4 (sheet 4) to lie between the exit of the code lines "0ccccccssssss" from CODE 120 and the CCS1s 126 in CSU 122, so as to extract from the former the "0cccccc" part of that code for execution of the processes using CLC 132 now to be described, even as the remaining signal code portion "ssssss" will pass directly to the SCSs 128. Those transmissions take place after the original "ccccccssssss" code would have been drawn from CODE 120 and passed through the processes of INE 116 and LUT 118 shown in the flow chart of FIG. 7, and then returned to CODE 120 as shown in Steps 6-9. CLC 132 includes three points of entry as shown near the left side of FIG. 8 (sheet 6), which are the Code Input (CI) 140 (from the entered "cccccc" code, and that then enters into Router 1 (R1) 142); Data Test (DT) 152, and Trigger (TR) 154. As was discussed earlier with respect to FIG. 5 (sheet 5), the relative phases as to the code and data inputs (and now also Trigger 154) can be shifted with respect to one another, both for the reasons outlined with respect to FIG. 5 (i.e., the arrival of data immediately upon completing the structuring of the circuitry that is to use those data) and for purposes of ensuring the simultaneous enabling not only of all of the CPTs 104 and SPTs 106 of a particular LN 102, but also those of all of the LNs 102 that participate in each cycle. Each of CI 140, DT 152 and TR 154 connect to separate inputs to a 3-bit AND gate (3AND) 156, and must each provide a "1" bit to 3AND 156 at the same time in order for the necessary structuring of the circuit in which the particular LN 102 takes part to occur.

As another part of Step 2, it is also desired to obtain a running count both of the LNs 102 used in the algorithm (equal in number to the number of CLCs 132 used and hence of CLs entered) and the cycles. The main purpose of the cycle count is to be applied, along with the operating time of the algorithm as measured, to determine the operating speed for the algorithm as a whole in terms of LNs 102/sec. That would be a matter of interest, but a more useful determination might be found in recording the operation of each LN 102 use against the Clock 130, so if were assumed that the time lapse in that recording process itself were constant throughout, the time intervals between the LN 102 counts would be a measure of the relative speeds of all of the LNs 102 (or groups of LNs 102, where there were more than one LN 102 in a cycle). If any cycles were found to be inordinately time-consuming, the route of the LN(s) 102 might perhaps be changed so as to use different LNs 102, thereby to decrease the operating time for the algorithm as a whole.

All code entries are made through CI 140 on the left hand side of FIG. 8, the code for which may have come from CODE 120 if using a saved algorithm, a CD if being imported from another ILA, or from the keyboard in the installation of a new algorithm. As shown briefly by Steps 17, 18, 19 and 20 of the flow chart of FIG. 7 (sheet 7), execution of the entire algorithm consists simply of entering the CLs in sequence until the supply of CLs has been exhausted. In the course of cycling through the flow chart repeatedly, all of the LNs 102 that are to participate in a particular cycle are triggered simultaneously. As an example of that procedure, if there were three LNs 102 participating in a particular cycle, those LNs 102, in separate ILMs 114, would be taken through that flow chart simultaneously, and the trigger signal would then be provided to all three LNs 102 (i.e., all three CLCs 132) at the same time so as to bring about the actual simultaneous code entry.

In order to provide means for effecting a count of both the cycles and the LNs 102 used (both in total and as to the LNs 102 within each cycle), of the two possible inputs to CI 140, one would be a Code Line (CL)="ccccccssssss . . ." to the leading end of which would previously have been added a "0" bit (for reasons to be explained below), and the second of which would be a "1" bit. Either the Digital-to-Binary (D/B) Look-Up Table LUT 118 would append a "0" bit to the trailing end of the $IN_j$ binary code obtained in each conversion or preferably CODE 120 would have added a "0" bit to the leading end of the "ccccccssssss" code, so that upon the entry of each successive "0+CL" combination, the "0" bit at the start thereof, by way of R1 142, will route the remaining CL code rightwardly in FIG. 8 for later use (as will be noted below), while the "0" bit itself is simply discarded. Upon completing the entry of the "0+CL" combinations for all of the LNs 102 in a cycle, the user would enter a single "1" bit that would not appear on the monitor screen, but only a blank line, but would be routed by R1 142 to "Cycle Accumulator" (CA) 144 so as to signal the end of the cycle and provide another cycle count.

In being placed as the first (and only) entry immediately after a cycle has just ended, that "1" bit would appear at the same relative (first) position as does the added "0" bit in the CL entry process, hence the "0" and "1" bits can serve as routing bits that will send the "1" bit and the CL (upon having stripped out the "0" bit) entries in two different directions. In that way, in the form as entered all of the CLs in all of the code lists will commence with a "0" bit, and there would be "1" markers (or preferably a blank line) on the screen and in the printout) to show where the encoding of the LNs 102 for one cycle had been broken off and the encoding of the LNs 102 of a new cycle was started. FIG. 8 (sheet 6) below will show how the cycle count is derived.

Using a 5-bit code for the $IN_j$ numbers as noted above, the first 31 numbers as $IN_j$ codes would already start with a "0" bit, but the numbers from 32 to 63 would start with a "1" bit, so to distinguish the 5-bit codes that start with a "1" bit starting at the number 32, a "0" added at the front of the "ccccccssssss" codes to yield a temporary 6-bit "iiiiii"$IN_j$ code that would not start with a "1" bit until $(iiiiii)_2=64$. Adding a leading "00" code to the $IN_j$ code would encompass the numbers up to 127, a "000" addition would extend up to 255, and so on, and the number of "0" bits actually required would depend upon how many LNs 102 were in PS 100. Again, the purpose is to ensure that the CL is directed to the LN 102 counting circuitry and not that for the cycle counting. (And also again, that rather short 5-bit $LN_i$ code is used here only for reasons of space in this text, and would ordinarily be of the size required by whatever size PS 100 was in use, in order to identify all of the LN 102s therein.)

The above procedure that employs a "0" bit at the start of the "cccccc" code to distinguish that code from the "1" bit that announces the end of a cycle could not be used in the manner described in a 2- or higher-level CCS 126, since another code is used at that location to indicate the number of levels in the CCS 126. However, nothing prevents allotting more code space and then redefining the code so as to carry out both tasks. One singular advantage of IL, in fact, is that, because of the extreme flexibility provided by every LN 102 operating completely independently from every other LN 102 (except as the user may structure those LNs 102 otherwise), and the ability, if the ILA is not provided with a desired circuit in hard wired form, to structure such circuit in PS 100, all of the procedures described herein can be changed at any time to meet possible variant local conditions.)

Again now as to the operating speed, and considering for example a bit sequence that extended over one second of time at some pre-selected point along the course of an algorithm execution, the throughput is determined not by how long it may have taken to transfer from memory to the ILA whatever array of bits had started the process, but rather by how many bits can be passed through that point in that one second, since it is only the latter measure that will determine how fast all of the data bits can be made to pass through the entire algorithm. Since there is but one course of data transmission, that starts with a first set of input bits and ends with a last set of output bits, the only effect of that initial data transfer time delay would be to have delayed the initial startup time, according to a real world clock that, for example, sets the work schedule of the facility at which the algorithm was executed. In other words, that startup delay does not figure in to that operating time. There will also be a delay during the passage of the original data bits through ILM 114, and particularly the code selectors CCS1 126 and SCS 128 that will be described below. However, to impose a time delay as to the START . . . STOP time period during which the execution of the algorithm was to be carried out would have no more or less effect on the throughput whether that delay was a few ns or came from deciding to run the algorithm tomorrow rather than today, which is to say none whatever. The throughput is determined by the time period between the time at which the first set of bits arrives at the LNs 102 and that at which the last set of bits appears at the output, and it is only that measure that establishes either the speed at which the ILM 114 and PS 100 had operated, or equivalently the throughput, and is also the only measure of any real interest.

The next issue to be resolved again relates to the fact that at least in locally (i.e., user) encoded algorithms, the LN 102 locations will most likely be expressed in the digital form $LI_i$, but for use in PS 100 those locations must be expressed in binary $IN_j$ form. The $LI_i$ will likely be in digital form initially since few users would want to stop to convert "by hand" a large number such as 6328 from its $LI_i$ digital form into its $IN_j$ binary form before the code entry is carried out. It must then be determined whether those code conversions should be made when the digital $LI_i$ is first entered or should be left in the $LI_i$ form, with the code conversion then to be carried out at the time that the binary $IN_j$ form is first needed to be used.

An operative reason for converting the $LI_I$ to $IN_j$ immediately is one of space. If only the first $LI_1$ value were known, one way to determine the $LI_i$ values would be to calculate those values from the one known $LI_1$ value, on the basis of their relative positions in PS 100, but for that arithmetical process the data must be in binary form. Also, if an $LI_i$ value such as 6328 were expressed in a 7-bit ASCII code as that number (i.e., as "6328") was entered, then the expression of the four characters "6," "3," "2," and "8" would require 4×7=28 bits. It would also present itself in ILM 114 as merely some weird code in an arithmetical sense, having no meaning with respect to actual operations, while in binary form that number would not only require just 12 bits, given that $(6328)_2$ = 110001011100, but would appear as computer-usable code. That procedure would save 28−12=16 bit spaces in every use of the number thereafter, both in actual operations and in storage in CODE 120. In addition, it would be preferable in developing an ILA that those processes of general applicability that could be done in advance of the execution of an algorithmic step, especially an arithmetic step, should so be done, since otherwise that process would need to be repeated in each cycle.

The only reason for maintaining the code in digital form is that in the initial entry of the code, some of the processes will be carried out by humans, as when using an Overlay 168 (discussed below) to locate the LNs 102 in PS 100 that are appropriate to the circuit, and as noted earlier the user would not want to be obliged to do any of that using binary numbers. In any event, FIG. 4 (sheet 4) shows the code from either a keyboard or from CODE 120 to enter first into INE 116, which cooperates with LUT 118 to convert those digital numbers into binary numbers (i.e., a "D/B" conversion) immediately. The point then being made is that in terms of the operation of the ILA only, as early as possible there should be no numbers in CODE 120 that were not already binary, the only reason for initially storing those numbers (as taken from a circuit or Overlay 168) would be for the convenience of the user. One possible procedure then to be followed would be to provide a switch (not shown) whereby the immediate INE 116/LUT 118 operation so as to acquire binary numbers would be bypassed during such period that the ILA was being conditioned for use by developing algorithm codes, but which switch would be set to make those D/B conversions immediately as shown in FIG. 4 (sheet 4) and 7 (sheet 7) when the ILA is ready for full use, just to make allowance for any algorithms that had been fully developed as to locating the proper LNs 102 but had left that code in digital form.

It may now be recalled that in identifying an $LI_i$ that LN 102 and the entire ILM 114 (in fully modular form, as discussed earlier) containing the INE 116, LUT 118, CODE 120, CLC 132, CCS1 126, SCS 128, etc.), those components pertinent to the identified LN 102 would all have been identified as well, since a particular location in CODE 120 will connect to just that one set of those components that has the same identification, all of which will pertain to and be connected to just one LN 102 in PS 100, that will then carry out all subsequent operations with respect to that LN 102. It should also be mentioned that references herein to codes "ccccccssssss," wherein that "ssssss" portion literally designates the code for only a single SPT 106, is also meant herein to represent two SPT 106 codes by "ssssssssssss" (12 bits) or a three SPT 106 code "ssssssssssssssssss" (18 bits), with only the one 6-bit "ssssss" reference usually being used in the text in order to save space. Finally, it should also be kept in mind that in the discussions throughout this specification, when for simplicity the passage of a single bit through some process is being described, in actuality there would likely be eight, 16 bits, 32 bits, etc. in each case passing through a like number of LNs 102, if the code had originated from a von Neumann-type computer using bytes of some fixed size, or could be of just about any length that the PS 100 could accommodate if derived from an ILA that had employed Variable Length Datum Segments (VLDSs), which entire byte or VLDS would be undergoing whatever procedures were being described as to just the one LN 102, thus to involve a much larger "swath" through PS 100 than the single-bit descriptions herein would tend to suggest. (For example, since all of the LNs 102 that participate in a cycle are to have all of the CPTs 104 and SPTs 106 that are involved to be enabled simultaneously, and there were three LNs 102 in that cycle as shown in a circuit drawing, each, in a fairly common circumstance requiring just two CPTs 104 (four bits) and one SPT 106 (six bits) to be enabled, that would be 3×10=30 PTs for each bit of the VLDS being treated, and finally ten bits in that VLDS, there would be 30×10=300 PTs (both CPTs 104 and SPTs 106) to be enabled simultaneously in just that one cycle.)

(The bit lengths 4, 8, 16, 32, 64, etc., might be termed "binary lengths," since these are the numbers that are represented by binary numbers having a leading "1" bit with the rest being "0" bits, and are commonly used for byte sizes. As noted above, since the individual bits in the "bytes," "words," or Variable Length Datum Segments (VLDSs) used in Instant Logic™ all act independently of one another, the datum segments in IL that are selected for use can be of any physically available length, and would not, for example, need to expend 32 or 64 bytes, say, to accommodate a 6-bit code, thereby to avoid wasting substantial amounts of space.)

To give here a quick summary of these matters, if as just discussed the identification of the location of an LN 102 had arrived at ILM 114 in binary form as the Index Number" $IN_j$, the entry would have been as "iiiiiccccccssssss," where "iiiii" again specifies the LN 102 location in a 5-bit binary form, used herein for reasons of limited space in a later Table. In using that 5-bit "iiiii" procedure, only the binary forms of the $LI_i$ values 1-63 could be encompassed, but that will suffice for these descriptive purposes, although an actual PS 100 would likely be many times larger. The full codes for all of the LNs 102 for each step or cycle are all entered at the same time, in no particular order in the code list. However, as to the circuit and signal codes themselves, it must be stressed again that the six bits in both the circuit code "cccccc" and the signal code(s) "ssssss" consist of three bit pairs, and the order of those bit pairs within both types of 6-bit code is absolutely critical, as of course is also the association of those codes with the correct LN 102. Each of the codes for the LNs 102 must include the "cccccc" CPT 104 code, although not every one of the three 2-bit nodes into the CCIN1s 190 must have an entry—these will only be made for those CPTs 104 that are actually to be enabled—and at least one "ssssss" code for one SPT 106, the separate "ssssss" codes again being in no particular order as to the different SPTs 106 if more than one is used, but in exact order within each "sssss" code itself. After those full CLs for all of the LNs 102 in a cycle had been entered, the next entry would be a "1" bit to mark the end of that cycle, for purposes of the cycle count. In principle, all of those full codes could be placed in a single line, but it is preferable for each CL to have a separate line, in part because the display thereof would more clearly express how many LNs 102 were being used in the particular cycle, while still providing a clear delineation by a blank line of where the cycle had been completed. (If preferred, instead of the blank line the user could encode the apparatus to display the "1" bit by which notice of the end of a cycle is brought about.)

For purposes of simplifying this description, the flow chart of FIG. 7 was constructed so as to complete all of the steps for one cycle and then undertake a next cycle, but it would be preferable to calculate all of the $IL_i$ values for the entire algorithm first, then go back through and convert all those the $IL_i$ values into $IN_j$ values, or at least to go through the whole algorithm first as to both the $IL_i$ calculations and the code conversions in one "pass," and then finally proceed with the actual code entry. The reason for using FIG. 7 in the form shown is that when trouble-shooting an algorithm as a whole, the cycle-by-cycle procedure shown would need be followed so that any errors can be found early on. Having learned that, the person of ordinary skill in the art would have no problem in changing the sequence so as to treat each task to be carried out "in bulk," i.e., throughout the entire algorithm. Which of those two procedures (or any others that a user might like to try) would be implemented by the instructions given by the control circuitry (not shown) for the ILA as a whole. (In another method to be described below, all of the D/B code transformations will have been completed before any algorithm is even selected for use, which would likely be the preferred method. These matters, of course, need only be considered once, at the time that the ILA is installed, and are not a continuing issue that will need to addressed every time that the ILA is used (unless the user chose to do so).)

If only the first $LI_1$ value were known, the $LI_i$ values for the rest of the LNs 102 in that cycle would need to be established before the D/B conversions for the remaining LNs 102 could be made. As noted earlier, each code that had entered IND116 in the "$LI_i$ccccccssssss" form (having perhaps been entered by hand) would need to have the $LI_i$ term converted to the $IN_j$ form in IND 116, and then be sent to CODE 120 in a form using the $IN_j$ binary code, in order for the rest of the CLs of that cycle to be entered. (That is the Steps 7-9 in the FIG. 7 flow chart, wherein the leading "0" bit is also added to the CL.) As can be seen in Steps 5-9 of FIG. 7, CLC 132 is adapted to accept the code from CODE 120 in either digital or binary form, with the $LI_i$ form if so received then being converted into the $IN_j$ form as just stated.

If the codes first appearing in binary form had been taken from an ILA that "0" bit might already have been added, but that does not mean that Step 6 in the "binary" branch from Step 5 of FIG. 7, the $LI_i$-to-$IN_j$ conversion process, would need to be bypassed. Steps 5 and 7-9 show that Step 6 (the test for whether the code is digital or binary) would be bypassed if the code were in binary form, but it will now be shown that because of the manner in which the "0" bit is added, Steps 7-9 actually need not be in the flow chart at all. The 12-, 18-, or 24-bit "ccccccssssss . ." CL (depending on whether the CL contained code for one, two, or three SPTs 106) is placed right justified into a 25-bit field that already had a "0" bit as the leading bit, so that Step 6 would yield a "0ccccccssssss . . ." code whether or not there had already been "0" bit at the MSB end of that CL. The flow chart that contains those Steps 7 and 8 was then shown simply for the sake of showing another option, although leaving out Steps 7, 8 would be preferred.

The $LI_i$ value and the accompanying "ssssss . . . " code of an LN 102 must suffice in themselves to establish the connection from that LN 102 that is required in order to arrive at the correct ILM 114 and hence correct next LN 102 in PS 100, based on the "ssssss" code of that LN 102 itself. (The "cccccc" code determines in part what role that LN 102 will play in forming a circuit, and as will be seen below, the "ssssss . . . " codes of an LN 102 can sometimes make connection to the LN 102 that preceded that particular LN 102.) Although there are only three codes (01, 10, and 11) for establishing which terminal of an LN 102 is to be used, either as an originating or a receiving terminal, and secondly only two directions (rightward and upward) were available from each terminal, nevertheless only one bit pair in the "ssssss" code suffices to determine the direction from an LN 102 in which the SPT 106 thereof to be enabled must extend, which could be any of the four "N," "S," "E," or "W" directions therefrom. That assertion need not be doubted, even though there continue to be only rightward and upward connections from available from an LN 102. The reason is that, with respect to a preceding LN 102 that was upward from the LN 102 then having the SPTs 106 thereon enabled in terms of that direction, although that upward LN 102 could not have made a downward connection to the LN 102 then being treated, an upward connection from the latter LN 102 to the preceding LN 102 thereabove would serve just as well, PTs being bidirectional. Such a connection, from the grid 110 terminal of the latter LN 102 to the DR 108 terminal of that upward LN 102 would look just the same as the usual connection from the DR 108 terminal of a first LN 102 to the GA 110 terminal of a following LN 102.

Whether the connection is made from the DR 108 terminal of the "Originating Transistor (OT) to the GA 110 terminal of the "Receiving Transistor" (RT) (the most common connection) or from the GA 110 terminal of the OT to the DR 108 terminal of the RT will determine whether the connection to be made will be in the direction of the signal flow or opposite thereto, the latter connection clearly being opposite to the signal flow, as will be shown later in a hypothetical circuit. (That is, both the paired terms "from" and "to" and the paired terms "proximal" and "distal" are quite arbitrary, and which is used depends solely on the point of view (although the context will normally remove the ambiguity).) However, because of the bidirectional character of PTs, including SPTs 106, which connection is made is quite immaterial to the operation of the circuit. (By contrast, as in the XOR gate of FIG. 50 (sheet 24), there can also be both a DR 108 terminal-to-DR 108 terminal and a GA 110 terminal-to-GA 110 terminal connection.)

A need for such a "backward" connection can come about in several ways. One of these would arise when an LN 102 was to send the output to two or more LNs 102. An ordinary OT DR 108 terminal-to-RT GA 110 terminal connection might be made first to the right, but then it would be necessary to send that same bit into another branch of the circuitry, for which that second connection could be made upwardly. In the circuit of FIG. 12 (sheet 10) to be described below, that "backward" connection was like that just discussed above, but made for a different reason, which was that the rightward path that the signal had been following was blocked, both to the right and upwardly. If a structuring path were to encounter a side or other boundary, unless the array were of a manifold-like character as will be discussed below, and if also the LN 102 thereabove was in use, then a "backwards," upward connection could be made from the LN 102 therebelow. (A manifold-like array will be seen below to be one in which when a line of LNs 102 encounters a boundary, the line will continue on in a "loop" around the array to the start of that same line.)

Also now, the matter of needing to know the $IN_j$ number of an LN 102 needs to be clarified. An LN 102 node in CODE 120 will have four lines extending therefrom, in four directions, two of which lines will be outgoing and the other two incoming. The content of the "ssssss" code will determine which one of those lines will be used, so whatever may be the $IN_j$ number of the LN 102 that turns out to be the RT is quite immaterial—it is the code that identifies the LN 102, and not the other way around. Even as to the OT the $IN_j$ value likewise need not (necessarily) be known, since all that must be known is that the LN 102 in question is where the circuit structuring had left off and must be resumed. The $IN_j$ number could be just about anything, since that number will be different in different sizes of the array, and what matters is not that number but the connection itself—if the correct direction had been identified for the purpose at hand that is the end of the matter. Strictly speaking, the same would be true throughout the full length of the algorithm.

The only circumstances in which that $IN_j$ number needs to be known would be those in which, for example (and as was noted earlier), some data have been temporarily stored in some local IL-structured latches, and it would be necessary later to come back to those same locations in order to begin structuring more circuits for which those data were required. This point is being stressed in order to avoid falling in to the perspective that abstract $LN_i$ numbers have any actual control of anything. (If those LNi values did not need to be known, it follows that they would also not need to be in binary code, but since it would never be known which LNs 102 might at some time need to be known, because of being part of a latch or some other reason, the procedures noted above for determining the binary $LN_i$ codes for all of the LNs 102 are carried out even so.)

As to maintaining the relationship between a particular set of CLs and a particular LN 102, if the location of that LN 102 was in the $LI_i$ digital form, Step 7 of FIG. 7 shows that the $LI_i$ and CL as received are first sent to IND 116, Step 8 shows the $IN_j$ number being determined from the $LI_i$ for that LN 102, with that "0" bit also being added to the leading end of that CL as described above, and then in Step 9 the $IN_j$ value so determined, the added "0" bit, and the CL are saved in CODE 120 just as though that $IN_j$ value had been present originally, with the association between the location of the LN 102 (now in binary rather than digital form) and the original CLs remaining intact. If the fixed connection between the particular LN 102 location in CODE 120 and the CI 140 of the CLC 132 being in the ILM 114 having the same location number were deemed sufficient to maintain that CL-LN 102 relationship intact, however, only the $LI_i$ and $IN_j$ codes and not the CLs themselves need be sent back and forth between CODE 120 and IND 116, thereby to save the power and LN 102 usage involved in transmitting the CLs out and back as shown in Steps 7 and 9 of FIG. 7. With the full "ccccccssssss" code having then been established in one way or another, Steps 10, 13 and 14 then show how the cycle and LN 102 counts are to be carried out.

The remaining aspects of determining $LI_i$ values and carrying out all of the remaining steps in FIG. 7 can best be explained through the use of FIG. 8 (sheet 6) that shows the "Code Line Counter" (CLC) 132 in which the CLs and both counts are respectively entered or developed. Except for the intervention of a certain "synchronizing" process to be described below, the operation of CLC 132 is initiated by way of "Code Input" (CI) 140, which preferably would represent an icon on a monitor screen that designates a particular algorithm, as one way of initiating an algorithm, although other ways are easily conceived. As mentioned earlier, the selection (by a "mouse click") of a particular algorithm will then start the structuring of the circuitry for that algorithm.

The input to CI 140 passes to "Router 1" (R1) 142 to be routed either as a CL to the rest of the circuitry if the input had had a leading "0" bit (thus to "signal" a CL) or as the above-mentioned "1" bit to "Cycle Accumulator" (CYA) 144, thus to add a cycle count. (That routing requirement was of course the reason for providing that leading "0" bit on every CL in the first place, as discussed above.) In summary, and as shown in Step 14 of FIG. 7, as a result of the foregoing either a cycle count or an LN 102 count will result from every CI 140 input: a cycle count based on a "1" bit input to CI 140 or an LN 102 count based on a "0" bit having been placed at the leading end of a CL input to CI 140, which latter input will generate a "1" bit in OR gate 146 that passes on to LNA 148. Both CYA 144 and LNA 148 will simply add each such "1" respective "1" bit as received onto the previously accumulated total of previous "1" bits of the respective count types, thus to provide a "running" count in each case. The "1" bit goes directly to CYA 144, while the "0" bit serves first to route that CL to OR gate 146 from which, since every CL will include at least one "1" bit, will result in a "1" bit that will then pass on to LNA 148 as an LN 102 count, and at the same time the CL is passed on to "Code Release Pass Transistor" (CRPT) 150. Both CYA 144 and LNA 148 will simply add a "1" bit to their respective current counts, either as received in the CYA 144 cycle count case or as developed from OR gate 146 in the LNA 148 LN 102 count case.

"Data Test" (DT) 152 and "Trigger" (TR) 154 are connected as two of the inputs to 3AND 156, with the third input thereto deriving from CI 140 through R1 142 and OR gate 146. ("Data Test" 152 is given that name rather than "Data Input" since the function to be carried out is not to enter data but only to recognize the entry of data, and thereby permit action to be taken thereon, with the actual data input line, unlike CI 140, being part of the external circuitry not shown.) That is, the CL that was caused to move to the right in FIG. 8 by the leading "0" bit in R1 142 will assuredly contain at least one "1" bit, and that CL passes on to OR gate 146 that by the nature of an OR gate will produce a "1" bit therefrom, which then provides the third "1" bit input to 3AND 156. This "1" bit is also that which passes on to LNA 148 to add a count to the number of LNs 102 used as noted above.)

Although the cycle and LN 102 counts could be sent to any point convenient to the user, both of these are shown in FIG. 8 as being sent to a monitor to be employed as the user may see fit, as well as being passed to a memory or a printer, etc. (not shown) for the normal record purposes. Preferably, these counts would be associated in memory and/or a printout with the $IN_j$ numbers and CLs that brought about the counts, as well as, for example, being displayed in a labeled field on a monitor screen for the display of each of the CYA 144 and LNA 148 counts. In operation, the CL itself would be sent to ILE 114 as the "CL input" for the basic circuit structuring process of the ILM 114, as shown in the flow chart of FIG. 7, or to CODE 120 if the algorithm was being installed. That operation could either be a normal self-regulating operation or one that was carried out step by step under direct user control, perhaps using a trigger (e.g., Trigger 154) to carry out each new step of the algorithm for purposes of trouble shooting. As will be further explained below, the external control circuitry (not shown) of the complete ILA would presumably be structured so as to ensure that CLs or data did not continue "pouring in" to CLC 132 while awaiting the execution of a next step.

No further actions could take place beyond 3AND 156 unless "1" bits were present on all three of those 3AND 156 inputs. The 3AND 156 then acts to release a CL from CLC 132 through CRPT 150 on to "Router 2" (R2) 158 only when those three conditions for release are met. The function of R2 158 is to send the CL to either INE 116 or CODE 120, depending upon whether the process was in Step 6 (the address code had been received in binary form) or in Step 7 (that code had been in digital form), or alternatively as to whether the algorithm was being installed or was in operation, as controlled by external circuitry (not shown).

The CLC 132 provides more features than are strictly necessary for the basic IL process in order to make the anticipated ultimate ILA as versatile as possible. The three inputs that are thereby made essential for operation are (1) the code necessary to structure the required circuits; (2) means for releasing any data that the algorithm may require; and (3) a trigger signal. At the option of the user, and by use of external circuitry (not shown), the DT 152 or TR 154 features can be bypassed (leaving the circuit structuring itself intact) simply by leaving the input line therefor with a constant 1" bit thereon. Thus, if no input data were required, and it was desired that the circuit be left to "free run" on its own internal data, both the DT 152 and TR 154 lines that connect to 3AND 156 would be provided with a constant 1" bit, so the execution of the algorithm would be wholly controlled by the circuit structuring.

Were it desired to ensure that all of the CI 140, DT 152, and TR 154 inputs would arrive at the same time, those inputs could first be passed through "Code Entry Release" (CER) 160, perhaps having the form of three PTs (not shown) connected in parallel to the stated inputs and all to be enabled at once, perhaps by a PTE 204. If not to be entered simultaneously, as for example delaying first the data input recognition in DT 152 and then TR 154 in order to allow the structuring processes brought about by a CI 140 input time to be completed, those inputs could be "staggered" by building specified amounts of delay (not shown) into the enabling of the PTs within CER 160.

If the operation was to be purely data driven, then the DT 152 would be provided with a "1" bit only as each data bit arrived (e.g., perhaps within CLC 132 itself by passing each CL through an OR gate to generate the required "1" bit), while leaving a "1" bit on LNA 148. The DT 152 line could also be left in use, in which case the circuit would then be data driven, but if the time of arrival of the data happened to be somewhat variable, TR 154 could also be used to adjust those data arrival times at the LNs 102 so as to take place with a constant period, providing that the Clock 130 phase was set so as always to enter the trigger pulse after the arrival of the data, as when the arrival of the data was used to enable both DT 152 and TR 14, leaving CI 140 to control the operation. Having the three inputs operating independently of one another also applies to different algorithms being executed simultaneously, and brings out the capability of allowing those algorithms that were clock driven to operate at different speeds, so long as sufficient Clocks 130 were provided for that purpose, i.e., so as to allow different algorithms to be run by those different Clocks 130.

The running count outputs of CYA 144 and LNA 148 would be changing much too rapidly even to be concurrently displayed, but the process could be "paused" at any time (e.g., by removing the input to TR 148 or halting the data input) to determine from the numbers displayed at that moment the location in the algorithm that had been reached. If the execution of an algorithm had stalled, the cycle or CL (i.e., LN 102) at which the stoppage had occurred would be seen immediately, and whatever corrective action was needed could be taken. After carrying out whatever repair or other actions that were needed, the execution of the algorithm would then be resumed. Also, the code list for the algorithm could be annotated in the course of that development, to indicate in the code list what processes were being carried out as to each CL or small set of CLs, and also as to the cause of a particular type of fault, to which additional notes could be added upon the occurrence of any new faults.

The $IN_j$ value for each LN 102 used would preferably be printed out along with those remarks and the CLs themselves, since without that information having been entered for inclusion in a printout, that printout of the code for the whole algorithm would consist only of many pages full of nothing but "0's" and "1's," and would be of little use. Such a list of counts, along with an automatically numbered listing of the CLs, could serve as useful appendices to an "operating manual" for more complex algorithms, especially if the counts from the CYA 144 and LNA 148 were correlated with the particular processes then taking place according to the code list. Although the cycle counts are brought about by a "1" bit input, those "1" bits need not be included in the printout of a CL list, so that printout would then appear as a short sequence of CLs (for one cycle), then either a blank line or preferably the cycle count then applicable, then another group of CLs, etc., with those blank lines or cycle counts marking the end of one cycle and the beginning of another.

Turning back to operations elsewhere within the apparatus, there will now be shown a "manual" method, "by hand," by which to determine $LI_i$ values, to be used in those cases in which only the initial $LI_1$ value was known and as yet the user has no "automated" means for making such determinations. This method would be to copy over onto the circuit drawing from a template such as that of FIG. 9 (sheet 8), wherein those integral numbers within the circles representing the LNs 102 would have been written in, only those numbers that corresponded to the LNs 102 that were actually to be used. These would be the $LI_i$ values that like both the $LI_1$ value for each algorithm and the CL that is associated with each such $LI_1$ or $LI_i$ value would be sent to IND 116, where all of the $LI_i$ values, including $LI_1$, would be converted into respective $IN_1$ and values, and the results of those conversions would be sent back to CODE 120. (The "layout" of the numbered LNs 102 in FIG. 9 is simply a randomly selected pattern used for illustration purposes only. As will be seen in the circuits used as examples below, the $LI_i$ numbers selected for these circuits will be bound to duplicate the reference numbers of the various apparatus components somewhere, but when that happens the context of the discussion will clearly identify the role in which the numbers then seen were being used, as between the two different ways in which such numbers are used in this application., e.g., a reference to a "282 LN 102" is clearly not a reference to a "Signal Code Voltage Source" (SCVS) 282.)

The $IN_j$ values being sought will ultimately derive from circuit drawings that had been designed to carry out whatever tasks were required by the algorithm. (In what follows, the means by which any well-defined information processing task would be translated into binary logic circuits on paper is assumed to be within the skill set of a person of ordinary skill in the art.) Procedures for translating that circuit into a series of CLs that would structure the circuit and execute the algorithm will now be described with reference to FIGS. 10 and 11 (both sheet 9). This code development process is called "Code Capturing," and in the use of Instant Logic™ (IL) in Information Processing (IP) is the key process in translating real world problems into those that can be resolved in an electronic device. Electronic means for carrying out the same process will be described later, the discussion now to follow being meant only to set out the "mechanics" of the process.

In explanation of this process, FIG. 10 (sheet 8) shows a 6×4 array at the top thereof that as indicated by the dashed lines extending downward therefrom is taken from a 30×20 PS 100, that 6×4 array being designated as "PS 100 Excerpt" (PSE) 162. The digits 1-12 are numbers that would have been assigned to the respective LNs 102 in the circuit when drawn, and when converted into the actual $LI_i$s used in the apparatus will be designated as just shown, i.e., as $LI_1$, $LI_2$, $LI_3$, etc., wherein the "1" LN 102 as taken from the circuit becomes $LI_1=1$, or $LI_{20}=20$, etc., in order to comport with the numbering system of CODE 120 and PS 100 wherein the node in the upper left hand corner is 1, $LI_1=1$, and $IN_1=00000001$. Since $2^0=1$, $2^1=2$, $2^2=4$, $2^3=8$, . . . , $2^8=256$, that $LI_i$ system would indeed encompass all of the LNs 102 in the array. That is, having elected to use a "1" subscript for the origin $LI_1$ of the LIi values, LUT 118 will yield, for example, an $IN_3$ from an $LI_3$.

Within PSE 162 are laid out a number of circles meant to represent particular LNs 102, each of which is designated either as an "Excerpt LN" (ELN) 164 for circles not including a number, or those of the circles that are numbered are designated as "Selected Excerpt LNs" (SELNs) 166, meaning the LNs 102 that were selected for use in the particular circuit, which use the same numbers as those in the circuit itself. (An example of that common practice of numbering the nodes in a circuit is shown in FIG. 12 (sheet 10) by the relatively large-type numbers near each of the LNs 102. The smaller numbers near to the $V_{dd}$ for each node are the $LI_i$ therefore (arbitrarily selected, and drawn from an array for which $x_M=282-186=96$, since the $LI_i$ for two nodes one above the other will always differ by the value of $x_M$. The LNs 102 of such drawings will usually be numbered such that the LN 102 that is to accept the input thereto will be numbered "1," and in consequence FIG. 9 shows that the SELN 166 numbered "1" also bears the label "$LI_1$," meaning that such SELN 166 is indeed that which "starts" the circuit by accepting the input thereto, the selected value for which is then used to determine all of the $LI_i$ values.

For the purpose of placing the proper $LI_i$ numbers on the LNs 102 in FIG. 9, FIG. 10 shows a like portion of a PS 100 for which there has been constructed an Overlay 168 containing formulae by which the $LI_i$ of each LN 102 encompassed by Overlay 168 would be calculated from that of the initial $LI_1$ as selected by the user. The lines in FIG. 10 that extend from Overlay 168 down into PS 100 indicate the location within PS 100 to which Overlay 168 refers, and the dark circles of PS 100 and Overlay 168 that are seen to coincide in position in PS 100 are used to ensure that Overlay 168 has been correctly positioned to yield the desired $LI_i$ values.

A count of the LNs 102 in the PS 100 of FIG. 9 will show that the LN 102 labeled "1" (i.e., the $LI_1$ LN 102) has the $LI_i$ number 81, while that in the lower right corner of that array has the $LI_i'$ number 176. (The conventional addresses for those LNs 102 would have had them at Row 5, Col. 21 and Row 30, Col. 26, respectively.) The SELNs 166 numbered 1-12 in the circuit drawing, when used in the circuit as seen within PSE 162, will have the $LI_i$ numbers therefor calculated using the formulae set out on Overlay 168. Application of the formulae therefor as shown in Overlay 168 of FIG. 10 to the SELNs 166 of FIG. 9 will yield the formula shown in Table IV below, since as just stated Overlay 168 in FIG. 10 would have been placed over a proper $LI_1$ location in PS 100, which in the example turned out to be $LI_1=81$. Upon placing Overlay 168 with the formulae for calculating the $LI_i$ shown thereon over PSE 162 of FIG. 9, in the proper orientation for an overlay having unequal sides, and with the dark circle thereof over that $LI_1=81$ location, allows the correct $LI_i$ values to be obtained from those formulae as shown in Table IV further below. That $LI_1=81$ would have come about because the user would have moved Overlay 168 over a PS 100 layout until a place was found at which all of the circles of Overlay 168 would have been over LNs 102 that would be available for use, and were otherwise located such as to be appropriate relative to the rest of the circuitry to be structured.

TABLE IV

| $LI_i$ Formulae for a Circuit |
|---|
| 1 = $LI_1$ |
| 2 = $LI_1$ + 30 |
| 3 = $LI_1$ + 60 |
| 4 = $LI_1$ + 60 + 1 |
| 5 = $LI_1$ + 60 + 2 |
| 6 = $LI_1$ + 60 + 3 |
| 7 = $LI_1$ + 90 + 3 |
| 8 = $LI_1$ + 90 + 4 |
| 9 = $LI_1$ + 90 + 5 |
| 10 = $LI_1$ + 30 + 3 |
| 11 = $LI_1$ + 30 + 4 |
| 12 = $LI_1$ + 4 |

The numbers "30," "60," and "90" used in Table IV are used because the PS 100 of FIG. 9 has a width or maximum "x" value of 30, and a number that is located directly below a first number will have a number that is the number of the upper LN 102 plus 30 for the first row down, plus 60 for the second row down, and plus 90 for the third row down. Numbers to the right of a particular number will simply have the number "1" added. The converse (i.e., using "−" instead of "+") of that procedure is used if the LN 102 for which the $LI_i$ value is being sought lies above or to the left of the reference LN 102. Application of $LI_i$=81 value to the entries in Table IV then yields all of the actual $LI_i$ in the following Table V:

TABLE V

| The $LI_i$ Values of a Hypothetical Circuit |
|---|
| 1 = 81 |
| 2 = 111 |
| 3 = 141 |
| 4 = 142 |
| 5 = 143 |
| 6 = 144 |
| 7 = 174 |
| 8 = 175 |
| 9 = 176 |
| 10 = 114 |
| 11 = 115 |
| 12 = 85 |

As a more general solution to the problem, an overlay having the distribution of the formulae for the $LI_i$ values as shown in Table VI below and that has a fixed $LI_1$ position at the center thereof (heavily underlined in Table VI for ease of visual location) would be preferred, since that layout if large enough would encompass any size of PS 100. Upon establishing that $LI_1$ value by placement of the overlay over a PS 100 chart as was done above, the $LI_i$ value of any other LN 102 within the space of such an overlay could be calculated immediately. Also, such an overlay could be used in just the one horizontal orientation, no matter what direction the circuit happened to develop, thus avoiding any need for two overlays and two sets of formulae. Even a larger circuit that exceeded the size of the overlay at hand could be treated using that same overlay by moving the starting location thereof, as noted below.

As seen in the second overlay in the lower part of FIG. 9, with an $LI_1'$ value to be used (i.e., 176) having been selected from within the range of that first overlay placement as in FIG. 9, with the overlay then to be applied a second time using that $LI_1'$ value as the staring point, the same formulae would apply to the LNs 102 encompassed by that new overlay but using the new $LI_1'$=176 value as the basis for doing the calculations rather than the original $LI_1$=81 value. To traverse some distance through the PS 100, the user would (1) place the overlay over a first $LI_1$ value; (2) select thereon a second $LI_1'$ value; (3) identify thereon a third $LI_1''$ value; (4) place the overlay again over that third $LI_1''$ value, and so on until the region of PS 100 that was desired was reached. That sequence must extend from the initial $LI_1$ value since the point reached must have the relationship with the $LI_1$ location that is defined by the structure of the circuit. The principles underlying the Overlay 168 use would also apply to a 3-D array, with the overlays being placed in planes above or below the reference plane.

Also, as to the first Overlay 168 described above, the facts that would need to be known in order to apply that Overlay 168 correctly would be (1) the $LI_1$ value; (2) which particular circle was to serve as the $LI_1$ circle; and (3) in what orientation (vertical or horizontal) is the overlay to be placed. In contrast, in prescribing a single overlay having a pre-defined $LI_1$ location and only one orientation to be used for all cases, Table VI shows an overlay for the proper use of which only the $LI_1$ value need be known.

TABLE VI

General $LI_i$ Overlay

| | | | | | | | | |
|---|---|---|---|---|---|---|---|---|
| $[LI_1 - 4 - 2x_M]$ | $[LI_1 - 3 - 2x_M]$ | $[LI_1 - 2 - 2x_M]$ | $[LI_1 - 1 - 2x_M]$ | $[LI_1 - 2x_M]$ | $[LI_1 + 1 - 2x_M]$ | $[LI_1 + 2 - 2x_M]$ | $[LI_1 + 3 - 2x_M]$ | $[LI_1 + 4 - 2x_M]$ |
| $[LI_1 - 4 - x_M]$ | $[LI_1 - 3 - x_M]$ | $[LI_1 - 2 - x_M]$ | $[LI_1 - 1 - x_M]$ | $[LI_1 - x_M]$ | $[LI_1 + 1 - x_M]$ | $[LI_1 + 2 - x_M]$ | $[LI_1 + 3 - x_M]$ | $[LI_1 + 4 - x_M]$ |
| $[LI_1 - 4]$ | $[LI_1 - 3]$ | $[LI_1 - 2]$ | $[LI_1 - 1]$ | $LI_1$ | $[LI_1 + 1]$ | $[LI_1 + 2]$ | $[LI_1 + 3]$ | $[LI_1 + 4]$ |
| $[LI_1 - 4 + x_M]$ | $[LI_1 - 3 + x_M]$ | $[LI_1 - 2 + x_M]$ | $[LI_1 - 1 + x_M]$ | $[LI_1 + x_M]$ | $[LI_1 + 1 + x_M]$ | $[LI_1 + 2 + x_M]$ | $[LI_1 + 3 + x_M]$ | $[LI_1 + 4x_M]$ |
| $[LI_1 - 4 + 2x_M]$ | $[LI_1 - 3 + 2x_M]$ | $[LI_1 - 2 + 2x_M]$ | $[LI_1 - 1] + 2x_M]$ | $[LI_1 + 2x_M]$ | $[LI_1 + 1 + 2x_M]$ | $[LI_1 + 2 + 2x_M]$ | $[LI_1 + 3] + 2x_M]$ | $[LI_1 + 4 + 2x_M]$ |

There is also an algebraic method of determining $LI_i$ values. If $r_i$ were the number of LNs 102 to the right of $LI_1$ and on the same line, then $LI_i = LI_1 + r_i$, which sums for the FIG. 9 array could again not exceed 30 for the first line, 60 for the second line, or 90 for the third line, etc. Going leftward the formulae would be the same except for bearing a minus sign rather than a plus. As to the different rows, as seen in Table VI the length $x_M$ of the x axis of the array is added for each row downward from that occupied by $LI_1$ in which the $LI_i$ in question appears, and for those $LI_i$ located above $LI_1$ the same numbers would be subtracted. A general formulae for determining the $LI_i$ values for all of the LNs 102 to be used in a circuit having a known $LI_1$ value is then given by the following Equation 7:

$$LI_i = LI_1 \pm r_i \pm k_i x_M, \quad (7)$$

where "$r_i$" is again the number of positions to the right or left of the $LI_1$ position, "$k_i$" is the number of rows below or above the $LI_1$ line on which the $LI_i$ appears, and $x_M$ is the length of the x axis. In the present case, for reasons of space Table V is seen to extend over only 9 nodes. (Unlike the above-described "manual" method, in determining the $LI_i$ numbers mathematically there is no "leapfrogging" across the array by repeated applications of an overlay, but only a single calculation for each node sought.)

In order to develop an $LI_1$ value directly from a PS 100, the LN 102 in the upper left corner of the boxed part of the PS 100 in the lower part of FIG. 9, which is $LI_1$, and which part is also expanded up to the larger version thereabove that includes the numbers within the circles for the LNs 102 being used, counts out in FIG. 9 to have the value 21, and being two rows below the top row will have an $LI_i$ value of 21+21 (30)=81, and the rest of the $LI_i$ data of Table IV can be filled in by the same application of the formula $LI_i = LI_1 \pm r_i \pm k_i x_M$ without recourse to an overlay. It is only necessary to know the physical location in PS 100 of the LNs 102 that are to be used, which can come from a larger chart of the PS 100 layout. The formulae in the upper part of FIG. 10 and in Tables III and VI constitute specific instances of that genera formulae as seen in Table V, and can be applied specifically to the numbered SELNs 166 of FIG. 9 so as to obtain the $LI_i$ for all of the 1, 2, . . . , 12 LNs 102 that are to be in use because of the original circuit drawing, i.e., the numbers in Table III. That process of converting the formulae of Table III into the actual $LI_i$ values of Table IV is illustrated in the following Table VII, to which the corresponding $IN_j$ numbers as would be found using LUT 118 have been added for future reference:

TABLE VII

Calculations of the $LI_i$ Values for the LN 102 Nodes of a Circuit Using Table VI:

1. $LI_1 = 81 = 01010001$;
2. $LI_2 = LI_1 + x_M = 81 + 30 = 111$; $IN_j = 01101111$;
3. $LI_3 = LI_1 + 2x_M = 81 + 2(30) = 81 + 60 = 141$; $IN_j = 10001101$;
4. $LI_4 = LI_1 + 2x_M + 1 = 81 + 2(30) + 1 = 81 + 61 = 142$; $IN_j = 10001110$;
5. $LI_5 = LI_1 + 2x_M + 2 = 81 + 2(30) + 2 = 81 + 62 = 143$; $IN_j = 10001111$;
6. $LI_6 = LI_1 + 2x_M + 3 = 81 + 2(30) + 3 = 81 + 63 = 144$; $IN_j = 10010000$;
7. $LI_7 = LI_1 + 3x_M + 3 = 81 + 3(30) + 3 = 81 + 93 = 174$; $IN_j = 10101110$;
8. $LI_8 = LI_1 + 3x_M + 4 = 81 + 3(30) + 4 = 81 + 94 = 175$; $IN_j = 10101111$;
9. $LI_9 = LI_1 + 3x_M + 5 = 81 + 3(30) + 5 = 81 + 95 = 176$; $IN_j = 10110000$;
10. $LI_{10} = LI_1 + x_M + 3 = 81 + 33 = 114$; $IN_j = 01110010$;

TABLE VII-continued

Calculations of the $LI_i$ Values for the LN 102 Nodes of a Circuit Using Table VI:

11. $LI_{11} = LI_1 + x_M + 4 = 81 + 34 = 115$; $IN_j = 01110011$;
12. $LI_{12} = LI_1 + 4 = 81 + 4 = 85$; $IN_j = 01010101$.

In short, either an overlay (preferably that of Table IV) or the $LI_i = LI_1 \pm r_i \pm k_i x_m$ formula can be used to determine all of the $LI_i$ of any circuit that would fit within the overlay or of any circuit at all within the size of the PS 100 using these formulae. It is better, of course, to avoid needing to use any overlay by calculating these LIi numbers mathematically as was just described within the coding algorithm itself.

With the $LI_i$ values for all of LNs 102 to be used in the particular circuit extract having been established, the next task is to get those values into the ILA, specifically into CODE 120, for which there are both "manual" and "automatic" methods. If that same "manual" method of determining the $LI_i$ values using an overlay as described above were to be continued as to the actual entries of those $LI_i$ values, the user would simply enter the $LI_i$ values as were found by the method described above into CODE 120, using a keyboard or a monitor window and a mouse, followed by the "cccccccsssss . . . " CLs as would be taken from the circuit as drawn. (How those CLs are developed will be described below.)

To "automate" that process, that $LI_i = Li_1 \pm r_i \pm k_i x_M$ formula method would preferably have been employed in acquiring those $LI_i$ values, since in that case the data underlying the $LI_i$ values as shown in Tables IV and VI would already have been placed in CODE 120. In such an "automatic" (electronic) method, if the CLs had already been placed within CODE 120 it would only be necessary to concatenate those CLs onto the $LI_i$ (of course correctly matching the CLs and $LI_i$ and ensuring the inclusion of the leading "0" bit) to obtain the full codes for all of the SELNs 166. If those CLs had not been entered at the time that all the $LI_i$ were being determined, those CLs would be entered in the same manner as was just noted for a continuation of that "manual" method, except that those CLs (with that leading "0" bit) would be entered at pre-determined locations as determined by the locations of the $LI_1$ and $LI_i$ values, so as to be appended onto the $LI_i$ values appropriate to each CL. In any of these cases, there should be a time at which both the $LI_i$ values and the CLs corresponding to those $LI_i$ values were present on screen at the same time, in order to ensure that each $LI_i$ was associated with the proper CL.

A "Node Locator" (NL) 170 circuit, shown in FIG. 11 (sheet 9), was specifically designed for the purpose of calculating those $LI_i = LI_1 \pm r_i \pm k_i x_M$ values, and begins with a pair of circuits used to identify a "+" or a "−" sign. In order to follow the manner in which the circuit functions, however, the manner in which the data to be used in the circuit are entered should first be pointed out. A set of fields is used that in its entirety "copies" the $LI_i = LI_1 \pm r_i \pm k_i x_M$ equation, i.e., there is first (1) an "$LI_1$" field into which the user enters the binary version of $LI_1$, i.e., $IN_1$, and then (2) a "+ or −" field into which the user enters either a "+" or a "−" sign that of course appear therein in their ASCII forms. Those two entries are employed in the circuit in which initially there are two "First Node Locator NAND" (NLNAND1) gate 172/first "Sign Register" (SR1) 174 combinations, with those SR1s 174 then being connected to respective first inputs to the NLNAND1 172 that is combined therewith.

In entering the equation $LI_i=LI_1\pm r_i\pm k_i x_M$, as shown by the larger numbers 1, 2, 3, . . . 7 that connect by arrows to various elements of FIG. 11, the various terms thereof can be entered in the order shown in the equation itself, so in FIG. 11 there can first be seen two "$LI_1$" entries, one for each of an ADDER and a SUBTRACTOR as will be discussed below, which "$LI_1$" entries will be ready for use as soon as the "+" or "−" sign and the "$r_i$" value (the "$r_i$" values as either an addend or a subtrahend) have been entered as the respective second and third entries as shown in FIG. 11. (The places for data entry in FIG. 11 are marked off by being encircled, with the result of the calculations (i.e., the equation as a whole) being shown at the end of the calculations in an elongate ellipse.

The result of the first addition or subtraction is shown in the respective upper left and upper right corners of the line "box" that extends between the upper ADDER and SUBTRACTOR and lower ADDER and SUBTRACTOR. Arrows near the center of the upper portion of that line are seen to point in both directions, meaning that the result of the addition or subtraction operation can extend from an upper ADDER to a lower SUBTRACTOR or from an upper SUBTRACTOR to a lower ADDER. That connection is necessary since both the upper and lower calculations can employ either the ADDER or the SUBTRACTOR circuit, and is possible since as to both the upper and lower operations, only one of the ADDER or SUBTRACTOR circuits will be in use at any particular time. The second entry is labeled "+ or −," one of which symbols is entered in accordance with which sign is applicable according to the particular formula then being used. (Again, if the LN 102 for which the $LI_i$ value is being sought is to the right of $LI_1$, the sign will be "+," or if to the left the sign will be "−.")

As to the corresponding circuitry, the "+" or "−" symbols have the ASCII codes of 0101011 and 0101101, respectively, which codes are permanently entered into respective first "Sign Registers" (SR1s) 174 that in FIG. 11 connect to the leftward terminal of the leftward NLNAND1 172 as to the "+" sign and the rightward terminal of the rightward NLNAND1 172 as to the "−" sign. (The "+" or "−" signs could also have been represented by the bits "0" and "1," respectively, that could have been used in lieu of the "=" and "−" signs. Those ASCII codes are a permanent feature of the circuit, and hence are shown in boxes, not circles.) The "+" or "−" sign when entered passes on to both NLNAND1s 172, i.e., to the rightward terminal of the leftward NLNAND1 172 and to the leftward terminal of the rightward NLNAND1 172. As is the nature of a NAND gate, one or the other of the NLNAND1s 172 will yield a "1" bit upon the ASCII code for the sign entering into the two NLNAND1s coinciding with the code in one or the other of the two SR1s 174.

As noted, the two NLNAND1s 172 connect respectively to an ADDER1 176 circuit and a SUBTRACTOR1 178, which are standard circuits well known to persons of ordinary skill in the art except that in this case ADDER1 176 and SUBTRACTOR1 178 both require an enable bit in order to operate. (The "1" added to those circuit names is again to distinguish these circuits from the second instances of those two circuits that will appear below.) That is of course necessary in order for the actions of the NLNAND1 s 172 to be effective. (The same result could have been accomplished by placing a PT along one of the input ($LI_i$ or $r_i$) lines leading to the ADDER1 176 and SUBTRACTOR1 178 circuits, and just one of which lines to those two circuits would be enabled by one NLNAND1 172.) It is thus evident that since at any one time only one of the two NLNAND1 s 172 can yield a "1" bit, only one of the ADDERI 176 and SUBTRACTOR1 178 circuits will be allowed to operate as to a particular sign entry and $IN_j$ calculation. (An advantage of using this mathematical method for establishing the $LI_i$ numbers for the LNs 102 of a circuit is that the result obtained is not an LIi value at all, but rather the binary equivalent thereof, i.e., the $IN_j$, ready for use in PS 100.)

The fourth entry is another "+ or −" entry, that determines which of second ADDER2 184 and second SUBTRACTOR2 186 are to be used. There are again NLNAND2s 180 and SR2s 182 interconnected as before relative to the "+ or −" entry. These were provided separately for purposes of ease in having the drawing reflect the course of the process, but of course there could be just one set of NLNANDs and SRs, in which case the two "+ or −" entries and following processes would both be carried out in the same set of NLNANDs and SRs. As those processes are being carried out, the fifth and sixth entries, which are "$k_i$" and $x_M$," respectively, are being entered into MULTIPLIER 188, so as to provide the "$k_i x_M$" product that is to serve as either the addend for an ADDER2 184 operation or as the subtrahend for a SUBTRACTOR2 186 operation. The first inputs to those two circuits will be either ($LI_i+r_i$) or ($LI_i-r_i$), and the second inputs will be the common $k_i x_M$, as shown on both sides of the FIG. 11 near the outputs of MULTIPLIER 188. Whichever of the addition or subtraction operation may have been used in each of the two operations, the result will be expressible as the original $LI_i=LI_1\pm r_i+k_i x_M$ formula as desired, and that is shown within an ellipse at the outputs of second ADDER2 184 and second SUBTRACTOR2 186.

Although the various "$LI_i$," "$LI_1$," "ki," and "$x_m$" terms were expressed above and in FIG. 11 in those particular digital forms as shown, which would be the point of view of the user as to what was being done, it will be realized that in order to carry out the calculations those terms would have been expressed as their binary forms, and as noted above, the result will be in the desired binary form of an $IN_j$. Because of the time required for the multiplication operation in particular, these calculations especially should be carried out as a group encompassing the entire algorithm before entering into any of the steps set out in the flow chart of FIG. 7 (sheet 7). Moreover, since the identification of the $LI_i$s and $IN_j$s for an algorithm need only be done once and preferably would not be an inherent part of the algorithm itself, the circuit of FIG. 11 (sheet 9) would best be provided as one of the IL "utility" algorithms, not for any particular need for high speed, but that would be structured and executed when needed to carry out those $LI_I$ and $IN_j$ determinations for various other algorithms, and not require fabrication and take up space unnecessarily as a hard-wired version. It may be noticed that FIG. 11 exhibits quite specifically a general philosophy underlying Instant Logic™, which is that real world problems are immediately translated into those binary gate circuits that will solve such problems, which problems are then addressed immediately without there being any "Middle Man" in the form of software.

Turning now to the role of that node identification process in the rest of the operations, there is an option as to whether an IND 116 would be provided for every LN 102 position in CODE 120 (and in PS 100). If such INDs 116 were provided, then the $IN_j$ values for all of the LNs 102 in a cycle would best be determined at the same time. Not to do so would require the fabrication of two different kinds of CLC 132, however, one with an IND 116 included and another without, or not to have an IND 116 in any CLC 132 at all, but instead to make the IND 116 as a separate unit. Even so, to have an IND 116 for every LN 102 would not necessarily be required since the $IN_j$ would preferably be determined "off line," i.e., before the actual execution of the algorithm so as not to interrupt the actual operations. Once those $IN_j$ values had been determined, in the course of the actual algorithm execution when time would make a difference the $IN_j$ and the different CPT 104 and SPT 106 codes for the different LNs 102 would all be entered at once, since those codes would be for different LNs 102 and hence connect to different CLCs 124 and thence different CCS1s 126 and SCSs 128. Consequently, although the IND 116 was placed in the sequence as shown in FIG. 4 (sheet 4) in order to show at the outset and in sequence all of the operations that will be needed, an actual ILM 114 would perhaps not include the D/B conversion at all, which, especially in light of the process of identifying $IN_j$ values for all of the LNs 102 in a circuit as just described, be formed instead as a separate "Node Locator"(NL) 170 that would find, all the $LI_i$ values of the algorithm and express those values as $IN_j$ as a preliminary operation before the processes of FIG. 7 (sheet 7) were even begun.

It is generally understood that a combinational logic circuit, consisting of some rather large collection of logic gates connected in sequence to form a series of circuits adapted to carry out some particular arithmetical/logical task, is the fastest way in which to carry out the arithmetical/logical processes that make up IP. In having a series of bits arrive at the inputs to such an elongate circuit, pass therethrough to a second step of the process in a continuous stream in accordance with the function of the circuit, and then continue on to the following circuit, etc., is all that is required to carry out any kind of IP. That is deemed to be the fastest process available, since making arithmetical/logical decisions is all that IP does, and the fastest way to make an arithmetical/logical decision in the electronics field is through the use of a gate circuit, or an equivalent binary switch such as an electro-optic device that would operate similarly. However, any such hard wired combinational logic circuit that could execute the entirety of even a simple program could well be impractically long and inordinately expensive, as well as being restricted in use to just the one algorithm. As a consequence, except for the relatively short gate sequences in an ALU that execute particular instructions, for practical reasons (i.e., the size and cost) specific gate circuits designed to carry out particular tasks are not generally used, in spite of their greater speed, and resort is had instead to μPs and FPGAs.

As to IL and the ILA (PS 100), what the bit stream flowing through PS 100 will encounter will be indistinguishable, except for passing through the SPTs 106, from what would have been encountered had that same circuitry been in the form of the hardwired gate sequences just noted. Thus, if at some point it was necessary to have an n-bit AND circuit, the n bits coursing through the PS 100 would at the proper place and time arrive at the input terminals of an n-bit AND circuit in both cases. In the hard wired circuit that AND gate would be present permanently, while in the ILA that AND circuit would have been structured perhaps a few ps or ns before the arrival of the data, and would then be de-structured a few ps or ns after that AND circuit had performed its function. It is of no importance to the operation itself, and would indeed be imperceptible, whether that AND circuit that was indeed present and functioning at the time needed had been present some few ps earlier or would remain present after that AND operation had been completed and the data then resulting had passed on. That being the case, what IL does is "draw in" some group of LNs 102 for the cycle in which those LNs 102 are needed to perform a part of whatever the task might have been, and then release those LNs 102 for other tasks.

Instant Logic™ as carried out in an ILA would then seem to be the fastest way possible in which IP, by which is meant any IP task that could be imagined, could be carried out, since the circuitry needed for every step of the algorithm could be structured "in an instant" (i.e., in a single cycle) for the purpose, and then de-structured. Moreover, as noted earlier, those structuring and de-structuring processes do not add to the overall execution time, since the time line for those structuring and de-structuring processes will be parallel to and independent of making the arithmetical/logical decisions themselves. The one difference between the two embodiments would be the added gate delays of the SPTs 106 by which the data paths are structured in IL and through which the data bits will pass, which for PTs would be rather minimal. The key to having the fastest possible Information Processing Apparatus (IPA) thus lies in having a continuous flow of data and the code needed to structure those circuits, without interruption, and the ILA is the only apparatus known to Applicant that exhibits that feature.

The next topic to be addressed will be the "code capturing" process, by which is meant the process by which the Circuit Code Selector (CCS1) 126 introduces the circuit code by which that circuit is structured. For that purpose, a hypothetical circuit to be structured is shown in FIG. 12 and a CCS1 126 that would carry out that structuring is shown in FIG. 13 (both sheet 10). Tables VIII(a), (b) below show the code entries that would need to be made for the enabling of the CPTs 104 and SPTs 106 of a set of LNs 102, cycle by cycle, so as to structure those LNs 102 into the hypothetical circuit shown in FIG. 12, which circuit could be an excerpt at some point along the complete code list for a much longer algorithm, although the intent here is simply to show some Instant Logic™ structuring techniques, with the circuit itself not being intended to exhibit any particular useful function. (Table VIII(b) shows the same data as does Table VIII(a) but with the LNs 102 being structured differently as to the cycle in which one of the SPTs 106 is enabled.) The circuit shown is made up of the very well known OR, NOT (inverter) and AND gates (in that order, and are so labeled in FIG. 12) so that emphasis could be placed not on the function of the circuit as such (that in FIG. 12 presumably not having any) but rather on the way in which the circuit would be structured by the methods of IL.

One departure from the standard process of structuring the next LN 102 in the direction of signal flow is specifically noted, i.e., that of structuring in a "reverse direction" as had been noted earlier, so with that exception (noted in the table), entries in the sixth "to SPT 106" column of Tables VIII(a), (b) below will refer to the terminals of the next rightward LN 102 to which the SPT 106 will extend, and the fifth "from SPT 106" column designates from which of the terminals of the identified LN 102 the SPT 106 will extend. The reason for the reverse connection derives from having the normal structuring of the 186 LN 102 blocked by previous structuring of the next LNs 102 for some other algorithm that would otherwise have been used, the blocking being shown by the dashed line above and to the right of the rest of the circuit.

Using the data in Tables VIII(a), (b) below, that were themselves based on an array for which $x_m$=96, it is possible to write out the code lines for each SPT 106, with the code for the CPTs 104 that are to be enabled being included as well. The resultant code lines are shown in FIG. 12 beneath each particular LN 102, and for the sake of completeness, the $IN_j$ codes for each LN 102 are shown as well, just below each of those code lines. The "0" that had been added on to the "ccccccssssss" code having already directed that code line in the proper direction by the action of R1 142, the full code that would apply to each LN 102 would be made up of the $IN_j$ code followed by the "ccccccssssss" code, with that added "0" having been removed. For the 185 LN 102 that full code, including an 8-bit $IN_j$ will then be the 20-bit code 10111001|010011|010101, with the eight $IN_j$ bits, six control code bits, and six signal code bits having been separated above by the vertical lines "|," and each 2-bit pair in FIG. 12 being similarly separated. With an $x_M$ value of 96 as noted above, since an 8-bit binary code will encompass numbers only up to 511, with 96×5=480 and 96×6=576 the 8-bit binary code used in FIG. 12 would accommodate only five full 96-bit rows if left in place.

It should be recalled, however, that as the LNs 102 for each cycle are used and then de-structured after use, LNs 102 that had participated in the early stages of any such circuit sequence could later be put back into use for other parts of the circuit, assuming of course that the course of structuring could be made to "circle back" to those spaces. The space to the right of and above those dashed lines in FIG. 12 was posited as already being in use with respect to the time period of cycle 322 only, when the 185/186 LN 102 OR gate and the output therefrom by way of the 16 SPT 106 of the 282 LN 102 were being structured, and might be available for use in subsequent cycles.

TABLE VIII(a)

SPT 106 Connections For the Hypothetical Circuit of FIG. 12 (Sheet 10) in a 2-D, Non-Manifold-Like PS 100

| Cycle | LN 102 | CPTs 104 | SPTs 106 | from SPT 106 | to SPT 106 | Counts |
|---|---|---|---|---|---|---|
| 322 | 185 | 1, 3 | 4 | DR 108 | DR 108 | 2, 1 |
| | 186 | 2, 3 | | None | None | 2, 0 |
| 323 | 282 | 1, 3 | 16 | GA 110 | DR 108 of 186 LN 102 | 2, 2 |
| | | | 5 | DR 108 | GA 110 | |
| 324 | 283 | 3 | 6 | DR 108 | S0 112 | 1, 1 |
| | 284 | 1, 2 | ? | DR 108 | ? | 2, 1 |

One cycle-by-cycle development of the signal path through the circuit of FIG. 12 (sheet 10) is reflected in the entries in Table VIII(a), specifically by the indicated cycle grouping, i.e., first the two 185 and 186 LNs 102, then the one 282 LN 102, and then the two 283 and 284 LNs 102 as would be carried out by the CCS1 126 shown in FIG. 13 (sheet 10). In FIG. 12 the circuit elements being used are the LNs 102 shown by the larger circles, the CPTs 104 shown by smaller circles, the SPTs 106 by small boxes, and finally the connecting lines that lie therebetween, all of which lines shown being in use, and shown in darker print. In order to avoid clutter, since there are so many SPTs 106 those not in use are not shown, while the less numerous CPTs 104 in use are shown in dark print while those not in use are shown in lighter print. The circles for the LNs 102 have an "IN" therein, the $LI_i$ value for each of which is shown near to the $V_{dd}$ above each LN 102; the circles for the CPTs 104 and the boxes for the SPTs 106 have those respective 104, 106 numbers from FIGS. 1, 2 (sheets 1, 2) attached thereto by lines; and the squares that represent the SPTs 106 also have a "1" therein indicating that they have been enabled, with the numbers from FIGS. 1, 2 that identify each SPT 106 being shown by numbers that connect by lines to each of the SPTs 106 shown. The "cccccccssssss" code lines are also shown below each LN 102, and below those lines the binary $IN_j$ codes for each of the LNs 102 are also shown. The arrowheads on the lines of the circuit pathway show the direction of signal flow. (In one instance, the connection is made in a direction that is opposite to that of the signal flow, with that connection direction being shown by separate, upwardly-directed dashed lines having arrowheads thereon, with both "direction of structuring" lines being shown in lighter print than are the signal lines between the LNs 102.)

As noted earlier, the structuring of a next LN 102 is ordinarily being carried out even as the preceding LN 102 is still in operation, but as to that upwardly extending input (in terms of the signal flow) line from the 282 LN 102 that at the same time is also an output line from the preceding 186 LN 102, in accordance with previous practice of enabling all of the CPTs 104 and SPTs 106 being used as to a particular LN 102 at the same time, in Table VIII(a) the 16 SPT 106 from that 282 LN 102 was enabled in the same cycle 323 as was the 5 SPT 106 on that 282 LN 102 that is used as the rightward output of that 282 LN 102. However, if the PS 100 circuitry were such that the LNs 102 were able to make downward as well as upward connections, then it is clear that as the usual means for transferring a bit from one LN 102 to the next, that downward-going LN 102, would have been used. Again, those are both the same The issue raised from having enabled that upward-directed 16 SPT 106 of the 282 LN 102 at the same time as the rightward going SPT 106 from that 282 LN 102 is that the upward-directed 16 SPT 106 of the 282 LN 102 could not be distinguished from a downward-going SPT 106 from the 186 LN 102—they would both simply be an SPT 106 that connected between the DR 108 terminal of the 186 LN 102 and the GA 110 terminal of the 282 LN 102.

As a result, the downward-directed line from the 186 LN 102 to the 282 LN 102 as hypothesized above is indeed there, but under a different name. Tables VIII(a) and (b) differ in more than just names, but also in timing: would enabling the input to the 282 LN 102 at the same time as were the 1 and 3 CPTs 104 of the 282 LN 102 be soon enough for the received bit to be acted on? The convention by which the CPTs 104 and SPTs 106 of an LN 102 are all to be enabled at the same time can thus lead to error. (By this example it can perhaps be appreciated why it is that some of these matters have been entered into in such copious detail—if that were not done, there could be many hidden errors occurring that would not be noticed because the processes occurring were not being looked at deep enough.) In the interest of having that 282 LN 102 receive the bit from the 186 LN 102 in time so as be more likely to be acted on, it would then be better to enable the 16 SPT 106 of the 282 LN 102 earlier, i.e., in the same cycle as are the 185 and 186 LNs 102 as shown below in Table VIII(b):

TABLE VIII(b)

An edited version of Table VIII(a), wherein one line has been moved to a previous cycle.

| Cycle | LN 102 | CPTs 104 | SPTs 106 | from SPT 106 | to SPT 106 | Counts |
|---|---|---|---|---|---|---|
| 322 | 185 | 1, 3 | 4 | DR 108 | DR 108 | 2, 1 |
| | 186 | 2, 3 | | None | None | 2, 0 |
| | 282 | 1, 3 | 16 | GA 110 | DR 108 of 186 LN 102 | 2, 1 |
| 323 | 282 | 1, 3 | 5 | DR 108 | GA 110 | 2, 1 |
| 324 | 283 | 3 | 6 | DR 108 | SO 112 | 1, 1 |
| | 284 | 1, 2 | ? | DR 108 | ? | 2, 1 |

The 282 LN 102 structuring of two CPTs 104 (1 and 3) and one (5) of the two SPTs 106 that are to be enabled and that nominally "derive from" the 282 LN 102 would then be enabled in the 323 cycle, with the other SPT 106 to be enabled, which is that 16 SPT 106 that connects from the GA 110 terminal thereof up to the DR 108 terminal of the 186 LN 102, would have been enabled in the previous cycle 322. The exact timing of the 186 LN 102 output would be somewhat variable in any event, since the 185 and 186 LNs 102 cooperate to form an OR gate, and even besides the fact that an input to the 186 LN 102 would come in from outside of PS 100, over some unknown distance, an input to the 185 LN 102 would need to traverse the 4 (DR 108 terminal to DR 108 terminal) SPT 106 in order to reach the same DR 108 terminal of the 186 LN 102 as is reached by a direct input to the 186 LN 102. Even von Neumann type computers have "logic races" as to any combinational logic components that they may have, but not so much as to require the same kind of detailed analysis as is being set out here. During the time that the 185-186 LN 102 OR gate structuring would have been developing the OR gate output, the 282 LN 102 would have been carrying out its own operation on a preceding bit, and that 282 LN 102 would have just completed its own task, shown in FIG. 12 to have been that of an inverter, so that the GA 110 terminal of the 282 LN 102 would then have become available for that next input from the 185-186 LN 102 OR gate, or more precisely, from the DR 108 terminal of the 186 LN 102. The difference between conventional circuitry and the IL manner of doing things is that as to the former, whatever might be some task, the operational transistor that was to carry out part of that task would have been present and ready to operate long before a bit to be operated on would have arrived, and would remain long after that operation has been carried out, but the data bits entering a PS 100 to be operated on have only a short window" of time within which to arrive on a GA 110 terminal of an LN 102 and bring about whatever effect it is to have, before that circuit will be de-structured into something else.

The general practice herein has been to enable the SPT(s) 106 of an LN 102 that is (are) to convey the LN 102 output prior to enabling the CPTs 104 that structure the LN 102 that is to receive those data, and the modified "schedule" of Table VIII(b) is now consistent with that rule. That same logic, however, would apply equally well to the 2 CPT 104 that connects onto the GA 110 terminal of the LN 102 that is to receive those data, but the structurings of an LN 102 herein as to the CPTs 102 have consistently enabled those CPTs 104 all at once, including the 2 CPT 104 that, like the 16 SPT 106 of the 282 LN 102, would convey a received bit onto that GA 110 terminal. However, considering the distance that data from an external source must travel as compared to that from an adjacent LN 102, the issue may not be so important. In any event, since the data entry and circuit structuring paths are separate and independent as previously discussed, and the relative phases of these operations can be adjusted, the "phase shifting" methods noted earlier would no doubt suffice to resolve any such timing problems.

Briefly turning back now to Table VIII(b), the third, "CPTs 104" column lists the CPTs 104 that were enabled for the LN 102 for which the $LI_i$ number is shown at the left of the row, and the fourth "SPTs 106" column lists the SPTs 106 that are enabled as to each LN 102. Except for the 282 LN 102, which as explained above is employed in a "reverse connection," the fifth "from SPT 106" and sixth "to SPT 106" columns are just that, wherein in FIG. 12 the SPT 106 in that fifth column lies to the left of the SPT 106 in the sixth column. The seventh and last column of Tables VIII(a), (b), with the label "Counts," indicates how many CPTs 104 and SPTs 106, respectively, had been enabled for the particular LN 102. As an example of such use, that column has the numbers "2, 1" in the first row, meaning that for the 185 LN 102 there are 2 CPTs 104 and one SPT 106 enabled, and similarly on down the column. Those numbers derive from and serve to summarize (1) the number of CPTs 104 that had been enabled as to the particular LN 102 (determined from a count of the column 3 entries); and (2) how many SPTs 106 were enabled as to that same "originating" 185 LN 102. The '186 row," "CPTs 104" column of Tables VIII(a), (b) lists two CPTs 104 (2 and 3), and the two "from SPT 106" and "to SPT 106" columns (fifth and sixth) for that 186 LN 102 show no SPTs 106 having been enabled, thus to yield the "2, 0" numbers in the "Counts" column for the 186 LN 102. The number of SPTs 106 enabled can also be gleaned from the number of rows (i.e., SPTs 106) listed pertaining to a particular cycle or LN 102, with, for example, the 322 cycle enabling three LNs 102 (or, as can be seen with respect to the 282 LN 102, at least a part of three LNs 102). That LN 102 is thus notable in being the only one in the circuit that has two enabled SPTs 106, but as a much less common circumstance, those two SPTs 106 are actually enabled in two different cycles. Those latter SPTs 106 thus appear in Table VIII(b) as a "1" entry in each of those cycles. (Table VIII(a) shows them as two entries in the 323 cycle, with that practice having been abandoned in light of the change in designation of the SPT 106 being used.)

As to the structuring itself, the circuit of FIG. 12 and Tables VIII(a) and VIII(b) have shown several kinds of structuring methods that can be used in IL for structuring circuits, so Table IX now shows the individual connections of the SPTs 106 that illustrate those structuring methods. (This Table IX, since it does not refer to the cycle in which the structuring occurs, would apply to the data of either Table VIII(a) or Table VIII(b). Also, for reasons of space the abbreviations "Dr.," "Ga.," and "So." are used for the DR 108, GA 110, and SO 112 terminals, respectively.)

TABLE IX

"ccccccssssss" Codes for the LNs 102 of the Circuit of FIG. 12 and Tables VIII(a), (b).

| $LI_i$ | | cccccc | | | ssssss | |
|---|---|---|---|---|---|---|
| 185 | 01 - Dr. on | 00 - Ga. off | 11 - So. on | 01 - Dr. out | 01 - rightward | 01 - Dr. in |
| 186 | 00 - Dr. off | 10 - Ga. on | 11 - So. on | 00 - none | 00 - none | 00 - none |
| 282(1) | 01 - Dr. on | 00 - Ga. off | 11 - So. on | 10 - Ga. out | 10 - upward | 01 - Dr. in |
| 282(2) | " | " | " | 01 - Dr. out | 01 - rightward | 10 - Ga. in |
| 283 | 00 - Dr. off | 00 - Ga. off | 11 - So. on | 01 - Dr. out | 01 - rightward | 11 - So. in |
| 284 | 01 - Dr. on | 10 - Ga. on | 00 - So. off; | 01 - Dr. out | 01 - rightward | ? |

To summarize now the overall numbering system for the basic IL circuit of FIG. 1, when expanded into a 2-D PS 100 as in FIG. 2 an LN 102 has 21 PTs connected to the three terminals thereof, each of which has an identifying number as shown in FIG. 2 (sheet 2), with those numbers having been selected using specific rules. The three "circuit" transistors (the CPTs 104) are identified by the terminals of the LN 102 from which those CPTs 104 connect outward as follows: "1" connects from the DR 108 terminal to $V_{dd}$; "2" connects from the GA 110 terminal to an external input; and "3" connects from the SO 112 terminal to GND. Those CPT 104 numbers are shown in all eight instances of the LNs 102 in FIG. 2. The remaining 18 SPTs 106, numbered 4-21, are numbered in the same order as to both the originating and receiving LNs 102, i.e., the three SPTs 106 that connect rightward from the DR 108 terminal are numbered in the order "4," meaning to the DR 108 terminal of the receiving LN 102; "5" means to the GA 110 terminal of the receiving LN 102, and "6" means to the SO 112 terminal of that receiving LN 102. The corresponding three SPTs 106 that connect rightward from the GA 110 terminal of the originating LN 102 are numbered 7, 8, and 9 in that same DR 108, GA 110, and SO 112 order as to the receiving terminals, and the SPTs 106 that connect rightward from the SO 112 terminal of the originating LN 102 the respective numbers would be 10, 11, 12, again in that same DR 108, GA 110, and SO 112 order as to the receiving terminals.

The SPTs 106 that extend upward from the LN 102 instead of rightward are given numbers in the same manner, except starting from number 13 and extending to number 21. All 21 of those PTs 104, 106 are shown in the template of FIG. 2 (sheet 2), while the numbers themselves are shown only in the first of the LNs 102 of FIG. 2, in the upper left hand corner thereof, since that number layout will be the same for all of the LNs 102. The entire 21 numbers, thus to include both the three CPTs 104 and the 18 SPTs 106 as just explained, are set out in the following Table X, wherein the three numbers for the three CPTs 104 themselves and the 18 (i.e., 4-21) numbers identifying the proximal end of the SPTs 106 are given in the 1, 3 and 5 "Originating" columns, while the corresponding locations of the distal ends of those respective SPTs 106 are given in the 2, 4, and 6 "Receiving" columns. Entries for the CPTs 104 will consist of the number only, but those for the SPTs 106 will also include a ">" symbol for those SPTs 106 that extend to the right and the symbol "ˆ" for those SPTs 106 that extend upward. Entries in the 2, 4, and 6 columns for the Receiving LNs 102 will consist only of the terminal name and terminal number, i.e., DR 108, GA 110, or SO 112.

TABLE X

A Chart of the Numbers Assigned to the SPTs 106 of an Originating LN 102, Also Indicating the Corresponding Terminals at the Receiving Ends Thereof

| Originating | Receiving |
|---|---|
| 1 DR 108 | ($V_{dd}$) |
| 2 GA 110 | (input) |
| 3 SO 112 | (GND) |
| 4 >DR 108 | DR 108 |
| 5 >DR 108 | GA 110 |
| 6 >DR 108 | SO 112 |
| 7 >GA 110 | DR 108 |
| 8 >GA 110 | GA 110 |
| 9 >GA 110 | SO 112 |
| 10 >SO 112 | DR 108 |
| 11 >SO 112 | GA 110 |
| 12 >SO 112 | SO 112 |
| 13 ˆDR 108 | DR 108 |
| 14 ˆDR 108 | GA 110 |
| 15 ˆDR 108 | SO 112 |
| 16 ˆGA 110 | DR 108 |
| 17 ˆGA 110 | GA 110 |
| 18 ˆGA 110 | SO 112 |
| 19 ˆSO 112 | DR 108 |
| 20 ˆSO 112 | GA 110 |
| 21 ˆSO 112 | SO 112 |

(>= rightward; ˆ= upward)

(It may be noticed that the use of a strictly binary code sacrifices the use of the highest numbered LN 102 in the array unless another bit were added to the bit spaces allocated to the $IN_j$ numbers. For example, a 4×4 array will contain 16 nodes, all of which can be represented by a 4-bit code except for that last number 16 that would require a 5-bit code. That is, although $4^2=2^4=16$, a 4-bit binary number can express digital numbers only up to 15, e.g., $1111=(15)_2$, while the 5-bit code 10000 is necessary to represent 16. Similarly, for an 8×8 array, a 6-bit binary number can express digital numbers only up to 63, with $2^6=64$. As noted earlier, if a "quasi-binary" code were used that started with a 00 code for 1, 01=2, 10 =3 and 11=4, then all of the locations in the array could be expressed by such a "quasi-binary"term having the same number of bits as the power of 2 of the highest number, i.e., all of the nodes in the array, whereby "1111" would equal 16. Although that procedure was shown earlier to have some advantages, the normal binary code wherein 1=01, 2=10 and 3=11 has been used throughout this application. It is that usage that permits the relationship of $(LI_i)_2=IN_j$, where the "2" subscript means "the binary form of," and those subscript numbers are the same on both sides of the equation. The use of that quasi-binary code remains as an option, however, and an Instant Logic™ device structured on that basis would also fall within the scope of the claims appended hereto.)

Turning now to the specific matter of code entry ("encoding"), as shown in the one level "Circuit Code Selector" (CCS1) 126 of FIG. 13 (sheet 10), the code entries as described above are received through an array of six "Circuit Code Input Nodes" (CCIN1s) 190, marked at the location of those CCIN1s 190 by a dark arrow with the label "MCI" ("Machine Code Input"), that term being used since the array of three 2-bit codes in the "cccccccsssss" code constitute the "circuit" part of the bits that bring about the operations in the PS 100, similar to the machine code in existing computers. (The "1" in the acronym "CCIN1" designates those elements (and the other elements herein that likewise include a "1" bit at the end of the acronyms therefor) as being part of that one level "Circuit Code Selector" CCS1 126, to distinguish that CCS1 126 and the several parts thereof from a second level "Circuit Code Selector" (CCS2) or "Data Analyzer" (DA2) 226 and analogous parts that will be shown and described later. The second name "Data Analyzer" name is added to the exact same circuit so as to provide a name that would be more informative "out in the real world," separate from the nomenclature technicalities that a patent application requires. The term should also indicate that this particular piece of hardware will also have uses elsewhere, outside of the context of Instant Logic™, as a general way of doing code selection.)

Those CCIN1s 190 connect to the rightward (in FIG. 13) sides of six XNOR1 gates 192, to the leftward sides of which XNOR1 gates 192 are also connected corresponding "First Circuit Code Reference Latches" (CCRL1s) 194, with the outputs of each 1-2, 3-4, and 5-6 pair of XNOR1 gates 192 being connected to the two sides of an AND1 gate 196. The actual entry of a code into PS 100 will only take place when a 2-bit code that enters into one of the 1-2, 3-4, or 5-6 pairs of adjacent CCIN1s 190 and then on to the rightward sides of a pair of XNOR1 gates 192 is the same as the code held in the like-numbered pair of CCRL1s 194 that connect to the leftward sides of those XNOR1 192 gates to which those two CCIN1s 190 are connected on the right sides thereof. A "1" bit is produced at the output of any XNOR1 192 gate for which the inputs onto the two sides thereof are the same, which in this case would be those from the CCIN1 190 and the CCRL1 194. The XNOR1 192 gates that formed any of the pairs 1-2, 3-4, or 5-6, with the outputs of each of those pairs being connected to the two sides of an AND1 196 gate, will cause a "1" bit to be produced by that AND1 196 gate. The "1" bit from such an AND1 196 gate then enters a One Level "Enable Latch" (EL1) 198 that will thereby pass therethrough a voltage from "Voltage Source" (VS1) 200 that will bring about the release of an enabling bit to the CPT 104 in PS 100 that is identified by that same 2-bit code "01," "10," or "11." (Those three VS1s 200 could of course have been combined so as to have just a single VS1 200 connecting to all three of the EL1s 198.) (A memory latch is also referred to a number of times below, sometimes just as "the latch," but the context should make clear in discussing either kind of latch to which kind of latch the reference refers.)

It may be noticed that the fact, for example, of having used both the 3 and 4 CCIN1s 190, i.e., having entered a 41" bit at the 3 CCIN1 190 and a "0" bit at the 4 CCIN1 190, in having entered those "1" and "0" bits in that order means to have entered the 2-bit code "10" that pertains to the 2 CPT 104 that connects to the GA 110 terminal of the LN 102. That "joining" of those two 1-bit codes into a single 2-bit code comes about by the fact that "1" bits are produced from both XNOR1s 192, those two "1" bit XNOR1 192 outputs then being "combined" by having been connected to the two sides of the 2 AND1 196 gate, thus to yield a "1" bit therefrom. The real substance of what is occurring here is that it only takes one bit to enable a pass transistor that will bring about some desired action, but to select the particular location at which that action is to take place may require quite a few bits, so once that batch of bits has identified the location sought by having had the same content as do the reference latches associated with the location sought, then the CCS1 126 will send the "1" bit needed to the particular location so identified.

For reasons of economy of manufacture, the six XNOR1s 192 of FIG. 13 are connected to just two CCRL1s 194, with (as it turned out, based on the codes being used) four of the XNOR1s 192 (2, 3, 5, and 6) being connected to the "1" CCRL1 194 and two XNOR1s 192 (1 and 4) to the "0" CCRL1 194. So far as the operation itself is concerned, the circuit could as well have been drawn with a separate CCRL1 194 being connected to each XNOR1 192, as will be done in other circuits further below. Had that been done here it can be seen that the resultant circuit would in fact consist of three identical circuits that were totally unconnected to one another, and that functioned entirely independently. Besides the separate CCRL1s 194, each of those three circuits would consist of (1) two CCIN1s 190; (2) two XNOR1s 192; (3) one AND1 196 gate; (4) one EL1 198; and one VS1 200. The three identical circuits then resulting are separated off by dashed lines in FIG. 13, wherein such lines can be drawn between those circuits without touching any part of those circuits themselves, thus to confirm and emphasize their separate status.

In part to help illustrate the independence of those circuits, one such circuit is drawn separately in FIG. 14 (sheet 11) as a "2-bit Code Output Enabler" (2COE). (Other than the reference number for the circuit itself, since the 2COE 202 circuit of FIG. 14 is but an excerpt of the CCS1 126 of FIG. 13, the reference numbers used in FIG. 14 are the same as those used in FIG. 13.) That drawing shows no code or any of the numbers that distinguish one instance of a repeated element from another, i.e., there are six CCIN1s 190 numbered 1-6 in FIG. 13, but since the pair of CCIN1s 190 shown in FIG. 14 could have been any one of the three pairs thereof in FIG. 13, in FIG. 14 no reference numbers are shown within the CCIN1s 190 or in the AND1 196 gate as were present in FIG. 13. It is evident that the 2COE 202 could be used at just about any place in any circuit in which it was sought to generate a "1" bit from an entry of two (particular) bits, whether as a group or using individual codes for selection purposes as was done in CCS1 126, which of course is why the circuit name does not refer to code selecting but only to the release of a bit (by enabling such "code output").

A 3-bit code selector is shown later in which it can be seen that a "3COE" (or higher) COE 202 could also be structured. Indeed, n-bit code selectors could be formed from the 2COE 202 of FIG. 13 wherein n would have values of 8, 16, or 32, . . . , or in light of the use by the ILA of the "Variable Length Datum Segments" (VLDSs) described earlier, n could be 11, 93, 173, etc. The point is raised here because, as seen in FIG. 14, the 2COE 202 uses an AND gate having a number of inputs corresponding to the bit lengths of the data bytes to be entered into the circuit, and to this inventor's knowledge there are no 173-bit AND gates, nor are there likely to be any. What that bit size counts, besides bits, is the number of LNs 102 connected in series to a single $V_{dd}$, and because of the voltage drops that occur at each such LN 102, a point would be reached at which the voltage would be reduced to a level that would not support the operation of the last of those LNs 102, which of course means that there is a limit to the size at which an AND gate could be expected to operate. Consequently, one manner in which that problem can be resolved will now be set out.

What must be determined in the 2COE 202, or in a "code output enabler" of any size, is whether the bits in a data word entry correspond to the bits held in the set of CRLs 212, but to avoid needing to have AND gates that are too long to be functional, that code matching task need not be done "all in one piece." As an example, a 20-bit data word could be segmented as to the individual connections made from each line carrying one of the bits of the data word into each one of the CCIN1s 190 in "batches." Those lines could connect perhaps to five different instances, in parallel, of a 4-bit circuit of the 2COE 202 type, i.e., a "4COE," using a corresponding set of five 4-bit CRLs being aligned accordingly (or here it would make no difference if a single 20-bit set were used). The only difference would be that the "4COE" would include 4-bit rather than 2-bit components. Another option would of course be to have four instances of a 5COE, but that would be less preferred because of the somewhat more complex task of developing any odd-numbered COE. For data words that themselves had an odd number of bits, however, at some point one of the circuits would have to be of a 3-bit or 5-bit, etc., size.

For even larger bit sizes, circuit structures could be made wherein perhaps two or three or so of the arrangements just described would be set up in parallel, for word sizes of 40 or 60 bits, with the outputs of each of such arrangement being cascaded into a single additional 2- or 3-bit AND gate, and then that whole arrangement could be cascaded again for really long words, etc. Also using what was just said above as to that first arrangement, the description of the 2COE 202 just given should suffice to show as well how a code output enabler of any bit size could be constructed. Depending on what kinds of tasks a particular ILA site carried out, these code output selectors could be provided in various sizes, or of course they could also be structured in PS 100 at any time they were needed. It should also be noted that the utility of these devices would not necessarily be limited to the Instant Logic™ context, since the same circuitry, if fixed in hardware, could be used in other contexts within current electronics practice.

This "COE-type" circuit, indeed, could turn out to be one of the more versatile circuits within the ILA or indeed in any binary electronic device. There can be circumstances in which the desianatinq problem did not lie in the need to treat long code words, but rather in finding some place within the structure of the device as a whole where there would be space to put a circuit that was large enough to perform that task, by which is meant not only the finding of a large enough block of free LNs 102 in the PS 100, but also in the current electronics art, the physical space in which to put a hardware version of the designator that was large enough to treat those large code words. One does not need to be using an ILA to make use of the practices set out herein when addressing a circuit that was to be in hard-wired form in the ILA itself.

In any kind of electronic instrument in which large scale designating (or sorting, data mining, or any other such task) was to be carried out, but with no single space that was large enough to admit enough circuitry to carry out that whole task being available, the independence of action of the COE-type circuit would permit any number of such circuits to be scattered throughout the architecture of the entire instrument and still get the designating carried out. As a less complex example, were it necessary to transfer some, say, 5- or 6-bit word across nearly the full length of an instrument, the same result could be achieved through use of a 5- or 6 bit COE at the outset, and then just transfer the one bit that would result across the instrument. (A macro-sized "Test Bed" (TB) 300 will be described later on that would seem to be a perfect tool for testing out such issues.) Indeed, for these and innumerable other such tasks that might come up, your normal digital electronics device should have a few Instant Logic™ Modules" (ILMs 114) tucked away inside their cabinets to carry out such tasks.

The AND1 196 gates of FIGS. 14-17 are caused to generate a "1" bit, and that "1" bit will release "another" "1" bit—actually a voltage taken from VS1 200 through the use of EL1 198. The reason for so doing, and not just using the "1" bit from the AND1 196 gate, rests on the presumed greater reliability of acquiring a voltage directly from a fixed voltage source rather than from an LN 102 output. Although being shown in FIGS. 14 and 15 as being located near to the rest of those circuits, those CPTs 104 are actually physically located in PS 100, that may be some distance from the CCS1 126 or the circuits of FIGS. 14-15, and in that case it will be important to ensure that after having been transferred to PS 100 that voltage will be of sufficient value to enable the CPTs 104, and would not have been reduced too much by ohmic losses. The voltage requirement is thus taken to be more likely to be met when using a fixed voltage source rather than a bit from an LN 102 output that may itself have deteriorated somewhat in strength.

On that basis, the EL1 198/VS1 200 combination will be of general value in itself, and is shown separately in FIG. 15 (sheet 12) as a "2-bit Latched Code Output" (2LCO) 204. (The "2" at the start of the "2LCO" acronym refers as before to the number of input bits. The "2-bit Latched Code Output" name is used here only by analogy to the names of the other elements of the CCS1 126 circuit of FIG. 13, and is perhaps better called a "Pass Transistor Enabler" (PTE) 204.) An alternative output circuit in which the EL1 198 and VS1 200 are not used but the "1" bit from the AND1 gate 196 is instead sent directly to the intended recipient (whether a CPT 104 or anything else) is shown in FIG. 16 as "Direct Code Output" (DCO) 206. Since the 2COE 202, PTE 204, and DCO 206 are all "general purpose" devices that can be used anywhere to provide a "1" bit to any kind of circuit, instead of having attached numbers the receiving elements in FIGS. 14-16 are simply labeled with a "?."

Besides helping to maintain a voltage level, a corollary result of using the EL1 198/VS1 200 combination is that another cycle is added to the timing sequence, and there could be occasions in which such a shift in timing could be fatal to (or save) the main purpose of the circuit. For example, instead of there simply being a CPT 104 as the recipient circuit as in the CCS1 126, that output could be, say, one of several inputs to an AND or OR gate. That added cycle could then have the "1" bit deriving therefrom arriving at such an AND or OR gate one cycle after one or more other inputs, thus to prevent the proper functioning of that gate. It might then be necessary instead to use the DCO 206 circuit of FIG. 16, but one would hope to be able to do that within circuitry that was located physically near to the circuit producing that "1" bit (as was produced by the AND1 gate 196 in CCS1 126), so the loss of power from transferring that voltage over a long distance would not be a concern. This example of "logic racing" is brought out to suggest that the entire algorithm (or indeed PS 100) may be fraught with hundreds or thousands of circumstances in which timing adjustments would be required. (A BYPASS gate (to be discussed below) that is used to resolve spatial mismatches can also be used to fix timing problems.)

At the same time, while the kinds of circumstances just described may have some effect on the maximum speed at which the apparatus could be made to operate (slowing down the operation increases the opportunity for causing the several inputs to an AND or OR gate or the like to overlap), no circumstances are seen to exist that would seriously impair or prevent the operation of the apparatus as has been described herein from operating at some speed.

From the foregoing, it is clear that as many of the 2COEs 202 as desired could be joined together to form larger circuit code selectors than the CCS1 126 of FIG. 13 (sheet 10) that used only three 2COEs 202. Moreover, in circumstances other than selecting from one up to three of three different codes with no duplication, as in the CCS1 126, repetitive selection of some codes could be carried out, as will be shown further below in connection with a second level circuit code selector, and for a wider range of choices a larger bit size could also be used. The CCS1 126 and other such one-level code selectors can then be taken as falling within a general class of code selectors designated as n-bit l/m code selectors, where "n" is the number of bits in the selection code being used, r is the number of input terminals provided, and "m" is the number of output codes allowed. The CCS1 126, for example, is a 2-bit 3/3 code selector as can be seen in FIG. 13 since three 2-bit code entries and three 1-bit outputs are shown.

Although a "code selector" for distributing a number of n-bit data inputs among an equal number of n-bit outputs (i.e., l=m) could possibly be found in the prior art, none of the present type have been found by Applicant, and it is thought that perhaps no data selector in which l≠m would have been known to the public at all. (That is, although there might be any number of different ways in which to carry out the particular process, it is possible that none of those would have employed precisely this particular type of code (or item, data, etc.) selector.) As noted above there could also be developed code selectors of this n-bit l/m type in which l>m, but in the present context, if all/inputs were used that would mean that one or more of the PTs 104 would be selected more than once, which would be meaningless in the context of selecting CPTs 104. However, for the purpose of expanding this code selector aspect of the invention for a more general use, a useful n-bit l/m data selector in another context in which l>m, will also be illustrated below. (Indeed, in view of the abundance of "categorization" problems in life's work, this "l>m" variation might well find greater use than the "l≦m" or "l=m" versions. What might be called "l>m" problems abound, and have been getting resolved for many years, but it is not believed that they have been addressed by the precise method described herein.)

Before getting into that higher level code selector, however, it is necessary to point out one more capability of the kinds of circuits illustrated by the CCS1 126 of FIG. 13 (sheet 10) and the 2COE of FIG. 14 (sheet 11), since there is one more technique of code selecting available that needs to be shown. That technique is found in the "Elective Code Selector" (ECS) 208 of FIG. 17 (sheet 11), wherein either a "0" or a "1" bit may be entered so as to select one or the other of two different output locations. The technique is shown in the context of another "normal" input of the type used in FIGS. 13, 14, so that a 2-bit code is thus obtained, but could also be used separately from such a context so as to yield just a 1-bit output. (Such a use, however, would do no more than "give back" the "0" or "1" bit that had been entered, and hence in isolation would have no useful purpose.)

The ECS 208 as shown in FIG. 17 (sheet 11) is seen to be made up firstly of a single "Normal Input Node" (NIN) 210 that together with an "Elective Code Reference Latch" (ECRL) 212 leads into a normal XNOR 214. The "elective" term on that ECRL 212 and two others that are exactly the same means only that they are parts of the "elective" ECS 208; these are all just common latches. There is also an "Elective Input" (EI) 216, that is similarly the same as the NIN 210, but is here designated "elective" to distinguish the different consequences of its use. Unlike the NIN 210, this EI 216 connects to two ordinary XNORs, but these are separately identified as being EXNORs 218 because of their elective role. Of the two EXNORs 218, one connects to a first "Elective AND" (EAND) gate 220 along with the output of the normal XNOR 214. The second EXNOR 218 connects to a second EAND 220, with the second input to this second EAND 220 being connected to the output of the normal XNOR 214. With the three ECRLs 212 having the respective values "1," "0," and "1," which of the two EAND gates will receive two "1" inputs and thus yield an output so as to enable the "Elective Enable Latch" (EEL) 222 and thereby pass through an enabling voltage from an "Elective Voltage Source" 224 then depends entirely on the input to the EI 216, since the reference bit on the first EXNOR 218 is a "0" bit and that to the second EXNOR 218 is a "1" bit. There could be no circumstance under which the input to the EI 216 would not end up enabling an EEL 222, since a "0" bit would match with a "0" bit on the 2 ECRL 212, thus to develop a "1" bit from the 1 EAND if the 1 ECRL 212 had a "1" bit thereon, and a "1" bit on the EI 216 would match with the "1" bit on the 3 ECRL 212, thereby to obtain a "1" bit from the 3 EXNOR 218 to match that same "1" bit from the NIN 210 and develop a "1" bit from the 2 EAND to enable the rightward EEL 222, in that rightward pathway. In other words, with a "1" bit on the NIN 210, the only possible two bit codes would be 10 and 11, with no "00" code being possible, and a similar analysis of the situation of having a "0" bit on the NIN 210 would establish the two outputs as being 00 or 01, with no "11" code being possible.

The connections between the XNORs and AND gates in this ECS 208 type of circuit are quite distinct, in that while the outputs of the two EXNOR 218 gates connect to the rightward terminals of the 2 and 3 "Elective AND" (EAND) gates 220 in the usual manner, the 1 XNOR 214 gate connects to the leftward terminals of both the 2 and 3 "Elective AND" (EAND) gates 220. In the example shown the 2 and 3 ECRLs contain the bits "0" and "1" respectively, so that while the 1 EAND 220 shall only yield an output on the input to the NIN 210 of a "1" bit (which could have been made to require a "0" bit if a "0" bit had been placed in the 1 ECRL 212), the rightward or 2 EAND 220 can yield either a "0" or a "1" bit, depending upon whether a "0" or a "1" bit was entered at EI 216. In that way, connection is made to the leftward terminals of both the 1 and 2 EANDs 220, to which are connected respective "Elective Enable Latches" (EELs) 222 and "Elective Voltage Sources" EVSs 224, which are respectively identical to the EL1 198 and VS1 200 of FIGS. 14, 15, with the EELs 222 and EVSs 224 again paired up to form a 2LCO (PTE) 204 as shown in FIG. 15.

The codes that could arise from ECS 208 are then "10" and "11," that with a "0" bit in the 1 ECRL 212 (e.g., for slippers) could have been "00" and "01." The positions of the NIN 210 and EI 216 could also have been reversed in the initial fabrication so as to place the "fixed" bit value on the right and the "elective" bit value on the left, thus to yield the possible codes "00" and "10" with a "0" bit in the rightward ECRL 212, or "01" or "11" with a "1" bit in the rightward ECRL 212. A circuit such as the ECS 208 could be used, for example, in a context in which as to the second bit the "0" inputs were women's shoes and the "1" inputs were men's shoes, with both inputs already in the data base but to be joined into a single category, e.g., when all that was sought to be learned was how many items of a particular type (shoes) were in an inventory, regardless of which kind (men's or women's), with the "1" (shoes" and "0" (slippers) being the only two entries within a broader "footwear" category as singled out in a prior classification level.

The conceptual basis for Instant Logic™ also encompasses higher level code selectors, in contexts not limited in numbers as is that of CPTs 104, but rather as to a body of data that can first be classified in terms of one type of category, and then within each of those categories another classification is made according to some other criteria. As shown below for each such level of selection, the body of data being treated will be directed as a result not only of criteria then being used, but also on the results from the previous level of selection, these levels thus being "nested together" so that each item will end up being classified in accordance with the criteria of all of the selection levels. The next selection process is carried out just once, but the actual "destination" of each item will follow not only the results of that sorting but also that of every preceding level. The sort processes in all of the levels will be under way at the same time. Thus, a number of motor vehicles might be classified in a first level sort as 2-door sedans, pickups, SUVs, etc., and then in a second sort level within each such category the vehicles of each type could be classified as to the "A," "B," "C," etc. manufacturers, resulting in A 2-door sedans, A pickups, A SUVs, etc., and then B 2-door sedans, B pickups, etc. If a next category was the price range, once all of the sort levels had been carried through, it would be easy enough to run a global search on all vehicles within a selected price range, so once the full process had been carried out, the "mining" for certain select groups would thus be quite simple. That "nesting" process could be continued for as many types of category as one wished.

The higher level code selector now to be described as a hard wired circuit is separate and distinct from those used to structure IL circuits for carrying out various algorithms. This circuit could be hard wired into an ILA as an optional "add-on" to the basic ILA, thus to have no necessary relationship with Instant Logic™. This is not to say, of course, that such circuits could not also be provided in the form of code lists, just like the usual algorithm, that would be added to CODE 120 along with the regular algorithms so that, when used, these higher level code selectors would themselves be structured in IL form just like any other algorithm, rather then being included as hard wired circuits.

The hard wired circuit to be discussed below may not be the best way to proceed, since data bases come in all shapes and sizes, and if hard wired circuits were to be used that would mean any number of different n-bit l/m code selectors if any real attempt were made to encompass all types of data bases. Thus, instead of installing a number of n-bit l/m code selectors, a single n-bit l/m code selector in which both "l" and "n" were quite large could also accommodate the smaller data bases in terms of the number of different groups, inputs or outputs. These considerations have nothing to do with the sizes of the data bases in terms of the number of items, but only the sizes of "l" and "m," but that still leaves a lot of circuitry that would rarely be used. Consequently, even though the code selector (or "data analyzer") to be discussed below will be treated as though it were hard wired, the tasks that these circuits are to perform are of the type that Instant Logic™ is intended to address, and hence would best be treated as yet another algorithm to be encoded and entered into the ILA. With codes for both the 2COE 202 of FIG. 14 and ECS 208 of FIG. 17 (both sheet 10) being available as code modules, for example, a wide variety of circuit code selectors could be built up very easily. (It is in precisely this kind of circumstance in which a circuit would be required in a number of different forms that the value of IL can best be exhibited and appreciated.)

A multi-level code selector might better be given a more general name, since the items being treated may be no kind of code (in that same sense) at all. (Any kind of binary code is of course a "code," but that code need not have any formal definition and could represent anything. In this next circuit, for example, one code will "stand for" shirts, another for sox, etc.) As a result, the second level "Code Selector" (CCS2) 226 circuit of FIG. 18 (sheet 12) that carries out the same code selection process as does the CCS1 126 of FIG. 13 (sheet 10) but also involves a second selection process within each of the categories found in the first process, can also be called a two level "Data Analyzer" (DA2) 226, since it does indeed analyze the data in terms of how many items are present within certain defined categories. (That same kind of analysis might be carried out on the parts of this invention, using the reference numbers.)

This two-level (which of course could be of various numbers of levels) code selector incorporates a principle not seen in the usual hierarchical sorting process. In the SCS 128 to be discussed later, for example, the "ssssss" code is separated out in sequence, wherein the first "ss" pair makes one grouping; within each of those groups the second "ss" pair divides each member of that first grouping into another group, etc., thus finally to identify a specific SPT 106. That same kind of "sieve" sort can be used to locate an address in PS 100 or CODE 120, by using the individual bits $i_1, i_2, i_3, \ldots i_n$ in an n-bit "iiiii . . . " address, wherein the level defined by each bit would have two members in the group, i.e., "0" and "1," and could be so applied in a complete ILA.

In the CCS2 or DA2 226, on the other hand, the separations into groups, using such criteria as may apply to each of the two (in this example, but could be any integer)) levels, take place simultaneously. Even as the "A" circuit is finding out how many of each the "a," "b," "c," etc., types (pants, shirts, etc.) there are, the "B" circuit is determining as to each item whether, for example, those clothes were for men, women, or children, so as a particular clothing type is counted and be ready to be added to the total, the "B" circuit will have identified the item as being men's, women's, or children's, so that the count of a particular clothing type will be sent to that one of those three categories to which that count should be added, and the "C" circuit carries out that routing.

The uniqueness of the process thus lies in the fact that in carrying out this "search within a search within a search," etc., process, all of these searches can be carried out simultaneously. In effect, this sorting process has been "parallelized," with the same consequences anticipated therefrom as constitute the reason for adopting parallel processing in the general computer art: within a given time period, more processing is expected to be accomplished if different aspects of the task can be carried out at the same time (or the same process can be carried out in multiple streams).

An added task of the DA2 226 application being used as an example, besides just the preparation of an inventory, is to determine which items are owned by the store and which have been taken in on consignment, which are the two groups into which the clothing items are separated in the second level of analysis. The DA2 226 of FIG. 18 (sheet 12) is made up of three subcircuits "A," "B," and "C," of which the "A" circuit is essentially the same as the CCS1 126, but to which have now been added connections to the "B," and "C" circuits of FIG. 18. The "B" circuit connection is initiated by a "Group Detector" (GD) 228 that separates out the "x" term from an initial "xcccccc" input and sends that "x" information to a "Group Code Router" (GCR) 230 that constitutes the "B" circuit, while sending the "cccccc" code to a "Data Code Router" (DCR) 232 for the usual treatment (as in CCS1 126) by the "A" circuitry. The "B" circuit makes the "owned" or "consigned" determination, which is sent to the "C" circuit to be carried out in the actual distribution of the outputs of the "A" circuit as dictated by the "B" circuit.

The wide variety of data analyzer types that there could be presents a nomenclature problem, so a standard method has been adopted. In the CCS1 126 the role of "n," "l," and "m" have already been treated above, so what is left to do as to multi-level DAs 226, as seen above, is to indicate the number of levels by an ending integer, as in the one-level CCS1 126 and the two-level CCS2 or DA2 226. The code used in utilizing a particular DA must of course have a format that will accommodate the number of levels involved, i.e., an "x," "xy," "xyz" allocation of bits that will specify what number of levels there are. That last integer in the mnemonic will of course convey that information, but it will be those bits that establish the number of levels there will be in the apparatus itself.

The number of bits used does not in itself indicate how many levels there are, of course (three bits could mean any of 4-7), so beyond using that ending integer the DA2 226 circuit of FIG. 18 becomes a 2-bit 2-group 3/3 Data Analyzer. A three bit, seven group, two level data analyzer would use a "111" code, thus to yield an n-bit xyz-group l/m data analyzer, in which the particular data analyzer might be a 3-bit 7-group 6/6 data analyzer, where there were six different item types, and the acronym would be "3-7DA2." (The total number of items has nothing to do with the structure of the data analyzer, but the number of categories could lead to a "tuvwxyz" code or even larger.)

If there were to be more groups than two, an "xy" or "xyz," etc., code would be required, and the "B" circuit would be expanded accordingly so as to treat a larger number of groups. That expansion might be accomplished by replication of the CCS1 126 as previously described, e.g., if there happened to be seven groups, a 3 bit "xyz" code in lieu of that single "x" bit would be used, and the actual second level selection, in lieu of the process using the simple "0" and "1" XNOR1s in the GCR 230 of FIG. 18, could itself be another n-bit l/m code selector, that in the case of seven groups would be a 3-bit 7/7 data selector.

Having a two level data analyzer means, of course, that two selections must be carried out with respect to each datum. The leading "x," "xy," or "xyz," etc., code, termed the "Group Routing Code (GRC)," has to do with providing the "A" circuit with a sufficient number of groups into which the data items are to be placed, and then placing each item into the correct one of those groups. (Not being a physical component, the GRC does not have a reference number.) Establishing the number of different groups for which space must be allocated is a task that needs only to be done once, and will be accomplished in advance by the user in entering a GRC of some particular number of bits, e.g., one bit by entering an "x," up to three bits by entering an "xy" code, up to seven groups with an "xyz" code, and so on. Once that maximum limit on the number of groups has been established by the number of bits in that GRC, the next task of the GCR 230 (the "B" circuit") is to peruse each code line to determine what is the actual "x," "xy," etc. number that is contained within the code line then being perused, and then configure the "C" circuit so that when the processing of the "cccccc" code for that code line has been completed in the "A" circuit, the results thereof will be placed into the correct group.

If structuring a circuit by the IL method, and given the availability of "code modules" with which to structure any circuit that includes multiple instances of a sub-circuit (for which a code module has been prepared), from the preceding discussion a person of ordinary skill in the art will realize that in the present case such an n-bit l/m code selector can be structured simply from seven copies of the 2COE 202 of FIG. 14 (sheet 11), and could proceed accordingly. Given that an "xy" or "xyz," etc., GRC that was large enough to encompass the number of groups that will actually be used had been selected, it is not necessary at that point to specify exactly how many groups will be used, nor how many different categories will make up each of those groups, since each item in a group will need to be passed through the DA2 226 separately.

The "A" circuit, consisting as it does essentially of a CCS1 126, does not require another detailed description except to note a few additional elements and the use of different reference numbers for this different embodiment. As shown in FIG. 18 (sheet 12), the "A" circuit begins with "Data Code Router" (DCR) 232 into which is entered the "cccccc" part of the input code that is left after removal of the GRC bits. (In this broader context, that "cccccc" code could consist of fewer or (more likely) more bits.) Beyond that, those "cccccc" bits are passed on from DCR 232 to a set of six "Data Input Nodes" (DINs) 234 that connect on to the rightward terminals of respective ones of six AXNOR2s 236. Those inputs are to match the contents of a corresponding set of six "Data Reference Latches" (DRLs) 238, the contents to match those of the like-numbered DINs 234, and that connect to the leftward sides of that same set of like-numbered AXNOR2s 236. (The "2" in that designation means that the gate appears in a two level code selector (i.e., 2CS2 226, designated here as DA2 226), and the "A" means that some other XNORs having a different function will be found elsewhere in the DA2 226, in a sub-circuit other than the present sub-circuit "A," so the particular sub-circuit in which that particular XNOR (or any other element that has repeated appearances) appears needs to be specified. Since XNOR2s are also to be found in the "B" circuit, rather than using the "first" and "second" appellations these will be termed "AXNOR2s 236" and "BXNOR2s 246," according to the sub-circuit in which they appear, and similarly as to other components that appear in two or more different sub-circuits.)

As in the CCS1 126, with matching inputs to any DIN 234/DRL 238 pair those AXNOR2s 236 will cause "1" bits to be produced from the AAND2 240 gates to which the AXNOR2 236 is connected, from which again each "1" bit so produced by an AAND2 240 gate will enter a "Two-Level Enable Latch" (AEL2) 242 to release a voltage from a "Two-Level Voltage Source" (AVS2) 244 to the destination. Alternatively the "1" bit will pass directly to the destination through a circuit such as the DCO 206 of FIG. 16 (sheet 11), with the actual destination in either case having been defined by the "switch setting" of the "B" circuit as defined by that "x" value, with that destination then being reached through the resultant configuration of the "C" circuit.

Considering again that "B" circuit, upon having been separated out from the "cccccc" code by GD 228, the "x" bit being used in this case connects to the left sides of two BXNOR2 246 gates that connect on to respective "Group Enable Latches" (GELs) 248. The right sides of those BXNOR2 246 gates connect to two of the DRLs 238 in the "A" circuit, there being no point in fabricating or structuring two more reference latches when the DRLs 238 in the "A" circuit are already available. The bits on those two DRLs 238 will be such that a "0" bit will be on the rightward terminal of the leftward one of those two BXNOR2 246 gates, and a "1" bit will be on the rightward terminal of the rightward BXNOR2 246 gate. With the "x" bit being on the leftward terminals of both of those two BXNOR2 246 gates, if "x" had been a "0" bit the leftward BXNOR2 246 would yield a "1" bit output but the rightward BXNOR2 246 would not, while if "x" had been a "1" bit the rightward BXNOR2 246 would yield a "1" bit but the leftward BXNOR2 246 would not.

The BXNOR2 246 gates connect to the gate terminals of respective "Group Enable Latches" (GEL2s) 248 that are labeled "OWN" as to the leftward GEL2 248 and "CON" as to the rightward GEL2 248, meaning "Owned" and "Consigned," respectively, with reference to the two groups defined for this DA2 226 as was noted above. (Since only the "B" circuit contains a "Group Enable Latch" and not the "A" circuit, no "B" designation on the GEL 248 is required. The added "2" remains necessary, however, since even though the term "group" establishes in itself that the circuit must at least be more than a one-level circuit, the "2" is needed to distinguish that circuit from even higher level (e.g., 3, or 4, etc.) data analyzers.) A "B Voltage Source" (BVS2) 250 connects to the data (D) terminals of both GEL2s 248, whereupon a "1" bit from that leftward BXNOR2 246 gate (based on "x" having been a "0" bit) entering thereon will cause the leftward and upper "OWN" GEL2 248 to pass out therefrom the voltage from the attached BVS2 250 onto a "0" "Group Code Line" (GCL) 252, while a "1" bit from the rightward BXNOR2 246 gate (based on "x" having been a "1" bit) will cause the rightward and lower "CON" GEL2 248 to pass out the voltage from the attached BVS2 250 onto a "1" GCL 252.

The output lines 218 of both GEL2s pass on to the "C" circuit, specifically, by means that will be explained below, to cause the transfer of the output data from the "A" circuit to respective "Owned" or "Consigned" regions in a "General Memory" (GM) 254, according to which of the "0" or "1" GCLs 252 had received that voltage from a BVS2. That transfer of a voltage onto one or the other of the two GCLs 252 constitutes the completion of the "B" circuit tasks and indeed of that second selection process in this two level data analyzer, and it only remains for the "C" circuit to put that selection into effect. The "A" circuit will have divided the input data into all of the defined categories, so it only remains within each such category, each of which should now consist of a list of coded items that fit a particular clothing type (shoes, sox, etc.), to place each such item into the GM 254 region that had been established for the listing of the clothing type that the particular item represents. As noted earlier, the function of the "B" circuit was to convert the information contained in that "x" value into actual electrical connections that would bring about the routing sought, and as was just described that function will now have been carried out.

(It may be noted that the "B" circuit in particular is a good example of how a computer instruction could be converted into a circuit, or if IL code lines had been written that would structure that circuit, of an algorithmic problem having being translated into IL code. The computer instruction would have had the "IF/THEN ELSE" form, e.g., "If x=0 then place the "cccccc" code into the "owned" memory region, or if x=1 then place the "cccccc" code into the "consigned" memory region.)

Turning now to the final "C" circuit of the DA2 226, each of the "1" bit outputs from the three "01," "10," and "11" codes entered into the "A" circuit connects to a rightward terminal of each of a pair of CAND2 256 gates in the "C" circuit (as indicated by the "C" in the acronym). As to the leftward sides of each CAND2 256 gate, the "0" GCL 252 connects to the leftward (in FIG. 18) one of the two CAND2 256 gates in each pair, and the "1" GCL 252 connects to the rightward of the two CAND2 256 gates. In each of the 1-2, 3-4, and 5-6 CAND2 256 gate pairs as numbered in FIG. 18, the "0" GCL 252 connects to the leftward terminals of the three 1, 3, and 5 odd-numbered CAND2 256 gates, and the "1" GCL 252 connects to the leftward terminals of the three 2, 4, and 6 even-numbered CAND2 256 gates. Since the rightward sides of both CAND2 256 gates for each input will already have a "1" bit thereon from the "A" circuit (if in fact they had been selected), only those CAND2 256 gates that likewise have a "1" bit on the leftward sides thereof will yield a "1" bit, which will be those to which the GCL 252 had been provided with a "1" bit by the "B" circuit. Each "A" circuit output can then be sent either to the "Owned" region of GM 254 or the "Consigned" region thereof, as determined by which of the "0" or "1" bit GCLs 252 had been enabled by the "B" circuit. Each CAND2 256 gate in itself thus serves to satisfy both conditions for an entry of a "cccccc" code, which as stated earlier are (1) that there was a DIN 234 input that matched the content of the correspondingly numbered DRL 238; and (2) that a destination region in GM 254 for the particular "cccccc" code had been specified.

FIG. 18 shows that the three 2-bit DINs 234 are each connected to GM 254 by way of a pair of "Group Release Pass Transistors" (GRPTs) 258, one of which GRPTs 258 in the pair being connected to the "Owned" region of GM 254 and the other to the "Consigned" region of GM 254, and also that the output of each CAND2 gate 256 connects to the gate terminals of those GRPTs 258. For example, with respect to the central 2COE 202 circuit and 2 CAND2 256 gate, central 2 AEL2 242 latch provides a "1" bit to the rightward terminals of both the 3 and the 4 CAND2 256 gates, while as to the leftward terminals thereof, the 3 CAND2 256 gate has the leftward terminal thereof connected to the "0" GCL 252 so as, if that "0" GCL 218 carried a "1" bit based on an x=0 input to GCR 230, to enable the 3 GRPT 258 to permit transfer of that particular "cccccc" code to the "Owned" region of GM 254 to which the output of the 3 GRPT 258 connects. Similarly, if the 4 CAND2 256 gate at which the "1" GCL 252 encountered a "1" bit on that "1" GCL 252 based on an x=1 input to GCR 230, then the 4 GRPT 224 to which that 4 CAND2 256 connects would receive a "1" bit, thus to permit the transfer of that particular "cccccc" code to the "Consigned" region of GM 254. There will thus be two GRPTs 258 for each of the three outputs from the "A" circuit and each of the two ("0" and "1") GCLs 252. The "A" circuit determines which input pair(s), if any, will yield an output, and the "C" circuit, according to which GCL 252 onto which the "B" circuit had placed a "1" bit, will determine to which region of GM 254 the "cccccc" code will be sent. For each data input, GM 254 will receive but one datum segment (DS), which DS will be sent into a specified one of the "Owned" or "Consigned" regions within GM 254.

In the example the input data consist of an inventory of a clothing store, consisting of some long, random list of items and corresponding quantities, and the purpose of the DA2 226 is to transform that list into an ordered list, neatly segmented into types for which it is also shown whether each item is owned or consigned. The user will of course know what types of clothing are included in the list (but not how many of each), so in this minimal example GM 254 will have segmented in advance each of the Owned and Consigned regions into areas reserved for each clothing type as, e.g., "01"=shirts, "10"=shirts, and "11=shoes (any actual list of course being much longer), and within each region the "ccccccc" code for each item will be transferred to the area that is defined therein by that "cccccc" code. In this particular example of a clothing inventory, only one of the three "cc" codes will have an entry for each item, since no item could fit more than one category, but another data base could include items classified in further categories—e.g., as to sex and an age, or even for men, women, or children, thus to give rise to 3$^{rd}$ or 4$^{th}$ level data analyzers.

A "raw" (untreated by DA2 226) data base would be stored initially within the "raw" part of GM 254, from which those data can be withdrawn for analysis later, as shown by the large arrow extending up from that "raw" region in GM 254, that arrow containing the label "xcccccc" and the external notation "To GD 228." Alternatively, the data can be entered initially into GD 228 and analyzed at once, those data then being distributed in sorted form into the Owned and Consigned regions of GM 254 according to the identity of each item as to type of clothing and the status of each item as being owned or consigned.

One more circuit code selector remains to be shown and described, which is the 3-bit "Elective Circuit Code Selector" (3ECCS) 260 of FIG. 19 (sheet 13) that in the previous n-bit l/m terminology is a 3-bit 4/3 code selector, meaning that there are four possible entries, of which only three can be used at once. This circuit provides means by which the output of an IL circuit would also be included in the circuit and in the analysis, that as mentioned earlier was to be foregone until the circuitry that would allow inclusion of that necessary fourth CPT 104, namely a 3-bit circuit (and as it turns out, the "elective" feature), had been presented. The circuit so to be encoded is that shown in FIG. 20 (sheet 14), which merely adds to the FIG. 1 circuit a fourth CPT 104 extending from the DR 108 terminal of the LN 102, thus to act as that output and that as shown in FIG. 20 is given the next number in the sequence so as to become PT No. 13.

That added PT is treated as a CPT 104 rather than an SPT 106 on the supposition, like that applied earlier to the input 2 CPT 104, that an assembly of parts does not constitute a circuit until it acquires an output as well as an input. (As was mentioned earlier, the operations that are entirely internal to the PS 100 can all be carried out and be understood without any mention of the PS 100 "output" (meaning to extend out of the PS 100), since within PS 100 the output of every LN 102 simply goes to a next LN 102. The direction in which that 13 CPT 104 is seen to extend on the paper was solely for reasons of space in which the 13 CPT 104 could be drawn, given that the CPT 104 really has no direction on the paper (or in the plane of the other components), since its entire purpose is to remove from the PS 100 when desired those signals that appear on that LN 102 DR 108 terminal.

(It should also be mentioned that since the outputs of an algorithm occur so rarely (i.e., presumably only once for each full execution of the algorithm), there is no need to inflict the rigors (and cost in hardware and electricity) of the "elective" process carried out by the "Elective Code Selector" (ECS) 208 set out below to every code line (CL), but to provide instead an independent "algorithm output release" circuit, whereby the algorithm output process is treated more or less as a separate and distinct operation from the IL operation itself, with the 13 CPT 104 shown in FIG. 20 still providing the outputs of the individual LNs 102, but as to those LNs 102 that mark the output of the algorithm as a whole, to enable those particular 13 CPTs 104 only by selected ones of an array of the 2CLOs (or PTES) 204 of FIG. 15 (sheet 11). (Again, the role of the PTE 204 is to ensure by way of including therein that VS1 200 that sufficient voltage will be provided to enable the PT being acted upon.) The algorithm itself will provide the addresses of the final set of LNs 102 at which the algorithm output data will be found, and for which the PTEs 204 for those LNs 102 would be enabled, then to send the output data to corresponding addresses in CODE 120 to which the respective PTEs 204 are connected. In what follows, then, if only 2-bit circuits are shown and described with respect to a particular circuit in which the recovery of the algorithm output data is involved, it should be taken that such an array of PTEs 204 is also being provided.)

The "3" at the start of the acronym 3ECCS indicates as usual the number of bits in the input, in this case a 3-bit input, and the "4/3" means that while there are four possible inputs to the device, there can only be three outputs. The term "Circuit" in the name and hence the second "C" in the acronym are included in order to distinguish this circuit from that ECS 208 (FIG. 17, sheet 11), and helps to point out the reason for including that elective "either but not both" feature. This FIG. 19 circuit thus employs the "elective" circuitry of the ECS 208 of FIG. 17, whereby as to those four inputs to the 3ECCS 260, as to two particular ones thereof only one or the other of the two can be used, but not both at the same time. The reason for including that elective circuitry in the FIG. 19 circuit is the inclusion therein of both an input 2 CPT 104 and an output through the 4 3EXNOR, when it would be an idle exercise to bring in an external signal only to send that same signal right back out again from the same LN 102. The elective feature prevents any such selection from being made inadvertently, and is thus applied to those 2 and 4 CPTs 104. The actual number of Three-Bit Elective Circuit Code Input Nodes" 3ECCINs 262 in the present case is 9, given that each code input requires three nodes, except that through the ninth elective code entry node there are two different entries ("0" and "1") that could be made, the lines for which are designated in FIG. 19 as "9" and "9'," with the latter line extending to a tenth (or "9'") "Three-Bit Elective Circuit Code XNOR" gate 3EXNOR 264, and there also being provided a tenth (or "9") "Three Bit Elective Circuit Code Reference Latch" (3ECCRL) 266, along with the 1-9 3ECCRLs 266 that connect to the leftward terminals of the like-numbered 3EXNORs 264 in the usual manner.

Before setting out this 3ECCS 260 in detail, it seems best here to point out and resolve a dilemma in establishing the code for that circuit. As can be seen in the ECS 208 circuit of FIG. 17, perhaps the easiest way to construct such an elective input is to (1) have the two XNORs between which choice is to be made located side by side as the last two XNORS on the right; and (2) have the two codes therefor such that the first bit for the two codes is the same in each, and then differing in that the second bit of those codes will be a "0" bit for one input line and a "1" bit for the other input line of the two. However, the election to be made in this case is between the 2 CPT 104 and the 4 CPT 104, and the normal binary codes for the "2" and "4" do not match the (1) and (2) criteria just stated: only one of the two codes would be at the right end of the 3ECCIN 262 sequence, and the respective 2=010 and 4=100 codes do not differ only in the last bit thereof. However, the codes being used here are employed only as between the 3ECCINs 262, 3EXNOR 264 gates, and the 3ECCRLs 266, and are not seen at any other part of the 3ECCS 260, nor indeed at any other part of the entire ILM 114. Consequently, nothing prevents defining the codes in this present limited context however one may wish.

The alterations in the codes and connections required to cause the election to take place between the 2 and 4 CPTs 104 is then (1) to interchange the codes that will be used between the 3 and 4 CPTs 104, so as to have the 4 CPT code differ from that for the 2 CPT 104 only in having a "1" bit as the third bit instead of a "0" bit as in the "010" code for the 2 CPT 104; (2) interconnect the first two lines of the 2 and 4 CPTs 104 rather the 3 and 4 CPTs 104; and (3) interchange the codes for the 3 and 4 ECCRLs as well, to match those that would be entered into the 3ECCINs 262. The resultant 3ECCS 260 circuit is shown in FIG. 19 (sheet 13), and the connections made and codes used are as shown in the following Table XI:

TABLE XI

Codes and Connections for 3-Bit 2-4 Elective 4/3 Code Selector

| | | | | | | | | | | |
|---|---|---|---|---|---|---|---|---|---|---|
| 3ECCIN NUMBER | 1 | 2 | 3 | 4 | 5 | 6 | 7 | 8 | 9 | 9' |
| 3ECCIN CODE | 0 | 0 | 1 | 0 | 1 | 0 | 1 | 0 | 0 | 1 |
| 3XNOR NUMBER | 1 | 2 | 3 | 4 | 5 | 9 | 7 | 8 | 6 | 9' |
| 3EAND NUMBER | 1 | 2 | 3 | 4, 9' | 5, 9' | 9 | 7 | 8 | 6 | 9' |
| OUTPUT CODE | 0 | 0 | 1 | 0 | 1 | 0 | 1 | 0 | 0 | 1 |

The codes for the first three 3ECCINs 262 are the 0, 0, 1 bits that in a 3-bit code define the number "1" in normal fashion and enter the rightward terminals of the 1, 2, and 3 3XNOR 264 gates, respectively, from which a "1" bit then enters the 1 3ECCAND 268 gate. The same normal coding is present in the next two (4 and 5) 3ECCIN 262 codes, with those 0 and 1 code entries entering the rightward terminals of the 4 and 5 3EXNORs 264. The output of the 6 3ECCIN 262, however, enters the rightward input of the 9 3EXNOR 264, which constitutes the first part of the interchange, so that at this point, the entry of a "010" code at the position 4, 5, and 6 3CCINs 262 would not produce a "1" bit from the 2 3ECCAND 268 gate so as to enable the 2 CPT 104. Those CPTs 104 are of course enabled in the usual way, i.e., the "1" bit from the particular ECCAND 268 passes into a "Three-Bit Elective Circuit Code Enable Latch" (3ECCEL) 270 which allows the passage therethrough of a voltage from a "Three-Bit Elective Circuit Code Voltage Source" (3ECCVS) 272 onto the CPT 104 in question.

Similarly, the next two (7 and 8) 3CCINs 262 "1" and "0" codes are entered normally, but in order to bring about a "1" bit from the 3ECCAND 268 so as to enable the 3 CPT 104, the third input to that 3 ECCAND 268 must come from the "1" bit that derives from the 9 EXNOR 264 having received that "0" bit from the 6 3CCIN 262. Moreover, as the third part of the interchange, the first two ("0" and "1") bits from that "01" code entry into the 4 and 5 3CCINs 262 and thence 4 and 5 3XNORs 264 must be connected over to the 9' 3XNOR 264 in order for the 2 and 4 3ECCAND 268 gates to have the same codes on the first two inputs thereto, in order for the “0” or “1” entry from the 9 and 9' 3CCIN 262 into the third input into one or the other of the 2 or 4 2ECCAND 268 gates to control which of the 2 or 4 3ECCANDS 268 and hence the 2 or 4 CPTs 104 is to be enabled, which of course is the object of this FIG. 19 3ECCS 260 circuit.

From what was just said it can be seen that the 010 code for the 2 CPT 104 must have been entered in order for the 3 CPT 104 to be enabled, since the 9 3EXNOR that participates in bringing about a “1” bit from the 3 ECCAND 268 that would enable that 3 CPT 104 derives the third input thereto from the 6 3CCIN 262, with that 6 3CCIN 262 being part of the “4, 5, 6” trio that provides the first two “1” bits into the 2 3ECCAND 268. Moreover, that 010 code that enables the 2 CPT 104 must also have been entered in order to enable either the 2 or 4 3ECCAND 268, since those first two “01” bits provide the first two bits of the codes for the 4 3ECCAND 268 as well as the 2 3ECCAND 268. Except for that 1 3EAND, the circuit for which stands alone, that 010 code that is putatively for the 2 3ECCAND 268 might just as well be left “on” permanently, such as by direct connection to the 010 sequence of 3ECCRLs 266.

Entering that “010” code for purposes of enabling the 2 CPT 104 does not in itself do so, of course, since that 2 3ECCAND 268 would still require a “0” bit from the 9 3ECCIN 262, so leaving that code present would not interfere with the desired use of the 2 3ECCAND 268, except that the bit that actually activated the 2 3ECCAND 268 would come from the 9, 9' 3ECCIN 262. Similarly, two of the bits that activate the 4 3ECCAND 268 actually come from that “010” input leading in to the 2 3ECCAND 268. If a “1' bit had in fact been entered in at the 9, 9' 3CCIN 262, that would prevent the 2 3ECCAND 268 from being activated, since that 9, 9' 3ECCIN 262 can enter just one of the “0” or “1” bits, and thus cannot both send a “1” bit to the 4 3ECCAND 268 and a “0” bit to the 2 3ECCAND 268. Similarly, and for the same reason, the entry of a “0” bit at the 9, 9' 3ECCIN 262 to go to the 6 3EXNOR 264, thence to yield a “1” bit at the 2 3ECCAND 268 that would enable the 2 CPT 104, precludes the entry of a “1” bit at the 9' 3ECCIN 262 so as ultimately to enable the 4 CPT 104. Those two conditions, of course, constitute the whole reason for the 3ECCS 260.

There are, of course, other ways in which that 3ECCS 260 circuit could have been constructed and still achieve the same purpose. For example, since before the cross-connecting and recoding is carried out, the subcircuits that contain the respective 1, 2, 3, and 4 3ECCANDs 268 are all independent circuits, i.e., two 3-bit versions of the 2COEs 202 of FIG. 14 and one of a 3-bit version of the ECS 208 of FIG. 17, they can be changed around in order, for example, so that the 2 and 3 2COEs 202 (or rather 3-bit versions thereof) as now shown in the 3 3ECCS 260 would be interchanged, thus to have the 2 3-bit version of a 2COE 202 immediately preceding the 4 3-bit version of the ECS 208, these having the “010, and “011' codes, respectively, whereby the more simple version of the elective code circuit of FIG. 17 could be used. Such a procedure would alter the 1, 2, 3, 4 order of code entries that a user would expect, but if desired it would be simple enough to construct above the 3CCINs 262 in FIG. 19 a cross-connection network that would interchange the positions of the 2 and 3 code entries back to the normal 1, 2, 3, 4 sequence for the convenience of the user. This or any other such variation in the detailed structures of these elective code selectors would of course be deemed also to fall within the scope of the claims appended hereto. It should also be noted that the task of preventing both the input and output terminals of a transistor from being in operation simultaneously is not, of course, the only context in which the circuit of FIG. 17 could be used. There could not only be other normal electronic uses, but even in electronically controlled sawmills, iron works, or other industrial facilities in which one might ever see a sign posted that said anything like “Do Not Turn On Both Valves at the Same Time,” and all such uses are deemed to fall within the spirit and scope of the claims appended hereto.

By obvious extrapolation from the different circuit code selectors shown here, it is clear that all such variations that were feasible would present quite a large range of code selectors. That is why it was suggested earlier that preferably these code selectors would not all be fabricated in hard wired form, since just one basic code selector that had been hardwired into an apparatus could be used to encode more complex types of code selector as the need arose. In any case, the object in showing this many code selectors was not so much to exhibit that variety, but rather to suggest a much greater variety, and much wider range, of different kinds of Instant Logic™ circuits that could be structured by all those different code selectors. In having said earlier that an ILA contains incipient versions of every binary circuit that could be made, it is evident that none of the code selectors shown herein would suffice to input the codes needed for all such circuits, but it would be easy enough, based on the principles shown herein, to use a basic, hard-wired circuit code selector, employing the usual IL procedures, to structure another circuit code selector that indeed would carry out the code input required for any circuit, particularly by appropriate assembly of multiple numbers of the 2COE 202 and ECS 208.

As to the Class 2 circuitry that serves to carry out the circuit structuring that underlies all Instant Logic™ operations, the 3ECCS 260 just described completes the basic circuitry needed to provide those circuit codes, either directly or through the fact that the circuitry described can then be used to structure other like circuits that would be specialized so that in particular, complex cases they indeed could structure the circuits that the basic circuitry could not. What then remains to be described that would render the PS 100 fully functional is just the “Signal Code Selector” (SCS) 128 in FIG. 21 (sheet 15). Unlike the circuit code selectors just discussed, there is only one type of signal code selector, i.e., SCS 128, that in itself suffices to distribute the signal codes as needed for any kind of IL circuit, as long as the geometry of these devices is no more than 3-D and no more SPTs 106 to be enabled are added on to an LN 102, i.e., the circuit of FIG. 1, or if used that of FIG. 20 (sheet 14) that includes an output CPT 104.

In either a 2- or a 3-D geometry, each SPT 106 will require six bits for identification, but instead of setting any fixed allocation of bit spaces in the ILM 114 for the “ssssss” signal parts of the CLs, after the $LI_i$ and the six bits for the circuit code there is simply left available enough space (e.g., 18 bits) for up to three of the 6-bit codes, with each such 6-bit to encode a single SPT 106. In expanding to three dimensions instead of just two, there would then be nine more SPTs 106 extending from an LN 102, and the total SPT 106 count would become 27. Any additional SPTs 106 that might be added to an LN 102 would require at least one more 6-bit code, or circumstances require an expansion of the individual code to three bits instead of two, so any such expansion might require as many as 36 bits within just the two dimensions. (In this disclosure only the 18-bit limit will be discussed.) The number of SPTs 106 on an LN 102 that would be enabled varies, hence the lengths of the various CLs themselves will also vary, in increments of six bits, even though the space allocated for those codes in ILM 114 will remain at 18 bits. (That is, the signal code actually employed could have lengths of 6, 12, or 18 bits.)

In discussing the signal code selectors, the code used will now obviously have to include that signal code, hence the "full code" "iiiiicccccccssssss" will be used, where the "iiiii"represents the $IN_j$ codes. Those $IN_j$ bit lengths will be fixed at whatever number of bits was required to express the number of LNs 102 in the particular instance of the PS 100. As to first level code selectors only, where no "x" or "xy," etc. term would be needed, and in 2-D, the full code would then comprise those five bits (as adopted herein) for the $IN_j$ codes, the bit length for the circuit code that will be fixed at eight bits, and then the signal code that will require those 18 bits, thus to require 5+8+18=31 bits to identify each SPT 106 to be enabled.

To reiterate now this whole encoding system, rather than through addresses the SPTs 106 are located by reference to the terminals of the LNs 102 ("originating" and "receiving") to which those SPTs 106 are connected. To define the location of an SPT 106 on a particular LN 102 requires three 2-bit codes, which are (1) to identify the terminal of the "Originating Transistor" (OT) to which the proximal end of the SPT 106 is connected; (2) a "Direction Code" (DC) indicating the direction in which that SPT 106 extends, thus to identify the "Receiving Transistor" (RT); and (3) the terminal on the RT to which the distal end of that SPT 106 is to connect. Those terminals, as to both the OT and RT, are designated by the codes "01" =DR 108 terminal; "10" =GA 110 terminal; and "11" =SO 112 terminal. The "ssssss" code is formed from those three 2-bit codes, that can also be represented by the code [OT][DC][RT], using the meanings therefor as just given. As can be seen from the $IN_j$ and bracket in FIG. 21, the circuit as shown applies both to just one single LN 102, identified by the $IN_j$ number thereof, and to just one SPT 106 as seen by the single "ssssss" code shown at the top of the figure. Three SCSs 128 are then required for each LN 102, but not all need to be used, as opposed to the circuit code selectors CCS 126 or 3ECCS 260 of which only one is required for each LN 102, for which up to three 2-bit codes can be entered but again not all need to be used.

That "ssssss" code is seen in FIG. 21 to enter the SCS 128 by way of a "Signal Code Input Node" (SCIN) 274 at the $IN_j$ address of the "Originating Transistor" as shown by the "[OT]" label thereon, where the terminal thereof from which the SPT 106 will be connected is selected. Since also acting as a Demultiplexer (DMUX), SCIN 274 is also designated as DMUX1 274. SCIN (or DMUX1) 274 connects to three DMUX2s 276, of which just one as selected by which of the "01," "10," or "11" codes in DMUX1 was used. Those terminal codes are shown to the right of (or within) the lines extending down from the DMUX1 274 to the "[DC]" (for "Direction Code") DMUX2s 276, where the respective "DR" = Drain, "GA" =Gate, and "source"=SO labels are shown just above each DMUX2 276. The signal path, in other words, will enter the path from the selected one of the DR 108, GA 110, or SO 112 terminals of the OT, respectively, depending on whether the code was "01," "10," or "11." Neither the direction in which that SPT 106 extends nor the terminal of the LN 102 to which the distal end of the SPT 106 will connect would yet have been specified, which means, of course, that the identity of the SPT 106 is not yet specified.

In the 2-D geometry now being discussed, the selected SPT 106 will then be one of those that connects at the proximal end thereof to the OT terminal selected by DMUX1. For each LN 102 terminal there will be three such SPTs 106 in a 1-D format (one to each of the three terminals of the RT), six in a 2-D format, or nine in a 3-D format. In the present 2-D PS 100 the two directions will be rightward and upward, so to make that distinction each DMUX2 connects to two DMUX3s 278, respectively labeled just to the right of each DMUX3 278 box with the letter "R" for rightward on a "01" code or "U" for upward on a "10" code from DMUX2 276. Those codes "01"=rightward and "10"=upward are indicated just to the right of each line coming down from the respective DMUX2s 276.

Indication of the direction will of course also identify the "Receiving Transistor" "[RT]" as to location, and that is all that needs to be known as to identifying the RT, since again the SPTs 106 are located relative to some known location, and not on the basis of addresses. (In structuring the next cycle what was here an RT will in that next cycle become the OT, for which the "iiiii" address will have to be known, and that knowledge comes from the formulae discussed earlier by which the "iiiii" addresses for all of the LNs 102 in a circuit were to be determined.) What is then still required is to identify the terminal on that RT to which the distal end of the SPT 106 is to connect, and that is accomplished by the six DMUX3s 278, for the three RT terminals on the LNs 102 in those two directions. As to each direction, for each of the three SPTs 106 there is a line extending down from the DMUX3 278 that in FIG. 21 is labeled as "d"=drain, "g"=gate, and "s"=source. Upon identifying that RT terminal the particular SPT 106 will have been fully identified.

Specifically, those three lines extending downward from each of those six DMUX3s 278 connect respectively to the "Gate" (G) terminals of an array of 18 "Signal Code Release Latches" (SCRLs) 280 that are labeled with the respective letters "d," "g," and "s" as to each DMUX3 278, to indicate the DR 108, GA 110 or SO 112 RT terminal to which the SPT 106 is to connect. The connection itself is made by the DMUX3 278 having placed the remaining $s_5s_6$ code onto the Gate (G) terminal of that one of the three SCRLs 280 that had been selected, that in turn, being a voltage, will release a voltage from a "Signal Code Voltage Source" (SCVS) 282 onto the selected SPT 106 to which the output terminal (O) of each SCRL 280 connects. These SCVSs 282 connect (or a single SCVS 282 connects) to the "Data" (D) terminals of the SCRLs 280, whereby a "1" from a DMUX3 278 on the G terminal of an SCRL 280 will cause a voltage from the SCVS 282 connected to that SCRL 280 to pass through that SCRL 280 and on out through the output (O) terminal thereof to the gate terminal of the selected SPT 106. That one SPT 106 would then have been enabled, and to complete the treatment of that LN 102, it is only necessary to carry out the operation just described on any other SCINs (DMUX1s) 274 by which some other SPT 106 is to be enabled. It should be noted that the general form of SCS 128 is highly flexible, in that the number of selection levels, and the number of DMUXs to be used at each level, can be varied widely.

By such changes to SCS 128, in fact, the circuit that will identify the $IN_j$s will be provided as well, whether within PS 100 or CODE 120, bit by bit. The cycle-by-cycle repetition of those processes on each LN 102 involved, that LN 102 in each case having indeed been identified as just stated, along with enabling the associated CPTs 104 as previously discussed, will have brought about the full structuring of a complete IL circuit.

Turning now to the actual circuit structuring using both the circuit and signal codes, what follows will be a series of circuits that can be structured using these IL procedures. These circuits will be shown first in an iconic version, then in a transistor-level version, and then in the IL structured version. The reason that this well known prior art is shown, particularly as to the transistor level circuits, is to allow easy confirmation of the fact that the IL procedures do indeed yield circuits that, transistor-by-transistor, are exactly the same circuit as the hard-wired versions thereof, except that the wires of the hardwired version are replaced by enabled pass transistors. The first of these circuits will be 1-D, that will require one less SPT 106 group.

To start at the most simple level, that would be the wire of FIG. 22 (sheet 16), as prior art for the IL-structured wire (Circuit 1) in FIG. 23 (sheet 16), which indeed is nothing more than a simple wire. (The IL-structured circuits shown hereinafter will be numbered sequentially, using numbers that start with "1' for the circuit of FIG. 23 and increasing thereafter to a number that is less than the number "100" that is used for the Processing Space PS 100.) While no doubt being the most simple and seemingly the most trivial of any IL circuit, and one that indeed could only be called a "circuit" because of how that "wire" comes into being through IL structuring, that Circuit 1 is in fact the most important and indeed the central circuit in Instant Logic™. That is not only because of the course of events by which the circuit of FIG. 23 came into being, i.e., from Applicant having sought to reverse the basic mode by which computers operated (instead of taking the data to the circuitry, take the circuitry to the data), and thus to eliminate the Babbage/von Neumann bottleneck, but also because that wire is the one circuit that makes all other IL circuits possible.

Indeed, one could describe any IL circuit as consisting solely of numbers of Circuits 1 (wherein some of the PTs would be CPTs 104 and others would be SPTs 106) and LNs 102, which assertion would be quite true since all IL circuit structuring consists entirely of making Circuit 1 connections either from one LN 102 to another, or to $V_{dd}$, GND, or input or output terminals. Reversing the Babbage procedure and hence eliminating the "von Neumann bottleneck" (vNb) required only one "key" element—Circuit 1 of FIG. 23, expanded by an array of operational transistors (the LNs 102). Solely by such means one accomplishes what had been sought, namely, to form the required circuitry at those locations in an operating space (PS 100) at which the data to be operated on would be located, rather than by the only other way, which had been (and still is) to transport the data to the locations of the required circuits (e.g., in an ALU). In the simplest manner of description, an IL-structured circuit is drawn by taking up a drawing of a hard-wired version of the circuit to be structured and then replacing every wire connection therein with an instance of Circuit 1. (An instance will be shown later, however, in which the usual drawing of a particular type of latch is not of a form that is most conducive to Instant Logic™ structuring, and hence is drawn a second time in a different way.)

This point is brought out to suggest that what was required to make all of IL possible, which was to add the "wire" circuit of FIG. 23 (sheet 16) to an array of LNs 102, CPTs 104, and SPTs 106, as referenced in FIG. 23 by the "(CPT 104 or SPT 106)" notation therein, which wire circuit and transistor combination was not to be found in any prior art that Applicant has discovered, no doubt accounts for the similar absence of Instant Logic™ in the prior art. The reason for adding that notation to FIG. 23 is to clarify that Applicant obviously does not claim the PT as such as an invention, but as implied by the "CPT" meaning "Circuit PT" and "SPT" that means "Signal PT," only that combination of PTs and LNs 102 that will form a binary circuit that had not already been at the location, together with the manner of using PTs in IL, the basic IL circuit by which that usage is carried out (see FIGS. 1 (sheet 1) and 20 (sheet 14)), and the circuits formed thereby, that reference to CPTs 104 and SPTs 106 in FIG. 23 clearly referring only to IL. (Prior uses of PTs in a number of patents for purposes other than those already noted herein will be set out in an Information Disclosure Statement (IDS) yet to be filed, but it may be said here that the prior use of PTs was mostly to "short out" other elements so as to take those elements out of some more complex hard-wired circuit, but no instance could be found in which the PT was ever used to structure a circuit that had not already existed.)

The next few circuits to be described will employ a code description used only for the simple circuits, in which the addresses of each LN 102 will be indicated simply by a letter designation (A, B, C, etc.) to take the place of an "iiiii" $IN_j$, and also a listing of the PTs 104, 106 in accordance with the number designations shown in FIGS. 1, 21. That is, the numbers 1, 2, 3, and 4 designate the DR 108, GA 110, SO 112, and output 13 CPTs 104, respectively, of every LN 102, and the subsequent numbers from 4 on up to 12 indicate the SPTs 106 that extend from each of those three OT terminals to all three of the like terminals of the RT, in that same order. The PTs 104, 106 that are actually in use will have a "1" bit shown therein and the interconnecting lines in use will be shown in a darker print. As to each circuit, where applicable there will also be shown a prior art iconic version thereof, a prior art transistor level version, and finally the IL version. Where a compounded iconic representation such as that for the XOR gate is available that includes subcircuits, after that compounded icon is shown an iconic version that shows the icons for the individual subcircuits will also be shown. (No prior art will be shown for the BYPASS gate since, unless one wished to apply that term to the wire of FIG. 23, there seems not to be any.)

Although the consequences of the foregoing discussions as are now to be set out might well be evident already, nevertheless it seems appropriate here to explain some more as to the consequences from that IL manner of using PTs. Thus, if a connection was needed in a hard-wired environment that would extend from one part of a circuit (e.g., at "transistor A") to another part (at "transistor B"), a mask would have been made that simply included a "wire," regardless of how those "A" and "B" transistors happened to be located relative to one another. Knowing that such a connection would be needed, where possible the circuit layout would have been designed initially so that those "A" and "B" points would already have been located as near to each other as was feasible (within the design rules), unless there were valid reasons for keeping those "A" and "B" elements apart such as for special thermal or interference reasons. Except for ensuring that the design rules were followed, the issue of where a transistor was to be located relative to another, other than "nearby," would not ordinarily arise. (That is, if a transistor could be located either to the right or left of a given transistor, which direction was chosen would not ordinarily matter (except perhaps in terms of aesthetics, or habit). If constraints were present that caused two transistors that had to be interconnected to be somewhat separated, if possible a wire of sufficient length to make that connection would be fabricated at the outset, simply by designing in that longer wire. To a person working in the "hard-wired" community, the things that IL can do in extending an existing line would never come to mind, since the pre existing lines of hard-wired circuits cannot be extended—the discussion about whether to extend a line in some circuit would no doubt come up at the design stage, but never after the circuit was already fabricated.

Although perhaps not evident at the onset of some IL circuit structuring, it can happen that no matter how the structuring of some particular circuit was sought to be carried out, a "gap" of one or more LN 102 spaces would appear between two of the LNs 102 of the desired circuit, with that gap needing somehow to be closed. In other words, the LN 102 might extend in the desired direction, but not far enough, and hence must be extended further. In the hard-wired environment, nothing could be done about that situation except "go back to the drawing board." In IL, however, any one or more LNs 102 that were located between two LNs 102 (e.g., the "A" and "B" points noted earlier) that needed to be interconnected would simply be made into BYPASS gates. As will be explained shortly, the term "bypass" simply means that the particular LN 102 itself was not going to be used for any actual circuit purpose, but only to make the connection between the "A" and "B" LNs 102. (As it happens, the XOR gate to be shown later requires a BYPASS gate within itself.) In using a BYPASS gate, the only effect would be that the connection desired would be made by using the DR 108 terminal of an SPT 106 (or any terminal, actually) of an LN 102 that was disposed between the two LNs 102 that needed to be connected, e.g., with the DR 108 terminal of the "A" LN 102 and the 5 SPT 106 thereof connecting to the DR 108 terminal of the intervening BYPASS transistor, and then with the 5 SPT 106 of the BYPASS LN 102 to be connected to the DR 108 terminal of the "B" LN 102, and thus to reach the desired point (although adding some time delay and resistance).

If point "A" and point "B" were separated by more than one LN 102, then that same number of BYPASS gates would need to be used, except that if there were too many LN 102 separations, the intervening wire and the SPT 106 of each BYPASS gate adding an ohmic loss, it would be advisable to use pairs of inverters instead in order to maintain the signal level. The BYPASS gate is thus used simply as a "stepping stone" from one LN 102 to another. (It was mentioned earlier that IL may end up structuring circuits that do not even exist within the art of hard wired circuits, and evidently the BYPASS gate turns out to be one of those. The BYPASS gate (Circuit 2) qualifies as being a "circuit" on the basis of the definition thereof given earlier, but like the inverter does not, strictly speaking, qualify as being a gate.)

Speaking now of circuit structuring in general, circuits drawn on a blackboard become fixed and invariant when fabricated in hard-wired form, but if structured in IL, such circuits can be changed almost as easily as the circuit designer makes changes on the blackboard. (Some changes can be made if using a Field Programmable Gate Array (FPGA), but neither on the scale possible with Instant Logic™ circuitry nor as the operation is proceeding.) As a result, an ILA would then be an excellent design tool or "test bed" besides being a functioning IP device in itself. When the circuit design has been settled on, the matter of then taking that design off somewhere to be fabricated does not arise, since when that circuit design is encoded into the ILA, the apparatus sought will already be at hand and would only need to be put to use.

In IL there is also the hard wired, unalterable circuit shown in the template of FIG. 2 (sheet 2), which circuit is specifically designed to allow the structuring therewithin of any of the incipient circuits that can be said to exist therein, by way of the transistor elements within the FIG. 2 circuit and the acuity of the user in perceiving those circuits, who needs only to encode what that user sees in his or her mind's eye. To structure any such circuit, the user need only determine, as to each new LN 102 to be included, whether there is sufficient space available for that transistor (and those that must necessarily follow) to be a part of the circuit sought, which question must also be asked in designing a hard wired circuit. The difference between that hard-wiring process and IL is that in IL "available" simply means whether or not the transistor then being considered for use is otherwise occupied at the moment in question, but might be free for use in a later or earlier cycle, but in hard-wired circuitry a space once occupied will remain occupied through all cycles.

The recourse in a hard wired circuit is to move the desired circuitry somewhere else, which can also be done in IL, but to avoid such "collisions" in IL a user can sometimes just change the starting time of the circuit, where by "collision" is meant that an LN 102 sought to be used is found to be already in use by some other algorithm. If it appeared that the LN 102 sought to be used would encounter a collision, the circuit to be structured can still be structured in that same way, with that LN 102 being located in the same place, but appearing a cycle or two earlier or later. Then when that LN 102 became structured as a part of the desired circuit, the LN 102 that would otherwise collide therewith might not yet have been structured, or may not be so structured until after the LN 102 that had been sought to be used had long since been so used for that other purpose and then been de-structured. (The LNs 102 themselves are of course always present, since being a part of the fixed, unalterable circuit" of the ILA itself as noted above, so the collisions referred to above would derive from attempting to structure the LN 102 in question as a functioning element of one circuit when that LN 102 was already to be structured to serve some other purpose.

The BYPASS circuit is shown in FIG. 24 (sheet 16), again without any prior art being shown since there seems not to be any. The "A" notation in FIG. 24 identifies the LN 102 that is to be structured into the circuit (without much meaning in this case since the circuit has but one LN 102), wherein the code that will actually structure that BYPASS gate, using the coding method just described, is simply "A04" as shown beneath the circuit in FIG. 24, meaning that that LN 102 itself is not empowered, but only the 4 SPT 106 of the A LN 102, and an input to the DR 108 terminal of the A LN 102 that is serving as the BYPASS gate is simply sent on from that DR 108 terminal of that A LN 102 as the OT to the DR 108 terminal of the LN 102 to the right of that first LN 102, which latter LN 102 then becomes the RT. The SPT 106 so doing will be the 4 SPT 106 as seen in FIGS. 1, 21.

The LN 102 is not a pass transistor and hence is not "enabled," but is "empowered" when connection is made to $V_{dd}$ and some other point that would provide a path to GND so as to permit the LN 102 to function as such. That path to GND will typically be from the SO 112 terminal of the LN 102 through the 3 CPT 104 to GND, but in an OR circuit, for example, that path can be through the 6 SPT 106 from the SO 112 terminal of one LN 102 that also connects to GND to the SO 112 terminal of another LN 102, or in an AND gate through the 10 SPT 106 on the SO 112 terminal of a first LN 102 to the DR 108 terminal of another LN 102, and then through the 3 CPT 104 of the latter LN 102 to GND.

The signal path provided here by that enabled 4 SPT 106 that connects from the DR 108 terminal of the BYPASS LN 102 is shown by the darker print of the LN 102, by the 4 SPT 106 and interconnecting lines, and also by the "1" bit shown within that enabled 4 SPT 106. In FIG. 24, the "A" LN 102 and A(4) SPT 106 alone make up the BYPASS gate, with the LN 102 shown to the right in lighter print (arbitrarily shown also as a BYPASS gate) is shown simply to serve as an RT for the "A" BYPASS gate output. It is assumed that such rightward LN 102 is in fact the LN 102 that needed to be reached in order to complete whatever the desired circuit was to be. (That exact same "space-filling" situation is shown in the XOR circuit of FIG. 50 (sheet 24), except that the output of the BYPASS gate goes into one LN 102 of a 2-bit AND gate.)

It is obviously not the mere reception of a signal on a DR 108 terminal of an LN 102 that establishes an LN 102 as being a BYPASS gate, since that will be true of most LNs 102, but also by the fact that the LN 102 in question is not even empowered, and hence can serve no other purpose than that of a BYPASS gate, which the gate of FIG. 24 indeed does since it sends that signal on to the DR 108 terminal of another LN 102. The other parts of the basic LN 102 circuit as shown completely in LN A of FIG. 24 that are not used in this BYPASS gate (e.g., the A LN 102 itself) are shown in lighter print in FIG. 24 since that A LN 102 is not empowered so as to bring those other parts into play. Again, LNs 102 are not turned on as such, but only by way; of enabling certain ones of the CPTs 104 that connect to that LN 102, i.e., at least PTs 1 and 3, either directly or effectively so through another one or more LNs 102 in series. If either the 1 or the 3 CPT 104 for a particular LN 102 is not enabled, then to power up that LN 102 the $V_{dd}$ or GND connection that would not have been provided directly would have to be provided indirectly through another LN 102, as in the AND gate mentioned above, and that will be more fully described below. (Also in the interest of avoiding clutter in the more complex drawings to follow, the "102" labels for the LNs 102 and "104" or "106" for the PTs 104, 106 will not be used again, since the use of those numbers wherein the "102" means an LN and "104" or "106" means a PT 104, 106 should have been sufficiently established now as not to require further repetition.)

In the most simple terms, a BYPASS gate is thus no more than the turning on of an SPT 106 that is disposed between two particular terminals on two separate LNs 102, that LN 102 for which an SPT 106 is turned on not otherwise being used, thereby to connect those terminals together and become an electronic, gate-based, IL equivalent of a wire connection that moves the location of the signal from one LN 102 to another. Since the LN 102 would not be empowered, no transistor action will be seen therefrom. It is important to recall, however, that any transistor, even when enabled, will have a higher resistance than would a simple wire, and that statement includes the A(4) SPT 106 in FIG. 24. (The operating rate of any circuit rests in part on the RC time constant thereof, and any increase in the resistance will adversely affect that operating speed, so BYPASS gates should only be used when absolutely necessary—i.e., when the BYPASS gate is used to structure a circuit that could not otherwise be structured, but at the cost of an increased delay and a loss of signal strength.)

Since no transistor action will take place in the BYPASS LN 102, nothing will interfere with the mere provision of a signal path, so although the connection in FIG. 24 was seen to be made between two DR 108 terminals, nothing prevents the connection from the BYPASS LN 102 as the OT to extend from any terminal thereon to any terminal on the RT. The only thing that must be ensured is that the output from the BYPASS LN 102 must be taken from the same terminal of that BYPASS LN 102 as that on which the signal had been received. Otherwise, the BYPASS LN 102 itself would have to participate in the signal transmission in some way, which of course that LN 102 could not do since it is not empowered. (In effect, what is "BYPASSed" in the BYPASS gate is that BYPASS LN 102 itself.)

Again, just as an inverter ("NOT" gate) is not a "gate" in the strictest sense of the term, neither is the BYPASS gate actually a "gate"—it does not have two inputs, will not be "open" or "closed" in response to a received signal bit (as opposed to the control bit that enables a PT), nor does it make any kind of logic "decision," but the term is applied herein to the BYPASS gate even so, simply for purposes of consistency with the manner of describing the other gates herein. LN A of FIG. 24 is not itself "powered up," since (using the FIG. 1 terminology) neither the 1 CPT 104 to $V_{dd}$ nor the 3 CPT 104 to GND is enabled by a "1" bit placed thereon, and only the A (4) SPT 106 on the DR 108 terminal of LN A is actually "used," because of the "1" enabling bit applied thereto and then the signal bit ("0" or "1"). Even so, the use of an LN 102 terminal in a BYPASS gate in such fashion will obviously prevent that LN 102 from being used for any other purpose at the same time.

Another aspect of fully understanding a circuit component is knowing when that component should not be used, and if not used, what should be used instead. It was already noted that if a signal path that was needed to be extended to reach another active component of a circuit was too long, so that the use of a string of BYPASS gates would bring about too much deterioration in the signal level, instead of using BYPASS gates each two intervening LNs 102 would preferably have been structured into inverters instead, that would then act to maintain that signal level. It should then be mentioned that instead of inverters, resort may also be had to a faster circuit called a "superbuffer," see FIG. 1.14 of Jeffrey D. Ullman, *Computational Aspects of VLSI* (Computer Science Press, Rockville, Md., 1984), pp. 19-20. To complete this matter, it may also be recalled that PTs in general can be connected directly into a circuit only through the end terminals thereof, with no end terminal of a PT to be connected to any PT gate terminal. Id., p. 19. Consequently, PS 100 is fabricated so as not to allow any such connection anywhere, the only connection to the gate terminals of the PTs in PS 100 being those from the encoding system of circuit and signal code selectors that will bring in "1" bits to enable those PTs (independently of everything else) from outside of PS 100.

One significant aspect of the BYPASS gate with respect to the operation of PS 100 is the fact that although the origin of a signal that is intended to be received by some circuit-active LN 102 is ordinarily the next previous LN 102 to that circuit-active LN 102, when a BYPASS gate is used that originating LN 102 will be two LNs 102 back from that RT, or further if more than one BYPASS gate were being used. Also, an LN 102 that has developed an output bit must maintain the presence of that bit long enough for the LN 102 that was to receive that bit to have done so, i.e., to have "captured" that bit, and to have at least begun to form its response thereto. In a "normal" path the capture of that bit occurs during the cycle that follows that in which the bit was released, so at first glance it would seem that the bit would need to be retained for a second cycle.

Ordinarily (i.e., in the absence of a BYPASS gate), the time required to transfer a bit from one LN 102 to another would be that required by the travel of the bit from an originating LN 102 through just one SPT 106 and the wire associated with that SPT 106 to a receiving LN 102. Another aspect of using a BYPASS gate is that to such time must be added the time required for a bit to pass through a first wire, then a second SPT 106, (i.e., the A(4) "BYPASS PT") and then a second wire, which added time will necessarily affect the response time of the RT. If carrying out the kinds of phase adjustments discussed above with reference to FIG. 5 (sheet 5), allocation would have to be made for the extra time involved when there is a BYPASS gate in the circuit. (Of course, these time delays are always relative: if pairs of inverters had been used rather than pairs of BYPASS gates, the added delay would be even longer because of the time required for those inverters to respond to an input bit.)

Before proceeding on to the next circuits, this BYPASS gate provides an adequate context in which to bring out some of the other significant aspects of IL as a whole, and such discussion will now be given. For example, precisely what those timing relationships would be also depends upon whether the data paths act as "race paths," in which a bit is captured during the same cycle in which sent, as the "normal path" mentioned above wherein the bit is captured during the cycle after that in which sent, or as "long paths," the bit in this case having been just missed on that cycle immediately after that in which sent. The "normal" path is ordinarily the one sought, as noted, e.g., in 1. Deol, C. Mallipedi, and T. Ramakrishnan, "Amdahl Chip Delay Test System," *Proc. IEEE ICCD* '91, pp. 200-205. The rate at which electrons will evacuate an area to form a positive voltage at such point will depend upon the magnitude of the applied voltage, so because of the unique nature of IL, and especially the matter of adjusting the relative phases of the circuit structuring and signal transfer processes on their separate paths as was discussed earlier in connection with FIG. 5 (sheet 5), the possibility of establishing race paths must be taken into account when "fine tuning" the operations in PS 100.

In PS 100 there will be a continuous flow of both data bits and the bits that will structure the circuits required by those data, those two operations being synchronized, but slightly out of phase. The circuit structuring takes place immediately prior to the arrival of the data, and the de-structuring of the circuits and their structuring into new circuits then occurs immediately after the function of the circuit as just structured had been carried out. (Ordinarily, the destructuring of a circuit and the structuring of a new circuit will be a single process: one set of code is replaced with another set.) It is then essential to ensure that in the timing of the two circuit structuring and data transmission events, the greater length of the data transmission path if a BYPASS gate (or inverters) had been used will be taken into account so as to maintain the synchronization of those two events.

It should also be stressed, however, that none of these considerations have anything to do with the basic operability of the IL circuitry. If operated at a low enough frequency, all of the problems just mentioned will disappear, since there would then be ample time for all of the required processes to take place. The present discussion, in other words, relates entirely to means by which the PS 100 circuitry could be made to operate as fast as possible. It remains to be seen through experiment, of course, how much difference these issues would really make, and the more significant they may turn out to be will, among other things, render more and more important such matters as maintaining a constant low temperature in the PS 100.

Delay differences can also arise as a result of process variations in chip manufacture, even as to different samples of the same chip, and there may also be contact problems. I. Deol et al., Id., p. 201. How that synchronization would be affected will also be a matter of whether a PS 100 was fabricated to favor one type path or another, what types of transistor and what voltage levels were used, and whether the operation of PS 100 was to be data driven or clock driven. All of these timing matters are subject to ordinary experimental confirmation by way of simulation or prototypes, as might properly be employed in any circuit or IC design in the hard-wired realm, but since the precise results thereof do not affect the underlying principles of IL itself, and although it is appropriate to mention them as part of a complete disclosure, these are not issues that can be resolved on paper, so no attempt will be made here to resolve those issues but only to point out that they are present and to obtain the best possible performance should be taken into account.

Whatever technique may be used to resolve those delay issues, there is at least one operational aspect of PS 100 that would not be affected. If as one technique a delay in the operation of a particular step were to imposed by a common Clock 130, and if the operations of PS 100 as to all of the IP tasks being carried out were being maintained in synchrony by that same common Clock 130, then the time during which the rest of the active LNs 102 in PS 100 were held in whatever condition those other LNs 102 might have been in would also be increased. As a result, the use of any substantial number of BYPASS gates (or inverter pairs) would reduce the maximum speed at which the PS 100 could operate. On the other hand, to hold just that one LN 102 in an "output" role for two or more cycles instead of one, without making any changes in the common Clock 130 itself, would have no effect on operations elsewhere within PS 100. Using the first method would have the effect of slowing all of the PS 100 circuitry but not affect the synchrony, while the second method would not affect any part of PS 100 other than that one LN 102, but would eliminate any synchrony that might have existed between the algorithm that included that one LN 102 and the other IP tasks that were then in process.

However, that is precisely as it should be. The fact that various algorithms can be in process in a PS 100 without interfering with each other means that it would not matter if the IL circuitry within which some other algorithm might be getting executed was in synchrony, or indeed was even present—one could add or delete IL hardware at will (meaning, of course, in terms of fewer or more modules, not within the PS 100 of a single module), which means that the apparatus is fully scalable, which is perhaps the most valuable feature that Instant Logic™ has. A loss of synchrony would have no adverse effect since, unless there were some "extraneous" relationship between those tasks, as in each being a separate part of some other, "huge" IP task for the continuation of which inputs from some two or more smaller tasks had to arrive on the exact same cycle, there is no reason why there would have been, should be, or indeed ever would be, any synchrony among those operations. Synchrony must be maintained within a task as to circuit structuring and data input, but not between different algorithms.

That is, every IP task that could be carried out in a PS 100 is really an independent entity, unaffected by whatever else may be taking place anywhere else within the PS 100. Whether data driven or clock driven, each full course of circuit structuring and data introduction and removal as would carry out some one IP task can and usually would have two or more operations timed relative to each other, within the confines of that one task only, but without regard to might be transpiring elsewhere within PS 100. Every one of such other tasks being executed would be "internally" timed in that same manner, but without regard to the other operations. There would also be cases, of course, in which one task needed to be completed before another task was begun, by which is meant ordinary "data dependence," but that would be a feature of the algorithms being executed and not of any aspect of IL itself, and may indeed be resolved in IL in ways that would not be possible in a hard-wired structure.

Data dependence is resolved in IL simply by starting up the second operation just when the required data from a first operation was about to appear, but that is the standard method of operation in IL in any event. The space not used by not initiating that second task until necessary would be applied in the meantime to other task(s) that might need to be carried out, usually in other algorithms. Not only can every IP task within PS 100 be carried out without any interaction with any other task, but every LN 102 in PS 100 by itself is also independently operable. For example, in simply transmitting an n-bit word, if one LN 102 failed, the bits of the (n−1) other LNs 102 would still be transmitted, and once the fault had been fully identified, the error is overcome by selecting a different LN 102 to be used instead of the one that failed. At the point of error, the bit affected and the parallel bits of the word that follow afterwards in the word are simply "moved over" one position. The only exception to that feature is the matter of enabling CPTs 104, when enabling the 3 CPT 104 precludes the enabling of the 4 CPT 104, and vice vera, that indeed is an inherent feature of IL in itself, but one that was simply imposed as a matter of convenience to the user in avoiding error.

Those procedures provide the complete circuit "cccccccc" and signal "ssssss" codes. The "cccccccc" code lists the 2-bit codes for those CPTs 104 that are to be enabled (those not to be enabled will be left blank) on the LN 102 that is identified by the "Index Number" ($IN_j$) "iiiii" in the particular CL. That CL discussed at present includes the output 13 CPT 104, that actually would be rarely used since only required at the very end of an algorithm. The "ssssss" code provides the location within the circuit of each SPT 106 to be used as to each LN 102. The circuit drawings to follow will employ the same method of marking and darkening of the various elements as were employed in FIG. 1. With the "iiiii" code having already been employed and deleted before the "ccccccccccccssssss" code comes into play, the full remaining code can be expressed as:

[001][010][100][011][OT][DC][RT], (8)

where the 3-bit circuit codes are as shown the 3ECCINs 262 in FIG. 19 (sheet 13) and the ellipsis after the "[RT]" code in the equation means that those last three 2-bit signal codes would be repeated in the event that there were another one or two SPTs 106 still to be enabled.

With the inclusion now of the LN 102 output 13 CPT 104, the use of a 3-bit circuit code, the $LI_i$ code removed, and just one SPT 106 to be enabled, the length of the CL had now become 18 bits, i.e., three bits in each of four circuit code entries to yield 12, and then the same six bits for the three 2-bit signal code SPT 106 entries. (With two or three SPTs 106, the CL would have lengths of 24 or 30 bits, respectively.) Even though the circuit code can only include three entries, that space for four entries must still remain since either of the 010 or 011 codes might be used, although not both at once, for the reasons set out above. This code also need not be changed upon the introduction of a third dimension, since the four 3-bit circuit codes still suffice to designate the CPTs 104, and the two bits of the signal codes, that would be "01," "10," and "11," still suffice to encompass the signal codes as before.

Equation 7 provides in the first four entries the actual code numbers to be used for the CPTs 104, as explained earlier. Those numbers are fixed in the locations shown in Eq. 7, and what structure the LN 102 will come to have depends on which of those numbers, from none up to three, had been enabled. That is to say, the formula in Eq. 1 will always have the code sequence shown, but what actually occurs in PS 100 depends on which of those codes had actually been entered by the user. Contrary to the procedure for the CPTs 104 wherein not every 2-bit node must have an entry, for the SPTs 106 one of the "00," "01, and "10" codes must be entered into each of the "[OT]," "[DC]," and "[RT]" positions. Also, even though the SPT 106 entries contain 2-bit codes that are literally the same as those used in the CPT 104 context, those codes have quite different meanings in the SPT 106 context, which meanings are given below in Table XII. As also noted earlier, in actual practice another instance of those last three codes, which three codes now make up the 6-bit "ssssss" code, would be added on to the right end of Eq. 7 for each additional SPT 106 that was to be enabled on the particular LN 102 being structured. The terms used in Eq. 7 are defined as shown in the following Table XII:

TABLE XII

| CPT 104 Codes For a 4-CPT 104 Array and Signal Code Routing Labels |
|---|
| [001] = Code for the 1 CPT 104 |
| [010] = Code for the 2 CPT 104 |
| [100] = Code for the 3 CPT 104 |
| [011] = Code for the 4 CPT 104 |
| [OT] = "Originating Terminal" |
| [DC] = "Direction Code" |
| [RT] = "Receiving Terminal." |

(It may be recalled that the last two ccc codes are out of order in order to accommodate the "elective" feature of the 3ECCS 260. The codes for both the OT and RT are the usual 01=drain; 10=gate; and 11=source, while the codes for the DC entry are 01=right; 10=upward; and 11=inward (in a 3-D PS 100).

When using the CCS1 126 of FIG. 13 (sheet 10), the entry of a 2-bit code as to the CPT 104 codes will place a "1" bit on the gate terminal of each CPT 104 being enabled, in accordance with which 2-bit segments of that "cccccc" code had been entered. The SPT 106 codes, although listed together with the CPT 104 codes in a single CL, will be entered into SCS 128 independently from the "cccccccc" code entry, at a time that lies within the same cycle as that in which the "cccccccc" code is entered, but at a time relative to that for the CPT 104 codes that must be determined. That is, at least one full "ssssss" code for an SPT 106 must be sent into an SCS 128, where from FIG. 21 (sheet 15) alone it cannot be known at the outset which of those "cccccc" or "ssssss" code entries will take the longest time to become effective, although an estimate could be made based in part on the complexity of the circuit and the number of steps involved. (Comparison in terms of the number of steps of the CCS1 126 of FIG. 13 (sheet 10) and the SCS 128 of FIG. 21 (sheet 15) suggests that the circuit code entry would be much faster than the signal code entry, especially since the DMUX actions are not one step events.)

The general idea, then, is to initiate the lengthiest process first, with such a time lapse between the start times of the first and second processes that the circuit and signal code entries would be completed at essentially the same time, by which is not meant the actual entry itself, but rather the time at which both entries have been effective to begin whatever the IP process was. (The "ssssss" codes of all the SPTs 106 of all the LNs 102 are all to be entered at the same time, if sufficient numbers of SCSs 128 have been provided, as are also the "cccccc" codes (separately from the "ssssss" codes), so the number of CPTs 104 or SPTs 106 to be entered will not affect the amount of time required.)

In the present case, however, that procedure cannot be followed directly without knowing the times required for those two processes. In any event, this matter is again not too critical, since the signal codes need only have been entered in time for the relevant SPTs 106 to have been enabled by the time that (1) the CPTs 104 being used have all been enabled; and (2) the LN 102 has responded with a "0" or "1" bit, thus to require output connections for the LNs 102 involved, either onward through PS 100 by way of one of the SPTs 106 or on out of PS 100 through the 13 CPT 104. Therefore, just as it was concluded earlier that the circuit structuring would have to be initiated before any data were transmitted, so should the signal code entries be made well before the circuit code entries. That situation would be further exacerbated if there were only one SCS 128 available for each LN 102, since if there were more than one SPT 106 to be enabled, those entries would have to be carried out one sequentially as to any group of SPTs 106 that were all in the same cycle.

Even further, although all of the 2-bit "cc" codes could be enabled at the same time, that is not true of the "ss" codes, at least in any proper sense. That is, each step in the signal code entry process depends upon there already being a result from a previous step. In order to select a direction code, for example, one must know which of the three DR 108, GA 110, or SO 112 terminals had been identified as the pathway that was to be followed. Of course, one could simply enter the direction code into all three of those pathways, and then a direction for the outgoing terminal that had actually been selected would have certainly been defined, but that would also result in having directions for all three pathways being followed at the same time. Presumably one would then enter the last "ss" code in all six of the DMUX3s 278, from which a particular d, g, or s terminal would have been selected for all six of the triplicate "d, g, s" SCRL 280 groups, all of which amounts to quite a bit of energy-consuming routing of which only that pertaining to the one selected pathway was really required.

To understand the significance of that discussion, it must first be noted what exactly it is that is being transmitted down those pathways. In the CCS1 126 of FIG. 13 (sheet 10), each step involves the generation of a "1" bit to be passed on to the next component, i.e., a "1" bit from a pair of XNOR1 192 gates to an AND1 196 gate, and then a "1" bit from that AND1 196 gate to the following EL1 198. The DMUX1s 274, DMUX2s 276, and DMUX3s 278 of FIG. 21 (sheet 15), however, do not yield "1" bits, but only select a pathway for whatever is passing through the SCS 128.

What is conveyed along the selected pathway is the "ssssss" code itself, reduced at each step through the DMUXs by two of the "5" bits, the content of each transmission then being those portions of the original "ssssss" code that had not already been utilized. It is only by the DMUX1 274 first receiving a "01," "10," or "11" code (as the first two "s" (i.e., the "$s_1s_2$") bits) that the DMUX2 276 to which the next bit pair is to be transmitted could be determined, and then it is only by the DMUX2 276 so selected having received and acted upon either a "01" or a "10" code (as the second two (i.e., the "$s_3s_4$") bits) that the direction towards the proper DMUX3 278 will be established so that the "d," "g," or "s" selection by that DMUX3 278 will be made on the correct LN 102 as the RT. That is, no selection could be made by any DMUX until after the preceding DMUX had selected only that particular DMUX for use. That procedure, of course, defines a sequential process, that in the present case involves three steps, as is further evidenced by the fact that the initial "ssssss" contains three 2-bit signal codes. Passage of the "$s_3s_4s_5s_6$" codes from the DMUX1 274 to the DMUX2 276, and then of the "$s_5s_6$" codes from the DMUX2 276 to the DMUX3 278 are shown in the upper left-hand corner of FIG. 21 (sheet 15). The selected DMUX3 278 will then select the appropriate one of the d=drain (or "DR") (01), g=gate (or "GA") (10), or s=source (or "SO") (11) terminals of the RT, using the "$s_5s_6$" code as received, in the normal manner of a DMUX.

As a result of all that, however, unless one is to have a particular one of the three RT terminals selected on all six RTs, the entry of each "ss" bit pair in the "ssssss" code must await the completion by the preceding DMUX of the selection of which of the next DMUXs is to make the next "ss" selection, whether of the terminal on the OT that is to be used, the direction therefrom that the RT is to be found, or the terminal of the RT so identified. The delays involved in those processes then make it just that much more likely that the entry of the "ssssss" code will require substantially more time than the simple two-step entry of the "cccccc" codes. That conclusion was originally derived just from the comparison noted above of the number of steps involved in using the CCS1 126 of FIG. 13 (sheet 10) and the SCS 128 of FIG. 21 (sheet 15), but then the realization that the sub-steps involved with respect to each bit pair of the "ssssss" code must be carried out by steps that are strictly sequential will add even more time delay.

Having now completed the description of the ILA apparatus and of how the "cccccc" and "ssssss" code entries are carried out, thus to encompass everything that may be done in a 2-D PS 100, the structuring of some additional circuits can be shown. However, one practical aspect of the entire process and of the dimensionality of the PS 100 still needs to be brought out, which is that the PS 100 must incorporate at least a minimal degree of three-dimensionality in order to function at all. Specifically, if a first LN 102 is to have an SPT 106 connecting from a DR 108 terminal thereof to a SO 112 terminal of the LN 102 to the right, and at the same time have an SPT 106 connecting from the SO 112 terminal of that first LN 102 to the DR 108 terminal of that rightward LN 102, the paths of those two SPTs 106 must obviously cross. There will also be SPTs 106 extending rightward from the GA 110 terminal of that first LN 102 that would also be crossed. It has now become common, however, to have integrated circuit chips built up in layers, and particularly to have transistors fabricated in one layer and then a conductive layer above that first layer, that conductive layer including lines that connect between the transistors of the lower layer. Bridges that will have one conductive line pass over another conductive line are also used. In discussing the circuits to follow, then, it should be taken that all of the SPTs 106 have been fabricated in such manner as to have no interconnection lines coming into contact with any other such line, whether by use of additional layers, by bridges, or as to the circuits being structured, by the use of "posts" that would raise the circuit structuring up to another complete IC level, using any multi-level or "skyscraper" technology, where by a "level" is meant a plane that contains all of the requisites of the usual planar integrated circuit, that has been fabricated so as to be placed atop another such level, with communication means being provided between those levels.

In the context of the actual IC structure, more precise definitions of what is meant by a "level" are required. In mentioning the need to carry out some circuit structuring in more than one level, reference is to what may be termed a "structuring level" that relates solely to that circuit structuring process, but does not say anything about the actual physical levels in which that structuring will be carried out, other than that if there must be two structuring levels, there must obviously be more than one physical level, or else the intent to avoid having different signal paths "colliding" with one another would not have been achieved. The IC in which these structuring levels are defined, however, will be found in the PS 100 of Instant Logic™ to have two physical levels, one for the SPTs 106 (for reasons that will be explained below) and another for the LNs 102, CPTs 104, and various other components. Each of these levels will have a full complement of layers, e.g., a transistor layer, a dielectric layer, a conductive layer for the wiring ($V_{dd}$, GND, etc.), and so on. A level in the IC context then means a structure that can support one electrical pathway, but if two different conductive layers are required for that purpose, then the "structuring level" would include two of those physical levels, with the two conductive layers contained in each such physical level. That indeed is the case in the PS 100 of an ILA, since as noted the SPTs 106 are disposed in a different layer (and indeed in a different level) than are the LNs 102, CPTs 104, etc. So then back in the context of circuit structuring, if it became necessary to employ a "second layer" to avoid signal path collisions, then the IC capable of carrying out that process would in fact contain four physical layers, two for each of the two "structuring levels." (The "Vertical ICs" to be shown later are so constructed.)

That process, it should be noted, has nothing to do with the problem as to the lines from one LN 102 to another that would cross over one another, since the one component among the various levels and layers just discussed that must actually extend to another LN 102 will be the conductive layer in that level which contains the SPTs 106, and the lines passing through those SPTs 106 still remain to reach the appropriate terminal of a neighbor LN 102 without contacting any other such wire. It will be seen later that the lines that come off from and lead into the terminals of an LN 102 have all been kept separated at the LN 102 by following different paths, which separation must be continued within the area between the LNs 102, and since there will inevitably be crossovers in that area, those lines, as suggested earlier, must lie in different planes (i.e., layers), separated by dielectrics. What then remains to be resolved is the situation in which the circuit to be structured has itself called for a crossover situation, i.e., where a line from one LN 102 would cross over a line from another LN 102, for which an example in a simple latch is shown later in FIG. 54 (sheet 27). (That particular case turns out to be easily resolved by redrawing the circuit, but others are not so readily resolved.) It will be shown later that at the transistor level as to particular circuits, it would be possible to route one of the two lines that would cross over along an inter-LN 102 path (using PTs or pairs of NOT gates) that would route around the "target" RT and come in "from the other side," but that is an inefficient and costly solution. Even for that case, therefore, the use of a multilayer IC becomes imperative.

Again as to the circuit structuring process, then, it was noted earlier that Instant Logic™ might be found to encompass circuits that would be unique to IL, perhaps because no occasion to use such circuits ever arose in ordinary computer work or such circuits would not be possible using the existing μ-based technology. One such circuit seems to be that BYPASS gate, and one more circuit that would also be exclusive to IL, since that circuit uses a BYPASS gate, might be found in the BRANCH gate, shown in FIG. 25 (sheet 16). Of course, that BRANCH circuit might be regarded instead simply as a particular application of the BYPASS gate, but the BYPASS circuit does exhibit further aspects of IL and hence, along with a number of others, have been and will continue to be addressed herein in considerable detail, simply because they are not usually a part of ordinary electronics practice.

To illustrate the "branching" process of the BRANCH gate, FIG. 25 (1) shows (1) an input to the A LN 102; (2) that receiving A LN 102; (3) a receiving B LN 102 connected from that A LN 102 and serving as a BYPASS gate to establish a first branch of the signal path; (4) a C LN 102 connected from that A LN 102 to establish the second branch of the signal path; and (5) a receiving D LN 102 connected from the B LN 102 that will continue the signal path of that B LN 102, albeit one cycle behind the operation of the C LN 102, but still to have created two signal pathways for the one signal that entered into the A LN 102. The B LN 102 has but one PT thereof enabled, i.e., the 14 SPT 106 that extends upward from the DR 108 terminal of that B LN 102 to the GA 110 terminal of the D LN 102. The criteria for having a BYPASS gate, which are that (1) the LN 102 itself should not be empowered; and (2) the ongoing signal bit should depart from the same terminal at which that signal had been received, are thus met.

The codes that structure the A and B LNs 102 are shown near to the $V_{dd}$ terminal of each LN 102, where for reasons of space the circuit and signal portions of the code are shown on different lines (including two signal code lines for the A LN 102 since two SPTs 106 are to be enabled). As to the A LN 102, the code A010011011010 has the meanings that the "A" is used in place of the "iiii" code, the "01" means that the 1 CPT 104 from the DR 108 terminal to $V_{dd}$ is enabled, the "00" code means that the 2 CPT 104 from the GA 110 terminal to an external input is not enabled, and the "11" code means that the 3 SPT 106 from the SO 112 terminal of the LN 102 is enabled, those meanings coming from the positions in the code line at which those codes are entered. (In a 3-D array three 3-bit codes would have been used.)

As to the signal code lines for the A LN 102, in the first signal line shown the first "01" means that the SPT 106 will come from the DR 108 terminal of the A LN 102, the second "01" means that the SPT 106 to be enabled extends to the right (thus to establish the B LN 102 as being the RT), and the third "01" code means that the distal end of that SPT 106 connects to the DR 108 terminal of the B LN 102. The second signal code line then refers to that second SPT 106, for which the "01" code again means that the SPT 106 to be enabled extends from the DR 108 terminal of that A LN 102, the "10" code means that such extension in this case is upward (thus to establish the C LN 102 as being the RT for this SPT 106), and that last "10" 2-bit code means that the distal end of the SPT 106 connects to the GA 110 terminal of the C LN 102. Since no CPTs 104 are enabled on the B LN 102 (the BYPASS gate), that circuit code is simply "000000," and since the only SPT 106 connection from the B LN 102 is the same as the second one of the two A LN 102 SPT 106 connections, that code is simply copied over from the A LN 102 to the B LN 102. No code is shown for the C or D LNs 102 since whatever their further structuring might be is irrelevant to the functioning of the BRANCH circuit. The net result of the BRANCH gate is that there are now two instances of the signal that originally arrived at the A LN 102, and two different processes pertaining to that signal can be carried out at the same time.

Unlike in the earlier presentation of the BYPASS gate, in this case the terminal of the RT of the BYPASS gate is different from the outgoing terminal of that BYPASS gate, but those terminals need not be the same for the "B" LN 102 to qualify as being a BYPASS gate. If for some reason it was necessary to have the two signal bits in the two branches "in phase," with the two signal bits passing through each of the second, third, fourth, etc., LNs 102 along those two pathways at the same time, the C LN 102 could also have been made a BYPASS gate, with there then being an E LN 102 connected thereto that would be in phase with the D LN 102, i.e., two LNs 102 away from the originating A LN 102. This BRANCH gate thus confirms what was said earlier to the effect that the output of a BYPASS gate can be to a terminal on the RT LN 102 therefor that was different from that from which the SPT 106 originated on the OT BYPASS gate, so long as the bit that departs from the BYPASS LN 102 departs from the same terminal as that at which the bit had been received.

The next IL circuit to be shown is the NOT gate or inverter (Circuit 3), with an iconic version of that "gate" being shown in FIG. 26 (sheet 16), the transistor-level version in FIG. 27 (sheet 16), and the IL-structured version in FIG. 28 (sheet 17). In FIG. 28 the "powering up" of the LN 102 is shown by the letter "L" in that A LN 102 in a dark circle with dark lines connected thereto, the CPT 104 numbers being shown within dark circles, and darker symbols being used for those three enabled CPTs 104 and the one enabled SPT 106 (those not in use not being shown at all), with 1" bits also being shown within the PTs 104, 106 in use. Those darker lines, the "Input" label on the lines leading in to the gate 110 terminal of the LN A and the fact that the 2 CPT 104 is darkened show that the input to this circuit again comes in from outside of PS 100, rather than from an inside source. (Were the internal input line to this LN 102 being used, which line is also shown in FIG. 28 to be connected to the gate 110 terminal of the LN 102, that lighter input line would be darkened and the 2 CPT 104 would be shown lighter.)

The PTs 104, 106 in use in the inverter or NOT gate of FIG. 28 are PTs 1, 2, 3, and 5, for which the code becomes "A011011010110" as shown in FIG. 28. The labeling shown under that code is intended in this drawing only to indicate the meanings of the 2-bit code just above each of those labels, i.e., following the "A" notation the "01," "10," and "11" codes mean that the 1, 2, and 3 CPTs 104 are all enabled, and "d," "r," and "g" labels mean that the SPT 106 to be enabled connects from the drain 108 terminal of the LN 102, extends to the right, and connects to the gate 110 terminal of the RT LN 102 so identified. The output from the NOT LN 102 could be shown as going to any of the drain 108, gate 110, or source 112 terminals of a rightward LN 102, and that LN 102 would still be a NOT gate, so in FIG. 28 that output was simply shown arbitrarily as being PT A(5), to the gate 110 terminal of the next LN 102 to the right, as would often be the case. (In the code that simply indicates the digital PT (CPT and SPT) numbers that code would be "01020305.")

That GA 110 line in lighter ink on the "A" LN 102 of FIG. 28 is the point at which a preceding LN 102 using the 5 SPT 106 as the output will connect. In principle such lines could also be shown for the other (DR 108 and SO 112) terminals, since the outputs of neighboring LNs 102 directed towards those terminals would have the same kind of direct connection as that to the GA 110 terminal. However, there is a reason to show that direct line onto that GA 110 terminal, which is to distinguish that line from the outside line through the 2 CPT 104, but since there are no inputs to the DR 108 and SO 112 terminals from outside of the PS 100, that reason does not exist as to those terminals. The connections from neighboring LNs 102 to the DR 108 and SO 112 terminals are thus simply assumed to be made directly to those terminals.

The first 2-LN 102 circuit to be shown is the AND gate, the prior art iconic version of which is shown in FIG. 29 (sheet 17), the prior art transistor-level version in FIG. 30 (sheet 17), and the IL version in FIG. 31 (sheet 17), that then becomes Circuit 4 as shown at the upper right corner thereof. In the latter two versions of the circuit the LNs 102 are distinguished by "A" and "B" labels and disposed in FIG. 31 in a seemingly vertical disposition, but for the reasons stated earlier as to what connections are provided between LNs 102 in a 1-D array, the physical dispositions thereof in this 1-D PS 100 must be in a horizontal direction. (FIG. 31 is immediately known to be in a 1-D array since no vertically extending SPTs 106 as were seen in FIG. 2 are shown.)

The LN 102 closest to GND is designated as the "A" LN 102 in FIG. 31, in accordance with FIG. 30, and that closest to $V_{dd}$ is the "B" LN 102, and unless otherwise noted for some special purpose that practice of beginning a drawing at the bottom of the figure will be continued throughout this disclosure. The actual description of the AND gate, however, will start with the B LN 102 in order to bring out better the contrast between this AND circuit and the NOT gate (Circuit 3) of FIG. 28. In any case such as this in which LNs 102 are connected in series between $V_{dd}$ and GND, the LN 102 closest to $V_{dd}$ will connect thereto through the 1 CPT 104 of that LN 102 as shown here and in the previous Circuit 3, while the source 112 terminal of that same LN 102, that in the Circuit 3 inverter of FIG. 28 had been connected through the 3 CPT 104 directly to GND, will in this Circuit 4 connect as part of the 2-bit AND gate to the drain 108 terminal of the rightward A LN 102, by way of the 10 SPT 106 of the B LN 102. (The 10 SPT 106 is thus one of those that would come into contact with the other SPTs 106 of LN B unless placed separately in an upper connection level or placed on a bridge as was discussed earlier.) The source 112 terminal of the A LN 102 will then connect to GND through the 3 CPT 104 of that LN 102 closest to GND, i.e., the A(3) CPT 104.

As to the specific LNs 102 of FIG. 31, the PTs 104 turned on as to LN A are CPTs A(2) and A(3), with no SPTs 106 being enabled, and as to LN B they are CPTs B(1) and B(13), and then SPT B(10). Those codes are shown in FIG. 31 as in FIG. 28, using the simpler notation that for reasons of space simply uses successive 2-digit PT 104, 106 numbers rather than the full binary code. (With two CPTs 104 and two SPTs 106 in use, the code for the B LN 102 would be rather long if expressed in binary code, which would be "B001000000011110101," using 3-bit code for the CPTs 104 since a 4 CPT 104 (designated here as PT 13 for purposes of continuity in the numbers) is shown to be present. It is the A(3) PT 104 that now connects the source 112 terminal of LN A to GND, while the CPT A(2) connects an input from outside of PS 100 to the gate 110 terminal of LN A. As to LN B, the B(1) PT 104 connects to $V_{dd}$, the internal line to the gate 110 terminal of the B LN 102 provides the second input to the AND gate, and B(13) was arbitrarily selected to provide the output from the entire AND gate from the drain 108 terminal of LN B to outside of the PS 100, with PT B(10) connecting the source 112 terminal of LN B to the drain 108 terminal of LN A as part of the series circuit. As shown in FIG. 31, the codes for the respective "A" and "B" LNs 102 are "A0203" and "B011013."

As a more informative way of describing an IL circuit, since there are two kinds of input into a binary circuit, i.e., (1) the data to be operated on and (2) a voltage source to empower such operations, in describing the operation of a binary circuit there will then be two different pathways that must be identified, which pathways can be termed the "signal" pathway and the "voltage" pathway, and there can be more than one of each. Within each such class, parts of two or more different pathways can coincide, e.g., for a certain distance, two different signal or voltage pathways can run along the same line, and both of those types of event will be seen in the AND gate of FIG. 31. That "signal" pathway will extend in some manner from the input to the output, and the "voltage" pathway from GND to $V_{dd}$ (or vice versa). In an Instant Logic™ circuit in particular, the identification of those pathways as to some particular circuit is especially important, since there will often be several ways in which the circuit could have been structured, and one would wish to know which particular version was at hand. In what now follows, both of those pathways will be identified for the particular 2-bit AND circuit of FIG. 31.

As a 2-bit circuit, the AND gate of FIG. 31 must of course have two inputs, which in this particular circuit has one input coming in from outside of the PS 100 through the input A(2) CPT 104 of the A LN 102 to the GA 110 terminal thereof, and the other is internal, from some terminal on a leftward LN 102. Taken individually, both of the A and B LNs 102 can be seen to be in the form of inverter circuits, since they both accept an input on the GA 110 terminal thereof and then provide an output from the DR 108 terminal thereof, the main difference between the two circuits being that in the case of the B LN 102 there is a rather lengthy path to GND, while for the A LN 102 that same lengthy pathway is used to reach $V_{dd}$. With those two LNs 102 being connected in series, there must then be an input to both LNs 102, which of course is what makes the circuit an AND gate.

The A LN 102 signal pathway is then from the A(2) external input through the A LN 102, then through the 10 SPT 106 of the B LN 102 (although the B LN 102 appears above the A LN 102 in FIG. 31, that is only for reasons of space for the drawing, that B LN 102 actually being to the left of the A LN 102), then through the B LN 102 itself, and then finally from the DR 108 terminal of the B LN 102 out of the PS 100 through the 13 CPT 104 of the B LN 102. For the B LN 102, that signal pathway is from an internal input to the GA 110 terminal of the B LN 102, through that B LN 102, and then again from the DR 108 terminal of the B LN 102 out of the PS 100 through the 13 CPT 104 of the B LN 102. As to the voltage pathway, for the A LN 102 that runs from GND through the A(3) CPT 104 to the SO 112 terminal of the A LN 102 and on through that A LN 102, from the DR 108 terminal of that A LN 102 to the 10 SPT 106 of the B LN 102, then on through both that 10 SPT 106 and the B LN 102 itself to the DR 108 terminal thereof, and then through the 1 CPT 104 of the B LN 102 to $V_{dd}$. The voltage pathway for the B LN 102 is exactly the same, since even though the B LN 102 is "picked up" at a point along the way to $V_{dd}$ that is closer thereto, the full path for the B LN 102 must still reach back to find a GND starting point. What now remains to be said about the AND gate of FIG. 31 would all have to do with the nature of an AND gate, which may be taken to be known to a person of ordinary skill in the art and need not be repeated. The fully functional AND gate (Circuit 4) is acquired, ready for use, simply by enabling the PTs 104, 106 indicated by the code near the right side of FIG. 31.

(This is a case that demonstrates the singular disadvantage of having included the elective feature in the circuit code selector, as shown in FIG. 19 (sheet 13). The premise under which that circuit development proceeded was that it would be undesirable to have enabled both the 2 CPT 104 as an external input and the 4 CPT 104 (designated as the 13 CPT 104 in FIG. 31) as the external output of the same LN 102 at the same time, since that would simply bring in a bit and then send it out again without that bit having performed any useful task. However, that premise includes the assumption that the LN 102 has an immediate connection to GND. When there is other circuitry between the LN 102 to GND, then there can indeed be a useful function for the circuit to perform. As concerns the performance of the AND circuit of FIG. 31, nothing would have prevented the B LN 102 from having received an external input, but such a circuit could not have been structured if the code selector being used had been the 3ECCS 260 of FIG. 19—it would not have been possible to enable both the 2 and 4 (i.e., 13) CPTs 104.)

(Consequently, although FIG. 20 does in fact illustrate a code selection technique worth knowing about, and that could be useful in circumstances other than the usual encoding of LNs 102 within a PS 100, the use thereof in that context, without more, is to be highly recommended against. At the same time, the effect of that 3ECCS 260 "either but not both" prohibition is easily eliminated, by first inserting a BYPASS gate at the DR 108 terminal output of that LN 102 and then using the 4 CPT 104 of that BYPASS LN 102 as the circuit output. In that case, the 2 and 4 CPTs 104 that were to be enabled would not be on the same LN 102, so both could be used at the same time. It would then be a matter of engineering choice as to whether to include that elective feature, to be used along with the BYPASS gate. Again in the interest of providing the Instant Logic™ Apparatus with maximum flexibility, and recalling that the use of a BYPASS gate is simply a matter of entering code, but the decision whether or not to use that elective feature of the 3ECCS 260 code selector is a hardware decision that would have to be made in advance, it might be thought to include a 3ECCS 260 code selector, at some expense, along with either a 3-bit, 4/4 version of the CCS1 126 code selector or the CCS1 126 code selector as shown in FIG. 11 (sheet 10) together with the separate output circuitry previously discussed, whereby the decision as to which code selector would be used could be made as to each LN 102. Of course, in deciding whether or not to incorporate that elective process in the ILM 114 it should be borne in mind that what is at stake is simply that someone might inadvertently enable both the 2 and 4 CPTs 104 of an LN 102 at the same time, in a circumstance that would then have the data simply come in to PS 100 through one door and immediately go out again through another door without having performed any useful task.)

The next circuit to be treated is the OR gate, for which a prior art iconic version thereof is shown in FIG. 32 (sheet 18), a prior art transistor-level version in FIG. 33 (sheet 18), and an IL-structured version in FIG. 34 (sheet 18) as Circuit 5, as shown in the upper right hand corner of the figure. Little difference appears in the OR gate as compared to the AND gate except that the A and B LNs 102 are connected in parallel rather than in series, and both of the inputs turn out to come in from outside of the PS 100 through the A(2) and B(2) CPTs 104, respectively. Even so, the need to have the input to the B LN 102 come in from outside of PS 100 is quite evident in this drawing, since the light line extending in to that GA 110 terminal of the B LN 102 is essentially "surrounded" by other circuitry, and with the A LN 102 already occupied in making connection between the A and B DR 108 terminals so as to provide the A side of the OR gate with a connection to $V_{dd}$, no other recourse is available.

The codes for the two LNs 102 are shown near the center bottom of the figure and are A020304 for the enabling of the 2 and 3 CPTs 104 and the 4 SPT 106 for the "A" branch, and B01020305 for the enabling of the 1, 2 and 3 CPTs 104 and (arbitrarily) the 5 SPT 106 to go to the GA 110 terminal of the next LN 102 for the B branch of the circuit. Also, as a reminder, in FIG. 34 the destination terminals as to being to the DR 108, GA 110, or SO 112 terminals for all of the SPTs 106 are indicated at the output arrow for each terminal. And as before, the numbering order for the SPTs 106 goes through the drain, gate, and source sequence as to the proximal ends of all of the SPTs 106, while at the same time within each such three part group that same sequence is followed as to the terminals of the neighboring LN 102 to which the distal ends of the respective SPTs 106 will connect. To have changed the circuit from the AND gate of FIG. 31 to the OR gate of FIG. 34, perhaps for use in a different algorithm that was then "passing through," would only have required the transmission of code bits that would change the codes from A0203 and B011013 for the AND gate to A020304 and B01020305 for the OR gate, i.e., thus to connect the two LNs 102 in parallel rather than in series.

The next circuit to be discussed (Circuit 6) is the NAND gate, for which the prior art iconic version thereof is shown in FIG. 35 (sheet 19), a prior art transistor-level version in FIG.

36 (sheet 19), and then the IL-structured version appears as FIG. 37 (sheet 19). A NAND gate is of course simply an AND gate with an inverter placed at the output thereof, and since both of those gates have already been described, little would be added in repeating the same descriptions on the NAND gate itself. However, the circuit is used here to demonstrate some other ways of carrying out the circuit structuring process, centered on the fact that in FIG. 37 the initial "A" LN 102 is located at the lower right in the figure, with the structuring proceeding from right to left. That method, although obviously not being needed for a circuit being structured in isolation, as here, could well be useful in circumstances under which the signal flow happened to be from right to left, as is taken to be the case in FIG. 37. Following the structuring of the "A" LN 102, a leftward "B" LN 102 completes the AND gate, another "C" LN 102 located further leftward adds the inverter to complete the structuring of the NAND gate, with another "D" LN 102 then being placed upwardly (for the want of leftward space on the paper) from the "C" LN 102 so as to provide an output destination from the NAND gate. (In the PS 100 those four gates would all lie along one straight line.) One aspect of IL that is sought to be shown is that the right-to-left manner of structuring circuits is as valid and viable method as the left-to-right method that is mostly used herein—it is similar to the order of the words in a language, wherein different cultures have adopted different directions. Even as that structuring is carried out from right to left, it can be seen by the arrow heads on the lines so produced that the signal path is also from right to left, as it must be since starting on the right from a connection to GND.

In FIG. 37, the SPTs 106 connect rightward from the "parent" LN 102 as usual, but the course of structuring as well as the signal path flow leftward, which generally means the use of an inter-LN 102 SPT 106 that originates at the RT rather than the OT, as would usually be the case. Short dashed lines are used in FIG. 37 to separate each LN 102 and the SPTs 106 associated therewith from the neighboring transistors, from which it can be seen, for example, that the SPT 106 used to link the A and B LNs 102 together originates at the B LN 102 rather than from the A LN 102 as would be the case if the structuring were proceeding rightward. The central feature of an AND gate is of course the connection in series of a sequence of two or more LNs 102, with the inputs to those LNs 102 being the inputs to the AND gate as a whole. That pathway is from GND to the A(3) CPT 104 in the lower right corner of FIG. 37, through the A LN 102 itself to the DR 108 terminal thereof, then from that DR 108 terminal leftward through the B(10) SPT 106 of the B LN 102 to the SO 112 terminal of that B LN 102, finally through that B LN 102 to the DR 108 terminal thereof, where the output of an AND gate would be taken. To complete the formation of the NAND gate, that pathway then continues on through the C(7) SPT 106 to the GA 110 terminal of that C LN 102, and thence through that C LN 102 to the DR 108 terminal thereof, with the output of the NAND gate being taken at that point.

In the usual left-to-right circuit structuring, that output would be taken from that DR 108 terminal of that C LN 102 using an SPT 106 that extended to the right, but as can be seen by the two slanted bars on the rightward line from that C(5) SPT 106 and the label "No Output," the signal cannot pass in that direction since the LN 102 that is rightward from that point, i.e., the B LN 102, has already been used, actually to bring in the signal to that C LN 102. The fairly obvious lesson from that fact is that once the circuit structuring has been started in a certain direction, absent a second dimension wherein that direction of structuring could be changed to proceed left to right, that structuring must continue in that same direction. The D LN 102, which is not actually a part of the Circuit 6 NAND gate, is added nevertheless in order to show, under this right-to-left structuring, where it is that the output of the NAND gate actually does go. That can be seen as being to the GA 110 terminal of the D LN 102, which on paper is upward from the C LN 102 for reasons of space but would actually be leftward therefrom in the PS 100. By the dashed line seen crossing that C LN 102-D LN 102 pathway it is seen that the SPT 106 that effects that C LN 102-D LN 102 connection derives from the D LN 102 as the RT using the D(7) SPT 106, and not from the C LN 102 as the OT.

The codes for the A, B, and C LNs 102 are shown just above each LN 102, and for the output D LN 102 inverter just to the left thereof. Since the A LN 102 does not require enabling any SPT 106, the output therefrom being taken through an SPT 106 from the B LN 102, and secondly since not needing a $V_{dd}$ connection, since again that is gained through the B LN 102, the A LN 102 needs only the 2 and 3 CPTs 104 to be enabled, that 2 CPT 104 being used to provide an external input and the 3 CPT 104 for the GND connection. The external input to the A LN 102 connection is simply to the GA 110 terminal thereof. The A LN 102 code is then simply A0203, as shown above that A LN 102 in FIG. 37. (Lest it be thought by now that an AND or NAND (and by analogy any OR or NOR gate) must always have an external input to the rightward LN 102, in the usual 2-D circumstance that connection would come in through that second dimension, e.g., from an LN 102 below the A LN 102.)

The B LN 102 requires the B(1) CPT 104 to $V_{dd}$ to be enabled, both for its own sake and to provide a voltage to the A LN 102. (Without the B LN 102 operating there would be no $V_{dd}$ for that A LN 102, which of course is the reason why this circuit is called a NAND gate.) The B(2) CPT 104 is used to provide an external input to that B LN 102, and then that B(10) SPT 106 from the SO 112 terminal of the B LN 102 to the DR 108 terminal of the A LN 102 to make the B LN 102-A LN 102 connection, thus to form the AND gate, the code for that B LN 102 then becoming B010210. As a separate circuit (a NOT gate), the C LN 102 requires its own $V_{dd}$ and GND connections, through the respective 1 and 3 CPTs 104, and then the C(7) SPT 106 to bring in the output from the DR 108 terminal of the B LN 102, thus to yield the code C010307. Finally that second inverter, the D LN 102, requires the same 1 and 3 CPTs 104 for $V_{dd}$ and GND and the same D(7) SPT 106 to bring in the output from the DR 108 terminal of the C LN 102 to the GA 110 terminal of the D LN 102, with the D LN 102 code then becoming D010307. The next LN 102 to receive that signal is not shown, but since in the PS 100 that next LN 102 would be immediately leftward of the D LN 102, that next leftward LN 102 would itself have to provide the interconnecting SPT 106, since the SPTs 106 extending to the right from the D LN 102 in FIG. 37, though seemingly appropriate for use, would face the C LN 102 to the right thereof just as the C LN 102 had faced the B LN 102. The separate AND and NOT gates that make up FIG. 37 are labeled just adjacent or above each such sub-circuit.

The last of these more simple circuits is the NOR(OR+NOT) gate (Circuit 7), shown in its prior art iconic form in FIG. 38 (sheet 20), in a prior art transistor-level version in FIG. 39 (sheet 20), and then in the IL-structured form in FIG. 40 (sheet 20). The structuring in this case runs in the usual left-to-right direction, in the order of the A, B, and C LNs 102. The need for either an outside connection or a 2-D array is of course again present in the NOR gate as in the OR gate discussed above. As suggested by the foregoing, to obtain the degree of flexibility that would be required for any kind of "sophisticated" IP, i.e., so as to permit the structuring at least of an XOR gate, would require the hard-wired circuitry of PS 100 to encompass at least two dimensions. In that case, it would be a simple matter to reverse the direction of the IP data flow through PS 100, were there reason so to do. (An important reason so to do lies in a case in which the course of structuring has led up to an edge or corner of the PS 100, and there is no other way to continue with the algorithm.) If a single LN 102 were given an upward ("North" or "N") connection to a second transistor level, then the "longitudinal" circuit structuring, i.e., in the "East" (or "E") and "West" (or "W") directions, could be established in either of those directions (or even in two directions, using the BRANCH gate discussed earlier), except in special cases (seen below in the XOR gate) in which there were to be cross-connections between LNs 102 located at separated parts of the complete circuit.

Given the understanding of the IL procedure imparted by the previous examples, it should be an easy matter after a little practice to write down the code at least for such simple circuits as the NOR gate. Simply from looking at the circuit drawing for the NOR gate in FIG. 40, the codes for the several LNs 102 can be written down. The code for the A LN 102 becomes A010304, since the enabled CPTs 104 and SPTs 106 are seen to be the 1 and 3 CPTs 104 and the 4 SPT 106. Similarly, the B LN 102 has the 1, 2 and 3 CPTs 104 enabled, along with the 5 SPT 106, to yield the code B01020305, while as to the C LN 102, the 1 and 3 CPTs 104 and the 5 SPT 106 are enabled to yield the code C010305. Those codes are shown in FIG. 40 just below the GND symbol for each of the LNs 102.

Again, that A(4) connection between the DR 108 terminals of the A and B LNs 102 serves both to place the A and B LNs 102 in parallel and, if desired, to allow one of the two $V_{dd}$ connections not to be used, since with that A(4) SPT 106 connecting together the DR 108 terminals of the A and B LNs 102, only one of the A(1) or B(1) CPTs 104 to $V_{dd}$ really needs to be enabled. The code for the B LN 102 is then much the same as that for the A LN 102, except for (1) needing to add that B(2) CPT 104 to bring in that external input; and (2) using the B(5) SPT 106 to go to the GA 110 terminal of the C LN 102 rather than the B(4) SPT 106 to the DR 108 terminal of the C LN 102, thus to become B01 020305. It would thus appear that for the most part encoding a circuit for the PS 100 involves only looking at the relevant circuit drawing, noting where the wire connections are, and then writing down the code numbers that will enable the PTs located at the analogous positions, but an example will be given below (in a latch circuit) in which that would not have been the way to proceed.

It may be noticed that the circuit of FIG. 37 (sheet 19) for the NAND circuit does not provide for any outputs from the PS 100, but will employ instead only a 2-bit code, that being sufficient to encompass the three CPTs 104. It was suggested earlier that upon no output being seen in a drawing, it should be assumed that some other means for extracting the outputs is provided. In order now to show that fact, however, there has been added to FIG. 40 a series of "node" symbols (two small concentric circles) as seen earlier in FIG. 2. Those symbols are intended in part to supplant the 13 SPTs 106 first seen in the AND circuit (Circuit 4) of FIG. 31 (sheet 17) in representing one more CPT 104, which was a 13 CPT 104, the result of which would require a 3-bit code with the consequent need for more complex hardware. Upon placing an SPT 106 at the DR 108 terminal of every LN 102, however, a PTE 204 connected to each such PT would permit writing a code line, at the end of the algorithm or any other time at which a data output was sought to be carried out, that would list the LNs 102 of interest and capture whatever bits were present on those terminals, and thus provide an en masse "dump" of the data as the output of the algorithm. That symbol on those DR 108 terminals is thus intended to indicate the presence on all of those N LN 102 DR 108 terminals of an instance of the PTE 204 of FIG. 15 (sheet 11). The circuit would then include only the EL1 198, a voltage source such as VS1 200, and the "?" box in FIG. 15 would then be the PT connected to those DR 108 terminals, the distal end of which would connect to memory or such other destination as might have been selected in the fabrication of the ILM 114.

(Another use of that circuit would be for routine circuit testing. An algorithm such as that described with reference to the phase shifting encoding described above with reference to FIGS. 6 (sheet 6) and 7 (sheet 7), which was simply a string of inverters, coincident in time with the enabling of those the PTEs 204 just noted, could be initiated with, for example, a sequence of "0" bits, and the failure of any LN 102 to produce a "1" bit could be recorded, perhaps also with a LED connected thereto that would light up on a failure of an LN 102 to yield the proper bit. Of course, other more complex algorithms could be used as well, perhaps to include some mathematical process, wherein the content a parallel array of LNs 102 would be compared to the anticipated result that had been entered into a comparator in advance. The algorithm could be executed starting at one end of the PS 100, extending across the full breadth thereof, so as to encompass all N of the LNs 102 within the PS 100. The substance of this procedure would then be that of providing easy visibility of the content of every LN 102 in PS 100, that could no doubt be employed for other purposes as well, as might be conceived by a person of ordinary skill in the art.)

To illustrate more completely the terminology used in this system, when referring to the usual left-to-right method of structuring circuits in a PS 100, the SPT 106 that connects from one LN 102 to another will ordinarily connect from that LN 102 (the OT) at which the signal bit of interest had last been produced, thus to provide an output connected to a rightward or upward receiving LN 102 (RT). In right-to-left coding, on the other hand, that SPT 106 will connect from the LN 102 that receives the signal bit (the RT) to the LN 102 that had produced that signal bit (the OT), and as a result, even though the physical direction in which the connection is made will remain the same, the direction of signal flow will have been reversed. That signal flow is reversed not just because of the mere decision to use right-to-left structuring, but because (1) that original (OT) LN 102 would have been connected to GND, so as to initiate the circuit in the direction towards $V_{dd}$, i.e., leftward; and (2) since that first LN 102 has no SPTs 106 that extend to the left, an SPT 106 that comes in from the left must be used, while that leftward SPT 106 remains the RT.

Again, to "connect from" has meant that the "proximal" end of the SPT 106, as the latter term was defined in reference to FIG. 1, is connected from a particular terminal of an LN 102 that is serving as the OT to a second LN 102 as the RT that has a letter designation that comes after the letter designation of the OT. In FIG. 34 (sheet 18) as an example, wherein the destinations of all of the SPTs 106 are labeled and those two ends are marked as to the A(4) connection to the DR 108 terminal of B LN 102, and the DR 108, GA 110 and SO 112 terminals are also labeled, the A(4) SPT 106 is connected at its proximal end to the DR 108 terminal of A LN 102 and the distal end connects to the DR 108 terminal of the B LN 102. However, according to the convention previously adopted herein, in the NAND gate of FIG. 37 (sheet 19) that had been structured right to left, on the A LN 102 at the right end of the figure there are no leftward going SPTs 106, so instead the B(10) SPT 106 is used, with the proximal end thereof connected to the SO 112 terminal of the B LN 102 and the distal end thereof then connecting to the DR 108 terminal of that A LN 102 that is to the right of the B LN 102. That is, the SPT 106 will always extend "from" a terminal of an LN 102 in a proximal—distal order, whatever letter A, B, or C is being used, and whatever the direction of construction or signal flow. As a result, the connecting SPT 106 connects through the proximal end thereof to a terminal of the RT if the structuring is from left to right, but through the proximal end thereof to a terminal of the OT if the structuring is from right to left, which is to say that the signal path (that defines which is the OT and which the RT) will be in the same direction as the circuit structuring if left to right, but opposite the signal direction if the structuring is being done right to left.

As to all that, it should not be taken from any of what was just stated that there is anything untoward or "strange" about what was termed as a "reverse" right-to-left way of structuring, since this disclosure as a whole could as well have been based on that right-to-left manner of structuring. What up to now had been the "normal" method of structuring herein would then become the alternative method that would require explanation. What is important about an alternative method of structuring is not just that such method is available, but also the manner in which that technique might be used. For example, in describing the structuring of gates in 1-D arrays even though only 2- or higher-D arrays would likely ever be encountered, because circumstances might arise in which the structuring had come up upon an edge of the PS 100, or the only unused LNs 102 in some step of an algorithm requiring another circuit or circuit part happened to be located just to the left of circuitry that had just been laboriously structured, thereby to eliminate any path to the right, and it would then be important to know that such a leftward turn in the signal flow was possible and could be used in such cases, rather than having to move the structuring just completed.

There is yet another convention that could be adopted that could be more useful in the long run. The selection of one direction as being "normal" and the opposite one a "reverse" connection was used to emphasize that there indeed was such a distinction, and that either direction could be used, but the basic underlying fact of the matter is that by looking at a bare SPT 106 laid out between the terminals of two different LNs 102, that SPT 106 will look the same under either perspective—it would appear to be a symmetrical device having a gate in the middle, and nothing would indicate which was the proximal end and which the distal. Contrary to the first convention adopted, it is not that there is no leftward-extending SPT 106 from an LN 102, but that such SPT 106 has a designation deriving from the leftward LN 102 rather than from the OT. The convention that most accurately models the fact of the matter is then simply to look at the circuit and the available space in the PS 100, identify the direction in which the structuring would best proceed, and then from the starting point as the OT determine which SPT 106 goes in the direction so identified, wherein the end of the selected SPT 106 that connected to that OT would always be the proximal end, with the direction of signal flow being that in which that SPT 106 had extended, whatever that direction around the compass might have been. The user would then not need to be concerned about directions of structuring and signal flow, or which end of the SPT 106 was meant when the term "proximal" or "distal" was used, etc.

An SPT 106 extending rightwardly from a leftward LN 102 or leftwardly from a rightward LN 102 are quite indistinguishable, and could be identified using a number deriving from either LN 102, so the practical way of proceeding would be to use the SPT 106 number derived from the system for numbering the SPTs 106 shown in FIG. 1, but in this case through the full 360 degrees around the LN 102, as shown in FIG. 41 (sheet 21). In FIG. 1 the numbering order for the SPTs 106 down from $V_{dd}$ towards GND had been vertical so as to yield a DR 108, GA 110, and SO 112 order for the OT terminals, and the destination terminal designations were such as to follow that DR 108, GA 110, and SO 112 order as to each of those 3-part groups, with the destination labels proceeding in that same order when going clockwise. In FIG. 42 that same procedure is followed as to the rightward and upward directed SPTs 106, but as to the leftward and downward directed SPTs 106, the order was arranged to go counterclockwise in order to maintain that same DR 108, GA 110, and SO 112 terminal sequence.

It is evident that every SPT 106 in the foregoing system will have two codes. That is, recalling that the seemingly downwardly going 7, 8, and 9 SPTs 106 only have that appearance because of space restrictions and are actually going rightward (with the upwardly-going 16, 17 and 18 SPTs 106 similarly going leftward), in FIG. 41 where the SPTs 106 extending leftward from an LN 102 are also shown, all of the rightward-going 4-12 SPTs 106 on an LN 102 would be duplicated by the 13-21 SPTs 106 coming leftward from the next LN 102 to the right. Using simple straight line representations of the SPT 106 connections, two adjacent LNs 102 not actually connected together would appear more or less as shown in FIG. 42 (sheet 21), wherein each rightward or leftward line pertains to a DR 108, GA 110, or SO 112 destination terminal. If those LNs 102 were then interconnected as shown in FIG. 43, with all of those connections being retained, there would be two SPT 106-SPT 106 interconnections for each SPT 106-SPT 106 pair, one from the left and another from the right. In this case, each horizontal line between the two vertical lines (the LNs 102) represents two connections.

By close examination of FIGS. 42, 43, it can be seen, for example, that just as the 4 SPT 106 connects rightward from the DR 108 terminal on the A LN 102 that is to go to the DR 108 terminal of the B LN 102 to the right, that connection is duplicated by the 13 SPT 106 on the DR 108 terminal of the B LN 102 going leftward to the DR 108 terminal on the A LN 102. With each LN 102 having nine SPTs 106 on each side extending towards a neighbor LN 102, there would be 18 lines between each A-B LN 102 pair. In FIG. 43, those LNs 102 have been interconnected with nine duplicate lines eliminated so as to have only nine SPT 106 connections between the two LNs 102, since as suggested earlier, in the actual manufacture of the PS 100 only one of those two connections would be implemented. Again as to FIG. 43, in a complete PS 100 there would of course be a sequence of very many more nine line groups connecting between many more LNs 102, and each SPT 106 therein could then have two designations thereon, one from the A LN 102 and another from the B LN 102. (The "hanging" SPTs 106 at the opposite ends of such a sequence and having numbers thereon would only appear at the boundaries of the PS 100.) Table XIII below shows the two different SPT 106 codes that would be if determined by using both a left and a right LN 102. (FIGS. 42-44 have shown only the East-West dimension in 1-D array, but if in a 2-D array that also had the N-S dimension the numbers of SPTs 106 would be doubled.)

TABLE XIII

| Code Correlations Between OT and RT SPT 106 Codes | | |
|---|---|---|
| 1. A(4)-B(13) | 2. A(5)-B(14) | 3. A(6)-B(15) |
| 4. A(7)-B(16) | 5. A(8)-B(17) | 6. A(9)-B(18) |

TABLE XIII-continued

| Code Correlations Between OT and RT SPT 106 Codes | | |
|---|---|---|
| 7. A(10)-B(19) | 8. A(11)-B(20) | 9. A(12)-B(21) |
| 10. A(13)-B(4) | 11. A(14)-B(5) | 12. A(15)-B(6) |
| 13. A(16)-B(7) | 14. A(17)-B(8) | 15. A(18)-B(9) |
| 16. A(19)-B(10) | 17. A(20)-B(11) | 18. A(21)-B(12) |

This analysis of the SPT 106 connections is not made for the purpose of the routine installation and execution of algorithms, since in that context, an immediate question would arise as to gaining access to individual terminals on individual LNs 102, considering the tiny dimensions involved. However, for the purposes of the present issue it is not necessary to fabricate a PS 100 at micron-sized levels. Nothing would prevent an ILA from being constructed even with discrete transistors perhaps placed on a wall-sized bread board. That would presumably lead to a much slower apparatus, but this discussion is not concerned with either the manner of installing an algorithm within CODE 120 or executing an algorithm in PS 100, or even with the "supercomputer" issue, but only to the use of the IL technology as a test bed for new circuits in which the speed would not be critical.

The testing procedure noted earlier centered on the "Test Array" (TA) 124 located in ILM 114, which has the same structure as the PS 100 and serves to provide an amount of "spare" space in which to test out algorithms without needing to avoid collisions with normal IP operations. However, since the structure of the TA 124 is the same as that of the PS 100, in order to execute an algorithm in the TA 124 all of the procedures carried out in the PS 100 would also need to be used, e.g., developing the code lines, entering the code through the CSU 122 code selectors, and all of the other operations that have been described above. Even as productive as such work might be, particularly when the algorithm is essentially complete and it is sought mostly just to give that algorithm a "dry run" in a "real" environment, that procedure would require substantial amounts of user time and effort, and is not well suited for trying out different gate constructions or structuring methods or the like. Installing or modifying a series of code lines in CODE 120 for testing purposes is not a matter of just moments.

The previous discussion as to interconnecting LNs 102 and the methods to be used was intended to provide a background for the development of an Instant Logic™ apparatus for small scale testing. If the usual method of installing and executing full algorithms as was just summarized is to be avoided, some alternative apparatus needs to be made available. For that purpose, FIG. 44 (sheet 22) shows a "Circuit Tester" (CT) 284 made up of a "Test Frame" (TF) 286 having disposed thereon a 9×6 array of "PT Push Buttons" (PTPBs) 288 by the use of which selected CPTs 104 and SPTs 106 could be enabled and disabled by the user directly, without need to use any code, thereby to structure experimental circuits that could be tested immediately. Unlike the operation of a CPT 104 or an SPT 106 in PS 100 or TA 124, the PT enabling and disabling in the CT 284 are "toggled," so as to be either enabled or disabled and then left in that condition until another push button entry was made that would change that status back to what that status had been before the previous entry. In that way, there is no continuous structuring and de-structuring sequence in which the structures made would only be present momentarily, so that when signal data are provided thereto, the user can examine the behavior of the circuit at leisure. Of course, the speed advantage of IL is then lost, but the object of the exercise would not be to mass produce results, but rather to find out if or how well a proposed circuit would work.

Specifically, FIG. 44 shows a CT 284 that for purposes of discussion (there being many different ways in which such a frame could be constructed) can be described as a nearly "life size" (perhaps four times the size of FIG. 44 as printed in the patent) metal or plastic frame onto which have been disposed an arbitrarily sized 9×6 array of PTPBs 288 that operate a like number of electronic, contact-operated "PT Toggle Switches" (PTTS) 290 that can be operated by the touch of a finger. FIG. 45 (sheet 22) shows a vertical cross section of CT 284, TF 286, PTPBs 288, PTTSs 290 and LEDs 298, by which the enabling and disabling of the CPTs 104 and SPTs 106 can be carried out and monitored. Internal to the CT 284 are also a "Leaf Spring" (LS) 292, an "Enable Line" (EL) 294, and a "Push Button Cushion" (PBC) 296 that provide the mechanical means for the operation of CT 284.

As seen in the cutaway side view of the CT 284 in FIG. 45, the PTTSs 290 are each a standard electronic toggle switch, and are activated by LS 292 that could be of a flexible strip of metal on the interior end of the PTPB 288s that are to come into contact with a pair of facing ELs 294 on the PTTSs 290 when a PTPB 288 is depressed, thereby to close the circuit therebetween and provide the pulse that will switch PTTS 290 between the "open" and "closed" conditions. An elastic, toroidal PBC 296 is disposed around the periphery of a space between each PTPB 288 and the PTTS 290, with that LS 292 disposed within that ring, thus to provide a "spring" action between those two elements and thereby return the PTPB 288 to the outward position thereof after that PTPB 288 had been depressed so as to activate PTTS 290. (Only some of the elements of each kind are marked in FIGS. 44, 45 in order to avoid clutter, and in FIG. 45 not all of the LEDs 298 are shown.)

Each PTPB 288 is labeled for a particular SPT 106 with both of the SPT 106 codes set out in Table XII, and in FIG. 44 the codes are shown for the SPTs 106 of two (A and B) LNs 102 within the push button outlines. Above that SPT 106 PTPB 288 array is a row of six more PTPBs 288 for enabling the A and B CPTs 104, and on both sides thereof space is provided for putting in information pertaining to the particular CT 284, e.g., the dimensions thereof or "CT 6." (This is not to suggest that there would be a number of different types of CT 284, but only that some may have been made having different array sizes or may be otherwise distinguishable.) Interspersed through the array and each PTPB 288 are pairs of LEDs 298, with one pair disposed adjacent on either side of each PTPB 288, one such LED 298 of the pair being connected to show a light if that PT 104 or 106 is enabled, and the second LED 298 being connected to show a light when there is a "1" bit signal thereon, i.e., the LN 102 to which the proximal end of an SPT 106 is connected has yielded a "1" bit at the DR 108 terminal thereof, that should appear both on the LN 102 terminal itself and on each of the SPTs 106 connected thereto.

Two voltage sources ($V_1$, $V_2$) and a GND line are disposed behind TF 286 (rightward in FIG. 45), with $V_1$ being the $V_{dd}$ source by which the PTTSs 290 operate, and $V_2$ the enabling voltage for the selected PTs. These are all shown end-wise in FIG. 45, but to avoid having unreadable clutter, no attempt is made to show all the complex wiring by which those lines connect either to the PTTSs 290 or indeed to the actual PTs. The configuration of that wiring, however, has been shown repeatedly in the various circuits herein, and should be clear to a person of ordinary skill in the art. The system as a whole is of course connected as well to a "Test Bed" (TB) 300 of the same form as that of a PS 100 or TA 124, and of a size to include whatever number of CTs 284 as had been conjoined as shown in FIG. 46 (sheet 23). FIG. 46 is an 8×8 array, thus to encompass 2×64=128 LNs 102, and of course as many of those arrays could be conjoined as there would be space available for them (and sufficient funds). (As in the case of the PS 100 and TA 124, the signal data by which the circuits structured will be tested will be sent separately, in this case to TB 300.) In any event, each PTPB 288 can be described as acting on a single "Control Unit" (CU) 302, of which just one is marked off by dashed lines at the top of FIG. 45, from which the enabling or disabling voltages will be sent to the CPTs 104 and SPTs 106 of TB 300. A CU 302 is made up of a PTPB 288, a PTTS 290, an LS 292, the two ELs 294, a PBC 296, and the two LEDs 298, and there is one such CU 302 for each CPT 104 and SPT 106.rt In addition, there can be provided separately a drawing in the form of a plurality of instances of the PS 100 template of FIG. 2 (sheet 2), in which (1) the lines between the LNs 102, along which appear the boxes in FIG. 2 that represent the SPTs 106 are shown connected the full distance between the particular LN 102 terminals; and (2) those SPT 106 boxes, CPT 104 circles have been replaced by LEDs. More aesthetically, each combination of an SPT 106 box and associated lines could be shown in an overlay with the lines between the LNs 102 being shown in the form of the wiring as seen in a circuit drawing, and the lines along which an SPT 106 had been enabled would be back lighted. The complete inter-LN 102 (or $V_{dd}$, GND or input) connections for a circuit would then be conspicuously displayed to the user (and others) when that backlighting was turned on.

The user, having previously drawn out a circuit of interest and then identified the CPTs 104 and SPTs 106 that would have to be enabled in order to structure that circuit, and perhaps a number of different variations thereof for comparative testing, could pass through those different circuits simply by selectively enabling the necessary PTs and thereby obtain an illuminated and indeed a working model of each such circuit simply by pushing a few buttons (or a "non-working" model if the circuit under test was in some way defective). Except when comparing different types of transistor or other element-dependent aspects of the circuitry, no faster or more efficient means for testing circuit designs would seem to be available, whether or not the circuit was otherwise intended for the Instant Logic™ domain. (That is, circuits intended for use in a μ-based system could still be tested using this IL-based system.)

In summary, within the Circuit Tester (CT) 284 and Test Frame (TF) 286, in each of those CUs 302, finger pressure on the PTPB 288 causes contact between the LS 292 that is disposed on the inner end of that PTPB 288 and a pair of ELs 294 on the inward face of the PTTS 290, and the resultant closure of the circuit between those two ELs 294 causes the PTTS 290 to switch from whatever "on" or "off" condition in which that PTTS 290 had been into the opposite condition. That new condition will remain in place until another activation of the PTPB 288 causes another switch in that condition. The change in condition just noted having been made, PBC 296 will return PTPB 288 back to its normal extended position, ready for use again when, say, a circuit just structured was to be de-structured. While the CT 284 has been shown in a 2-D form as applicable to a 2-D "Test Bed Array" (TBA) 304 as shown in FIG. 46 (sheet 23), it is evident that a 3-D version thereof, as well as the 3-D TB 300 with which that CT 284 would be employed, could also be constructed. When using discrete transistors, to develop a 3-D version would only require interconnection of two or more layers of a 3-D TB 300 with pass transistors, in the same manner as the operational transistors are interconnected within a layer.

Another point that needs to be made with respect to 3-D arrays is that of how the $LI_i$ of a node located somewhere in the interior of the array could be determined. Although it is easy enough to count off the nodes in the 3×3×3 array, it would be quite a bit more difficult to determine the $LI_i$ of an interior node in the 8×8×8 array of FIG. 52 (sheet 25). In order to be aware of which LN 102 one is actually seeking (it takes some familiarity with the geometry of a cube to know what the $LI_i$ is of the node just below or one plane inward from, say, the 278 $LI_i$), one must at least know its x, y, and z coordinates, and with those in hand the $LI_i$ value is easily obtainable.

The $LI_i$ of any LN 102 can be found in a 3-D PS 100 through the formula $$LI_i(x,y,z)=X_M(Y_M(z-1)+y-1)+x. \tag{9}$$

wherein the x, y, and z integers are the Cartesian coordinates of the LN 102 location, $X_M$ and $Y_M$ are the maximum axis lengths in the respective x and y directions, and the term on the left will be the respective $LI_i$ values being sought, i.e., $LI_i$=1, $LI_i$=2, $LI_i$=3, etc., on through to the highest value (in this case of an 8×8×8 array) of 512. When writing code lists for a 3-D environment, the $LI_i$ values of every LN 102 in the vicinity of those for which one had written the last code line must be known, thus to determine which LNs 102 surrounding those last encoded LNs 102 would be free for use and had not already appeared in some other code list at that same time. Equation 9 will provide those $LI_i$ values by separately incrementing by 1 each of the x, y, z coordinates of the LN 102 just located. Equation 10 can be used in a 2-D system by fixing z at 1, thus to yield $$LI_i(x,y)=X_M(y-1)+x. \tag{10}$$

The matter of using Instant Logic™ in a 3-D environment was only briefly mentioned earlier for future reference, since at that time there had not been given sufficient background in IL for the subject to be treated adequately, but now enough is known about IL that such analysis can be given. That will now be done by way of the XOR circuit, the basic iconic representation of which is shown in FIG. 47 (sheet 23), an expanded iconic version showing the subcircuits thereof in FIG. 48 (sheet 23), and a transistor-level version in FIG. 49 (sheet 23), with all three versions being from the prior art, and as to FIGS. 48, 49 seen in this construction to include an OR gate, an AND gate, and a NAND gate. (The XOR gate is one of those that can be constructed in several different ways.) A circuit drawing of the XOR gate is shown in FIG. 50 (sheet 23), and the IL-constructed version in FIG. 51 (sheet 24) as IL Circuit 8, so marked About FIG. 50, it need only be said that while it was asserted earlier that the IL circuit structuring will yield the exact same circuit as the prior art version, and it was in order to be able to confirm that fact that the prior art versions of each IL circuit have been shown, this XOR gate can now serve to illustrate the fact that while that assertion is true in the electronic sense, that need not be true in the physical sense. Specifically, it is evident that the IL version of the XOR gate in FIG. 51 has one more LN 102 than there are operational transistors in the prior art version of FIG. 50. In the prior art XOR gate of FIG. 50, the A and B transistors make up an OR gate, C and D an AND gate, E an inverter or NOT gate (to form the NAND gate in FIGS. 48 and 49), and the F and G transistors form the AND gate of those drawings. In FIG. 50 the output of the OR gate from the B transistor connects directly to the input to the upper transistor of that rightward AND gate, which is the G transistor, but in the IL version the H LN 102 is seen to intercede between those B and G transistors. The reason for having that extra LN 102 is of course that the construction of the PS 100 provides no diagonal connections that would allow the G LN 102 to be adjacent to the B LN 102 and, still allow direct connection thereto from the F LN 102 to form that AND gate. The PS 100 instead places an LN 102 between the B and G LNs 102, which is the H LN 102, which can then be structured into a BYPASS gate in order for the B LN 102 to make connection with the G transistor. How that comes about will be set out in the description of the IL-structured XOR gate that now follows.

The structuring of the XOR gate will be described in terms of the two dimensions as shown in FIG. 51 (sheet 24), but to provide further insight into the possibilities of IL, the LNs 102 used will lie in a particular "vertical" (x, y) slice of the 8×8×8 3-D PS 100 shown in FIG. 52 (sheet 25). The particular slice and the area within that slice in which the LNs 102 to be used are located was arbitrarily selected to be as shown by the underlined $LI_i$ numbers in Table XIV below, and is emphasized in FIG. 52 by a dark line marked by dark arrows labeled "a" that point to the 65, 72, and 128 $LI_i$s that constitute the three visible corners of the z=2 plane. (Also shown in FIG. 52 is a scattering of some of the Via1s 306 by which interplane connections would be made. Via1s 306, of which only a few are randomly shown or marked in FIG. 52, are required only in the z direction since the x and y connections will all be intraplane (Another via type used in specific types of IC will be distinguished later.)

To give a quick summary of an XOR gate, the complete structuring of the XOR gate of FIG. 51 (sheet 25) begins with an OR gate made up of LNs A and B, which are LNs 115 and 116 in the upper left hand corner of FIG. 51. Secondly, the C and D (123 and 124) LNs 102 that are respectively just below the A and B LNs 102 form an AND gate. Those two gates will receive the same two inputs since the C and D LNs 102 both connect to an external source through the 2 CPTs 104 thereof, and the GA 110 terminals thereof at which those inputs are received are connected through the respective 17 SPTs 106 (see FIG. 2, sheet 2, for the SPT 106 reference number) to the GA 110 terminals of the respective A and B LNs 102. The OR gate output is taken as whatever it may be, while the AND gate output first goes through the E LN 102 (125), which is configured as a NOT gate. The output of that inverter and OR gate go respectively to the F (126) and G (118) LNs 102, which together form another AND gate from which the output of the XOR gate is taken. The locations of those respective LNs 102 are shown in the following Table XIV, and the Code Lines for each LN 102 are shown in Table XV that then follows:

Table XIV

| $LI_i$ Numbers for an XOR Gate Structured in a 3-D PS 100 |
|---|
| 106 108 107 110 109 110 111 112 |
| 113 114 <u>115</u> <u>116</u> <u>117</u> <u>118</u> 119 120 |
| 121 122 <u>123</u> <u>124</u> <u>125</u> <u>126</u> 127 128 |

TABLE XV

Code Lines for an XOR Gate Structured in a 3-D PS 100

| | $LI_i$ | $IN_i$ | cccccc | ssssss | x | y | z |
|---|---|---|---|---|---|---|---|
| A | 115 | 01110011 | 000011 | 010101 | 3 | 2 | 2 |
| B | 116 | 01110100 | 010011 | 010101 | 4 | 2 | 2 |
| C | 123 | 01111011 | 001011 | 010111101010 | 3 | 1 | 2 |
| D | 124 | 01111100 | 011000 | 011010101010 | 4 | 1 | 2 |
| E | 125 | 01111101 | 010011 | 010110 | 5 | 1 | 2 |
| F | 126 | 01111110 | 001011 | 101011 | 6 | 1 | 2 |
| G | 118 | 01110110 | 010000 | 010110 | 6 | 2 | 2 |
| H | 117 | 01110101 | 000000 | 010110 | 5 | 2 | 2 |

The binary encoding for the A LN 102 as structured in the XOR gate, since the $LI_i=(115)_2$ =01110011 (using "|" lines to separate the "$IN_i$," "cccccc," and "ssssss" code entries), becomes 01110011|000011|010101. That code is made up of the index number ($IN_i$) code 01110011, the circuit PT code 000011 indicating that only the PT A(3) to GND has been enabled, and then the signal PT code is 010101, indicating that the one SPT 106 that has been enabled derives from the DR 108 terminal of the A LN 102, extends to the right, and connects to the DR 108 terminal of the next neighbor B LN 102. The codes for all of these LNs 102 are shown near to the respective LNs 102 in FIG. 51, and in Table XV above.

From the differences between the $LI_i$ numbers of the upper LNs 102 and of the lower LNs 102 just beneath each of the upper LNs 102 the length of the x axis of that PS 100 must be eight, as can be confirmed in FIG. 52 (sheet 26). In FIG. 52 it can be seen that as to all of the $LI_i$ codes listed in Table XIV, the circles are darkened in FIG. 52, the $LI_i$ values are underlined, those LNs 102 are all located within the second vertical plane going inward, and the coordinates therefor are shown in the last column of FIG. XIV.

As has been previously described, the code routers would have been configured so that the index number code router has been allocated eight bit spaces in order to accommodate the 8-bit binary code being used, then another six bits for the circuit code, and finally the signal code router has been configured to accept the six bits of a single signal PT code, but in the event that more than one signal PT of an LN 102 was to be enabled, as in the C and D LNs 102 above, spaces will also have been allocated for two more signal PTs to be enabled should that be the case, with that code being expressible generally as $IN_i$ ccccccssssss . . . , with the ellipsis allowing for more signal codes, or in more detail, and using the codes "ii," "jj," and "kk" as the separate "ss" signal codes, as:

$$[xxxxxxxx][cc_1][cc_2][cc_3][ii_1][jj_1][kk_1][ii_2][jj_2][kk_2][ii_3][jj_3][kk_3] \quad (11)$$

It is suggested that a consistent practice of treating both the circuit and signal codes in terms 2-bit entries might help to avoid human error, and also to aid in communicating such errors, as in, e.g., "there's an error in the second 'jj' code of the 211 LN."

Structuring of the B LN 102 then yields an A-B OR gate, using the code of Table XIV, which is 01110100|010011|010101, with the different portions of the code again being marked off by the "|" symbol. Examination of the B LN 102 in FIG. 51 shows the $IN_i$ code as 01110100, which is indeed $(116)_2$; that the 1 and 2 CPTs 104 are enabled, consistent with that 010011 code; and that the 4 SPT 106 that extends from the DR 108 terminal of the B LN 102 to the DR 108 terminal of the next (117) LN 102 is enabled, which is consistent with the first "ii" code 01 for an SPT 106 connecting from the DR 108 terminal; with the second "jj" code 01 which indicates that the coding is to go to the right: and with the third "kk" code 01 that calls for the SPT 106 to connect at its distal end to the DR 108 terminal of the LN 102 to the right.

The structuring of the AND gate begins with the C LN 102 (123) that lies in the array row that is just below the row containing the A and B LNs 102, specifically just below the A LN 102 (115). In both FIGS. 51 (sheet 25) and 52 (sheet 26) and Table XIV, the C LN 102 can be seen to be the 123 LN 102 in the 8×8 array slice being used. This C LN 102 provides one of the 2-bit AND gate inputs, for which purpose the 2 CPT 104 (code 10) is enabled, as is also the 3 CPT 104 (code 11) to GND. The code 01 $V_{dd}$ connection is not used, but that DR 108 terminal is instead connected to the SO 112 terminal of the D LN 102 through the C(6) SPT 106 so as to initiate the AND gate structuring. A second enabled SPT 106, C(17), extends from the GA 110 terminal of the C LN 102 to the GA 110 terminal of the A LN 102 as the first step in ensuring that the OR and AND gates receive the same inputs. Like the C LN 102 and the 2 and 3 CPTs 104 thereof, both of those SPT 106 connections are shown by darker boxes and lines, and the boxes themselves contain the number "1."

Just as the B LN 102 provided the $V_{dd}$ connection for the A-B OR gate, the D LN 102 provides the $V_{dd}$ connection for the C-D AND gate, not by a parallel connection as in the OR gate case but because of the series connection of the C LN 102 through the D LN 102 to $V_{dd}$, already seen to have been created by the C(6) connection between the C LN 102 DR 108 terminal and the SO 112 terminal of the D LN 102. The D LN 102 thus has both the 1 and 2 CPTs 104 enabled, as shown in FIG. 51 by the darker circle or box and interconnecting lines, and the numbers "1" within the enabled PTs. Enabling the 2 CPT 104 provides the second AND gate input, and the D LN 102 also has a D(17) connection that, in analogy to the C(17) connection, connects the D LN 102 input to the B LN 102 input. (The GA 110 terminal interconnections of the A-C LNs 102 and the B-D LN 102 inputs are labeled "a" and "b," respectively, for purposes that will be explained below.) The full codes for both the C and D LNs 102 require the use of formula (8) up to the second or $[ii_2][jj_2][kk_2]$ signal code, because of the second SPT 106 being used on both LNs 102, and as before the leading binary $IN_i$ code is shown for the C and D LNs 102 in Table XIV. The codes for the C and D LNs 102 thus include 8 +6 +6 +6 =26 bits.

The C-D AND gate output enters an inverter, the E LN 102 (125) through the D(5) SPT 106 from the D DR 108 terminal to the E GA 110 terminal, as can be seen by the darker lines and D(5) box, the latter also including the number "1." In the E LN 102 itself, the 1 and 3 CPTs 104 are enabled, as shown by darkened lines and circles, thus to provide both the $V_{dd}$ and the GND connection that establishes the inverter circuit. The E LN 102 uses the E(5) SPT 106 to connect to the F LN 102 (126) in the same manner as the D(5) was used to connect to the E LN 102, thus to establish the F LN 102 as the first LN 102 of another AND gate, the second LN 102 being the G LN 102 (118) that is reached by the F(15) SPT 106 from the DR 108 terminal of the F LN 102 to the SO 112 terminal of the G LN 102. The G(5) SPT 106 was then arbitrarily selected to show the XOR gate output being taken from the DR 108 terminal to connect to the GA 110 terminal of the next rightward LN 102.

As noted earlier, the output of the A-B OR gate requires the use of a BYPASS gate to reach the input to the second (G) LN 102 of this second AND gate. That will be provided by the H LN 102 (117) that, as shown in FIG. 24 (sheet 16), has but one PT thereon enabled, which is the H(5) SPT 106 from the DR 108 terminal of the H LN 102 to the GA 110 terminal of the G LN 102. The H LN 102 thus simply receives a signal on the DR 108 terminal thereof and passes that signal on to the next LN 102, the outward connection therefrom in this case going to the GA 110 terminal of the next LN 102 rather than to the DR 108 terminal thereof as was the case in the BYPASS gate of FIG. 24. The feature that defines a BYPASS gate is again not the SPT 106 connections themselves, but rather the fact that the LN 102 is not itself "powered up" but merely receives a signal which is then passed on to the next LN 102. By using that H LN 102, the outputs of both the A-B OR gate and the C-D-E NAND gate become the two inputs to the F-G AND gate. The proper functioning of the FIG. 51 XOR gate can easily be verified by a person of ordinary skill in the art by constructing a truth table therefor, which will be the same as that for the prior art XOR gate of FIG. 50 (sheet 24).

There still remains the need to get the XOR gate placed into a previously structured circuit so as to receive inputs from within the PS 100. As before, a second, rightward LN 102 of either an OR or an AND gate cannot receive an input from an LN 102 that was to the left thereof if that leftward LN 102 had already been used for another purpose, e.g., to connect to that LN 102 to the right in some different way, and that is the case in the XOR gate of FIG. 51. The way in which those connections are accomplished is to cause entry of the two XOR input bits onto the two input GA 110 terminals of one or the other of the OR gate or AND gate, while also making connection from those two GA 110 terminals to the two corresponding input GA 110 terminals of the other of the OR or NAND gate LNs 102, i.e., by the cross-connections shown as the vertical lines "a" and "b" of FIG. 51, but using external inputs through the respective 2 CPTs 104.

Line "a" is seen to connect from the GA 110 terminal of the C LN 102 in the lower left hand corner of FIG. 18 up to the GA 110 terminal of A LN 102 in the upper left corner of FIG. 51. The same type of connection is made by line "b" from the D LN 102 in the lower row of the column to the right of the C LN 102, up to the B LN 102 in the upper row of that same column, and the criteria stated above for the input circuitry of an XOR gate are then satisfied: the "a" line input bit appears on the GA 110 terminal of the LN 102 closest to GND in both the OR gate and the AND gate parts of the NAND gate, and the "b" line input bit appears on the GA 110 terminal of the LN 102 closest to $V_{dd}$ in both the OR gate and that AND gate.

It was elected to show the input bits as coming in to the AND gate, but those bits could as well have been shown to be coming in to the OR gate. However, what would permit the XOR gate to be structured to have only internal inputs is the fact that once those "a" and "b" lines have been established, it is not required that the two inputs arrive at the same type gate. That is, instead of having them both enter into the OR gate, or both into the AND gate, one can have the input coming in to one of each. For example, once the "a" line has interconnected the GA 110 terminals of a first LN 102 in the OR gate and a first LN 102 in the AND gate, it does not matter to which end of that "a" line the input may come in. An XOR gate that takes advantage of that fact and has only internal inputs is shown in FIG. 53 (sheet 27) as IL Circuit 9, so marked. (For easier readability and a more compact drawing, the full code lines shown in FIG. 51 are deleted from the XOR gate of FIG. 53.)

In the XOR gate of FIG. 53, therefore, one input enters the XOR gate through the AND gate, by way of the 0 LN 102 (122) that is in the column leftward of the left side of the XOR gate, in the same row as are the C and D LNs 102. The 0 LN 102 happens to be structured as an inverter, and has an output from the DR 108 terminal thereof to the GA 110 terminal of the C LN 102 within the XOR gate, which is the same location as one of the external inputs used in the XOR gate of FIG. 51.

(That internal input could as well have been shown simply by showing an internal input to the C LN 102, but it was thought to show the actual LN 102 within the PS 100 outside of the XOR gate in order to distinguish the different method required as to the second input now to be described.)

The second input to the XOR gate comes in from a source within PS 100 by way of the K LN 102 (108) in the top row of the PS 100 of FIG. 53. Using the model wherein the LNs 102 can connect upward but not downward, the required connection would have to be made by the same kind of "reverse" connection as was used in the hypothetical circuit of FIG. 12 (sheet 10), which in the present case means using the B(16) SPT 106 from the GA 110 terminal of the B LN 102 to the DR 108 terminal of the K LN 102. (Again, the connection is made upward, but the signal flow is downward, from the K LN 102 to the B LN 102.) That location within the XOR gate is not the same location as was used by the second external input to the XOR gate of FIG. 51, but is at the opposite end of line "b" that does connect to that same location, and hence serves just as well.

This last aspect of the XOR gate essentially grounds our the basic information known at present about Instant Logic™, but there are other issues yet to be treated, having to do either with more complex methods of using IL or ways in which more computing power (CP) can be extracted from an ILA. One issue that was mentioned earlier relates to the use of a circuit drawing on paper as the starting point for structuring that circuit. For that purpose, FIG. 54 (sheet 27) shows the usual circuit drawing from the prior art of a "Common Latch" (CL) 308, and it will be demonstrated that to base the structuring of an IL circuit on the usual drawing of that circuit may not always be the best way to proceed. The difficulty that arises from relying on the standard gate level CL 308 of FIG. 54 (sheet 27), or specifically in structuring LNs 102 so as to match up with the transistor-level circuit of FIG. 55 (sheet 27), is also made difficult by attempting to restrict the IL structuring in FIG. 56 (sheet 27) of the latch 308 to two dimensions, marked as Circuit 10, thus allowing no bridges, so the line cross-over seen in the standard CL 308 drawing of FIG. 54 (sheet 27) must be accomplished some other way.

In FIG. 54, CL 308 is seen to be made up principally of a 1NAND gate 310 and a 2NAND gate 312, as so numbered therein. The "S" input 314 to CL 308 is on the first input to 1NAND gate 310, and the "Q" 316 output of CL 308 is the output of that 1NAND gate 310, while the "R" 318 input to CL 308 is on the second input to 2NAND gate 312, and the "Q'" 320 output of CL 308 is the output of the 2NAND gate 312. (In these figures, the Q' output is shown in the normal fashion as a "Q" with a bar over the top, but with no such font being available, in this text the two inverted Q outputs are distinguished instead by an apostrophe on the "Q.") The feedback action of CL 308 comes from having the second input to the 1 NAND gate 310 connected to the Q' output of the 2NAND gate 312, and similarly the first input to the 2NAND gate 312 is connected to the Q output of the 1NAND gate 310.

In the IL-structured version of CL 308 in FIG. 56 a more simple depiction is employed than had previously been used, showing only the SPTs 106 and associated lines that are in use, while showing all of the LNs 102 and the "1" and "3" CPTs 104 and associated lines, with those in use in dark print and those not used in light print. Since the circuit is not associated with any particular PS 100, no number designations are used for the LNs 102, but only letters. A grid is added for quick numeric identification of the LNs 102, with the column numbers being given in the upper right corner of each "cell" and the rows being indicated in the lower right corner of each cell. This IL-structured version of the CL 308 of FIGS. 54, 55 shows the "A," "B," and "C" LNs 102 in the second row of FIG. 56 as forming the 1 NAND 310 gate by way of a 6 SPT 106 connection from the DR 108 terminal of the "A" LN 102 to the SO 112 terminal of the "B" LN 102, from which the inverter to form the 1 NAND 310 gate is formed by a 5 SPT 106 connection from the B LN 102 DR 108 terminal to the GA 110 terminal of the "C" LN 102. Enabling the 4 SPT 106 of the "C" LN 102 then provides both the "Q" output of that 1NAND 310 gate and a first connection onward towards the first input to the 2NAND 312 gate. The "S" 314 input to CL 308 is on the first input to the 1 NAND 310 gate. (The destination of the "Q" output is not specified, but of course would be a next LN 102 that as part of some circuit required that datum, such circuit to be structured at the time that the datum was needed. If it were actually the inverse of the CL 308 content that was required, that circuit would instead be structured so as to receive the "Q" output of CL 308 from the 2,4 or "H" LN 102.)

Since it happens that there are only two LNs 102 intervening between the output of the 1NAND 310 gate and the first input to the 2AND 312 gate, it is assumed for the purpose of the present discussion, and also in order to show the contrast between this first "feedback" connection and the second such connection to be noted later between the 2NAND gate 312 output and the second input to the 1 NAND 310 gate, that such a span between LNs 102 would not degrade the level of a signal bit to an extent that would require amplification. Consequently, the connections required were made through BYPASS gates so as to save power. Those LNs 102 are in row 3, which was interposed between the two NAND gates in order to provide those "stepping stones' between the two NAND gates. The D LN 102 lies just above the 3,4 or "G" LN 102, which is the first input to the 2NAND 312 gate, so that first BYPASS connection is initiated by way of the 16 SPT 106 of the 3,4 or "G" LN 102, i.e., from the GA 110 terminal thereof up to the DR 108 terminal of the 3,3 or D LN 102, that first BYPASS gate then being completed by enabling the 4 SPT 106 of that 3,3 LN 102 that extends from DR 108 terminal thereof to the DR 108 terminal of the 2, 3 or E LN 102. The second BYPASS gate is completed by enabling the 13 SPT 106 of the 2,3 or E LN 102 that extends from the DR 108 terminal thereof up to the DR 108 terminal of the 2,2 or C LN 102, on which the "Q" output from the 1 NAND gate is produced, thus to provide the first feedback connection between the output of one NAND gate and an input to the other NAND, specifically from the "Q" output of the 1 NAND 310 gate to the first input to the 2NAND 312 gate.

The 2NAND 312 gate lies in the fourth row of the PS 100 excerpt, and is formed from the F, G and H LNs 102 in the same manner as was the 1 NAND 310 gate from the "A," "B," and "C" LNs 102, with the "F" LN 102, which is the second input to the 2NAND 312, receiving the "R" input to CL 308. The "Q'" output of CL 308 is provided at the output of the 2NAND 312 gate, and is also to provide the second feedback connection in CL 308, namely, to the second input to the 1NAND 310 gate. Unfortunately, there is no quick route for this second feedback connection so long as the structuring is maintained within a single level, with the only option then being to "loop around" the rest of the circuit to reach that 4,2 LN 102, which is the second input to the 1NAND 310 gate. Another row to provide "stepping stones" could have been interposed between row 4 in which the "Q'" output is located and that first "stepping stone" row 3, but that of course would have this second feedback connection being blocked by the first feedback connection, which of course is precisely the "cross-over" problem. There are then only two other routes that could be taken, both involving looping around the rest of the circuit, one of which would be to drop down to a new row 5 from that "H" LN 102, turn left over to a new column 5 and then go up the left side of the circuit, but as can be seen a Column 1 has already been provided that allows a shorter route that goes up the right side of the circuit, and that route is taken instead.

Unfortunately, as shown in FIG. 56, that shorter route encloses the "S" input to CL 308, for which there would be no access without using a second level. That blocking of the "S" input would be avoided if the first loop mentioned above were used, i.e., to extend down, then leftward, and then up the left side of the drawing, since the 3,1 LN 102 would be available for use from the 3,2 LN 102 at which the "S" input is located. That loop going up the right side also encloses the "Q" output of CL 308 (although leaving the "Q'" output with outside access), that would likewise be provided with access outside of the circuit if that right side loop were not used. However, that first route mentioned, i.e., down from the 2,4 LN 102, then left, and then up the left side, would enclose the "R" input as well as that "Q" output. With the use of a second layer evidently being required in either case, the feedback route shown in FIG. 56 becomes the preferred structure since that route requires two fewer LNs 102 than the alternative. (Were a second layer (i.e., a third dimension) been available, there would have been no need to route any feedback loop around the circuit in the first place.)

As a consequence, in the preferred (if confined to one layer) structure of FIG. 56 the 5 SPT 106 from the DR 108 terminal of the "H" or 2,4 LN 102 (the "Q" 320 output) connects to the GA 110 terminal of the "I" or 1,4 LN 102, with the 13 SPT 106 on the DR 108 terminal thereof then extending up to the DR 108 terminal of the "J" or 1,3 LN 102. That "I" LN 102 then becomes the first inverter of two inverter pairs that along with some BYPASS gates first extend upward, then leftward across the top of the circuit, and finally down one row to the GA 110 terminal of the "A" or 4,2 LN 102, which is the second input to the 1 NAND 310 gate. The inverters as the Receiving Transistors (RT) each receive an input to the GA 110 terminals thereof, and then as the Originating Transistors (OT) connect from the DR 108 terminal thereof to each next LN 102, i.e., to the GA 110 terminal thereof if that LN 102 is to be an inverter, or to the DR 108 terminal thereof if that LN 102 is to be a BYPASS gate. On the "J" or 1,3 LN 102 the output is taken from that same DR 108 terminal as a BYPASS gate to connect through the 14 SPT 106 thereof to the GA 110 terminal of "K" or 1,2 LN 102, which is to be an inverter.

Upon reaching the DR 108 terminal of the 1,1 LN 102 using the 13 SPT 106 of the "K" LN 102, that procedure is repeated across the top of FIG. 56 to the 4,1 or "0" LN 102, except now using the 4 SPT 106 to reach a DR 108 terminal from a DR 108 terminal and the 7 SPT 106 to reach a DR 108 terminal from a GA 110 terminal, with the "M" and "N" LNs 102 serving as inverters and the "L" and "0" LNs 102 serving as BYPASS gates. (Which LNs 102 were used as inverters and which as BYPASS gates is immaterial, so long as there resulted an even number of inverters through the length of the path that were reasonably distributed along the path, i.e., having no long stretches of BYPASS gates that might bring about too much signal loss.) The 4,1 LN 102 uses the 16 SPT 106 on the GA 110 terminal of the "A" or 4,2 SPT 106 therebelow to connect upward to the DR terminal of that 4,1 LN 102, thus to complete the second feedback connection from the "Q'" output of the 2NAND 312 connects to the second input to the 1NAND 310.

In the foregoing treatment of latch 308 and FIG. 56, the comments as to whether the structuring of the circuitry was taking place along the direction of signal flow or opposite thereto were noted only as a matter of passing interest, since that issue has no real bearing on the functioning of the circuit. (In an SPT 106 description given above, especially with reference to FIGS. 44, 45 (sheet 22), it is acknowledged that, strictly speaking, a PT has no direction, so that in spite of that prior use of that "from . . . to" terminology, all that really occurs is that an SPT 106 is used that connects between the two desired terminals.) In the first feedback loop that employs only BYPASS gates, such matters are particularly unrelated to the circuit performance, since not employing any electronic function of the LN 102 itself other than a connection point, BYPASS gates are likewise bidirectional, having no obligatory direction of signal flow. In structuring the second feedback loop, however, in which the length of the feedback loop was thought to require the use of pairs of inverters in order to maintain the signal level, care must be taken to ensure that the inverter orientations are directed in the same direction as the signal flow, i.e., connecting between the DR 108 terminal of the "upstream" LN 102 as the OT to the GA 110 terminal of the "downstream" LN 102 as the RT, since otherwise the circuit would not operate.

FIG. 57 (sheet 28), which is marked as Circuit 11, shows an IL-structured version of the CL 308 of FIG. 56 but to which a third dimension, i.e., a second, upward level, has been added to the IC. In FIG. 57, the first or lower level in the 3-D PS 100 is on the left as shown by the label, and includes the 1NAND 310 and 2NAND 312 gates along with one of the feedback loops, i.e., that from the "Q" 316 output of the 1 NAND 310 gate to the first input to the 2NAND 312 gate. In other words, the lower level in FIG. 57 duplicates what was shown in FIG. 56 except that the second loop shown therein was removed, with that connection then to be made instead in the upper or second level of the IC on the right in FIG. 57, as again shown by the label therewithin, which includes only the second feedback loop from the "Q'" output of the 2NAND 312 to the second input to the 1 NAND 310 gate, but still showing all of the LNs 102 and associated lines but in the lighter print. Those parts of FIG. 57 that are the same as those of FIG. 56, including the LNs 102, will bear the same reference letters, but new numbers will be applied to the mechanism by which connection is made between the two levels. In this particular CL 308 circuit, it happens that no LN 102 in the upper level is used other than as a BYPASS gate, so no LN 102 power is used in that upper level circuitry. (That is, signal data are indeed transmitted through that second level circuitry, but the impetus for so doing, i.e., a $V_{dd}$ source, derives from the lower level. Caution might indicate that two of the LNs 102 in that loop, e.g., the "D" and "E" LNs 102, should be made instead into inverters.)

As to additional LNs 102 being added for purposes of the feedback loops, only two BYPASS gates are used in the lower level for the first feedback loop, which are the "D" and "E" LNs 102, but with three BYPASS gate needing to be used to form that second feedback loop in the upper level, which are again the "D" and "E" LNs 102, plus one more LN 102 that previously had been unlabeled but is now given the designation "P" (following the last letter used in FIG. 56), that lies just below the "A" LN 102. For the first loop in the lower level the DR 108 terminals of the "D" and "E" LNs 102 are used, and the same terminals of the LNs 102 having those same letters, plus that third "P" LN 102, are used for the second loop in the upper level. These are of course different actual LNs 102, being in the upper level, so there will at least be no direct interference between the loops. This use of a 3-D PS 100, instead of 2-D, thus permits the number of LNs 102 that must be added in order to incorporate those feedback loops into the circuitry to be reduced from nine in the 2-D PS 100 to five in the 3-D PS 100.

The construction of ICs having more than one level will be described further below, but one method of so doing will be set out here so as to make clear how the structuring of an IL circuit can be carried out between levels, as shown in FIG. 57. There are a number of different ways in which a "vertical" IC can be made (see, e.g., George Lawton, "The Lowdown on High-Rise Chips," *Computer*, October 2004, pp. 24-27), but for present purposes, rather than selecting some particular technology, only a simple operational model of a rather generic nature will be shown. There are really only two different general approaches to the construction of multi-level ICs that could be taken, which are to (1) construct only single level ICs that would have all of the transistors and wiring appropriately disposed in various layers in the usual manner, but also having a pattern of interconnect nodes on the surface thereof that would make the required contacts when one such IC was placed atop another; or (2) constructing a composite IC that had the multi-level circuitry built in. This inventor cannot pretend to address multi-level ICs in any great detail, but for the purposes of this application it is only necessary to show that multi-level ICs can be built and used, with some kind of interconnect means between those levels having been provided, but with the precise manner of so doing having no bearing on the subject of Instant Logic™ as such. The approach taken here, then, will simply be to postulate some generic means of making such interconnections, with a further slightly more detailed description, including drawings, to be given later in this text.

Controlled connection between levels could come about, for example, by first providing an "Interconnect Pass Transistor" (IPT) 322 disposed between a particular LN 102 terminal and a conductive Plate 324 within the surface of the level that is associated with that terminal, and secondly through the disposition of a conductive Post 326 from the level below that is in contact with that Plate 324. A similar arrangement would be established at the lower end of that Post 326, whereby contact would be made through another IPT 322 that extends between the lower level Plate 324 and the terminal of the LN 102 of that level that corresponds to the upper LN 102. In short, the Post 326 that originates in the lower level is in physical and electrical contact with a Plate 324 at each end thereof, i.e., in both levels, and in each level there is an IPT 322 disposed between the Plate 324 located near the selected terminal and that terminal itself, which IPTs 322 must then be enabled in both levels in order to establish electrical contact between those upper and lower terminals. Upon assuring that there were unused LNs 102 available for further structuring around the upper level LN 102 to which contact to a terminal thereof was to be made, circuit structuring that had been blocked by other circuits in the lower level could then be continued in that upper level. Typically, that upper level circuitry would then be connected back down to the lower level in the same manner.

It should be noted also that in any multi-level arrangement, that upper level as was just discussed would likewise have a Post 326 extending up to a third level, so the question arises as to whether that new upwardly-going Post 326 could use the same Plate 324 as was used by that first Post 326 coming up to that second level. If that construction was to be used, then that second Post 326 that extended up to the third level would bear the same signal as had been brought up to that second level by that first Post 326. That would not in itself place that signal onto any Level 3 circuitry as such, without having enabled the Level 3 IPT 322, but would still have created an "antennae" of that second Post 326 that could be a source of interference or cross-talk. At certain operating frequencies that circumstance could be troublesome, but at "computer" operating frequencies, and particularly those of an Instant Logic™ Apparatus (ILA), it is likely that such interference would not occur to any appreciable extent. This matter is thus mentioned only as something to be kept in mind in the design and construction of an ILA (that after all might well be sought to operate at wide ranges of frequencies).

Before pursuing that matter of interconnecting levels any further, however, there is yet another aspect of the common latch to be considered, and one that brings out the importance of giving careful study to the circuit about to be structured. In FIG. 58 (sheet 29) there is shown a version of the CL 308 of FIG. 54 that is electronically identical (i.e., all of the wires connect to exactly the same nodes), but has one of the NAND gates pointing in the opposite direction. As "Reverse Latch" (RL) 328, this circuit has a "First Reverse NAND" (1RNAND) 330 gate facing to the right and a "Second Reverse NAND" (2RNAND) gate 332 facing leftward, with the "Reverse S" (RS) 334 input coming in to the first input to the 1RNAND 330 gate in the same manner as in CL 308, and likewise the "Reverse Q" (RQ) 336 latch output comes off as the output of that 1 RNAND 330 gate.

In the lower row of the FIG. 58 circuitry, the "Reverse R" (RR) 338 input to the latch is seen to come in as the second input to the 2RNAND 332 gate just as in the CL 308 of FIG. 54, with the "Reverse Q" (RQ') 340 output of RL 328 again being the output of the second NAND gate, i.e., of 2RNAND 332. There only remains then to provide the two feedback loops to have structured this RL 328, which though differing in appearance from that of the CL 308, is functionally and electronically identical therewith. There will be seen a substantial difference in what is required to form those feedback loops, however, and indeed such as to require no BYPASS gates at all.

The IL structuring of RL 328 is shown in FIG. 59 (sheet 29), marked as Circuit 12, which besides showing that difference in direction of the 2RNAND 332 gate, also shows that the "F," "G," and "H" LNs 102 thereof have been shifted in position by one cell to the right. As a result, as to both feedback loops the two LNs 102 that need to be connected together have come to be immediately facing one another, so only the usual direct connection between one LN 102 and another need be made.

In the structuring of the RL 328 in FIG. 59, it may be noticed that the LNs 102 in the lower row have been reversed in orientation so as to put the receiving terminals on the right, which among other things is much more convenient for right-to-left structuring following the signal path. The real importance of that change, however, derives from the effect then had on the structuring process. That change in the drawing will have no effect, of course, on the LNs 102 as they are fabricated in the PS 100, and the directions in which the SPTs 106 between an OT and an RT remain left-to-right and upwards, so the number designations must remain as before. Between the "E" and "D" LNs 102 in row 2, for example, the SPT 106 extends from the SO 112 terminal of the leftward "E" LN 102 to the rightward "D" LN 102, through a 10 SPT 106. Similarly, the connection from the "F" to the "E" LN 102 is not from a DR 108 to a GA 110 terminal but rather from the GA 110 terminal of the "F" LN 102 to the DR 108 terminal of the "E" LN 102, using the 7 SPT 106 of the "F" LN 102. Beyond that difference, the structuring of the FIG. 59 circuit is quite standard.

The "A" or 4,1 LN 102 is structured as a second input to an AND gate, i.e., with a 6 SPT 106 extending from the DR 108 terminal thereof to the SO 112 terminal of the "B" LN 102 to the right, and with no $V_{dd}$ applied. That "B" or 3,1 LN 102 is likewise structured as the first input to an AND gate, having the 5 SPT 106 thereof extending to the GA 110 terminal of the next rightward "C" or 2,1 LN 102. The assumption is then made that the RQ 336 output therefrom will go to a DR 108 terminal of a next LN 102, so the 4 SPT 106 is seen to connect out from the DR 108 terminal of that "C" LN 102, although the "Q" (or here, "RQ") output of a latch could be extracted to go anywhere.

In the second row, and structuring leftward as noted above, the "E" and "D" LNs 102 are connected by the 10 SPT 106, which has the DR 108 terminal of the "upstream" LN 102 connecting to the SO 112 terminal of the "downstream" LN 102, as is appropriate for a second input to an AND gate, and again with no $V_{dd}$ applied. The DR 108 terminal of the "E" LN 102 then connects to the GA 110 terminal of the "F" LN 102 as is appropriate for an LN 102 acting as a first input to an AND gate that is going into an inverter to form a NAND gate, and with $V_{dd}$ applied as the voltage source for both of the "E" and "D" LNs 102, but through the 7 SPT 106 of the "F" LN 102.

What then becomes important from this altered manner of representing the latch is the manner of forming the two feedback loops. By a comparison of FIGS. 54 and 58, it can be seen that the cross-over in the former drawing comes about only from the decision to show the two NAND gates pointing in the same direction, while in FIG. 58 with the two NAND gates facing in opposite directions, there is no cross-over. The gain from selecting the latter circuit for use is not limited to the context of Instant Logic™, of course, but would apply equally as well in the context of conventional electronics, since if bridges or the like had been used to carry out that apparent crossover, that would have been a needless expense.

To gain full advantage from that change in IL, that change also requires a shift in the positioning of the second NAND gate: while the 1RNAND 330 is structured in Columns 4, 3, and 2, the 2RNAND 332 is structured in the 4, 3, 2, and 1 Columns (with an intervening BYPASS gate in Col. 3), as a result of which the RQ 336 output of the 1 RNAND 330 gate is located in Column 2, just above the "E" or 2,2 LN 102 that is the first input to the 2RNAND 332 gate to which that RQ 336 must connect. There is one BYPASS gate that must be used, however, in that the RQ' 340 output of the 2RNAND 332 gate from the "F" or 3,2 LN 102 would not lie below the "A" or 4,1 LN 102 that is the second input to the 1 RNAND 330 gate to which that RQ' 340 output must connect, so instead of having that RQ' 340 output appear at that 3,2 LN 102 location, that LN 102 is made into a BYPASS gate that moves the RQ' 340 output LN 102 over to the 4,2 LN 102 position, that does lie just below the second input to the 1 RNAND 330 gate, as required.

The connections are made firstly by using the 16 SPT 106 of the "E" or 2,2 LN 102 to reach from the GA 108 terminal thereof to the DR 108 terminal of the "C" or 2,1 LN 102, which makes the connection from the output of the 1RAND 330 to the first input to the 2RNAND 332. Then the 4 SPT 106 is extended from the DR 108 terminal of the "F" or 3,2 LN 102 to receive the RR 338 input from the "D" or 1,2 LN 102, after which the 7 SPT 106 on the GA 110 terminal of the "G" or 4,2 LN 102 extracts that signal from the DR 108 terminal of the "F" or 3,2 LN 102, and then uses the 14 SPT 106 on the DR 108 terminal of that "G" or 4,2 LN 102 to carry the RQ' output of the 2RNAND 332 up to the GA 110 terminal of the "A" or 4,1 LN 102, which is the second input to the 1RNAND 330 gate, as required. Only one BYPASS gate was required, which totals to seven LNs 102 in this IL structuring of a common latch, which now is only one LN 102 more than the six LNs 102 in the conventionally fabricated latch, whereas in the prior structures had required nine extra LNs 102 in the first, one-level structuring example and five extra LN 102 in the second, two-level structuring. Also, the structuring of this "Reverse Latch" 328 was easily carried out within a single level.

Turning now to a more detailed look at those inter-level connection mechanisms, FIGS. 60 and 61 (both sheet 30) present the two such IC structures suggested earlier, i.e., the "Two Level, Six Layer Vertical IC" (2,6V(C) 342 of FIG. 60, and the "Two Level Seven Layer Vertical IC" (2,7VIC) 364 in FIG. 61 (both sheets 30). The 2,6VIC 342 has two "One Level, Three Layer Vertical ICs" (1,3VICs) 344 joined together by way of Plates 324 and Posts 326, while the 2,7VIC 364 has already had the two three-layer IC structures joined together using a plate and post structure that encompasses all seven layers, the seventh layer being an extra dielectric layer interposed between those two 1,3VIC 344 structures.

One set of possible layers in the two 1,3VICs 344 is shown in FIG. 60 as a "One Level First Transistor Layer" (1TL1) 346, a "One Level First Dielectric Layer" (1DL1) 348, a "One Level First Connection Layer" (1CL1) 350 in the first 1,3VIC 344, and then in the second 1,3VIC 344 a "One Level Second Transistor Layer" (2TL1) 352, a "One Level Second Dielectric Layer" (2DL1) 354, and a "One Level Second Connection Layer" (2CL1) 356, the functions of each of which will be known to a person of ordinary skill in the art, the only difference being that there are two sets of the transistor, dielectric and connection layers for the purpose, as will be explained below, of being able to place the LNs 102, CPTs 104, and the IPTs 322, Plates 324, and Posts 326 of this PS 100 version into one physical level, with the SPTs 106 being placed in a second physical level. (The "1" on the acronym signifies only that this was the first structure discussed.) There are also provided a number of Vias 358, with the Plate 324 and Post 326 that were shown in top plan view in FIG. 57 (sheet 28) now being shown in a side elevation view. (In terms of the structuring of circuits, those two physical levels will be seen below to constitute just one "structuring level.")

This side view of the 2,6VIC 342 permits illustration of the manner in which connection would be made between the two levels, one placed above the other. At the lower end of Post 326 there is a Bead 360 and at the upper end a Recess 362 within Plate 324. If one 1,3VIC 344 is placed atop another as in FIG. 60, the Beads 360 shown on the lower surface of the upper 1,3VIC 344 are fitted into the Recesses 362 within the Plates 324 on the upper surface of the lower 1,3VIC 344, thus not only to provide inter-level connection but also to aid in proper registration of the two ICs. That arrangement, as could also be carried out using the IC of FIG. 61, will leave the 1CL 350 connection layer of the lower 1,3VIC 344 facing onto the 2TL1 352 transistor layer of the upper 1,3VIC 344, but the Bead 360 and Recess 362, as seen in the 2,6VIC 342 itself in FIG. 60, are sized so as to leave an air gap between the two 1,3VICs 344 so there should be no electrical interference between the two.

As to the 2,7VIC 364 of FIG. 61, that structure is essentially the same as that of the 2,6VIC 342 of FIG. 60 except for being a composite structure having a single Post 326 at each location that encompasses all seven layers at the outset, and in using an extra dielectric layer. The lower LVICL 366 and upper UVICL 368 levels in the 2,7VIC 364 are each made up three layers, with the LVICL 366 being made up of a "Two Level First Transistor Layer" (1TL2) 370 at the bottom of the level, then a "Two Level First Dielectric Layer" (1DL2) 372, and then a "Two Level First Connection Layer" (1CL2) 374.

Interposed between the LVICL 366 and the UVICL2 368 there is an "IC Dielectric Layer" (ICDL) 376 in place of the air gap in the FIG. 60 structure. The UVICL2 368 is similarly made up of a "Two Level Second Transistor Layer" (2TL2) 378, a "Two Level Second Dielectric Layer" (2DL2) 380, and a "Two Level Second Connection Layer" (2CL2) 382. From the "generic" description of a two-level IC now to be set out, any person of ordinary skill in the art of multi-level ICs would certainly be able to structure such an IC using the particular multi-level technology with which that person was most familiar.

Although as noted earlier, for every LN 102 in any PS 100 extract that is present in one physical level of a vertical IC, by which is meant that the PC 100 extract in question is disposed above or below another "matching" PC 100 extract (i.e., having the same layer sequence), as to which electrical connection is to be made between selected terminals of two LNs 102 by way of conductive posts, given that terminals only connect to terminals, each terminal towards which such a post is directed must have some means for making an electrical connection between the post and the terminal. If as here there is to be a permanent connection between the posts of one level and some "conductive element" (actually Plate 324 as will be seen below) in another level, there could be no permanent electrical connection between the terminals of the LN 102 in a level and either that plate or the post itself since otherwise, when the LN 102 in question were put to use in a circuit on either level, both Plate 324 and Post 326 would interact capacitively and inductively with the surrounding circuitry and with GND. That would be the equivalent of a relatively enormous antenna, or at least a large reactance burden.

Such a connection to Plate 324 and Post 326 (that are both physically and electrically interconnected when the two levels are brought together) would result in a substantial increase in the capacitance of that terminal. (Even a "floating" post and plate not electrically connected to anything would have some effect on the local capacitance, but that would be unavoidable.) As is well known, the speed of an LN 102 is dependent in part on the RC time constant thereof, and with the highest speed possible being one of the goals of Instant Logic™, everything that can be done to enhance that speed should be done, especially as to such fine points as the RC time constant of a circuit, that can sometimes be overlooked. However, the way in which permanent electrical connection between the post and plate and the LN 102 terminal associated therewith is avoided but such connection is then brought about when needed, will now be explained "in the rough."

Again as to both the 2,6VIC 342 and 2,7VIC 364 of FIGS. 60 and 61, respectively, passing vertically through the structure are a number of Vias 358 much like those Via1s 306 shown in FIG. 52 (sheet 25), and will serve in a 3-D Instant Logic™ Array or PS 100 in the same way as in the current IC art, but since there will likely be many more inter-level interconnections to be made in IL, there will also likely be many more Via1s 306 (or Via2s 358) to be provided. (In FIG. 52, there not yet being any detailed discussion of 3-D architectures, those Via1s 306 were shown for the purpose of illustration only. The reason for distinguishing between the two different via types is that the FIG. 52 structure could well consist of separate planes, stacked up together by separate mechanical means with spaces in between, so that exact registry of the vias of the different planes would not be required, but here, where the different levels are in immediate juxtaposition, very precise registration would be required.) However, the preferred mechanism in this present context would be by way of the Plates 324 and Posts 326 shown in FIGS. 60 and 61 (sheet 30). These are solid, electrically conductive posts that would aid in the stacking of the "vertical" ICs to be discussed below one atop the other, in proper electrical connection when required, as will also be explained below. (The Via2s 358 are also left present since in any 3-D architecture, there will also be $V_{dd}$, GND, and other connections needed that will reach through a plane to other planes yet deeper into the architecture, and the vias provide the means for so doing, by passing wires therethrough.)

At the lower end of each Post 326 there is a Bead 360, i.e., an extension of Post 326 beyond the lower edge of the VIC, and around each Post 326 there is a Plate 324 having a corresponding Recess 362, which is literally a slight "dip" or indentation into the upper surface of Plate 324 into which will fit the Bead 360 of a VIC2 322 thereabove. As an aid in obtaining the most accurate registration, both Bead 360 and Recess 362 can be V-shaped, convexly as to Bead 360 and concavely as to Recess 362, as seen, for example, in U.S. Pat. Nos. 5,848,687 and 6,307,830 issued to Shultz, wherein that technique is used on a protective ring for stacking compact disks (CDs), or perhaps in the present case Bead 360 could be shaped as a point or "V," and Recess 362 a matching indentation.

The actual electrical connection is made by enabling the IPTs 322 that are disposed in both levels between each particular LN 102 terminal and a corresponding Plate 324 that is in contact with the Post 326 from the IC level below. In the usual 6-bit "$s_1s_1s_2s_2s_3s_3$" signal code for the selection of an SPT 106 to be enabled, the "$s_2s_2$" pair, which is the "direction code," would use the "11" code to designate the "z" direction for the structuring as described earlier, but rather than just identify the direction so that the desired set of DR 108, GA 110, and SO 112 SPTs 106 from which selection would then be made using the $s_3s_3$ code, that code would also enable those IPTs 322, i.e., in both the lower and upper levels. The "$s_2s_2$" code would indicate that the Post 326 located near to that one of the "originating" DR 108, GA 110, or SO 112 terminals as had been selected by the $s_1s_1$ code was to be used, and a second consequence of entering that "$s_2s_2$=11" code would be that "1" bits would be sent to the IPTs 322 both in the level in question and in the level thereabove that are associated with the selected terminal.

Once in that upper level, however, it then remains to select the direction within that upper level in which the structuring is to proceed, i.e., rightward or upward, so besides having used that "11" code to enable the relevant IPTs 322 so as to reach that upper level, a second direction code must be used to identify whether the set of SPTs 106 in that upper level from which a particular DR 108, GA 110, or SO 112 terminal is to be selected will be to the right or above (in the paper) the active LN 102 and Post 326 in that upper level. With those being the only possible choices, that direction code would now only need to have one bit.

There is no question about the "z" direction (+or−) in which to connect, since the "$s_2s_2$ =11" code is made to extend only in the positive direction, just as the "01" and "10" codes for the rightward and "upward" directions (on the paper) in the originating level designate only positive directions. (If connection was to be made by a post coming up from below the level in question, that would have been effected by the use of code in that lower level. That is, if a "1" lower level was to transmit a signal "up" to a higher "2" level, the signal code for the particular LN 102 in level 1 would have used the "$s_2s_2$ = 11" code.) There is also no question as to which LN 102 is in which level, since even though the two LNs 102 will bear the same coordinates in terms of column and row as will be described below, these are still LNs 102 in a PS 100 in which each LN 102 has its own $LI_i$ and $IN_i$ numbers for identification. How all that is worked out will be explained below after the "mechanics" of the connection process itself have been fully resolved.

It should be noted that "activating" a Plate 324 so as to be able to send a signal upward through the Post 326 of a VIC to another VIC thereabove will also place that signal onto the post of any VIC that was connected to that originating VIC from below, since the joining of the two levels is indeed made by contacting the lower Post 326 to the upper Plate 324, thereby to create in that lower VIC that source of possible interference through capacitive effects mentioned earlier. However, if there were little if any electronic events taking place within that lower VIC in the vicinity of the post that had so been activated, the "damage" caused could be minimal. Even so, any metal or other conductive material at all that was near that post, whether being employed electronically or not, could have some effect on the behavior of that post in the originating VIC thereabove, but one could only assume (and reasonably so) that such effect would be insubstantial.

The same interconnect mechanism used with reference to the 2,6 VIC 342 is employed in the 2,7VIC 364 shown in FIG. 61 (sheet 30), and using the same elements as were already discussed above, so nothing further concerning the 2,7VIC 364 in that regard need be said. However, it may be added that for either VIC there need not be a Post 326 at each terminal. The PS 100 that had only one post per LN 102 would obviously not be able to use its only Post 326 in the same manner as that previously described, but the code can be changed to accommodate that one Post 326.

The original "ssssss" code had the first two bits ("$s_1s_1$") selecting the LN 102 terminal from which the desired SPT 106 was to extend, the second two "$s_2s_2$" bits selected the direction in which the SPT 106 was to extend (and hence the LN 102 to which connection would be made), and the third pair "$s_3s_3$" selected the terminal of the receiving LN 102 to which the SPT 106 was to be connected. Rather than indicating a post to be used, in a one-post scheme the code "$s_2s_2$=11" would first of all indicate that the structuring was to proceed in the z direction, meaning that a post would be used, but secondly, the "$s_1s_1$" code, rather than indicating an originating terminal on the OT as occurs when the direction code is either "01" or "10," would select that IPT 322 that was connected from the Post 326 on the selected LN 102 to the desired DR 108, GA 110, or SO 112 terminal on that original level LN 102. A second action deriving from that "11" code would be to enable the IPT 322 so selected, in both the lower and upper levels. Those operations would place the signal on the desired terminal of what would now be the OT in the upper level, but where to go from there would not yet have been specified.

Which of the terminals of the RT to which connection would made would be defined by that original "$s_3s_3$" code, but the LN 102 to which that code would be applied would not yet be known. There would only be two choices, either rightward or upward from the OT in the circuit drawing, i.e., either up one row or to the next column to the right, so that issue could be resolved by a single 1-bit code where, e.g., "0"=rightward and "1"=upward. Any signal code that when entered had placed a "11" code into the "$s_2s_2$" position of the "sssss" code would then also need to be accompanied by another bit that would establish the direction of structuring in the upper level. (That bit will be designated as the "Upper Direction Code" (UDC) and in the code formula will be indicated by a "u," or by "uu" in the 2-bit case.) That full code would be easily recognized in a code list since it would contain seven bits for each LN 102 rather than six bits. In order for repeated signal codes for more than one SPT 106 to be read correctly, the coding protocol must be of some fixed form, and since it is the "$s_2s_2$" code that brings about the use of a Post 326, the 1-bit direction code for that upper level should be placed following the original 6-bit "ssssss" code, as will be done in the new code formula to be shown below. (That 1-bit code could also reasonably be placed just before the "$s_3s_3$" code, which would actually have better logic to it in selecting the LN 102 before selecting from the terminals thereon, but it was deemed safer and less subject to error to place that 1-bit code at the end of the "ssssss" code. In any event, this would be a matter of choice for the designer.)

There is a tradeoff as to whether one wished to build a "three post" or a "one post" PS 100. The "one post" version would effect considerable savings in that only one post would have to be fabricated for each LN 102, thus to save the cost of fabricating 2N Posts 326 (and Plates 324, etc.), but at the same time the cost of requiring the N Signal Code Selectors SCS 128 and all of the associated wiring, etc., to accommodate seven bits instead of six would be added. Using just one post, the code formula would no longer be that of Eq. 11, which is $$[xxxxxxxx][cc_1][cc_2][cc_3][ii_1][jj_1][kk_1][ii_2][jj_2][kk_2][ii_3][jj_3][kk_3], \quad (11)$$

but $$[xxxxxxxx][cc_1][cc_2][cc_3][ii_1][jj_1][kk_1][u_1][ii_2][jj_2][kk_2][u_2][ii_3][jj_3][kk_3][u_3], \quad (12)$$

where the three "$[p_i]$" codes have been inserted right after each of the three "$[ii_i][jj_i][kk_i]$" codes. Using the 8-bit $IN_i$ code shown, in the one post PS 100 the full code would be 35 bits long rather than 32 bits. With three posts, the code would be 38 bits long and have the formula $$[xxxxxxxx][cc_1][cc_2][cc_3][ii_1][jj_1][kk_1][pp_1][ii_2][jj_2][kk_2][pp_2][ii_3][jj_3][kk_3][pp_3]. \quad (13)$$

The "$pp_i$" codes will be identified as such by the fact that by making an initial bit count each of the signal codes could be seen by first passing the code line through a simple "equal to" circuit to be seven or eight bits long, rather than just six, with the actual number of added bits (one or two) not needing to be counted since that would be determined by the number of posts there were for each LN 102; the SCS 128 would be configured to interpret that number of bits as a "$p_i$" or "$pp_i$" code to match the number of posts in the PS 100. With reasonable cost estimates, the economic factor (which of course would not be the only factor) in choosing which technique to use should be easily resolved.

What is intended to be shown by FIGS. 60 and 61 is for the most part just to demonstrate that such differences in manufacturing technique do exist, but with the precise nature of how the IC was built having no bearing on the IL operations. What is significant about the two structures is that they both have two levels, that seemingly would satisfy the needs of certain ones of the circuits previously shown that required an excursion into a second level in order to build a bridge over some blocking LNs 102. As was just mentioned, however, the great number of SPTs 106 required by IL suggests the use of a second level solely for those SPTs 106, with posts then extending up from the initial transistor layer to make connection thereto. That earlier discussion in terms of the two levels used for structuring purposes sufficed to set out the principles of the IL structuring being blocked by other LNs 102 and hence the need for a second level, but does not suffice to take full account of the nature of the LN 102-SPT 106 relationship. One of either of the 2,6VIC 342 or 2,7VIC 364 would be required to fulfill the role of just one of the structuring levels set out in the earlier discussion, with that 2,6VIC 342 or 2,7VIC 364 having the SPTs 106 in the upper "level" thereof and the rest of the components in the lower "level," so if the structuring needs of particular circuits required stepping up to a second "level," that would require the use of a second 2,6VIC 342 or 2,7VIC 364, and hence four of the levels both as originally discussed and as designated in FIGS. 60 and 61, meaning that two of the structures of either FIG. 60 or 61 would be required.

FIG. 62*a* (sheet 31*a*) now shows an idealized layout of the LNs 102, CPTs 104, SPTs 106, IPTs 322, and Posts 326 in a PS 100. Two levels are shown, the upper level containing the SPTs 106 being shown in the lighter print and left transparent so that the lower level therebelow, that has the rest of the components shown with darker print, could also be seen. The problem presented was that of finding a way to connect each of three different lines deriving from three different origins extend in four different directions without any lines crossing each other. In so doing, it was sought to maintain the practice that the lines are to be straight, and generally are to meet each other at right angles. That was accomplished in the present case by laying out the first level mostly in right angles (the posts extend out at arbitrary angles), and then the second level lines are all entirely straight and at right angles, but the two levels were rotated one with respect to the other by an angle of about 14 degrees.

There are no doubt many ways in which this layout could have been achieved, but that was done here by first drawing an equilateral triangle, bisecting one side, placing the "D" DR 108 and "S" SO 112 terminals at the two apexes of the line that had been bisected, and then placing the gate "G" terminal along that bisecting line and rotating the figure so that lines that passed horizontally through the D and S terminals would no longer encounter one another as they would have in the original drawing, and then placing the G terminal at a point along that bisecting line at which lines drawn both horizontally and vertically through that G terminal would not encounter either of the D or S terminals. There is a limit to how far that rotation could be carried out, since eventually a point would be reached at which the G terminal would be directly above the D or the S terminal. That range is determined also by the width of the lines being used, but with the dimensions used, the angles of rotation that would serve the purpose turn out to fall within the range of from 11.3° to 19.4°, and as noted the layout used happened to have an angle of rotation of 14°.

In FIG. 62 FIG. 62*a* the LN 102 is shown near the center of the figure with the D and S terminals extending out from opposite ends therefrom in straight, collinear lines, with the G terminal disposed on a line extending from one side of the LN 102 at right angles to the D-S line. The circled "D," "S," and "G" locations are meant to indicate contact points on those respective terminals to which other lines may be connected. The 1 and 3 CPTs 104, that connect from the LN 102 to $V_{dd}$ and GND, respectively, are located a predetermined distance along those lines from the respective D and S terminal contact points. From those contact points along the D and S terminal lines, added lines extend out at some arbitrary angle that will be in accord with the space available to an IPT 322 in each case, and just beyond the IPT 322 on each line there is a Post 326. On the G terminal line, a second line extends outward at right angles therefrom to the 2 CPT 104, that accepts inputs from outside of the PS 100, and at the G contact point there is again a line extending out to an IPT 322 beyond which there is again a Post 326. All of the requisites for Instant Logic™ operation are then present in that level except for the SPTs 106, that as noted earlier are in the level above that just described. (This use of Posts 326 to get from an LN 102 physical level to an SPT 106 physical level is to be distinguished from the use of Posts 326 as previously described in getting between circuit structuring levels, since the latter requires the use of code and the enabling of an IPT 322 while the route from an LN 102 to the associated SPTs 106 is a fixed characteristic of the circuit and needs no code or special PTs.)

In the upper level shown with the lighter ink in FIG. 62*a*, it can be seen that each of the D, G, and S contact points has wide lines designated as "SPT 106 Lines" (SPTL) 384 extending therefrom in four orthogonal directions in which except for crossovers none of those lines from one contact point encounter any lines from any of the other contact points. (To avoid further clutter in FIG. 62*a*, the labeling of those lines is shown in the next figure.) As to the crossover points, FIG. 63*a* (sheet 31*a*) shows the SPTs 106 each to have a line extending therefrom at heights that differ among the different SPTs 106. The regular nature of those line heights is not meant to suggest that the D, G, and S SPTs 106 are arranged to have that particular fixed pattern, but merely that the line extending from the SPT 106 can be set in the deposition process to be formed at various selected heights. By such means the lines extending from those D, G, and S terminal contact points that in a top plan view are shown to have crossover points can be fabricated so that any two lines that "cross over" one another will do so literally, i.e., the heights of the two lines will be different so that there would be no contact between those lines at such crossover points. The same procedure is carried out in both directions, so that in traversing the distance to a neighbor LN 102, the kind of crossover mentioned earlier in which the lines from a DR 108 terminal to a SO 112 terminal of a neighbor receiving LN 102, for example, would not come into contact with a line coming in from the DR 108 terminal of that receiving LN 102 to the SO 112 terminal of that originating LN 102.

Figure 62B:
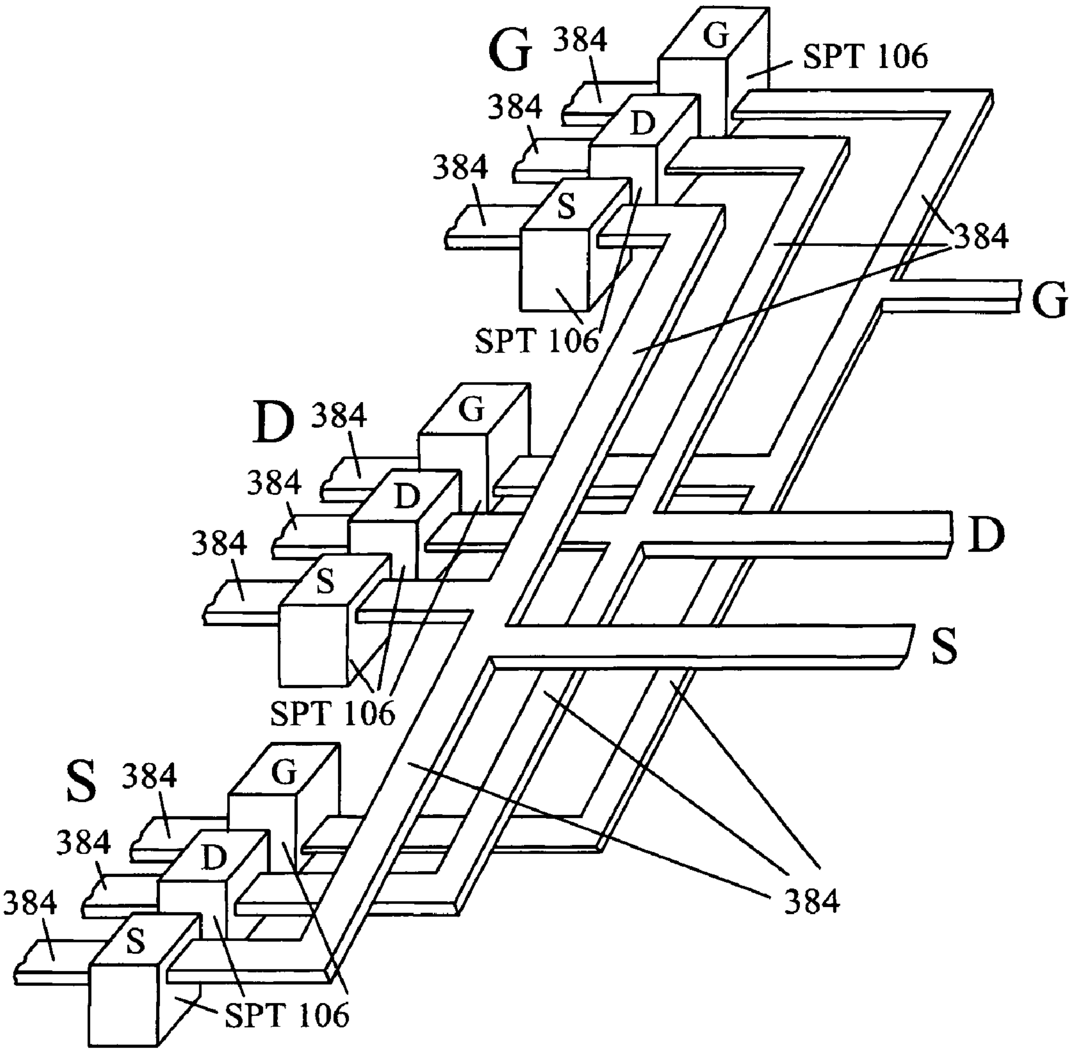
Figure 63B:
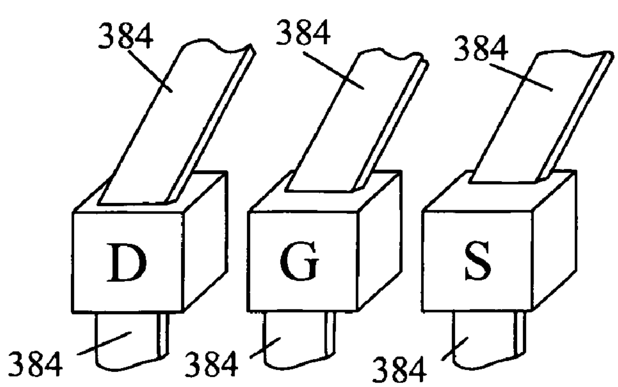
Figure 62C:
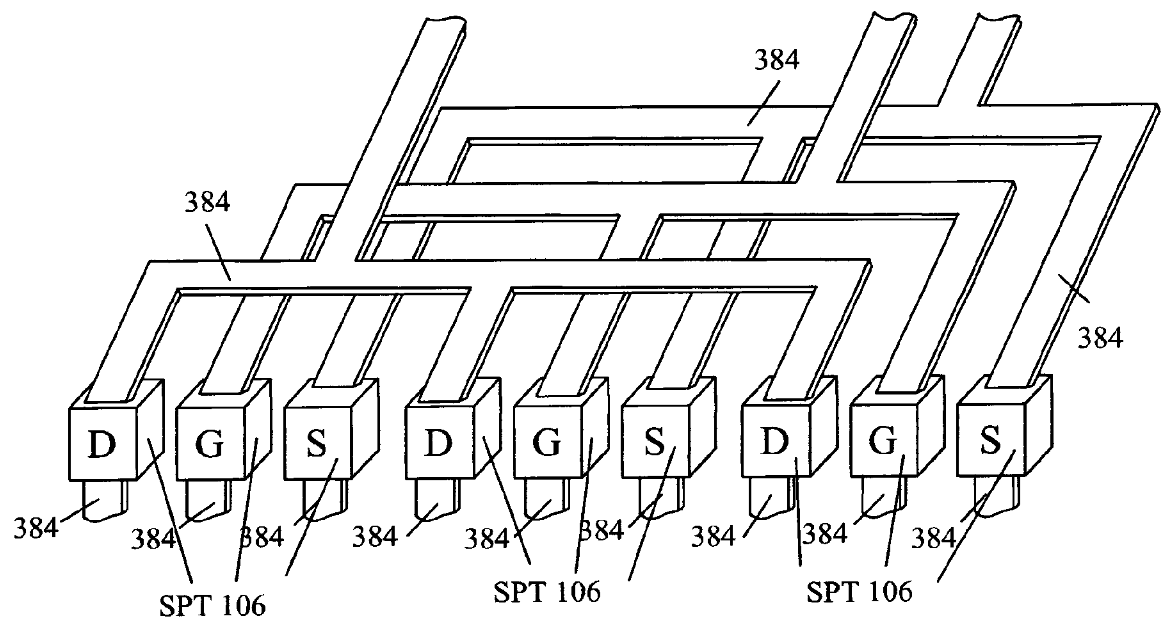

Perspective drawings of the SPTs 106 shown in FIG. 62*a* are shown in FIG. 63*a* sheet 31*a*) for the rightward-extending lines and in FIG. 63*b* (sheet 31 b) for the upward -extending lines. An inter-LN 102 connection layout that exhibits the required structure for the horizontal direction is shown in FIG. 62*b* (sheet 31*b*), and for the vertical direction in FIG. 62*c* (sheet 31*c*). It may be noted that the three respective rightward and upward ends of the lines coming from the SPTs 106 have been spaced so as to be in alignment with the input lines to an LN 102, as can be seen on the left and bottom sides of FIG. 62*a*, which is what the lines of FIGS. 62*b* and 62*c* would encounter in the order of the SPTs 106, i.e., the G, D, and S connections reading downward as to the rightward extending lines but in the order D, G, and S reading rightward as to the upward extending lines.

Each of the three terminals of an LN 102 will need to connect with each of the same three terminals in each of four neighbors, so that between each pair of LNs 102 there will be nine connections. The layout of FIG. 62 is such that from each of the three D, G and S contact points, in a particular direction, there is a composite line having three lines therein, with those three lines designated for the D, G, and S terminals of the neighboring LN 102. At the end of the composite line the three S, G, and D lines are separated out, and on each of those three lines there is an SPT 106 that connects to the named terminal contact point in the neighbor LN 102. Put another way, a line coming in from any particular terminal of a neighbor LN 102 will have a path to any of the three D, G, and S contact points of the LN 102 shown in FIG. 62. The convention has been that an LN 102 connects the terminals thereof only in the upward and rightward directions, so the three composite lines extending in each of the four different directions have been consecutively numbered clockwise, so that the upwards composite lines are all "1", lines, those to the right are "2" lines, those at the bottom are "3" lines, and those to the left are "4" lines. The directions of signal flow have been shown by arrows, so that the 1 and 2 lines are all sending signal out, and the 3 and 4 lines are all receiving signals coming in.

When preparing the masks for constructing this two-level IC, it is of course not the masks themselves that need to be rotated relative to one another, unless one was to build a chip that contained but one LN 102. Instead, a base design of a single LN 102 is drawn first, that design is then rotated 14 degrees (or whatever that angle may be within the workable range), and it is then that rotated LN 102 design that is replicated across the mask so as to encompass whatever size the wafer may be. The somewhat irregular pattern that results for the locations of the Posts 326 in the upper level must of course be replicated precisely in the lower level, which would no doubt involve "lining up" the two mask patterns so that the "post holes" would be in proper optical alignment. The mask patterns for the lines, and their varying heights, would then follow as a matter of course, with those line heights being determined using different masks and differing amounts of dielectric deposit. This is, of course, just one highly generic method of fabrication, and those of ordinary skill in the art will be able to establish their own fabrication protocols, the only purpose here being to show that the structure described could indeed be fabricated.

There remains one more aspect of Instant Logic™ that requires treatment. Substantial effort was devoted herein to finding ways in which the speed or more exactly the throughput of an IL apparatus could be maximized. One method of so proceeding has been an effort to ensure that the number of LNs 102 not in use during any cycle would be minimized, even as to seeking out the optimum shape of the PS 100, as was discussed in connection with FIG. 3 (sheet 3). Yet one more way of seeking full LN 102 use centers on having carried a course of circuit structuring up to a boundary, i.e., a side or corner of the PS 100, or in a 3-D environment an edge, and then not being able to proceed any further. The re-routing of the structuring path then required would leave some LNs 102 unused, or inaccessible to any other algorithm that was sought to be structured. At least part of a solution to that problem can be found in the adoption of a "manifold" architecture. As used herein, "manifold" means the electronic equivalent of a mathematical structure that has no boundaries, i.e., no sides, edges or corners.

When the structuring of a circuit has been following a line that had extended all the way up to a boundary, that process could be continued if the LN 102 at that boundary had been connected around to the LN 102 at the opposite end of that line, which LN 102 by that time would have been freed up from the initial use thereof. Such a line, in effect, would then be as a circle and have no end. A "manifold architecture" is one that would be formed from an ordinary 3-D array by making connection from all of the LNs 102 at the various boundaries of the 3-D array, which the cube of FIG. 64 (sheet 32), designated as "Cubic Manifold Array" (CMA) 386, is intended to represent, to the LN 102 at the opposite end of the line that had reached the boundary. (The manifold architecture is not fully "manifold," since in not including diagonal lines there would be no connections between opposite corners of the cube, and such a line would be redundant in any event since a corner would obviously have been reached by a straight x, y, or z line that does have an opposite end.)

The following Table XVI shows an 8×4 array by which the use of that process will be demonstrated:

TABLE XVI $LI_i$ Numbers for an 8 × 4 Manifold Array

| | | | | | | | |
|---|---|---|---|---|---|---|---|
| 1 | 2 | 3 | 4 | 5 | 6 | 7 | 8 |
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |

A formula for locating $LI_i$s other than the first $LI_1$, taken here to be the "1" location in Table XVI, was given earlier in Eq. 6 as $LI_i=LI_1±r_i±k_ix_M$, where $LI_i$ is the location being sought, $LI_1$ is the reference location, taken here to be the "1" location, $r_i$ is the horizontal distance from the reference location to the node sought to be identified, $k_i$ is the number of rows above or below the reference row within which the node being sought is located, and $x_M$ is the length of the x axis. The formula can of course be applied as well to any other starting point than $LI_i$ to allow the structuring process to continue.

The results of calculations from that Eq. 6 formula within the array of Table XVI, using the first four steps of some algorithm that was being structured along a straight line, as to a set of separate operations of the algorithm that were independently started at the successive nodes listed in the left-most column of Table XVI as "$LI_1$" and then proceeding rightward in one node increments in each different algorithm operation, appear as shown in the following Table XVII:

TABLE XVII

Linear X-axis Node Locations in an 8 × 4 Manifold Array

| $LI_1$ | $LI_1 + 1$ | $LI_1 + 2$ | $LI_1 + 3$ |
|---|---|---|---|
| 4 | 5 | 6 | 7 |
| 5 | 6 | 7 | 8 |
| 6 | 7 | 8 | 9 − 8 = 1 |
| 7 | 8 | 9 − 8 = 1 | 10 − 8 = 2 |
| 8 | 9 − 8 = 1 | 10 − 8 = 2 | 11 − 8 = 3 |

If structuring in a straight downward line, the general formula for the $LI_i$ value would be $LI_i=LI_1-kX_M$, which again would be the number of nodes by which the node in use had had been shifted in each step. In this case the number of nodes moved in each step will be eight, in moving from one row down to the next as described earlier, and in a manifold array, starting each operation at the series of $LI_1$ values shown in the left-most column, the calculations would yield the results set out in the following Table XVIII:

TABLE XVIII

Linear Y-axis Node Locations in an 8 × 4 Manifold Array

| $LI_1$ | $LI_1 + 8$ | $LI_1 + 2(8)$ | $LI_1 + 3(8)$ |
|---|---|---|---|
| 4 | 12 | 20 | 28 |
| 5 | 13 | 21 | 29 |
| 6 | 14 | 22 | 30 |
| 7 | 15 | 23 | 31 |
| 8 | 16 | 24 | 32 |
| 9 | 17 | 25 | 33 − 32 = 1 |
| 10 | 18 | 26 | 34 − 32 = 2 |

The boundary problem arises from the fact that, for example, if as in Table XVI one had been following a circuit structuring path that had started with $LI_i=6$ in the third row of Table XVI and then gone on to the "$LI_6+1$" and "$LI_6+2$"

nodes, then seeking the location "$LI_6$+3" so as to continue that linear course of circuit structuring through adjacent nodes would bring the process to the node "9," that would lie in a different row than the "6" node, and also rather distant from that last node so that no "next neighbor" connection could be made. The same principle applies to the vertical path of Table XVII, except that the increments by which the location is moved is eight, in going from one row to the next. (If going in the z direction the increment would be (multiplying) xy=32, since one would have moved a complete x,y plane full of numbers.) The principle of the manifold array is that the LN 102 connections at a boundary will continue on around (or perhaps through, using Via2s 358) the main array structure back to the opposite end of the line in question, thus to allow the structuring process to continue "in a straight line." The course of the different x-direction structuring paths noted in Table XVI would appear as shown in the following Table XIX, where the LNs 102 being used are underlined, and each row of Table XIX represents a separate structuring process that had been begun at the different starting points indicated by the first underlined number in each row:

TABLE XIX

The X-axis "Wrap-Around" Effect in a Manifold Array

| | | | | | | | | |
|---|---|---|---|---|---|---|---|---|
| 1. | 1 | 2 | $\underline{3}$ | $\underline{4}$ | $\underline{5}$ | $\underline{6}$ | 7 | 8 |
| 2. | 1 | 2 | 3 | $\underline{4}$ | $\underline{5}$ | $\underline{6}$ | $\underline{7}$ | 8 |
| 3. | 1 | 2 | 3 | 4 | $\underline{5}$ | $\underline{6}$ | $\underline{7}$ | $\underline{8}$ |
| 4. | $\underline{1}$ | 2 | 3 | 4 | 5 | $\underline{6}$ | $\underline{7}$ | $\underline{8}$ |
| 5. | $\underline{1}$ | $\underline{2}$ | 3 | 4 | 5 | 6 | $\underline{7}$ | $\underline{8}$ |

A similar listing is shown in Table XX for a vertical structuring pathway, where again each entry is a different circuit structuring path that would have been carried out starting at the first LN 102 node going rightward that is shown underlined; in the later operations 3 and 4 the structuring had reached the boundary but still had one or more steps to perform and hence that structuring was obliged to wrap around to the beginning of the particular line:

TABLE XX

The Y-axis "Wrap-Around" Effect in a Manifold Array

| | | | | |
|---|---|---|---|---|
| 1. | $\underline{4}$ | $\underline{12}$ | $\underline{20}$ | 28 |
| 2. | 4 | $\underline{12}$ | $\underline{20}$ | $\underline{28}$ |
| 3. | $\underline{4}$ | 12 | $\underline{20}$ | $\underline{28}$ |
| 4. | $\underline{4}$ | $\underline{12}$ | 20 | $\underline{28}$ |

In the 9×9×9 "Cubic Manifold Array" (CMA) 386 of FIG. 64 the "Manifold Lines" (MLs) 388 are shown, with a few thereof being marked for identification. (Also, the numbers of some of the LNs 102 have been shown for use in an example given below.) An ML 388 is simply an additional line that extends from an LN 102 at a boundary of the array on around or through a CMA 386 by way of a Via2 358 to the LN 102 at the opposite end of a line out to that boundary LN 102. For example, in the boundary problem just noted in which the structuring had started at the 6 LN 102 (Step 4 in Table XVIII) and extended to the 8 LN 102, if the structuring were to continue the next connection would be from the 8 LN 102 by way of an ML 388 back to the 1 LN 102 where that line had started.

Similarly, if in the CMA 386 the structuring had been carried out vertically through the 74, 65, 56, 47, 38, 29, 20, 11, and 2 LNs 102, and because of prior use by other algorithms the 1, 3, and 83 LNs 102 that are adjacent to that 2 LN 102 were unavailable, the structuring would then proceed along the ML 388 line from the 2 LN 102 back down to the 74 LN 102, as shown by the arrow adjacent to that ML 388 in FIG. 64, the ML 388 itself also being shown in darker ink in FIG. 64 and labeled with an "A," as are two other MLs 388 at the top and left side of FIG. 64 to illustrate the use of MLs 388 in all three directions. Any further structuring from that 74 LN 102 could then repeat the 65, 56, . . . , etc. path as shown by the upward arrow in FIG. 64 along the LN 102 path that had been followed before, since again those LNs 102 would no doubt have already carried out their earlier roles and be ready for another role; alternatively, the structuring could proceed instead, for example, in the rightward 75, 76, . . . , etc., direction, whichever was the most free of other blocking usages. In IL it does not matter where the structuring goes, so long as it goes to any nodes at which there are stored any needed data.

Of course, if an LN 102 at the start of a line on which the structuring had encountered a boundary at the other end had in the meantime been put to other use, "Wrapping around" back to that original LN 102 could not be done. Moreover, the relevant ML 388 could not even be connected to that starting LN 102, since otherwise the activity at that last boundary LN 102 would interfere with whatever processes were going on at that LN 102 at the start of the line. That circumstance would of course be avoided insofar as possible. For the usual case in which no such conflict has been created, then, each ML 388 will be seen in FIG. 64 to have a "Manifold Line PT" (MLPT) 390 thereon, of which to save clutter only a few are shown and marked in FIG. 64, that is used to connect the relevant ML 388 to the LN 102 from which a "Wrap around" ML 388 is to be used, which leaves what had been the starting LN 102 free for other uses unless such a wrap-around was to be carried out.

From an LN 102 on an outer side (or top or bottom) only one ML 388 is present on the LN 102, while edge LNs 102 have two MLs 388 thereon and a corner LN 102 will have three MLs 388, so if all of those were to be provided a 2-bit code would have to have been added to the signal code to identify the direction of the terminal on which the ML 388 to be used was located and hence was to have the MLPT 390 thereon enabled. In the signal code formulae of Eqs. 11, 13, however, there seems to be no location at which a "manifold" code "$mm_i$" could be placed that would not be ambiguous, since from the discussion above, any extra one or two bits detected in a signal code would automatically be interpreted to be those designating the use of a Post 326. A circumstance in which an ML 388 was to be specified but no Post 326 would be indistinguishable from one designating a Post 326 but no ML 388. On that basis, it would seem that an additional code line would have be added, e.g., so as to use one of the PTEs 204 shown on the face of the ILM 114 that would allow a 2-bit entry, then to be labeled "Manifold" or some such term, and the user would employ that PTE 204 with respect to the LN 102 then being treated in order to indicate that the signal path was to enter a particular ML 388 disposed at that LN 102, with the code from that PTE 204 then being sent to the SCS 128 to bring about that actual routing.

To that end, means for enabling either or both the MLPTs 390 and the IPTs 322 are shown in the ILM 114 of FIG. 4 (sheet 4), wherein a dashed-line box is shown for each such purpose, i.e., one box that represents an array of "Interconnect PT Enablers" (IPTEs) 392 for enabling the IPTs 322 previously discussed, and another box representing an array of "Manifold PT Enablers" (MPTEs) 394 for enabling the MLPTs 390. (The priority of Posts 326 over MLs 388 in the reading of the signal code (i.e., any extra bits are taken to designate a Post 326 rather than an ML 388) was established as indicated because the use of Posts 326 could be quite frequent, while the use of MLs 388 would likely be less frequent.)

However, rather than needing to operate those IPTEs 392 and MPTEs 394 manually, recourse could again be had to an added code, in this case a 3-bit code separate from the normal "ssssss" code, on any LN 102 that required such action, i.e., the edge and corner LNs 102, since the "face" LNs 102 will have just one ML 388 and no selection among directions is required. In that code the first of the three bits would indicate whether the following two bits (or one bit in the case of a single Post 326 on each LN 102 in PS 100) were to be read as an "$mm_i$" code for the MLs 388 or a "$pp_i$" code for the Posts 326. As in the earlier use of PTEs 204, no effort is made here to illustrate the myriad connections that must exist between the IPTs 322 and the IPTEs 392, on the one hand, or between the MLPTs 390 and MPTEs 394 on the other, since by now that requirement will be well understood.

On the other hand, the use of that extra code line could be avoided if the manner of encoding for Post 326 were left as described above while the MLs 388 were controlled by code in the same manner as was the circuit code: three 2-bit spaces would be allocated in the CCS1 126 for the three possible directions of an ML 388, fixed at locations within the code either before or after the six bits of circuit code, that would then be interpreted in the same manner as that circuit code in identifying any one or more of the three PTs associated therewith to be enabled, and then thereafter the signal code would be treated as previously described (e.g., but again using only one bit for the direction code in the upper level). For a fully functional, "on-line" Instant Logic™ Apparatus code control would obviously be preferred, but for a version of the ILA that was intended for experimentation, perhaps using CT 284 as shown in FIGS. 44-46 (sheets 22-23), the aforesaid manual operation would be a valuable alternative, since it would allow for immediate changes in the use of Posts 326 and MLs 388 just as in the rest of the circuit structuring process.

As to the actual implementation of the IPTEs 392 and MPTEs 394, for the manual entry aspect it would be easy enough to provide in the ILM 114 of FIG. 4 (sheet 4) the kind of push button device as seen in the Circuit Tester (CT) 284 of FIGS. 44, 45 (sheet 22), which is seen (still designated as a CT 284) as another dashed-line box so labeled in FIG. 4, and connected to the IPTE 392 and MPTE 394 boxes of FIG. 4. However, for the preferred practice of having those controls entered as part of the algorithm codes, since as just noted the possible uses of the 2-bit [jj] code for the direction of an SPT 106 have been exhausted with the inclusion of a third dimension, other means for entering such codes must be provided. (The reason for using both an IPT 322 and an IPTE 392, or both an MLPT 390 and an MPTE 394, where in each case one PT is being used to enable another PT, is that one would not want to have the myriad MLPTs 390 distributed within the MLs 388 themselves over the entire periphery of the PS 100 be operated by lines that would extend all the way to the front surface of the ILM 114, so the MPTEs 394 are disposed near to that PS 100 surface, perhaps in an open lattice-like box around the PS 100, which box could also aid in carrying in many of the other lines, such as those for $V_{dd}$ and GND.) The kinds of connections described are shown in FIG. 65 (sheet 33).

The full code as previously characterized was given above as $$[xxxxxxxx][cc_1][cc_2][cc_3][ii_1][jj_1][kk_1][ii_2][jj_2][kk_2][ii_3][jj_3][kk_3], \quad (11)$$

not including $p_i$ or $pp_i$ codes for using Posts 326. As to the MPTEs 394, the array at hand may or may not be of a manifold type, but assuming a manifold-type ILA in which MLs 388 were provided, they would likely be provided in all three directions (but not necessarily on all three terminals), a 2-bit code would again be needed in this case to indicate the direction in which the desired ML 388 was oriented. (It can be seen in the 3-D array of FIG. 64 (sheet 33) that the 1, 81 and 456 nodes would each connect to three MLs 388, in the x, y, and z directions, as are marked in on node 81.) However, that is not to say that more than one ML 388 at once would necessarily be used, and the first code noted below encompasses only one MPTE 394 (and hence MLPT 390), so should MLs 388 be needed in two or three directions, another one or two 3-bit codes could be used. Since the ML 394 issue centers on the individual LNs 102, it seems logical to associate this "$mm_i$" code closely with the binary $IN_j$ code for the LN 102, so in the following Eq. 14 the $mm_i$ code is defined so that $$[xxxxxxxx][mm_i][cc_1][cc_2][cc_3][ii_1][jj_1][kk_1][ii_2][jj_2][kk_2][ii_3][jj_3][kk_3], \quad (14)$$

where the $mm_i$ codes are "01" =x, "10" =y, and "11" =z. The latter code would of course implicate the use of a Post 326, which would then be used just as before except that the MPTE to be enabled would again lie within a separate ML 388.

Were it desired to allow more than one ML 388 be used on an LN 102 at the same time, by way of using more than one MLPT 390 and MPTE 394, the code would become $$[xxxxxxxx][mm_1][mm_2][mm_3][cc_1][cc_2][cc_3][ii_1][jj_1][kk_1][ii_2][jj_2][kk_2][ii_3][jj_3][kk_3], \quad (15)$$

and the individual $mm_i$ codes would have fixed codes and locations in the exact same manner as did the circuit codes [$cc_i$]. Firstly, the CCS 126 for a PS 100 that included both Posts 326 and MLs 388, or even just MLs 388, would be structured to read these $pp_i$ and/or $mm_i$ codes as were the $cc_i$ codes. That modification would simply lie in adding the necessary 2COEs 202 of FIG. 14 (sheet 11) to the CCS 126 and making the connections therefrom to the MPTEs 394, and then secondly as to the signal code similarly expanding the capacity of the SCS 128 to encompass seven bits as noted above.

A string of six "0" bits following the "xxxxxxxx" $IN_i$ code would mean that no MLs 388 were to be used, and a six-bit signal code would mean that no Posts 326 were to be used, and then the normal interpretation of both the circuit code and signal code as originally described would be carried out. That is, a "00" code in a particular location would indicate that the ML 388 corresponding to that location was not in use, but the appearance of one or more of the "01," "10," or "11" codes, in the positions as assigned in that order, would indicate that the MLPT 390 associated with that position was to be used, with the actual codes again being "01" =x, "10" =y, and "11"=z. Such a multiple usage would not likely occur often, but would be appropriate in a circumstance such that at the very time that the circuit structuring had encountered a boundary, the algorithm being encoded also required a BRANCH gate, in which case the subsequent structuring could indeed be carried along two or even three subsequent lines. If the full code complement had allocated positions for both MLs 388 and Posts 326 were used, the (truly) full code would become $$[xxxxxxxx][mm_1][mm_2][mm_3][cc_1][cc_2][cc_3][ii_1][jj_1][kk_1][pp_1][ii_2][jj_2][kk_2][pp_2][ii_3][jj_3][pp_3]. \quad (16)$$

The MLs 388 of FIG. 64 are intended only to show what is meant by the beginnings and ends of those lines between which connection is made, but not to suggest how they would actually be installed. It then seems necessary to show at least one means by which they might be installed and connected in which, although while seeing the start of those lines, it will not be possible in all cases to see the ends. Such a showing is given in FIG. 65 (sheet 33), in the form of a "Wrap-around Cap" (WC) 396, or less formerly as a "Wrap Cap" (WC) 396, that is also shown in a cutaway side elevation view in FIG. 66 (sheet 34). WC 396 consists principally of a rigid, planar "Manifold Line Frame" (MLF) 398 in the form of a rectangular frame including a vertical and horizontal grid, and also a lower level in the same form wherein a number of MLs 388 are carried along the upper part of the frame and a number of MLPTs 390 that operate the MLs 388 along the lower part of the MLF 398. MLF 398 is made up at least in the upper level of a non-conductive material along which the MLs 388 are laid out, the non-conductive material having elongate troughs (not shown) or similar such means extending the full length thereof into which the conductive material that constitutes the ML 388 as is placed into those troughs and secured.

There are two types of connection that must be made in order for this manifold system to function. The MLs 388 must of course contact the desired LN 102 terminals in the plane of the IC, or in the top connection layer which is just as good since electrical connection to the desired terminals would be made by contacting the appropriate nodes in the connection layer. (In the 2,6 VIC2 342 that would be the 2CL1 356, and in the 2,7 VIC2 364 that would be the 2CL2 382.) Beneath the MLs 388 in FIG. 66 there is shown an array of "Contact Studs" (CSs) 400, that upon being placed onto the surface of the IC will be placed into physical and hence electrical contact with the DR 108 terminals of all of the LNs 102 of the CMA that are on the outer surface of the particular side of the IC to which connected. As shown in FIGS. 65, 66, of the three terminals that an LN 102 will have only the DR 108 terminals of the LNs 102 are used, for reasons of both economy and space. If the bit sought to be wrapped around to the opposite side of the IC were not on a DR 108 terminal, it would be easy enough to move that bit over to the DR 108 terminal of an adjacent LN 102 and make the connection to the ML 388 at that point, which would certainly be easier to carry out than having had to install connection means and MLs 388 for all three terminals at both ends.

As to any particular ML 388, contact is made only at the LNs 102 at the two ends of that ML 388, but of course every boundary LN 102 will have such a contact since every boundary LN 102 will need to be provided with these wrap-around means. Direct connection is made of the MLs 388 to those tops of the CSs 400, with connection between the opposite sides of the CMA 386 in order to achieve the wrap-around required in a structuring process being through the MLs 388 disposed within the MLF 398 in the x and y directions, and a wrap-around in the z direction is made by way of Via2s 358 that are disposed adjacent to those CSs 400, seen from the top at various locations in FIG. 65 and seen as a whole in the side view of FIG. 66. The actual contacts are made by way of an array of "Contact Studs" (CSs) 400 that are disposed within the plane of the MLFs 398, and shown in FIG. 65 as dark circles at the nodes of the lattice network that makes up the MLF 398, a few of which are labeled, while in FIG. 66 the CSs 400 are shown in side elevation extending down from the plane of the MLF 398. The MLF 398 and the CMA 386 are held in contact by means that will be described below.

The second type of connection required is that of the MPTEs 394 to the MLPTs 390 that control which MLs 388 will to be enabled so as to accomplish a wrap-around connection. FIG. 67 is placed above FIG. 66 on sheet 34 rather than below in order better to show the means for connection of the MPTEs 394. The WC 396 itself, which contains both the MLs 388 and the MLPTs 390, is installed permanently as a control mechanism on the outer surfaces of the CMA 386, and then to be put into operation there is provided the "Manifold Line Control Cable" (MLCC) 402 that connects from a source of control bits established by the user to the WC 396 in order bring in the enable bits from the MPTEs 394 that will enable the selected MLPTs 390. Those control data are generated as previously described, e.g., by manual use of the MPTE 394 boxes on the ILM 114 of FIG. 4 or by encoding those data into the algorithm code as was also described above.

In order to carry out that ML 388 control process, the WC 396 is provided with a "Wrap Cap Cover" (WCC) 404 shown in FIG. 66 (sheet 34) that fits atop the WC 396 and that contains an "Upper Manifold Contact Plane" (UMCP) 406 having disposed therein along the under surface thereof an array of "Contact Pins" (CP) 408. UMCP 406 is brought into contact with a "Lower Manifold Contact Plane" (LMCP) 410 that contains in the upper surface thereof an array of "Contact Orifices" (COs) 412 through which contact is to be made therewithin with the MLPTs 390. That is, each CO 412 connects through a "Manifold Control Line" (MCL) 414 to an MLPT 390 on a particular ML 388, so that upon a "1" bit having come in through the MLCC 402 to the CP 408 that has been inserted into the particular CO 412, that "1" bit will be placed on the gate terminal of the MLPT 390 in question, and a wrap-around connection will have been made between the two LNs 102 at the opposite ends of that particular ML 388. The proximal ends of the MLCC 402 lines connect to the CPs 408, while the distal ends thereof connect to MPTEs 394 that could be located anywhere that was convenient and are under control of both the "MPTE 394" button on the face of the ILM 114 and SCS 128 that as described earlier would have been adapted to include such connections in those ILAs such as the CMA 386 that has been provided with the wrap-around capacity.

Further as to the construction of this manifold apparatus, the WCC 404 has around the lower periphery thereof an enlarged Rim 416 thereon that can be forced to "catch" under the lower surface of the WC 396 to ensure that the WCC 404 does not fall off, and in addition, when the MLCC 402 has been connected, an "Elastic Collar" (EC) 418 shown by the dashed lines in FIGS. 66, 67 to extend across the "flared" part of the MLCC 402 is used, along with a number of "Elastic Straps" (ESs) 420 placed thereon that extend along perpendicular lines from the EC 418 the length at least of the CMA 386, but preferably would connect to a like set of ESs 420 on an EC 418 facing in the opposite direction from the opposite side of the CMA 386. The EC 418 and ESs 420 serve to ensure that the contact of the CPs 408 within the COs 412 will be and remain firm, but not excessive, thus to ensure proper electrical contact. That same function could be carried out with some kind of mechanical clamp, but the use of elastic means seems to be preferable since there would then be some measure of control over the degree of force with which the CP 408 is placed within the CO 412, perhaps by controlling the degree of tension in the ESs 420, thus to avoid accidental breakage of a CP 408. (The manner of using ESs 420 will be described below.)

(In order to be able to show the actual contact between CPs 408 and COs 412, the UMCP 406 and CPs 408 of FIG. 67 are separated off and shown a second time in FIG. 66, which firstly depicts the UMCP 406 and LMCP 410 in contact, with the CPs 108 then necessarily being located within the COs 412, the lines coming in to those CPs 408 being shown simply as coming in somehow from the MPTEs 394. It should then be made clear that this duplicate showing is purely for demonstrative purposes only, however, and the apparatus in fact has only one UMCP 406/CP 408 structure.)

Now as to those Elastic Straps (ESs) 420, two such ESs 420, "strap a" and "strap b," are shown in FIG. 68 (sheet 34). Strap "a," shown in the darker print, has had strap "b" brought up and connected thereto. Both straps "a" and "b" are seen to have "Holding Bars" (HBs) 422 that extend across the ends thereof, and further up the strap there are a number of "Attachment Slots" (ASs) 424 disposed along the length of the ES 420 into which an HB 422 can be placed. As shown in FIG. 68, the "b" ES 420 has had the HB 422 thereof inserted into the second of the four ASs 424 of the "a" ES 420 that lie in a sequence extending away from the end thereof at which is located the HB 422 of the "a" ES 420. The remaining length of the "b" ES 420 thus lies atop the "a" ES 420 that is then covered from view. The end portions of the HBs 422 appear on each side of the other ES 420, however, with a center portion of the "b" HB 422 being seen within the AS 424 of the "a" ES 420 into which entered. Both the ES 420 and HB 422 are quite flexible, so that the HB 422 can be bent around enough to be put through the AS 424. At the end of ES 420 the width thereof has been narrowed down so that an end portion of the ES 420 itself can also fit through the AS 424. Since the compression forces sought to be imposed as to the UMCP 406 and LMCP 410 will be quite small, the material of the ES 420 will best have a rather low coefficient of expansion, so that the degree of force imposed can be "fine-tuned" in selecting the particular AS 424 into which an opposite HB 422 will be inserted, perhaps also including quite a number of closely spaced ASs 424 in the ES 420.

Although this showing of the manner in which all of the bits required for the operation of that manifold capability are brought to bear on that wrap-around process has been directed towards that manifold capability only (as shown by the "Wrap-Around Module" label on the MLCC 402), this same procedure can be used to connect any kind of electronic signal or voltage on which the IL operation is based into an ILM 114 and hence the PS 100 so as to govern the operation of the Instant Logic™ Apparatus as a whole. That would include $V_{dd}$ and GND, perhaps through separate lines that would employ additional vias 306 to reach into the interior of the PS 100, even as to whatever data were to be operated on in the PS 100. To maintain the "plug-in" character of WC 396, however, where contact can be made only at the surfaces of whatever device (that could include even current electronic devices that use conventional digital electronics and not IL) is to be put into operation by that WC 396, such device would need to have had additional COs 412 installed for connection with the CPs 408, or accessible conductive surfaces to be contacted by the CSs 400, all wired in internally as would be required, and including conductive surfaces that connect through vias 306 to components such as the LN 102 terminals in a lower level of an IC as shown on the left side of in FIG. 66.

In order for such devices to be of a size that the process just described would be practical, instead of emphasizing the packing the smallest possible transistors into as small a space as possible, the IC design would be directed towards connectability, since with the IL methodology that emphasis on size may not be as necessary as it had been. As noted before, the ILM 114 has all of the "tools" necessary to carry out complete Instant Logic™ operations, and with PSs 100 therewithin of one of the kinds shown herein, either 2- or 3-dimensional in structure, together with a cable such as the MLCC 402 that has been structured to correspond in the connections that such cable makes both with the ILM 114 and the control and data sources also noted earlier, a complete Instant Logic™ system will have been provided.

That same kind of cable, suitably modified for the purpose as would now be apparent to a person of ordinary skill in the art, could also be used to interconnect any number of ILMs 114 so as to expand the capacity of the apparatus as a whole, thereby to demonstrate that super-scalability discussed earlier, with such additions preferably being made in the manner shown in FIGS. 3(*a*)—(*g*) so as to make use of the geometric advantages there described (i.e., to make the connections in such manner as to minimize the amount of outer surface exposed). All that is required is to examine the LNs 102 along the periphery of a particular PS 100 and see what lines there are that have been left unconnected (which can also be seen in the edges of the PS 100 extracts shown herein as "templates" for the structuring of circuits (e.g. FIG. 2, (sheet 2)), which are seen to be the nine SPT 106 connections between any two LNs 102. As can be seen in FIG. 4 (sheet 4), the ILM 114 being brought in to be connected to an existent system will already contain within itself all of the circuitry needed to operate both those SPTs 106 and CPTs 104, and the only further task to be accomplished would be to adjust the numbers used in designating the $LI_i$ and $IN_i$ values of the LNs 102 so as to accommodate the larger number of LNs 102.

In then actually implementing Instant Logic™ by way of a fully functional apparatus, there are two routes that can be considered. One of these, that might be designated as the "microscale" version, would contemplate the use of ICs and all the other common trappings of the current electronics industry. In an entirely new kind of technology such as IL, however, it would also seem appropriate to adopt a "macroscale" approach as well, at least through a "pilot" program, that would involve discrete components and no doubt a soldering iron. Although the preceding discussion has primarily been in terms of ICs, no real attempt was made herein to distinguish between these two different approaches, but while some of the issues raised would apply in either case, some others would apply only to one approach but not the other. In particular, anything that has been said that related to any really "hands on" way of treating things would only apply to the macroscale approach, since that kind of structure would be much more accessible to manipulation than would be individual connections somewhere deep within a vertical integrated circuit. Conversely, the problems of avoiding contact between signal lines and other issues of that kind would not arise at the macro scale, since presumably only discrete components would be used everywhere, and only the normal practice of not letting the lines of the apparatus come into contact with each other would need to be followed.

The dividing line that would be drawn between the micro- and the macro-scale is clear, centering on what technology is used in the manufacturing, and depends on how far each of those approaches could be taken. Much of what would be involved in identifying the best approach depends on such matters as how many pins can be fit onto an IC, what are the densities now possible on a chip for both ICs and wires, how high a "skyscraper" IC could be built, what kind of transistor would be best to use in a discrete component approach, would that approach have to be entirely discrete or are there any packages now available that would already have combined at least some components that would fit into an Instant Logic™ circuit, on which one would have to conclude "probably not," specifically as to any ILM 114 component, which are highly specialized devices. Also requiring consideration would be what kind of LN 102 and PT 104, 106 density, and using what kind of transistors, could be anticipated in PS 100 or CODE 120 (especially considering the number of wires in the PS 100), how much would the wire lengths necessary in a macro approach detract from the possible speeds of operation, and myriad other such details.

Given the ability to string as many wires to as many places as desired when working within the open spaces of a macro approach, there is no doubt that anything that could be conceived in IL could be built at the macro level, but there could well be some IL circuits that simply could not be fabricated on ICs. In taking the macro approach, a key issue would be how many LNs 102 would be needed in order to claim that a fully functional ILA had been provided, and perhaps even such issues as how much wall space in how large of a room would be needed, and how much power would be needed to accommodate such a device. Even so, it seems clear that an IL development project should begin with a macro-scale device, not only because of the ability to explore the boundaries of IL performance at much less expense than if using ICs, that would require a new factory run for every version, but also because with then having that macro-scale devise on hand, one would be left with an excellent experimental platform that could support a wide range of research, not only on IL itself but also on the circuitry art in general. (One question that could and ought to be examined in detail is whether or not the structuring of a manifold-like architecture would really be worth the effort.)

How complex such matters can become can be seen in the structuring of an ADD circuit, as will shortly be carried out, which circuit would in any event need to be a part of any system that purported to be a complete information processing system, since any such system would certainly be required to carry out arithmetical processes. Besides being quite essential, since without an ADD circuit there could be no arithmetical processes at all, but yet with that circuit all arithmetical processes then becoming possible, the structuring of the ADD circuit also provides quite a few lessons in the art of structuring IL circuits, and hence will be treated in considerable detail. There are more simple ADD circuits that could have been used as an example (e.g., see Lin, supra, p. xx), but it was elected to use an ADD circuit construction that would involve some real structuring problems so as to demonstrate more fully the IL structuring process.

As a part of that process, it was also elected to develop a structure that could be compacted so as to fit a half-adder onto a single page, which in itself results in a number of constraints that would otherwise not exist, but was deemed worth doing in order to demonstrate the kinds of structuring difficulties that might arise, and when they did how to resolve them. (In the interest of that compactness, great effort was expended to structure an ADD circuit within just two IC levels, which effort did in fact succeed as will be seen below.) The choices to be made in structuring an ADD circuit are quite numerous, and it is not possible at present to show what any "best" mode, if there is such a mode, might be, especially since the PS 100 that a user was designing, in light of the nature and size of the algorithms that would need to be treated, might well impose other constraints that at present could not be anticipated. Consequently, the ADD circuit as structured here should be taken as being just one of quite a large number of different possibilities. The basic point to be made, then, is simply that an ADD circuit, as a representative of the sequential rather than combinational class of circuits, also falls within the range of circuitry that IL is capable of structuring and using in what then becomes a complete Instant Logic™ apparatus.

This process begins with the drawing of FIG. 69, sheet 35, which is an icon level version of an ADD circuit from the prior art, as specifically adapted from Jacob Millman, *Micro-Electronics: Digital and Analog Circuits and Systems* (McGraw-Hill Book Company, New York, 1979), p. 173. Just as simply taking up some standard circuit version as written and setting out to adapt that circuit to IL was found in the latch example discussed earlier not always to be the best approach, so likewise can the taking up even of a carefully selected circuit version and then starting to enter lines and codes onto the template of FIG. 2 not be well advised. (Even in the course of this present structuring the ADD circuit of FIG. 69 will undergo some substantial changes, based on taking advantage of some specific features of IL that derive from the basic freedom to place any circuit at any location that seems advantageous, as long as the integrity of the basic circuit itself is not compromised, by which is simply meant that the same signals end up in the same places, regardless of how they got there.)

Before proceeding any further with the structuring, however, it may be noted that as to sequential circuits in general, there is one major advantage of Instant Logic™ (IL) that is lost to some extent when carrying out arithmetical functions, but that derives from the nature of those functions, i.e., from the nature of sequential processes, and not from any characteristic of IL itself, since the same thing occurs in conventional computers (but to no effect, since the circuit is locked in place in any event). One major hallmark of IL, as described earlier, is that as soon as an LN 102 that had been structured as part of a circuit has been used in a particular role, i.e., for the specific IP purpose for which that LN 102 had been structured into a circuit, that LN 102 can be left intact if needed again, but can also be immediately de-structured and restructured for some other purpose, the quite unreachable ideal goal being that at no time should any LN 102 be sitting idle. (The goal is "unreachable" except in special cases because the circuits that end up being structured seem inevitably to leave a few LNs 102 "surrounded" and not accessible for use.) In the simple latch treated earlier, data would be stored therein for times that would vary, depending upon the needs of the algorithm, i.e., until those data came to be needed for some new purpose, and the data would then be extracted whereby the LNs 102 that had formed the latch would at that time become available for other use. It is that feature that makes a circuit sequential, wherein what the next action of the circuit will be depends upon the "history" of what had been done before. Thus, in the single 2-bit parallel ADD circuit to be shown here, account must be taken of whether or not there had been a carry bit produced in the previous stage.

Even so, there will still be a point in time at which in using IL a part of an n-bit ADD circuit can be de-structured and then restructured for further use. Concerning the need for such a capability, the 2-bit ADD circuit shown here contains about 150 LNs 102 alone, so an 8 bit ADD circuit would occupy quite a large amount of "real estate" indeed, let alone a 16- or 32-bit full adder. Consequently, in spite of the "ADD" process being sequential, in IL new stages of an n-bit ADD circuit can still be getting structured as earlier parts thereof have been freed up and become available for use (perhaps by "running in circles"), thereby to "tie up" a lot fewer LNs 102 than would be required in any kind of conventional binary logic—an ADD circuit could be structured and operated that would have an n value as large as could never even be considered under the prior art, and could operate as long as one wished, that would certainly open up new mathematical avenues, especially in numerical investigations that would be totally impracticable when using the usual computers, or even supercomputers.

Most circuits that go beyond the basic ones shown so far herein will be based on some kind of "plan of attack," if not on a structural basis as being a composite of simple gates as in the XOR gate, then on a functional basis as to the arrangement of different procedures in different areas of the structure, such as carrying out mathematical operations at one location and other kinds of data manipulation such as sorting somewhere else. (In this ADD gate, the two NOR gates are placed side by side, and then the issue is taken up of how to get them properly interconnected.) Of course, the latter procedure would require a deep enough analysis of what is taking place within the circuit to recognize whatever the subtasks therein might be. Blind "trial and error" will not serve, or even if that procedure eventually did "work out," it would still have entailed a substantial waste of time and effort.

The most general "rule" in the structuring of IL circuits is thus to (1) know the circuit very intimately; and (2) develop a specific "plan of attack" based on that knowledge. (When attempting to structure this ADD circuit in the first experiment, it took some time to realize that if two lines were structured in parallel but in different levels, if those lines were then to be crossed by any other connections, those crossing lines would have to be put into a third level, which is precisely how the two input lines to the ADD circuit both came to be structured in Level 1.) That particularly includes knowing the direction of signal flow on every line, since when using inverters, which will often be the case in IL circuits where pairs of inverters are used to maintain the signal strength, particularly when using a bridge, the "forward" direction of those inverters must comport with that direction of signal flow. That inverter issue is of course well known, but IL requires that such issues be paid close attention—IL involves a new art that must be learned.

Moreover, in sequential processes new data cannot be entered in every cycle along the same transistor sequence, as was the case in the string of inverters discussed in connection with FIGS. 5 (sheet 5) and 6 (sheet 6) that had to do with setting the timing of the various circuit structuring and data inputs. From the prior art iconic drawing of an ADD circuit shown in FIG. 69 (sheet 35), and based on the earlier discussion of the cycle-by-cycle operation of circuits such as that inverter string, it can be seen that as to a single addition in that ADD circuit of FIG. 69 the full execution of an ADD operation will require quite a large number of IL cycles. What was earlier termed the "bit rate," i.e., the frequency at which data bits would be entered into the circuit, must then be but a fraction of the operating rates of the LNs 102 themselves in the case of strictly combinational logic operations. Much more so than in combinational logic IL operations, any kind of speed comparison between different ILA devices, or of an ILA with a conventional computer, must then specify how much of the work was arithmetical and how much logical.

As an essential part of disclosing how the invention can best be used, it is necessary to describe how the structuring of an IL circuit would be carried out, and a detailed description of how this ADD circuit was structured will now be given, even though that could not be claimed to be the best possible way to structure an ADD circuit, since the circuit shown is nevertheless the best that has been accomplished to this point. Quite a few places will be seen in which choices had to be made, and although the particular choices made may not have been the best, they will still be the best that could be discerned at the time, and the criteria used to make those choices will be stated. In this ADD circuit, much more so than in other more simple circuits, perhaps dozens of different versions of the circuit might come about, whether by way of having started out with different circuit constructions or from different ways of structuring a circuit having a particular construction. It will no doubt only be as a result of long experience that the "best" of such versions will likely be found. It is easy enough to find a connection that will reach from point "A" to point "B," but it can be much more difficult to find such a connection that will also leave possible the most efficient "next" connection, from point "B" to point "C." Just as it is possible to structure the circuit into a corner, so can one structure the circuit into an internal "black hole" from which there is no escape. (That would indeed have been the case as to the SUM output of this circuit were it not for having a second level available.) There will be cases in which an apparent blockage can be overcome by "looping" around some large portion of the circuitry, however, as was seen in the structuring of the common latch earlier.

In FIG. 69 (sheet 35), the full prior art ADD circuit is shown, but since the second half-adder is identical to the first half-adder except as involves the means by which the two half-adders are interconnected, and also that the second half-adder does not use inverted inputs, the entire second half-adder need not be shown, so only such portions thereof that show those differences will be presented. Only the leftward half-adder in FIG. 69 will be shown in its entirety and fully described, specifically in the iconic form of FIG. 70 (sheet 36). Although FIG. 70 does duplicate the half-adder of FIG. 69 electronically, the structuring of that leftward half-adder as there shown will be modified in FIG. 70 from a literal reading of FIG. 69, in order to take advantage of the IL structuring techniques, with the components thereof being labeled with letters of the alphabet and the connections being numbered in the order in which the structuring of each connection was described in this text.

For that first half-adder, figures are then provided for both the lower Level 1 (FIG. 71 (sheet 37)) and the upper Level 2 (FIG. 72 (sheet 38)), marked as Circuit 13 only on those two figures. In FIGS. 73-74 (sheet 39) and 75-76 (sheet 40), the respective lower and upper rows of the first and second levels of both half-adders will show the modifications that were made so as to join those two sides together, together with a modification that permitted access to the full ADD circuit SUM ($S_1$) output. The two sides as so joined will be shown in FIG. 77 (sheet 41), and finally FIG. 78 (sheet 42) will illustrate in a perspective view of an "open" 3-D PS 100 the complete circuitry of the two levels of that leftward half-adder, including the posts that interconnect those two levels and a number of arrows on the various lines and posts so as to display the complete half-adder operation.

That the ADD circuit will require at least two levels seems immediately obvious, as suggested by the number of interconnects on the left side of the prior art ADD circuits of FIGS. 69 and 70 that cross over one another. What is not clear at a glance, however, are the exact points at which the structuring must use another level. The initial entering of lines must be taken up with a specific view towards determining when the need for another level will arise. The only apparent way to determine whether or not additional levels well be needed, and if so, at what point must that second level be brought in, seems to be to begin laying out the circuit in the usual manner of IL in just one level until some kind of unavoidable blocking appears that would force the structure into a second level, while of course also avoiding connections that seem to be aimed towards a blocking situation. That situation will of course require the use of Posts 326, and in the course of using those Posts 326 certain self-imposed rules that seem judicious to follow will appear that will impose further limits on how it will be possible to proceed.

In order to avoid confusion later, the relationship between the numbering of the inputs to an AND gate or any other circuit having more than one input in series when shown in iconic form or at the transistor level needs to be clarified. In a gate level representation of an AND gate, the upper input is usually the "first" and any inputs below that the "second," "third," etc. When shown vertically, or especially when shown horizontally as here, there has been at least some tendency to designate the lower (or here the leftward) input to a transistor level drawing of an AND gate as being the first input and then to count upward, so that in a 2-bit AND gate those inputs that are closer to $V_{dd}$ would be the second, third, etc., inputs, which is opposite to what was just said as to the iconic drawing. Since this analysis seeks to convert the iconic form into a transistor-level version, those definitions of "first" and "second" that start with the first connection being that nearest $V_{dd}$, then to count downward (or in this case leftward) will continue to be followed.

There will be a difference between the iconic ADD circuit as shown in FIG. 69 and both the gate level version in FIG. 70 and the transistor-level versions thereof in the two levels of FIGS. 71-72 that goes beyond just that change to a transistor representation. In FIG. 70 there are two NOR gates labeled as "E" for the first 4-bit NOR gate and "I" for the second 3-bit NOR gate. In a literal conversion to the transistor form using IL procedures the structuring would proceed from the Conn. 1 line just completed either with an inverter to the right thereof so that the group of LNs 102 just interconnected would form into a NOR gate as shown in FIG. 69, or turn leftward to start connecting up the outputs of that series of circuits, that would be on the DR 108 terminals of the rightward LNs 102 thereof, i.e., the 3,2, 3,3, 3,4, and 3,5 LNs 102. Since the actual AND gate outputs would appear on those DR 108 terminals, and only one inverter is needed to convert an OR gate into a NOR gate, the rightward connections from the AND gate outputs would be made through BYPASS gates, since otherwise the AND gate outputs would end up being inverted twice.

That process would entail the use of two columns of LNs 102, i.e., the column that was used to structure that one inverter to the right of the column of LNs 102 that carries Conn. 1, and then another column in which those BYPASS gates would appear. However, nothing prevents acquiring that one inversion required by way of structuring the LNs 102 that take off the AND gate outputs as inverters instead of BYPASS gates, and then leaving out that inverter that would be rightward of that Conn. 1 line. A set of parallel AND gates that are connected together at the outputs thereof to form an OR gate, with that OR gate then being followed by an inverter as shown in FIG. 69, is electronically no different from a set of parallel NAND gates with joined outputs. Consequently, both the "E" and the "I" NAND gates shown in FIG. 69 will be structured in that latter manner, thereby eliminating the need to use one column of the LNs 102. Except when deliberately adding in an LN 102 so that the LNs 102 on either side thereof can be joined, as was done in the XOR gate of FIG. 51 (sheet 24), if possible to do so that last LN 102 from which the circuit output is taken that is then to be entered into an inverter might itself be made into an inverter, thus to eliminate the inverter to which that output was then to go. (That was not possible in the present case since the LNs forming the first inputs to those AND gates each had inputs to the SO 112 terminals thereof and thus could in no way be made into inverters.)

As an example of how choices made initially can have unanticipated consequences, near the upper right corner of FIG. 71 the two input LNs 102 of each of the "A," "B," and "C" NAND gates, and the top two inputs to the "D" NAND gate, are shown to extend in a straight horizontal line (on the paper), that since both the first and second inputs have lines coming in to them from the left, will obviously require a "bridge" into a second level since otherwise no line coming in from the left could reach those first or rightward inputs. (That is, unless a row had been left blank alongside each NAND gate, but since another vertical line (on the paper) would still be needed to interconnect the first inputs to the "A" and "F" NAND gates, which line would need to be put into a bridge in any event, there seemed to be little point in providing those blank rows.) To have structured those NAND gates vertically on the paper would resolve that issue, but would then require the use of a second level in order to interconnect the second inputs to those three NAND gates. (In addition, such a totally vertical manner of structuring those NAND gates would require as many rows as there are LNs 102 in all of the NAND gates, which would be nine rows, as much as is presently used to depict the entire ADD circuit, and thereby cause the figure to be rendered on too small a scale to be readable.) In other words, every line must be drawn so as to avoid resolving one problem at the cost of creating a worse problem. A plan for the structuring that would project ahead to incorporate whatever additional connections would be required should be worked out as early as possible in the drawing process.

As seen earlier with the latch, however, what appears to be a need for another level may not always be so. The manner in which the first "A"-first "F" input connection just noted is made turns out to eliminate an apparent need for another vertical line, which as it happens was of no great gain since there is another vertical line parallel to the one eliminated, so a bridge was required in any event, but the same could occur wherein that was not the case, and hence should be borne in mind. It should also be pointed out that the only thing accomplished by that first "A"-first "F" input connection other than the connection itself is that a line present in FIG. 69 has been moved rightward in FIG. 70 so there is but one vertical line between that collection of AND gates and that second line to the right in FIGS. 69, 70 rather than two. To that extent, FIG. 69 is misleading in what it presents.

As a practical matter, once it is determined that a circuit has connected the various lines together as they should be, the further layout of the circuit as carried out in the prior art seems to have rested somewhat on aesthetic grounds, so as to look like a neatly organized structure, but such drawings ought not to be read literally. The earlier discussion of how different constructions of an XOR gate can be realized should also be kept in mind. Even in conventional electronics it is not necessary to make a connection at the very same point as may be shown in a drawing, if for electronic purposes some other point that is connected to the point shown in the circuit would serve just as well, and instances of so doing herein will be noted. That possibility should always be examined since, as will be seen several times in the ADD circuit, a new point of connection might be found that would allow a circuit to be structured that at first glance seemed impossible, or that different point of connection can at least render the following structuring much easier.

With all of that having already been done, such structuring as may be necessary to obtain the desired connections in the second level is then carried out, and then the structuring is returned to the first level. In the interest of having the heat production spread out as much as possible, it would no doubt be appropriate to distribute the circuitry evenly between the two or more levels in any event, but just as in any other area of electronics, "trade-offs" will be required, e.g., in seeking the shortest and most efficient signal paths that even way of distributing the heat sources may not come about.

But before getting into the details of the ADD circuit structuring, it is noted again that the construction of the LN 102 terminal—SPT 106 connections in the basic PS 100 LNs 102 must be such that any terminal on one LN 102 can be connected through the appropriate SPT 106 to any terminal on an adjacent LN 102, without interference from the lines to any other SPT 106 and the connections of such a second SPT 106 (whether enabled or not) to both LNs 102. This issue arose earlier since from the layout of the PS 100 array in FIG. 2 (sheet 2) it appears, for example, that a connection from a SO 112 terminal to a rightward gate 110 or DR 108 terminal would cross over an SPT 106 line from the leftward DR 108 or GA 110 terminal to the rightward SO 112 terminal.

That situation presents no problem in the realm of a macro-PS 100 in which discrete transistors would be used, but in an IC provision must be made to separate those SPT 106 lines, most likely by a multi-layer structure having a different layer for each of the three LN 102 terminals. (The way in which that separation is accomplished initially will be shown later in FIG. 62 (sheet 31), in which the lines to and from the SPTs 106 have been separated vertically.) In structuring the ADD circuit it is assumed that such connections could be continued on, e.g., by providing both the "One Level First Connection Layer" (1 CL1) 350 and the "One Level Second Connection Layer" (2CL1) 356 connection levels of the 2,6VIC 342 in FIG. 60, or the "Two Level First Connection Layer" (1 CL2) 374 and the "Two Level Second Connection Layer) (2CL2) 382 of the VIC1 356, each with separate DR 108, GA 110, and SO 112 layers within each such connection level, these would all be electronically separated from one another but yet have means for connecting to any terminal at each end thereof. Such a number of connections would no doubt decrease the LN 102 density that could be achieved in PS 100, so there will again be some disadvantages in the Instant Logic™ technology along with the advantages, it being taken, however, that the advantages will far outweigh such disadvantages. As noted, the means employed for such separation would no doubt lie in the SPT 106 lines themselves, whether by that multi-layer method or otherwise, that would permit connection to the designated OT and RT terminals, not only direction-wise (as to which LN 102 to go to) but also as to the appropriate terminal. (The highly conductive and fine scale material graphene ("Graphene's Unique Properties Offer Much Potential," *APS News*, Vol. 15, No. 5 (May 2006), pp. 1, 3) would very likely be a good candidate for those wires.)

Each node (LN 102) in these figures will have coordinates applicable thereto defined in terms of the column and row in which the LN 102 appears, e.g., the LN 102 in the fourth column and sixth row would have the coordinates (4,6). Those numbers begin at the upper right-hand corner of the figure and increase right-to-left as to the columns and downward as to the rows, with the column number being shown in the upper right corner of each LN 102 "box" and the row number being in the lower right hand corner thereof. (That right-to-left direction was chosen since, as will be explained below, to carry out the actual structuring from right to left was clearly the least problematic manner in which to proceed.)

Thus, in the transistor level ADD gate drawings of FIG. 71 and thereafter, for those NAND gates the Column (Col.) 3 LNs 102 nearest to $V_{dd}$ are designated as having the "first" inputs as noted above, and the Col. 4 LNs 102 are the second inputs. Also, in order to be able to keep track of the line segments, even as these are distributed between levels, encircled numbers called "Connection Numbers" (Conn. 1, Conn. 2, etc.) are placed within those line segments, and likewise in the line segments and gate icons in the iconic version of FIG. 70, so that the line segments and gates in FIG. 70 can be identified to the lines in the transistor level drawings. (The numbers of the particular SPTs 106 that were used, as defined in FIG. 2 (sheet 2) will also be shown in those lines within small boxes.) A numbered listing of these connections is provided in Table XXI further below, following this complete description of the ADD circuit structuring, that will follow the order in which the connections are described herein, with each path number being carried through whatever excursions between levels as might have occurred.

The detailed structuring will be shown in eight figures, i.e., (1) a transistor-level drawing of a first level of the leftward half-adder in FIG. 69; (2) a transistor-level drawing of a second level of that half-adder; (3) and (4), transistor-level drawings of those upper and lower parts of the leftward half-adder that were needed to depict the interconnection means; (5 and 6) similar transistor level drawings of those upper and lower parts of the rightward half-adder, as likewise needed; (7) a composite drawing showing the actual inter-half-adder connection; and (8) a perspective view of a 3-D PS 100 that includes all of the circuitry just noted.

As noted earlier, considerable effort was expended to create a design in which no third level would be needed. What appeared as though it was going to be a major problem was that of connecting the two half-adders together. Since the points needing to be accessed for the connection between the half-adders turn out to be accessible from the boundary of each half-adder, and any circuit can be structured to have whatever position relative to another circuit as may be desired, that connection turns out to be easily made. As will be shown in detail later, the two half-adders are laid out side by side, but shifted by one position, so that the two points needing interconnection are facing one another across just a single unused LN 102 in the leftward half-adder, with the actual connection itself being made in Level 2.

The structuring is best pursued by starting out in a region of the circuit where the need for another level seems least likely to arise, and then proceeding with structuring in that first level until the need for another level does arise. The need arises, of course, when a structuring path sought to be taken is seen to encounter an LN 102 that has already been used, and no other route is available. Because of the numerous crossing lines on the left side of each half-adder of FIG. 69 (sheet 35), the structuring of the transistor-level version of the leftward half-adder, shown in FIG. 71 (sheet 37), begins at the right side of the upper left part of FIG. 69 with the upper 4-bit NOR gate (which has come to be the "E" OR gate of FIG. 70 (sheet 36)). It was also the "strategy" to structure the two main parts of the circuit first, which are the two OR gates.

The first figure (FIG. 71) shows Level 1 of the leftward half-adder, and is started with the four branches of the "E" NOR gate, using the LNs 102 in Col. 2 and rows 2, 3, 4, and 5. This "E" OR gate was started at Col. 2 and row 2 since projection ahead shows that Col. 1 and row 1 will be needed later in order to make connection from the output of the "I" OR gate to the second input to the "C" NAND gate—an example of the "looping" noted above. Upon having structured the NAND gates themselves, the structuring of the "E" OR gate will then require only the interconnection of the DR 108 terminals of those four 2,2, 2,3, 2,4, and 2,5 LNs 102.

The OR gate structuring is thus initiated by the connection line ("Conn.") marked by a 1D bit within a circle that is placed within each of the lines thereof that interconnect one DR 108 terminal of an LN 102 to the drain 108 terminal of another LN 102. Structuring upwardly, the first such connection uses the 13 SPT 106 on the DR 108 terminal of the 2,5 LN 102 to reach up to the like terminal on the 2,4 LN 102, from that terminal another 13 SPT 106 is used to reach the like terminal on the 2,3 LN 102, and then finally the 13 SPT 106 on that terminal is used to connect up to the 2,2 LN 102, thus to structure the four branches of what is to be the OR gate "E" of FIG. 70 into an OR gate-like structure and to form Conn. 1 (that will actually provide the ADD circuit output $S_1$ shown in FIGS.

69-70 and is so listed as the first entry in Table XXI and marked off by an encircled "1" bit in the "E" gate icon in FIG. 70. (See FIG. 2 (sheet 2) for these SPT 106 numbers; Table XXI is shown following the completion of the entire ADD circuit structuring.)

As noted above, the SPT 106 number is shown in a darkened box on each line, past the Conn. numbers in the direction of structuring, those circles being more near to the terminal at which the connection was initiated. $V_{dd}$ is shown above the 1 CPT 104 near to each LN 102 that is actually powered up, but is not shown on those LNs 102 that are either not used at all, are used as a BYPASS gate, or will naturally not have $V_{dd}$ applied, as in the second or further inputs to an AND gate. Except for possible overload, only one such $V_{dd}$ would have been needed to be shown in this context since again, all four NAND gate LN 102 outputs are connected together at the DR 108 terminals thereof.

The inputs of those four branches of OR gate "E, which are the inverters atop each NAND gate as the circuit has been so modified, pass through the 5 SPTs 106 of the respective inverter 3,2, 3,3, 3,4 and 3,5 LNs 102 to enter through the GA 110 terminals of each of those Col. 2, rows 2-5 LNs 102, which inverters have made the Col. 2, rows 2, 3, 4, and 5 OR gate interconnection sequence (Conn. 1) into a NOR gate, as described above. That is, the DR 108 terminal outputs of the respective Col. 3 "A," "B," "C," and "D" inverters, which are also the first inputs to and yield the outputs from the NAND gates as formed from the AND gates of FIG. 69 in this version of the circuit modified by those inverters, form the horizontal Conns. 2, 3, 4 and 5, each having a 5 SPT 106 from each of the four LNs 102 having the respective 3,2, 3,3, 3,4 and 3,5 coordinates, over to the Col. 2 LNs 102 of Conn. 1, and are so listed in Table XXI. Of course, each of those NAND gates will connect to $V_{dd}$ through the respective DR 108 terminals of the "A," "B," "C," and "D" inverters, and will connect to GND through the 3 CPTs 104 from the SO 112 terminals of the second inputs to the respective "A," "B," and "C" NAND gates, and similarly as to the third input to the "D" NAND gate.

Those four NAND gates themselves are formed by the respective Conns. 6, 7, 8, and 9, as also so listed in Table XXI, that connect from the DR 108 terminals of the respective Col. 4, rows 2, 3, 4, and 5 LNs 102 that form the second inputs to the respective AND gates, through the 6 SPT 106 on the DR 108 terminals of each such LN 102 to the SO 112 terminals of the respective right adjacent Col. 3 LNs 102, which form the first AND gate inputs as noted above, with Conn. 9 also extending on to include connection from the DR 108 terminal of the 4,6 LN 102 up to the SO 112 terminal of the 4,5 LN 102, through the 15 SPT 106 of that 4,6 LN 102.

(Since the purpose of the Conn. numbers is to allow the path of a particular connection to be traced out with greater ease, the same number will be used for all steps of the connection, as in this 3-bit D NAND gate that requires 2 segments (from the 4,6 LN 102 to the 4,5 LN 102, and then from the 4,5 LN 102 to the 3,5 LN 102), or in the "E" NOR gate that required three segments (the 2,5 to 2,4, 2,4 to 2,3, and 2,3 to 2,2 LNs 102). As will be seen shortly, that practice is particularly useful when the connection is passing back and forth between levels.)

With reference to what now follows concerning the use of BYPASS gates, it may be recalled that when a terminal (usually the DR 108 terminal) of an LN 102 is being used to form a BYPASS gate where there must be one line coming in to the terminal and another line coming out, in order to emphasize the actual signal path in these figures only that part of the terminal that lies between those incoming and outgoing lines is darkened as being a part of the signal path, and the parts of the terminal on both sides of those connection points are not darkened, since not being part of the signal path, even though it is obvious that a voltage applied to one part of an electrically conductive terminal will be felt throughout that terminal. (With respect to matters of RFI, capacitive and inductive reactances, and the like, it should be recognized that a voltage placed on a terminal will also be felt through the full lengths of all of the lines that connect to that terminal, extending all the way out to the near terminal of the SPTs 106 that will be on each of those lines, beyond which the SPT 106 itself would be nonconductive unless enabled. That procedure in which the parts of a terminal that are not directly within the signal path are not darkened is not followed even if the LN 102 has the appearance of being a BYPASS gate if that LN 102 has already been powered up for some other purpose. By definition, no part of a "powered up" circuit, i.e., an "energized" LN 102, can be a BYPASS gate. An example of such a case can be seen in the 4,2, 4,3, and 4,4 LNs 102, that have double line, double connections on the terminals thereof as does a BYPASS gate but yet those LNs 102 are functioning as second inputs to the "A," "B," and "C" NAND gates. The origin of those second connection to those terminals lies in Conn. 10, that will now be described.

Those Conns. 1-9 complete the "E" NOR gate, but as noted earlier the second inputs to the three "A," "B," and "C" NAND gates are also to be interconnected together so that all of them will receive the same input (which is a carry bit, if any, from the second half-adder). The GA 110 terminals of the Col. 4, rows 2, 3, and 4 LNs 102 are thus to be interconnected, so that task will be finished up before turning to the next major structure, which will be the "I" NOR gate. Those second input LNs 102 lie in a straight vertical line in Col. 4, along which there are no other LNs 102 intervening, so Conn. 10 is made simply by using the 17 SPT 106 on the GA 110 terminal of the 4,4 LN 102 to reach up to the GA 110 terminal of the 4, 3 LN 102, and then the 17 SPT 106 on the GA 110 terminal of the 4,3 LN 102 is used to connect up to the GA 110 terminal of the 4,2 LN 102, thus to form the entirety of Conn. 10 as listed in Table XXI.

The next connections will be for the "I" NOR gate, and can be treated very quickly, since besides lacking a fourth branch that gate is identical to the "E" NOR gate. The OR gate connection will be made first as Conn. 11, and is made by the 13 SPT on the DR 108 terminal of the 2,9 LN 102 extending up to the DR 108 terminal of the 2,8 LN 102, and then a second 13 SPT 106 thereon that reaches up to the DR 108 terminal of the 2,7 LN 102, by which the outputs of what will be the "F," "G," and "H" NAND gates become interconnected, from which the "I" NAND gate will result upon structuring those three NAND gates, thereby completing Conn 11 as noted in Table XXI.

Connections 12, 13, and 14 are made respectively by a 5 SPT 106 extending from the DR 108 terminal of the 3,7 LN 102 to the GA 110 terminal of the 2, 7 LN 102; by another 5 SPT 106 extending from the DR 108 terminal of the 3,8 LN 102 to the GA 110 terminal of the 2, 8 LN 102; and finally by another 5 SPT 106 extending from the DR 108 terminal of the 3,9 LN 102 to the GA 110 terminal of the 2, 9 LN 102, the leftward ones in each such pair being the first inputs to what will be the "F," "G, and "H" NAND gates, with the rightward ones of each pair each being an inverter that converts what will be the respective "F," "G, and "H" AND gates into NAND gates. Those Conns. 12, 13, and 14 are then likewise listed in Table XXI. Again, each of these NAND gates will connect to $V_{dd}$ from the respective DR 108 terminals of the 2,7, 2,8, and 2,9 LNs 102.

Those “F,” “G, and “H” NAND gates will be completed by structuring the second inputs thereto, which will be Conns. 15, 16, and 17, respectively. These are made by a 6 SPT 106 that extends from the DR 108 terminal of the 4,7 LN 102 to the SO 112 terminal of the 3,7 LN 102, thus to complete the “F NAND gate (with the DR 108 terminal of the 3,7 LN 102 being connected to $V_{dd}$ and the SO 112 terminal of the 4,7 LN 102 being connected to GND). The “G” NAND gate is similarly completed (with like $V_{dd}$ and GND connections) by the 6 SPT 106 on the DR 108 terminal of the 4,8 LN 102 being connected to the SO 112 terminal of the 3,8 LN 102, and then with the corresponding $V_{dd}$ and GND connections for the “H” NAND gate being present, that NAND gate is completed by the DR 108 terminal of the 4,9 LN 102 being connected to the SO 112 terminal of the 3,9 LN 102. These Conns. 15, 16, and 17 are likewise listed in Table XXI, and complete the structuring of the “I” NOR gate.

With those two “E” and “I” NOR gates now being present, and the second inputs to the “A,” “B,” and “C” NAND gates being interconnected through Conn. 10, it now becomes possible to connect one of the input nodes of the “E” NOR gate, that according to FIG. 69 (sheet 35) would be the second input to the “C” NAND gate, to the output of the “I” NOR gate. That would be Conn. 18, but because of the convenient access to the second input of the “A” NAND gate, and the interconnection of those second inputs through Conn. 10, the second input to the “A” NAND gate will be used instead. It was for this purpose that the “A” NAND gate was initiated at the 2,2 LN 102, i.e., to leave a path to the output of the “I” NOR gate. (It can be seen in FIG. 69 that the output of the “I” NOR gate is indeed the only source of second inputs to the “A,” “B,” and “C” NAND gates.)

The required connection will be made by Conn. 18. A complication arising from the foregoing is that the output of the “E” NOR gate must also be extracted, that output indeed being the output not only of the left half-adder but also of the entire ADD circuit, and the Conn. 18 as will shortly be structured in Level 1 will entirely surround that “E” NOR gate output. As will be shown shortly, however, that circumstance will be easily resolved through the use of Level 2. As in the “E” NOR gate, the “I” NOR gate output could be taken from any of the 2,7, 2,8, or 2,9 LNs 102 that make up Conn. 11, but the 4 SPT 106 of the 2,7 LN 102 will be used since that 2,7 LN 102 is the closest to the second inputs of the “A,” “B,” and “C” NAND gates, of which for the same kind of reason the second input to the “A” NAND gate will be used, as the closest possible point of contact. The 4 SPT 106 on the DR 108 terminal of the 2,7 LN 102 extends rightwardly to the DR 108 terminal of the 1,7 LN 102, from which the 18 SPT 106 thereon is used to connect up to the DR 108 terminal of the 1,6 LN 102. While the 1,7 LN 102 was thus used as a BYPASS gate, in some places along the route of Conn. 18 inverters will be used instead in order to maintain the signal level, and the 1,5 LN 102 will be one of those inverters. That is, the 14 SPT 106 on the DR 108 terminal of the 1,6 LN 102 extends up to the GA 110 terminal of the 1,5 LN 102, from which the output thereof is taken from the DR 108 terminal thereof through the 13 SPT 106 thereon on up to the DR 108 terminal of the 1,4 LN 102.

Another inverter is formed in the 1,3 LN 102 by taking the input thereto at the GA 110 terminal thereof from that DR 108 terminal of the 1,4 LN 102 through the 14 SPT 106 thereon, with that 1,4 LN 102 serving as a BYPASS gate, the output of the 1,3 LN 102 of course being taken then from the DR 108 terminal thereof. While the 1,6 and 1,4 LNs 102 both served as BYPASS gates, the 1,5 and 1,3 LNs 102 make up a pair of inverters, whereby the signal bit appears at the DR 108 terminal of the 1,3 LN 102 just as that signal bit had left the DR 108 terminal of the 2,7 LN 102. From that DR 108 terminal of the 1,3 LN 102 the 13 SPT 106 thereon takes the signal on up to the DR 108 terminal of the 1,2 LN 102, which then serves as another BYPASS gate by using the 13 SPT 106 on that DR 108 terminal, at which the signal had been received, to take the signal on up to the DR 108 terminal of the 1,1 LN 102.

At this point the structuring turns leftward through the 2,1, 3,1 and 4,1 LNs 102, then to drop down one row to reach the second input to the “A” AND gate, the required destination. The 2, 1 and 4,1 LNs 102 are both used as inverters, and since the signal is coming in from the right, the orientation of those two LNs 102 have been changed so as to have the GA 110 terminals come in from the right to meet that signal direction, rather than from the left, which would require looping the connecting line around the LN 102 in order to make the connection. That change of course has no effect whatever on the actual LNs 102 in the PS 100, and a person of ordinary skill in the art will be able to interpret what occurs at those two LNs 102 just as easily as in the usual case where the GA 110 terminal would enter the LN 102 from the left.

To start that sequence, therefore, the 7 SPT 106 on the GA 110 terminal of the 2, 1 LN 102 is used to connect back to the DR 108 terminal of the 1,1 LN 102. The leftward 3,1 LN 102 then uses a 4 SPT 106 on the DR 108 terminal thereof to connect to the DR 108 of the 2,1 LN 102, and the 4,1 LN 102 then uses another 7 SPT 106 to connect from the GA 110 terminal thereof to the DR 108 terminal of the 3,1 LN 102. Connection to the 4,1 LN 102 is then from below by way of the 16 SPT 106 on the GA 110 terminal of the 4,2 LN 102, that being the destination which brings the output of the “I” NOR gate to the second input to the “A” NAND gate, and thus to complete Conn. 18 as shown in Table XXI.

A good many of the connections to follow will involve the use of Level 2 bridges, so before getting into those it seems advisable to provide here a more detailed description of the Posts 326 involved. (Plates 324 have not been included in the foregoing discussion since it is assumed that their role in contacting a Post 326 from below and then imparting the signal thereon to the Post 326 attached to that Plate 324 in the level then being discussed is by now well understood, it thus being somewhat of a waste of space to reiterate their presence every time a Post 326 is mentioned. References to a “Post 326” should then be taken to include the Plate 324 as well.) But to clarify that arrangement, the connection of those Posts 326 from one level to another comes about from the lower end of a Post 326, and specifically Bead 360 on that upper Post 326, coming into physical and electrical contact with a Recess 362 within a Plate atop a lower Post 326, Recess 362 being an indentation in that Plate 324 that had been sized to accept the Bead 360 of the upper Post 326. That arrangement constitutes the inter-level connection mechanism, with there Initially being no connections from any Post 326 (or more accurately, any Plate 324) to any terminal of any LN 102. The physical contact is made when the two levels are brought together, either in manufacture when using a two-level IC or when constructing an IL apparatus if separate ICs are being used. Electrical connection from an LN 102 in the lower level and an LN 102 in the upper level comes about from enabling an “Interconnect PT” (IPT) 322 in each level that extends from the Plate 324 in a level to a terminal of the LN 102 in that same level. Some added resistance will come both from the Post 326 itself and from the juncture between a Bead 360 and a Recess 362 in particular, which again is the reason for using quite a few inverter pairs in any bridge circuit.

Those IPTs 322 are provided that will connect the Plate 326 that is near to an LN 102 terminal to that terminal on the LNs 102 at both ends of the bridge. For reasons of space, the double circle used to represent a "Conn." (and having the Conn. Number therein) is meant to represent both the Post 326 and the Plate 324, Post 326 itself (represented by the inner circle) extending upward therefrom as to the lower level or downward therefrom as to the upper layer, and the IPT 322 is shown as a separate little box connecting Plate 324 and the included Post 326 to the appropriate LN 102 terminal, in FIG. 65 or thereafter, and also in FIGS. 1 (sheet 1) and 2 (sheet 2).

The next connection, Conn. 19, will extract the output of the "E" NOR gate, which is also the SUM ($S_1$) of the full ADD circuit of FIG. 69. Because of the nature of an OR (or NOR) gate as seen in the interconnection through Conn. 1 of the outputs of the "A," LB," "C," and "D" AND gates, the last of these being at the 2,5 LN 102, that 2,5 LN 102 is also an output of that "E" NOR gate, the connections for which will be treated now so as to continue on with the structuring in this particular portion of FIG. 71. It happens that although the 2,5 LN 102 in Level 2 will be used shortly, the 2,6 LN 102 is not only not in use in either level, but in Level 2 has long sequences of unused LNs 102 passing by, so that upon connecting to a Post 326 at the DR 108 terminals of the 2,6 LNs 102 in both levels, there will be opportunity thereafter in Level 2 to direct that $S_1$ output to any destination desired. Completion of Conn. 19 then rests only in a connection from the DR 108 terminal of the 2,6 LN 102 through the 13 SPT 106 thereof to the DR 108 terminal of the 2,5 LN 102 from which the SUM output derives, and then the enabling of the IPT 322 at the DR 108 terminal of that 2,6 LN 102 in both Levels 1 and 2, thereby to place that output on that DR 108 of the 2,6 LN 102 in Level 2 for further connection, thus to complete Conn. 19, as noted in Table XXI.

Conn. 20 connects the first input to the "B" NAND gate, at the 3,3 LN 102, to a line in Col. 7 that carries the first input to this ADD circuit, i.e., at the 7,3 LN 102. Since the 4,3 LN 102 provides the second input to that "B" NAND gate, that LN 102 is not available, hence it becomes necessary to connect up to Level 2. Consequently, a Post 326 is provided between the two levels for both the 3,3 LNs 102 and the 7,3 LNs 102, and interconnection between the 3,3 LN 102 and the 7,3 LN 102 is made in Level 2. Specifically, the 5 SPT 106 on the DR terminal of the 7,3 LN 102 is enabled to connect over to the GA 110 terminal of the 6,3 LN 102, with that 6,3 LN 102 being made to act as an inverter by taking the output therefrom through the 5 SPT 106 thereof to the GA 110 terminal of the 5,3 LN 102; that 5,3 LN 102 is likewise made to act as an inverter by taking the output thereof from the DR 108 terminal thereof to the 4 SPT 106 to the DR 108 terminal of the 4,3 LN 102, which is then given the role of a BYPASS gate by taking the output thereof from that same DR 108 terminal, through the 5 SPT 106 thereof, to the GA 110 terminal of the 3,3 LN 102, which as noted above is the first input to the "B" NAND gate, and Conn. 20 is thereby completed, as noted in Table XXI.

Connection 21 is initiated using a Post 326 at the GA 110 terminal of the 3,2 LN 102 by first enabling the IPT 322 connected thereto in Level 1, which is represented by the small box on the interconnecting line to the double-circle post symbol labeled "21" that represents the Post 326. The corresponding IPT 322 in Level 2 is then enabled to place that "I" NAND gate output from the rightward half-adder in FIG. 69 onto the GA 110 terminal of the 3,2 LN 102 in Level 2 of the leftward half-adder of FIG. 69. (The precise locations at which these Posts 326 will be placed in the drawing are entirely dictated by the space available, and indeed it may happen that because of other connections in the two levels the locations of the two ends of a Post 326 may not even coincide in location, but of course so long as connections have been made to the correct terminal all that has nothing whatever to do with the actual placement of the IPTs 322 in PS 100 or the operation of the circuit being described.)

That signal from the 3,2 LN 102 is taken from the DR 108 terminal thereof, through the 5 SPT 106 thereon to go to the GA 110 terminal of the 2,2 LN 102, but with that 3,2 LN 102 functioning not just as an inverter but also as the first input to an AND gate, since in Level 1 that 3,2 LN 102 connects through the SO 112 terminal thereof in series with the 4,2 LN 102. A like Post 326 at the GA 110 terminal of the 3,5 LN 102, upon enabling the IPT 322 between that Post 326 and GA 110 terminal at that point, will then send the signal down to the 3,5 LN 102 in Level 1, those 3,2 and 3,5 LN 102 locations in Level 1 being the first inputs to the respective "A" and "D" NAND gates between which Conn. 21 is to make connection. The signal being carried is the inverse of the carry bit from the rightward half-adder or $C_0'$, which is the output of the "I" NAND GA in that second half-adder.

The input to the 3,2 LN 102 in Level 2 is of course also received on the GA 110 terminal thereof, so as to make of that 3,2 LN 102 an inverter as well. Rather than simply proceeding downward in the figure, however, because of the blocking of that route by the use of the 3,3 LN 102 for a bridge over to the first ADD gate input, the 5 SPT 106 of that 3,2 LN 102 is used to connect to the GA 110 terminal of the 2,2 LN 102, that with the output therefrom being taken out from the DR 108 terminal thereof by the 16 SPT 106 of the 2,3 LN 102 makes of that 2,2 LN 102 an inverter as well. With the input to that 2,3 LN 102 coming in at the GA 110 terminal thereof as just noted, and the output therefrom again being taken from the DR 108 terminal thereof, in this case by the 16 SPT 106 of the 2,4 LN 102, that 2,3 LN 102 likewise becomes an inverter.

That 2,4 LN 102 then likewise becomes an inverter, since the signal thereon exits from the DR 108 terminal thereof, but in this case by way of the 13 SPT 106 on the DR 108 terminal of the 2,5 LN 102, which then will not be another inverter. The output from that 2,5 LN 102 is in fact taken off horizontally from that same DR 108 terminal by the 7 SPT on the GA 110 of the 3,5 LN 102, which then makes of the 2,5 LN 102 a BYPASS gate. What has then resulted is that the $C_0'$ bit that had come in to the GA 110 terminal of the 3,2 LN 102 in Level 1 will now come in to the GA 110 terminal of the 3,5 LN 102 in Level 1 as well, upon the IPTs 322 that connect at both ends of the Post 326 at that point being enabled.

There are then two inverter pairs or four inverters in Conn. 21, which in the direction of the signal flow are the 3,2, 2,2, 2,3, and 2,4 LNs 102, with the 2,5 LN 102 as a BYPASS gate being the only LN 102 in the sequence that is not an inverter. That sequence will of course yield an unchanged signal bit, with that many inverters having been used because of the possibility that those two Posts 326 might otherwise have overly deteriorated the signal strength. Being now completed, Conn. 21 joins the list in Table XXI.

Before taking up the Conns. 22 and 23 as indicated above, however, more needs to be said about those Posts 326. The SPTs 106 used in a bridge of course connect to the LN 102 terminals, not to any Posts 326, so at both ends of a Post 326 an IPT 322 that is connected between the relevant terminal and a corresponding Plate 324 will be enabled, in this last case at the lower end of the Post 326 at the 3,5 LN 102, thus to put the signal from the "I" NOR gate output coming at the gate terminal of the 3,2 LN 102 of Level 1 onto the Plate 324 at the 3,5 LN 102 location, and then enabling the IPT 322 at the lower end of the Post 326 at the 3,5 LN 102 will permit taking that signal back off. At the upper end of both Posts 326 the IPTs 322 there located are enabled to put the signal onto or remove the signal from the respective GA 110 terminals of the 3,2 and 3,5 LN 102 locations between which the bridge is formed. As to the LNs 102 that lie between the 3,2 and 3,5 LNs 102, which in Conn. 21 are the 3,3 and 3,4 LNs 102 in Level 2, those LNs 102 are routed around by using the Col. 2 route just described.

Considering now Conns. 22 and 23, these serve to carry the signal that had just arrived at the 3,5 LN 102, the first input to the "D" NAND gate, on to the first input to the "F" NAND gate as to Conn. 22 and then on to the first input to the "G" NAND gate as to Conn. 23. With the signal path having now arrived back in Level 1, these connections will likewise be carried out in Level 1. The first of these, Conn. 22, of course originates at the 3,5 LN 102 that had just been reached by Conn. 21. The direction of signal flow is again downward in the drawing, so the first step in Conn. 22 takes place through the 14 SPT 106 on the DR 108 terminal of the 3,6 LN 102 up to that GA 110 terminal of the 3,5 LN 102, at which the signal had arrived through the Post 326 as described above. That signal then leaves that DR 108 terminal of the 3,6 LN 102 through the 16 SPT 106 on the GA 110 terminal of the 3,7 LN 102 therebelow, that 3,7 LN 102 being the first input to the "F" NAND gate, whereby Conn. 22 is then completed and is so listed in Table XXI.

The connection on to the first input to the "G" NAND gate, or Conn. 23, requires but a single step, which is to enable the 16 SPT 106 that connects from the GA 110 of the 3,8 LN 102 up to the DR 108 terminal of the 3,7 LN 102, which had just been reached by Conn. 22. As stated, just that one step completes Conn. 23, and is so listed in Table XXI. (With the connection that follows to the right, i.e., from the DR 108 terminal of that 3,8 LN 102 to the GA 110 terminal of the output inverter of that "G" NAND gate, which connection was Conn. 13, has that 3,8 LN 102 functioning as was the 3,5 LN 102, i.e., as the first input to an AND (or NAND) gate, provided that a "1" bit on the second input to that "G" AND gate at the 4,8 LN 102 has given the 3,8 LN 102 a GND connection.)

The lines remaining to be connected are mainly the two ADD gate input lines, but it seems worthwhile first to complete the connections along the way thereof that extend to the right to the various AND gates for which most, but not all, of the connections related thereto have already been structured. The next connection, Conn. 24, will then be from the second ADD gate input in Col. 6 to the first input to the "C" NAND gate. That connection will have to bridge over the second input to the "C" NAND gate, but Col. 5 at row 4, which is the row used by that "C" NAND gate, is free for use, so the first step of Conn. 24 will simply be to use the 4 SPT 106 on the DR 108 terminal of the 6,4 LN 102 to reach rightward to the DR 108 terminal of the 5,4 LN 102, at which point a Post 326 is used to reach up to Level 2. (The Post 326 at the 6,4 LN 102 could have been used for that purpose as well.) It is only the second input to that "C" NAND gate at the 4,4 LN 102 in Level 1 that needs to be bridged over, so this Conn. 24 bridge will be quite short. (In a first-glance comparison of this Conn. 24 as shown in FIGS. 72 and 69 will suggest that the placement of that Post 326 in FIG. 72 is incorrect, until it is recalled that the step just described that actually moved that Post 326 location had been carried out.

In Level 2, for this short of a bridge, the upper end of that Post 326 at the 5,4 LN 102 that connects to the DR 108 terminal thereof is joined by the 4 SPT 106 at that same terminal to reach the DR 108 terminal of the 4,4 LN 102, from which the 5 SPT 106 thereon, thus to make BYPASS gates of both the 5,4 and 4,4 LNs 102, is used to reach the GA 110 terminal of the 3,4 LN 102, to which another Post 326 is connected so as to connect back down to Level 1 and to the GA 110 terminal of that 3,4 LN 102 in the usual manner, thereby to complete Conn. 24 as shown in Table XXI.

Unlike that Conn. 24 for which there had been a free LN 102 available just rightward of the starting point thereof that could be used to place the needed Post 326 to get up to Level 2 in the next Conn. 25, which Conn. 25 will extend from the first input line for this ADD circuit in Col. 7 to the second input to the "D" NAND gate, there is no free LN 102 to the right of that starting point, with that space about to be occupied by the line carrying in the second input to this ADD circuit, hence the needed Post 326 must be placed right at that Col. 7 starting point for Conn. 25. That fact is quite immaterial to the circuit operation, since the use instead of that next adjacent 5,4 LN 102 in Conn. 24 was purely an option, and was only employed here in order to show that option.

As a result, Conn. 25 begins with a Post 326 at the DR 108 terminal of the 7,5 LN 102 in Level 1, which line carries the first input node to the ADD circuit, and from that 7,5 LN 102 in Level 2 will carry that signal over to the second input to the "D" NAND gate as shown in FIGS. 69 and 70. A Post 326 and associated IPT 322 at that point in Level 1 will reach up to Level 2, and after enabling the IPT 322 at that point, connection is made from that DR 108 terminal through the 4 SPT 106 thereon to the DR 108 terminal of the 6,5 LN 102, by which action the 7,5 LN 102 acts as a BYPASS gate. As in the earlier Conn. 20 going over to the first input to the "B" NAND gate, the next two rightward LNs 102, which are the 6,5 and 5,5 LNs 102, are then structured as inverters in the same way as was done in Conn. 20. Since this Conn. 25 is just going to the second input to the "D" NAND gate rather than to the first as in Conn. 20, the next step at 5,5 LNs 102 is to use the 5 SPT 106 thereof to take the signal down to the GA 110 terminal of the 4,5 LN 102, which is that second input to the "D" NAND gate, and upon employing the IPT 322 and Post 326 at that point to get back down to Level 1, that first input to the ADD circuit will have been connected to that second input to the "D" NAND gate, hence Conn. 25 will have been completed and is so shown in Table XXI. The two inverters structured from the 6,5 and 5,5 LNs 102 serve to maintain the integrity of the input signal.

Another connection of precisely the same nature as the Conn. 25 just described that takes the first ADD circuit input over to the second input to the "D" NAND gate is now repeated in row 7 as Conn. 26 for the second input to the "F" NAND gate and hence the detailed steps of that Conn. 25 description need not be repeated. Upon that Conn. 26 being so entered, Conn. 26 can be said to be completed and is so listed in Table XXI.

Of these horizontal, rightward connections from the two ADD circuit inputs there are only two left that are not an inherent part of the ADD circuit input lines themselves, which are a line from the Col. 6 line that carries the second ADD circuit input to the third input to the "D" NAND gate and another line from that Col. 6 line that connects to the second input to the "G" NAND gate, and these will become Conns. 27 and 28, respectively.

The starting point for Conn. 27 is through the IPT 322 and Post 326 located on the DR 108 terminal of the 6,6 LN 102, and upon those elements being configured and enabled, along with the IPT 322 at that location in Level 2, the Level 2 part of Conn. 27 is initiated by a 4 SPT 106 extending from the DR 108 terminal thereof to the DR 108 terminal of the 5,6 LN 102, thus to make the 6,6 LN 102 into a BYPASS gate. The 5,6 LN 102, however, uses a 5 SPT 106 to place the signal on the GA 110 terminal of the 4,6 LN 102, which is as it should be since that 4,6 LN 102, after all, is the third input to the "D"

NAND gate and must receive the signal thereto on the GA 110 terminal thereof. This Conn 27 then carries out the same function as would a direct connection between the first ADD circuit input and that third input to the "D" NAND gate, which criterion can be used as a test of the proper functioning of a bridge, with the IPT 322 and Post 326 connected to the GA 110 terminal of that 4,6 LN 102 so as to act as a BYPASS gate using that GA 110 terminal as a contact point to create the same connection in Level 1, Conn. 27 can now be deemed complete and is so shown in Table XXI.

In Conn. 28, connection is made from the Col. 6 line carrying the second ADD circuit input to the second input of the "G" NAND gate, which is found in Level 1 at the 4,8 LN 102. That location is quite free of any interfering LNs 102 from that point back to that Col. 6 line, that will itself become Conn. 30, so all that will be required is a turn to the right at row 8 as that Conn. 30 comes down through the drawing. For that purpose, a 5 SPT on DR 108 terminal of the 6,8 LN 102 is sent over to the GA 110 terminal of the 5,8 LN 102, from which another 5 SPT 106 connecting from the DR 108 terminal of that 5,8 LN 102 extends to the GA 110 terminal of the 4,8 LN 102, thereby forming inverters of both the 5,8 and 4,8 LNs 102, thus to preserve the status of that second ADD gate input. The next LN 102 is the second input to the "G" NAND gate that is the destination, so upon the 5 SPT 106 on the DR 108 terminal of the 5,8 LN 102, Conn. 28 is completed, and is so shown in Table XXI.

Other than connecting to the rightward half-adder, the only connections remaining to be made are those Col. 7 and Col. 6 lines that bring in the first and second inputs to this ADD circuit as a whole, and except for having a number of other connections branching off to the right therefrom, which (in the order of appearance coming down both lines) are the 20, 24, 25, 27, 26, and 28 lines that have all been structured already, of these last two lines, which are Conn. 29 as to the Col. 7 line and Conn. 30 as to the Col. 6 line, the Conn. 29 line is perfectly straightforward and differs from the Conn. 18 line on the right side of FIG. 71 only by being structured downward rather than upward. That process of passing through a relatively long stretch of LNs 102 using both BYPASS gates and inverters to maintain the signal level therethrough with the only concern being to have used an even number of inverters has been illustrated sufficiently to this point to need no further explanation. Consequently, both Conn. 29 and Conn. 30 will be taken to have been completed and are so shown in Table XXI.

However, at the rightward end of Conn. 30 there remains the connection the rest of the way to the first input to the "H" NAND gate, as seen in FIG. 69. The required line, which will be Conn. 31, is to connect that first input to the "H" NAND gate to the second input to the ADD circuit, and an access point for so doing is available at the second input to the "G" NAND gate, where Conn. 30 had left off. Level 1 is thoroughly blocked for that purpose, but there is space available in Level 2, so this Conn. 31 will begin with an IPT 322 and Post 326 on the GA 110 terminal of the 4,8 LN 102, which in Level 1 is that second input to the "G" NAND gate. Post 326 in Level 2 connects through the IPT 322 again to the GA 110 terminal of that 4,8 LN 102, and the output therefrom is taken from that GA 110 terminal, thus to make the 4,8 LN 102 a BYPASS gate whereon the contact point is that GA 110 terminal. The 8 SPT 106 attached to that GA 110 terminal is used to connect to the GA 110 terminal of the 3,8 LN 102 from which the signal is again taken, thereby likewise making the 3,8 LN 102 a BYPASS gate at the GA 110 terminal thereof. That signal is taken down to the 3,9 LN 102, which in Level 1 is that first input to the "H" NAND gate, through the 17 SPT 106 on the GA 110 terminal of that 3,9 LN 102 and then an IPT 322 and Post 326 down to Level 1, thereby to complete Conn. 31, and is so listed in Table XXI.

What then remains of this ADD circuit is to connect the two half-adders together, that will be Conn. 32 as the last connection in this ADD circuit. As noted earlier, those portions of the left and right sides of this ADD circuit as shown in FIG. 69 that are required to show the LNs 102 that are used in Conn. 32 will now be shown. As to the leftward half-adder, the relevant portions of the respective Levels 1 and 2 thereof are shown in FIGS. 73 and 74 (both sheet 39). The point of connection sought in this leftward half-adder is at the 3,2 LN 102 thereof, which is the first input to the "A" NAND gate, and at the GA 110 terminal thereof there is seen to be connected an IPT 322 that connects to a Post 326 labeled "32." Correspondingly, FIG. 74 shows an IPT 322 and Post 326 at that 3,2 LN 102 in Level 2, where of course the same Post 326 is seen.

FIGS. 75 and 76 (sheet 40) carry out that same process with respect to the rightward half-adder in FIG. 69, wherein the bottom three rows of Level 1 thereof are shown in FIG. 75, and the Level 2 circuitry for those same three bottom rows is shown in FIG. 76. These latter two figures show an IPT 322 and Post 326 disposed on the DR 108 terminal of the 2,9 LN 102. In FIGS. 71 and 72 (sheets 37 and 38, respectively), show the IPTs 322 and Posts 326 on both the 3,2 and 2,9 LNs 102, for the reason that when the code for the two levels of a half-adder is assembled, it may not be known whether that particular half-adder code will be used for the left or right sides of the complete ADD circuit to be installed. (Whichever IPT 322 and Post 326 are not used can be deleted from that code, or simply left intact and the IPTs 322 for the Post 326 that was not to be used simply not enabled.

The manner of interconnecting those two half-adders, and specifically of making the inter-half-adder connection of Conn. 32 is shown in FIG. 77 (sheet 41). With those two LNs 102 at opposite ends of the half-adder circuit, the way of so doing using the techniques shown so far would either be to structure a rather long line that would have to go around one of the half-adders or the other, or be forced into a Level 3, since Level 2 is by now occupied by too many circuits. However, a feature of Instant Logic™ of which advantage has not yet been taken is that a circuit can be structured by those IL methods to appear anywhere. What is done in this case is to structure the rightward side of the full ADD circuit as shown in FIG. 69 so as not only to have the lower end of the "rightward" half-adder abut immediately against the structure of the "leftward" half-adder, but also to shift the position of the "rightward" half-adder one position to the left so that the 2,9 LN 102 of that rightward half-adder would lie directly in line with the 3,2 LN 102.

The result of all that is shown in FIG. 77 (wherein because of limitations in horizontal space, Col. 7 in the top, "rightward" half-adder portion and Col. 1 of the bottom, "leftward" half-adder portion have both been removed from the figure), wherein the two "32" Posts 326 are now seen to lie in vertical alignment, separated by only a single LN 102. Conn. 32 is then completed by using the 16 SPT 106 on the GA 110 terminal of the 3,2 LN 102 to reach the DR 108 terminal of the 3,1 LN 102, and then the 13 SPT 106 on the DR 108 terminal of that 3,1 LN 102 to reach the DR 108 terminal of the 2,9 LN 102, this being the connection that crosses from the one half-adder to the other. In just those two steps, then, the "I" NOR gate output from the rightward half-adder is made to reach the second input to the "A" NAND gate of the leftward half-adder, thereby to complete Conn. 32, as is so indicated in Table XXI, and indeed to complete the structuring of this ADD circuit. The Instant Logic™ Apparatus can now more rightly be claimed to be a general Information Processing Apparatus having the ability to carry out arithmetical as well as logical operations.

However, the process of carrying out that structuring has brought a few other things to light that should perhaps be mentioned as part of a full disclosure. In structuring this ADD circuit, there had been some thought that a third level might be required, which turned out not to be the case, but even so it will likely happen some time, so the question arises as to where any such third level should be placed. The natural tendency, having had Level 1 connect up to Level 2, would be to have Level 2 connect up to Level 3. If Level 1 had been the main starting point of the circuit, however, it is from that Level 1 that the needs for bridges over blocking LNs 102 would most often arise, and with the structure just stated, that would have that bridging connection in a Level 3 that was two levels away from Level 1, and the signal would then have to traverse the length of two posts. It would then be preferred that in the design process as carried out here that the operator redefine the level numbers as soon as the need for a third level arose. All of the principal structuring would be carried out in the middle level, with that as "Level 1," and if blocking then still arose in Level 2 on one side, the structuring would be taken instead into the Level 3 on the opposite side. This structuring of course requires no physical access of any kind, and that structuring could be carried out in a middle level as easily as in the side levels.

What might have been put to rest by this ADD circuit alone are the notions that not every terminal on an LN 102 would need to have a post, and that of the 18 SPTs 106 shown in FIG. 1 there may be some that would never be used. Of those 18, there are 5 that were not used in this ADD circuit, which are the 11, 12, 19, 20, and 21 SPTs 106. The SO 112 terminal in particular seems not have much use in an OT role, though of course that terminal is used in every AND gate, and could also be used in that context if a course of "reverse" structuring were being carried out, and in the structuring as described there was in fact an SO-to-SO connection. It is also quite possible that with the experimental versatility of Instant Logic™, one circuit could be made into quite a different circuit in a minute or two, so entirely new circuits could well be created and tested very rapidly using the IL techniques. It would then seem that in spite of the findings just noted, discretion would suggest retaining all of the SPTs 106 of FIG. 2.

The design and construction of variations in the forms of the transistors and like components from those already described or referred to herein or in the particular selection of components, could easily be carried out by a person of ordinary skill in the art, based on the present description of the manner of so doing and the functions described herein to be carried out, hence all such variations are deemed to fall within the spirit and scope of the invention and of the claims appended hereto. Some other arrangements and dispositions of the aforesaid or like components, the descriptions of which are intended to be illustrative only and not limiting, may also be made without departing from the spirit and scope of the invention, which must be identified and determined only from the claims set out below and the equivalents thereof.

The connections previously set out as to the first half-adder of FIG. 69 and hence of FIGS. 71-77 are listed for reference in the following Table XXI, in which the entries will be in Level 1 unless otherwise stated.

TABLE XXI

Connections used in Structuring a Half-adder

| Connection | Description |
|---|---|
| 1. | Between the successive, vertically adjacent DR 108 terminals of the 2,2 to 2,5 LNs 102 to form the foundation for the E OR gate input connections. |
| 2. | From the DR 108 terminal output of the "A" NAND gate at the 3,2 LN 102 rightward to the GA 110 terminal of the 2,2 LN 102 for the first "E" OR gate branch. |
| 3. | From the DR 108 terminal output of the "B" NAND gate at the 3,3 LN 102 rightward to the GA 110 terminal of the 2,3 LN 102 for the second "E" OR gate branch. |
| 4. | From the DR 108 terminal output of the "C" NAND gate at the 3,4 LN 102 rightward to the GA 110 terminal of the 2,4 LN 102 for the third "E" OR gate branch. |
| 5. | From the DR 108 terminal output of the "D" NAND gate at the 3,5 LN 102 rightward to the GA 110 terminal of the 2,5 LN 102 for the fourth "E" OR gate branch. |
| 6. | From the DR 108 terminal of the second input to the "A" AND gate at the 4,2 LN 102 rightward to the SO 112 terminal of the 3,2 LN 102, which is the first input to the "A" AND gate in this first branch of the "E" OR gate.. |
| 7. | From the DR 108 terminal of the second input to the "B" AND gate at the 4,3 LN 102 rightward to the SO 112 terminal of the 3,3 LN 102, which is the first input to the "B" AND gate in this second branch of the "E" OR gate. |
| 8. | From the DR 108 terminal of the second input to the "C" AND gate at the 4,4 LN 102 rightward to the SO 112 terminal of the 3,4 LN 102, which is the first input to the "C" AND gate in this third branch of the OR gate. |
| 9. | From the DR 108 terminal of the third input to the "D" AND gate at the 4,6 LN 102 upward to the SO 112 terminal of the 4,5 LN 102, which is the second input to the "D" AND gate, and then from that DR 108 terminal of that 4,5 LN 102 to the SO 112 terminal of the 3,5 LN 102, which is the first input of the "D" AND gate in this fourth branch of the "E" OR gate. |
| 10. | Between the second gate 110 terminal inputs to each of the "A," "B," and "C" AND gates at the respective 4,2, 4,3, and 4,4 LNs 102. |
| 11. | Between the successive DR 108 terminals of the 2,7 to 2,9 LNs 102 to form the basis for the "I" OR gate connections. |
| 12. | From the DR 108 terminal output of the "F" AND gate at the 3,7 LN 102 rightward to the GA 110 terminal of the 2,7 LN 102 for the first "I" OR gate branch. |
| 13. | From the DR 108 terminal output of the "G" AND gate at the 3,8 LN 102 rightward to the GA 110 terminal of the 2,8 LN 102 for the second "I" OR gate branch. |
| 14. | From the DR 108 terminal output of the "H" AND gate at the 3,9 LN 102 rightward to the GA 110 terminal of the 2,9 LN 102 for the third "I" OR gate branch. |

TABLE XXI-continued

| Connections used in Structuring a Half-adder | |
|---|---|
| Connection | Description |
| 15. | From the DR 108 terminal of the second input to the "F" AND gate at the 4,7 LN 102 rightward to the SO 112 terminal of the 3,7 LN 102 which is the first input to the "F" AND gate for this first branch of the "I" OR gate. |
| 16. | From the DR 108 terminal of the second input to the "G" AND gate at the 4,8 LN 102 rightward to the SO 112 terminal of the 3,8 LN 102 which is the first input to the "G" AND gate for this second branch of the "I" OR gate. |
| 17. | From the DR 108 terminal of the second input to the "H" AND gate at the 4,9 LN 102 rightward to the SO 112 terminal of the 3,9 LN 102 which is the first input to the "H" AND gate for this third branch of the "I" OR gate. |
| 18. | From an output of the "I" NOR gate at the DR 108 terminal of the 2,7 LN 102 rightward, upward, leftward, and then downward to the GA 110 terminal of the 4,2 LN 102, which is the second input to the "A" NAND gate, and that itself connects downwardly through Conn. 10 to the GA 110 terminal of the 4,4 LN 102, which is the second input to the "C" AND gate. |
| 19. | A downward extension of Conn. 1 in Level 1 from the DR 108 terminal of the 2,5 LN 102, which in Level 1 is the output of the "D" AND gate, to the DR 108 terminal of the 2,6 LN 102 and then therefrom through a post to the DR 108 terminal of the 2,6 LN 102 in Level 2, to permit extraction of the $S_1$ output of this ADD gate. |
| 20. | From the drain 108 terminal of the 7,3 LN 102 in Level 1, which is carrying the first input to this ADD gate, through a post up to the drain 108 terminal of the 7,3 LN 102 in Level 2, from that terminal in Level 2 rightward to the GA 110 terminal of the 3,3 LN 102, and then through a second post down to the GA terminal of the 3,3 LN 102 in Level 1, which is the first input to the "B" NAND gate. |
| 21. | Through a post from the DR 108 terminal of the 3,2 LN 102 in Level 1, which is the first input to the "A" AND gate, up to the DR 108 terminal of the 3,2 LN 102 in Level 2, then rightward to the 2,2 LN 102 in Level 2, downward to the 2,5 LN 102, leftward to the drain 108 terminal of the 3,5 LN 102, and then back down through a second post to the DR 108 terminal of the 3,5 LN 102 in Level 1, which is the first input to the "D" NAND gate. |
| 22. | From the GA 110 terminal of the 3,5 LN 102, which is the first input to the "D" NAND gate in Level 1, to the GA 110 terminal of the 3,7 LN 102, which is the first input to the "F" NAND gate in Level 1. |
| 23. | From the GA 110 terminal of the 3,7 LN 102, which is the first input to the "F" NAND gate, to the GA 110 terminal of the 3,8 LN 102, which the first input to the "G" NAND gate. |
| 24. | From the DR 108 terminal of the 6,4 LN 102, which is carrying the second input to this ADD gate, rightward to the DR 108 terminal of the 5,4 LN 102 in Level 1, up through a post to the DR 108 terminal of the 5,4 LN 102 in Level 2, then rightward in Level 2 to the GA 110 terminal of the 3,4 LN 102, then back down through a second post to the GA 110 terminal of the 3,4 LN 102 in Level 1, which is the first input to the "C" NAND gate. |
| 25. | From the DR 108 terminal of the 7,5 LN 102 in Level 1, which is carrying the first input to this ADD circuit, up through a post to the DR 108 terminal of the 7,5 LN 102 in Level 2, rightward to the GA 110 terminal of the 4,5 LN 102, then back down through a second post to the GA 110 terminal of the 4,5 LN 102 in Level 1, which is the second input to the "D" NAND gate. |
| 26. | From the DR 108 terminal of the 7,7 LN 102 in Level 1, which is carrying the first input to this ADD gate, up through a post to the DR 108 terminal of the 7,7 LN 102 in Level 2, rightward to the GA 110 terminal of the 4,7 LN 102 in Level 2, then back down through a second post to the GA 110 terminal of the 4,7 LN 102 in Level 1, which is the second input to the "F" NAND gate. |
| 27. | From the DR 108 terminal of the 6,6 LN 102, which is carrying the second input to this ADD circuit, to the GA 110 terminal of the 4,6 LN 102, which is the third input to the "D" NAND gate. |
| 28. | From the DR 108 terminal of the 6,8 LN 102, which is carrying the second input to this ADD circuit, to the GA 110 terminal of the 4,8 LN 102, which is the second input to the "G" NAND gate |
| 29. | From the DR 108 terminal of the 7,2 LN 102, which is the first input to this ADD gate, downward and then rightward to the GA 110 terminal of the 4,9 LN 102, which is the second input to the "H" NAND gate. |
| 30. | From DR 108 terminal of the 6,2 LN 102, which is the second input to this ADD gate, downward to the GA 110 terminal of the 6,8 LN 102, from which Conn. 28 then goes rightward to the GA 110 terminal of the 4,8 LN 102, which is the second input to the "G" NAND gate as noted in the "28" entry above. |
| 31. | From the GA 110 terminal of the 4,8 LN 102 in Level 1, which is the second input to the "G" NAND gate through a post up to the GA 110 terminal of the 4,8 LN 102 in Level 2, then rightward and downward to the GA 110 terminal of the 3,9 LN 102 in Level 2, then back down through a post to the GA terminal of the 3,9 LN 102, which is the first input to the "H" NAND gate. |
| 32. | From the DR 108 terminal of the 2,9 LN 102 in Level 1 of the right hand half-adder of FIG. 69, i.e., the output of the "I" NOR gate in that right-hand half-adder, up through a post to the DR 108 terminal of the 2,9 LN 102 in Level 2 of that right-hand half-adder, then by locating that right-hand half-adder so that the 2,9 LN 102 of that rightward half-adder lies in a vertical line with the 3,2 LN 102 in the left-hand half-adder, from the DR 108 terminal of the 2,9 LN 102 in Level 2 of the right-hand half-adder to the DR 108 terminal of the 3,1 LN 102 in Level 2 of the left-hand half-adder, to the GA 110 terminal |

TABLE XXI-continued

| Connections used in Structuring a Half-adder | |
|---|---|
| Connection | Description |
| | of the 3,2 terminal in Level 2 of the left-hand half-adder, and then down through a post to the GA 110 terminal of the 3,2 LN 102 in Level 1 of the left-hand half-adder, which is the first input to the "A" NAND gate in the leftward half-adder. |

It may have been noticed that the structure of this ADD circuit exhibits an architectural or geometric principle that is somewhat akin to that by which super-scalability can be achieved as was described earlier with reference to FIGS. 3(*a*)-3(*g*). The structure of that ADD gate, as shown in FIGS. 69-77 (sheets 35-41) and then summarized in FIG. 78 (sheet 42) turns out to be remarkably compact, having a relative few unused LNs 102, which is the goal as to the joining together of ILMs 114 so as to minimize the number of perimetric LN 102 terminals that are unusable because on at least one side thereof there are no adjacent LNs 102 to which connection could be made. That kind of "packed" geometry is also an advantage in the structuring of individual circuits, from the point of view of employing as much of the available space as possible, but besides having the unfortunate tendency to concentrate the heat generation, also has the same result as is seen in the ILM 114 "packing" case, which is that of minimizing the number of terminals to which connection can be made. It has been seen that any limitation in the number of choices available when in the course of structuring a circuit can make that process more and more difficult. There are again present the kinds of countervailing interests that are common to electronics work, and these will have to be weighed in an ILA just as in the usual electronics art.

The main purpose of FIG. 78, however, was to try to capture in visible form the outstanding feature of Instant Logic™, which is the continuous, non-stop flow of what might be termed questions at the inputs to an ILA and an outflow of answers at the outputs of the ILA. What must necessarily be missing in a fixed drawing of a circuit is the continuous process of structuring the circuits needed for the IP task and then the de-structuring thereof when each task has been completed, that whole process being what makes Instant Logic™ possible.

That completes the disclosure of Instant Logic™ as known to date, but it must be added that although considerable effort was made herein to estimate the levels of performance that might be realized in a functioning Instant Logic™ (IL) device based on what were taken to be reasonable projections from current computer and supercomputer performances, and further on estimates of the current procedures avoided and efficiencies added by Instant Logic™ methods and apparatus, it must be stressed that no actual ILA has yet been built, this specification thus being entirely theoretical, so no guarantee of any clock speeds, throughput, volumes of data, or any other such parameters that might have been mentioned herein can be made. It remains the opinion of the inventor, however, that such projections have been realistic, and might well even be surpassed, and that the detailed design of a manufacturable IL Apparatus should be undertaken with all due haste. Some attempts were made in the above to seek means by which economies could be realized, but it must still be said that even with those efforts, it is evident that Instant Logic™ stands to be quite an expensive endeavor.

Again, the descriptions and drawings of the invention provided, as well as the expressions of the methods of Instant Logic™ above, are intended to be illustrative or explanatory only, and not limiting, especially in light of the clear flexibility available in IL and the wide variety of choices that are available at virtually any stage in the design of particular embodiments of an ILA as set out, from which an almost endless variety of other dispositions of the components and of the several IL procedures set out herein, may also be made by a person of ordinary skill in the art in light of the content of this application without departing from the spirit and scope of the invention, which must then be identified and determined only from the claims that follow just after the following Glossary, and from equivalents of those claims.

Instant Logic™ Structured Circuits

1. Wire (FIG. 23, sheet 16)
2. BYPASS gate (FIG. 24, sheet 16)
3. BRANCH circuit (FIG. 25, sheet 16)
4. Inverter (NOT gate) (FIG. 28, sheet 16)
5. AND (FIG. 31, sheet 17)
6. OR (FIG. 34, sheet 18)
7. NAND (FIG. 37, sheet 19)
8. NOR (FIG. 40, sheet 20)
9. XOR (FIG. 51, sheet 24)
10. XOR with only internal inputs (FIG. 53, sheet 26)
11. Common latch in 2-D (FIG. 56, sheet 27)
12. Common latch in 3-D (FIG. 57, sheet 28)
13. "Reversed" latch (FIG. 59, sheet 29)
14. ADD (FIGS. 71-77, sheets 37-41)

Glossary

Terms that may have mnemonics but that do not refer to actual physical components are not given identification numbers, while the components themselves are given identification numbers (IDNs) relating to the function and not the type. Components that identify their functions in their names, such as an AND gate, are only given component numbers.

"ACE": Alternate Code Entry.

Active: As to a PT, being physically connected up so as to be available to accept an enabling bit that would then permit electrical current to pass therethrough, while as to an LN 102, having all of the physical connections that are required when serving as a component of a circuit, and also being in a condition to accept a signal bit thereon and act upon such bit in the manner required of the particular type of circuit in which the LN 102 appears, i.e., having all of the necessary $V_{dd}$, GND, and SPT 106 connections pertinent to a particular circuit so as to be able to serve as the entirety or part of such circuit. (While an LN 102 in the role of a BYPASS gate participates in the functioning of the circuit in which found, that LN 102 does not do so as an active element thereof but only in a passive role.)

Alternate Code Entry: Code input means adapted to accept one or the other of the binary "0" or "1" bits, so that the acceptance thereof will bring about the making of an arithmetical/logical decision. (in the example shown) as the second bit of a 2-bit entry that had a "1" as the first bit thereof, would yield either a "10" code or a "11" code, or similarly as either a "00" or a "01" entry, etc. This technique could of course be expanded to 3-bit or higher entries so that, for example, one input could select from among a larger number of choices, or adopt other such means of expansion.

Alternate Entry: The process in which a single input node can accept either a "0" or a "1" bit, for the specific purpose of using the identity of the particular bit that had been entered to make some kind of logical decision.

Assemble: To "assemble" an IL circuit is to bring together in immediate juxtaposition a number of small, independent circuits that have been structured by IL procedures so as to form a larger and more complex ensemble that appears like and acts like a single circuit, rather than carrying out the process of structuring the entire circuit, LN 102 by LN 102. (Four 1-bit inverters laid side by side form a 4-bit inverter, or two PTEs 138 and one ACE 140 form one CCS1 124.)

Babbage Paradigm: The method of computer operation in which operands are transferred to the circuitry at which the desired operations can be carried out. Adopted by John von Neumann and thereby established the "von Neumann bottleneck" or "Babbage/von Neumann bottleneck."

Binary Circuits: Circuits based on the system of logic created by George Boole in 1853 from the equation $x^2=x$, for which the only solutions are "0" and "1." The term "binary circuits" is used in this application in lieu of the common term "digital circuits" since the electronic circuits currently in use are in fact not digital and, with perhaps some few exceptions, and upon the finding of that applicability by J. R. Pierce, have not been since at least the digital computer of Konrad Zuse in the early 1950's, which then makes the term "digital electronics" obsolete.

Bit Rate: The cycle time of a data source (not a part of the invention) that provides to ILM 112, and specifically to the IND 116, the data (the "work piece") on which the Instant Logic Apparatus (ILA) is to operate; the operating rate of that data source, measured in bits per second or "bits/sec.

BP: Babbage Paradigm.

BR: Bit Rate

BYPASS: A pseudo-gate structured by enabling a PT that connects between terminals of a pair of adjacent LNs, the originating LN otherwise being inactive. The intent in using a BYPASS gate is to move the location of a signal bit from one LN to an adjacent LN (or even further) in order to overcome spatial mismatches in circuit structuring.

CAM: Content-Addressable Memory.

Capture: A bit is captured by a receiving LN when that LN has received the bit and responded thereto to such an extent that the anticipated output would be provided even if the voltage that had constituted the bit being received were to be removed.

CCIN: Circuit Code Input Node.

CCS: Circuit Code Selector.

Construct: To form a complex gate circuit by the interconnection of two or more simple gate circuits. This definition recognizes that there may be a number of different ways in which a complex gate circuit could be constructed out of simple gate circuits, in terms of both the types and the number of simple gate circuits used.

Circuit: As an adjective pertaining to a representation of a circuit, the form of such representation that shows the several transistors and the like that the circuit contains. The alternative is an iconic representation of the circuit as will be defined below.

Circuit Code: A 2-bit code that will cause a "1" bit to be sent to the gate terminal of a circuit PT, thus to define and structure the circuit, i.e., one of those that connect (1) from $V_{dd}$ to the drain terminal of an LN 102; (2) from a data source external to the PS to the gate terminal of an LN; and (3) from GND to the source terminal of an LN 102.

Circuit Code Input Node: Any particular one of an array of input nodes through which machine code (MC) enters a Circuit Code Selector (CCS).

Circuit Code Selector: The hard-wired circuit within the ILM 112 that accepts code input from an encoder, converts such of that code that was not in binary machine code into that form, and causes selected CPTs 104 within PS 100 to be enabled.

Circuit PT: A pass transistor (PT) used to connect (1) from $V_{dd}$ to the drain terminal of an LN 102; (2) from a data source external to the PS 100 to the gate terminal of an LN 102; and (3) from GND to the source terminal of an LN 102.

Code: An array of bits that when applied to the circuit and signal PTs of a PS 100 would bring about the enabling of either a single PT or a selection of PTs as pertain to the structuring of a single LN 102, depending on the context, together with the signal connections between LNs 102.

Code Dependence: A condition similar to data dependence, but in which a code-directed process cannot proceed until some other code-directed process has been completed, as when the first code provides the destination to which the second code is to be sent.

Code List: A sequential listing of individual codes, either for a single LN 102 or such collection of LNs 102 as would form a complete circuit, that when applied to a PS 100 would bring about an IP operation, again depending on the context. (If referring to an LN 102 only, a "code" would be that for enabling a single PT, and the "code list" would contain the codes for all of the PTs, resulting then in the complete structuring of that LN 102. If speaking of a circuit, a "code" would be the code for an LN 102 (i.e., the "code list" of the previous definition), and a "code list" would be codes for all of the LNs 102, resulting then in the code needed for the entire circuit.)

Configure: To enable a particular set of pass transistors in an FPGA so as to interconnect a set of gates in such a way as to form a desired circuit.

"Connect from": The proximal end of an SPT 106 is connected from a particular terminal of an LN 102 that is serving as the OT relative to another LN 102 as the RT that would ordinarily have a letter designation that comes after the letter designation of the OT "Connect to": The distal end of an SPT 106 is connected at a particular terminal of an LN 102 that is serving as the RT relative to another LN 102 as the OT that would ordinarily have a letter designation that comes before the letter designation of the RT.

"Connection": In the context of interconnecting arrays of LNs 102, a "connection" means the full complement of nine actual terminal-to-terminal connections between one LN 102 and another.

Connection Quotient: The ratio of the number of actual connections in an array of PEs (LNs 102) to the number of potential connections in a PE array (i.e., if all PEs had four connections), that for a 10×10 array would be 360/400=0.9.

Construct: To form a complex gate circuit by the interconnection of two or more simple gate circuits. This definition recognizes that there may be a number of different ways in which a complex gate circuit could be constructed out of simple gate circuits, in terms of both the types and the number of simple gate circuits used.

Control Code: Code that selects from a menu a particular IP task to be carried out, or performs any other such administrative function that relates either to the actual ILA operation for IP purposes or to installing code lists, maintenance, etc., i.e., all of the code used in an ILA other than the circuit code and signal codes.

Contact Terminal: A terminal such as the drain, gate, and source terminals of an operational transistor from which connection can be made to like terminals of one or more other operational transistors so as to create operable electronic circuits.

Cycle: The process within a PS 100 of a signal bit having been received at the gate terminal of an LN 102, that LN 102 acting in response thereto over a sufficient length of time to create an output on the drain terminal thereof and transmit that output to a next LN 102 over a time period long enough to be received by a next LN 102, and a response to that bit has begun. Equivalent to an "instant."

Cycle Rate: Cycles/second=cps=Hz, with reference to the operating rate of an LN 102.

Cycle Time: The time required to execute a cycle, also designated as an Instant.

Data Array: The full set of gate (GA 110) terminals of all of the LNs 102 in a PS 100.

Data Relevant: Having direct control or contact with binary data as the work pieces of the invention, including the circuits that themselves carry out the processing of the data or encoding and other such devices that establish the code by which those circuits used in the information processing are structured, and the data are caused to pass therethrough. Distinguished from monitors, printers, and the like that do not themselves participate (if such is the case) in the actual information processing.

Datum Segment: A bit string that does not have some predefined length, and may have been produced specifically by zero stripping a bit string or byte that had originally been of some fixed length, the length of the resultant datum segment then depending upon how many leading zeros had been in the original bit string (e.g., as a fixed length byte) and had been stripped out.

"Defined path": In a 1-, 2-, or 3D P 100, an imaginary line coincident with any of the one, two, or three orthogonal axes of the PS 100, along which the LNs 102 from which the desired circuits are structured, which line can also jog at right angles so as to momentarily follow lines that are mutually at right angles.

EEPROM: Electrically Erasable Programmable Read-Only Memory.

Electronic energy: The energy embodied in the formation of voltage differences in the form of bits as are employed in an electronic circuit.

EMI: Electromagnetic Interference.

Enable: To place a "1" (for NMOS) or "0" (for PMOS) bit on the gate terminal of a PT so as to render that PT conductive.

Energy packet: In electronic terms, a bit, or in optical terms, a photon (which see).

"Enterable": As an adjective with reference to code, the term means that a user only needs to know an index number (i.e., location within the PS 100) at which to start some code sequence, whereby if the code were so entered the IP could begin.

Fabricate: To manufacture a number of instances of a circuit or group thereof in "hard wired" form by any of the "mass production" procedures commonly used in digital electronics.

Field Programmable Gate Array: A circuit made up of an array of different kinds of electronic gates and pass transistor-controlled interconnects, whereby the application of different codes will cause those gates to be interconnected in different ways, thus to yield different circuits.

FPGA: Field Programmable Gate Array.

Full code: A code that includes the index code along with the circuit code and signal code. A broader instance of a code would be that which included an "x," "xy," etc., indication of how many groups and hence selection processes there were for the particular code selector, but the "full code" term includes only those index, circuit and signal codes, and in a multiple level code selector, each level would be receiving as input the full codes pertinent to each particular level of the code selector.

Functionally Inter-connectable: Said of devices that when two or more of such devices are interconnected to form a composite device, the circuitry within each device is connected to the circuitry of every other device to which connected, whereby the circuitry so interconnected functions in the same manner when data are passing between said devices as when those data are operated upon within an individual one of said devices, thereby to yield a composite device that is functionally equivalent to an individual one of such devices, only larger.

Granularity: The relative sizes of the elemental Processing Elements (PEs) that are then replicated to yield the full processing power of an IP apparatus. Can be used to compare the size of the PE to the apparatus as a whole, or as between different kinds of IP apparatus, e.g., the granularity of the PEs of an ILA is much finer (the PEs are much smaller) than are the microprocessors of PCs (and of parallel supercomputers, etc.).

GC: Group Code.

GD: Group Detector.

Group Code: In the full code for a multi-group code selector, the code following the IN code that identifies the group to which the particular item belongs.

Group Detector: That component in a multi-group code selector that determines whether or not the data being treated are to be distributed among a number of groups, and if so, to which one of those groups the particular item belongs.

Iconic: As an adjective pertaining to a representation of a circuit, a symbol used to represent a gate or the like that does not show the several transistors thereof, but is either itself a standard iconic symbol for the circuit or a construct made up of a number of such standard iconic symbols. The alternative is a "circuit" representation of the circuit.

I: The number designation of an LN 102 in a general sense.

$I_{r,c}$: The number designation, wherein r="row" and c="column," of an LN 102 along a particular axis of a 3-D, x, y, z Cartesian coordinate system, that axis being the one that is not listed in the subscript; see the following definition.

$I_{x,y}$: The number designation of an LN 102 location within the above coordinate system at points along the "z" axis, i.e., at different values of $z_i$, and similarly as to the "x" axis for $I_{y,z}$ and the "y" axis for $I_{x,z}$.

IL: Instant Logic™.

IL Circuit: A Class 3 circuit structured using the methods of IL.

ILA: (1) Instant Logic™ Apparatus.
(2) Instant Logic™ Array (i.e., PS 100).

ILA Circuit: A hardwired circuit within the ILM 112 that is used to carry out IL by way of developing and transmitting into PS 100 the circuit and signal codes needed to structure the circuitry required for an algorithm.

ILM: Instant Logic™ Module.

ILP: Instant Logic™ Paradigm.

IN: Index Number.

INC: Index Number Code.

IND: Index Number Decoder.

Index Number: The expression in binary code of an integer that had been assigned to an LN 102 to indicate the location of that LN 102 within a PS 100.

Index Number Code: A binary code into which the ordinal numbers of the LNs 102 are transformed in order to specify the locations of the LNs 102 within the PS 100.

Index Number Decoder: The circuitry that derives the IND from the integer codes for the LNs 102 as used in the drawings of circuits that are to be structured.

Information Processing (IP): The use of arithmetical and logic operations in order to obtain from a first set of information of a first nature a second set of information of a second nature that is implicit in that first set of information, or the sorting or other manipulation of such information.

Instant:=I, the time required to execute one cycle, dependent on both the rate at which the PTs and LNs can respond to a bit (controlled by the slowest of those two rates), and the time for a bit to travel from the output of one LN to the input of the receiving LN, the full "instant" being the sum of those two times.

Instant Logic™: The method of acquiring the circuitry needed to carry out IP at those times and places within a PS 100 at which data to be operated upon are located or will be created or otherwise appear, consisting essentially in the structuring, by way of transferring enabling bits to the gate terminals of selected ones of an array of circuit and signal PTs, of selected circuits at selected times and places relative to the data to be worked upon. The method aspect of the invention.

Instant Logic™ Apparatus (ILA): A functionally complete apparatus made up not only of all of the hardwired circuitry need to carry out IP using the IL methodology as constitutes the present invention, but also power supplies, monitor, printer, program control circuitry, etc.

Instant Logic™ Array (ILA): PS 100, i.e., the array of LNs 102, CPTs 104, and SPTs 105 that when those PTs are selectively enabled will have structured the circuits that will carry out the desired IP.

Instant Logic™ Circuit: See IL Circuit.

Instant Logic™ Paradigm (ILP): The procedure, opposite to that of the Babbage Paradigm (BP), in which instead of transmitting data to the circuitry that will operate on those data, as is done when under the BP, the circuitry is provided at the anticipated sites of the data in a separate Processing Space 100 (PS 100).

IP Task: A given course of IL operations that when carried out will yield some desired set of information from a set of information that had been provided.

IPA: Information Processing Apparatus, including both ILAs and conventional computers.

IS: Instruction Set.

Level: A term used to distinguish between (a) the types of code used to identify particular LNs 102, CPTs 104 and SPTs 105, that will vary in accordance with the dimensionality of the PS 100 to be used; (b) the degrees of detail used in a classification of items or events, wherein lower levels are broad in scope, and higher levels are carried out within a class of items that had been derived from a classification carried out at a lower level; and (c) the vertically separate operational portions of a 3-D "sky scraper" (multilevel) integrated circuit.

LI: Location Indicator.

Location Indicator: A cardinal number used to indicate the location of an LN 102 within PS 100.

Logic Grid: An array of LNs 102 that have been structured to work through a series of mutually related and interdependent logic choices, analogous to finding simultaneous solutions to a number of equations.

Logic Node: An operational transistor within the PS 100.

LN: A Logic Node.

Machine Code: The code that serves to enable selected PTs 104, 106 so as to structure all of the LNs 102 that will carry out the various IP operations on various algorithms.

Manifold: The geometric structure of an array of nodes in one, two, three or four dimensions in which the nodes located at "opposite," mutually facing ends, sides, edges, corners or vertices of a basic geometric structure are interconnected so that the nodes on or along the locations just listed will have the same number of connections thereto as do the nodes within that basic structure.

"Manifold-like": A PS 100 having the necessary added wiring so as to attain the geometry of a manifold, as a result of which the structure acts as though it had no "outside"—every node is electronically equivalent to every other node.

Modular: A form of the Instant Logic™ Apparatus that contains all of the components of a functional apparatus on just one Integrated Circuit, or at least on a very few (e.g., having PS 100 on one chip and everything else on a second chip) so as to form a single entity that could be multiplied as a unit to vary the size and capacity of the entire apparatus.

$n_f$: The number of nodes in a node array that are surrounded on all sides by other nodes.

$n_t$: The total number of nodes in a node array.

NCQ: Normalized Connection Quotient.

"Next Adjacent": In a listing of three elements in the order first, second, third, the third element is adjacent to the second element and is "next adjacent" to the first element.

Normal Path: A bit path in which a bit being transferred along a data path will be "captured" by the receiving LN 102 in the cycle following that in which the bit was released by the originating LN 102.

Normalized Connection Quotient: The ratio of the number of actual connections in an LN 102 array to the number there would be if every LN 102 had four connections, that ratio then being divided by the CQ of a 10×10 array.

Operand: An item of information as to which some kind of translational operation is to be carried out, or to which some kind of IP is to be applied.

Operational Code: A code applied to an Instant Logic™ Apparatus that will enable selected pass transistors therein so as to render the operational transistors therein able to carry out information processing.

Operational Joinder: The essential first step of all IP, which is to bring together the data (i.e., the "operands") and the apparatus by which those data are to be operated upon. Using the Babbage/von Neumann Paradigm (BvNP), that joinder is brought about by transferring the operands to the apparatus that would carry out the desired processing on those data, while in the Instant Logic™ Paradigm (ILP) that joinder is brought about by structuring the required circuit(s) at the site(s) of the data.

Operational Transistor: A transistor that has or is to have connections made thereto from $V_{dd}$ and GND, from an input source, and as an output recipient and transmitter, that in IL are the LNs within the PS 100 of the ILA. The terminals of the operational transistors used as example herein have had terminals designated as being a drain, a gate and a source terminal, but the term is not limited to that transistor type, and applies as well to bipolar operational transistors for which the terminals thereon are designated as emitter, base, and collector.

Optically Active: Said of a material having an asymmetric internal structure that renders that material responsive to the state of polarization of light impinging thereon.

OT: Originating transistor.

Pass transistor: A transistor of a symmetric construction that as a positive type is normally non-conductive and becomes conductive upon the application of an enabling voltage to the gate terminal thereof, or as a negative type is normally conductive but becomes non-conductive upon the application of a voltage to that gate terminal. A dominant feature of the pass transistor is that because of the symmetric construction thereof, electrical current once allowed can pass through the pass transistor with equal ease in either direction.

Passive: The condition of a transistor that is physically interconnected into a circuit as would be required in an active functioning of the transistor, but yet lacks any electrical connection, either direct or indirect, to $V_{dd}$ or to GND and hence could not respond to any signal bits arriving on a terminal thereof. (An LN 102 participates passively in a circuit when serving as a BYPASS gate.)

PE: Processing Element.

Perimetric: Being located on the perimeter or outer surface of a body.

Photon: In the interest of saving space, the term "photon" is used in a very generic sense to designate the bundle of photons that would be emitted by turning on a light-producing source, just as the term "bit" is used to designate either an excess or a deficiency of electrons.

Processing Element: The smallest functional element into which the circuitry carrying out IP can be broken down and that when then replicated would yield the total processing power of an IP apparatus. Consists in IL of an LN 102 and all of the PTs 104, 106 connected thereto that when enabled will either place that LN 102 into operable form (Circuit PTs (CPTs) 104) or will transfer data to and from that LN 102 (Signal PTs (SPTs) 106). (See FIG. 1.) The term is not used especially as a part of describing IL itself, but rather to draw a contrast between the granularity of this invention and those of other devices, particularly "supercomputers" that use a microprocessor as the PE in a parallel processing architecture.

Processing Space: The component within an Instant Logic™ Module (ILM) that is made up of all of the PEs at which circuits are to be structured so as to carry out Instant Logic™ processes and thus execute algorithms.

PS: (a) Processing Space or (b) Pathway Segment.

r: An integer that expresses the number of locations along a straight line that a particular LN 102 is located away from a reference location, as in $LI_i=LI_0\pm r$.

$r_n$: The ratio $n_f/n_t$ of the number of nodes in a node array that are fully connected to other nodes, given by $n_f$, to the total number of nodes in the array, given by $n_t$.

Race path: A bit being transferred along a data path will be "captured" by the receiving LN 102 in the same cycle as that in which the bit was released by the originating LN 102.

Range: The extent over which instances of some event, condition, or the like can or have been shown to occur or can be observed.

Reverse structuring: Given that a "normal" course of structuring a circuit will employ the SPTs 106 that are either upward or to the right of the LN 102 being structured, the circumstance, perhaps arising from structure blocking, in which the structuring in question must instead be carried out using SPTs 106 that are downward or to the left of the LN 102 being structured, the proximal ends of the SPTs 106 then to be used then being located on that downward or leftward LN 102.

Router: A simple or complex logic circuit that on the basis of having received a particular one of several possible bit strings at one or more inputs thereto will route any data that may appear on one or more other inputs thereto onto one of several specific, pre-selected data paths, as determined by which particular bit string had been transmitted thereto.

RT: Receiving transistor.

Scalability Factor: The Normalized Connection Quotient (NCQ) of an array of PEs, which is the ratio of the number of actual connections of the PEs therein to the number possible if the PEs all had four connections, then normalized by the Connection Quotient (CQ) of a 10×10 array (360/400=0.9).

Scalable: With reference to computers and like information processing devices, the character that if the size of the device was increased by some multiplying factor, the "speed" or throughput of the devise would likewise increase, to the same degree. (See super-scalable and sub-scalable.)

"Severally": When applied to making connections, meaning that a particular element may connect to several different ones of the element type to which those connections are made.

SF: Scalability Factor.

Signal Code: The code used in the PS 100 of an ILA that defines which signal PTs are to be enabled so as to allow the passage of a data bit therethrough.

Signal PTs (SPTs): PTs that connect between the terminals of a given LN 102 and the terminals of adjacent LNs 102 or an external data source, that when enabled will allow the transfer of signal bits over the signal paths so created.

SRAM: Static Random-Access Memory.

Stage: A particular state or condition of an ongoing IP task, such that the various stages follow each other either in time or in the extent to which the IP task had been completed.

Step: The full range of bit transfer and circuit response that will take place within a single operating cycle, i.e., within an instant, whereby some total number of such steps will represent the full completion of some IP task.

Structure: (Verb) To form a functional binary circuit or part of such circuit by the method of IL, i.e., by enabling a selection of circuit and signal PTs. Enabling those circuit and signal PTs will cause different terminals of different LNs to be interconnected, thus to form a desired binary circuit or part of such a circuit.

(Noun) With respect to some particular manner of construction of a circuit or gate, the form in which the circuit or gate appears after having been structured by the methods of IL.

"Structure blocking": The prevention of a course of structuring from proceeding in a certain direction because one or more other LNs 102 that would be employed in the structuring of a circuit or part thereof as desired have already been structured as part of the circuitry for another or even the same algorithm as to the same cycle.

"Structuring direction": The general direction through a PS 100 along which a series of circuits is structured. With that as the longitudinal direction of the structuring, the line along which a number of LNs 102 are structured in order to accommodate an n-bit VLDS would be necessarily be transverse to that main direction of advance through the PS 100

Sub-scalable: Said of a computer or other information processing device that when increased in size to some multiple of the original size, the throughput of the resultant device would be less than the product of the original throughput and the multiplying factor used.

Super-scalable: Said of a computer or other information processing device that when increased in size to some multiple of the original size, the throughput of the resultant device would be greater than the product of the original throughput and the multiplying factor used.

"Transistor-like": As an adjective pertaining to an electronic switch, the phrase encompasses any kind of electronic switch that has opposite ends between which electric current either can or cannot pass, depending on whether or not an element of the switch that lies between those opposite ends has had placed thereon a voltage or other appropriate energy source that does or does not permit passage of electric current or other relevant energy transmission between those opposite ends, the switch thus acting in a binary fashion, i.e., so as to exhibit one or the other of only two conditions, i.e., of being "on" (when such electric current passage is permitted) or "off" (when such electric current passage is precluded).

"Untethered": Said of an electronic instrument that is not connected to an AC power source and must therefore rely on battery power.

Variable Length Datum Segment (VLDS): An information-containing bit string that may contain various numbers of bits rather than some fixed number, in the form of bytes or words of some variable bit length. Can be produced by zero stripping a byte or word of some fixed length of any leading zeros that may be present, thereby to leave a bit string or "datum segment" that may have various lengths, depending on the original bit length of the datum segment and how many leading zeros had been stripped.

Zero strip: To remove leading zeros from a binary expression of text or numbers so as to leave a datum segment that contains fewer bits and only actual information.

I claim:

1. Apparatus for information processing, comprising:

An array of passive energy transmitting devices, each having a number of terminals thereon that are connectible along directions as defined by a dimensionality of said array, each of said passive energy transmitting devices being capable of being transformed into a corresponding active energy transmitting device capable of receiving energy packets having information contained therein and performing information processing on said energy packets;

A first array of active energy transmitting devices having proximal and distal ends, said active energy transmitting devices being capable of passing energy packets therethrough upon an imposition thereto of an enabling signal, with said proximal ends of said active energy transmitting devices being connected respectively to different ones of said connectible terminals on said passive energy transmitting devices, and said distal ends of selected ones of said active energy transmitting devices being connected respectively to an energy source, an entry location for energy packets, and an energy sink;

A second array of active energy transmitting devices having proximal and distal ends, said active energy transmitting devices being capable of passing energy packets therethrough upon an imposition thereto of an enabling signal, with the proximal ends of each of said energy active transmitting devices of this second array that had not already been connected to an energy source, entry location for energy packets, or energy sink, connecting to each of said connectible terminals on each of said passive energy transmitting devices, with the distal ends of each of said active energy transmitting devices of this second array that had not already been connected to an energy source, entry location for energy packets, or energy sink, connecting to each of said connectible terminals of an adjacent passive energy transmitting device, in as many directions as may be defined by the dimensionality of said arrays of active and passive energy transmitting devices; and Addressing means by which enabling signals can be directed to selected ones of said active energy transmitting devices; whereupon An imposition of an enabling signal onto one or more of said active energy transmitting devices connected to one or more of said passive energy transmitting devices will transform said one or more passive energy transmitting devices into corresponding active energy transmitting devices capable of performing information processing upon an entry of energy packets into said entry location for energy packets; and Data entry means by which data bits (energy packets) requiring information processing are acquired and sent to appropriate ones of said data entry locations, so that upon a use of said data entry means by actual data entry, in conjunction with an entry of enabling bits to appropriate ones of said active energy transmitting devices as established by an algorithm being executed and the data provided, will bring about a desired information processing.

2. The apparatus of claim 1 wherein said apparatus, said passive energy transmitting devices and said active energy transmitting devices are all electronic circuits, said energy is electronic energy, and said enabling signal is an enabling voltage.

3. The apparatus of claim 2 wherein said electronic circuits for said passive energy transmitting circuits comprise operational transistors and said electronic circuits for active energy transmitting devices comprise pass transistors, said energy packets are electronic bits, and an array of operational transistors and pass transistors comprises a processing space.

4. The apparatus of claim 3 wherein an application of enabling voltages to said pass transistors is controlled by code entered into said processing space through a code selector unit.

5. The apparatus of claim 4 wherein said code selector comprises a circuit code selector and a signal code selector.

6. The apparatus of claim 5 wherein said circuit code selector comprises:

A number of circuit code input nodes each being connected respectively to a first input to an XNOR gate;

A number of XNOR gates being equal to the number of said circuit code input nodes;

Reference latches holding respective values "0" and "1" that connect respectively to a second input to each of said XNOR gates, whereupon an entry of the same bit value from said circuit code input node to said first input to said XNOR gate as a bit value of said reference latch that is connected to said second input to said XNOR gate will bring about a "1" bit output from said XNOR gate; wherein The said "0" and "1" bit values that are held in said reference latches are established in such a manner as to form a number of bit combinations of a pre-selected bit length, each of said bit combinations being distinct in terms of the bit values held from every other bit combination formed in that same manner;

Each of said distinct bit combinations is connected to said second inputs of a number of arrays of XNOR gates wherein a bit length of each said array of XNOR gates is the same as the bit lengths of said bit combinations;

Each XNOR gate of a particular said array of XNOR gates to which any one of said bit combinations is sent from said reference latches is a different XNOR gate from any XNOR gate to which a different one of said bit combinations has been sent;

A number of AND gates each having a number of inputs equal to the number of XNOR gates contained in each of said arrays of said XNOR gates, an output of each of said XNOR gates of a particular array of said XNOR gates being connected respectively to each of said inputs to that one of said AND gates to which are connected the outputs of those said XNOR gates that are connected to the particular AND gate, whereby Upon all of the XNOR gates of a particular one of said arrays of said XNOR gates having yielded a "1" bit, said AND gate to which said particular one array of said XNOR gates connects will yield a "1" bit;

An array of enable latches equal in number to the number of said AND gates, to which gates of said enable latches are respectively connected outputs of said AND gates, and An array of voltage sources equal in number to the number of said enable latches and being connected respectively to each of said enable latches, whereby A receipt of a "1" bit by a particular one of said enable latches from the said AND gate connected thereto will cause a voltage from that particular said voltage source that is connected to said particular one of said enable latches to pass through said particular one of said enable latches, with said voltage then serving as a "1" bit to enable that pass transistor within a processing space to which an enable latch is connected, as one part of structuring a circuit using operational transistors of said processing space as one part of structuring a circuit using the operational transistors of said processing space.

7. The apparatus of claim 5 wherein said signal code selector comprises:

A first DMUX having lines therefrom connecting to three second DMUXs, pertaining respectively to drain, gate, and source terminals of an operating transistor serving as an originating transistor, with a pass transistor to be enabled being connected to that one of said drain, gate, and source terminals of said originating transistor that had been selected by said first DMUX;

An array of second DMUXs, each of which connects to one of said lines connecting from said first DMUX, and has two lines connecting thereto that pertain to upward and rightward directions from said originating transistor, with said pass transistor that is to be enabled being directed in a direction as defined by that same said second DMUX that had itself been selected by said first DMUX; and An array of six third DMUXs, each of which connects to one of said two lines connecting from one of said three second DMUXs, and has three lines connected therefrom that pertain respectively to the drain, gate, and source terminals of an operating transistor acting as a receiving transistor;

An array of six 3-line code enablers, with each of said code enablers being connected to one of said three lines connecting from one of said six third DMUXs and having enabling lines connecting therefrom, with each of said lines being connected to the gate terminal of a pass transistor; and One or more voltage sources that collectively will connect to each of said code enablers, whereby a "1" bit received by one of said code selectors through said first, second and third DMUXs will direct voltage from said voltage sources to the gate terminal of that pass transistor that is connected to that terminal of said receiving transistor as had been selected by said first, second, and third DMUXs.

8. The apparatus of claim 4 wherein said processing space has a manifold-like construction, comprising:

A multiplicity of manifold lines having first ends that connect indirectly to at least one operational transistor that is physically located on an outer surface of said processing space, along an edge of said processing space, or at a corner of said processing space, and second ends that connect directly to respective operational transistors that are physically located at opposite positions with respect to a location of each said at least one operational transistor, within an opposite surface, an opposite edge, or an opposite corner, respectively;

A multiplicity of manifold line pass transistors having a number that is equal to the number of said manifold lines, connected respectively to said first ends of said manifold lines that connect indirectly to said at least one operational transistor, and further connected to at least one terminal of said at least one operational transistor, thereby making direct connection thereto;

A multiplicity of manifold line pass transistor enablers having a number that is equal to the number of said manifold line pass transistors that are connected respectively to each of said manifold line pass transistors, whereby An enabling voltage from one of said manifold line pass transistor enablers to that manifold line pass transistor to which connected will cause said manifold line pass transistor to become conductive, thereby Enabling a signal voltage to be conveyed from a terminal of a first operational transistor to a second operational transistor that is physically located oppositely to said first operational transistor, said first and second operational transistors being located on opposite sides, opposite edges, or opposite corners of said processing space.

* * * * *